United States Patent
Takeda et al.

(10) Patent No.: US 7,760,305 B2
(45) Date of Patent: Jul. 20, 2010

(54) LIQUID CRYSTAL DISPLAY DEVICE WITH MULTIPLE ALIGNMENT STRUCTURES

(75) Inventors: Arihiro Takeda, Kawasaki (JP); Katsufumi Ohmuro, Kawasaki (JP); Yoshio Koike, Kawasaki (JP); Shingo Kataoka, Kawasaki (JP); Takahiro Sasaki, Kawasaki (JP); Takashi Sasabayashi, Kawasaki (JP); Hideaki Tsuda, Kawasaki (JP); Hideo Chida, Kawasaki (JP); Makoto Ohashi, Kawasaki (JP); Kenji Okamoto, Kawasaki (JP); Hisashi Yamaguchi, Kawasaki (JP); Minoru Otani, Kawasaki (JP); Makoto Morishige, Kawasaki (JP); Noriaki Furukawa, Kawasaki (JP); Tsuyoshi Kamada, Kawasaki (JP); Yoshinori Tanaka, Kawasaki (JP); Atuyuki Hoshino, Kawasaki (JP); Shougo Hayashi, Kawasaki (JP); Hideaki Takizawa, Kawasaki (JP); Takeshi Kinjou, Kawasaki (JP); Makoto Tachibanaki, Kawasaki (JP); Keiji Imoto, Kawasaki (JP); Tadashi Hasegawa, Kawasaki (JP); Hidefumi Yoshida, Kawasaki (JP); Hiroyasu Inoue, Kawasaki (JP); Yoji Taniguchi, Kawasaki (JP); Tetsuya Fujikawa, Kawasaki (JP); Satoshi Murata, Kawasaki (JP); Manabu Sawasaki, Kawasaki (JP); Tomonori Tanose, Yonago (JP); Siro Hirota, Kawasaki (JP); Masahiro Ikeda, Kawasaki (JP); Kunihiro Tashiro, Kawasaki (JP); Kouji Tsukao, Yonago (JP); Yasutoshi Tasaka, Kawasaki (JP); Takatoshi Mayama, Kawasaki (JP); Seiji Tanuma, Kawasaki (JP); Yohei Nakanishi, Kawasaki (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 12/121,390

(22) Filed: May 15, 2008

(65) Prior Publication Data
US 2008/0303997 A1      Dec. 11, 2008

Related U.S. Application Data

(60) Continuation of application No. 11/600,859, filed on Nov. 16, 2006, now abandoned, which is a continuation of application No. 09/689,928, filed on Oct. 12, 2000, now Pat. No. 7,224,421, which is a division of application No. 09/097,027, filed on Jun. 12, 1998, now Pat. No. 6,724,452.

(30) Foreign Application Priority Data

| Jun. 12, 1997 | (JP) | ................................... | 9-155437 |
| Aug. 27, 1997 | (JP) | ................................... | 9-230982 |
| Aug. 27, 1997 | (JP) | ................................... | 9-230991 |
| Sep. 30, 1997 | (JP) | ................................... | 9-266937 |
| Dec. 26, 1997 | (JP) | ................................... | 9-361384 |

(51) Int. Cl.
    *G02F 1/1337*    (2006.01)
    *G02F 1/1343*    (2006.01)
(52) U.S. Cl. ..................................... 349/129; 349/139
(58) Field of Classification Search ......... 349/129–130, 349/139
    See application file for complete search history.

(56) References Cited

U.S. PATENT DOCUMENTS

| 4,038,439 | A | 7/1977 | Gibson et al. |
| 4,068,925 | A | 1/1978 | Tani et al. |
| 4,247,174 | A | 1/1981 | Walter |
| 4,333,708 | A | 6/1982 | Boyd et al. |
| 4,385,806 | A | 5/1983 | Fergason |
| 4,701,028 | A | 10/1987 | Clerc |
| 4,786,147 | A | 11/1988 | Clerc |
| 4,861,143 | A | 8/1989 | Yamazaki et al. |
| 4,889,412 | A | 12/1989 | Clerc |

| | | |
|---|---|---|
| 5,039,185 A | 8/1991 | Uchida et al. |
| 5,136,407 A | 8/1992 | Clerc |
| 5,196,954 A | 3/1993 | Yamazaki et al. |
| 5,298,199 A | 3/1994 | Hirose et al. |
| 5,309,264 A | 5/1994 | Lien |
| 5,309,624 A | 5/1994 | Nishikawa |
| 5,434,690 A | 7/1995 | Hisatake et al. |
| 5,473,455 A | 12/1995 | Koike |
| 5,504,604 A | 4/1996 | Takatori et al. |
| 5,557,434 A | 9/1996 | Winker et al. |
| 5,576,863 A | 11/1996 | Aoki et al. |
| 5,579,140 A | 11/1996 | Yamahara et al. |
| 5,583,679 A | 12/1996 | Ito et al. |
| 5,608,556 A | 3/1997 | Koma |
| 5,666,179 A | 9/1997 | Koma |
| 5,673,092 A | 9/1997 | Horie |
| 5,694,188 A | 12/1997 | Sano et al. |
| 5,717,474 A | 2/1998 | Sarma |
| 5,745,206 A | 4/1998 | Koike et al. |
| 5,757,451 A | 5/1998 | Miyazaki et al. |
| 5,757,455 A | 5/1998 | Sugiyama et al. |
| 5,781,262 A | 7/1998 | Suzuki et al. |
| 5,796,456 A | 8/1998 | Takatori et al. |
| 5,831,700 A | 11/1998 | Li et al. |
| 5,831,704 A | 11/1998 | Yamada et al. |
| 5,872,611 A | 2/1999 | Hirata et al. |
| 5,905,556 A | 5/1999 | Suzuki et al. |
| 5,907,380 A | 5/1999 | Lien |
| 5,909,265 A | 6/1999 | Kim et al. |
| 5,917,572 A | 6/1999 | Kurauchi et al. |
| 5,953,091 A | 9/1999 | Jones et al. |
| 5,953,093 A | 9/1999 | Hirata et al. |
| 5,959,707 A | 9/1999 | Murai et al. |
| 5,963,290 A | 10/1999 | Murai et al. |
| 5,986,732 A | 11/1999 | Ozeki et al. |
| 5,995,190 A | 11/1999 | Nagae et al. |
| 6,061,116 A | 5/2000 | Nishida et al. |
| 6,061,117 A | 5/2000 | Horie et al. |
| 6,147,729 A | 11/2000 | Kurauchi et al. |
| 6,191,836 B1 | 2/2001 | Woo et al. |
| 6,195,144 B1 | 2/2001 | Murai et al. |
| 6,266,116 B1 | 7/2001 | Ohta et al. |
| 6,288,762 B1 | 9/2001 | Sasaki et al. |
| 6,300,993 B1 | 10/2001 | Kuo et al. |
| 6,512,564 B1 | 1/2003 | Yoshida et al. |
| 6,567,144 B1 * | 5/2003 | Kim et al. .................... 349/128 |
| 6,704,083 B1 | 3/2004 | Kim et al. |
| 6,710,837 B1 * | 3/2004 | Song et al. .................. 349/143 |
| 6,781,657 B1 | 8/2004 | Kim et al. |
| 6,903,791 B2 * | 6/2005 | Sasaki ........................ 349/129 |
| 7,180,567 B2 | 2/2007 | Ikeda et al. |
| 7,304,703 B1 | 12/2007 | Takeda et al. |

FOREIGN PATENT DOCUMENTS

| | | |
|---|---|---|
| EP | 445777 | 9/1991 |
| EP | 636917 | 2/1995 |
| EP | 676661 | 10/1995 |
| EP | 0 740 182 A2 | 10/1996 |
| EP | 854377 | 7/1998 |
| EP | 0864377 | 7/1998 |
| GB | 1462978 | 1/1997 |
| JP | 60-256121 | 12/1985 |
| JP | 1-189629 | 7/1989 |
| JP | 1-196020 | 8/1989 |
| JP | A 2-15238 | 1/1990 |
| JP | 02-035416 | 2/1990 |
| JP | 2-151830 | 6/1990 |
| JP | 2-190825 | 7/1990 |
| JP | A 2-267524 | 11/1990 |
| JP | 3-043701 | 2/1991 |
| JP | 3-209220 | 9/1991 |
| JP | 3-261914 | 11/1991 |
| JP | 04-251285 | 9/1992 |
| JP | 5-173142 | 7/1993 |
| JP | 6-082777 | 3/1994 |
| JP | 06-194656 | 7/1994 |
| JP | 6-258649 | 9/1994 |
| JP | 6-301036 | 10/1994 |
| JP | 7-013164 | 1/1995 |
| JP | 7-028063 | 1/1995 |
| JP | 7-043719 | 2/1995 |
| JP | 07-120767 | 5/1995 |
| JP | 07-147426 | 6/1995 |
| JP | 7-199193 | 8/1995 |
| JP | 7-199205 | 8/1995 |
| JP | 07-225389 | 8/1995 |
| JP | 7-230097 | 8/1995 |
| JP | 7-234414 | 9/1995 |
| JP | 7-281195 | 10/1995 |
| JP | 7-104450 | 11/1995 |
| JP | 7-311383 | 11/1995 |
| JP | 7-318950 | 12/1995 |
| JP | 07-333617 | 12/1995 |
| JP | 08-022023 | 1/1996 |
| JP | 08-029790 | 2/1996 |
| JP | 08-043825 | 2/1996 |
| JP | A 8-76125 | 3/1996 |
| JP | 08-095054 | 4/1996 |
| JP | 08-101399 | 4/1996 |
| JP | 2507122 | 4/1996 |
| JP | 8-292423 | 11/1996 |
| JP | 09-033882 | 2/1997 |
| JP | 9-043592 | 2/1997 |
| JP | 9-105908 | 3/1997 |
| JP | 09-120072 | 5/1997 |
| JP | 9-120075 | 5/1997 |
| JP | 09-146098 | 6/1997 |
| JP | 09-152583 | 6/1997 |
| JP | 09-325373 | 12/1997 |
| JP | 10-048634 | 2/1998 |
| WO | WO97/12275 | 4/1997 |
| WO | WO 98/57222 | 12/1998 |

OTHER PUBLICATIONS

Soref et al.; "Electrically Controlled Birefringence of Thin Nematic Films"; *Journal of Applied Physics*, vol. 43, No. 5, May 1972, pp. 2029-2037.

Aratani et al., "Complete Suppression of Color Shift in In-Plane Switching Mode Liquid Crystal Displays with a Multidomain Structure Obtained by Unidirectional Rubbing," Japanese Journal of Applied Physics, Tokyo, JP, vol. 36, No. 1A/B, Part 2, Jan. 15, 1997, pp. L27-L29.

Anonymous, "Liquid Crystal Display," Research Disclosure, vol. 41, No. 409, May 1, 1998.

Lien et al., "UV modification of surface pretilt of alignment layers for multidomain liquid crystal displays," Appl, Phys. Lett. 67 (21), Nov. 1995, pp. 3108-3110.

SID 97 Digest, Society for Information Display International Symposium Digest of Technical Papers, vol. XVIII, pp. 675-678 (1997).

Okamoto; MVA Liquid Crystal Technology—Latest Version of VA Liquid Crystals; *Nikkei Flat Panel Display*; Part 3-6; pp. 104-107, 1998.

Ohmuro et al., Development of Super-High-Image-Quality Vertical-Alignment-Mode LCD, DIS 97 Digest; pp. 845-848, 1997.

Ong, H.L., "Multi-Domain Homeotropic LCDs with Symmetrical Angular Optical Performance," *SID International Symposium Digest of Papers*, vol. 23, May 17, 1992, pp. 405-408.

\* cited by examiner

Primary Examiner—Dung T. Nguyen
(74) Attorney, Agent, or Firm—Greer, Burns & Crain, Ltd.

(57) ABSTRACT

A liquid crystal display device that includes a plurality of pixels, a first substrate and a second substrate, as well as a liquid crystal layer provided between the first and second substrates. A first alignment structure and a second alignment structure are formed on the first substrate, and a third alignment structure and a fourth alignment structure are formed on the second substrate, for controlling an alignment of the liquid crystal. At least one auxiliary alignment structure is also formed on the first substrate for controlling an alignment of liquid crystals. The first and second alignment structures extend linearly in different directions from each other in a pixel, and the third and fourth alignment structures extend parallel to the first and second alignment structures, respectively. Also, the auxiliary alignment structure extends substantially along an edge of the pixel.

21 Claims, 246 Drawing Sheets

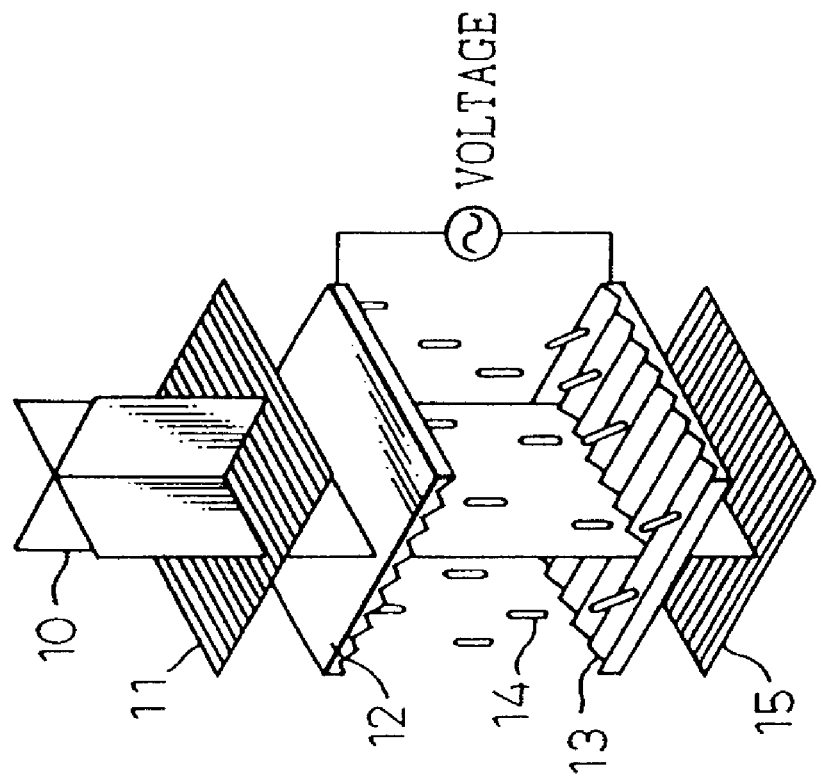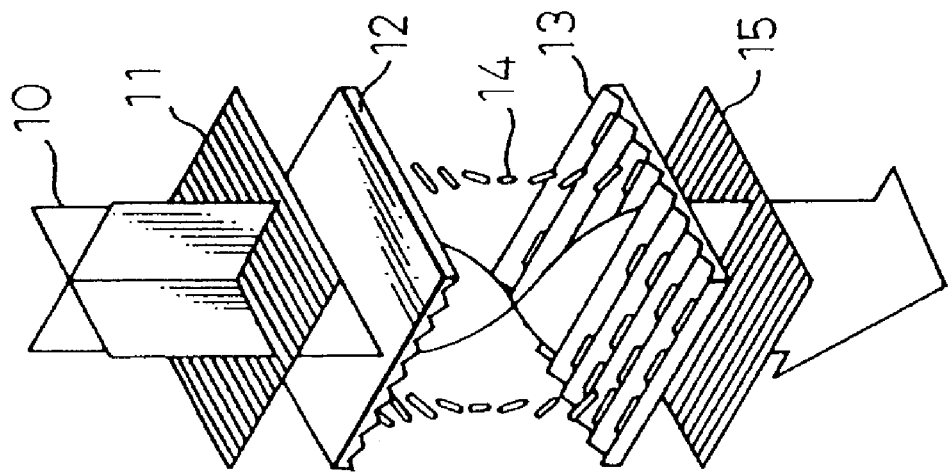

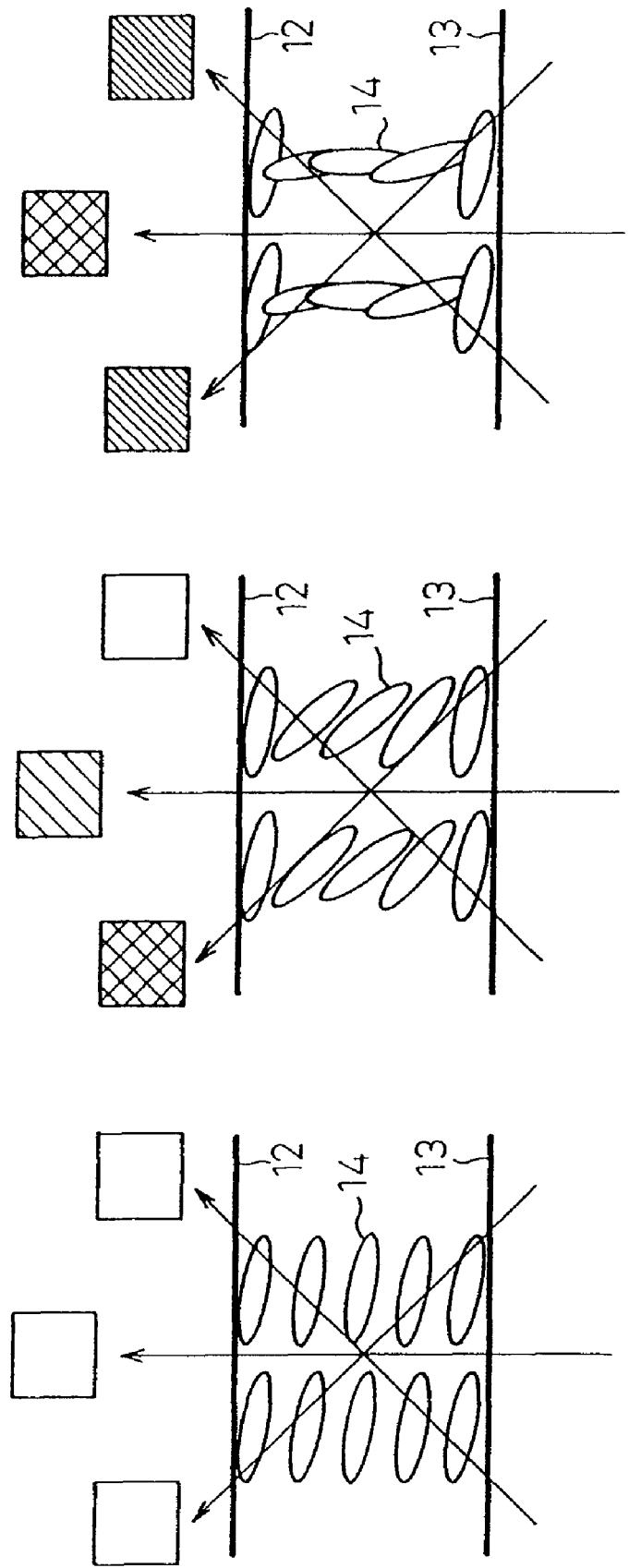

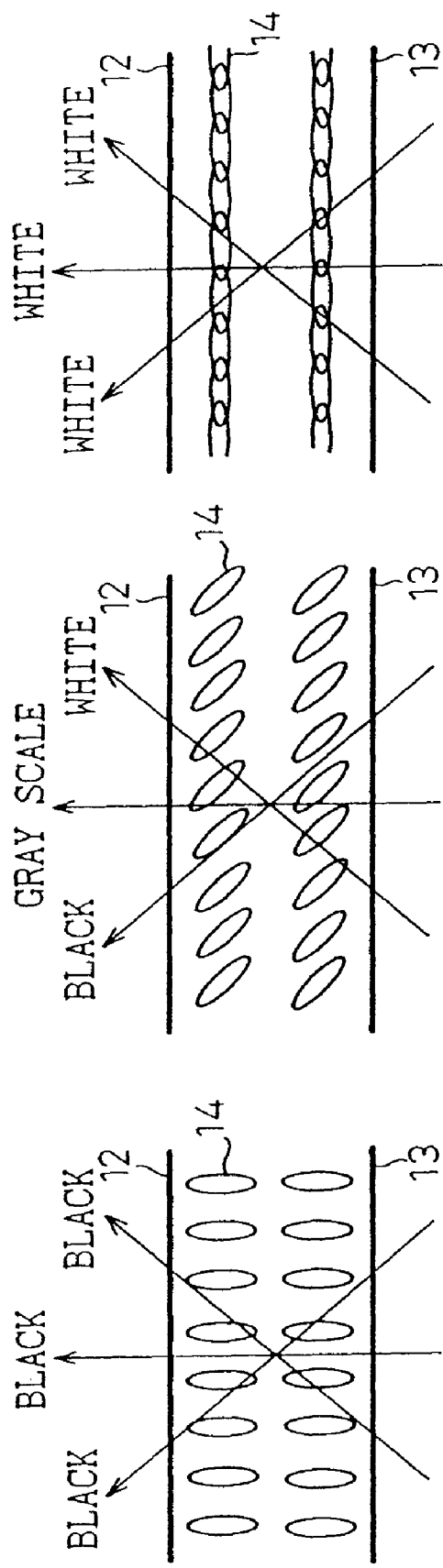

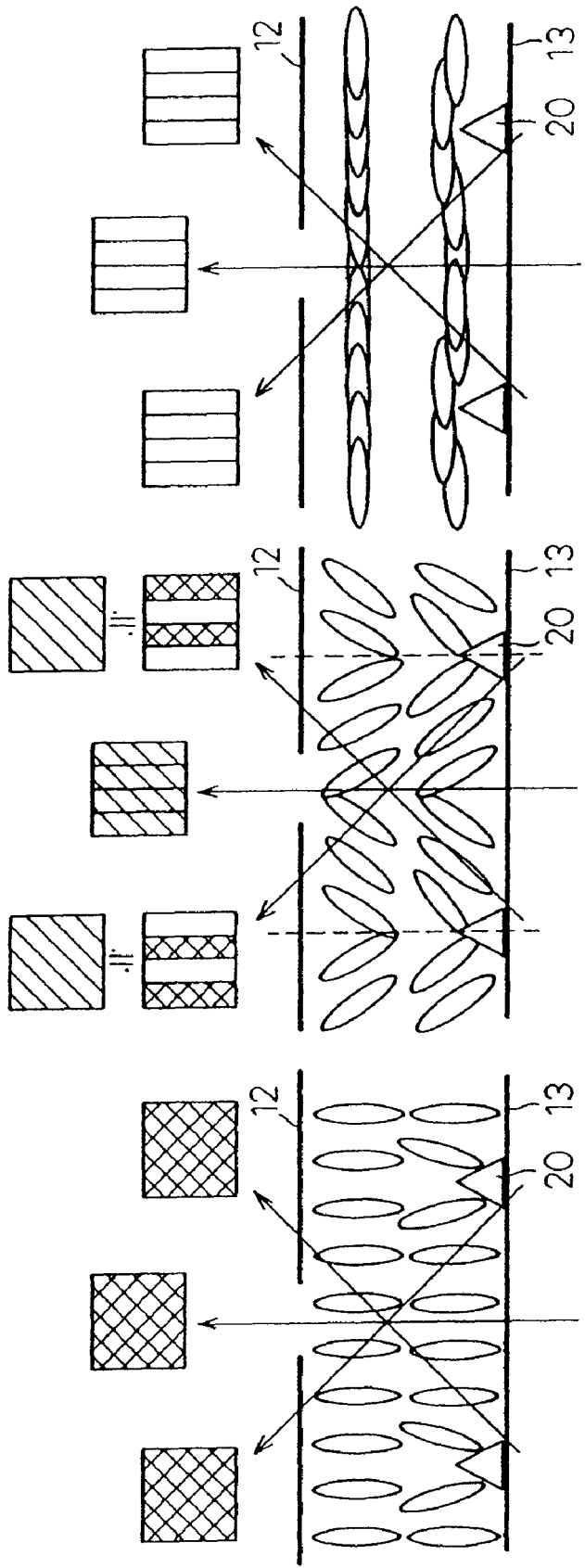

ON RESPONSE SPEED

OFF RESPONSE SPEED

−45°

−90°

−90°

−45°

0°

Fig.49A
Fig.49B
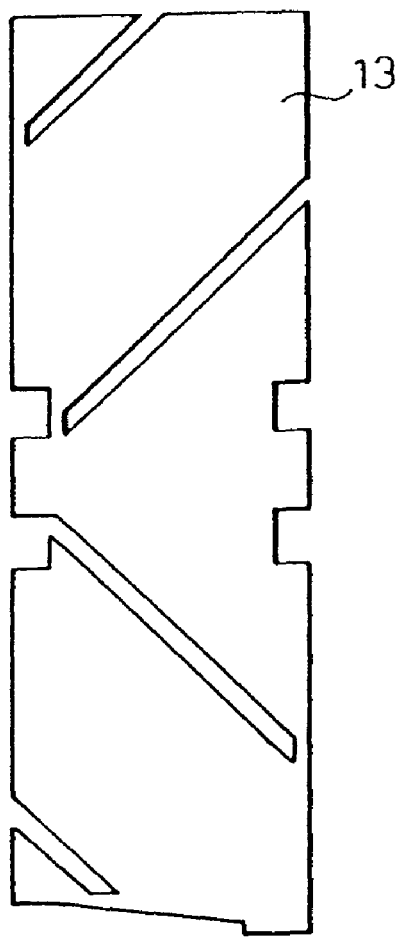
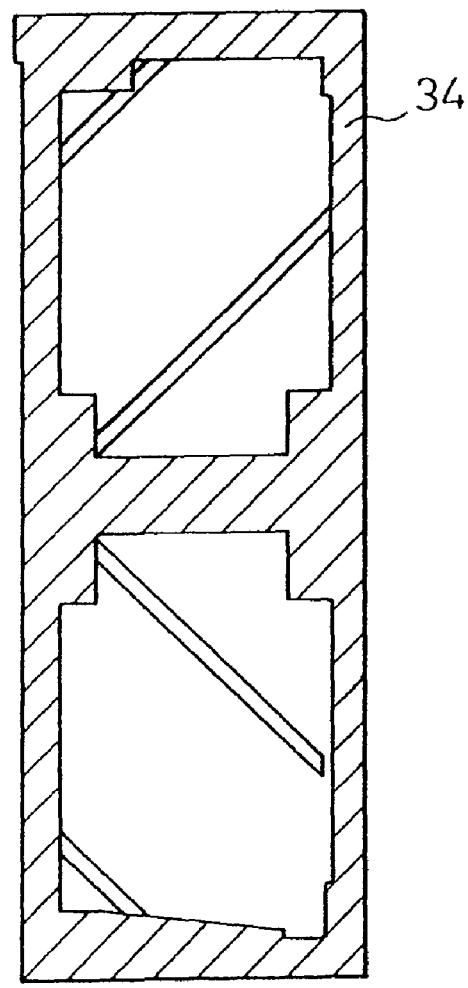

Fig.50A
Fig.50B
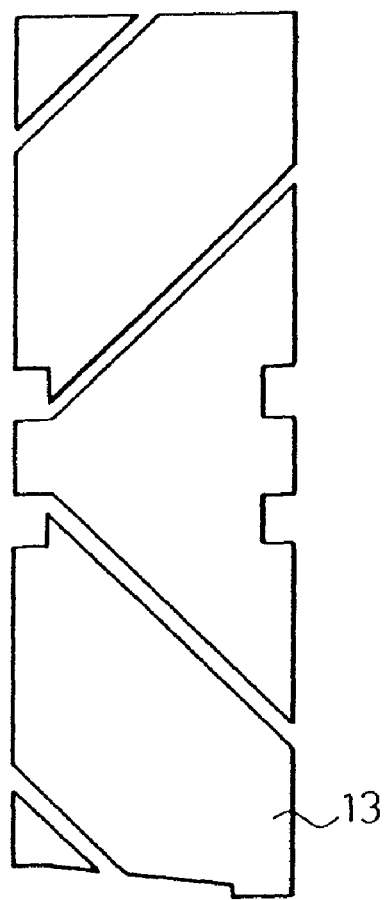
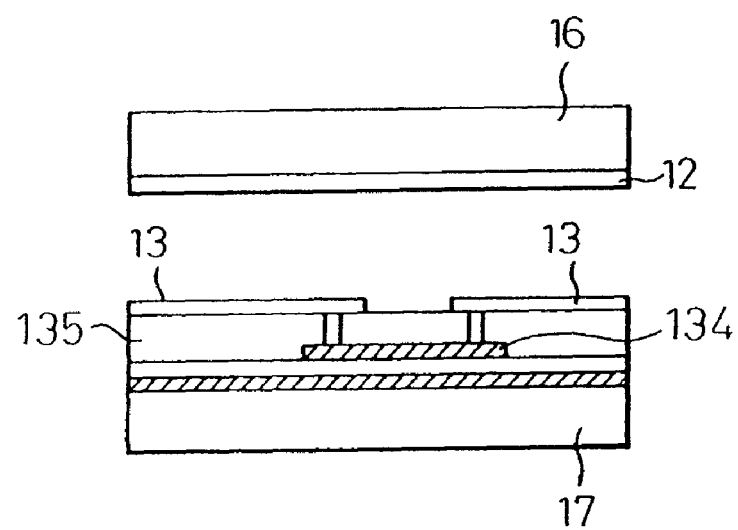

WHEN NO VOLTAGE IS APPLIED

WHEN A VOLTAGE IS APPLIED

A-A'

B-B'

A-A'

B-B'

20B  20A

A'+A"=2A

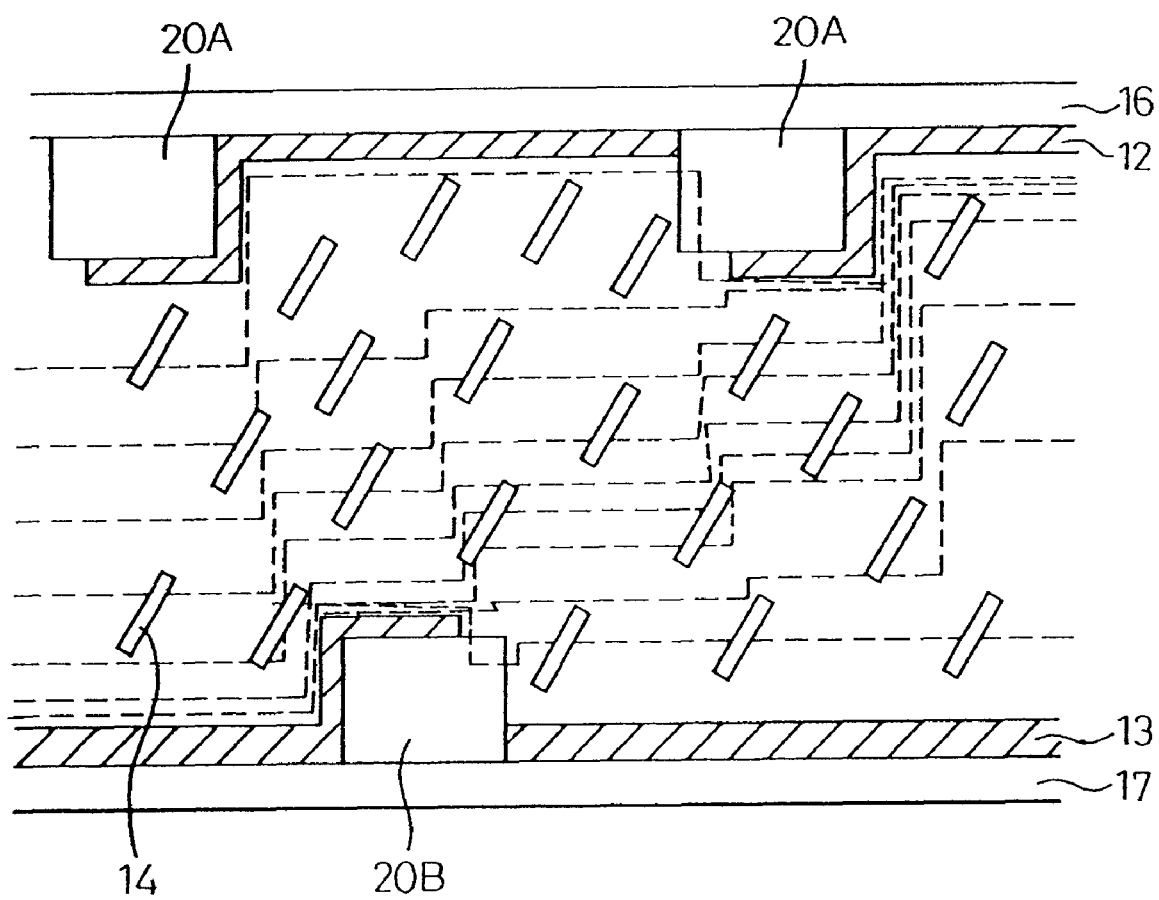

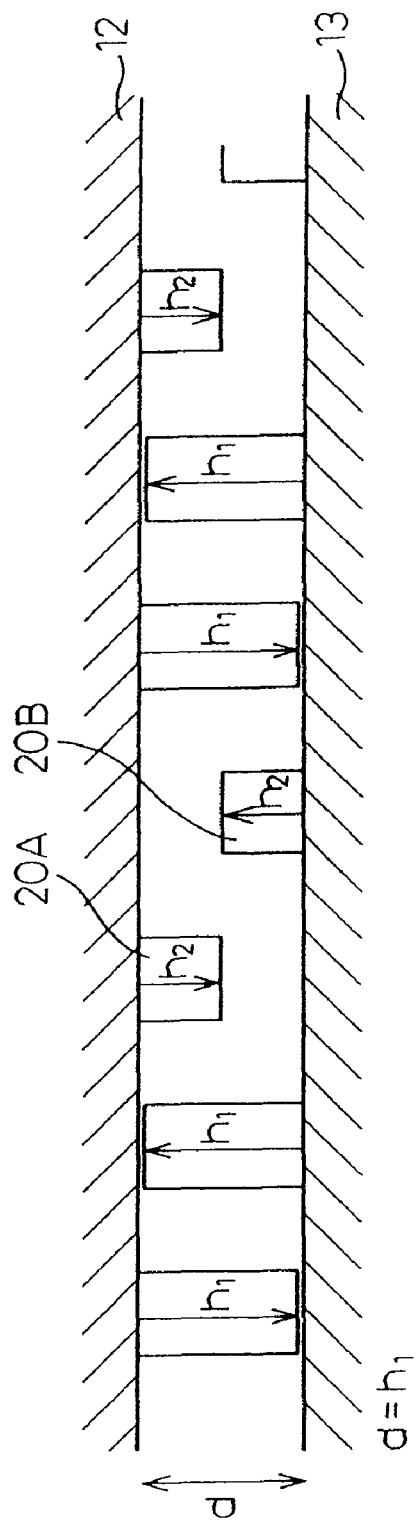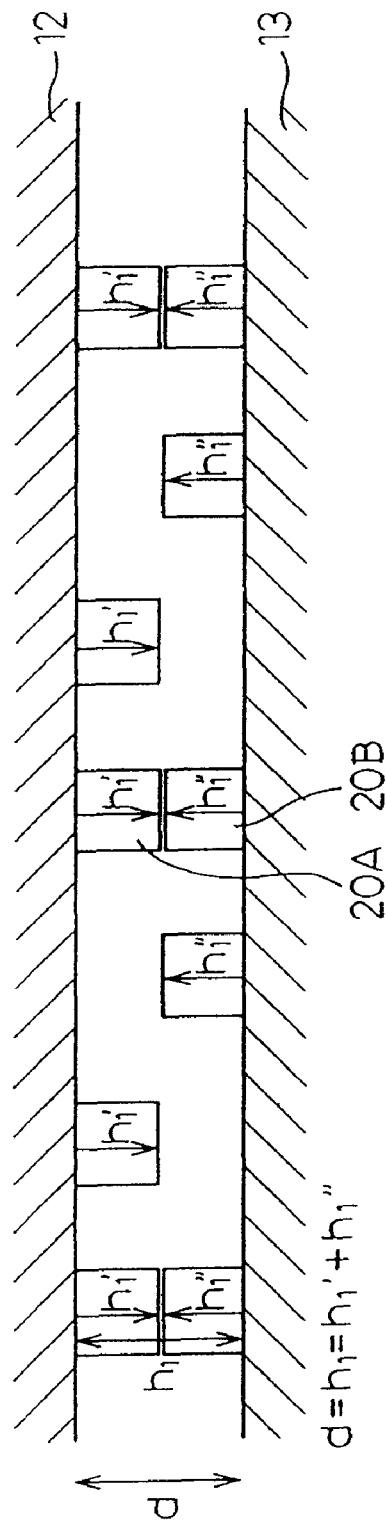

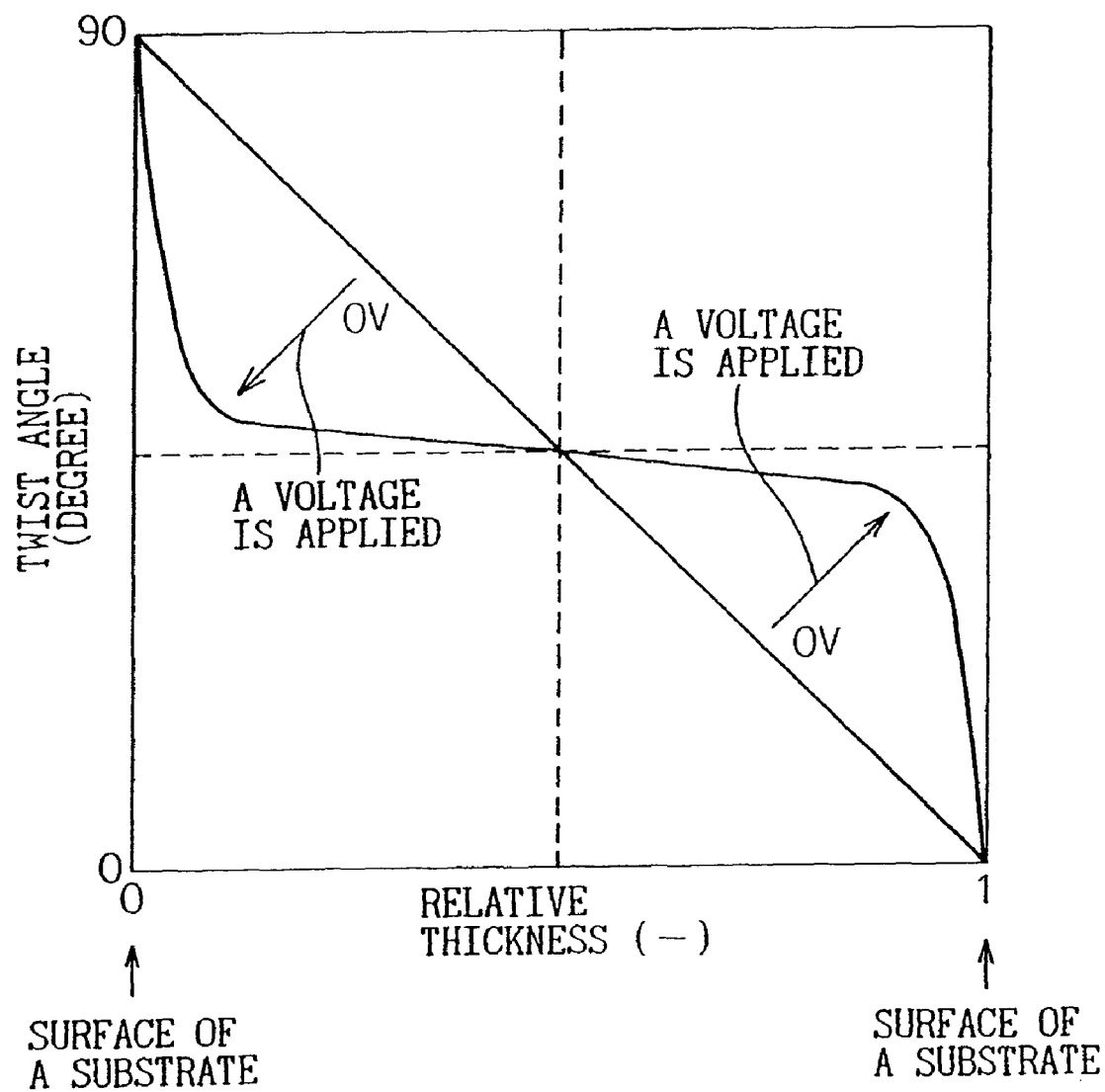

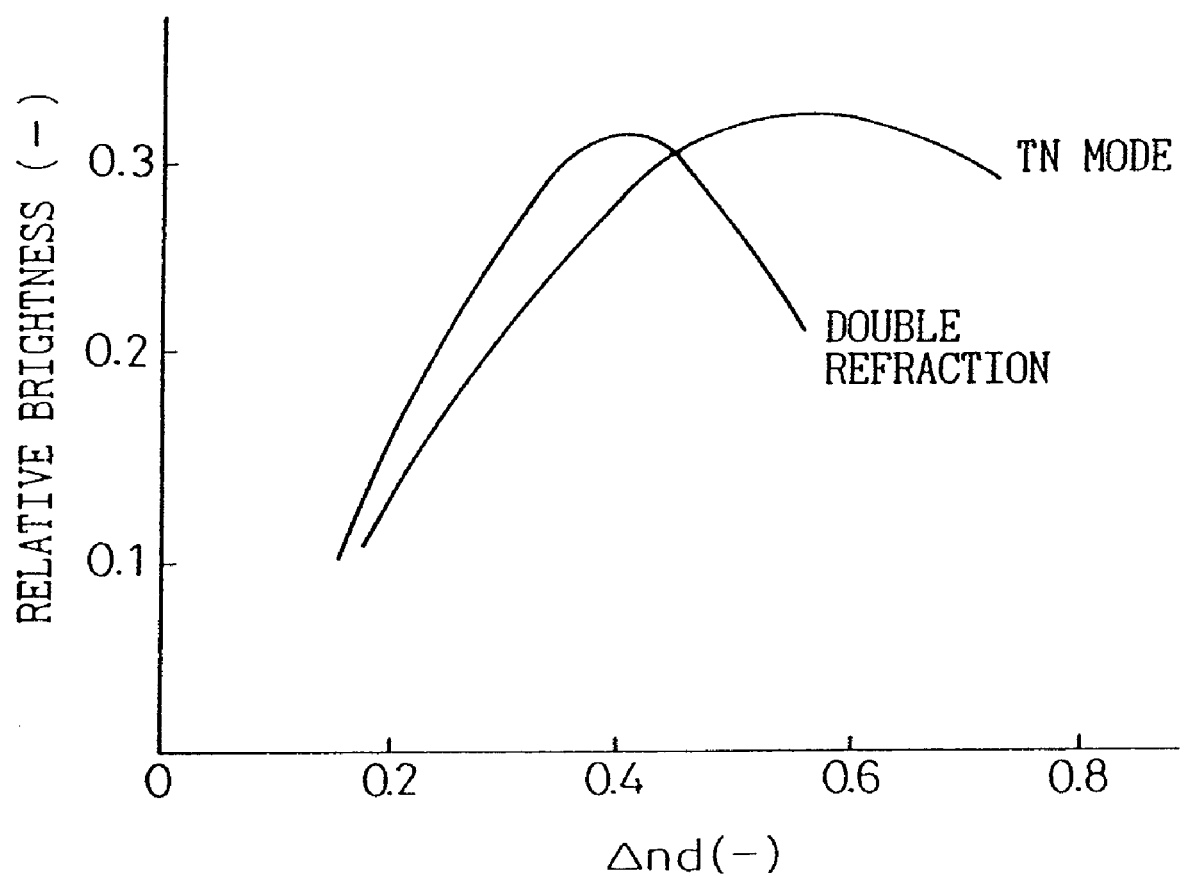

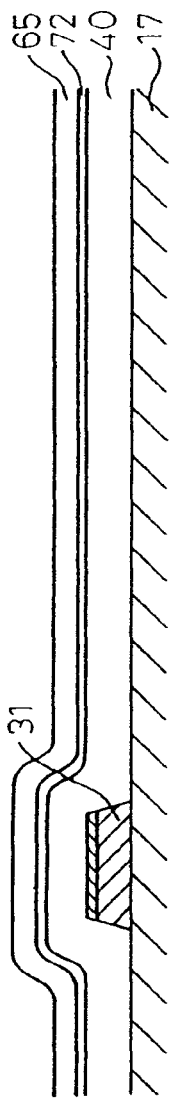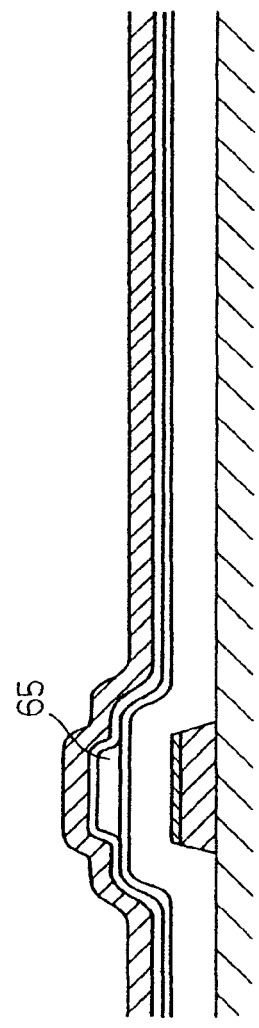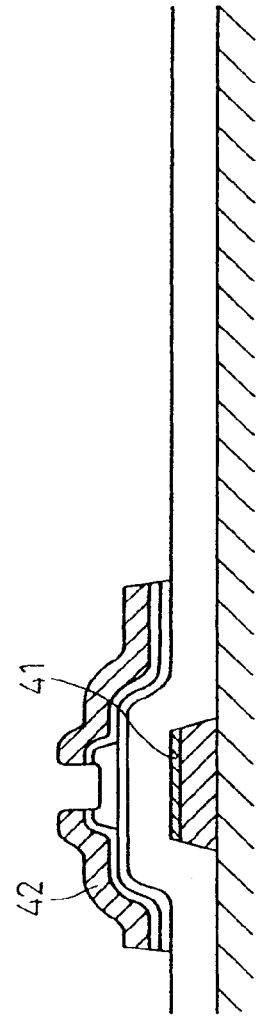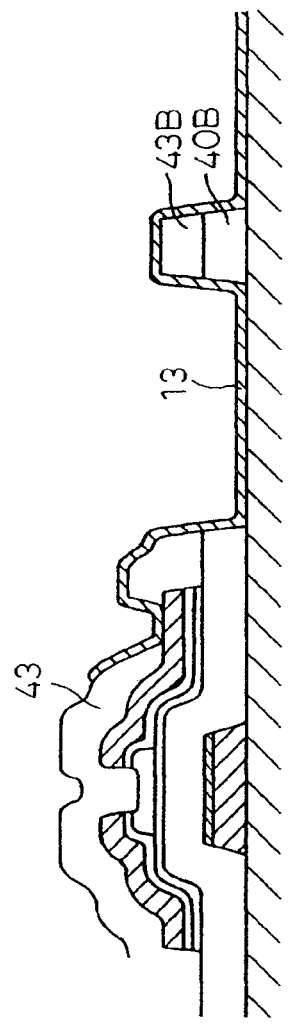

BEFORE BAKING

AFTER BAKING

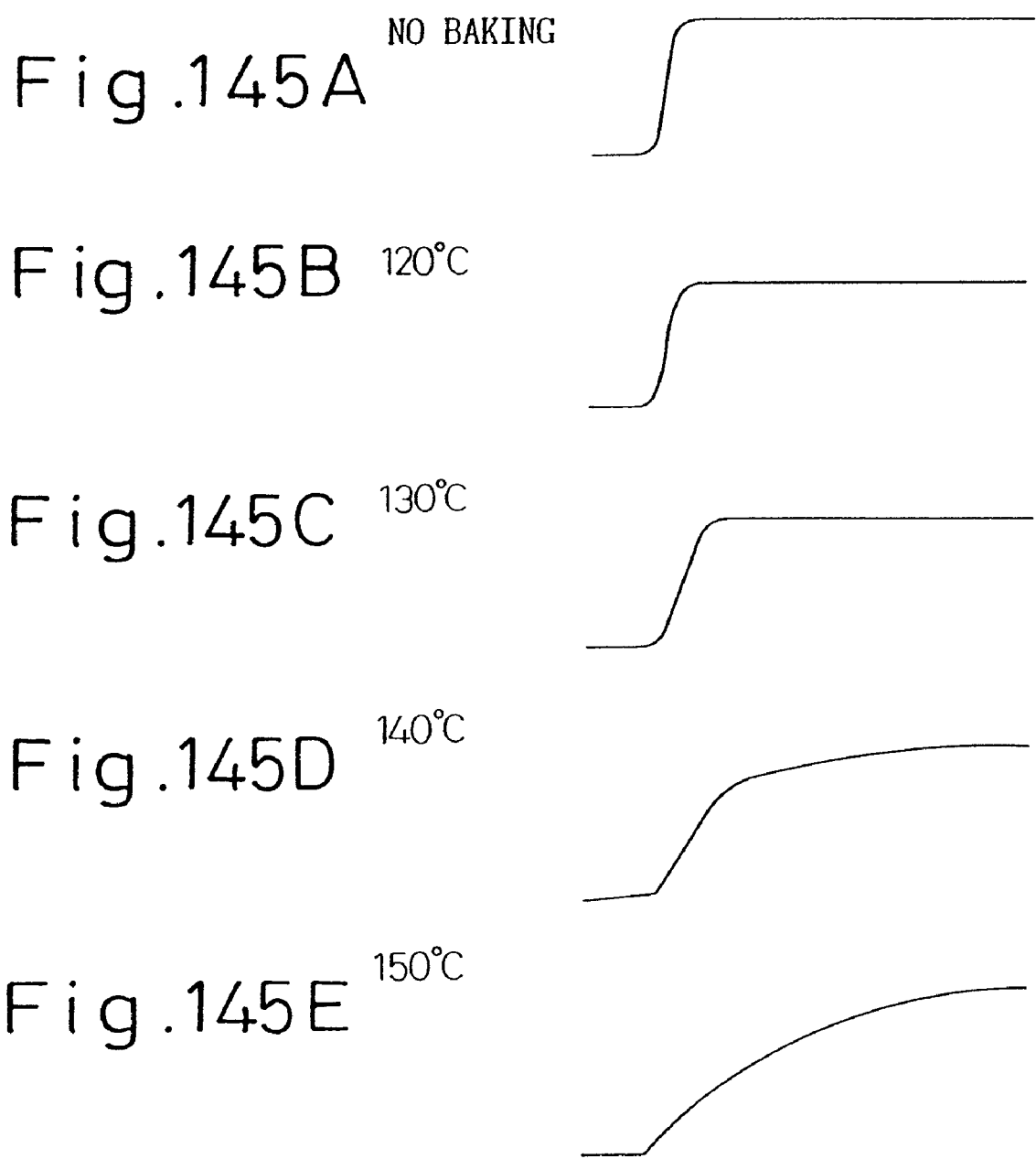

2μm WIDTH

5μm WIDTH

10μm WIDTH

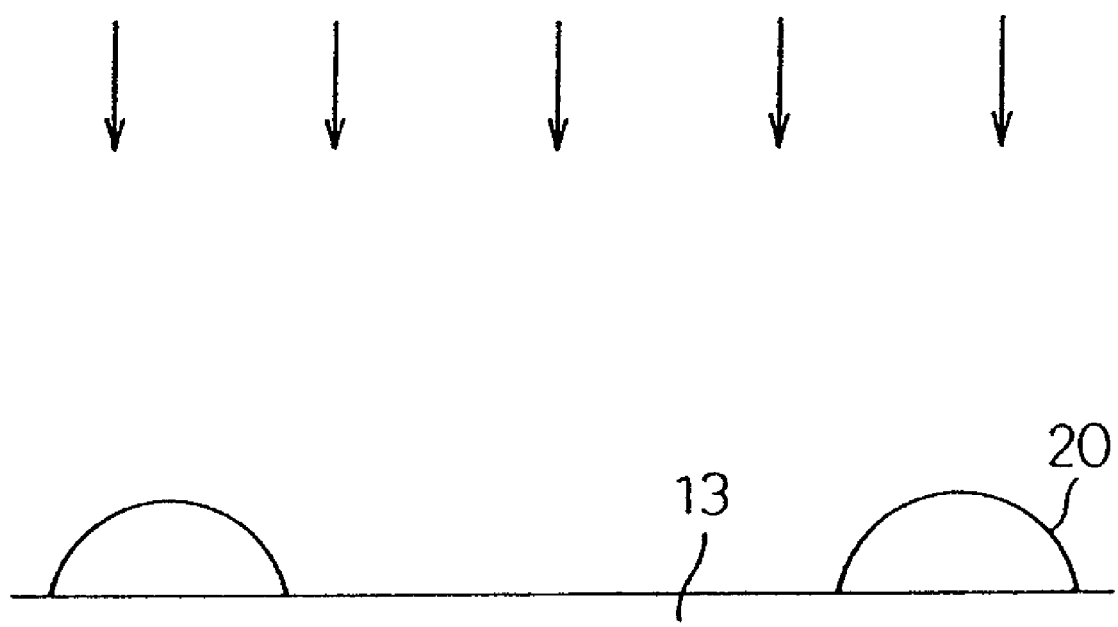

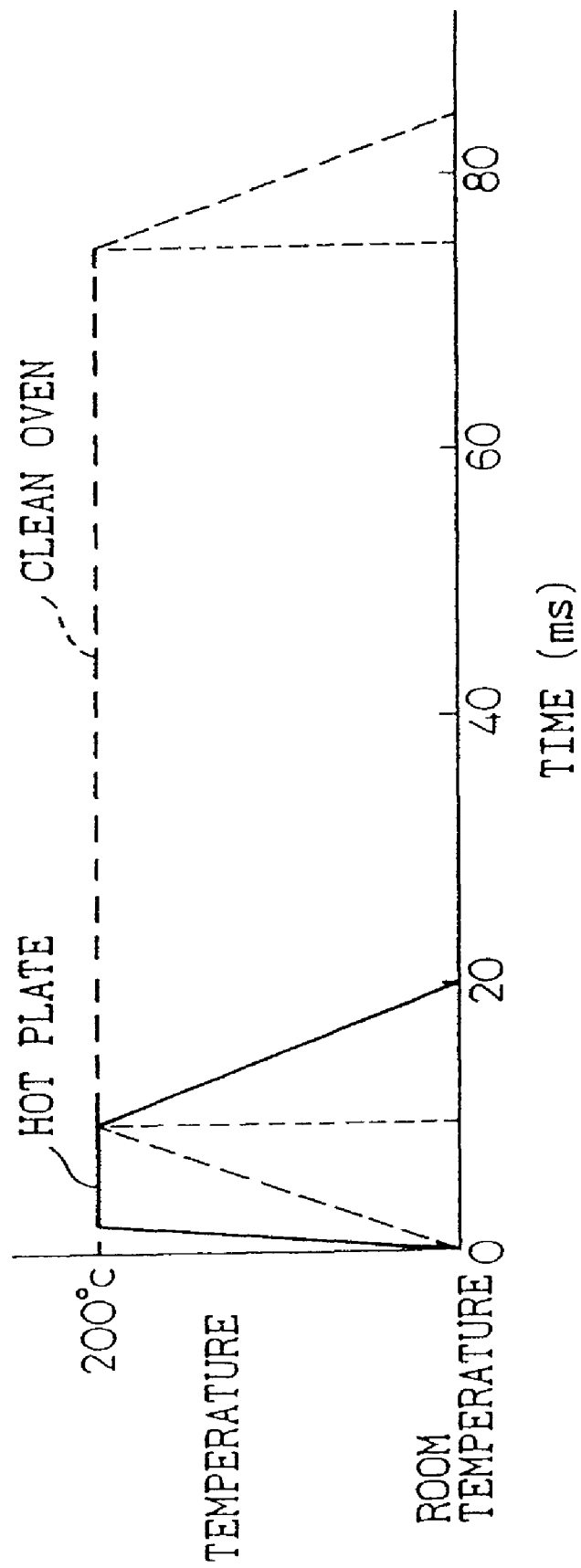

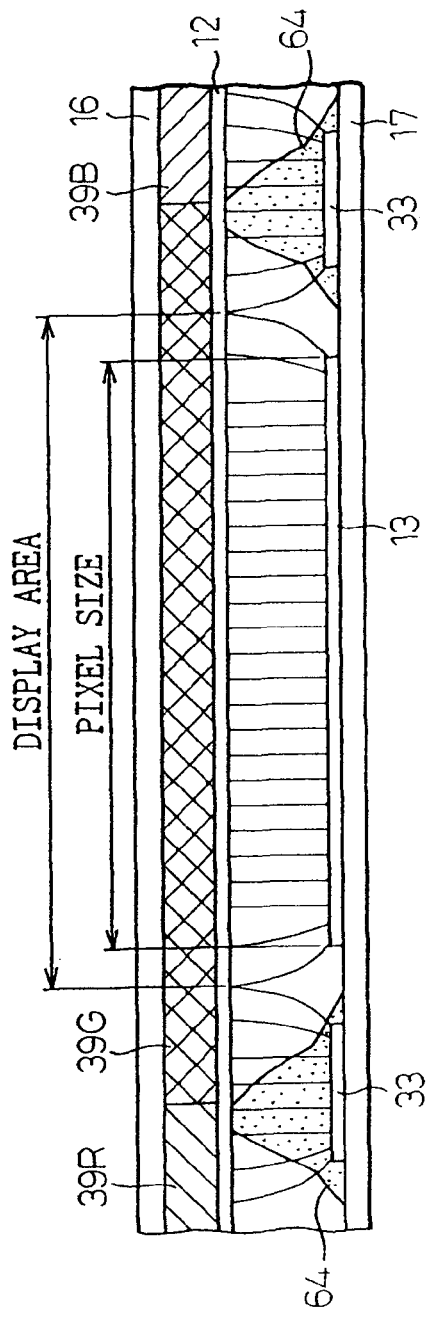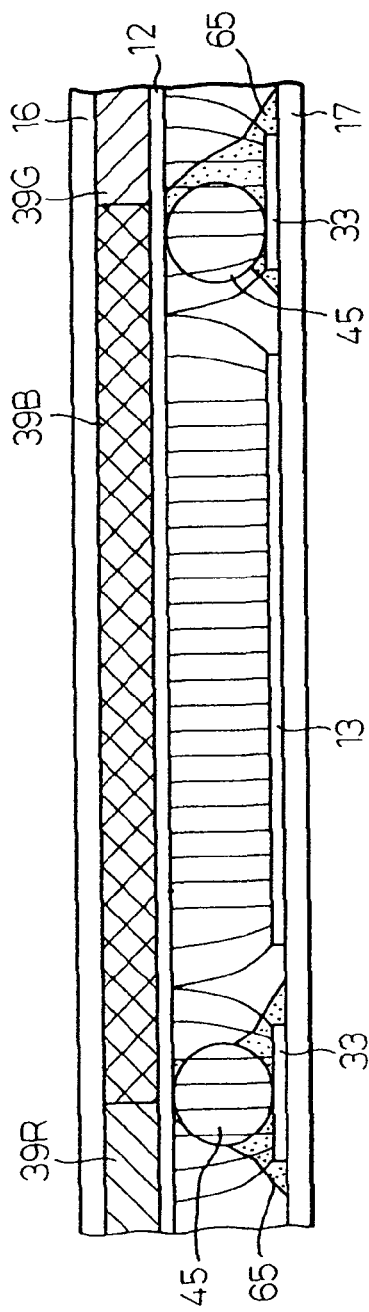

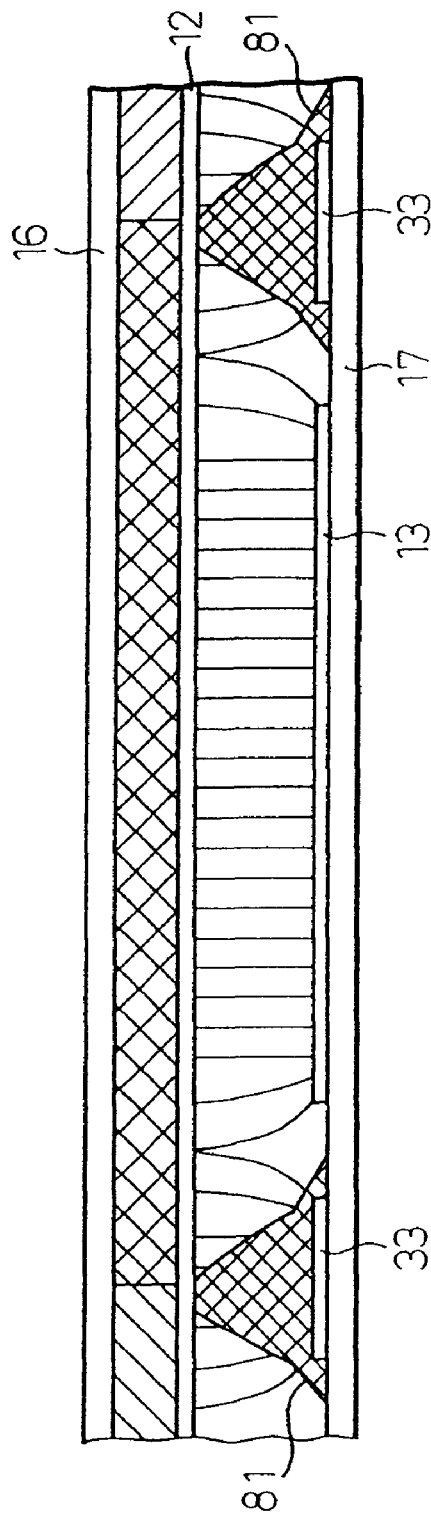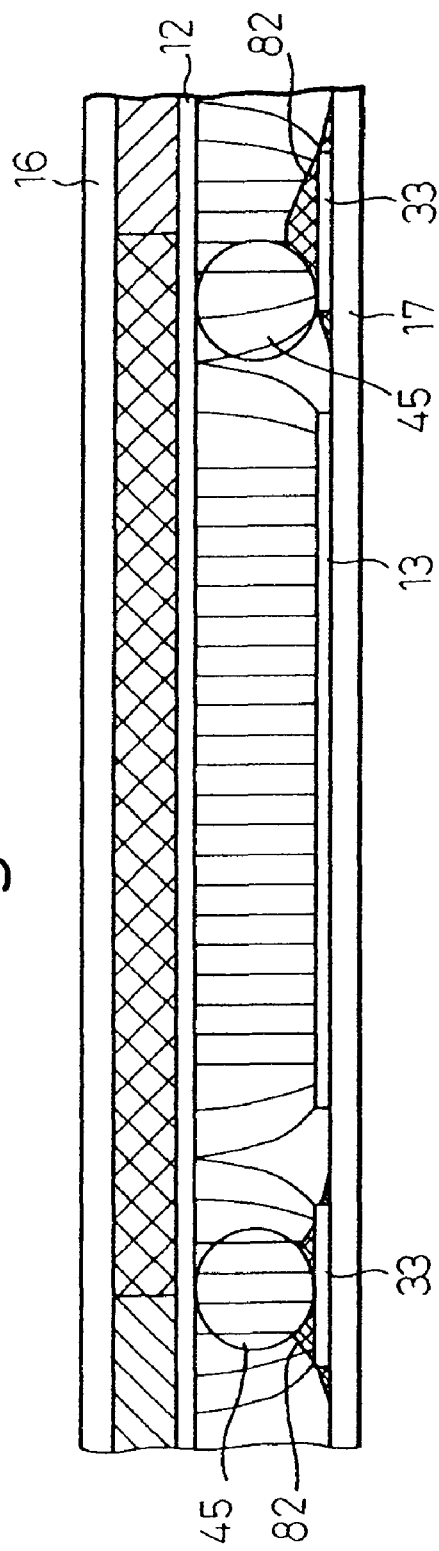

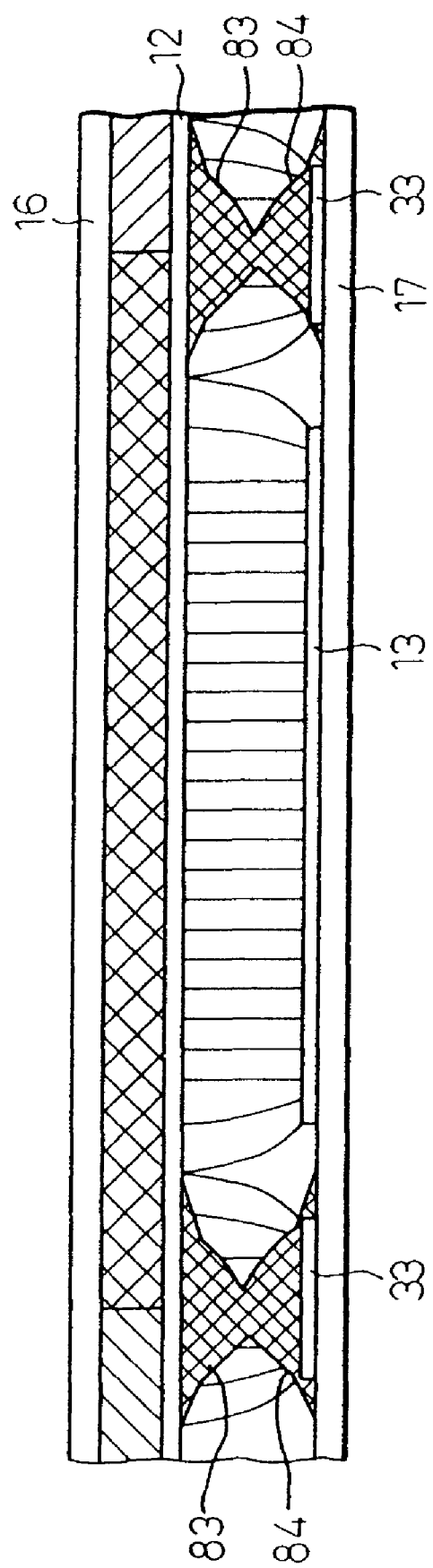

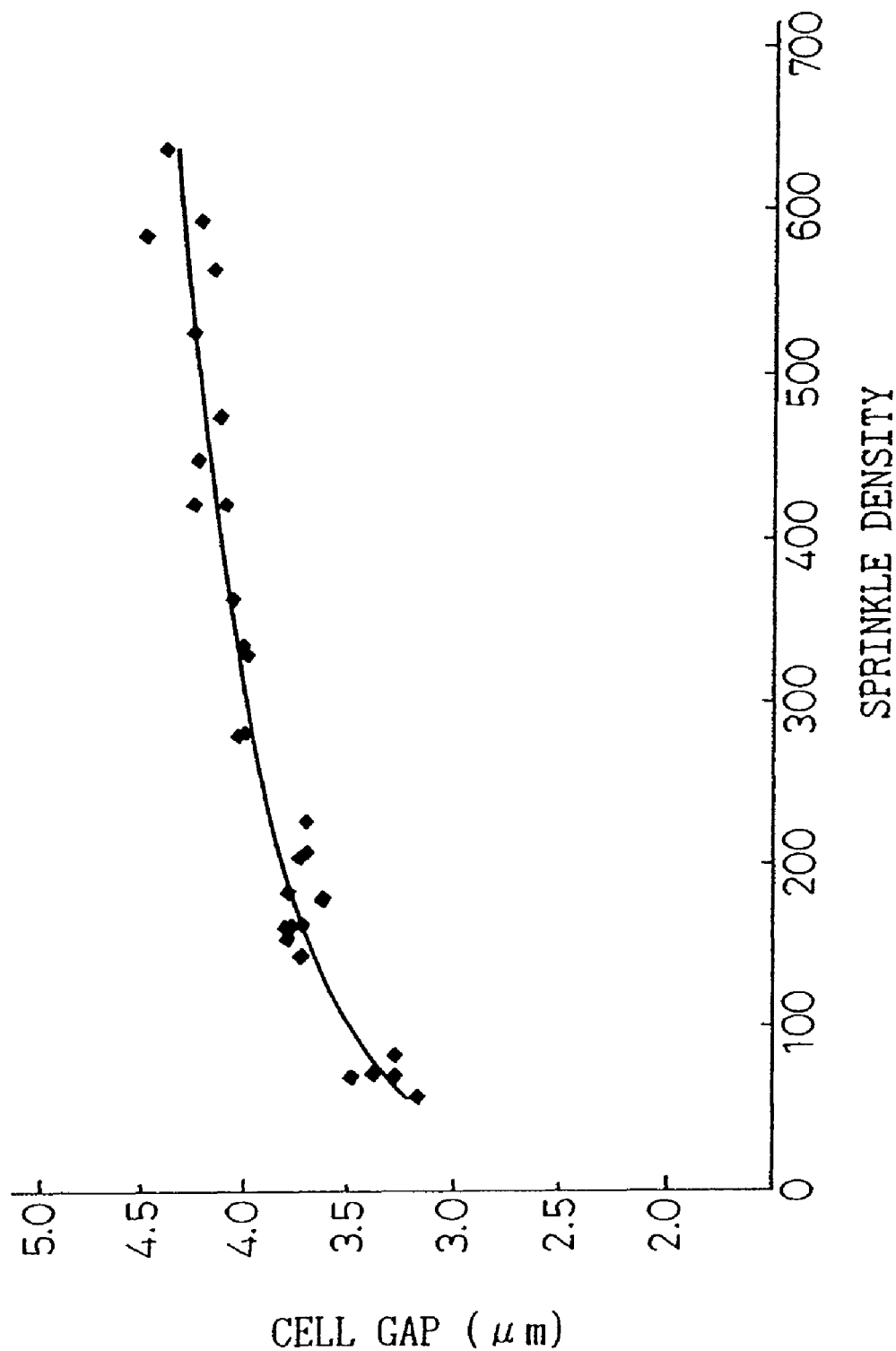

Fig. 170

| SPRINKLE DENSITY OF SPACERS (NUMBERS/mm²) | 50 | 100 | 150 | 200 | 250 | 300 | 350 | 400 | 450 | 500 | 550 |
|---|---|---|---|---|---|---|---|---|---|---|---|
| BLEMISH OCCURRENCE DUE TO PUSHING | YES | YES | NO | NO | NO | NO | NO | NO | NO | NO | NO |
| BLEMISH OCCURRENCE DUE TO PULLING | NO | NO | NO | NO | NO | NO | YES | YES | YES | YES | YES |

18-CROWN-6

DIBENZOYL-18-CROWN-6

CRYPTAND [2.2.2]

CRYPTAND [2.1.1]

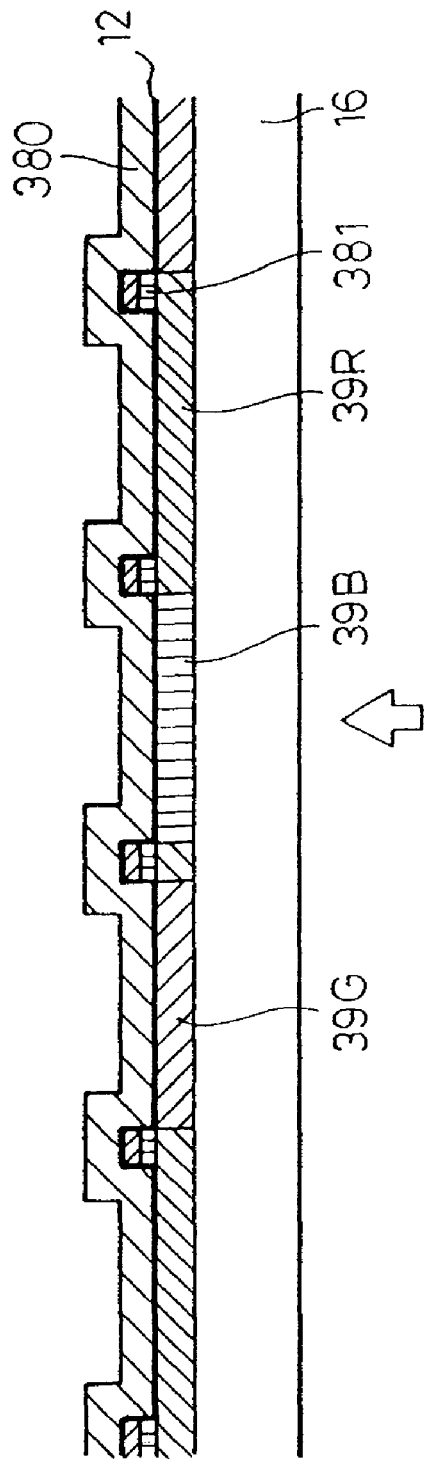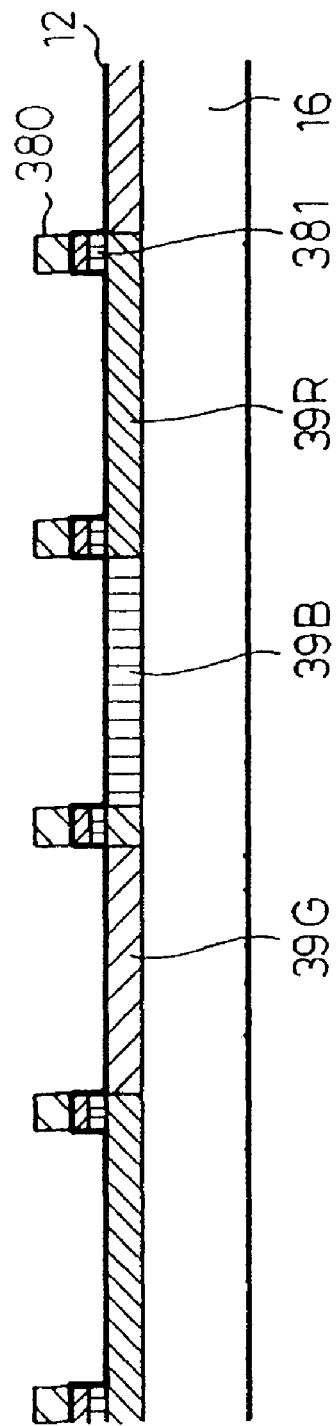

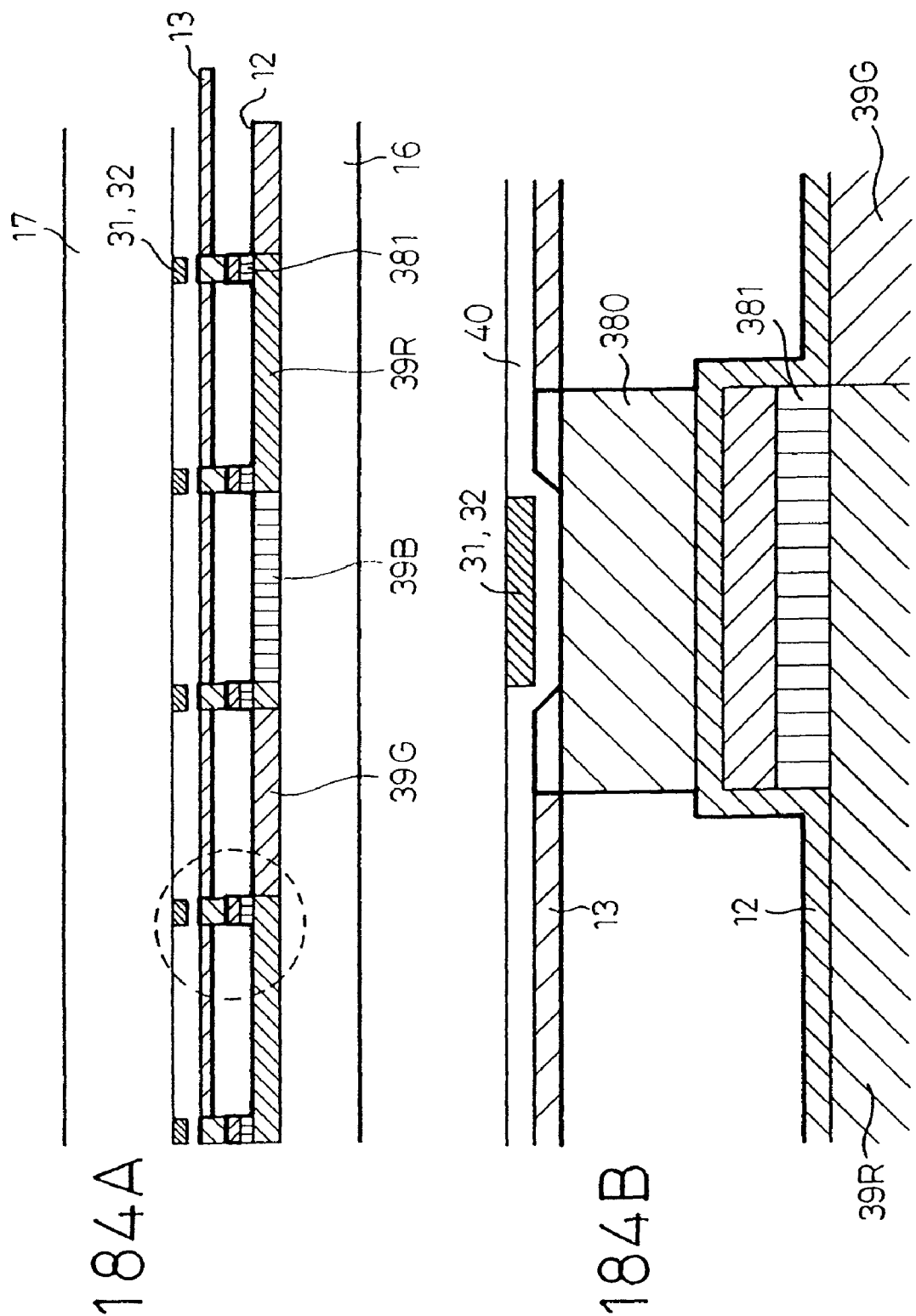

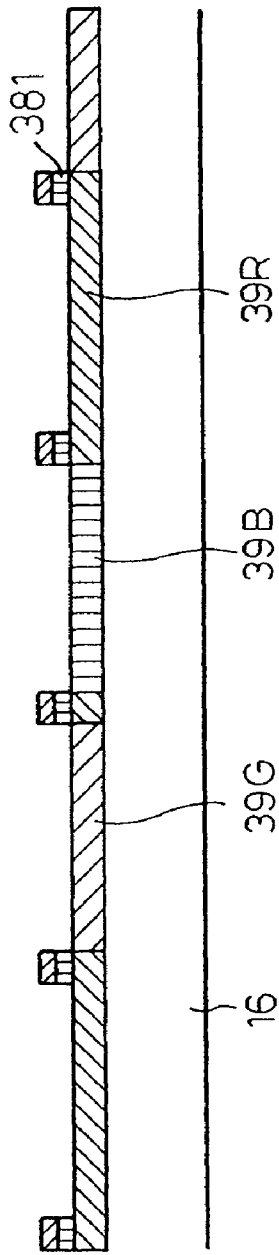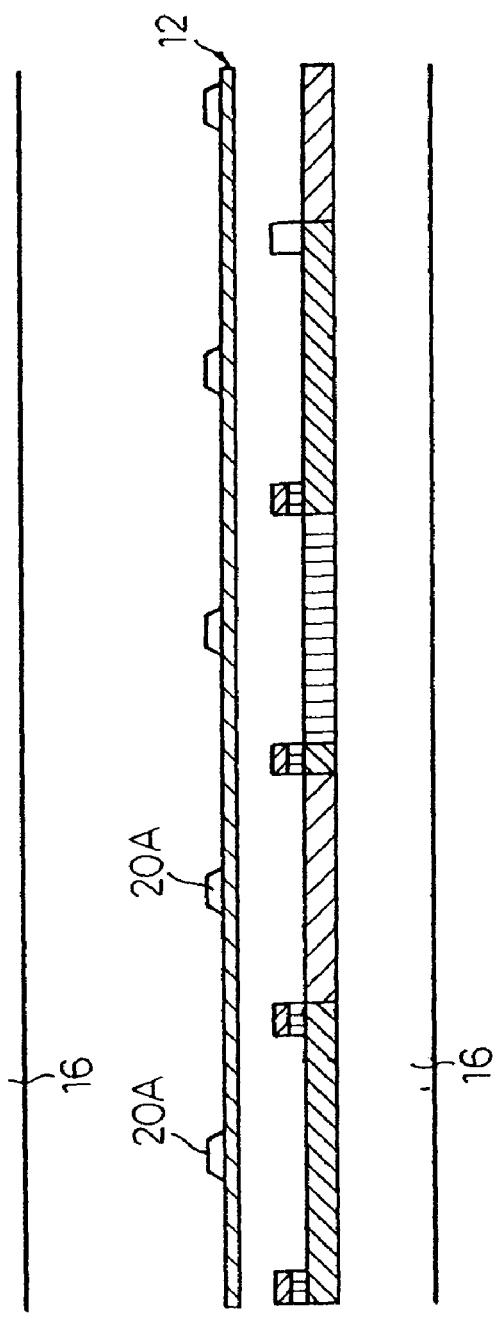

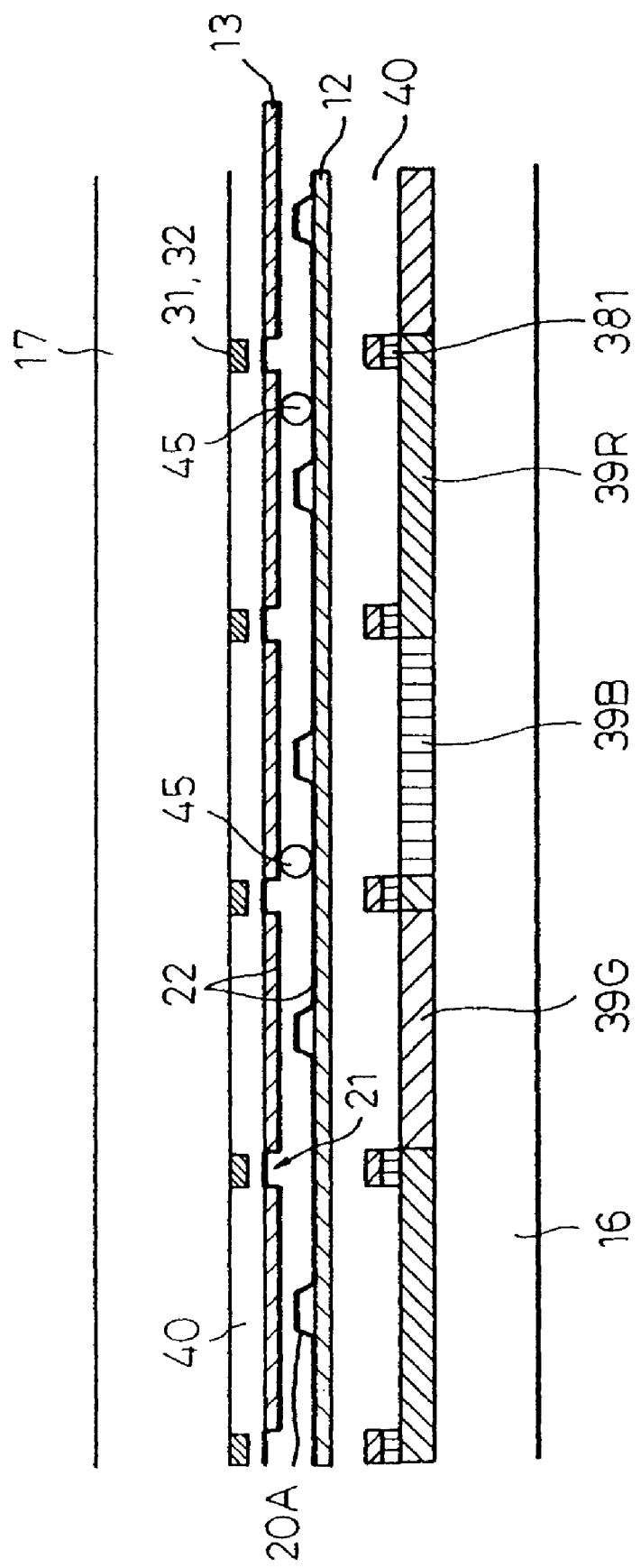

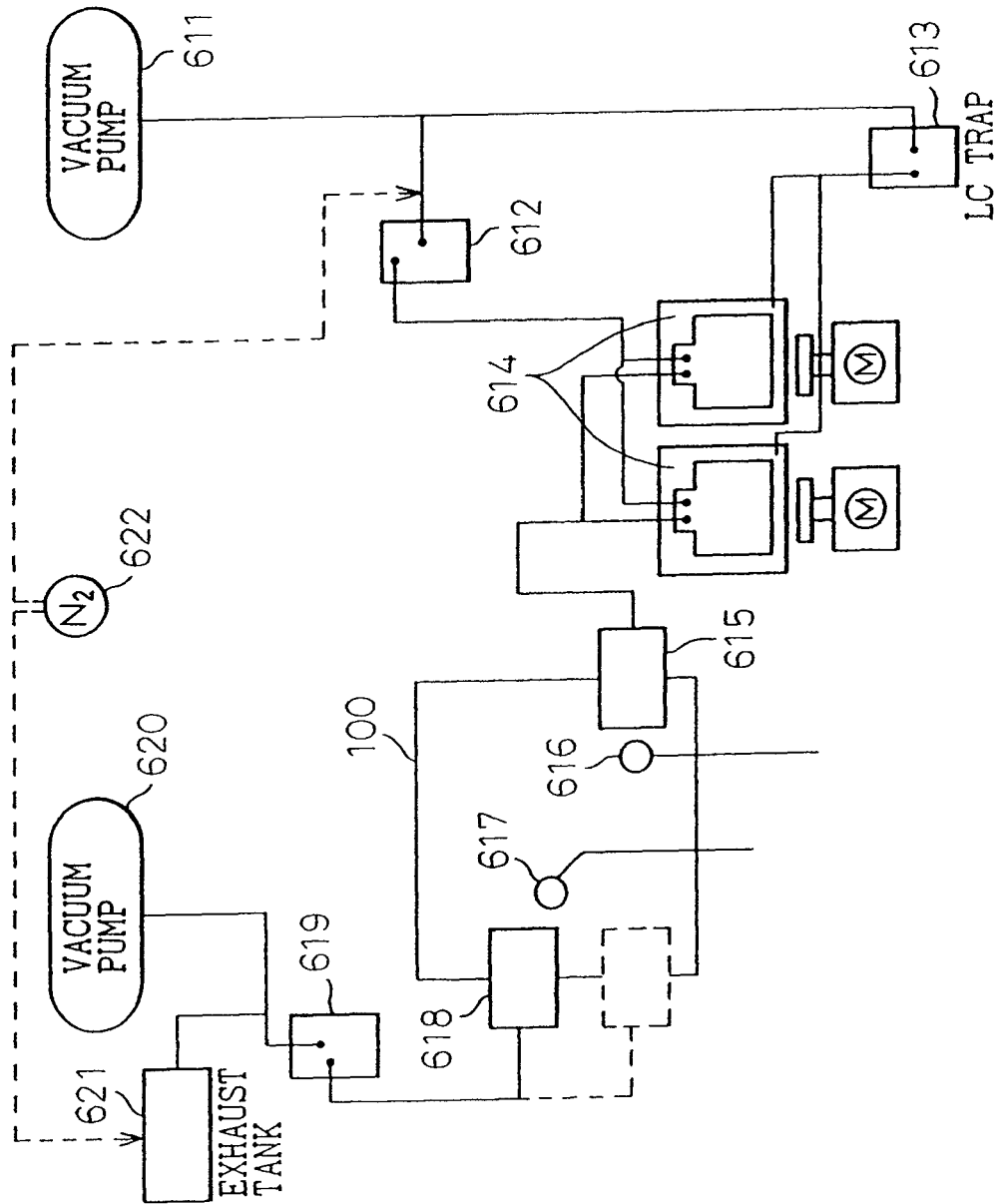

Fig. 209 DISCHARGE OF CHARGES (THEORETICAL VALUE)

Fig.210
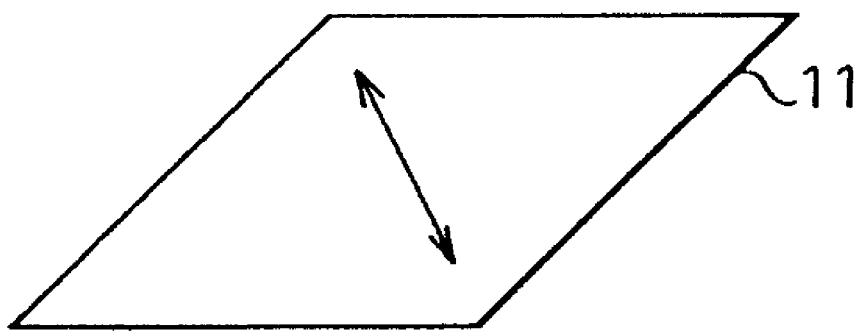
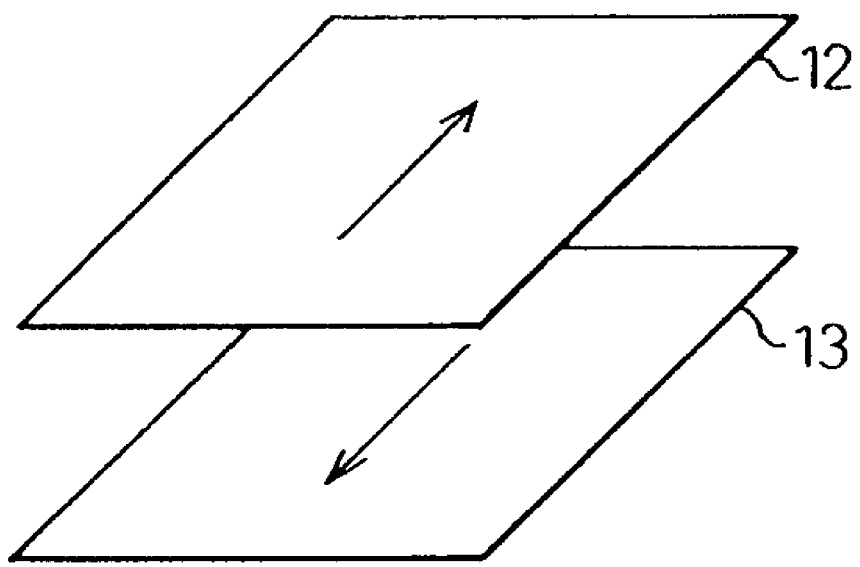
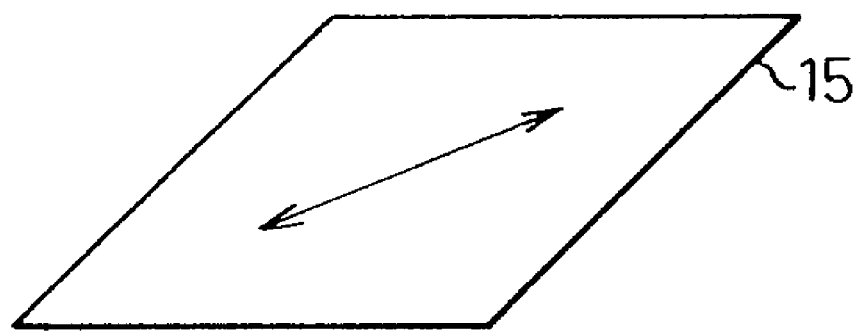

| | |
|---|---|
| GENERAL CONDITION | $n_x, n_y \geq n_z$ |
| POSITIVE UNIAXIAL FILM | $n_x > n_y = n_z$ |
| NEGATIVE UNIAXIAL FILM | $n_x = n_y > n_z$ |
| BIAXIAL FILM (A PHASE LAG AXIS IS X DIRECTION.) | $n_x > n_y > n_z$ |
| RETARDATION IN INPLANE DIRECTIONS | $R = (n_x - n_y)d$ |
| RETARDATION OF THICKNESS DIRECTION | $R = \left(\dfrac{n_x + n_y}{2} - n_z\right)d$ |

Fig.221
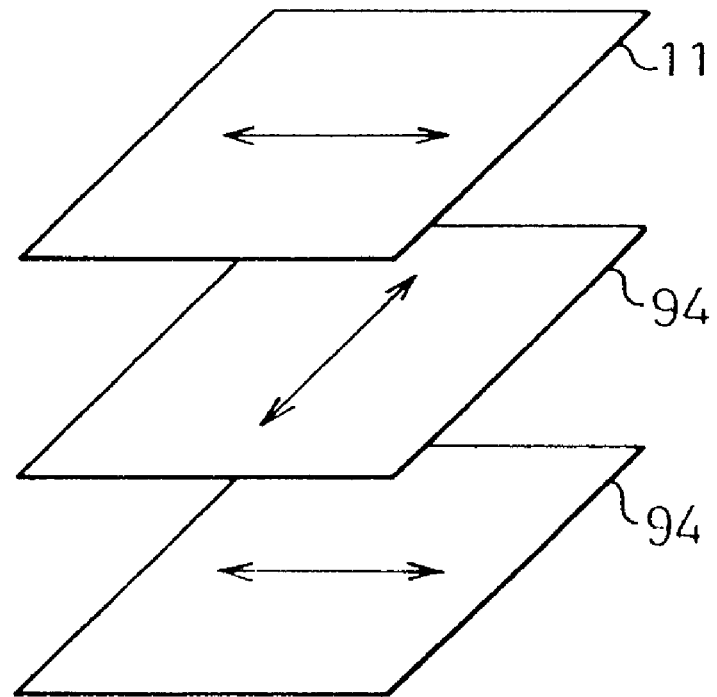
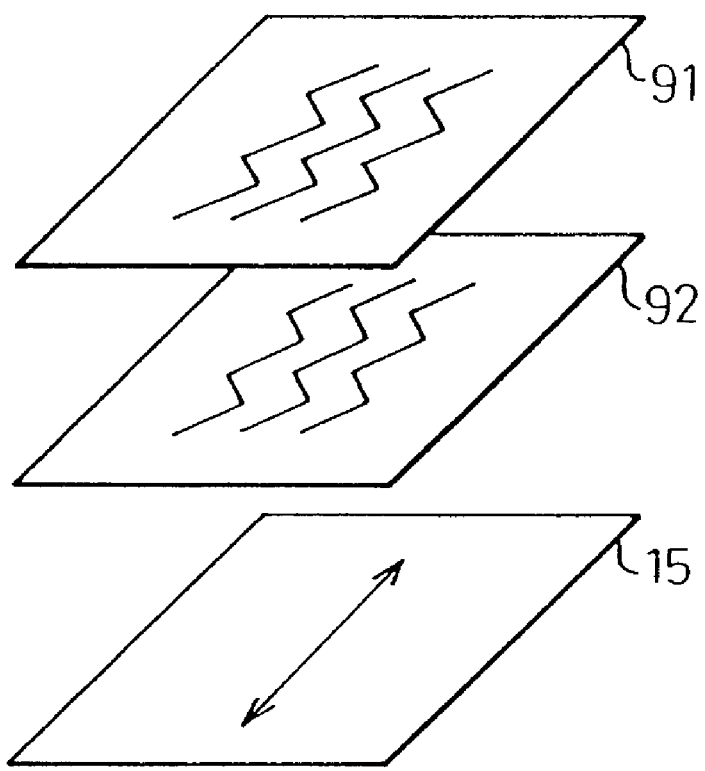

Fig. 240
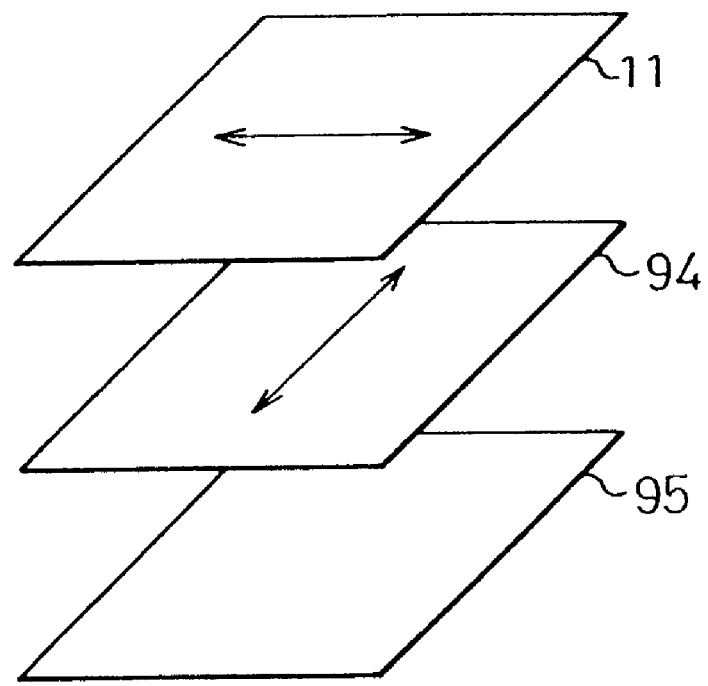
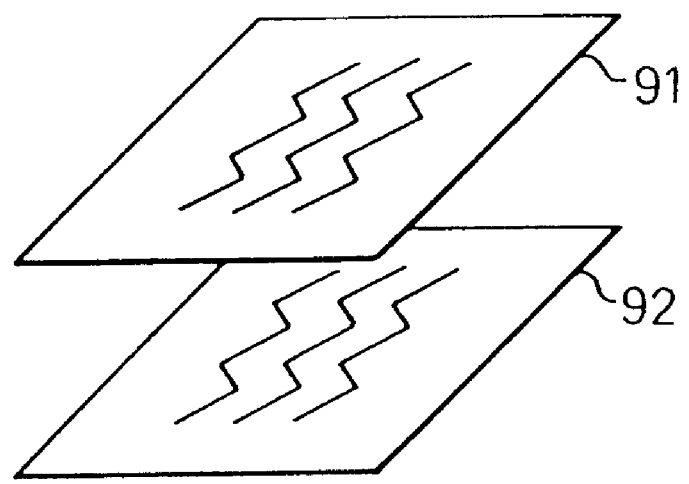
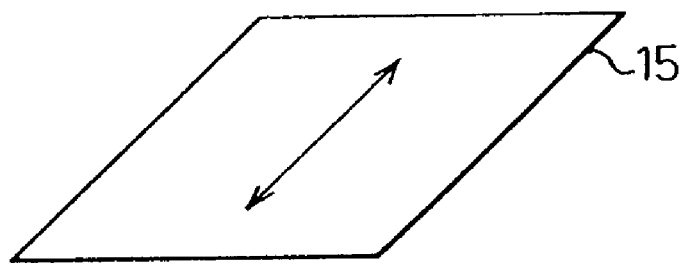

Fig. 249

| SAMPLE | THICKNESS OF A PANEL (μm) R G B | GAP BETWEEN PROJECTIONS (μm) R G B | PHASE DIFFERENCE FILM Rd VALUE (nm) | TRANS-MITTANCE % (5v) | VIEW ANGLE : CR >10 LEFT-RIGHT DIRECTION | COLOR DIFFERENCE (5v: LEFT -RIGHT) Δu(x) | Δv(Y) |
|---|---|---|---|---|---|---|---|
| EMBODIMENT A | 5.7, 4.6, 3.6 | 20, 25, 30 | 320 | 5.60 | ±80° | 0.03 | 0.03 |
| EMBODIMENT B | 5.7, 4.6, 3.6 | 20, 25, 30 | 320 | 5.60 | ±80° | 0.03 | 0.05 |
| PRIOR ART 1 | R,G,B=3.6 | R,G,B=30 | 240 | 4.50 | ±80° | 0.06 | 0.05 |
| PRIOR ART 2 | R,G,B=4.6 | R,G,B=30 | 320 | 5.80 | ±80° | 0.14 | 0.12 |

Fig.250

| EXAMPLES | INITIAL VALUES | AFTER 200 HOURS |
|---|---|---|
| EMBODIMENT C | 25 | 42 |
| EMBODIMENT D | 33 | 51 |
| EMBODIMENT E | 26 | 45 |
| EMBODIMENT F | 30 | 48 |
| REFERENCE | 32 | 70 |

Fig.253
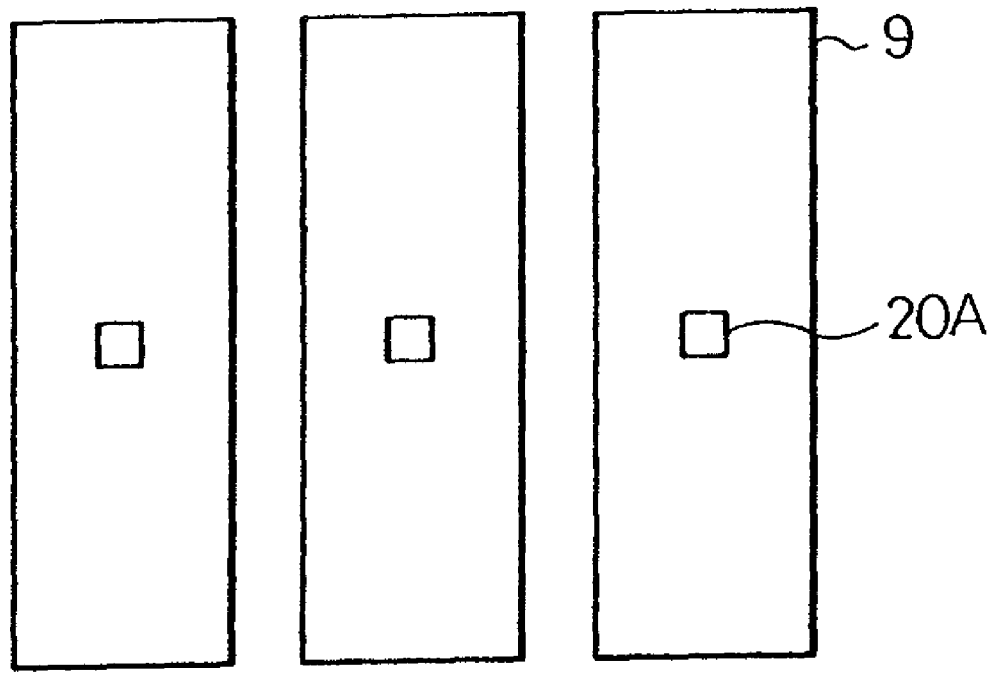
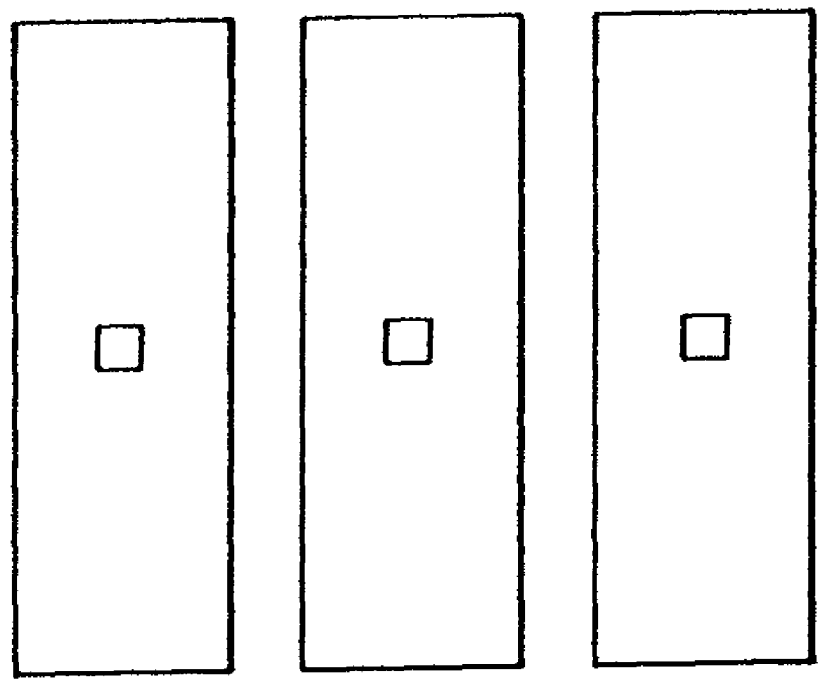

LIQUID CRYSTAL DISPLAY DEVICE WITH MULTIPLE ALIGNMENT STRUCTURES

This is a Continuation of U.S. patent application Ser. No. 11/600,859, filed Nov. 16, 2006, which is a Continuation of U.S. patent application Ser. No. 09/689,928, filed on Oct. 12, 2000, which is now U.S. Pat. No. 7,224,421, which was issued on May 29, 2007, which is a Divisional of U.S. patent application Ser. No. 09/097,027, filed on Jun. 12, 1998, which is now U.S. Pat. No. 6,724,452, which was issued on Apr. 20, 2004.

BACKGROUND OF THE INVENTION

The present invention relates to a liquid crystal display (LCD), or more particularly, to a technology for realizing orientation division for a vertically-aligned (VA) LCD.

Among flat-panel displays enjoying image quality equivalent of the one offered by the CRT, it is a liquid crystal display (LCD) that has been most widely adopted nowadays. In particular, a thin-film transistor (TFT) type LCD (TFT LCD) has been adapted to public welfare-related equipment such as a personal computer, word processor, and OA equipment, and home electric appliances including a portable television set, and expected to further expand its market. Accordingly, there is a demand for further improvement of image quality. A description will be made by taking the TFT LCD for instance. However, the present invention is not limited to the TFT LCD but can apply to a simple matrix LCD, a plasma addressing type LCD and so forth. Generally, the present invention is applicable to LCDs which include liquid crystal sandwiched between a pair of substrates on which electrodes are respectively formed and carry out displays by applying voltage between the electrodes.

Currently, a mode most widely adopted for the TFT LCD is a normally-white mode that is implemented in a twisted nematic (TN) LCD. The technology of manufacturing the TN TFT LCD has outstandingly advanced in recent years. Contrast and color reproducibility provided by the TN TFT LCD have surpassed those offered by the CRT. However, the TN LCD has a critical drawback of a narrow viewing angle range. This poses a problem that the application of the TN LCD is limited.

In an effort to solve these problems, Japanese Examined Patent Publication Nos. 53-48452 and 1-120528 have proposed an LCD adopting a mode referred to as an IPS mode.

However, the IPS mode suffers from slow switching. At present, when a motion picture representing a fast motion is displayed, drawbacks including a drawback that an image streams take place. In an actual panel, therefore, for improving the response speed, the alignment film is not rubbed parallel to the electrodes but rubbed in a direction shifted by about 15°. However, even when the direction of rubbing is thus shifted, since the response time permitted by the IPS mode is twice longer than the one permitted by the TN mode, the response speed is very low. Moreover, when rubbing is carried out in the direction shifted by about 15°, a viewing angle characteristic of a panel does not become uniform between the right and left sides of the panel. Gray-scale reversal occurs relative to a specified viewing angle.

As mentioned above, the IPS mode that has been proposed as an alternative for solving the problem on the viewing angle characteristic of the TN mode has the problem that the characteristics offered by the IPS mode other than the viewing angle characteristic are insufficient. A vertically-aligned (VA) mode using a vertical alignment film has been proposed. The VA mode does not use a rotary polarization effect which is used in the TN mode, but uses a birefringent (double refraction) effect. The VA mode is a mode using a negative liquid crystal material and vertical alignment film. When no voltage is applied, liquid crystalline molecules are aligned in a vertical direction and black display appears. When a predetermined voltage is applied, the liquid crystalline molecules are aligned in a horizontal direction and white display appears. A contrast in display offered by the VA mode is higher than that offered by the TN mode. A response speed is also higher, and an excellent viewing angle characteristic is provided for white display and black display. The VA mode is therefore attracting attention as a novel mode for a liquid crystal display.

However, the VA mode has the same problem as the TN mode concerning halftone display, that is, a problem that the light intensity of display varies depending on the viewing angle. The VA mode provides a much higher contrast than the TN mode and is superior to the TN mode in terms of a viewing angle characteristic concerning a viewing angle or a viewing angle characteristic, because even when no voltage is applied, liquid crystalline molecules near an alignment film are aligned nearly vertically. However, the VA mode is inferior to the IPS mode in terms of the viewing angle characteristic.

It is known that viewing angle performance of a liquid crystal display device (LCD) in the TN mode can be improved by setting the orientation directions of the liquid crystalline molecules inside pixels to a plurality of mutually different directions. Generally, the orientation direction of the liquid crystalline molecules (pre-tilt angles) which keep contact with a substrate surface in the TN mode are restricted by the direction of a rubbing treatment applied to the alignment film. The rubbing treatment is a processing which rubs the surface of the alignment film in one direction by a cloth such as rayon, and the liquid crystalline molecules are orientated in the rubbing direction. Therefore, viewing angle performance can be improved by making the rubbing direction different inside the pixels.

Though the rubbing treatment has gained a wide application, it is the treatment that rubs and consequently, damages, the surface of the alignment film and involves the problem that dust is likely to occur.

A method which forms a concavo-convex pattern on an electrode is known as another method of restricting the pre-tilt angle of the liquid crystalline molecules in the TN mode. The liquid crystalline molecules in the proximity of the electrodes are orientated along the surface having the concavo-convex pattern.

It is known that viewing angle performance of a liquid crystal display device in the VA mode can be improved by setting the orientation directions of the liquid crystalline molecules inside pixels to a plurality of mutually different directions. Japanese Unexamined Patent Publication (Kokai) No. 6-301036 discloses a LCD in which apertures are provided on a counter electrode. Each aperture faces a center of a pixel electrode and oblique electric fields are generated at a center of each pixel. The orientation directions of the liquid crystalline molecules inside each pixel are divided into two or four directions due to the oblique electric fields. However, the LCD disclosed in Japanese Unexamined Patent Publication (Kokai) No. 6-301036 has a problem that its response (switching) speed is not enough, particularly, a response speed for transition from a state in which no voltage is applied to a state in which a voltage is applied is slow. A cause of his problem is presumed that no oblique electric field exists when no voltage is applied between the electrodes. Further, because a length of each area having continuously oriented liquid crystalline molecules in each pixel is a half of a pixel size, a time for all liquid crystalline molecules in each area to be oriented in one direction becomes long.

Further, Japanese Unexamined Patent Publication (Kokai) No. 7-199193 discloses a VA LCD in which slopes having different directions are provided on electrodes and the orientation directions of the liquid crystalline molecules inside each pixel are divided. However, according to the disclosed constitutions, the vertical alignment film formed on the slopes are rubbed, therefore, the VA LCD disclosed in Japanese Unexamined Patent Publication (Kokai) No-7-199193 also has the above-mentioned problem that dust is likely to occur. Further, according to the disclosed constitutions, the size of the slopes is a half of the pixel, therefore, all liquid crystalline molecules faces the slopes are inclined, a good black display cannot be obtained. This causes a reduction of contrast. Further, inclination angles of the slopes are small because two or four slopes are provided across each pixel. It is found that the gentle slopes cannot fully define the orientation directions of the liquid crystalline molecules. In order to realize steep slopes, it is necessary to increase a thickness of a structure having slopes. However, when the thickness of the structure becomes large, charges accumulated on the structure becomes large. This causes a phenomenon that the liquid crystalline molecules do not change their orientations when a voltage is applied due to the accumulated charges. This phenomenon is so-called a burn.

SUMMARY OF THE INVENTION

As described above, there are some problems to realize a division of orientation directions of the liquid crystalline molecules for improving the viewing angle performance in the VA LCD.

An object of the present invention is to improve a viewing angle characteristic of a VA liquid crystal display, and to realize a VA liquid crystal display exhibiting a viewing angle characteristic that is as good as the one exhibited by the IPS mode or better than it while permitting the same contrast and operation speed as the conventional liquid crystal displays.

According to the present invention, in the VA mode employing a conventional vertical alignment film and adopting a negative liquid crystal as a liquid crystal material, a domain regulating means is included for regulating the orientation of a liquid crystal in which liquid crystalline molecules are aligned obliquely when a voltage is applied so that the orientation will include a plurality of directions within each pixel. The domain regulating means is provided on at least one of the substrates. Further, at least one of domain regulating means has inclined surfaces (slopes). The inclined surfaces include surfaces which are almost vertical to the substrates. Rubbing need not be performed on the vertical alignment film.

In the VA LCD device, when no voltage is applied, in almost all regions of the liquid crystal other than the protrusions, liquid crystalline molecules are aligned nearly vertically to the surfaces of the substrates. The liquid crystalline molecules near the inclined surfaces also orientates vertically to the inclined surfaces, therefore, the liquid crystalline molecules are inclined. When a voltage is applied, the liquid crystalline molecules tilt according to an electric field strength. Since the electric fields are vertical to the substrates, when a direction of tilt is not defined by carrying out rubbing, the azimuth in which the liquid crystalline molecules tilt due to the electric fields includes all directions of 360 degrees. If there are pre-tilted liquid crystalline molecules, surrounding liquid crystalline molecules are tilted in the directions of the pre-tilted liquid crystalline molecules. Even when rubbing is not carried out, the directions in which the liquid crystalline molecules lying in gaps between the protrusions can be restricted to the azimuths of the liquid crystalline molecules in contact with the surfaces of the protrusions. When a voltage is increased, the negative liquid crystalline molecules are tilted in directions vertical to the electric fields.

As mentioned above, the inclined surfaces fill the role of a trigger for determining azimuths in which the liquid crystalline molecules are aligned with application of a voltage. The inclined surfaces need not have large area. With small inclined surfaces, when no voltage is applied, the liquid crystalline molecules in almost all the regions of the liquid-crystal layer except the inclined surfaces are aligned vertically to the surfaces of the substrates. This results in nearly perfect black display. Thus, a contrast can be raised.

BRIEF DESCRIPTION OF THE DRAWINGS

The present invention will be more clearly understood from the description as set below with reference to the accompanying drawings, wherein:

FIGS. 1A and 1B are diagrams for explaining a panel structure and an operational principle of a TN LCD;

FIGS. 2A to 2C are diagrams for explaining a change of viewing according to a change of viewing angle in the TN LCD;

FIGS. 7A to 7C are diagrams for explaining a VA LCD and problems thereof;

FIGS. 9A to 9C are diagrams for explaining principles of the present invention;

FIGS. 49A and 49B are diagrams showing a modification of pattern of pixel electrodes of the sixth embodiment;

FIGS. 50A and 50B are diagrams showing a pattern of pixel electrodes and a structure of a panel of the seventh embodiment;

FIG. 110 is a diagram showing a structure of a panel of a 26th embodiment;

FIG. 119 is a diagram showing shapes of protrusions of a 30th embodiment;

FIG. 120 is a diagram showing a change of transmittance according to a change of height of protrusions;

FIG. 121 is a diagram showing a change of a contrast ratio according to a change of height of protrusions;

FIG. 122 is a diagram showing a change of transmittance in white level according to a change of height of protrusions;

FIG. 123 is a diagram showing a change of transmittance in black level according to a change of height of protrusions;

FIGS. 124A and 124B are diagrams showing pixel structures of an modification of the 30th embodiment;

FIGS. 125A and 125B are diagrams showing shapes of protrusions of a 31st embodiment;

FIG. 126 is a diagram showing a relationship between a twisted angle and a thickness of liquid crystal layer in a panel of the VA LCD;

FIG. 127 is a diagram showing a relationship between a relative luminance of white level and a retardation of liquid crystal in the panels of the VA LCD and TN LCD;

FIG. 128 is a diagram showing relationships between transmittances and a retardation of liquid crystal at respective wavelengths in the panel of the VA LCD;

FIG. 129 is a diagram showing relationships between response times and a gap between protrusions at respective wavelengths in the panel of the VA LCD;

FIG. 130 is a diagram showing relationships between an aperture ratio and a gap between protrusions at respective wavelengths in the panel of the VA LCD;

Figure 131:
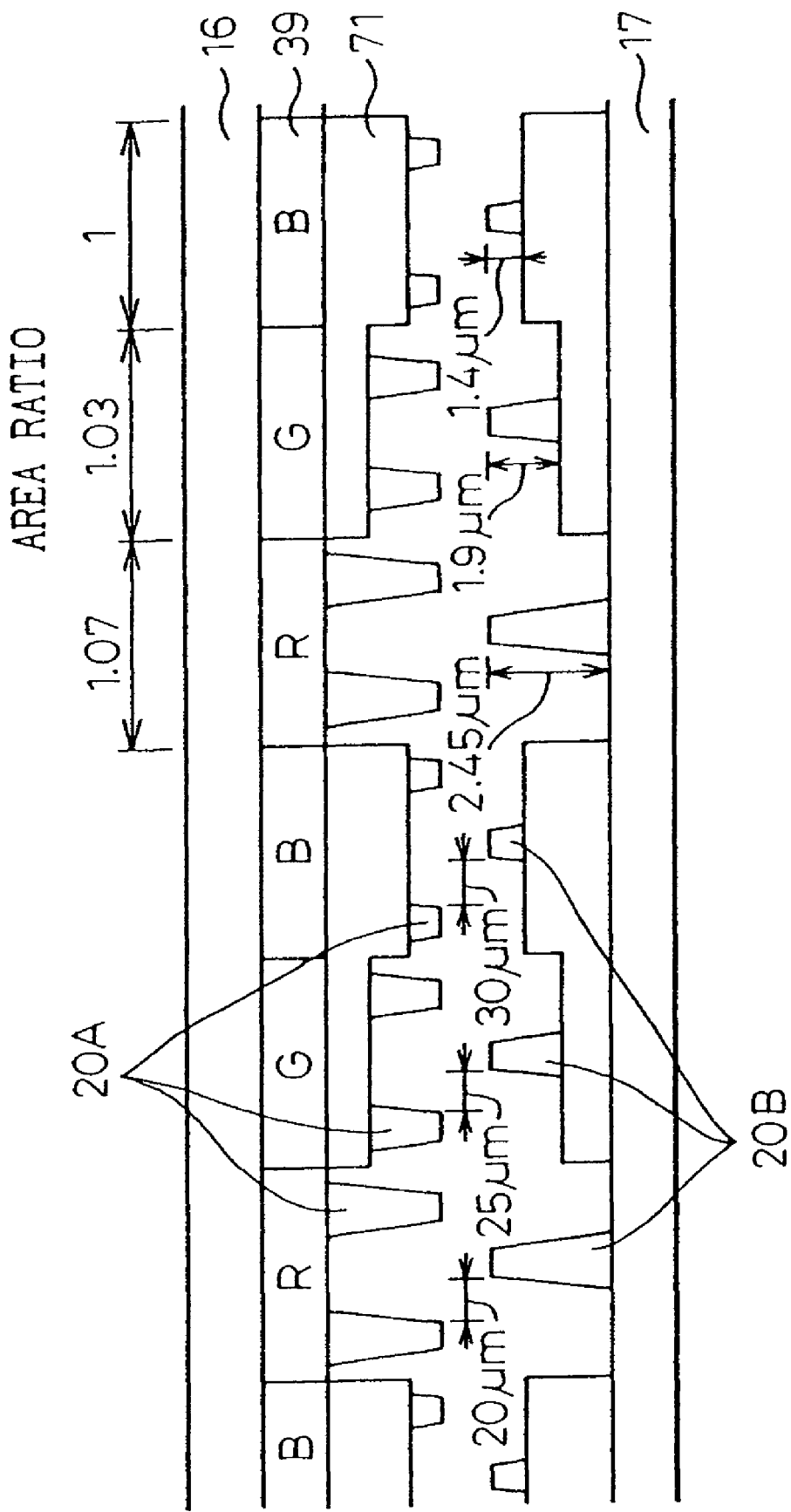
Figure 132:
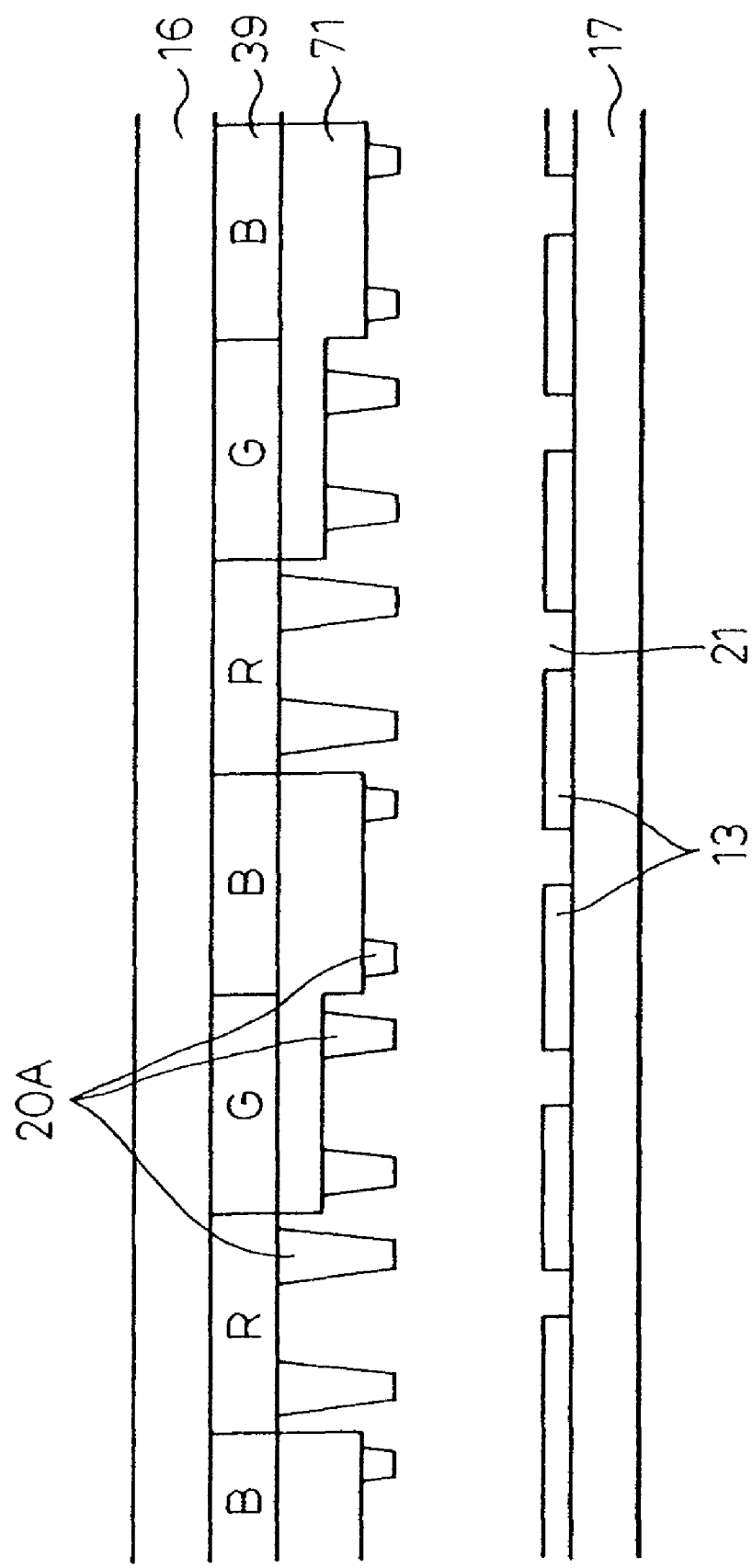
Figure 133:
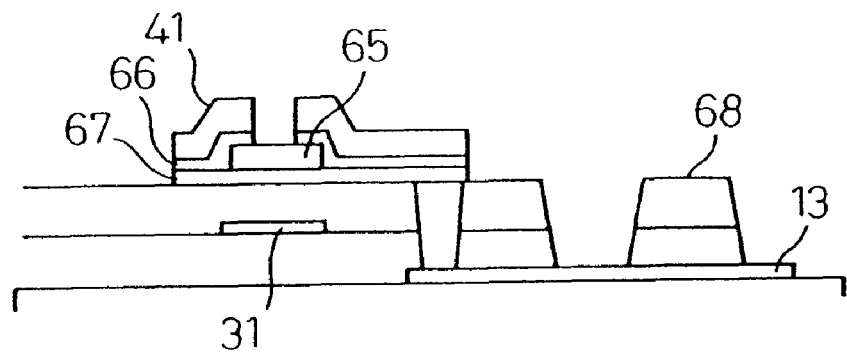
Figure 134A:
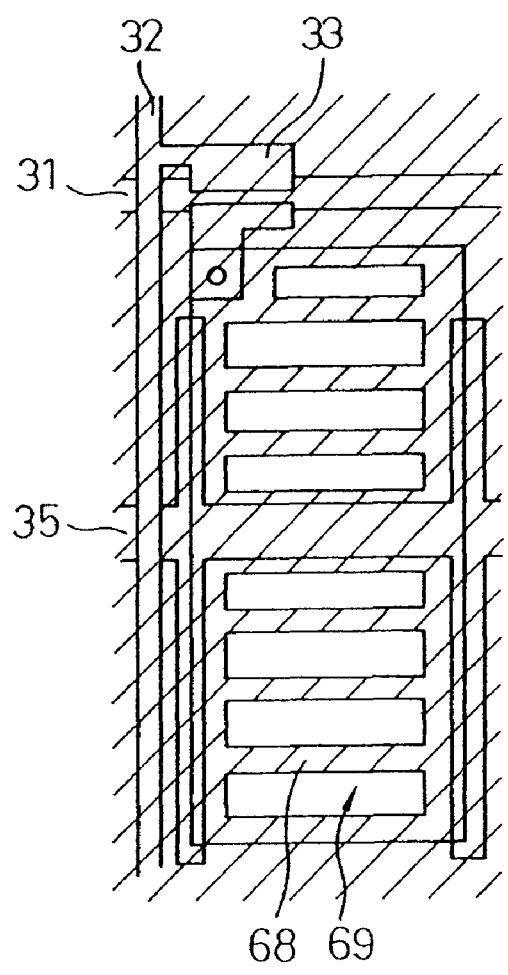
Figure 134B:
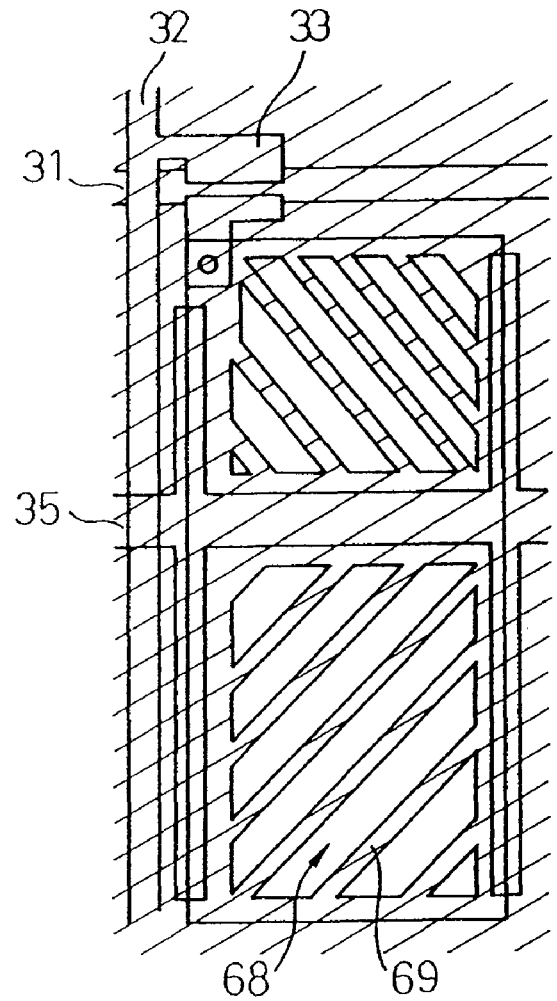
Figure 135:
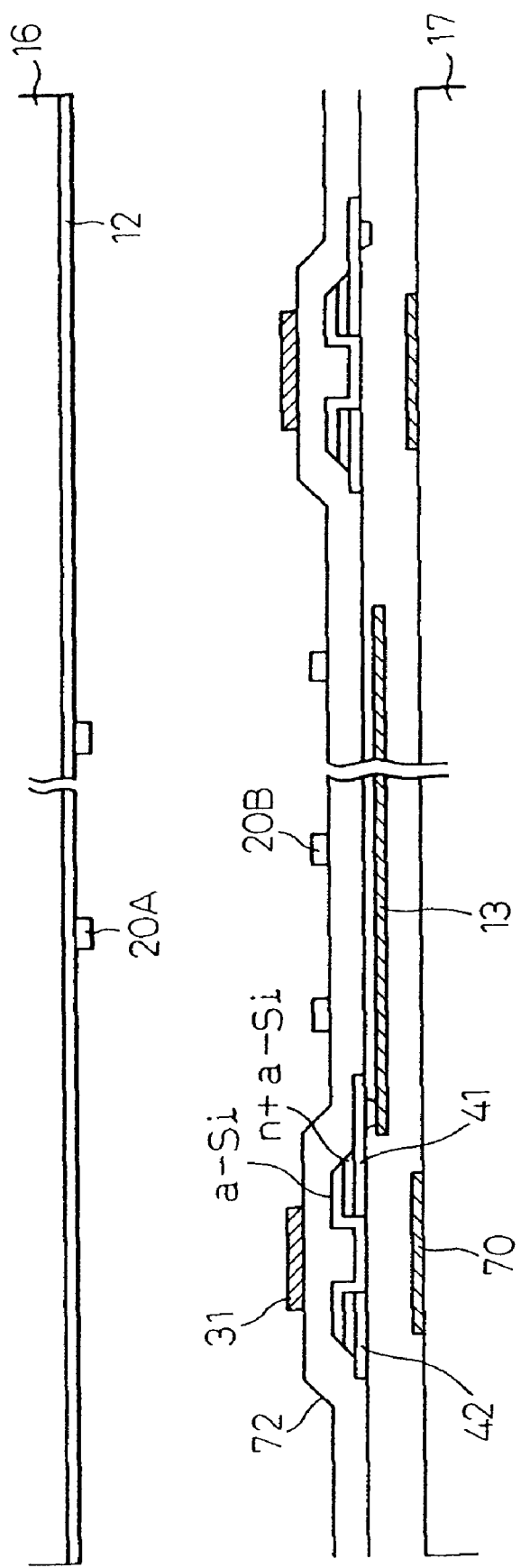
Figure 136A:
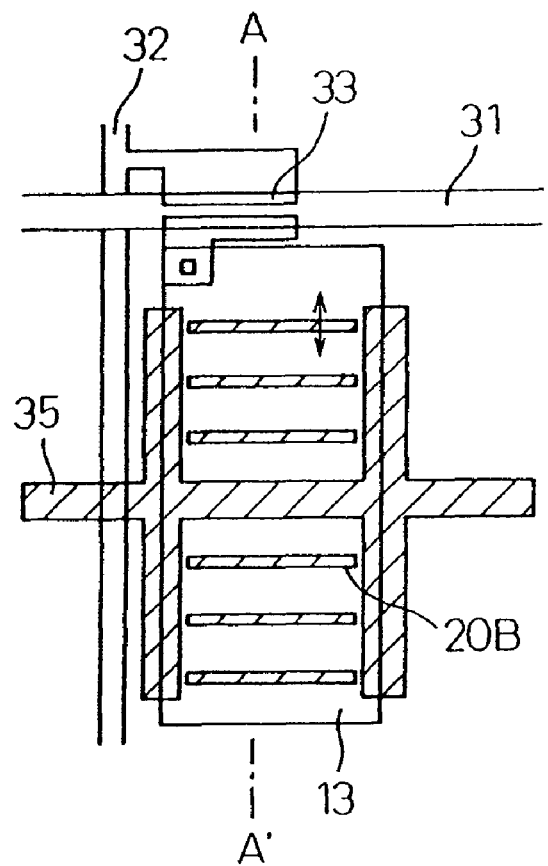
Figure 136B:
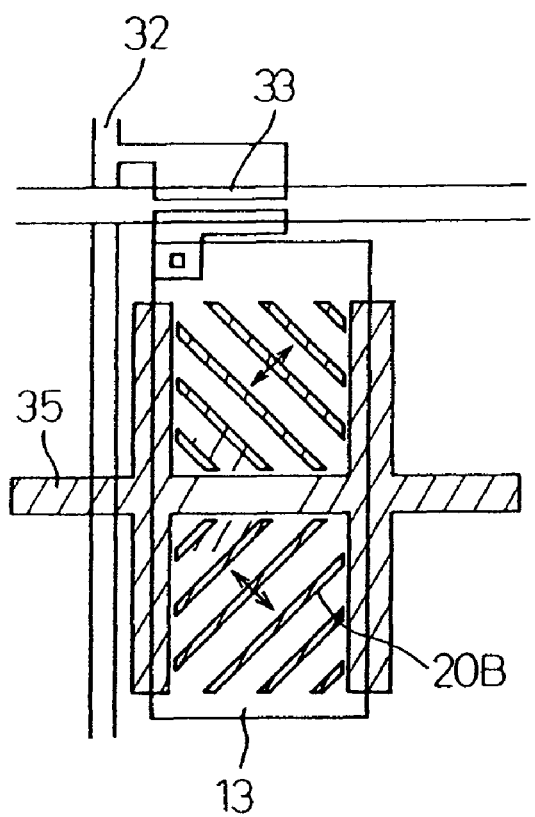
Figure 138:
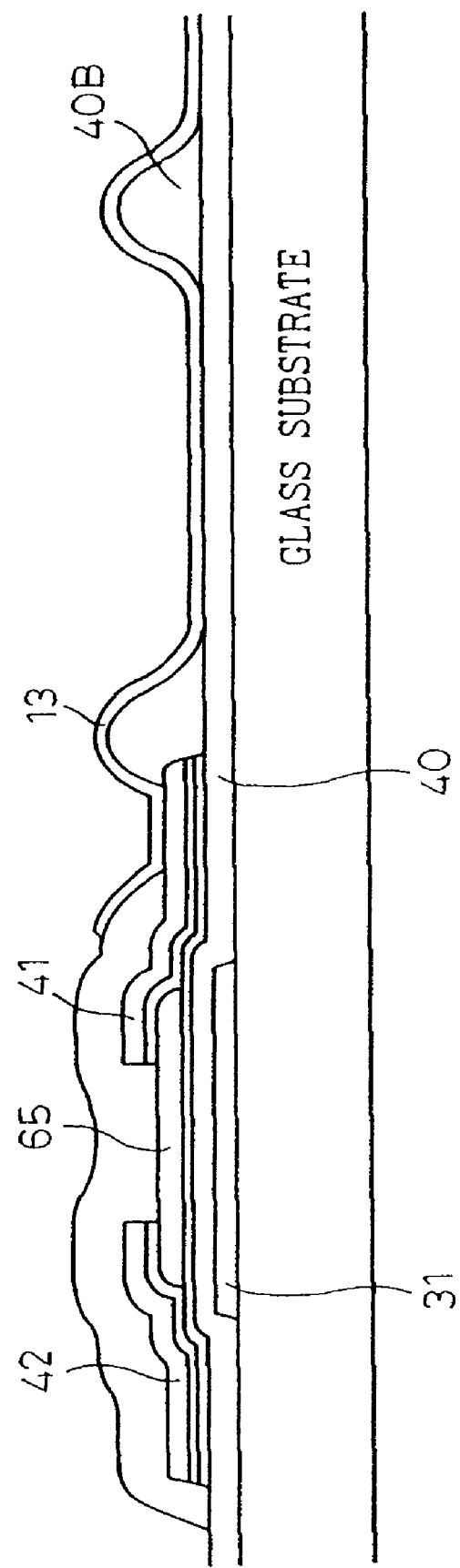
Figure 140A:
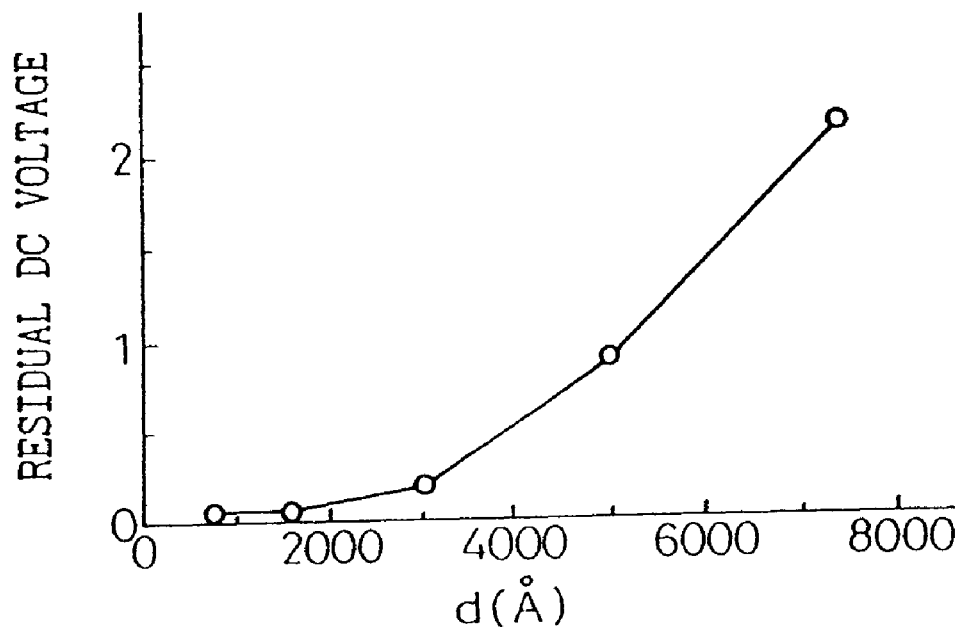
Figure 140B:
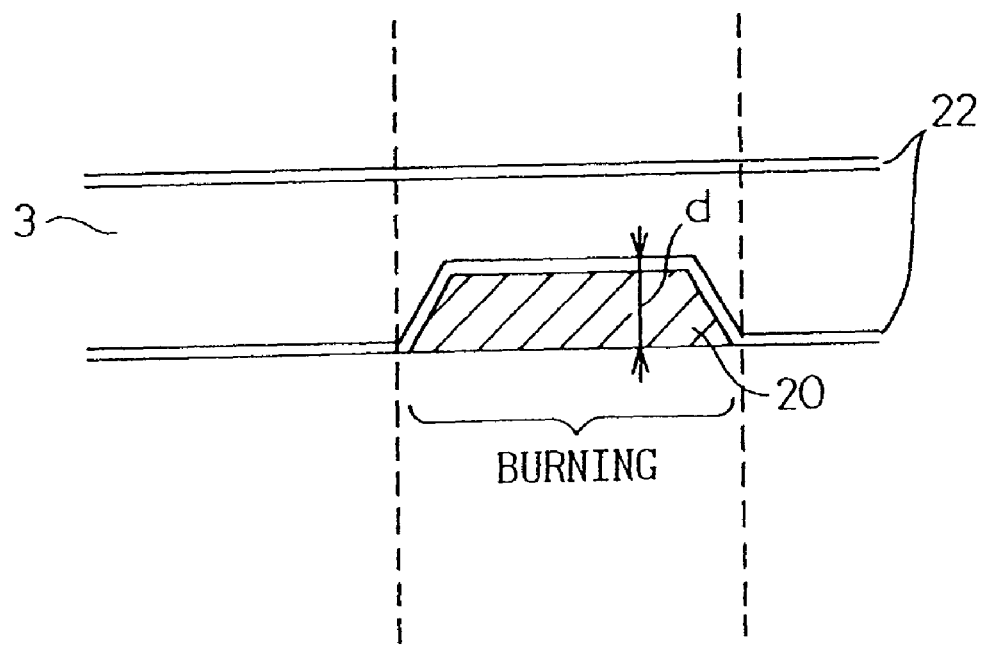
Figure 141A:
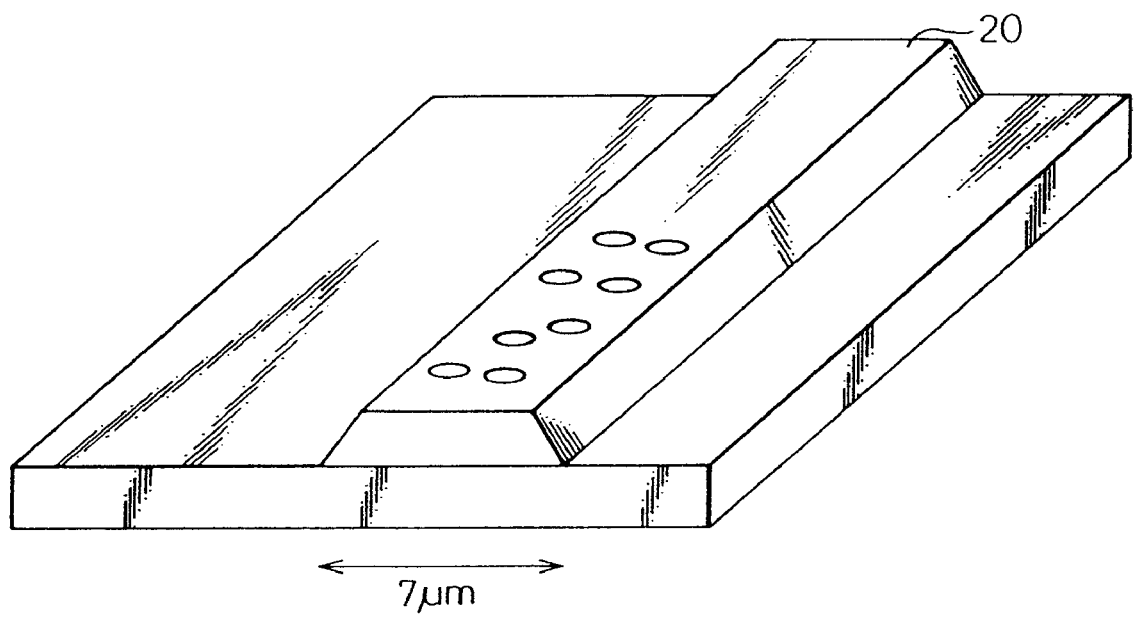
Figure 141B:
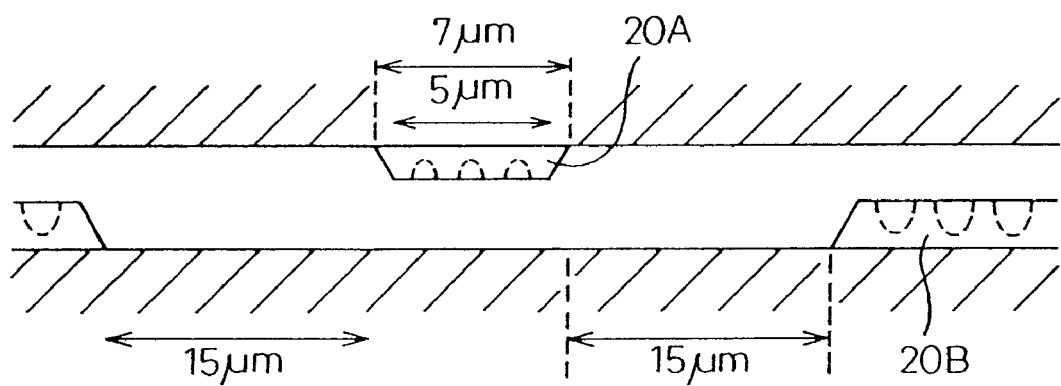
Figure 143:
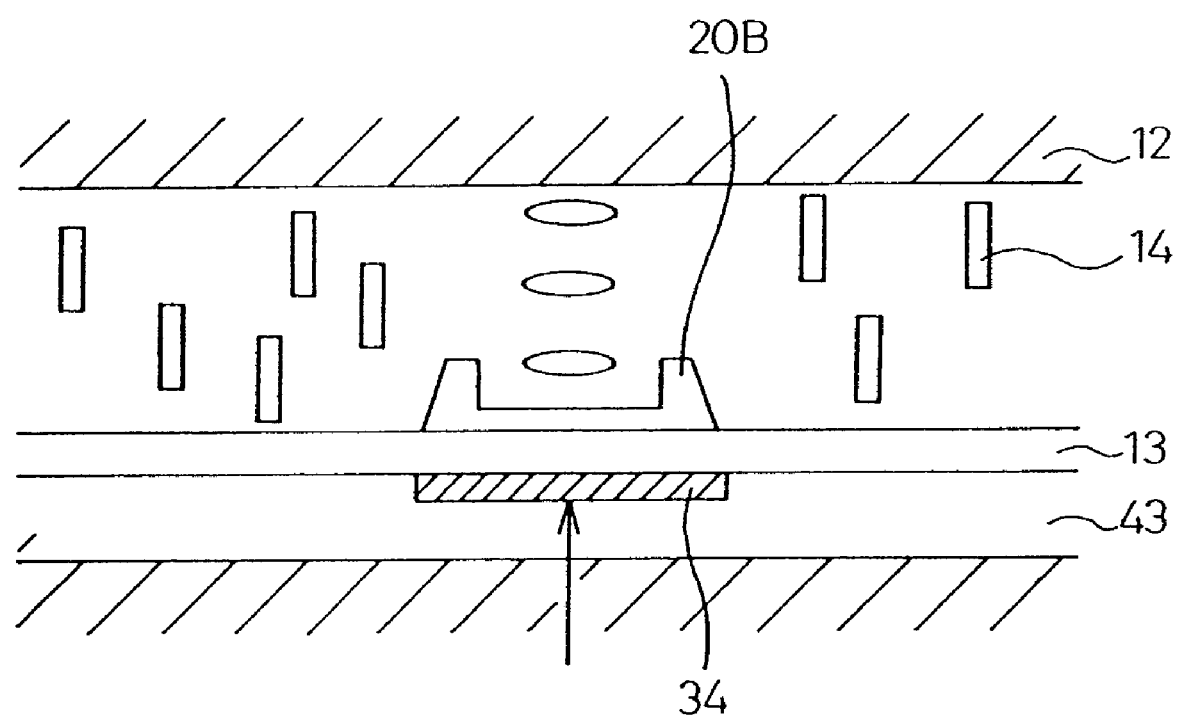
Figure 144A:
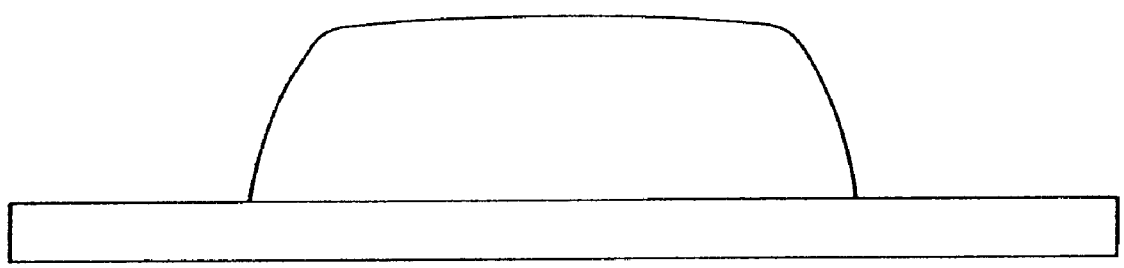
Figure 144B:
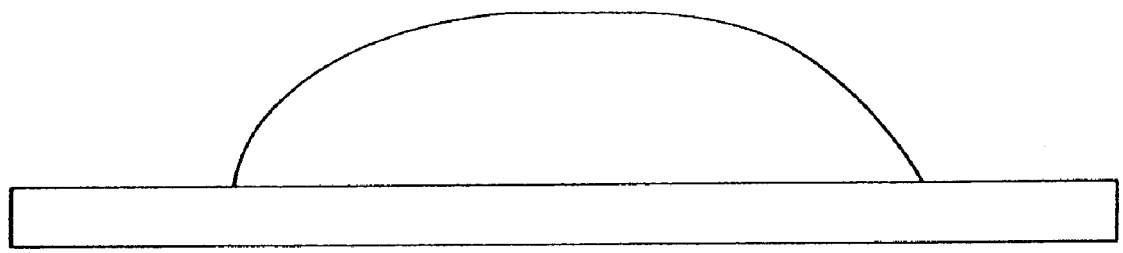
Figure 146A:
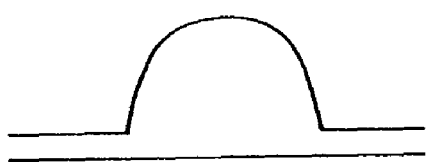
Figure 146B:
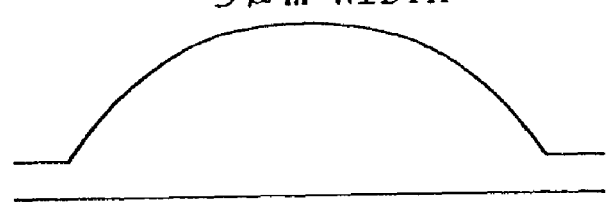
Figure 146C:
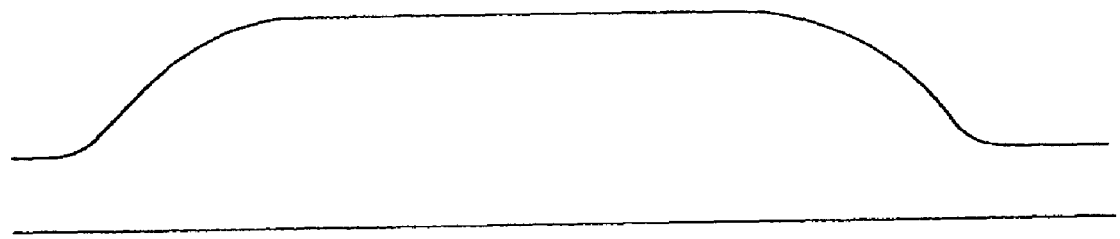
Figure 147A:
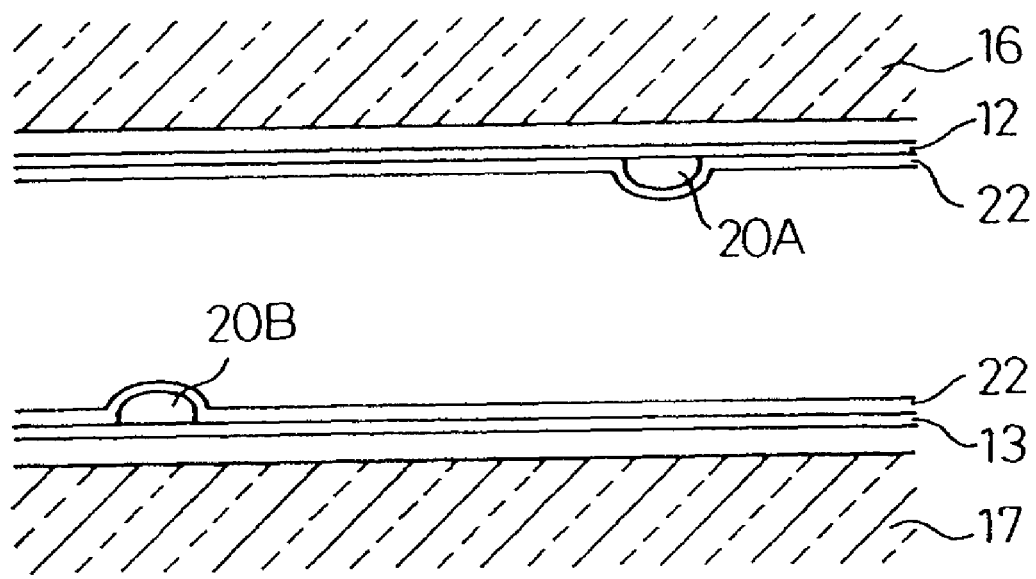
Figure 147B:
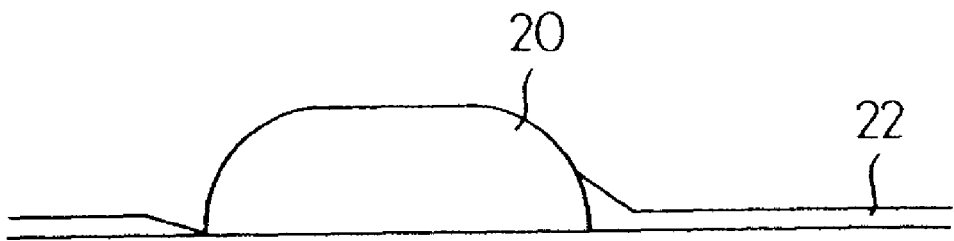
Figure 148A:
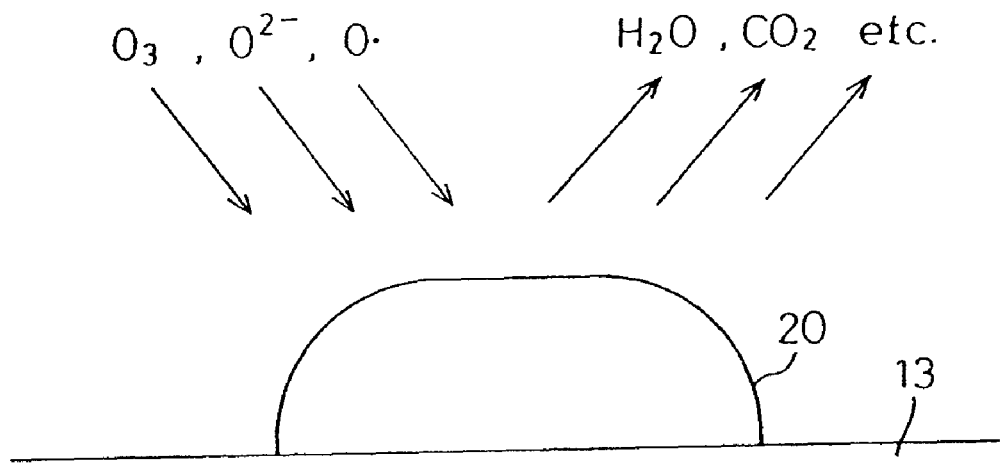
Figure 148B:
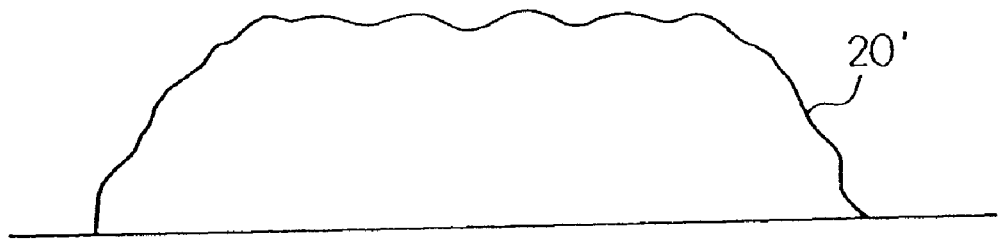
Figure 148C:
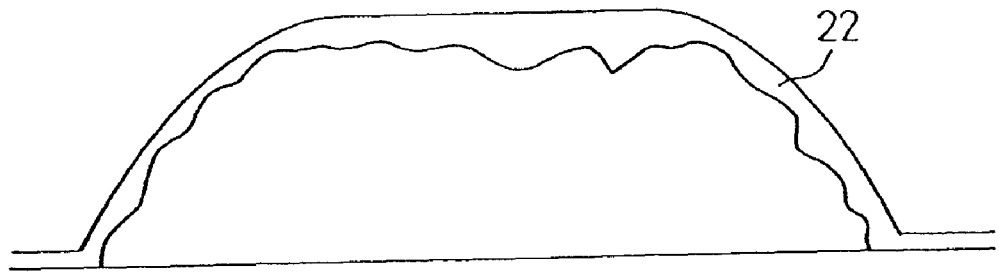
Figure 149A:
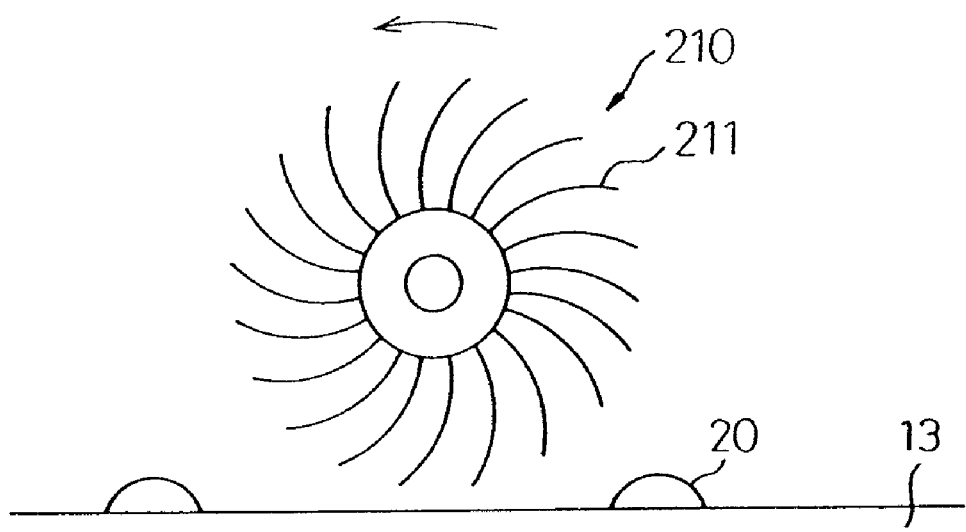
Figure 151A:
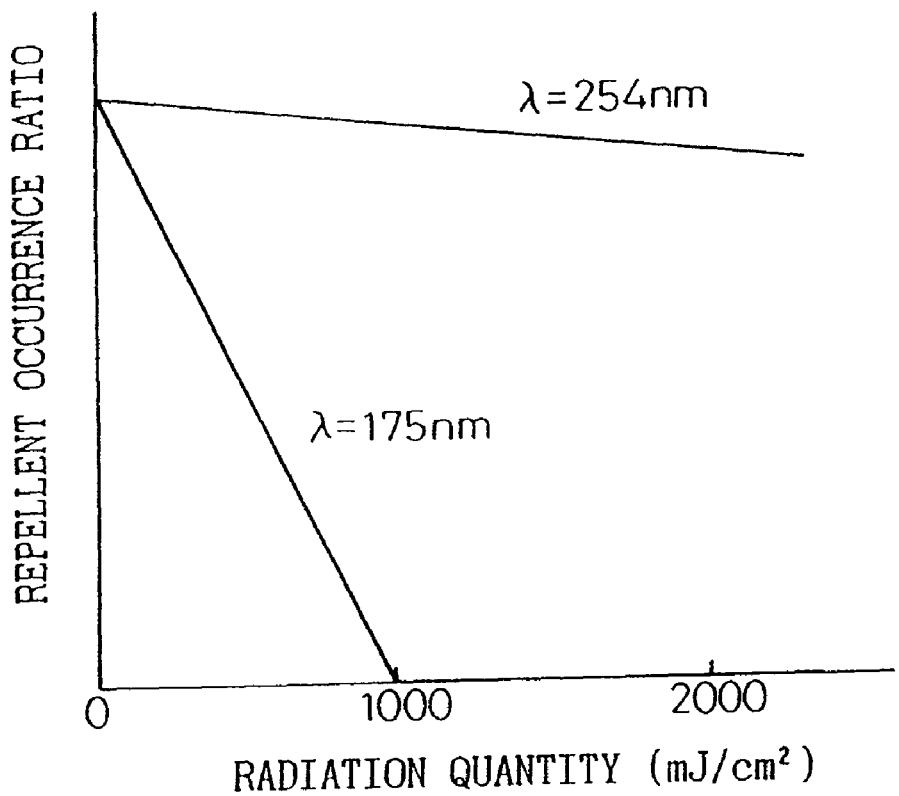
Figure 151B:
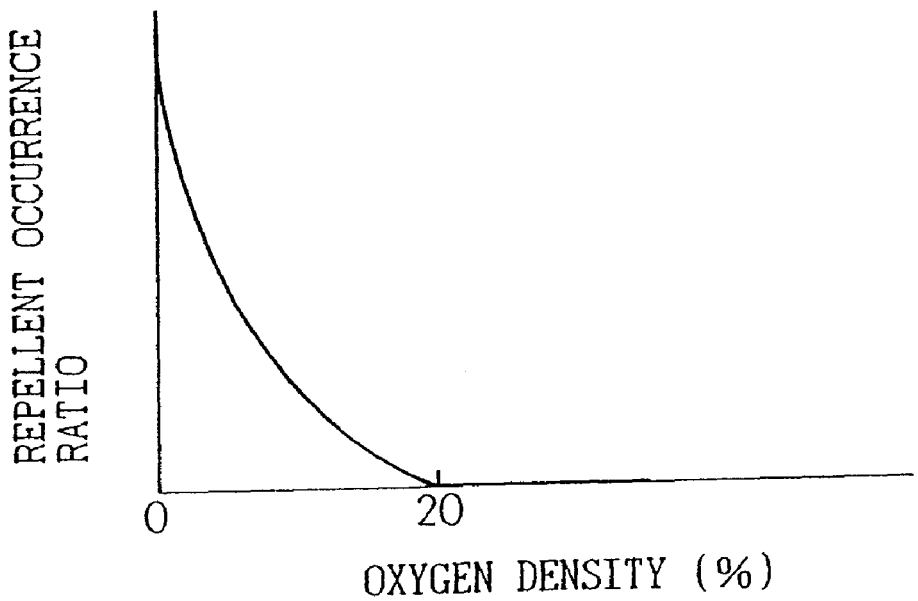
Figure 152A:
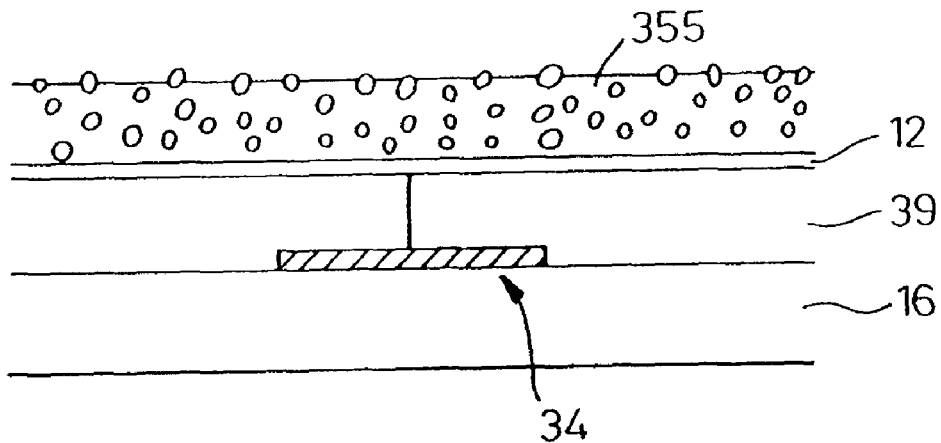
Figure 152B:
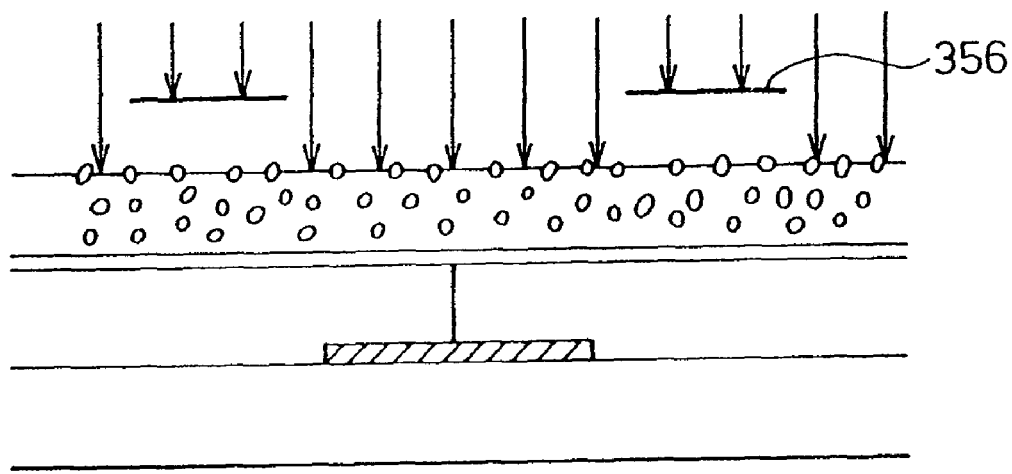
Figure 152C:
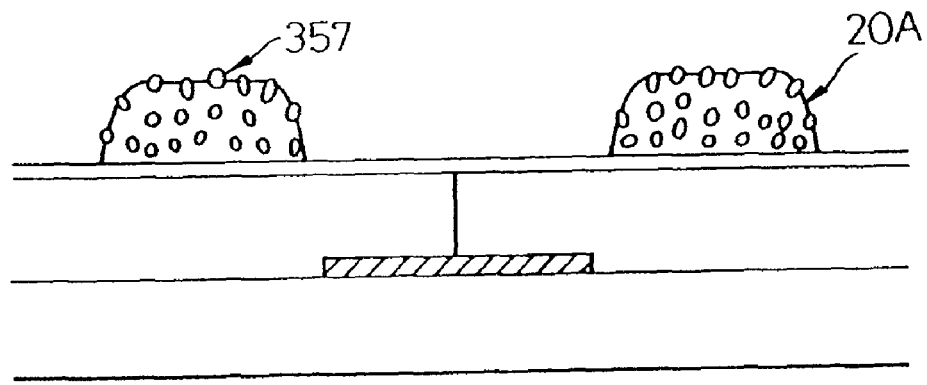
Figure 153A:
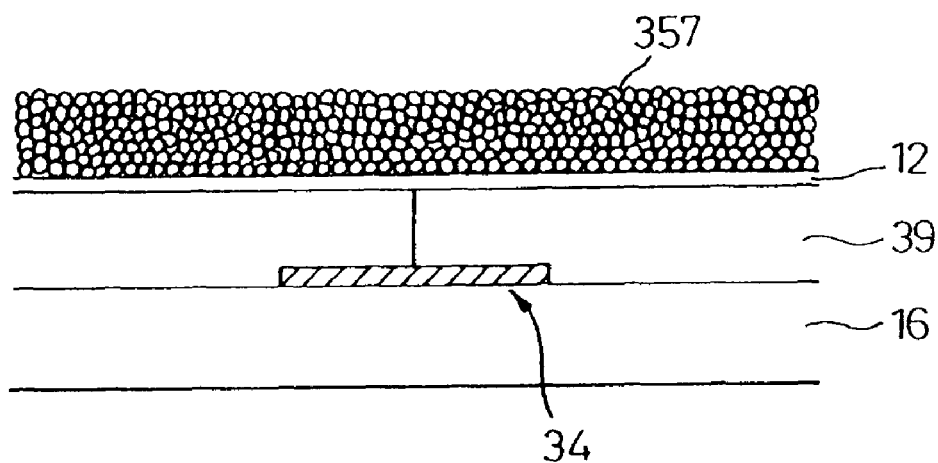
Figure 153B:
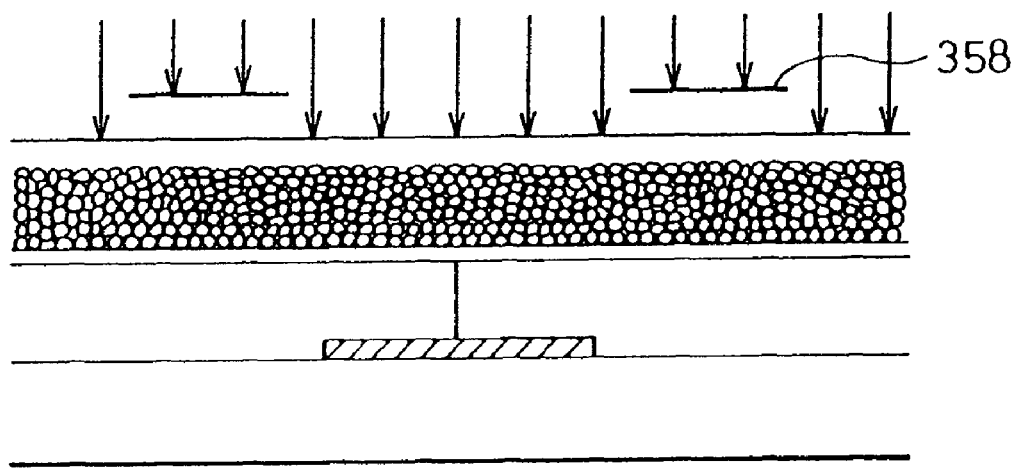
Figure 153C:
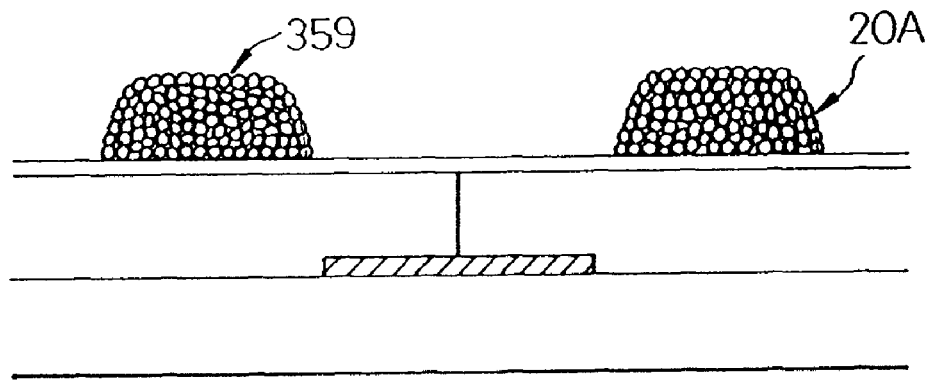
Figure 154A:
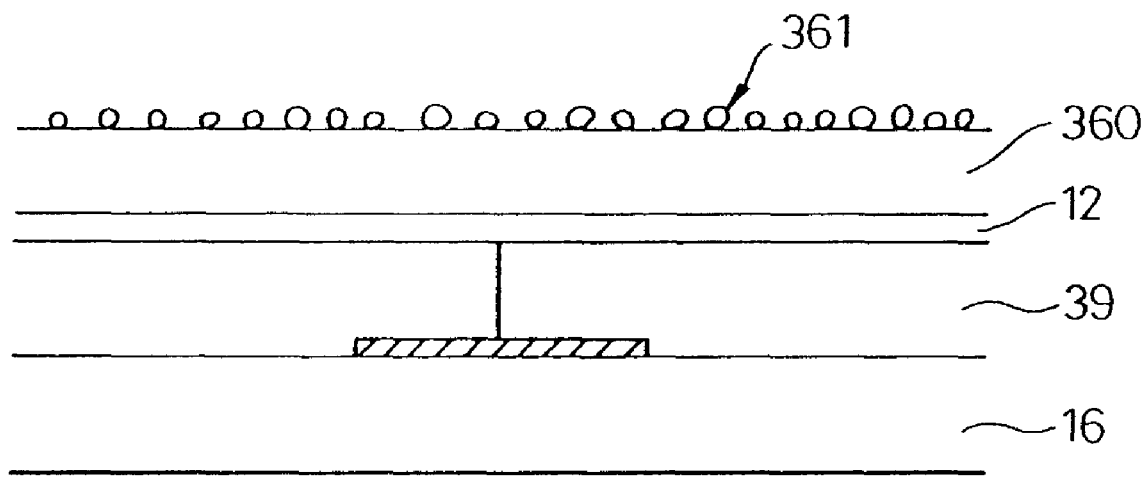
Figure 154B:
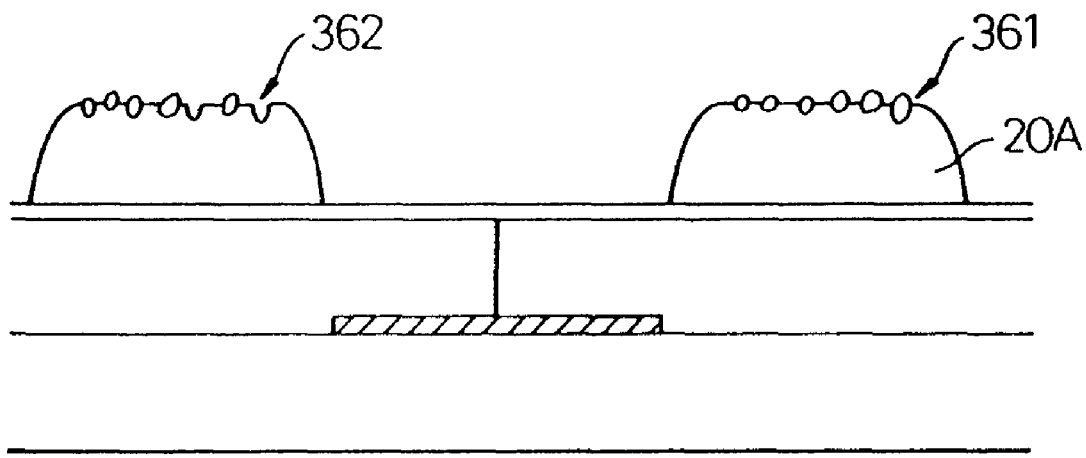
Figure 155A:
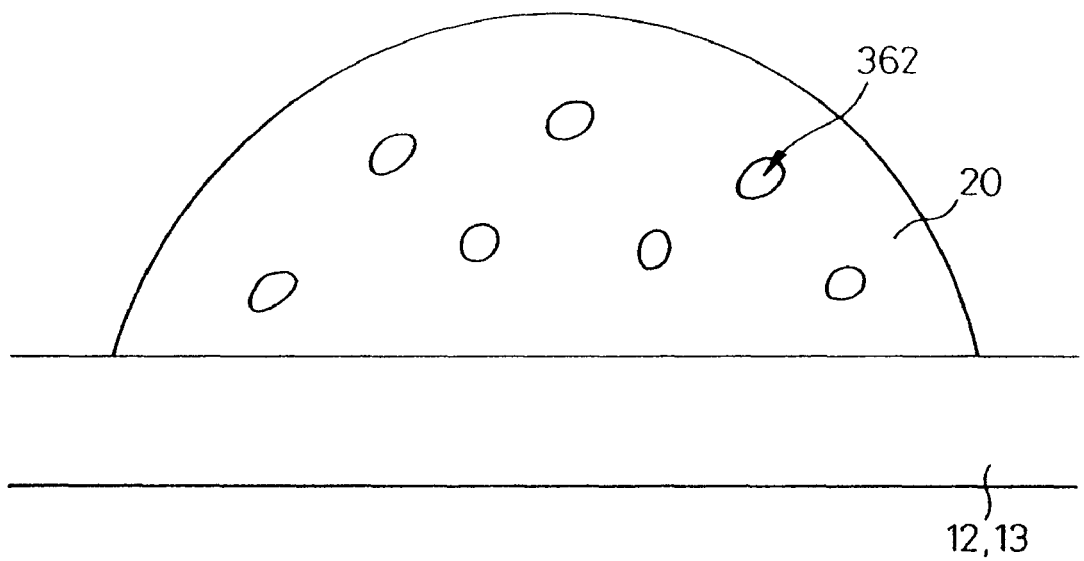
Figure 155B:
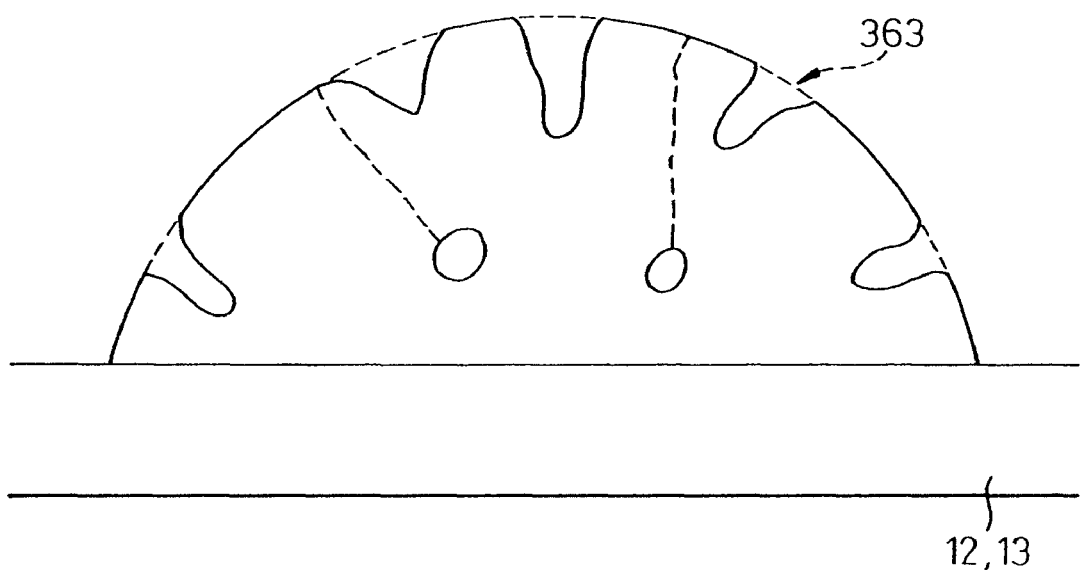
Figure 157A:
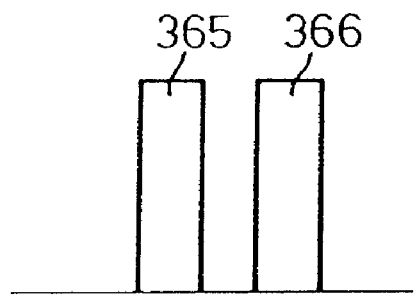
Figure 157B:
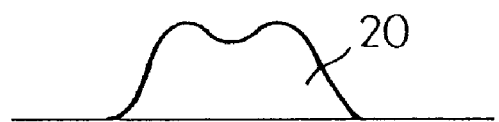
Figure 157C:
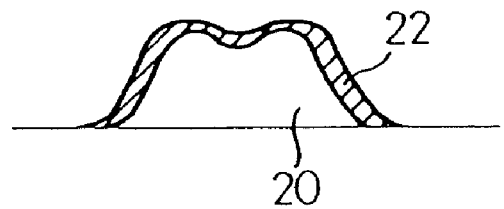
Figure 158:
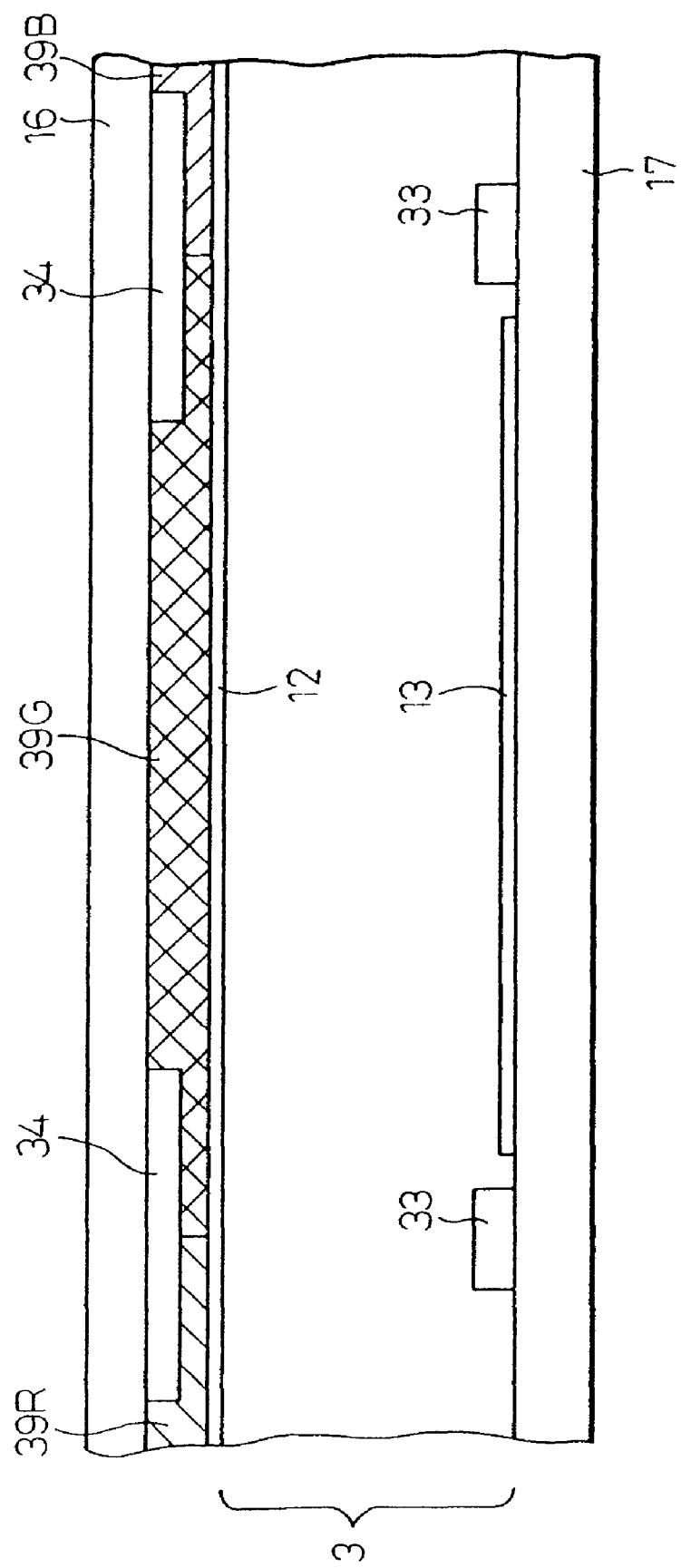
Figure 159:
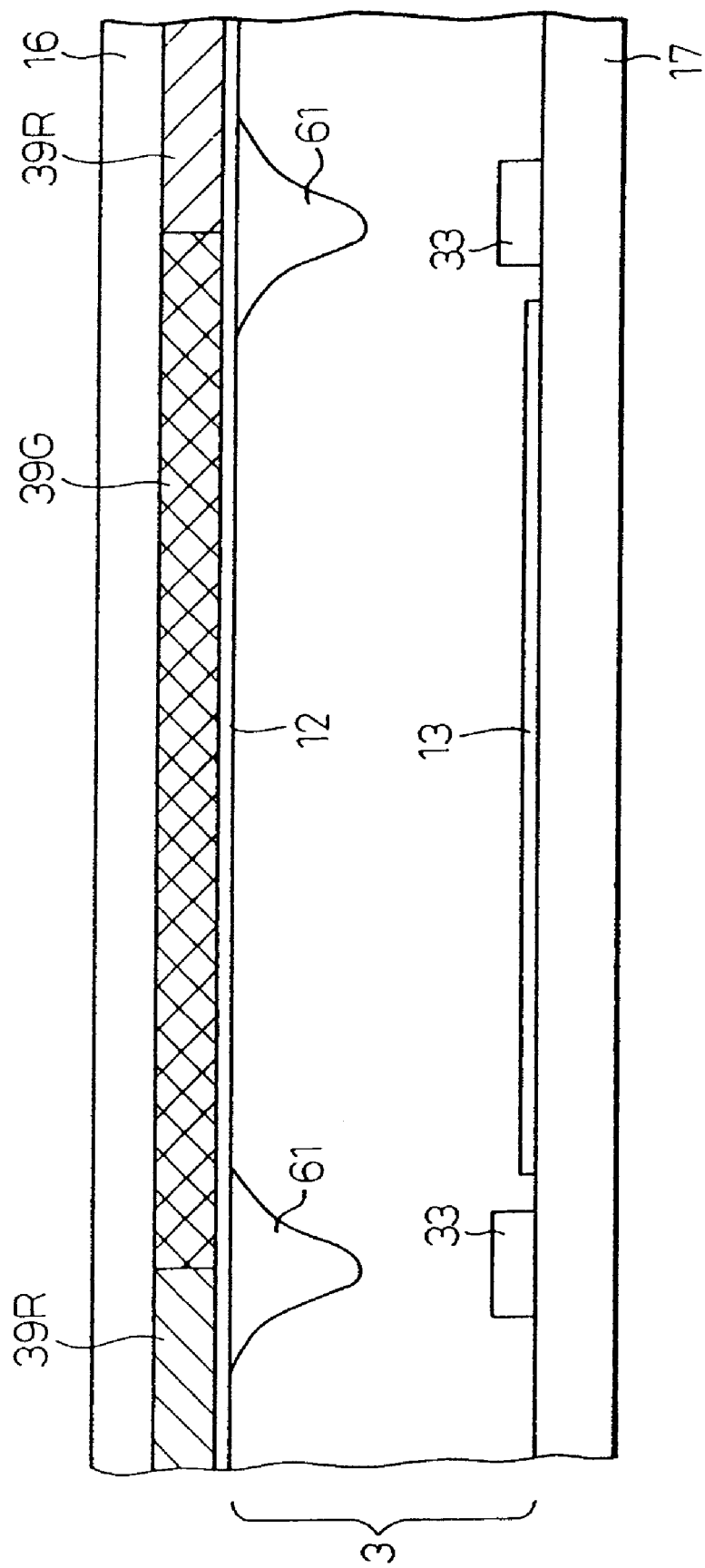
Figure 160:
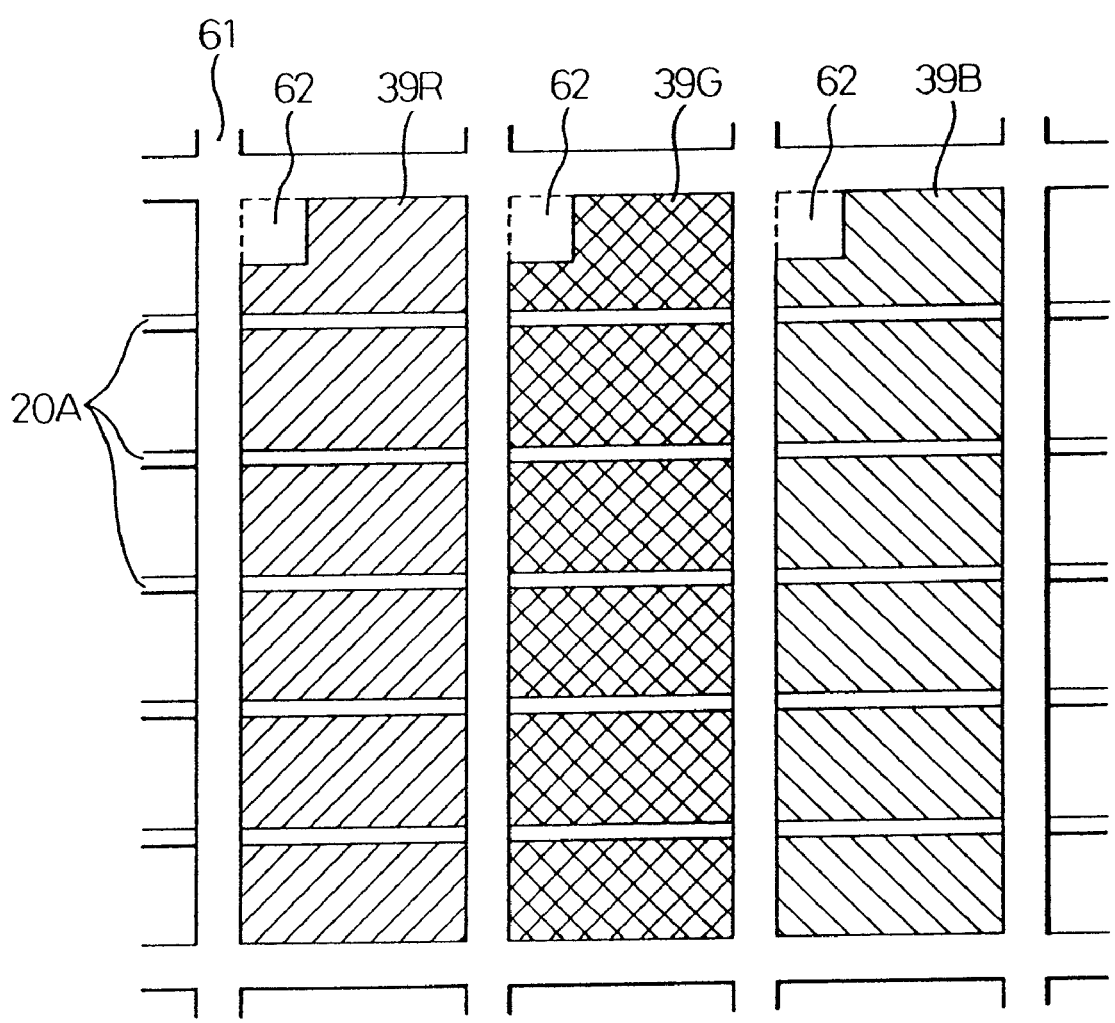
Figure 161:
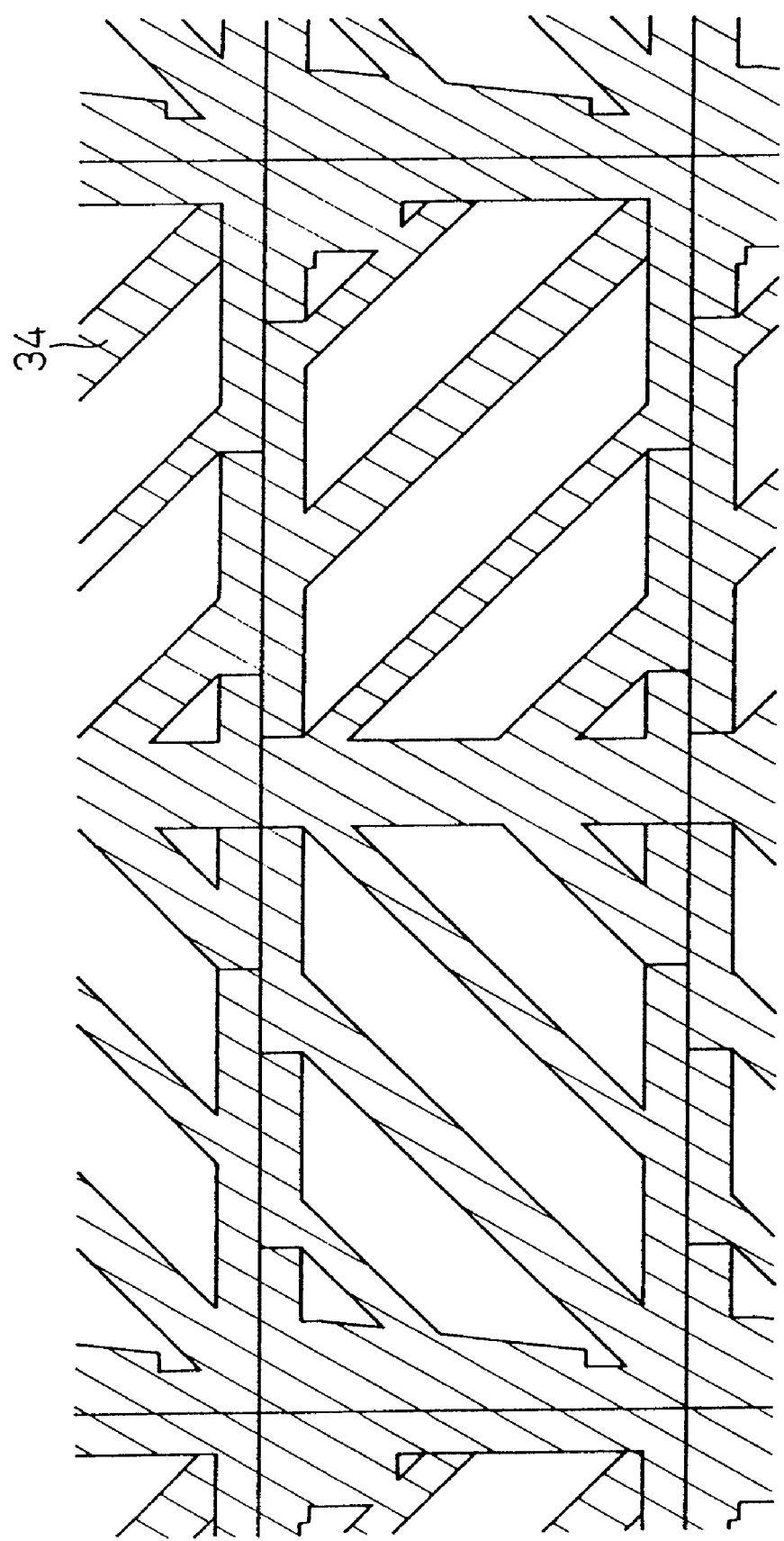
Figure 162:
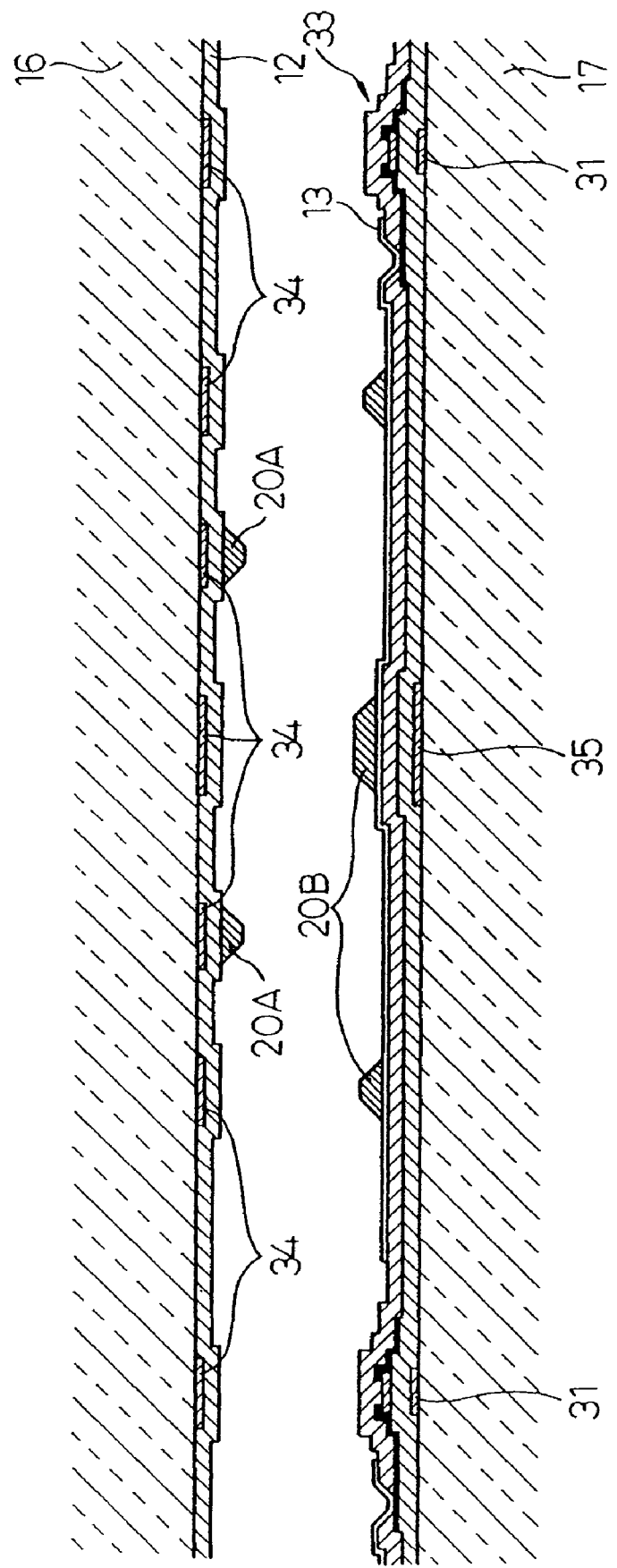
Figure 163:
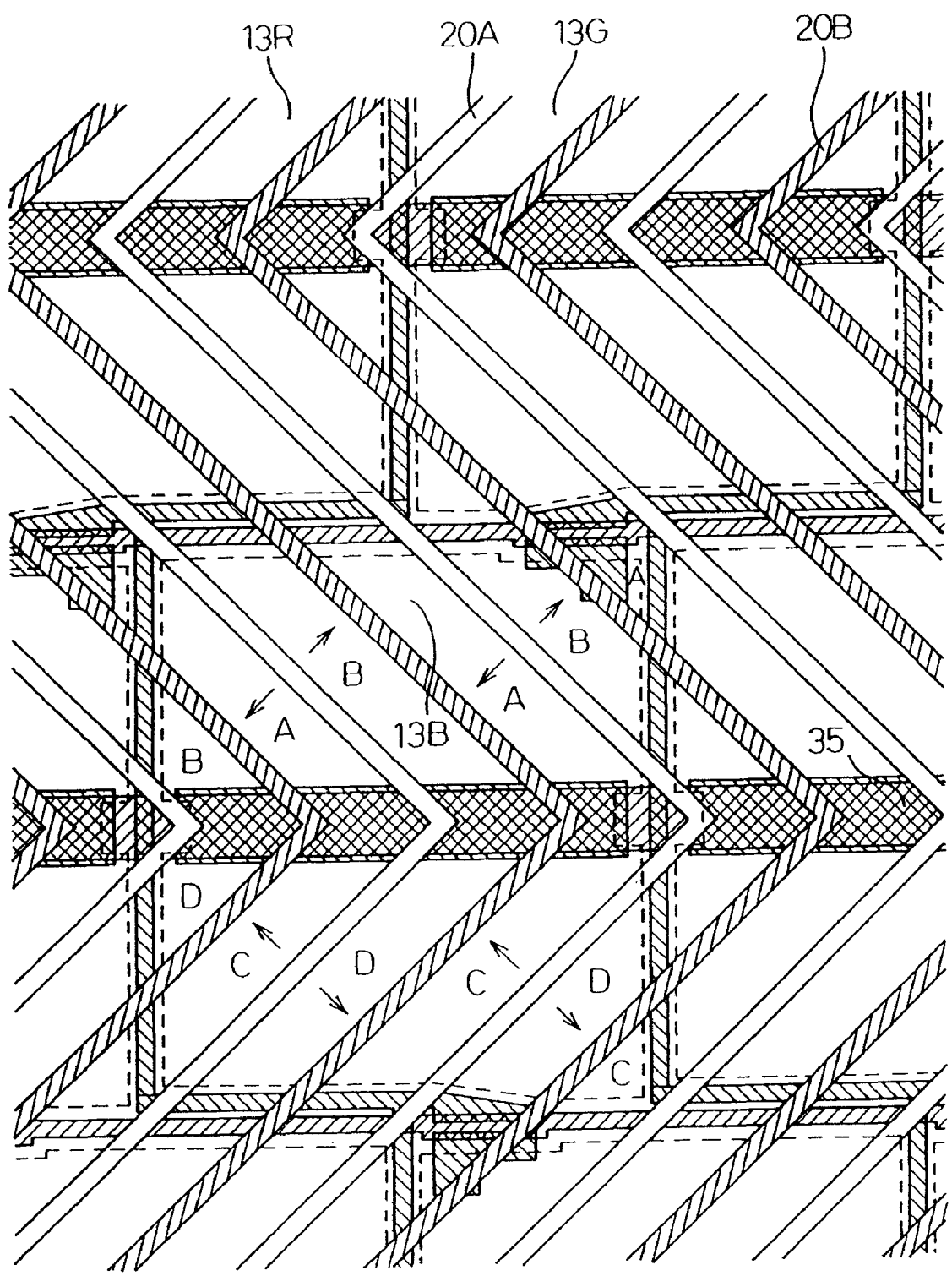
Figure 164:
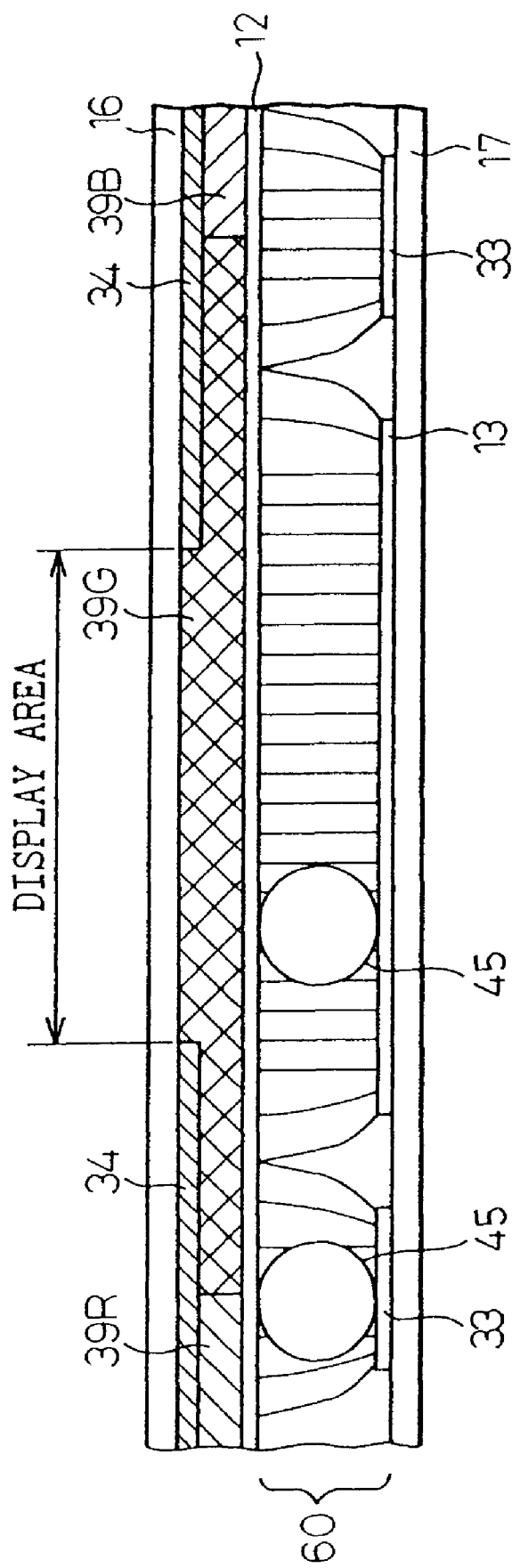
Figure 168A:
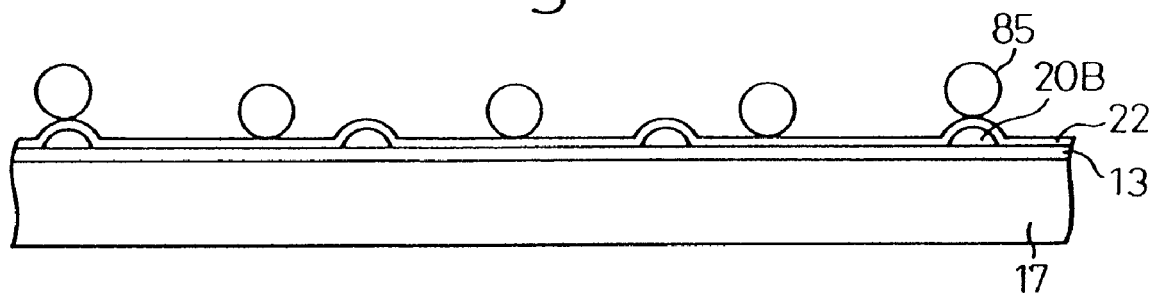
Figure 168B:
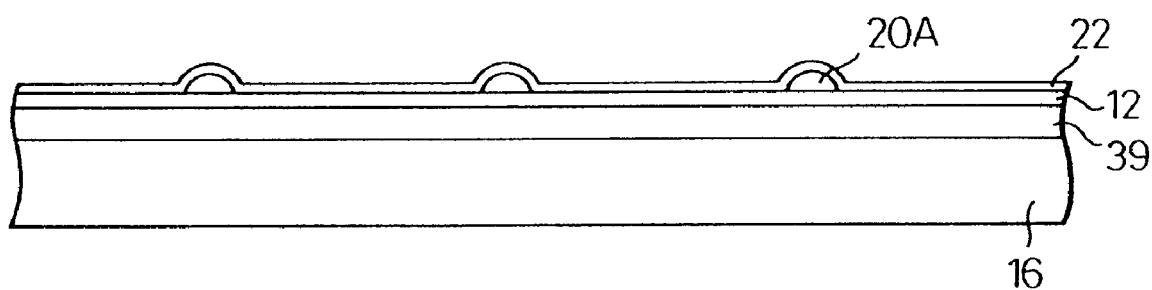
Figure 168C:
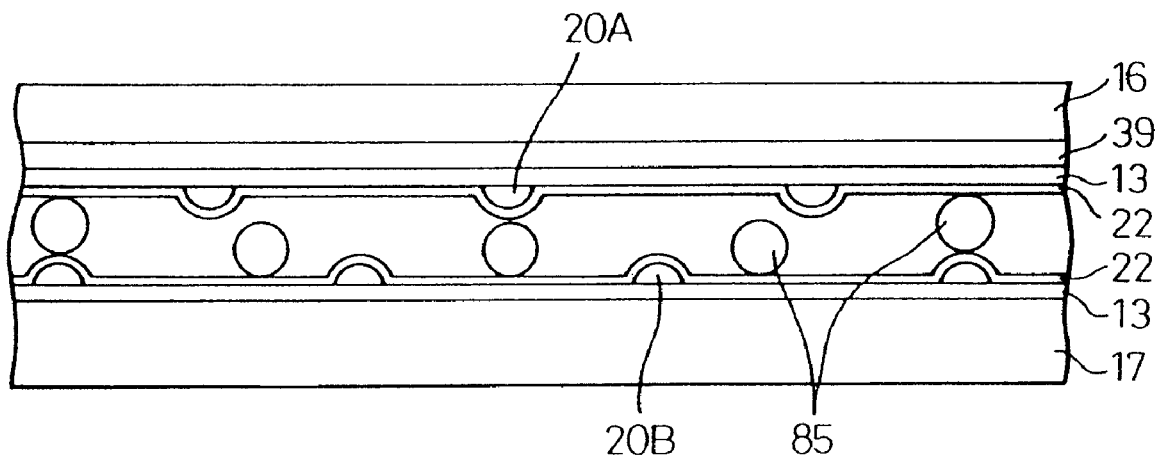
Figure 171A:
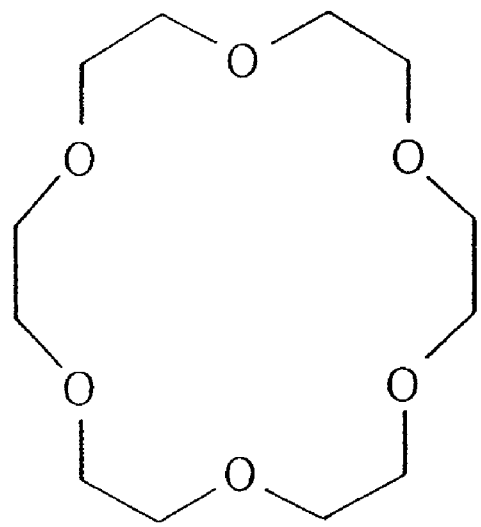
Figure 171B:
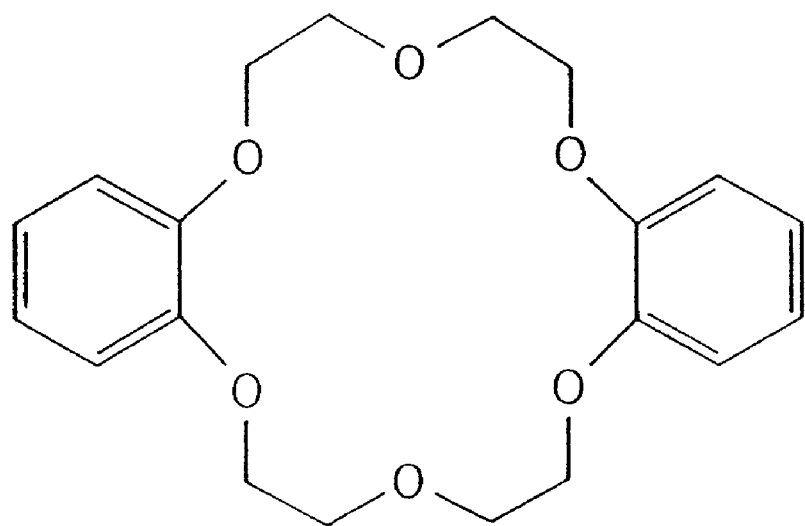
Figure 172A:
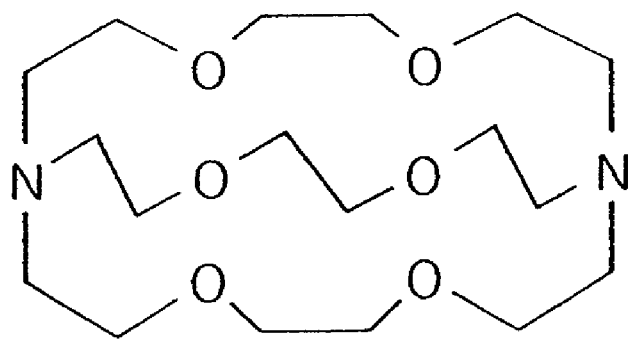
Figure 172B:
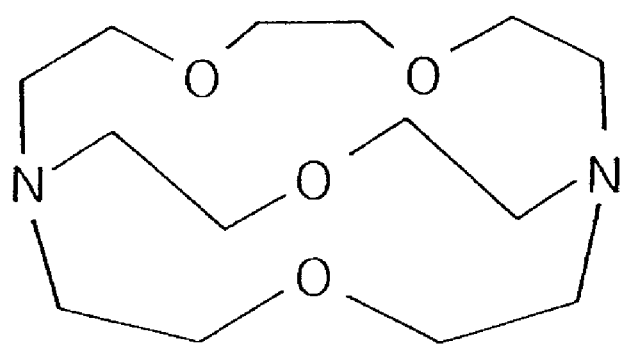
Figure 173A:
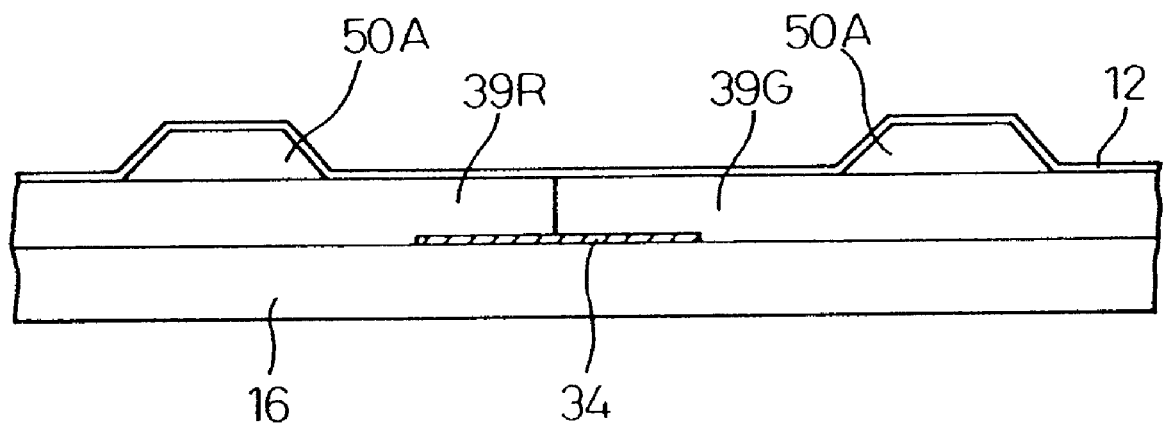
Figure 173B:
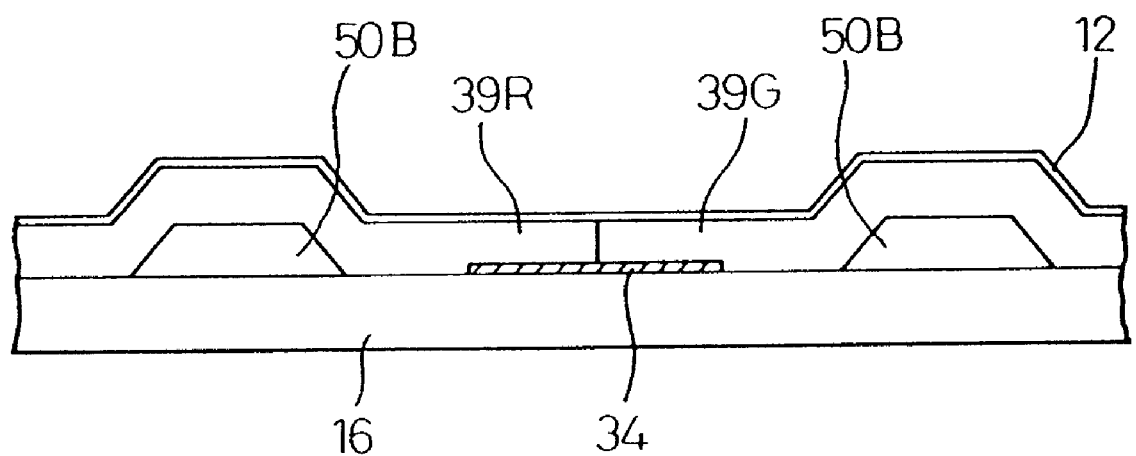
Figure 174:
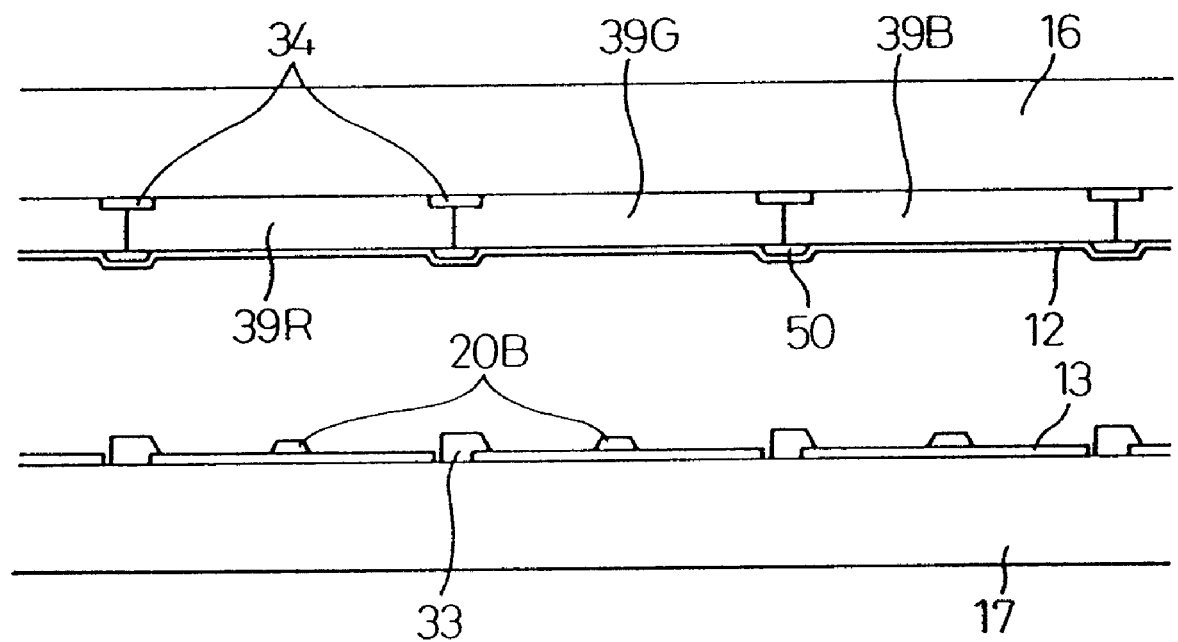
Figure 175A:
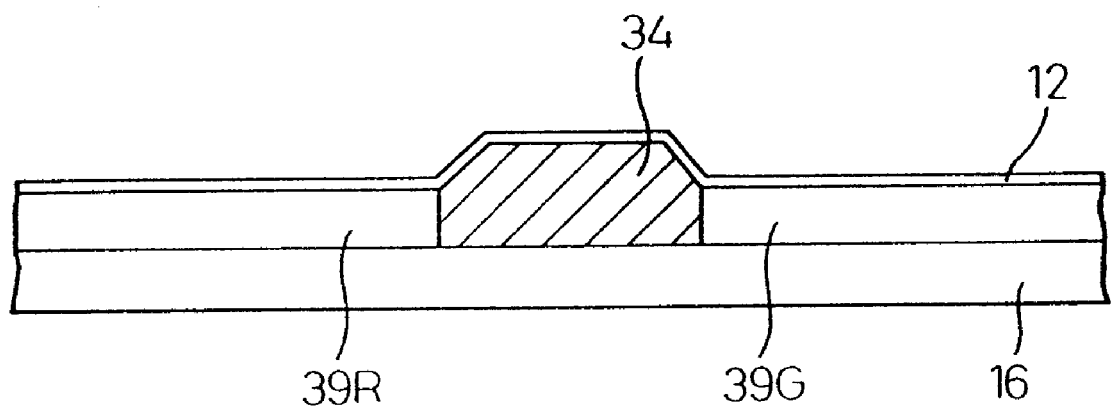
Figure 175B:
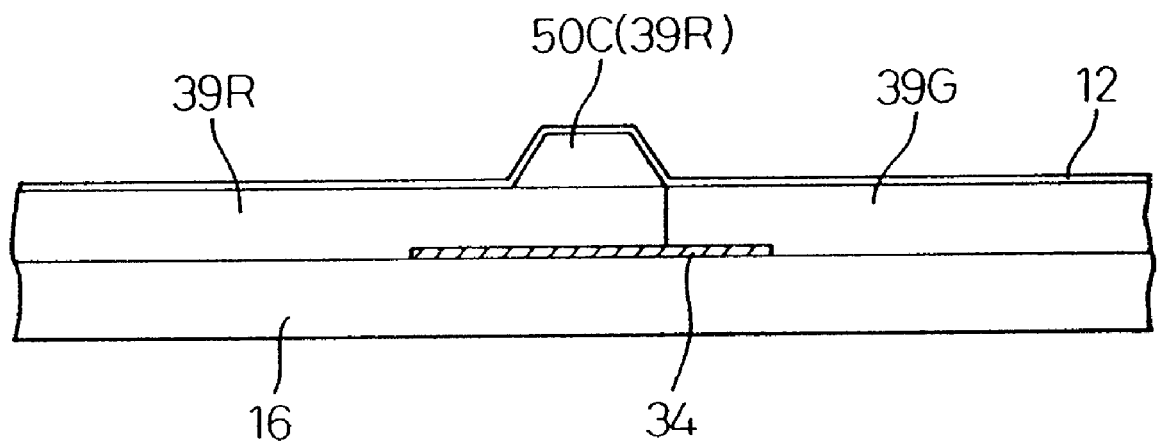
Figure 176A:
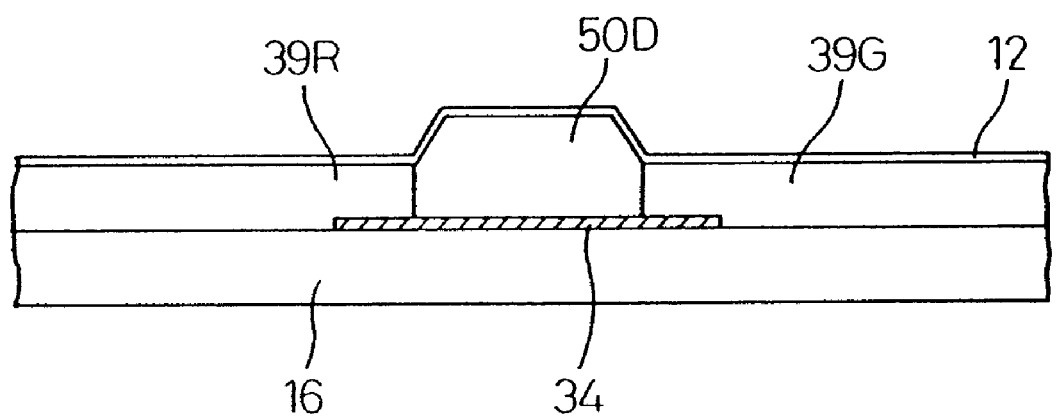
Figure 176B:
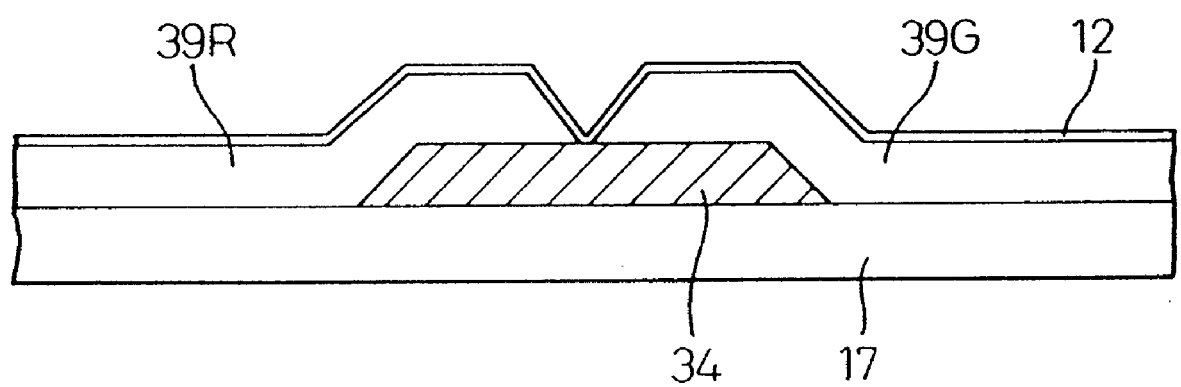
Figure 177A:
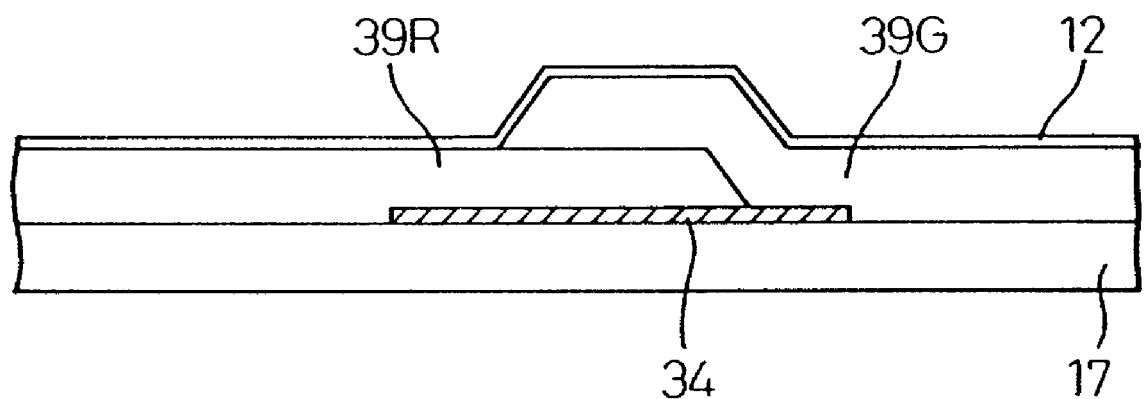
Figure 177B:
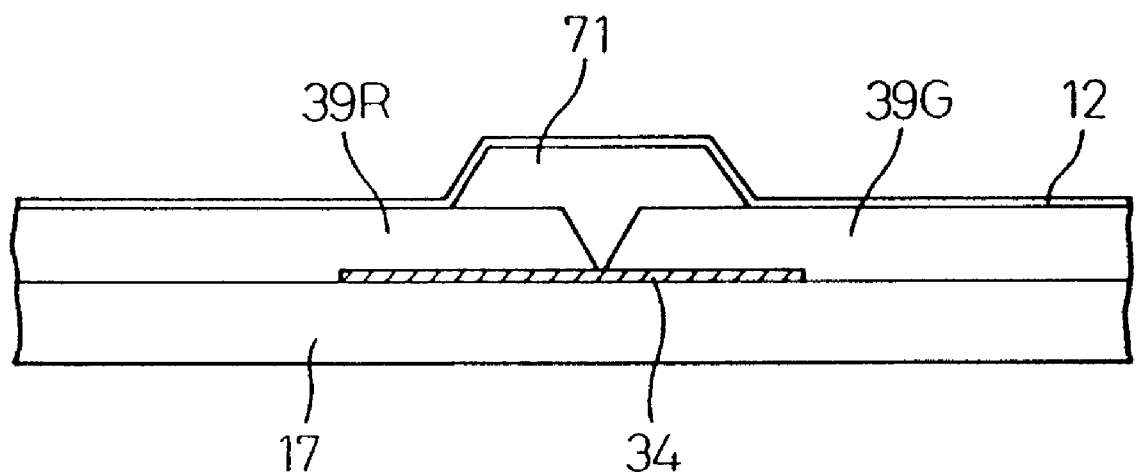
Figure 178:
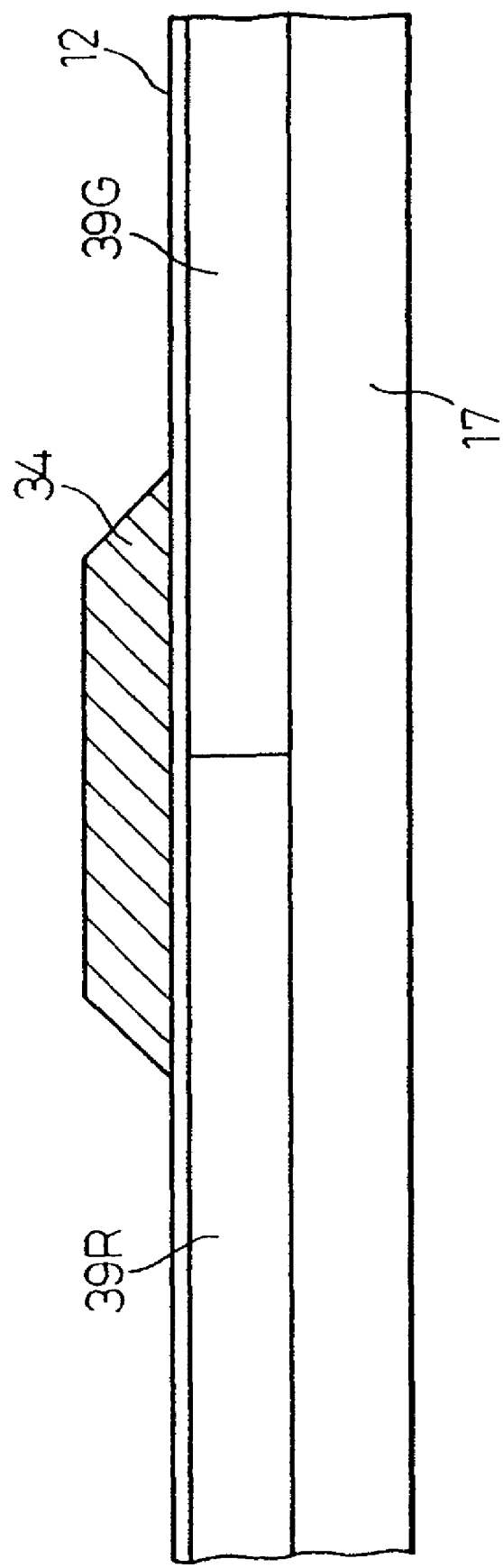
Figure 179A:
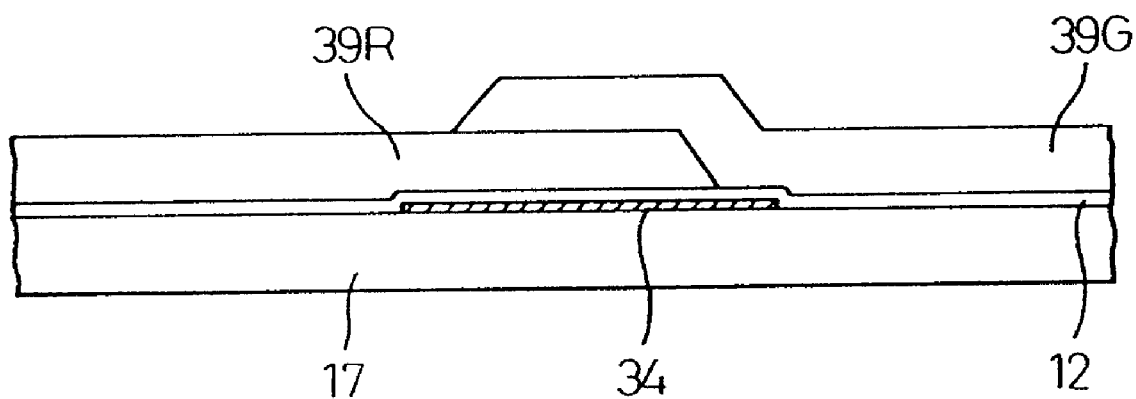
Figure 179B:
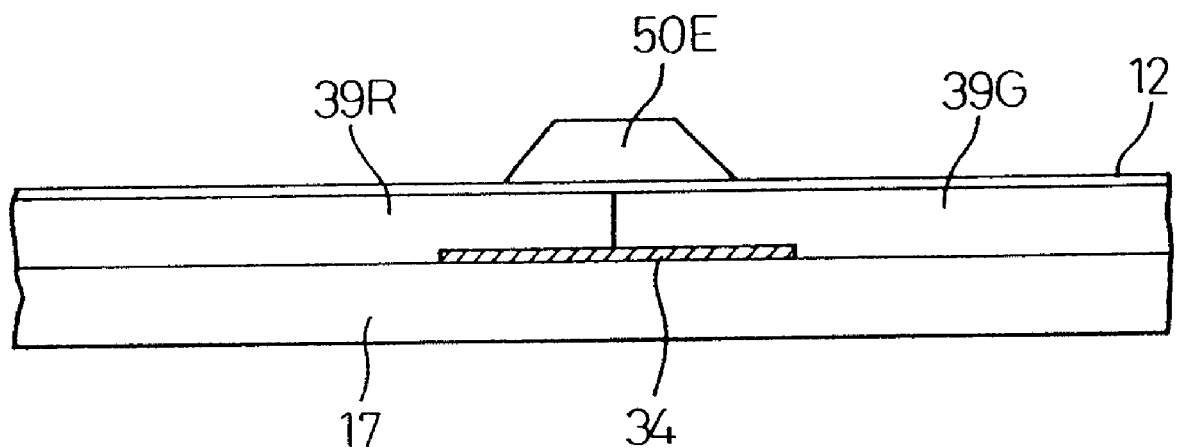
Figure 180A:
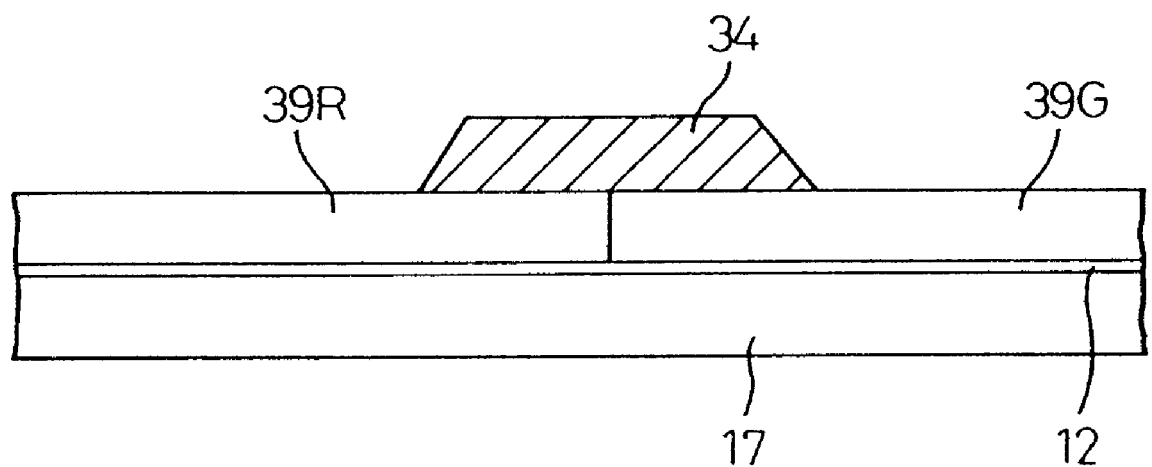
Figure 180B:
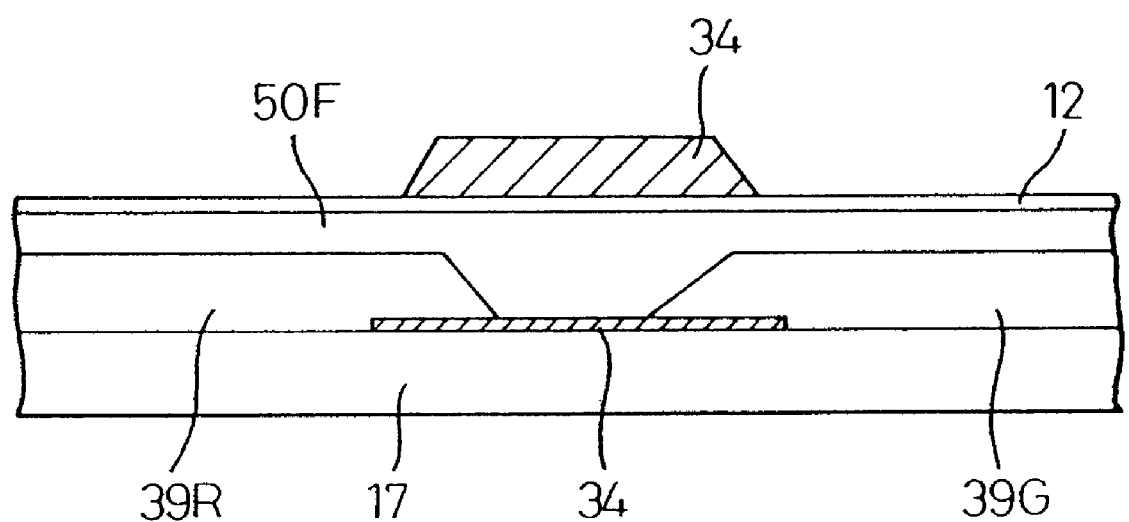
Figure 182:
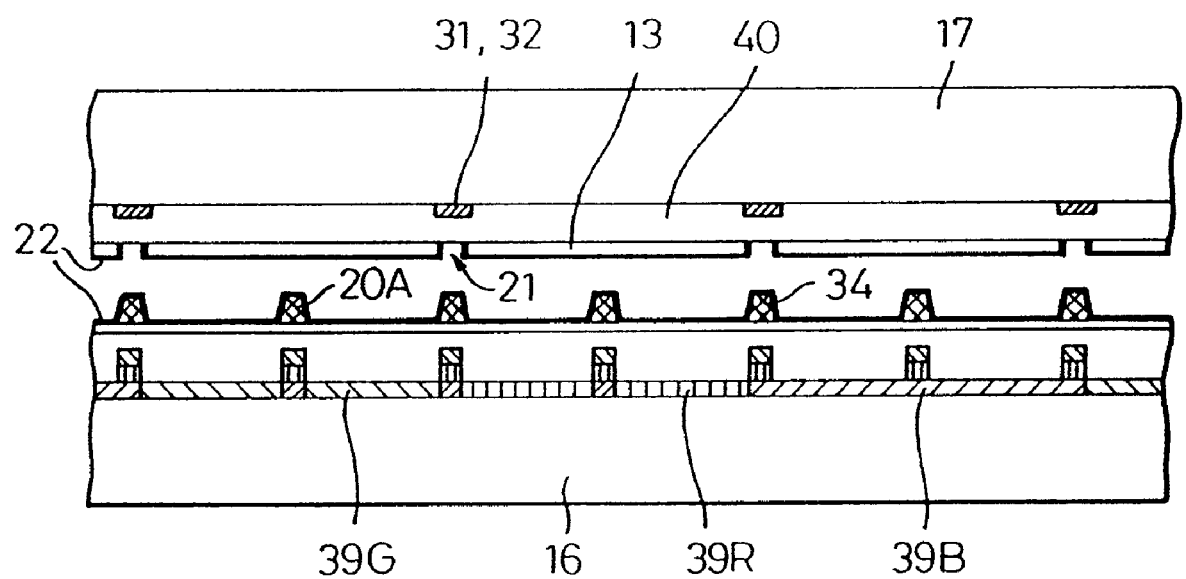
Figure 187:
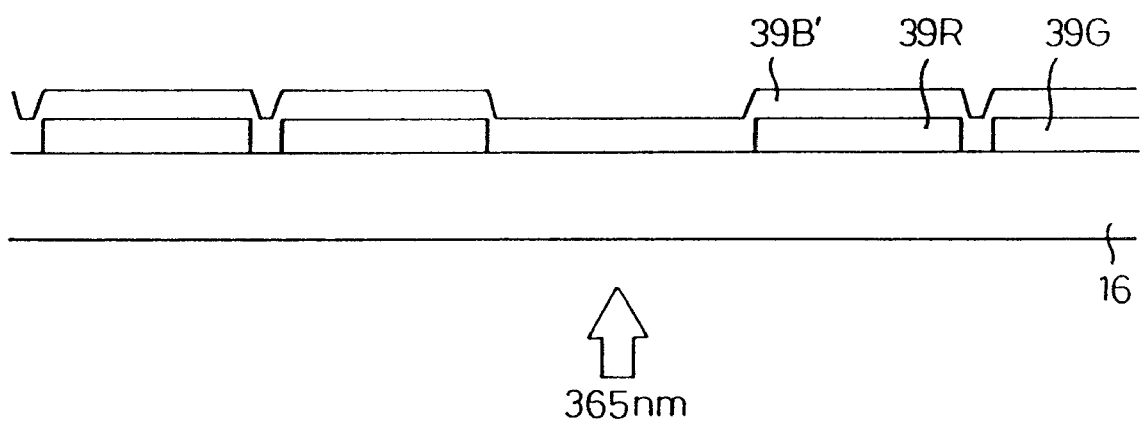
Figure 188:
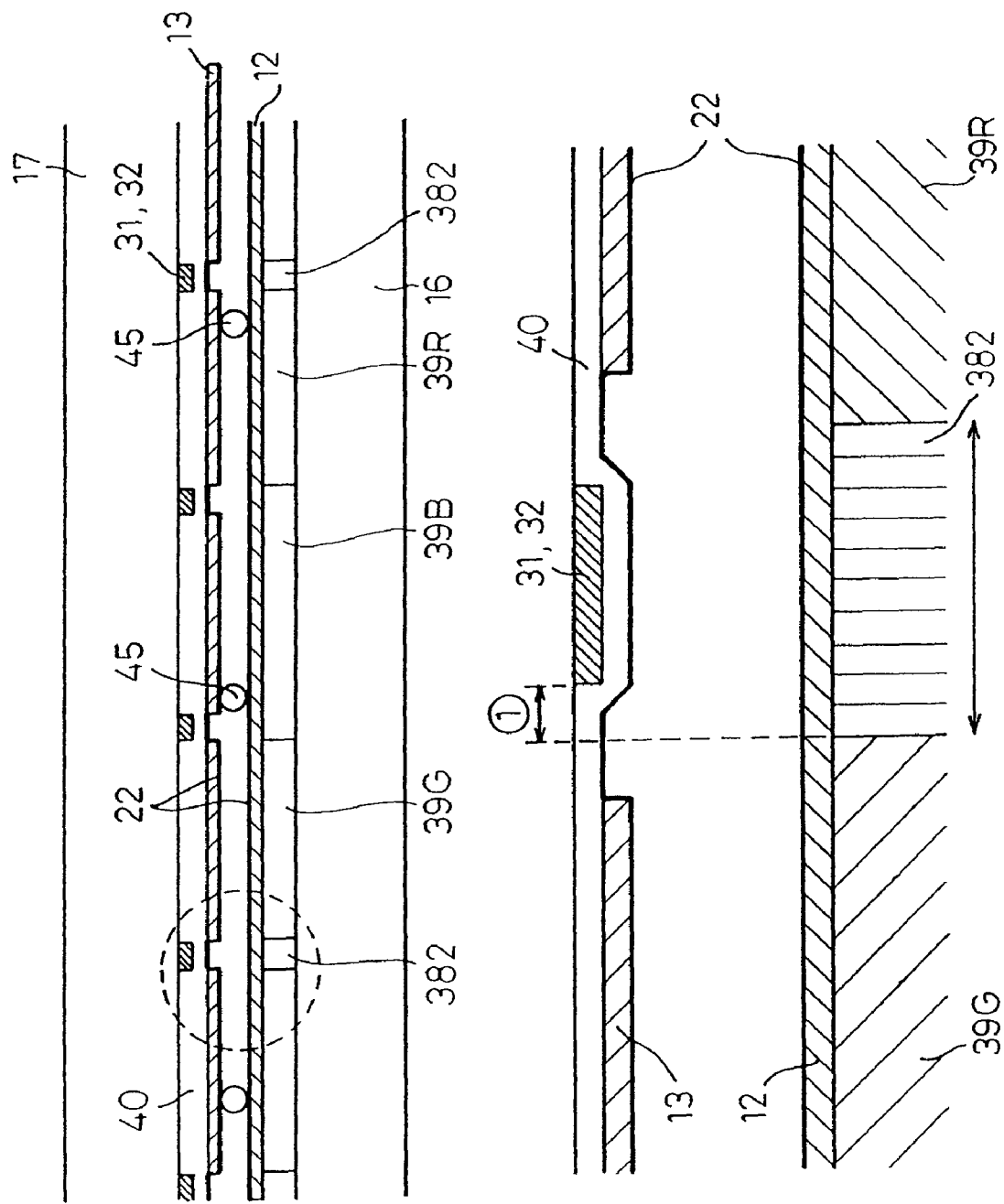
Figure 189:
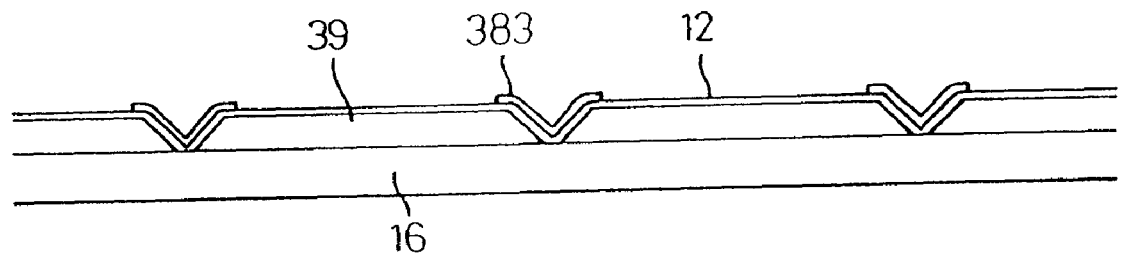
Figure 190A:
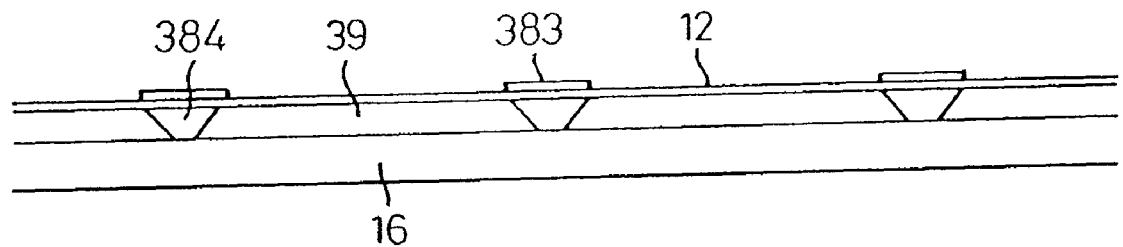
Figure 190B:
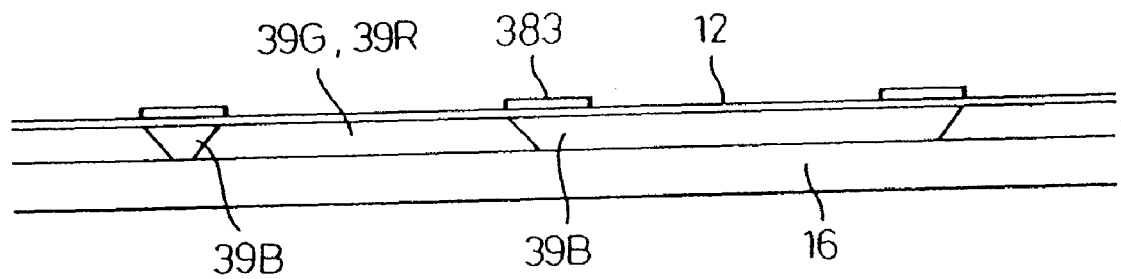
Figure 191:
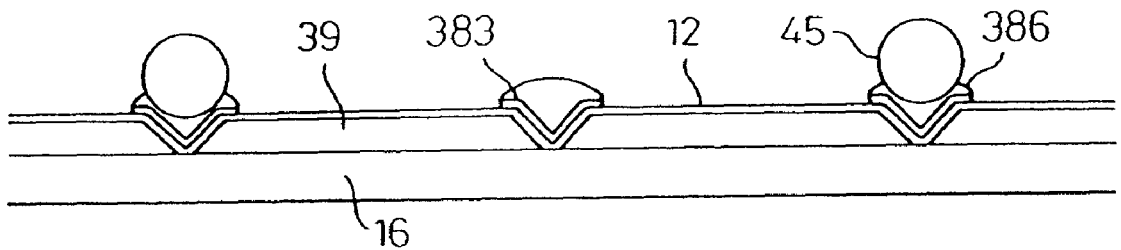
Figure 192:
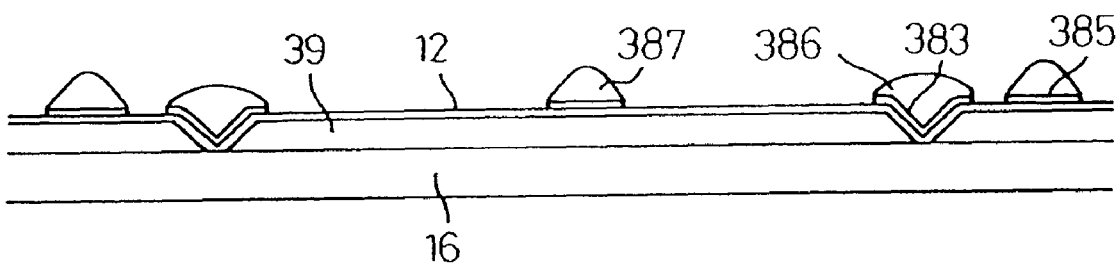
Figure 193:
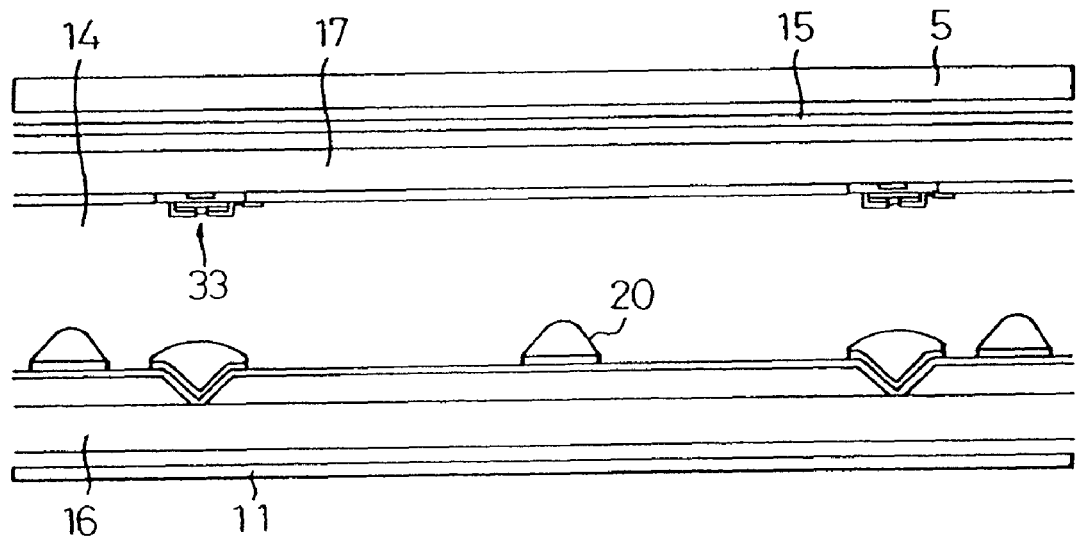
Figure 194:
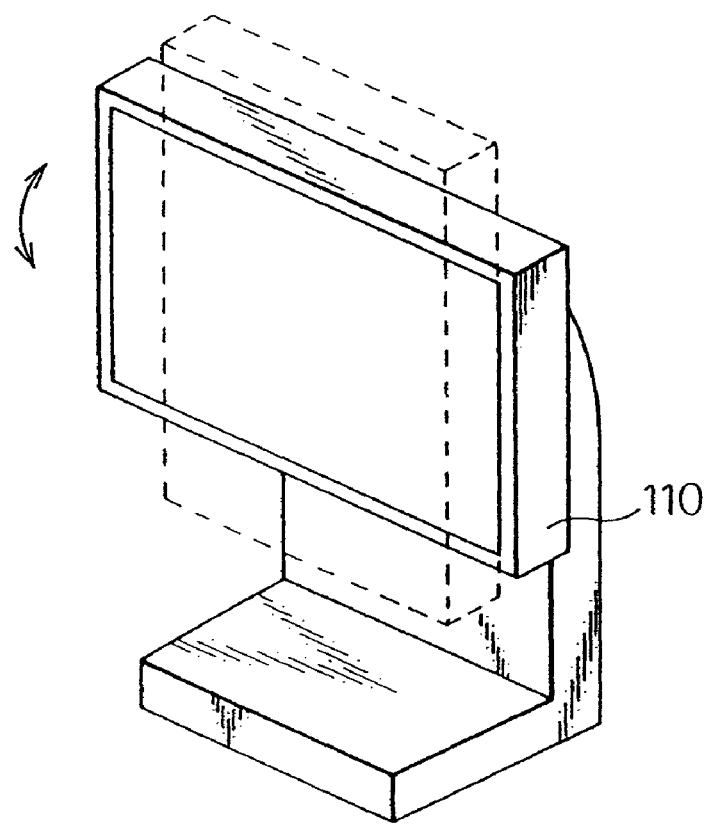
Figure 195:
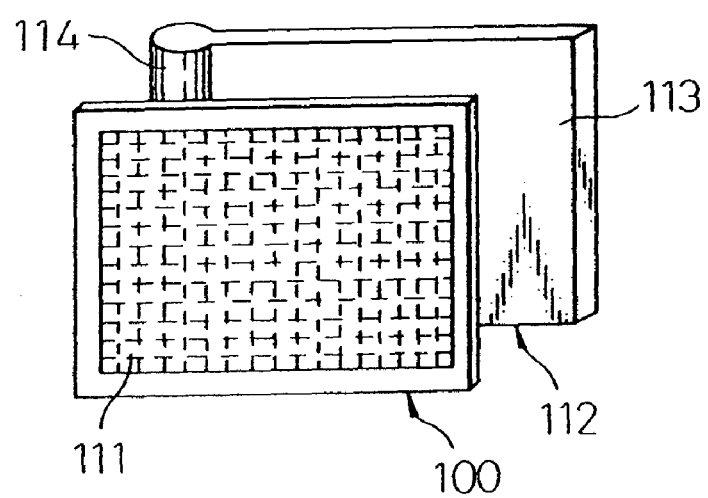
Figure 196A:
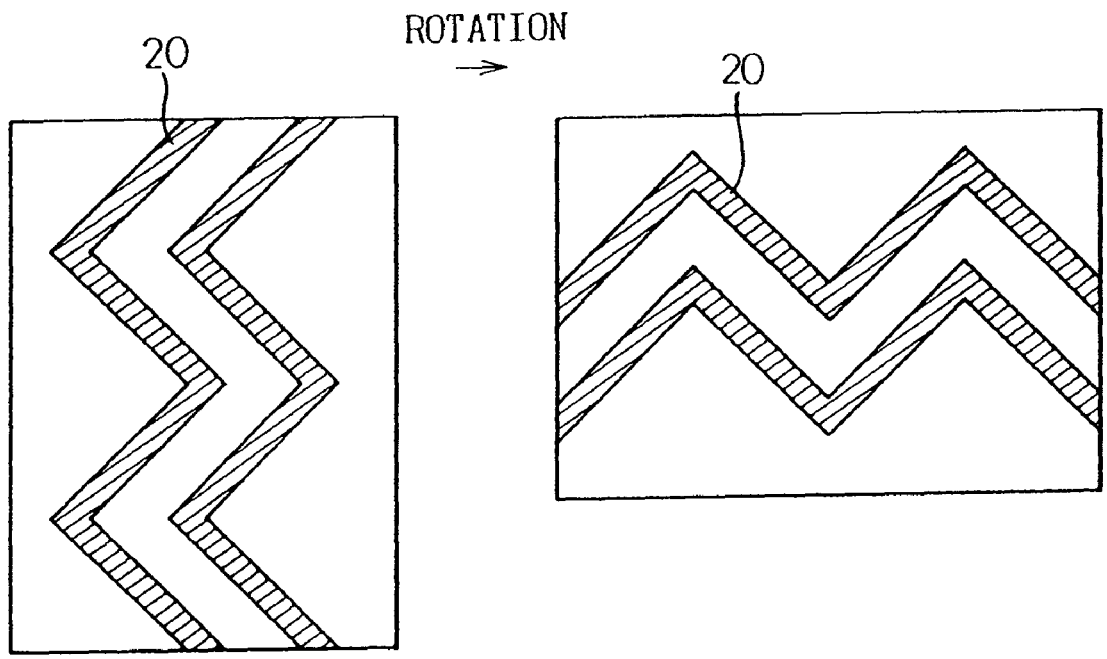
Figure 196B:
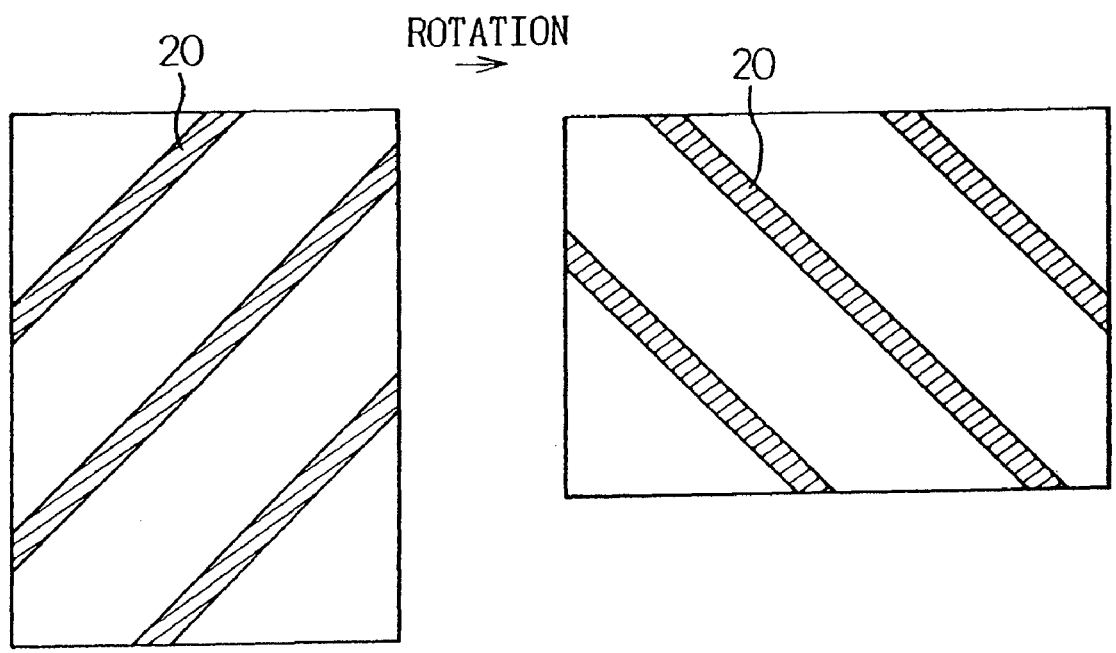
Figure 197:
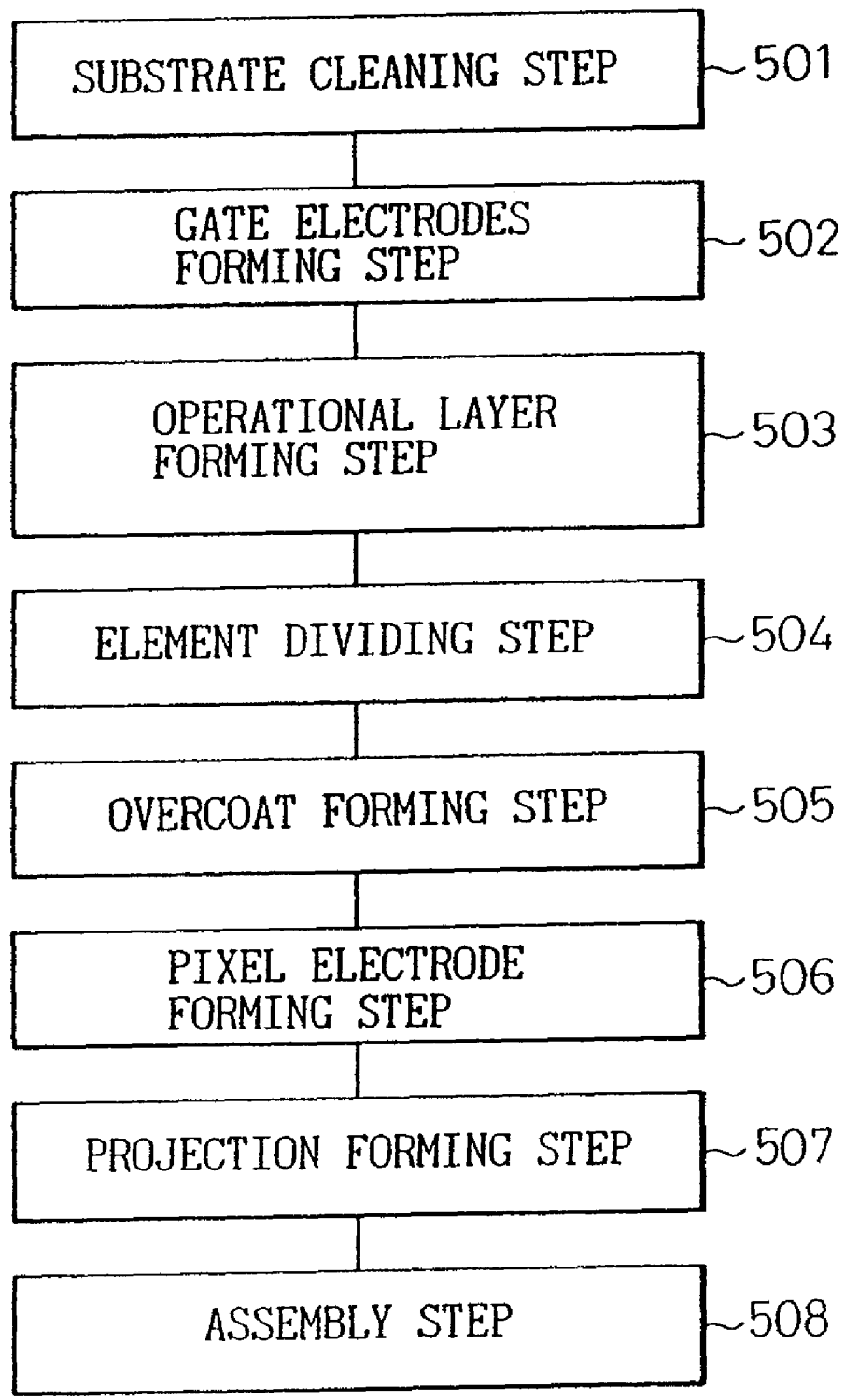
Figure 198:
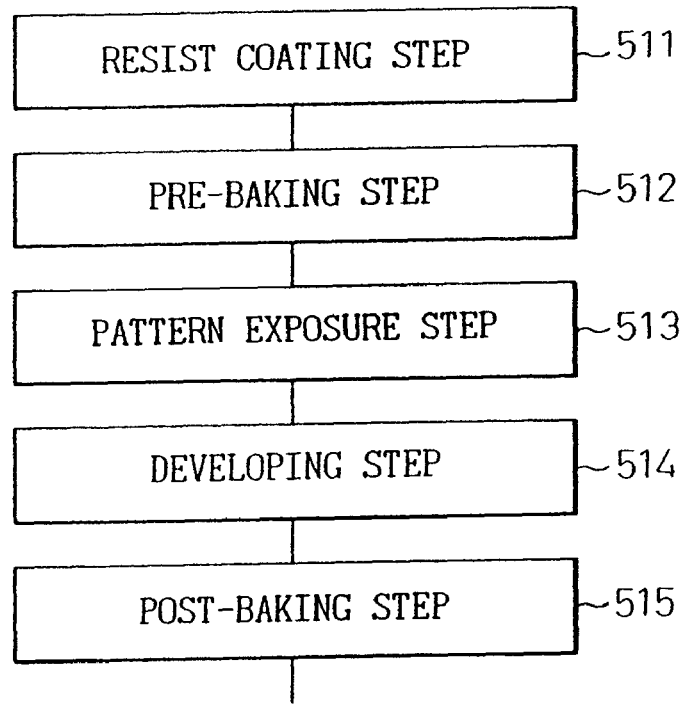
Figure 199:
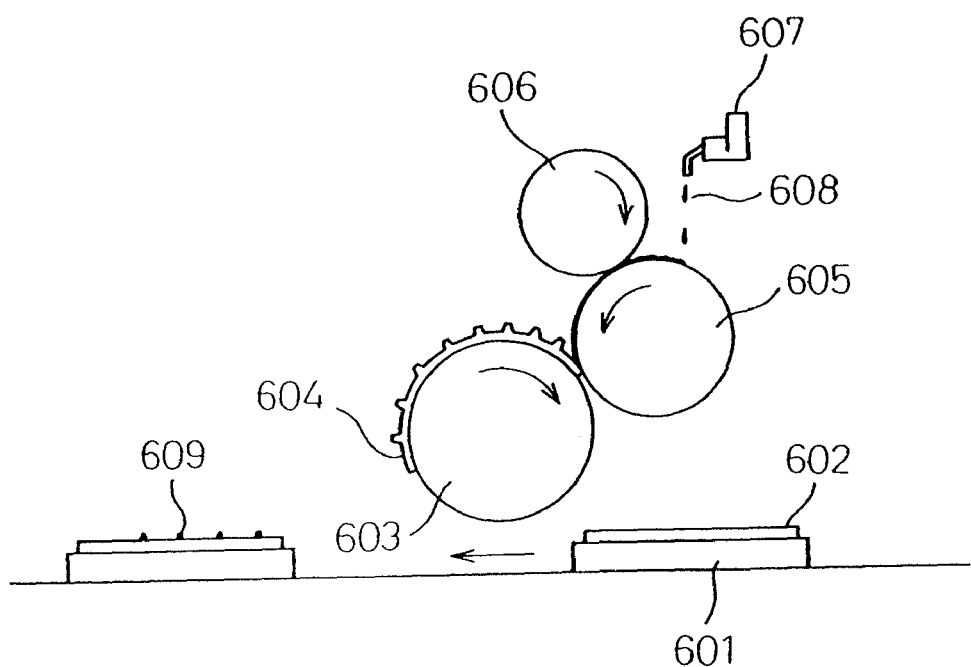
Figure 201A:
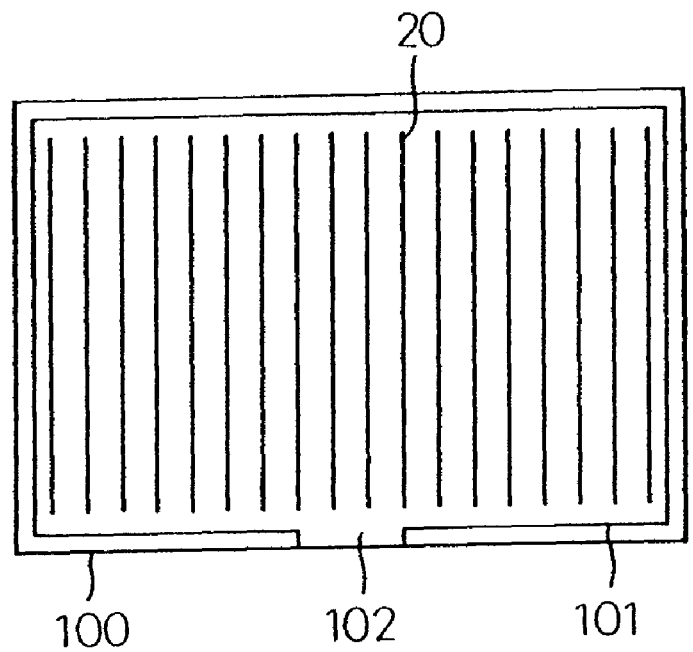
Figure 201B:
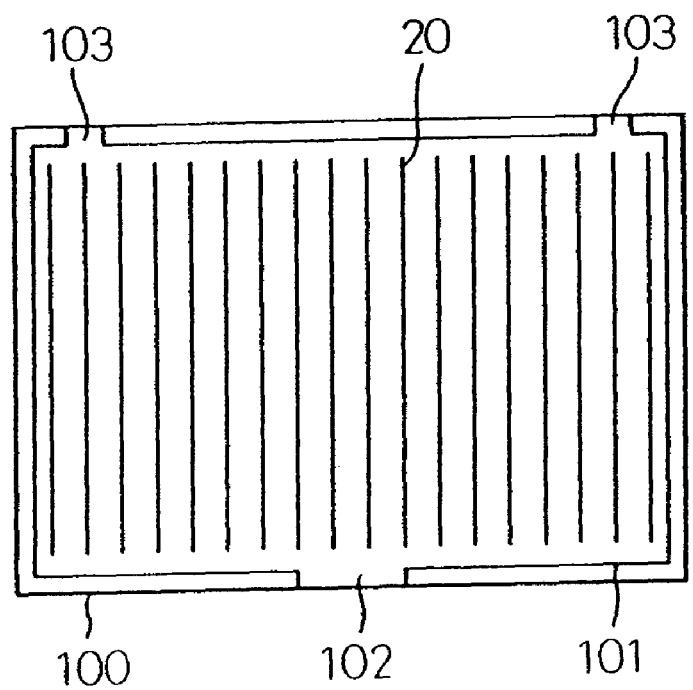
Figure 202A:
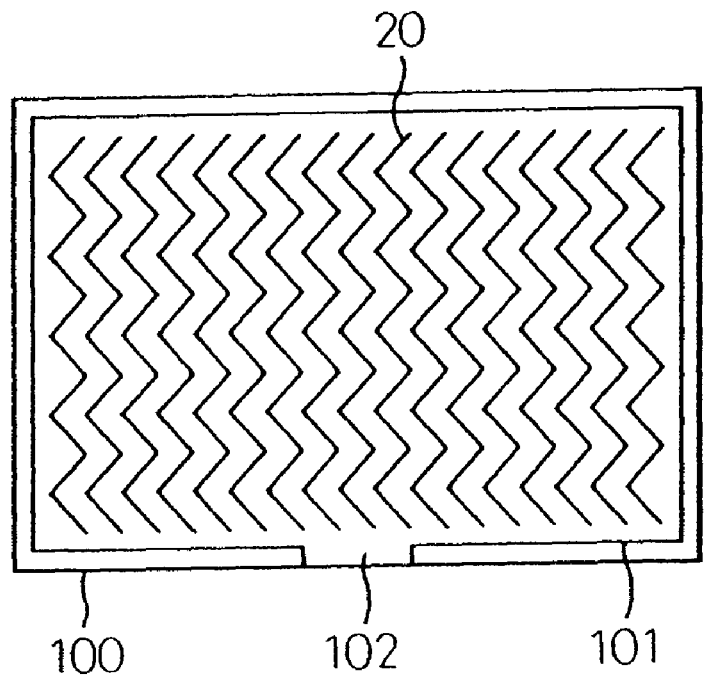
Figure 202B:
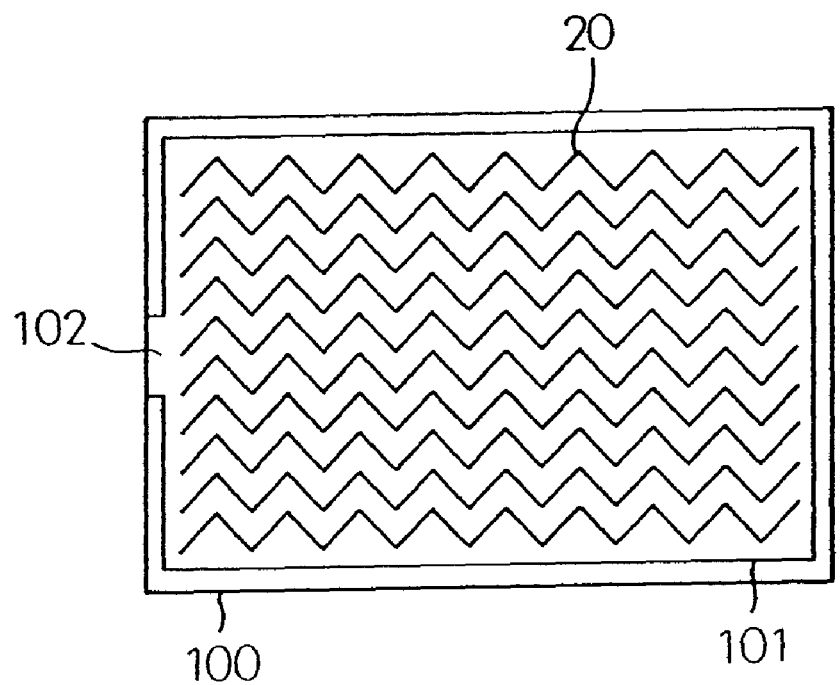
Figure 203A:
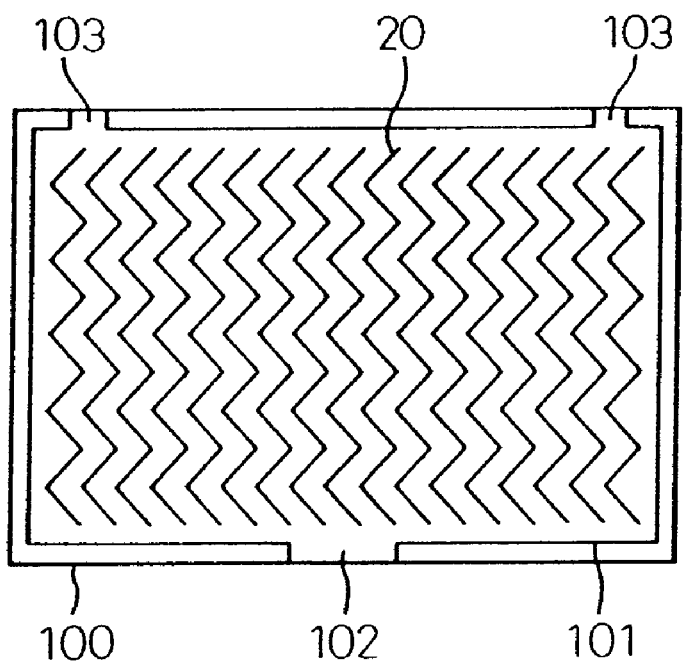
Figure 203B:
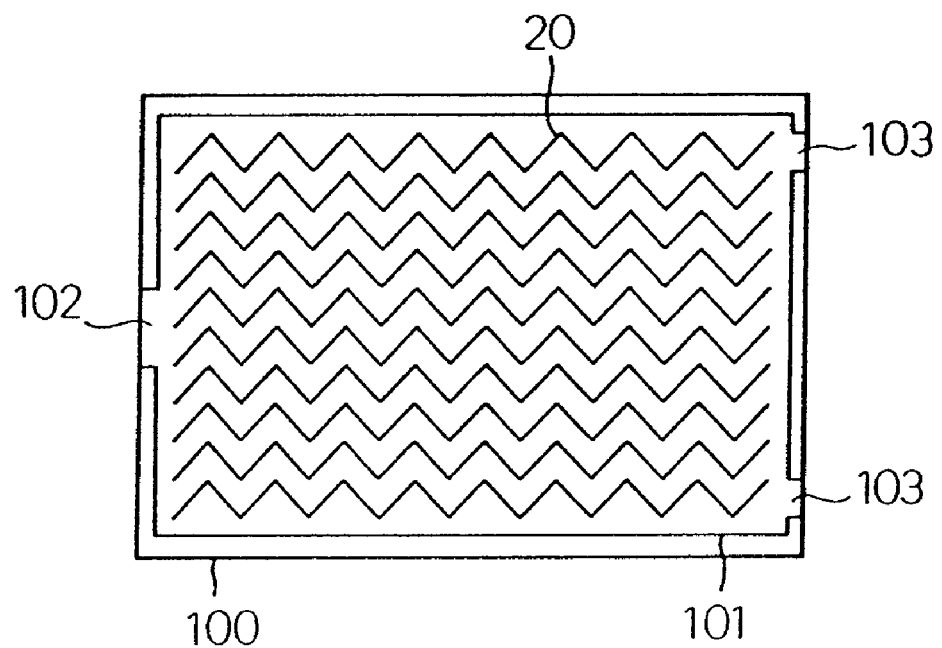
Figure 204:
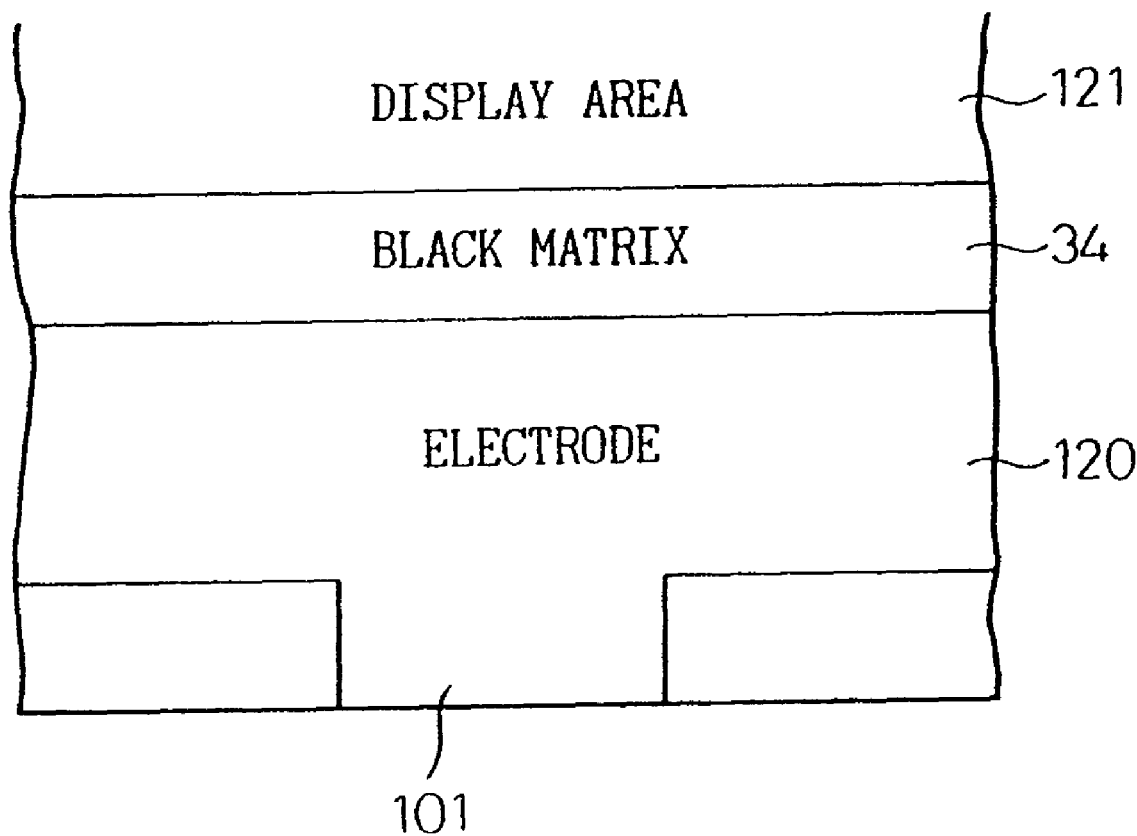
Figure 205A:
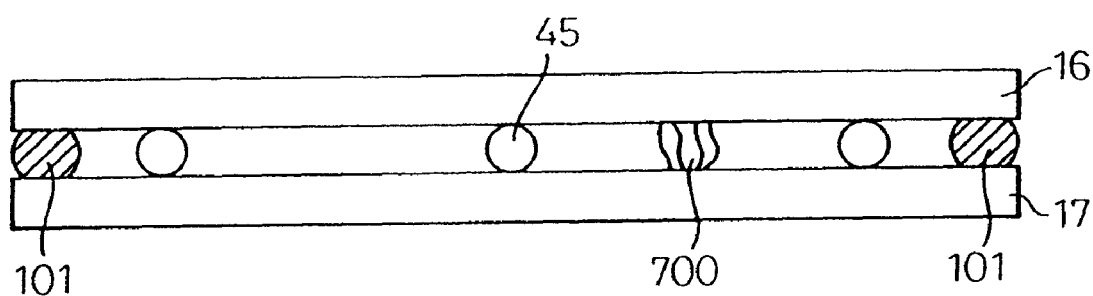
Figure 205B:
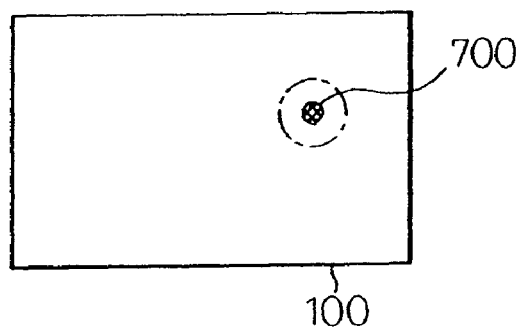
Figure 205C:
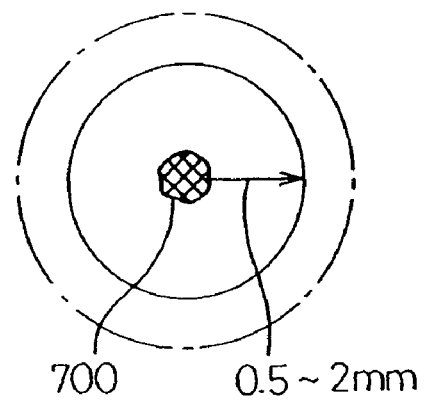
Figure 206:
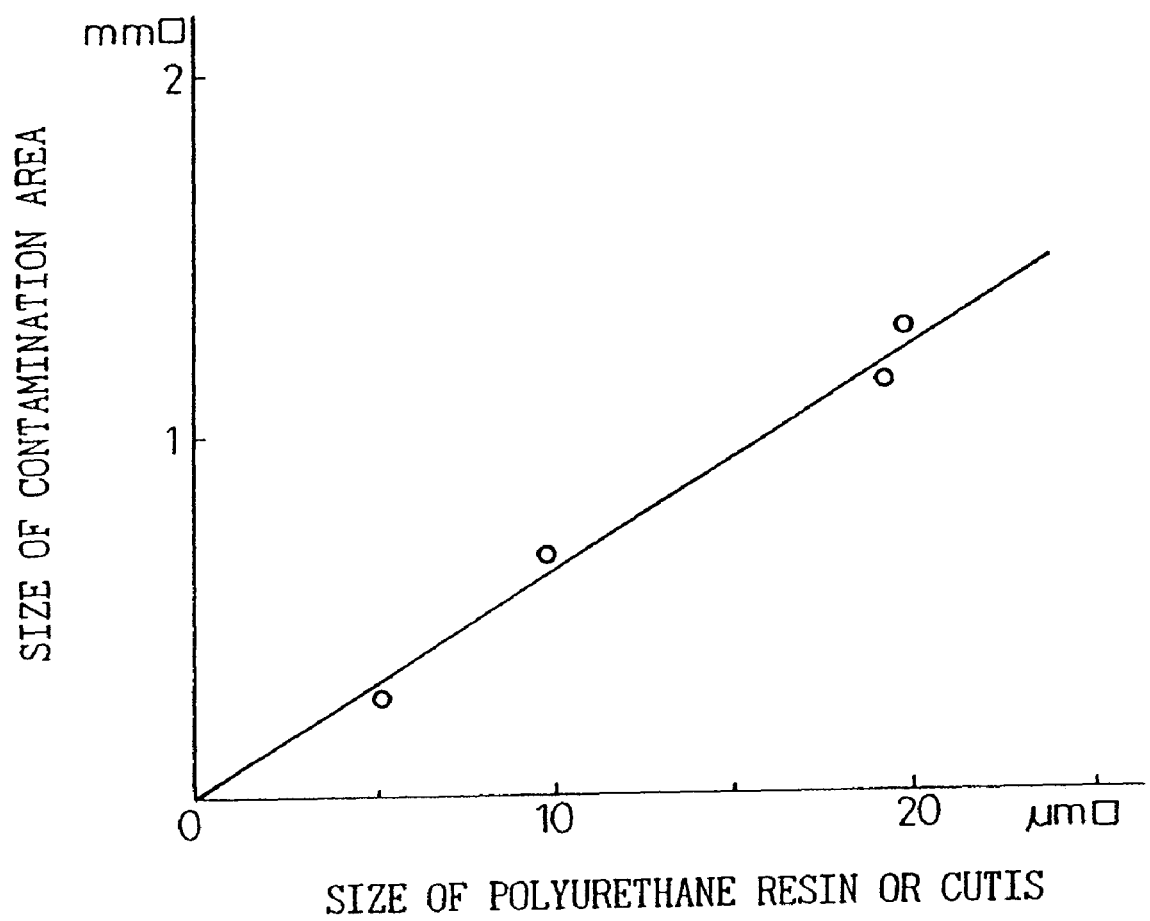
Figure 207:
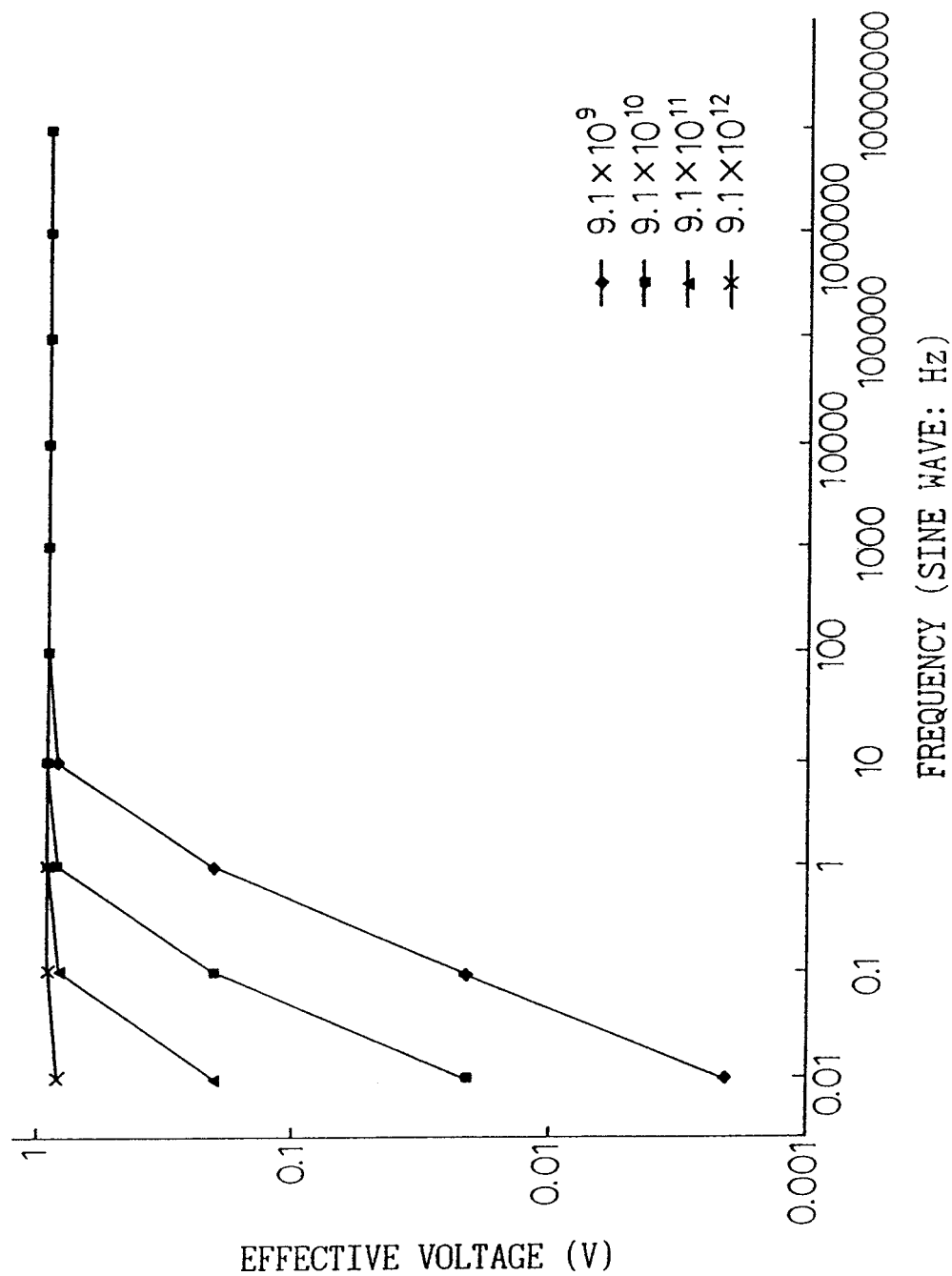
Figure 208:
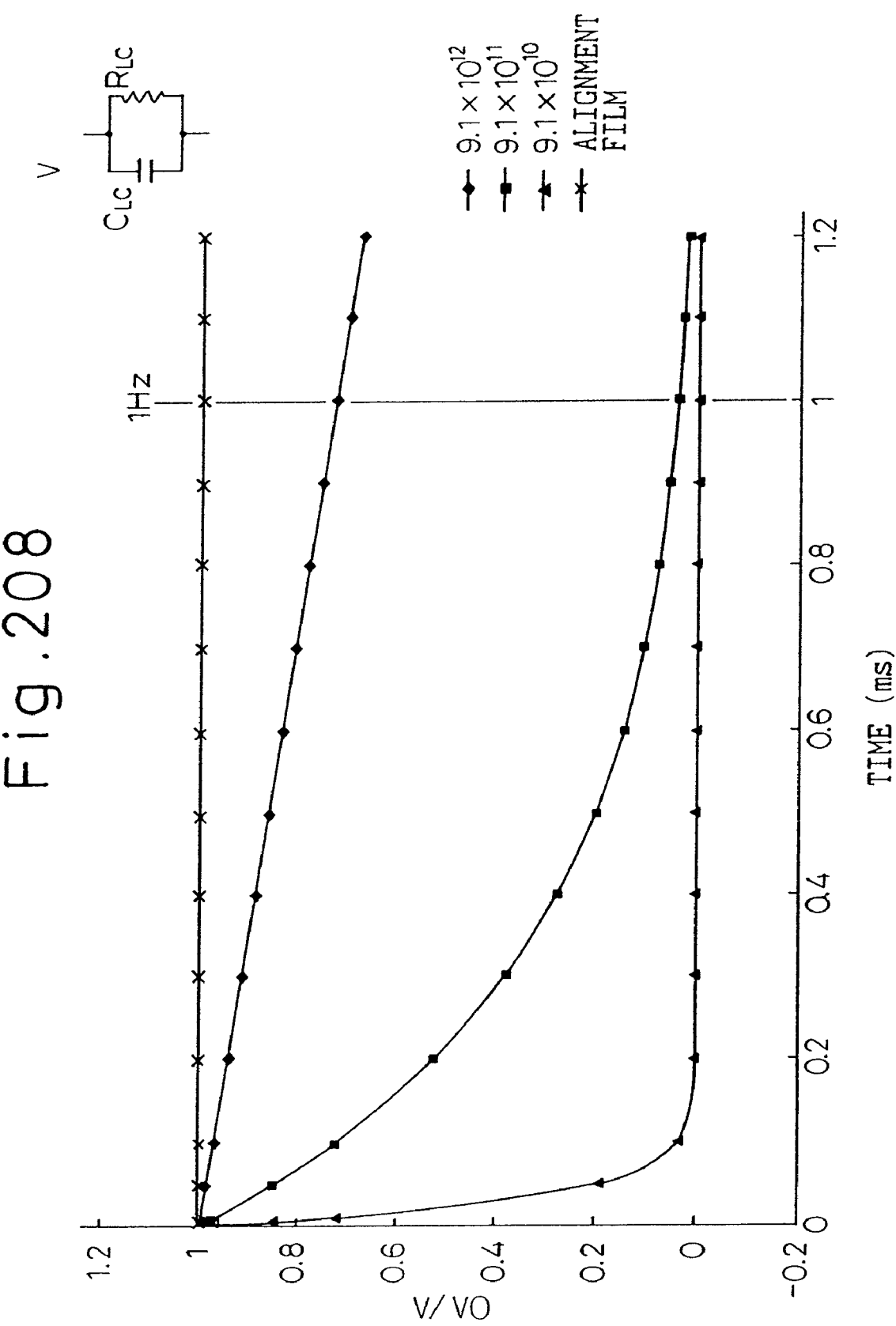
Figure 209:
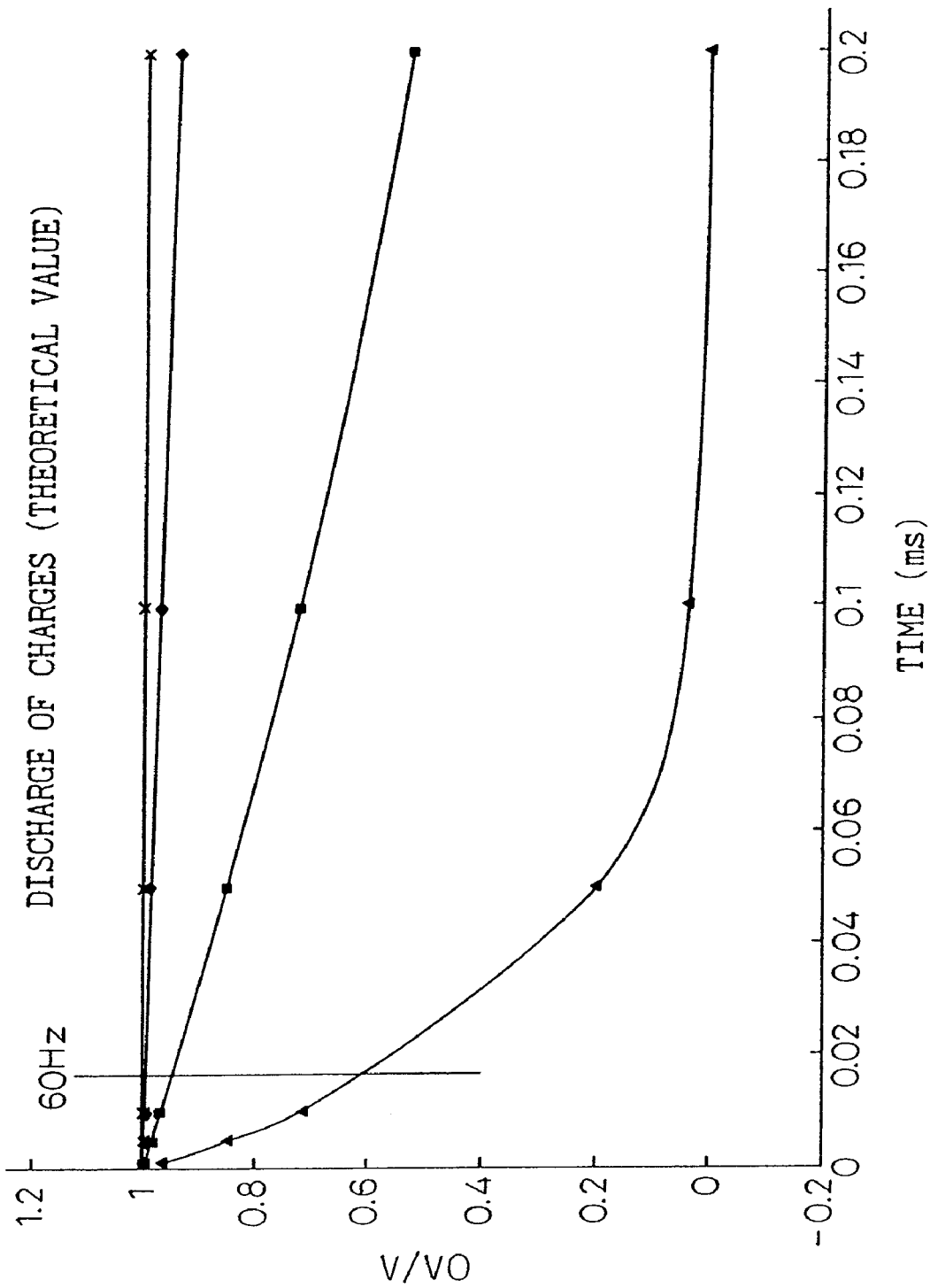
Figure 211:
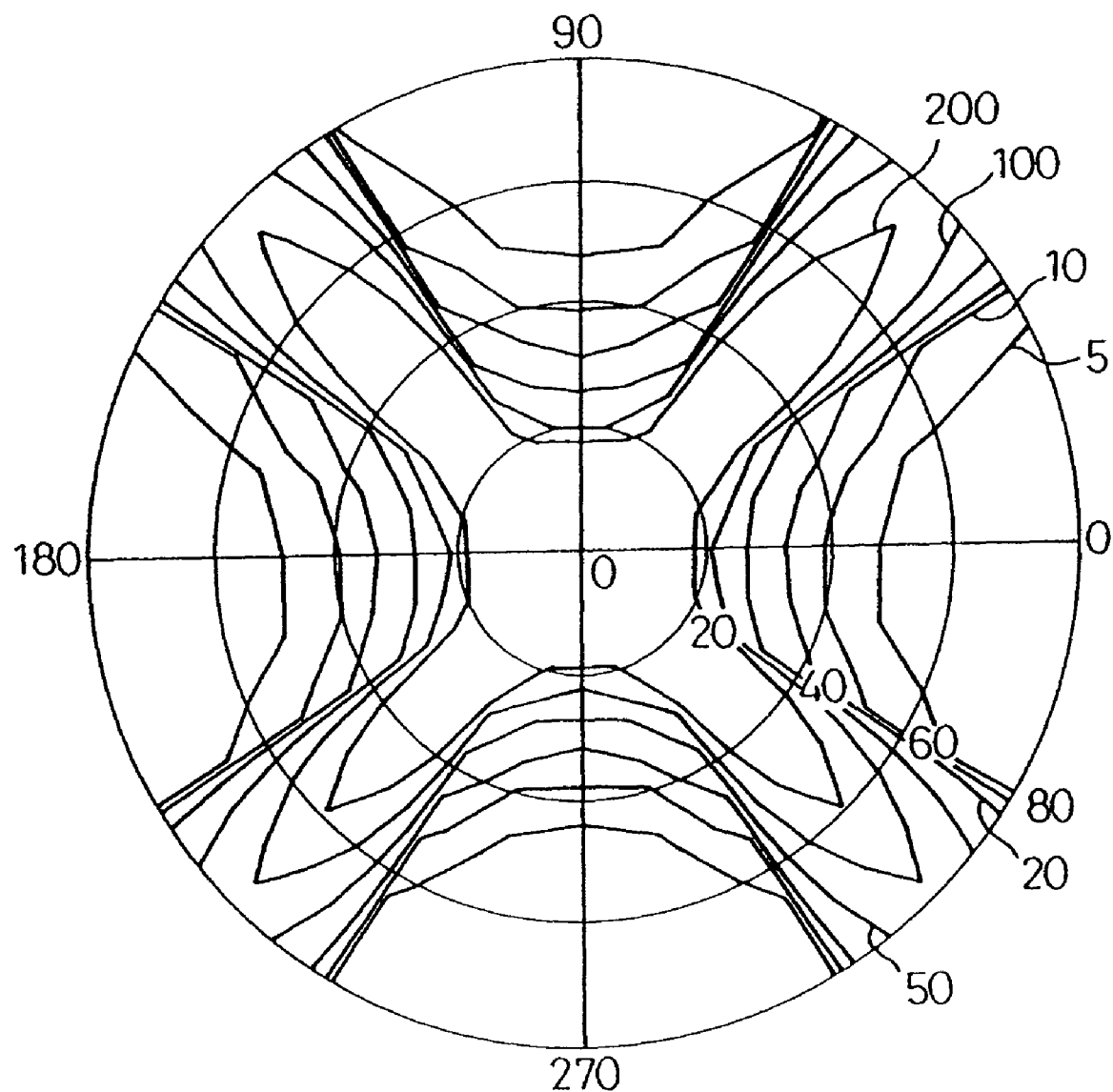
Figure 212:
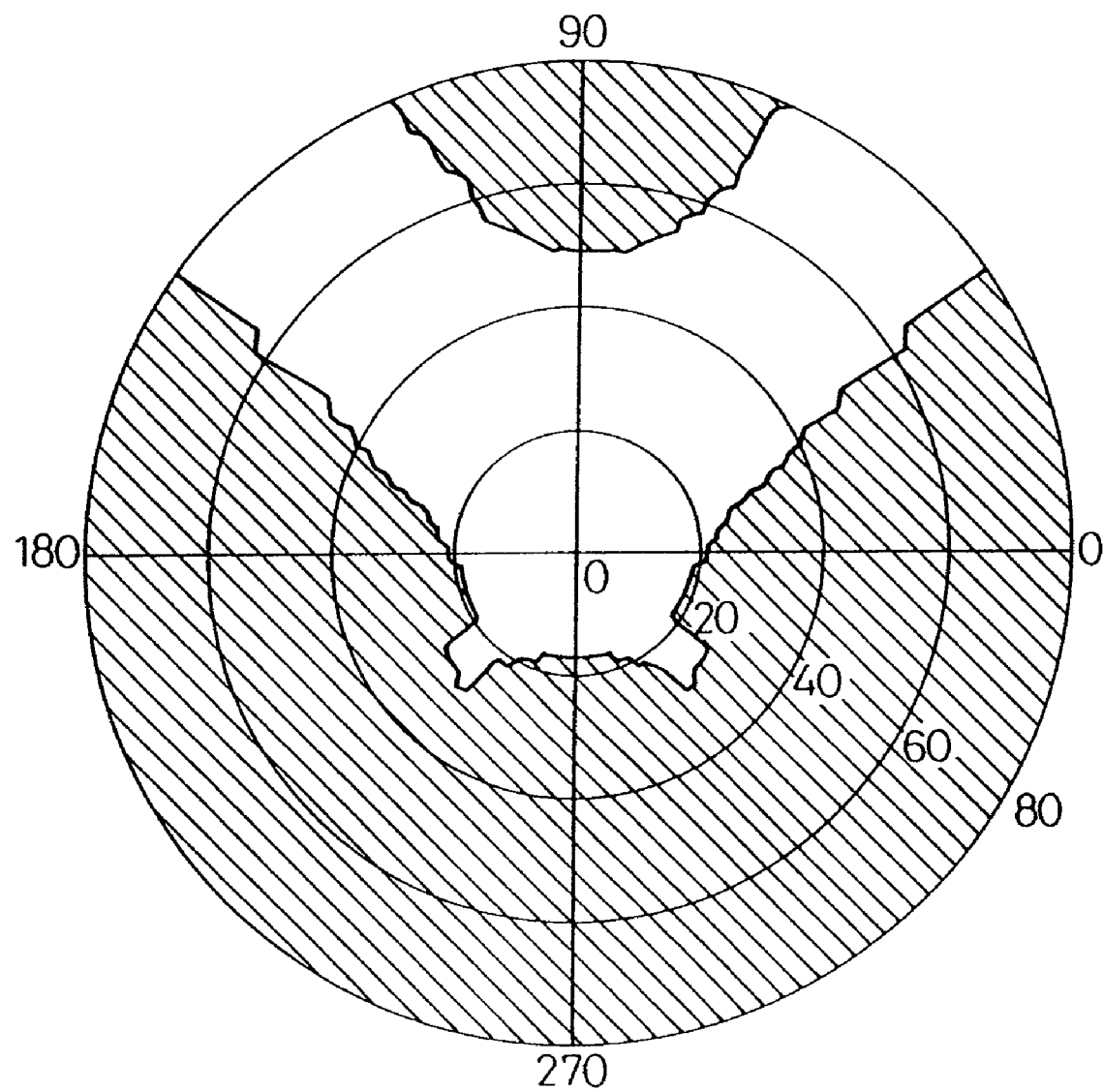
Figure 213:
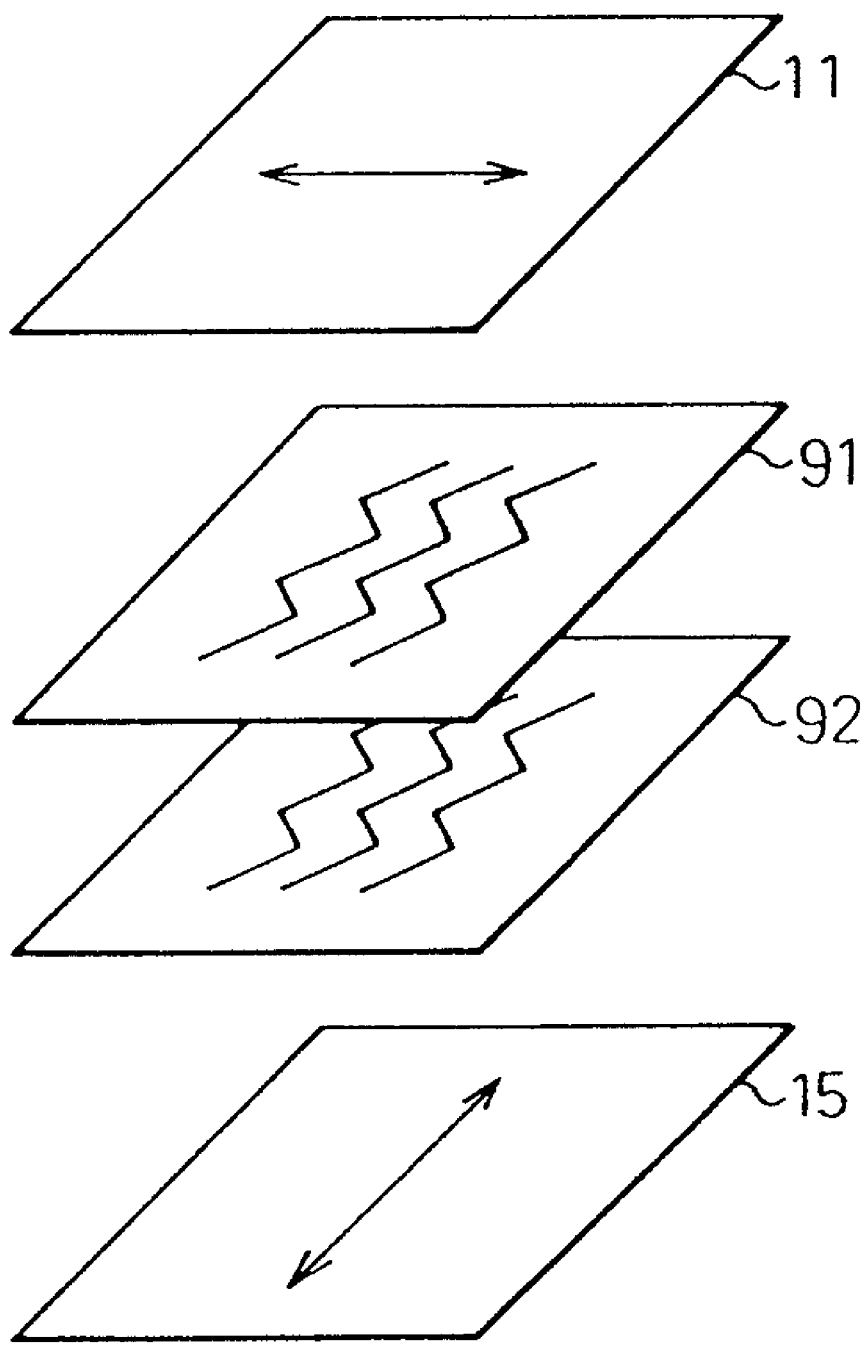
Figure 214:
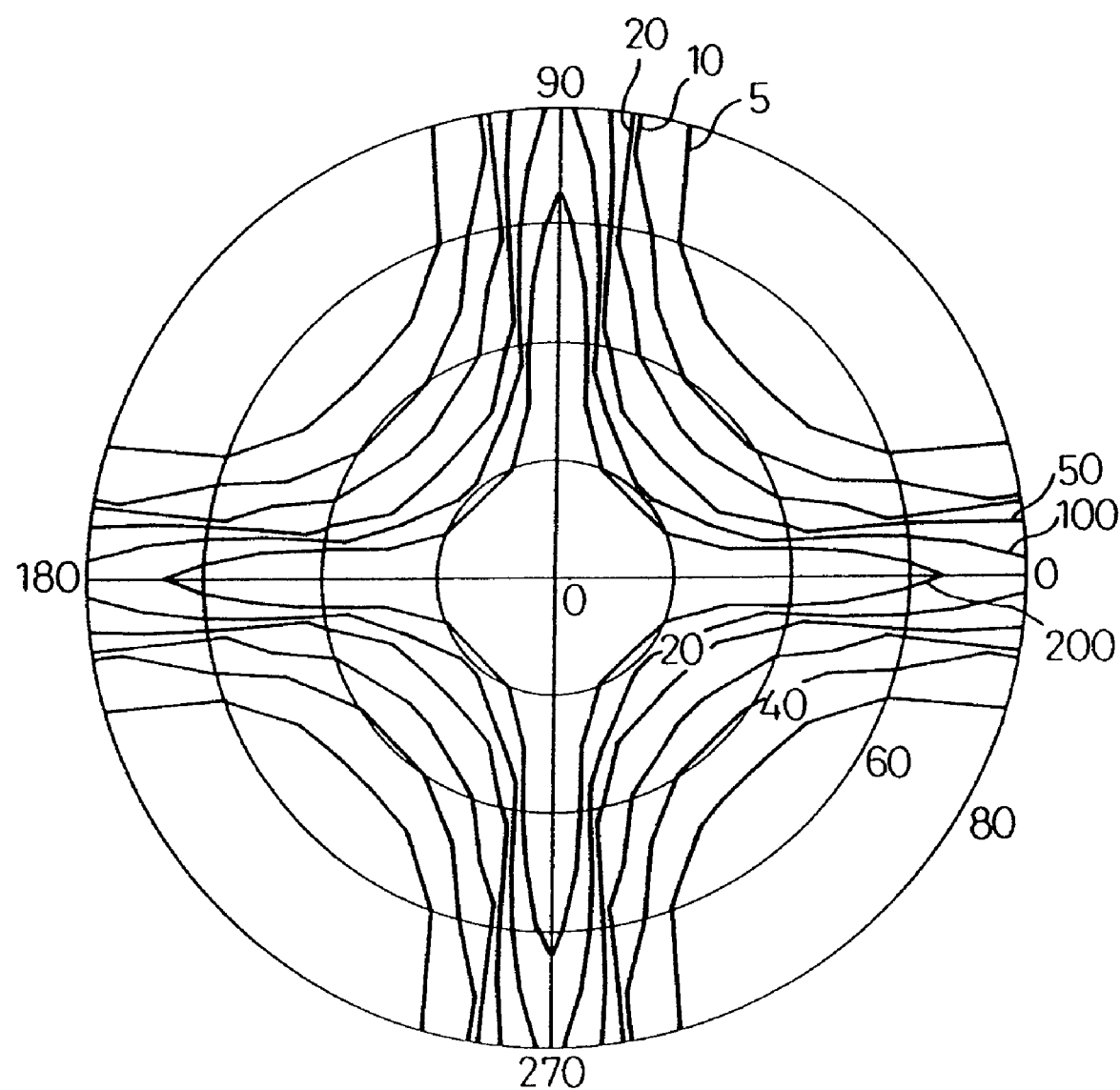
Figure 215:
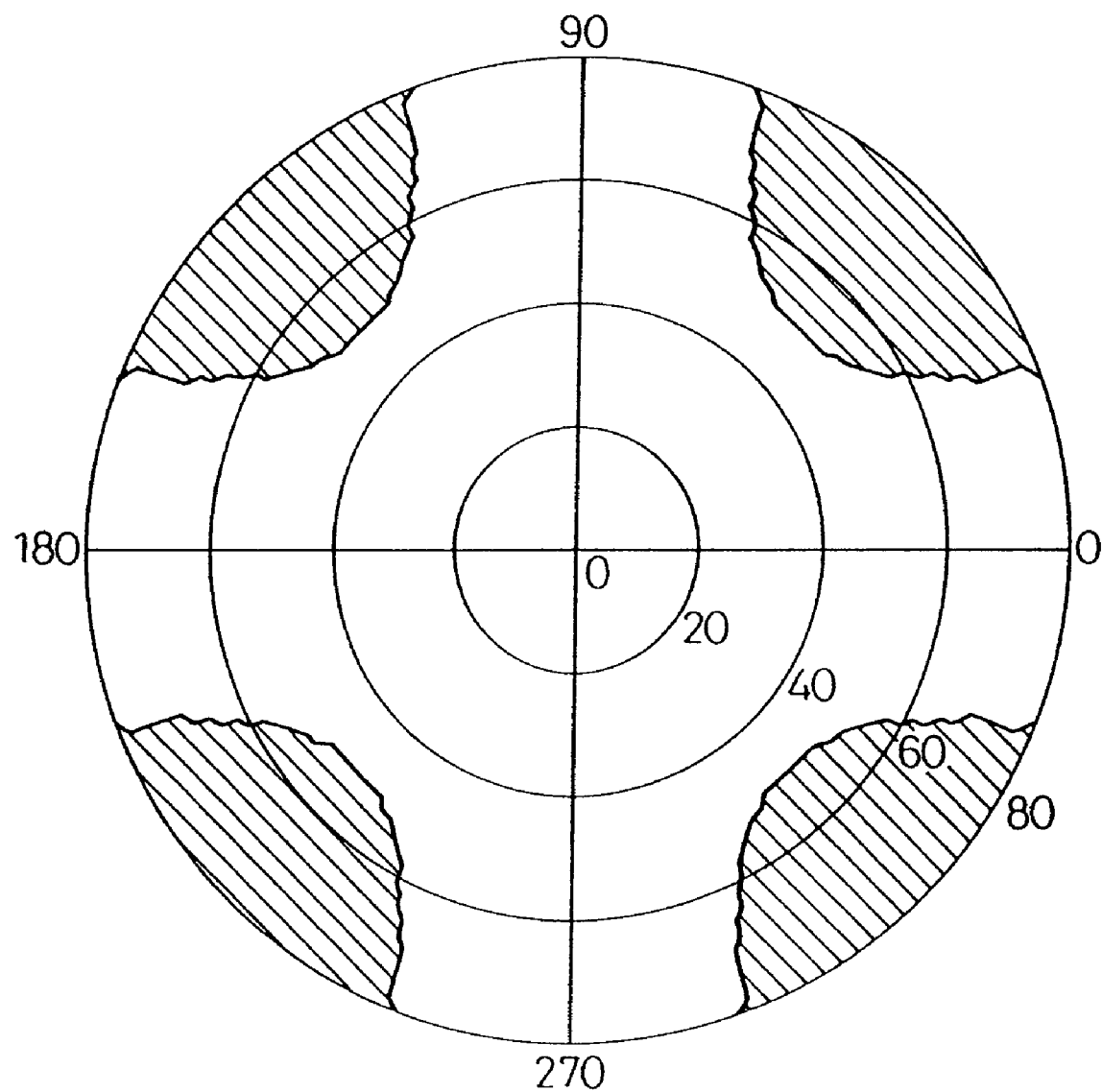
Figure 216:
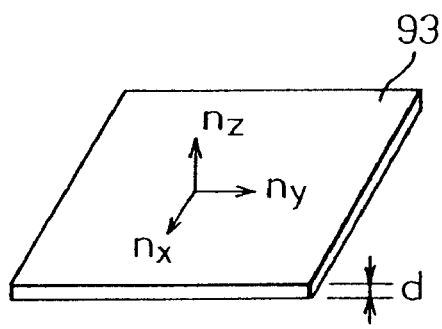
Figure 217:
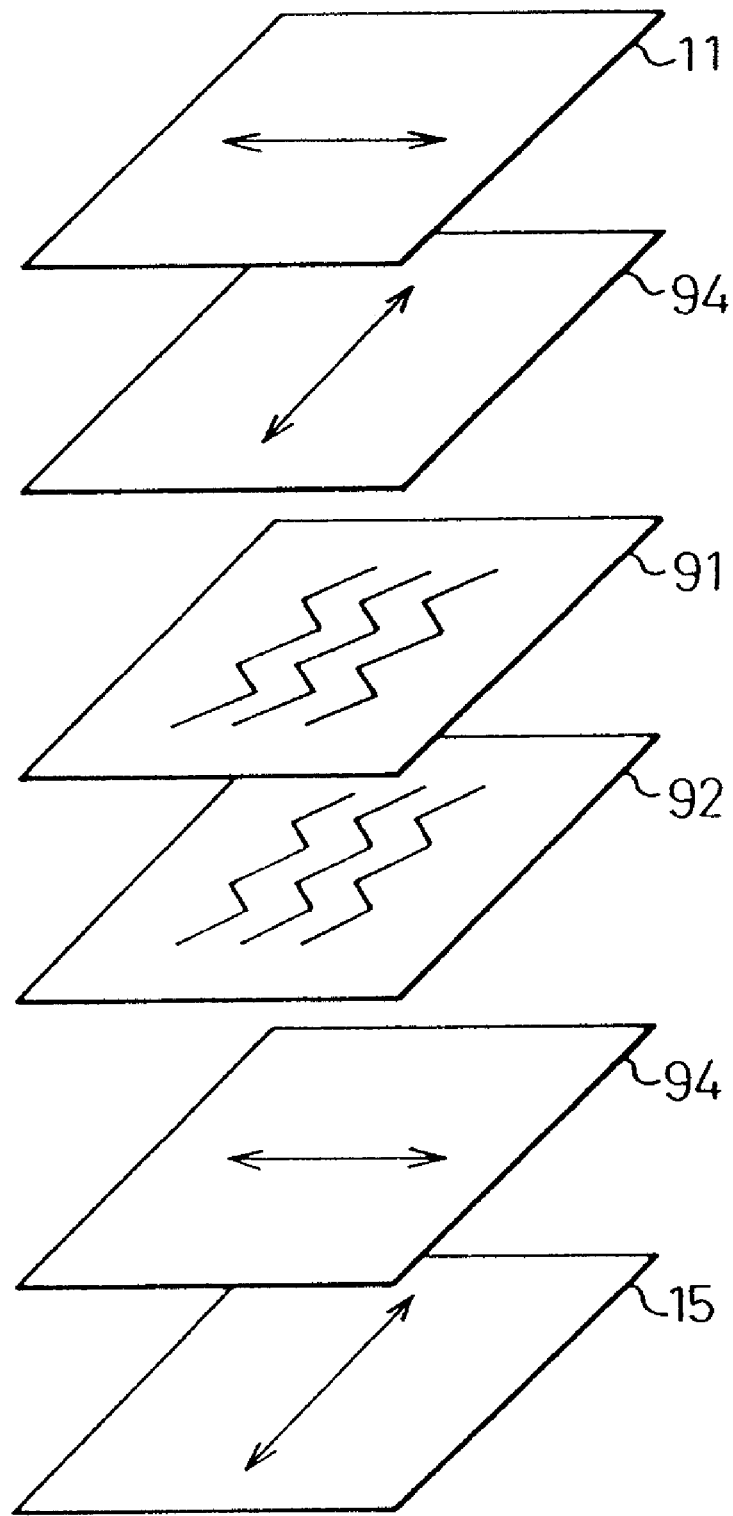
Figure 218:
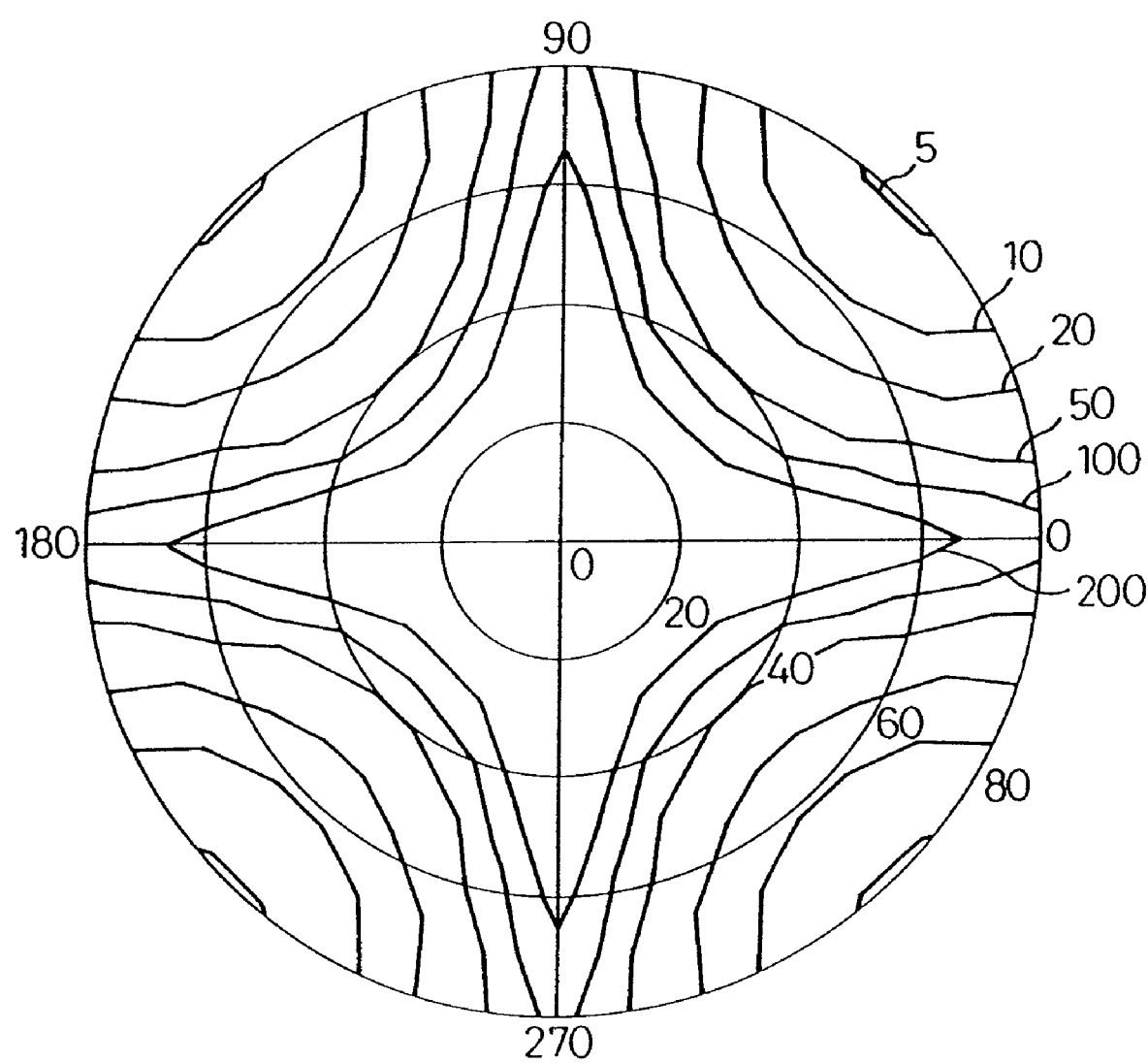
Figure 219:
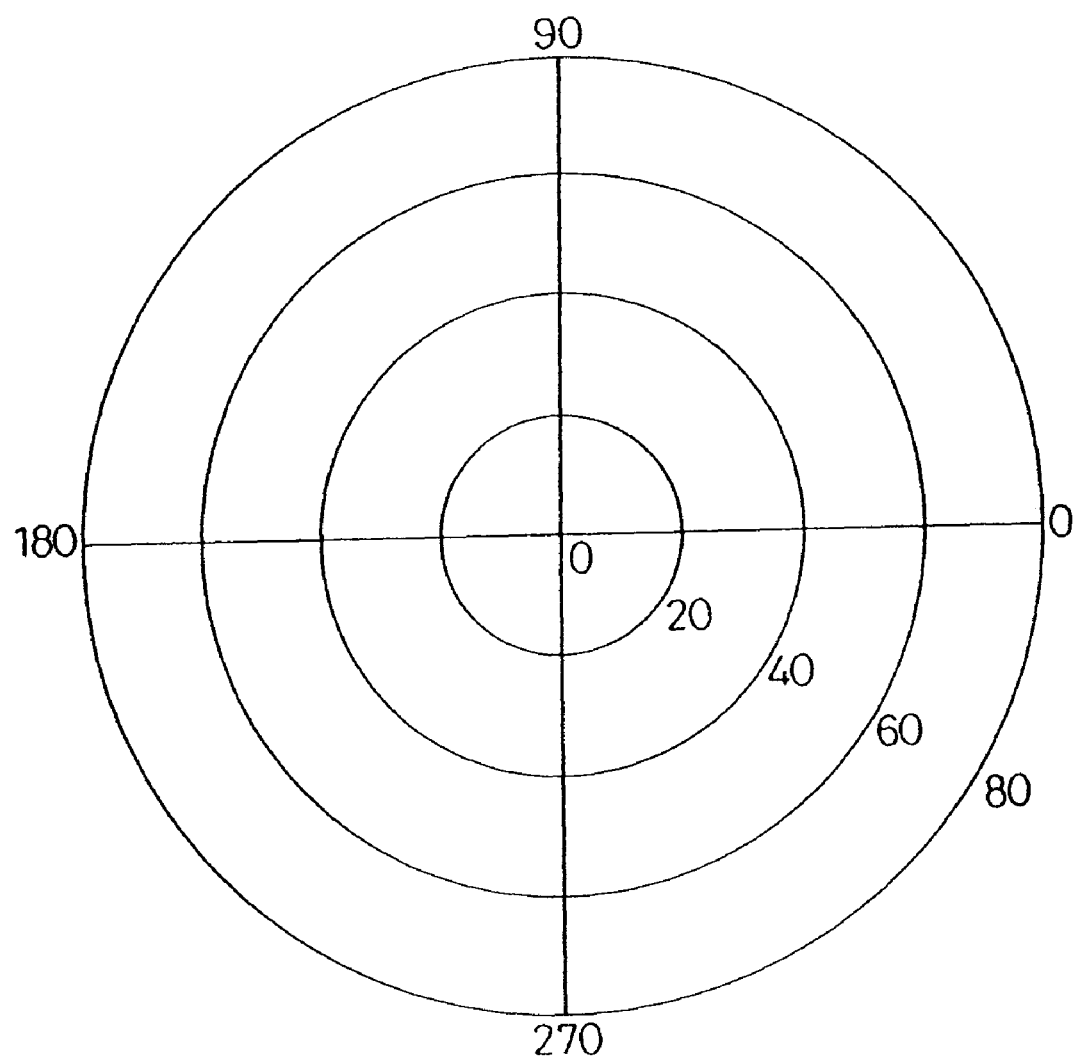
Figure 220:
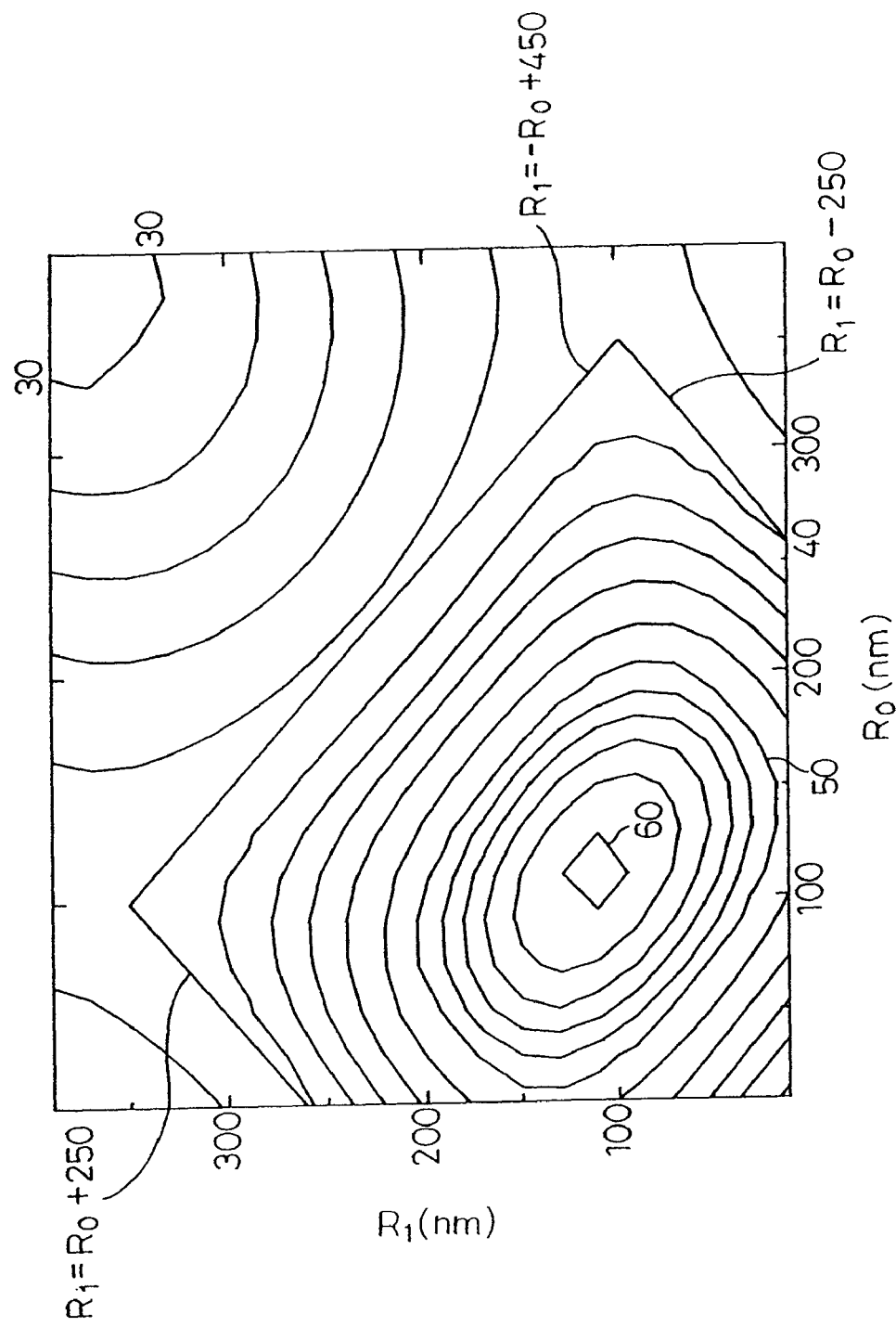
Figure 222:
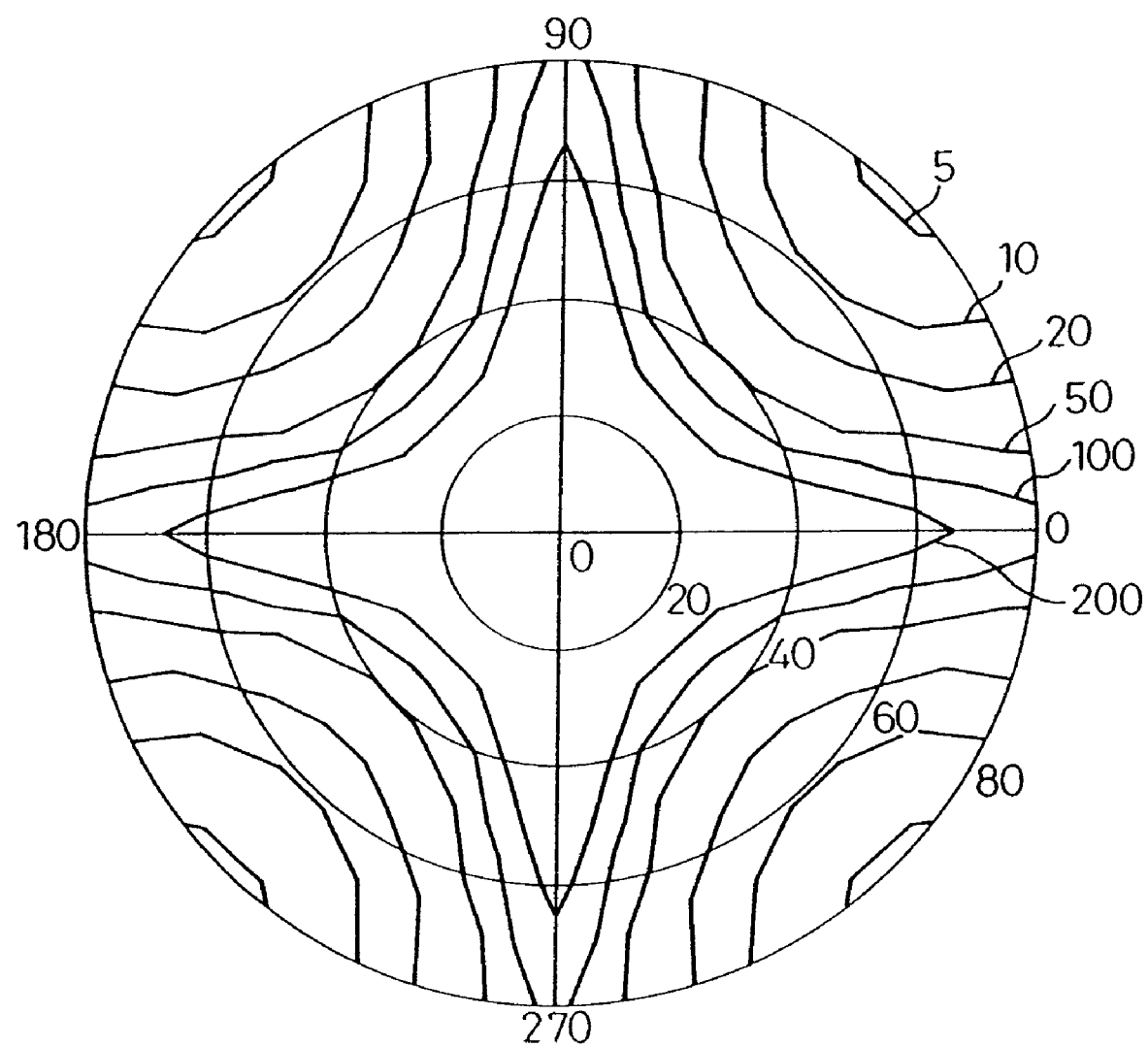
Figure 223:
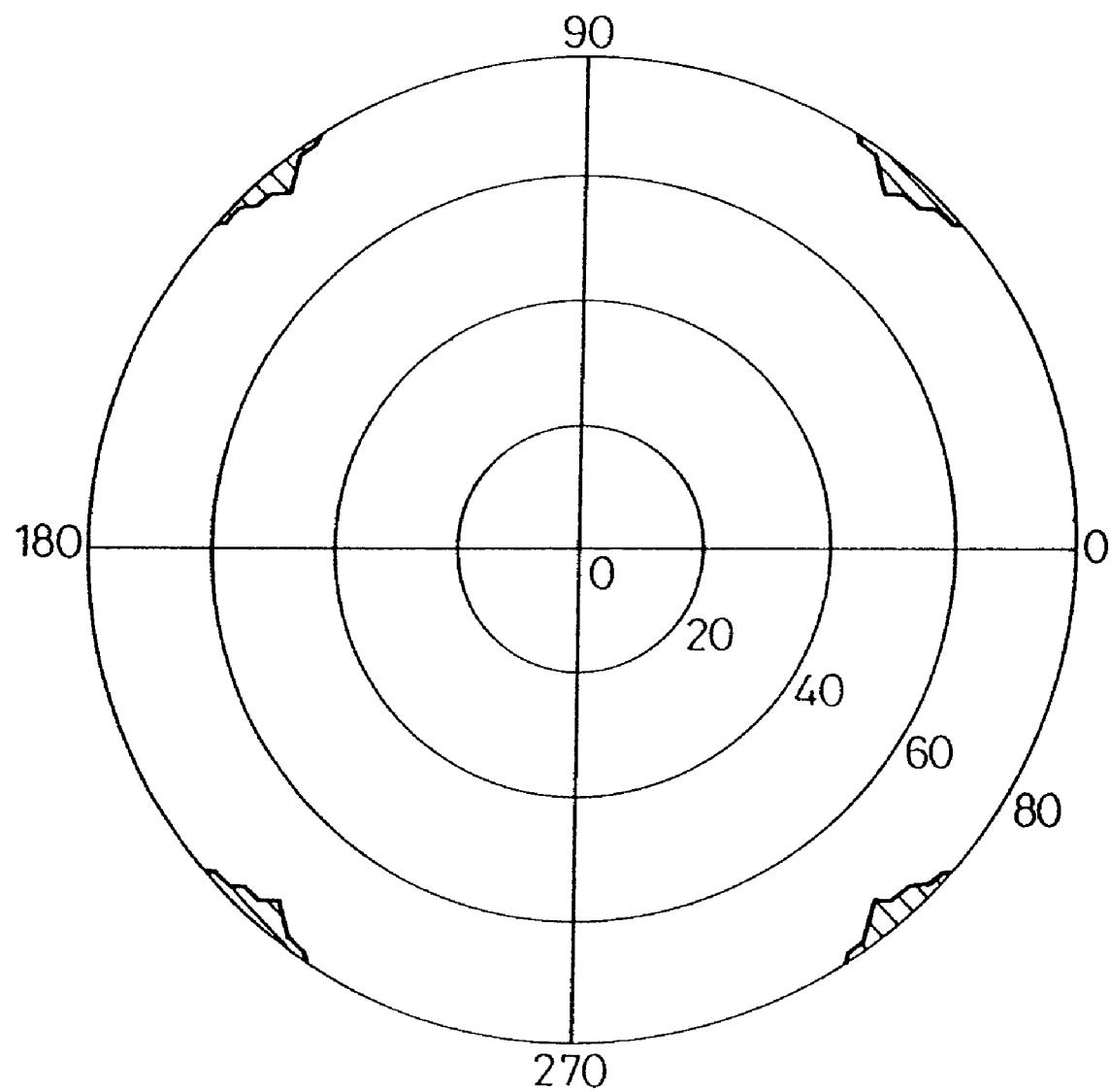
Figure 224:
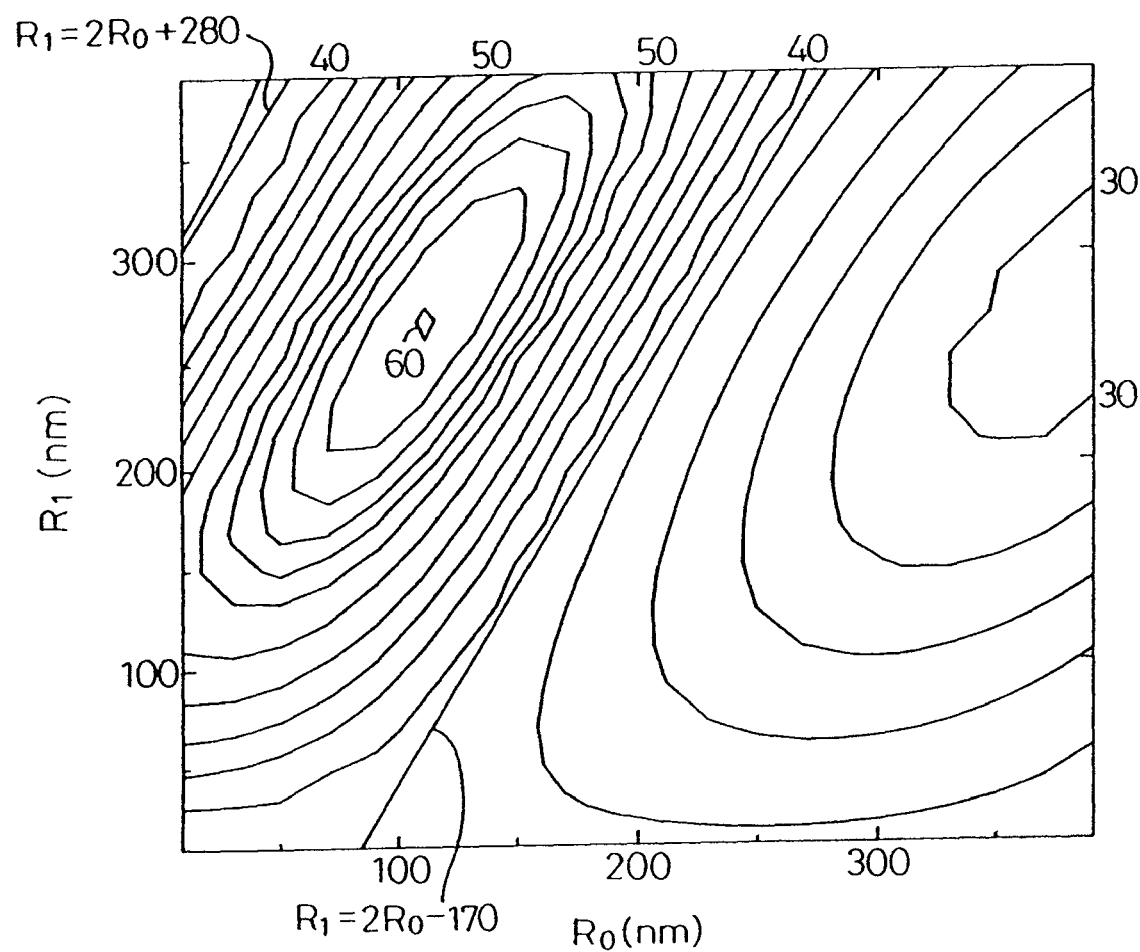
Figure 225:
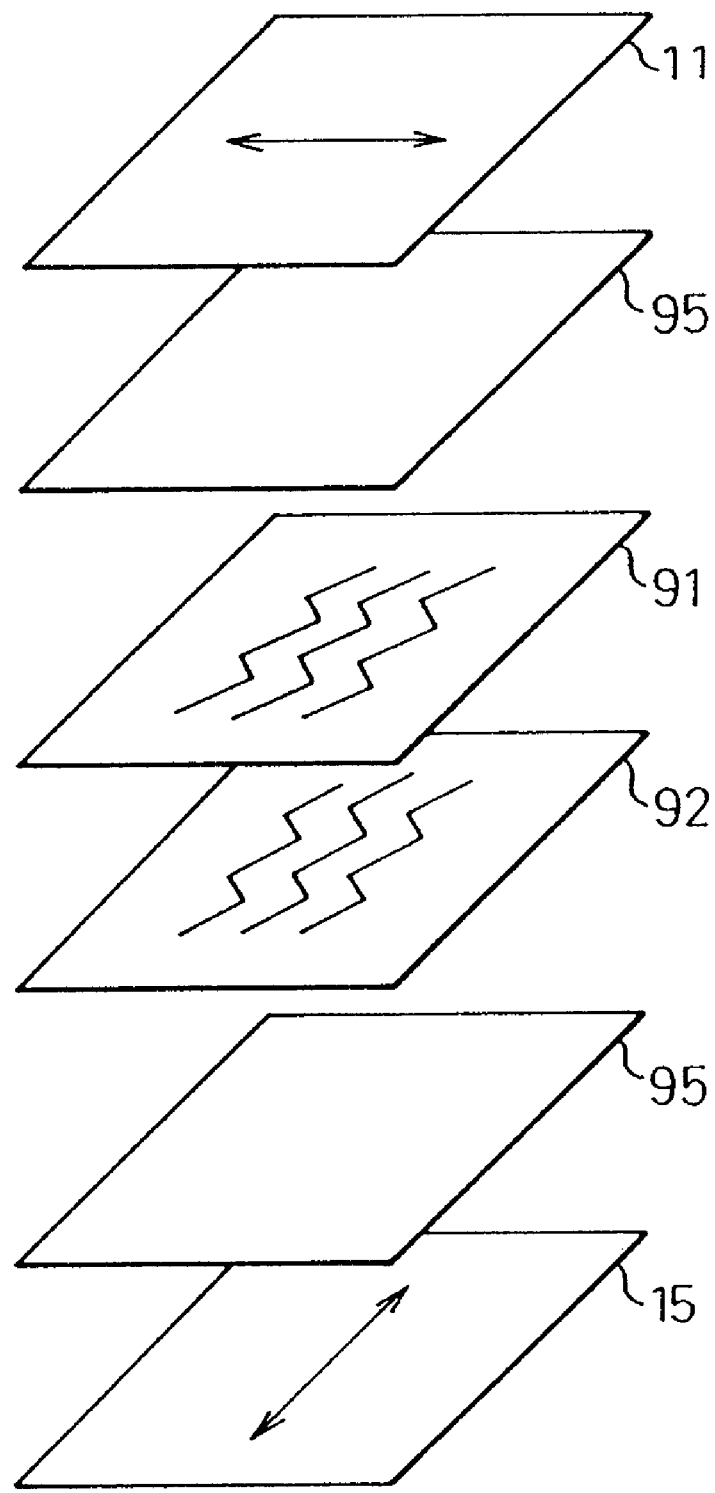
Figure 226:
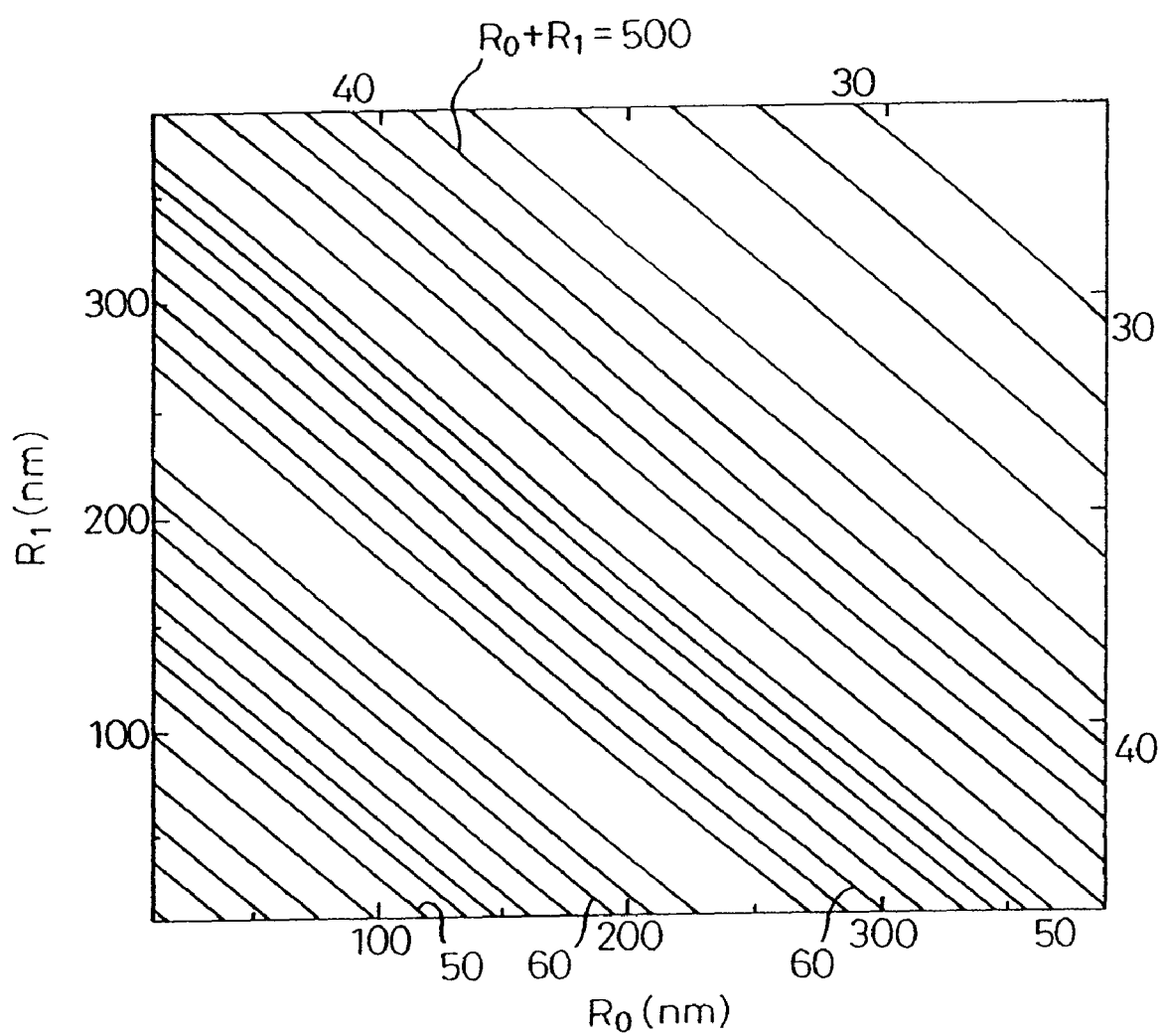
Figure 227:
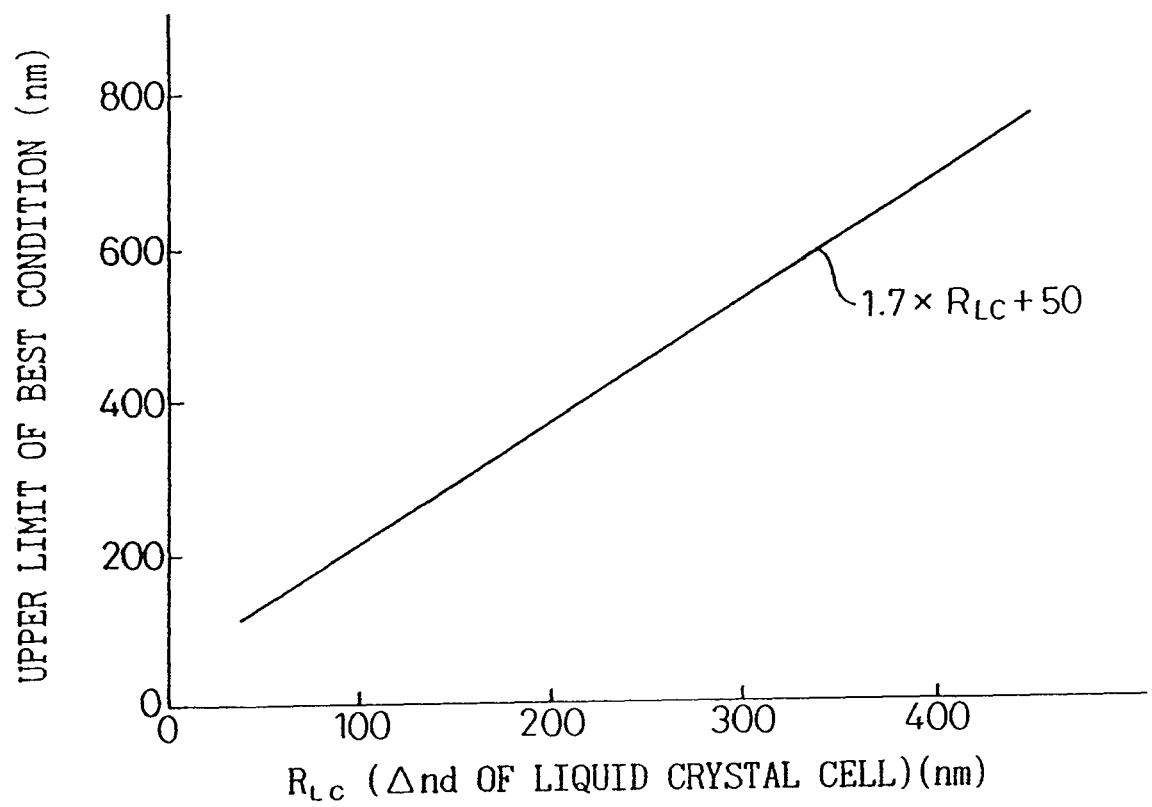
Figure 228:
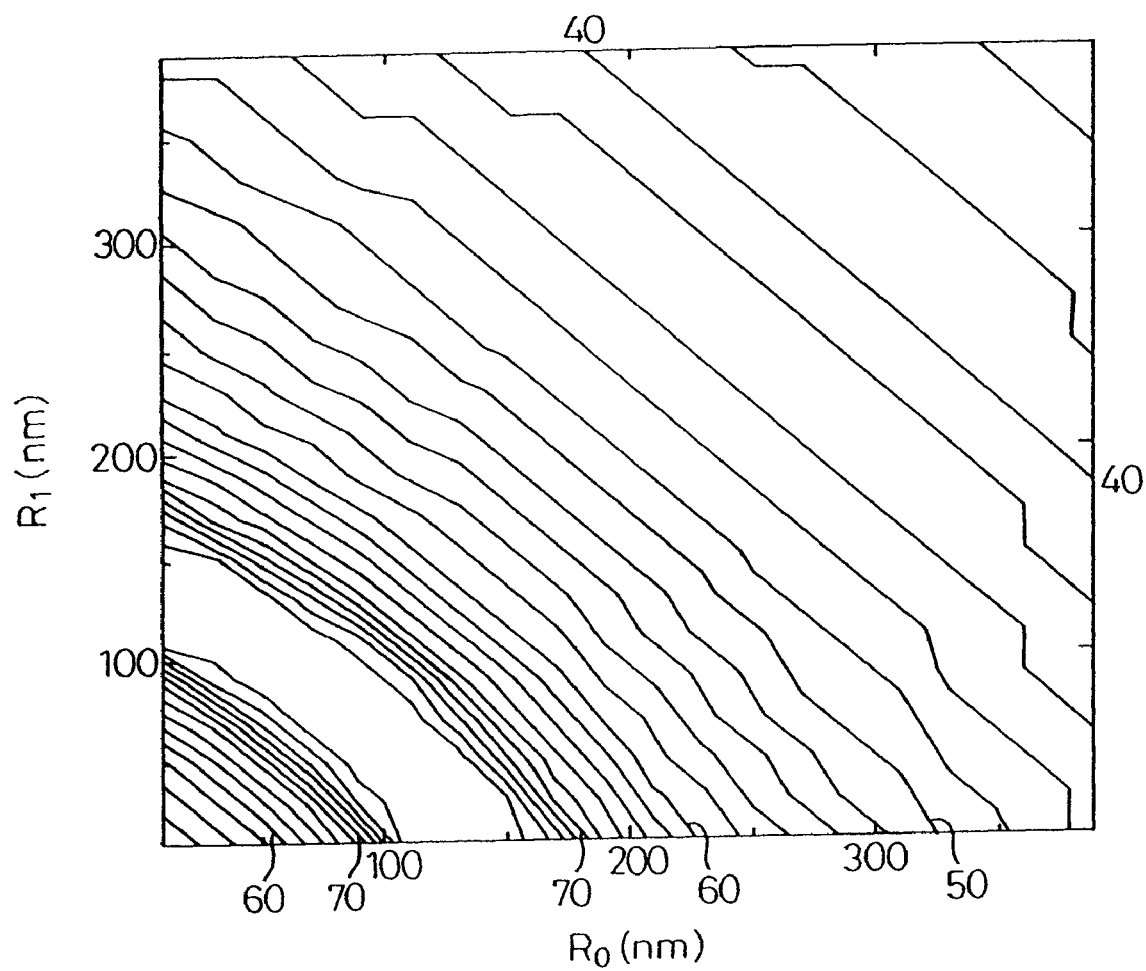
Figure 229:
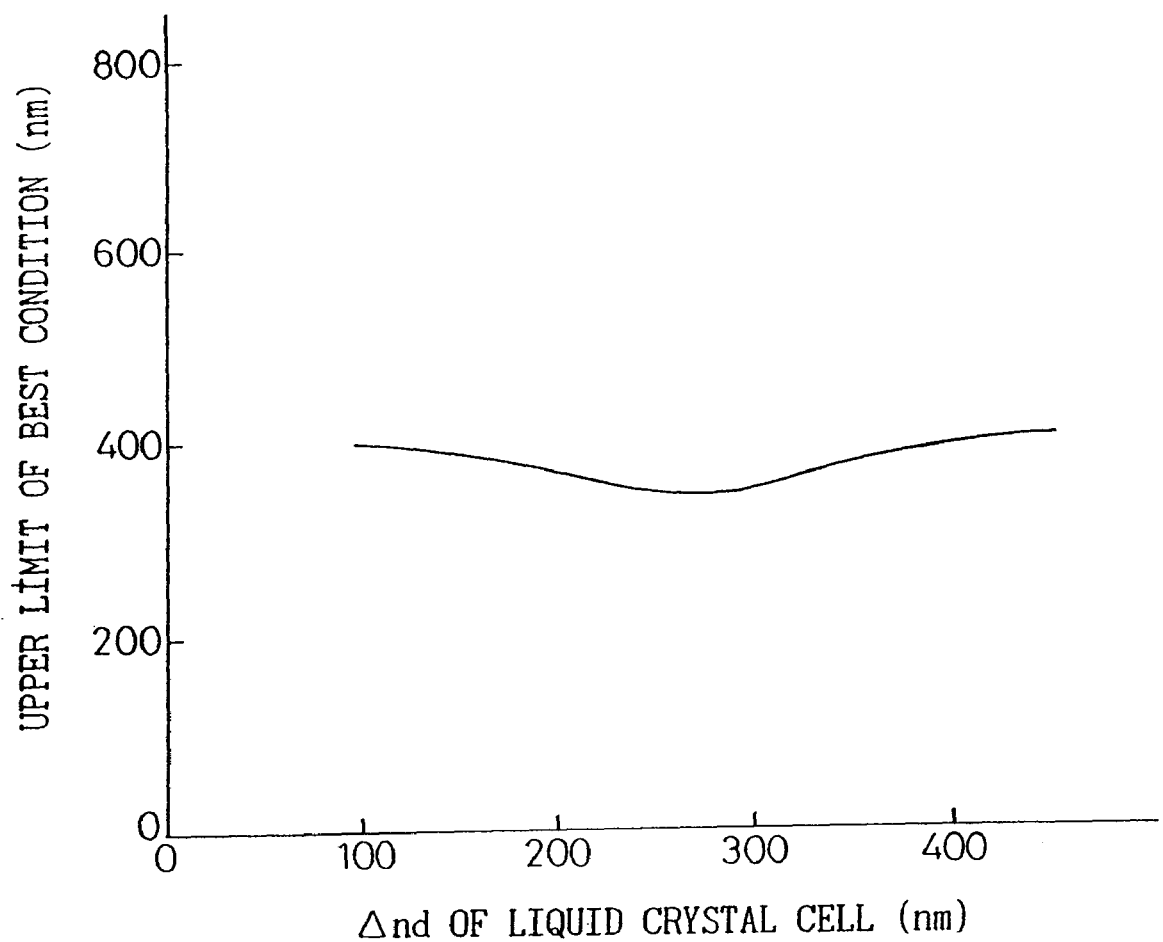
Figure 230:
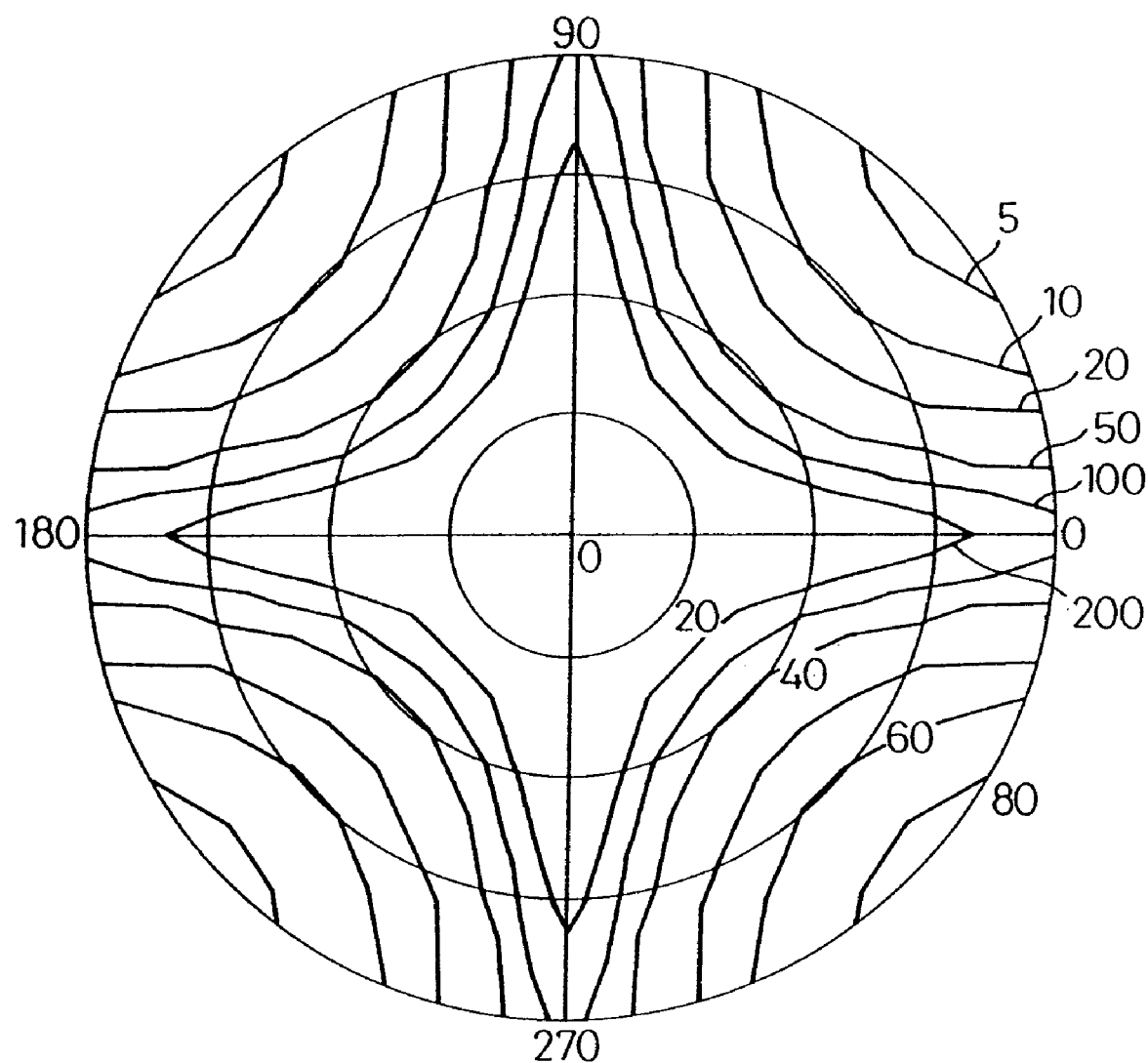
Figure 231:
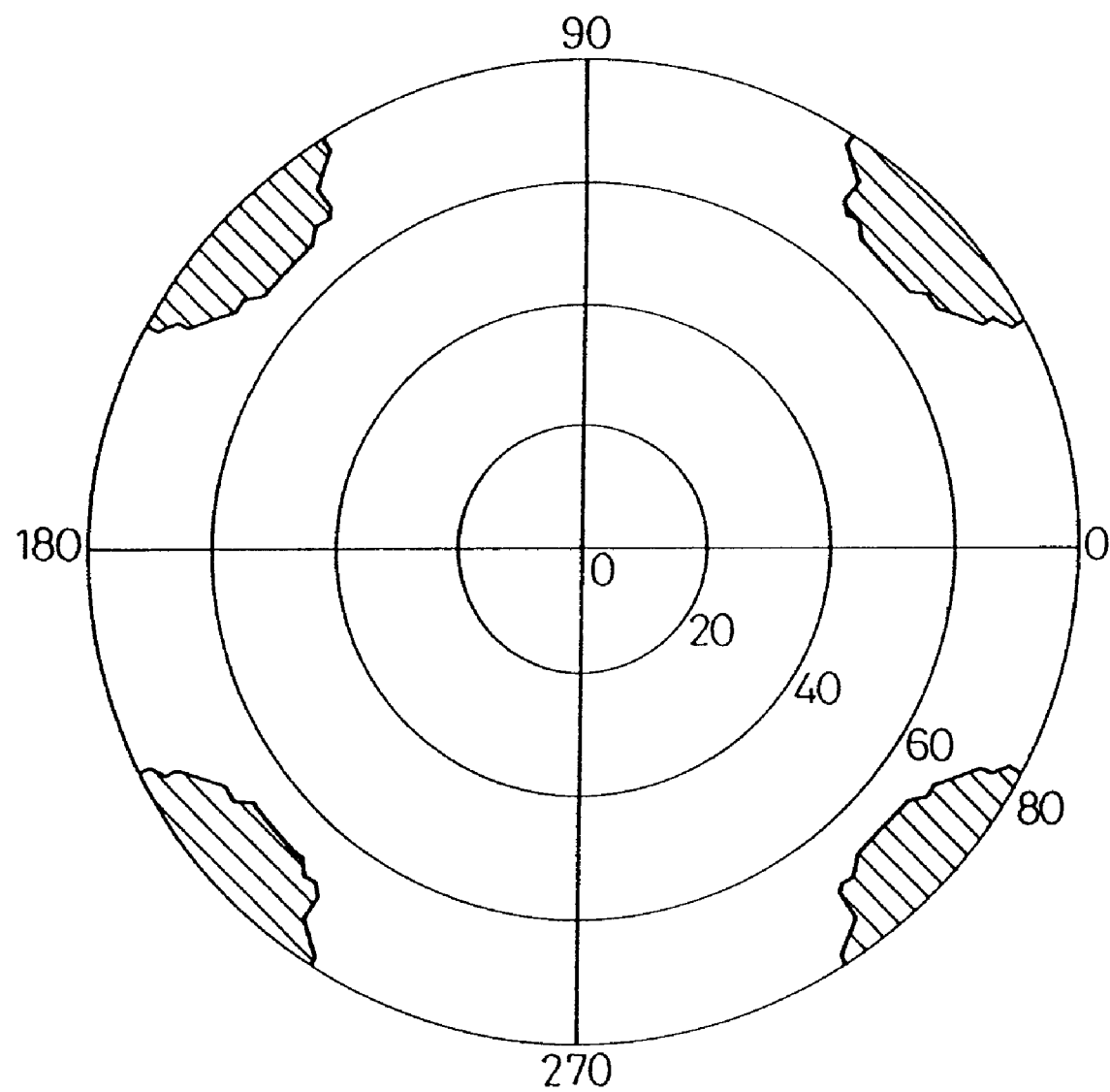
Figure 232:
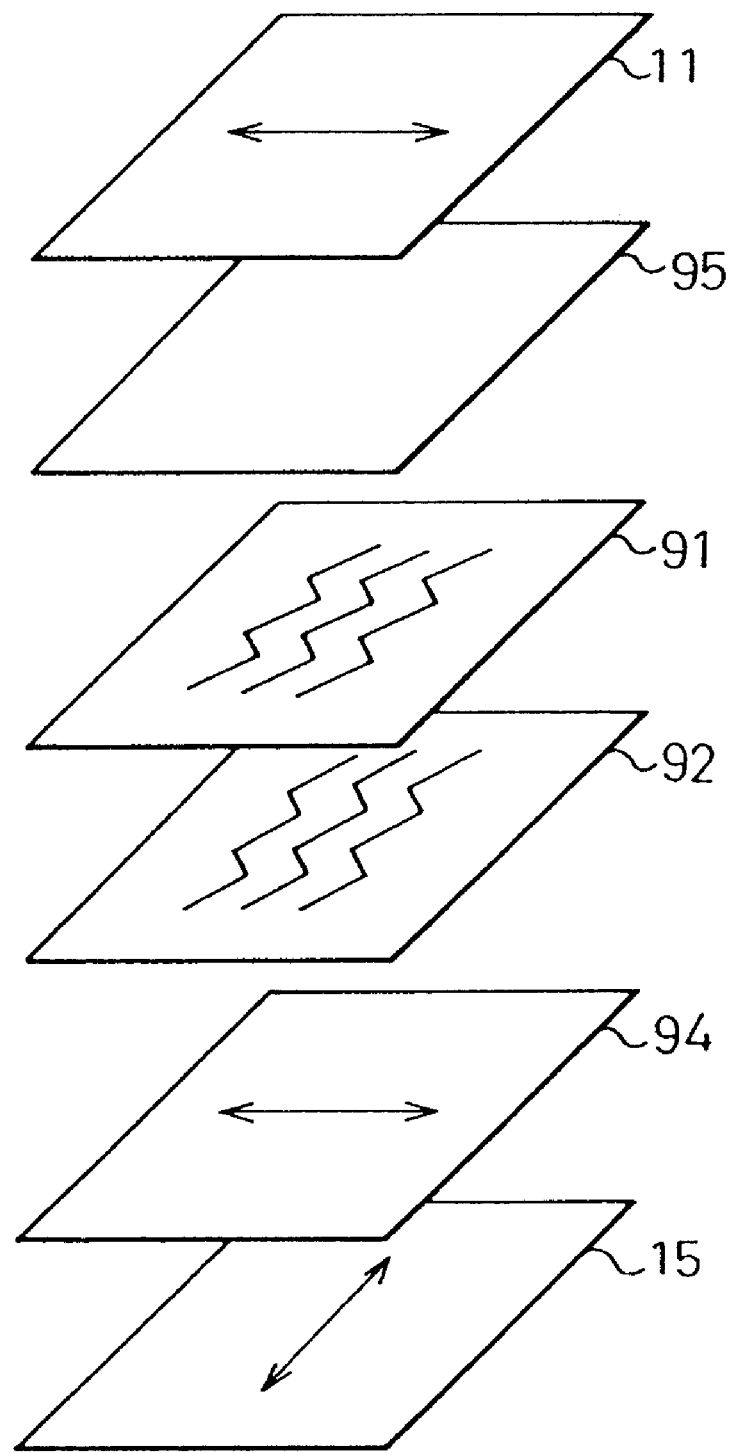
Figure 233:
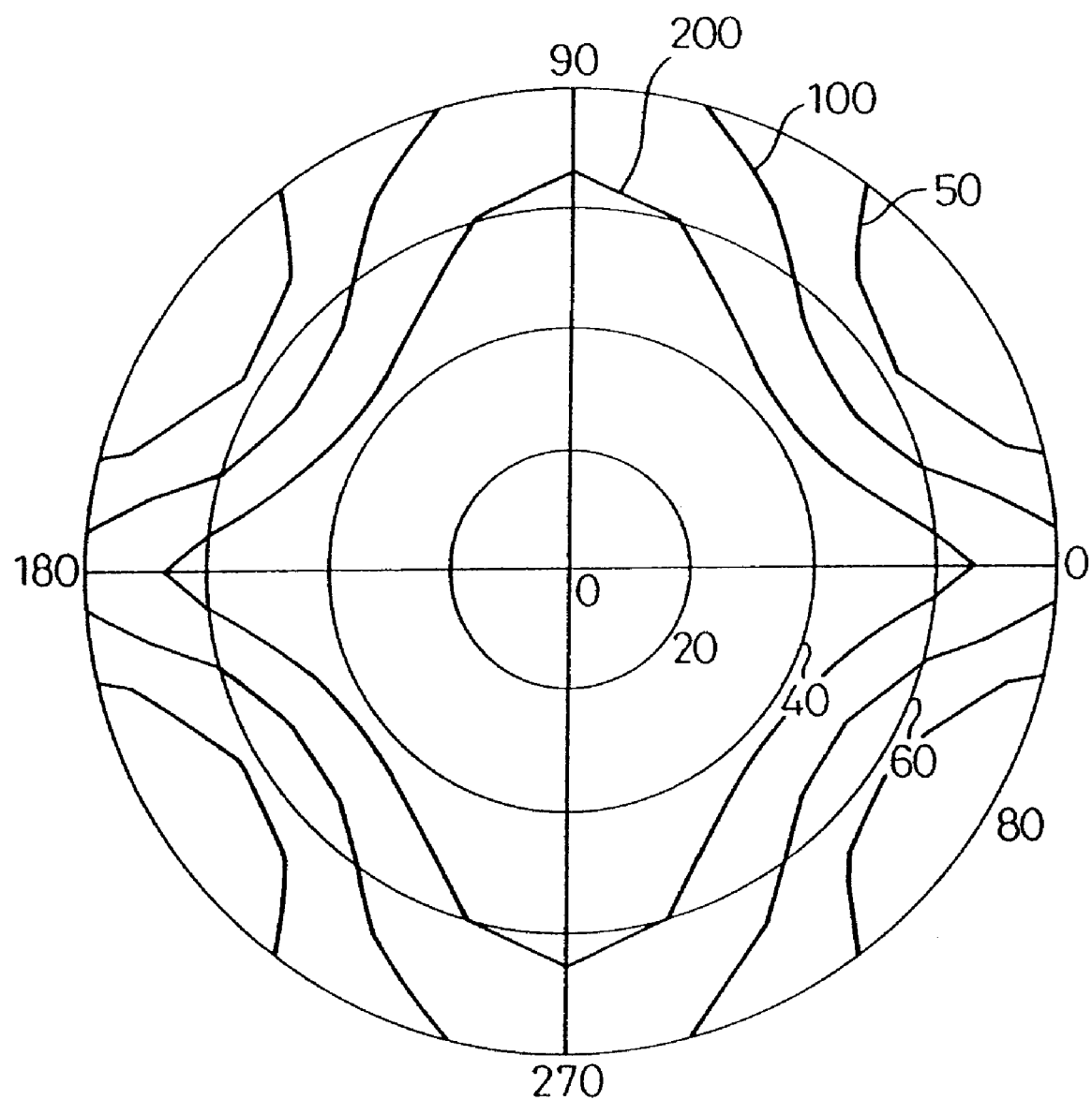
Figure 234:
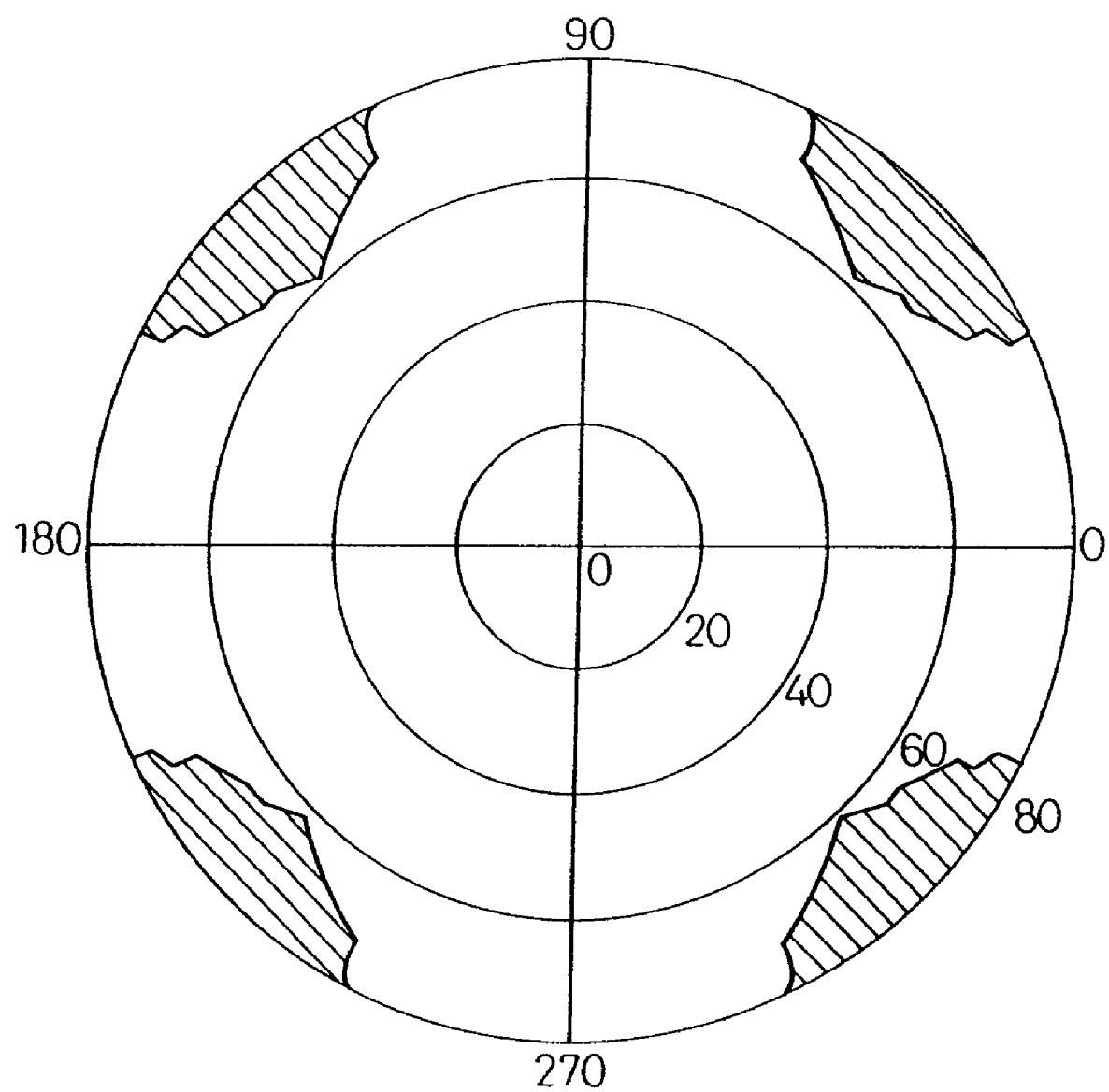
Figure 235:
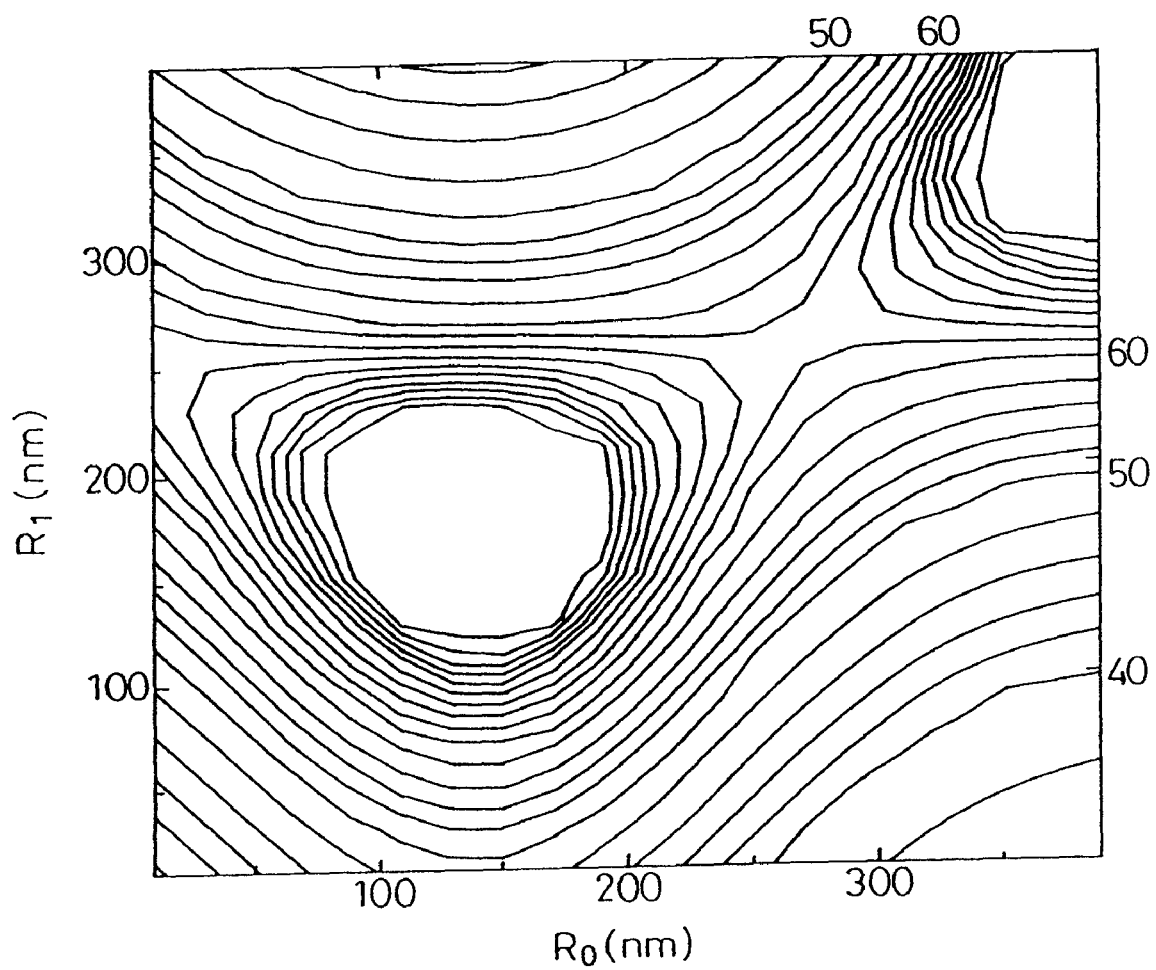
Figure 236:
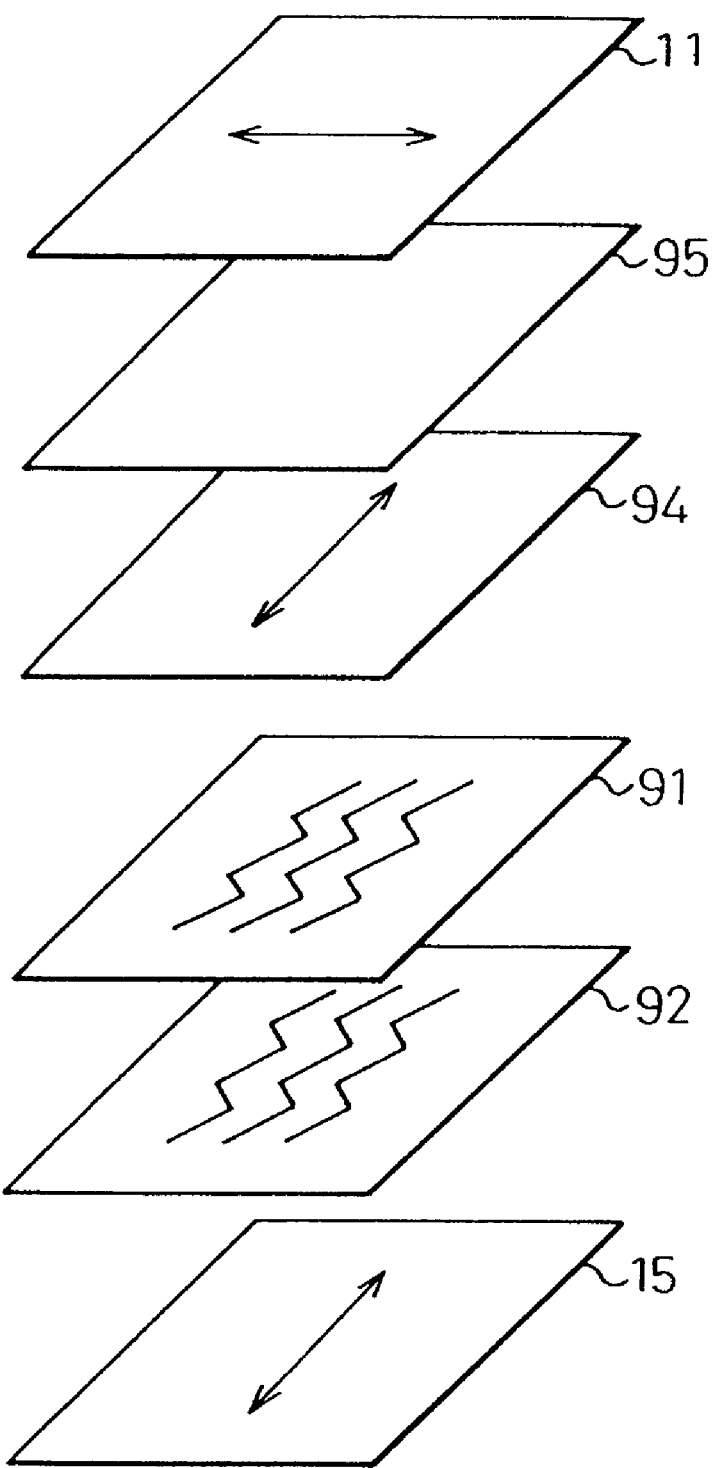
Figure 237:
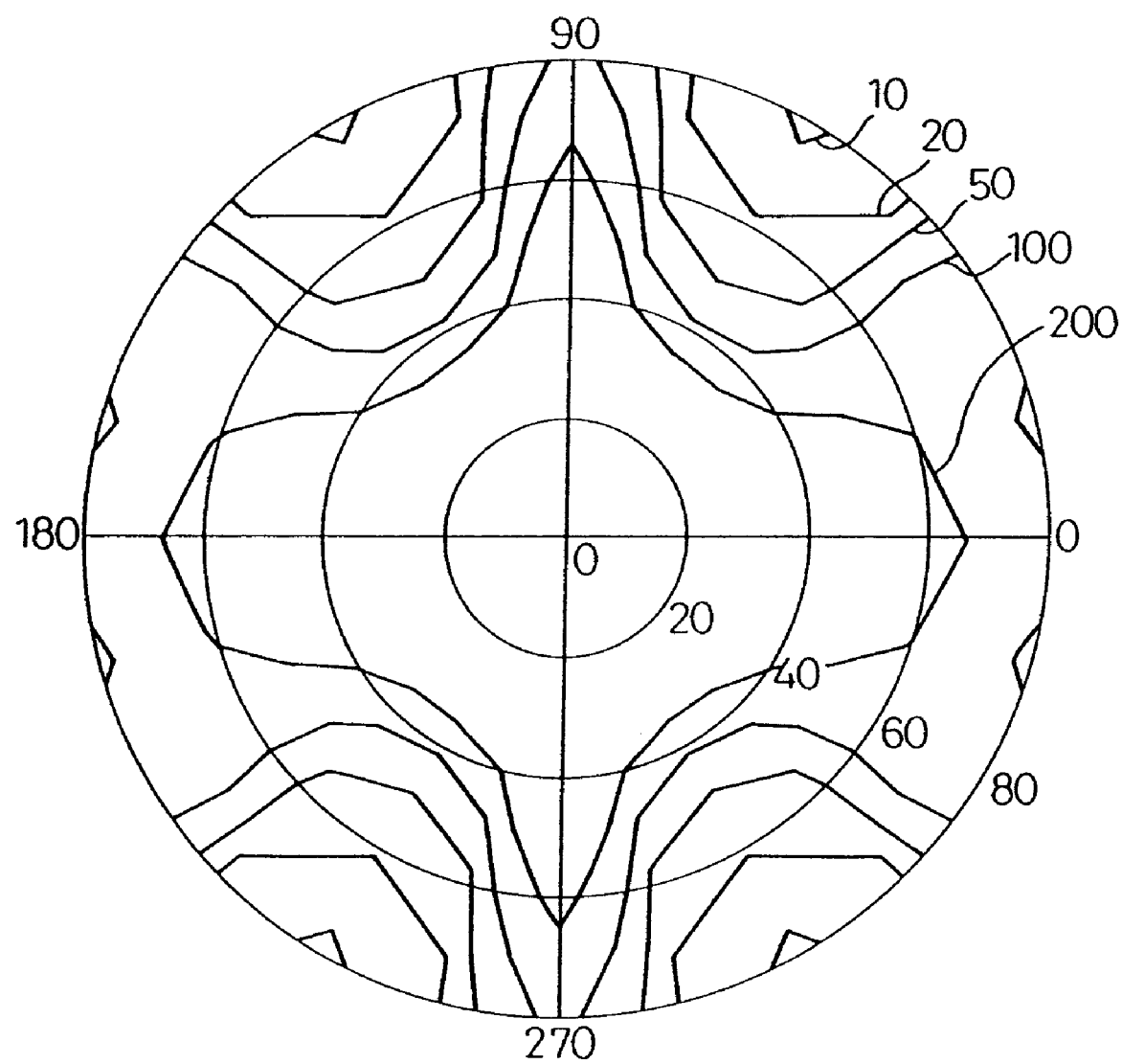
Figure 238:
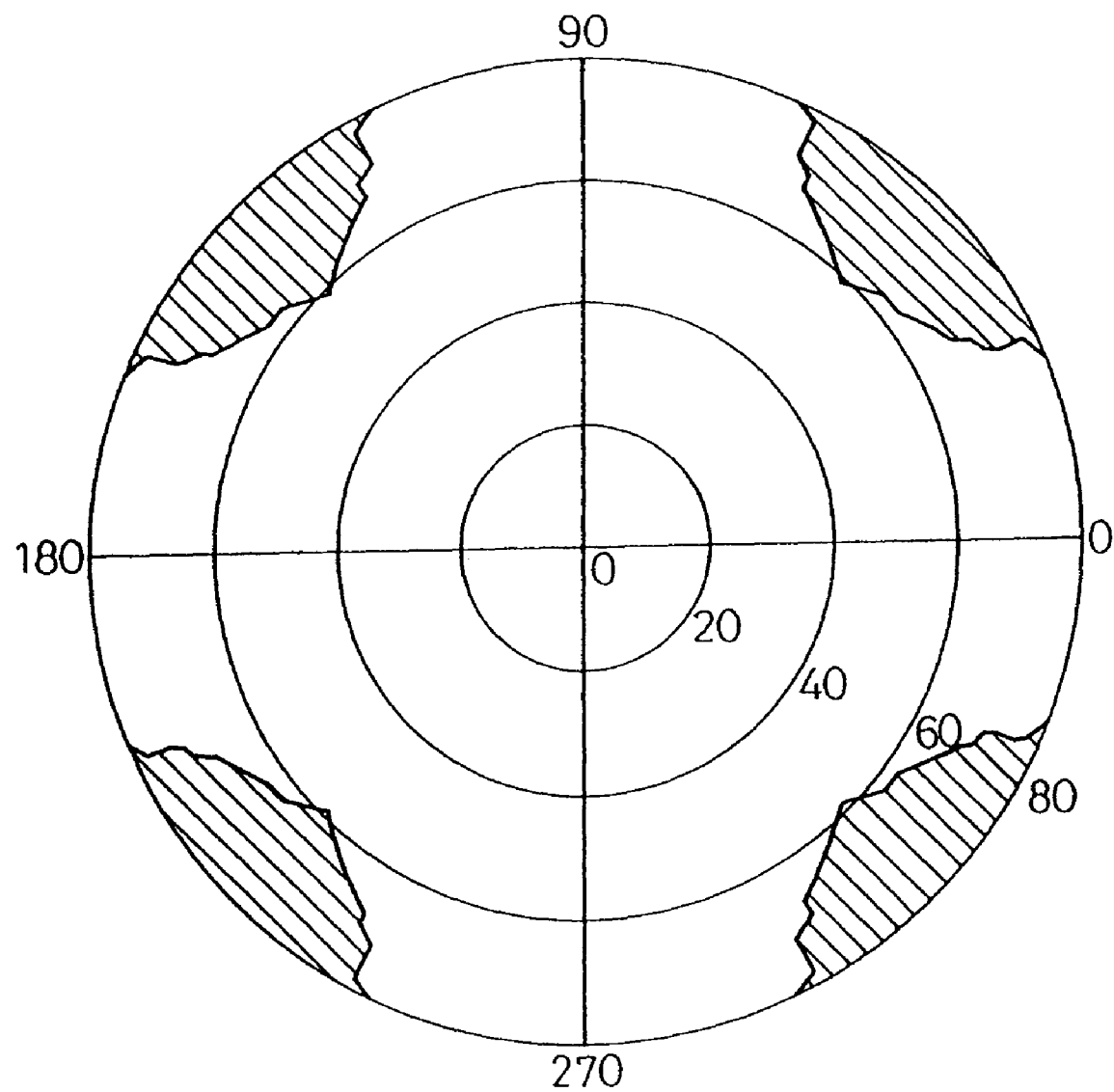
Figure 239:
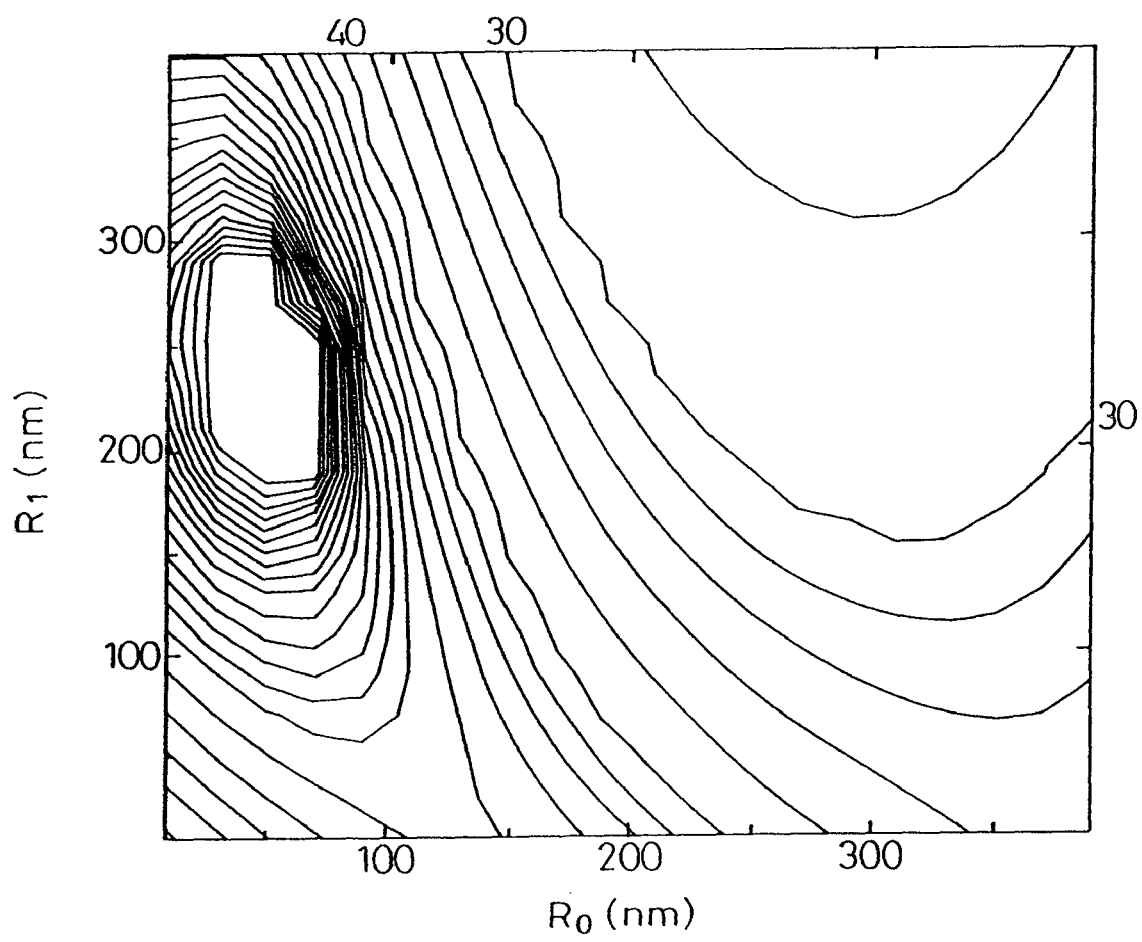
Figure 241:
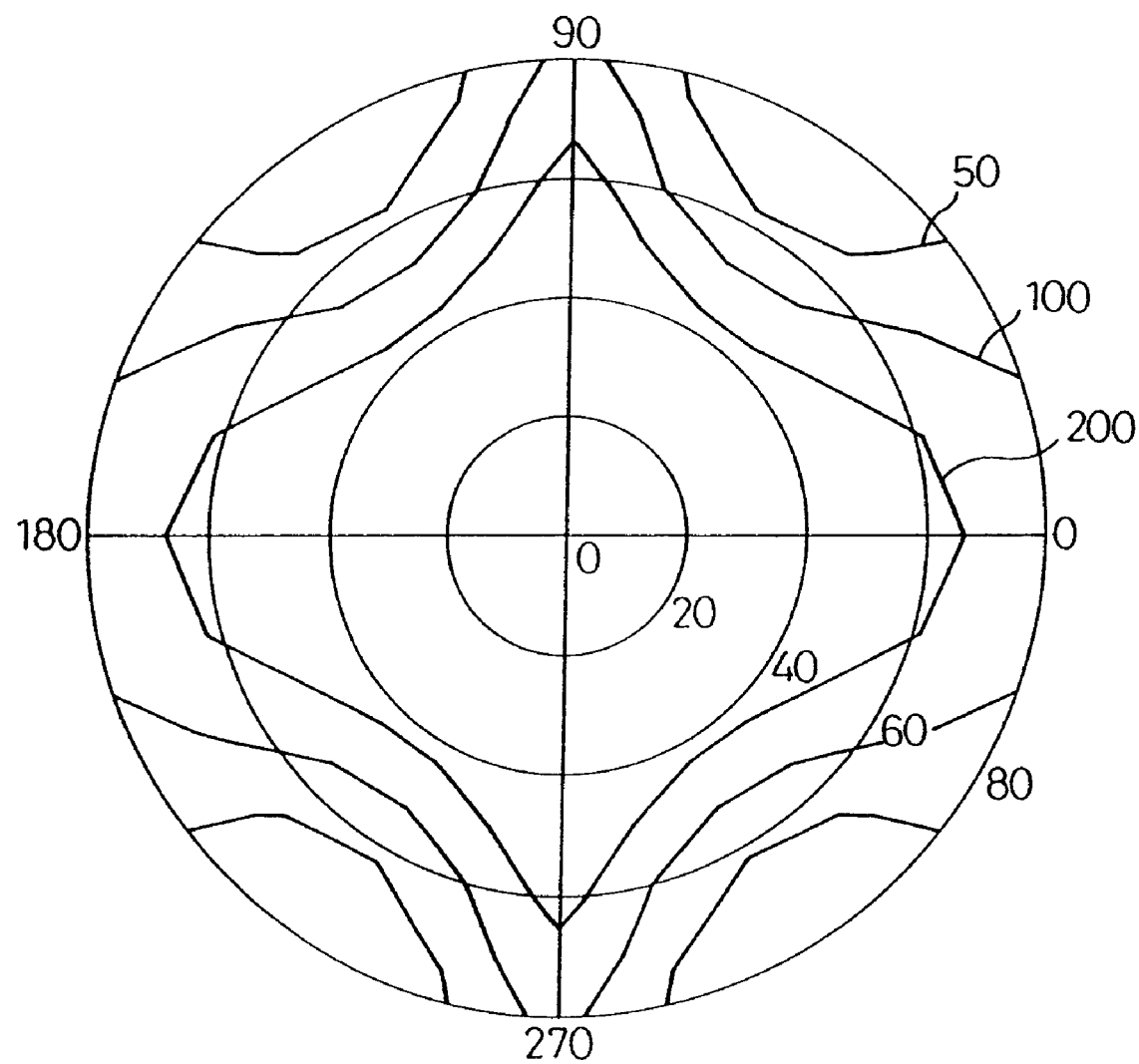
Figure 242:
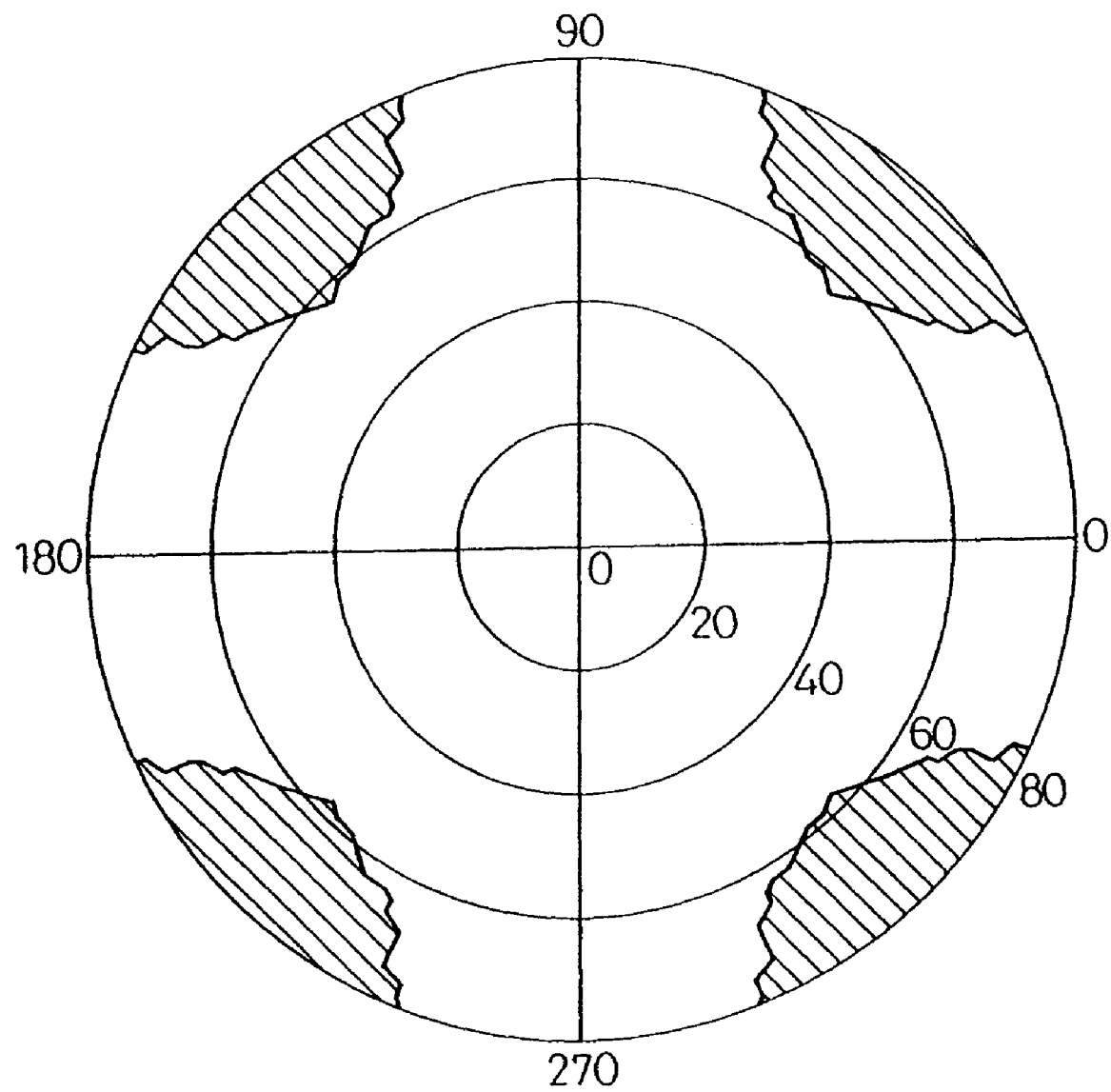
Figure 243:
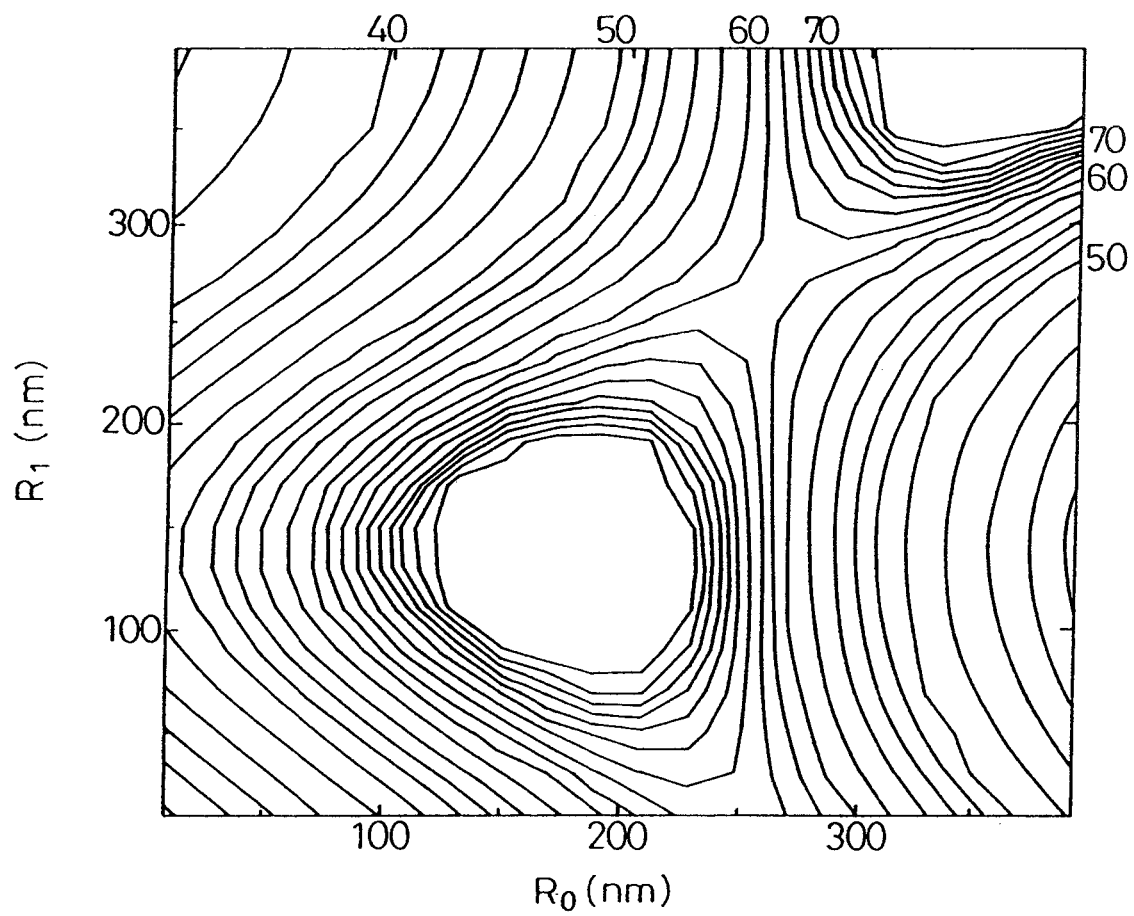
Figure 244:
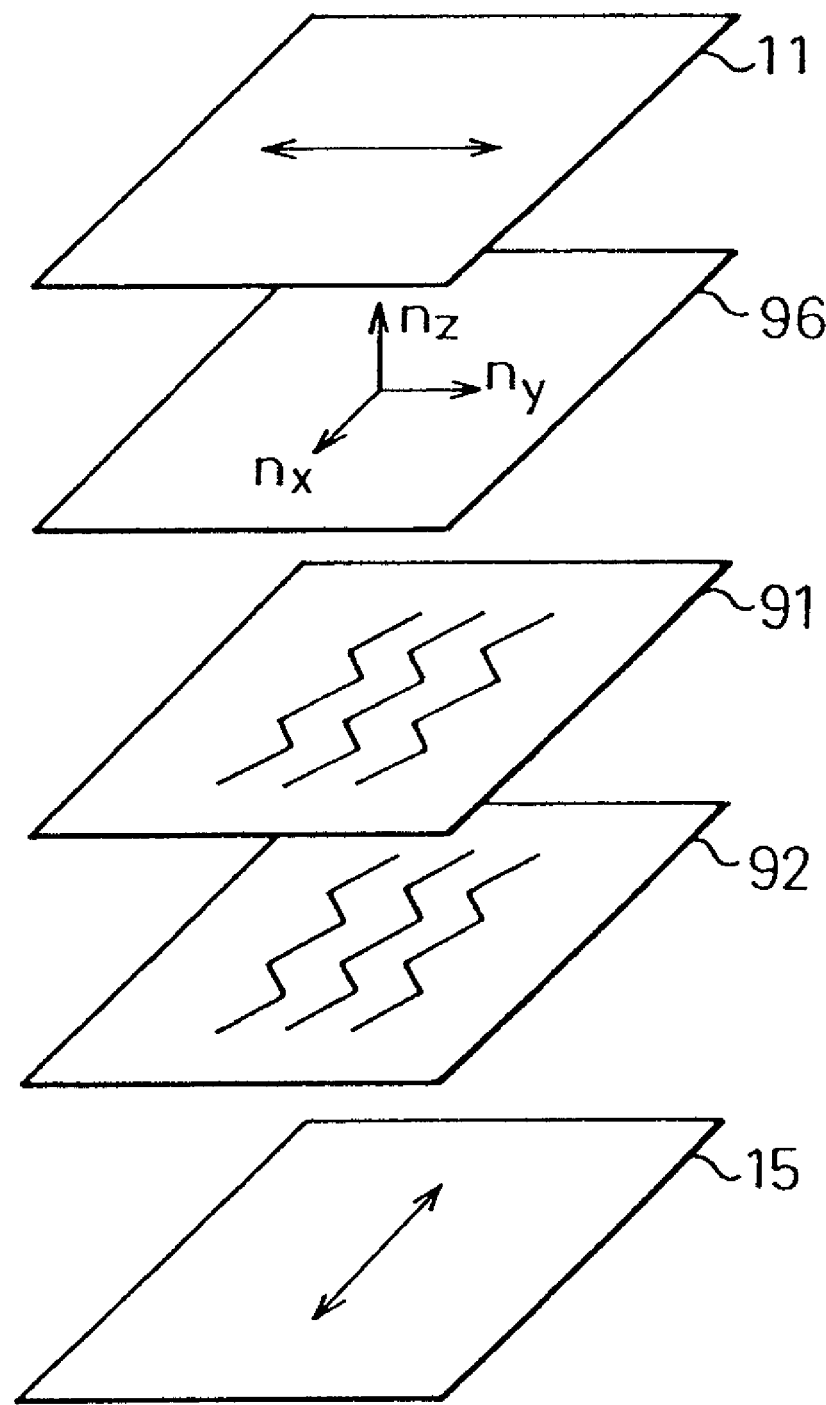
Figure 245:
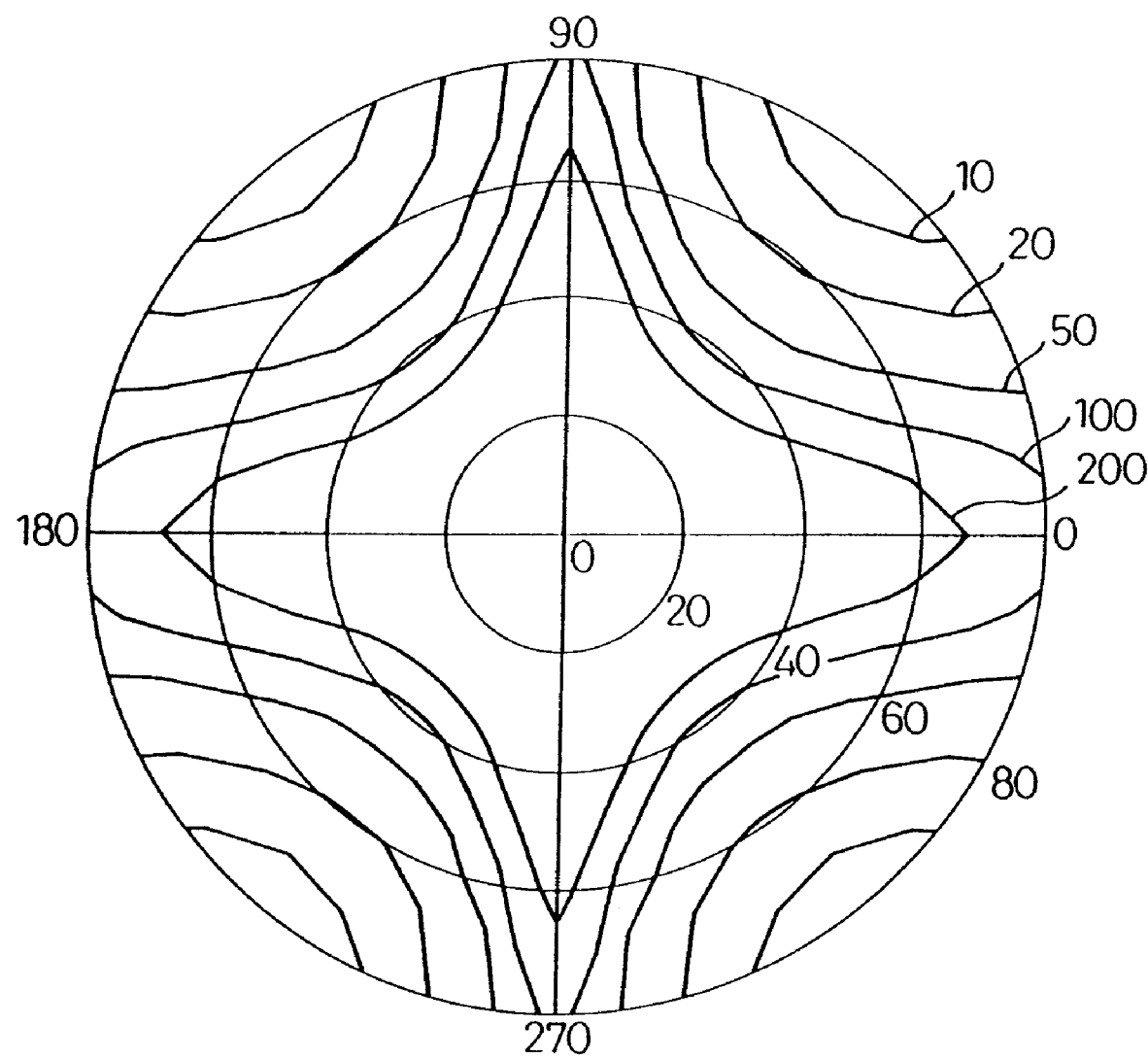
Figure 246:
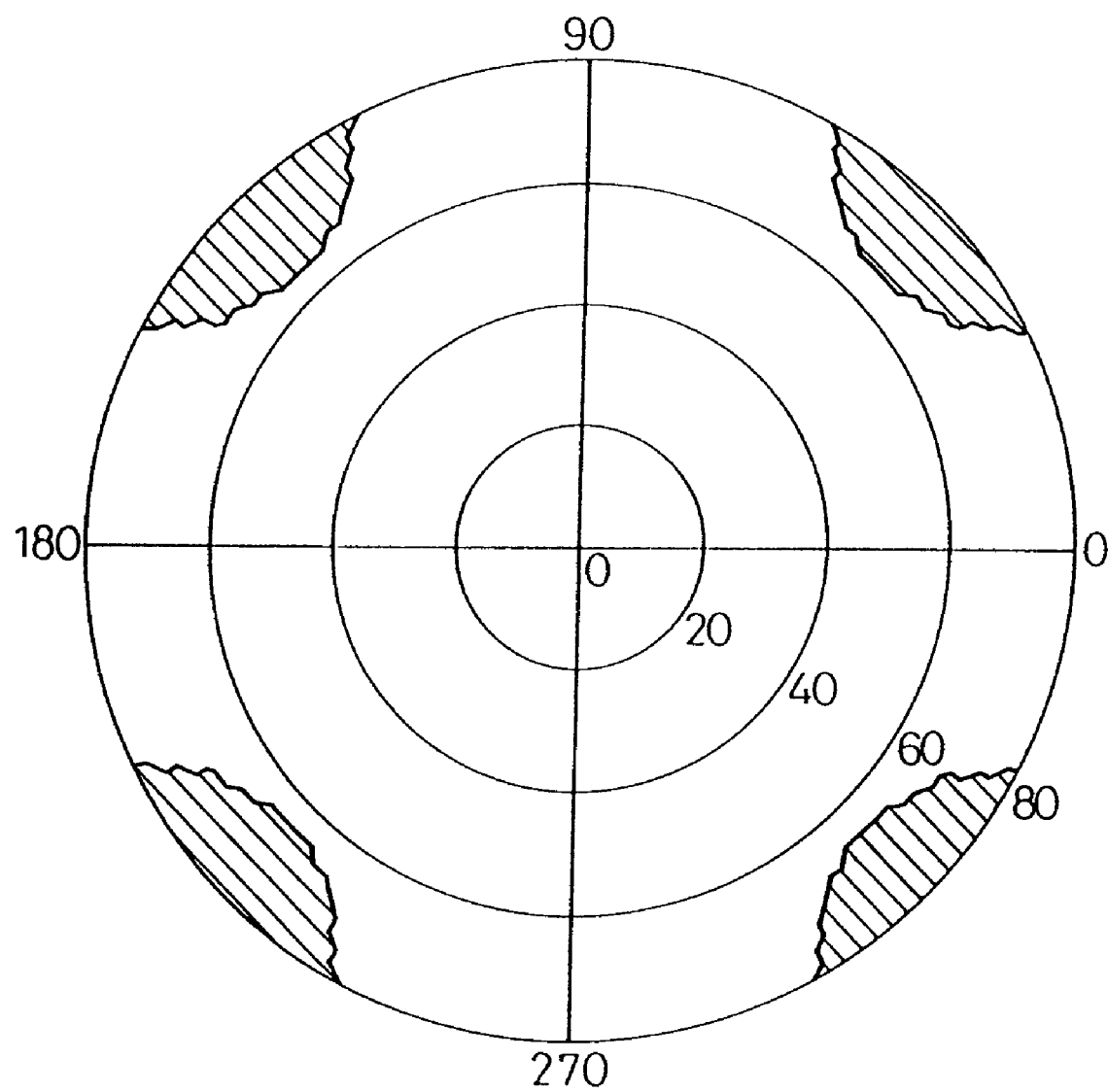
Figure 247:
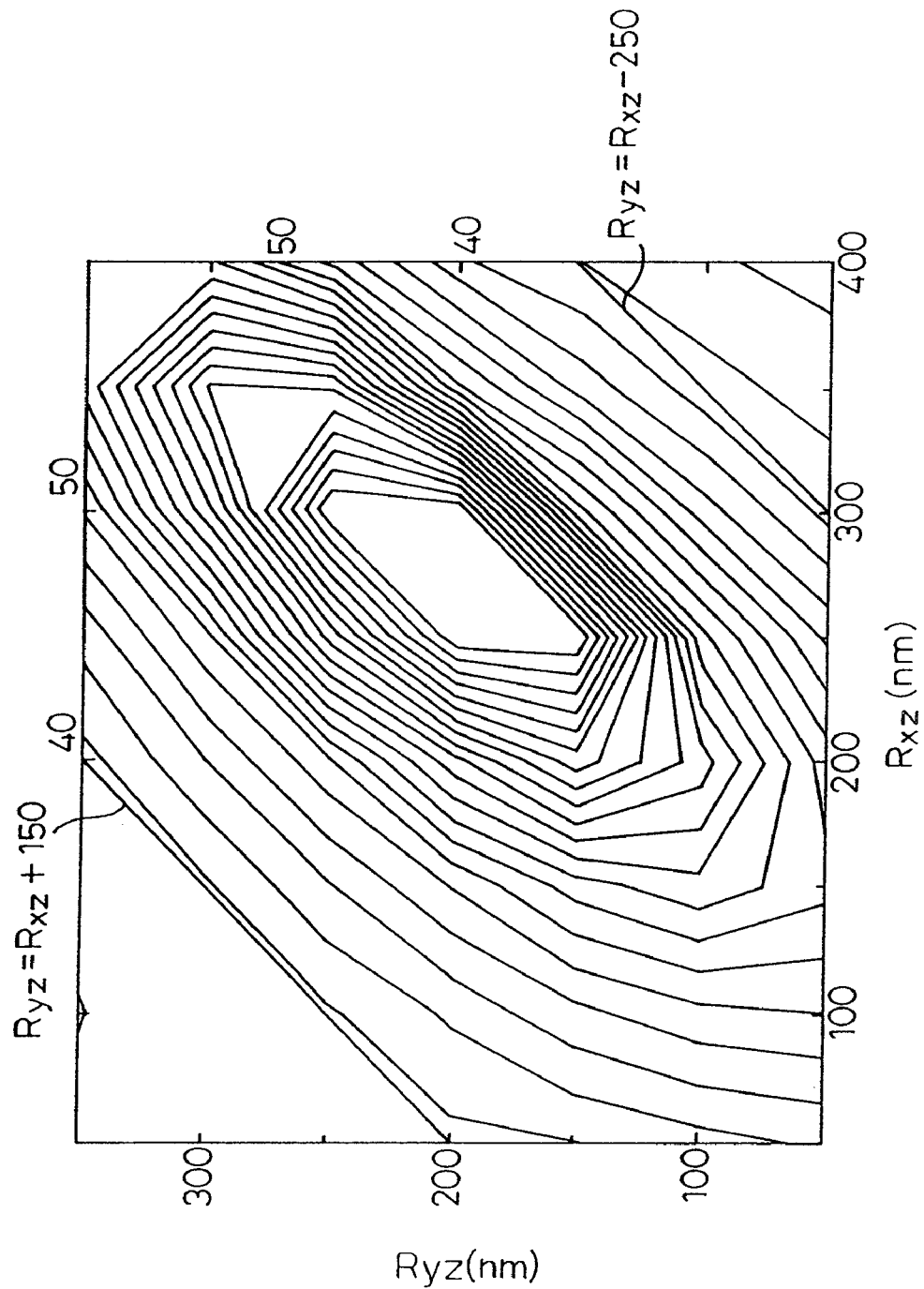
Figure 248:
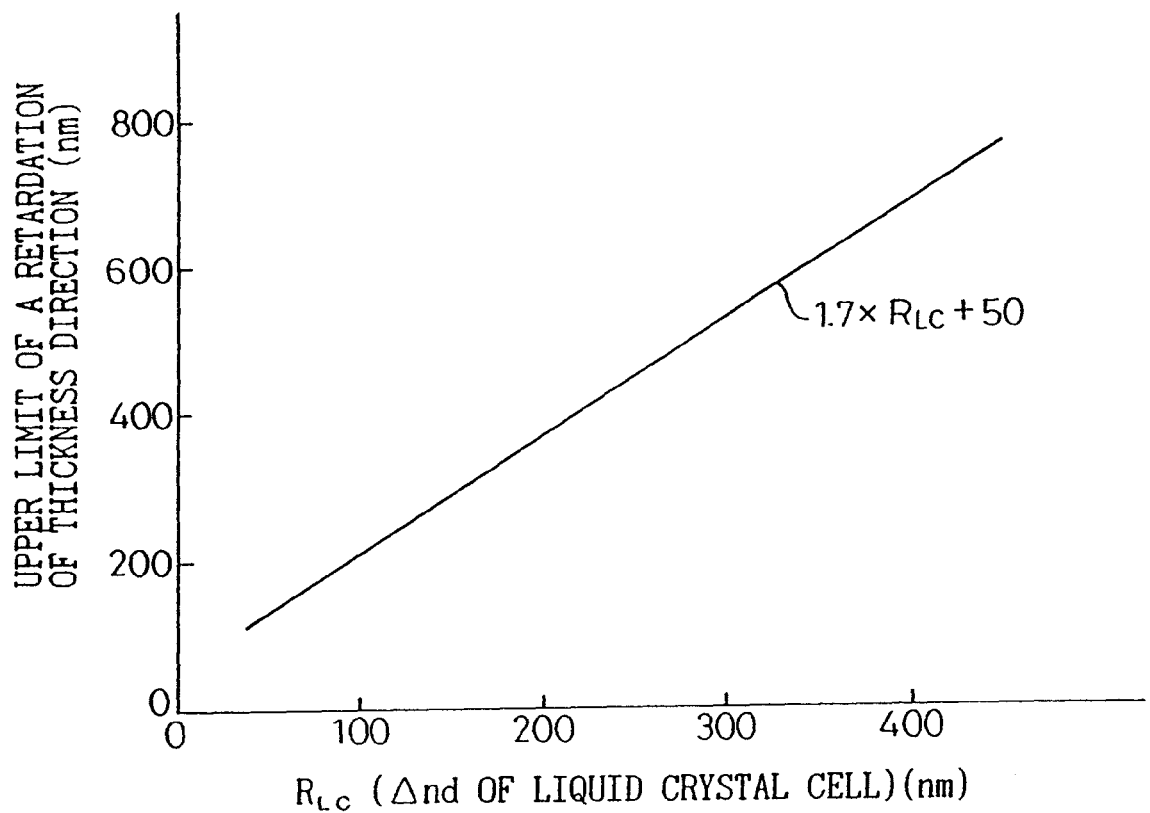
Figure 252A:
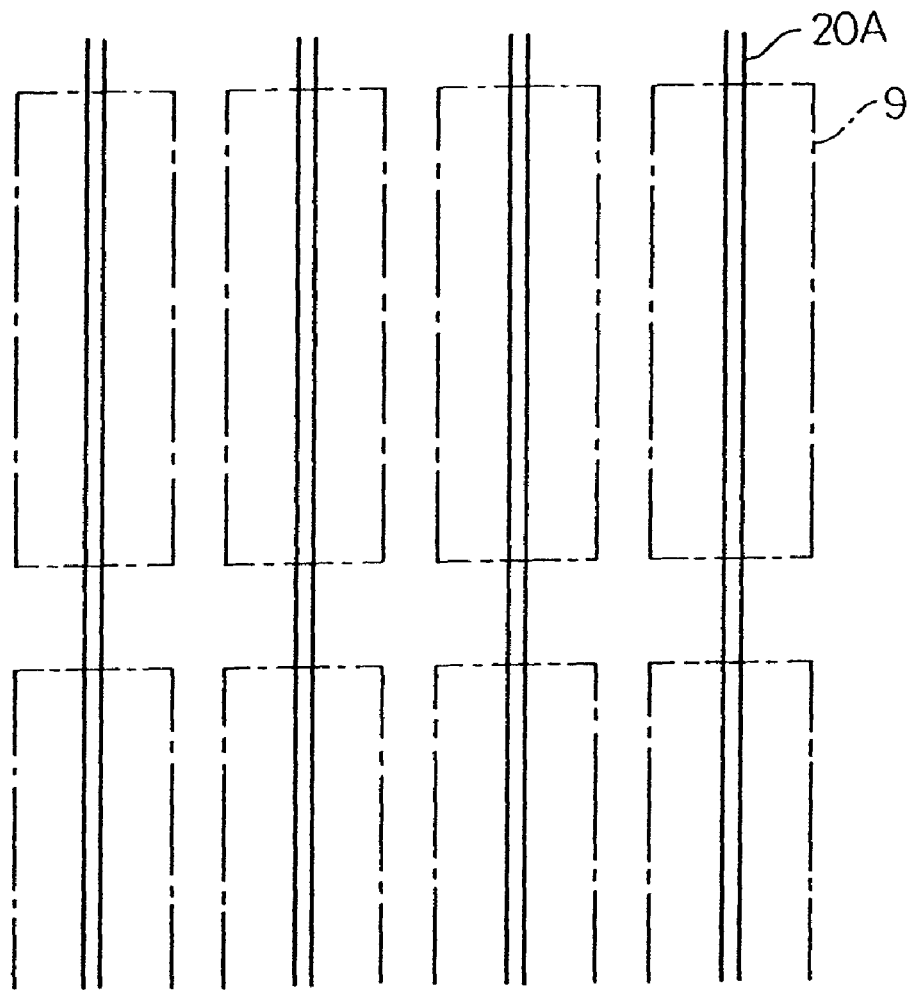
Figure 252B:
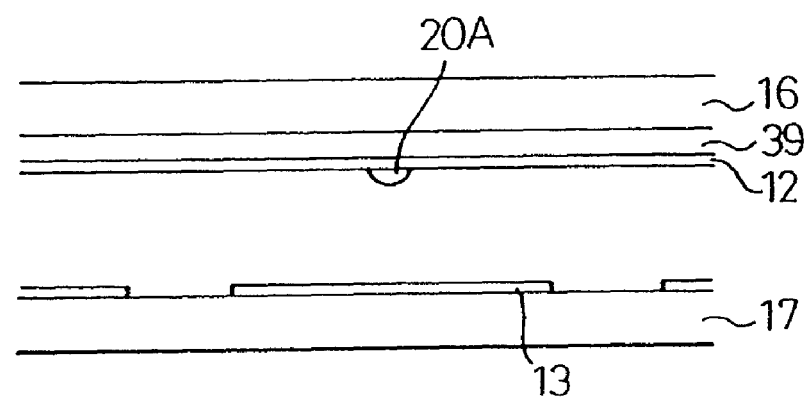
Figure 254A:
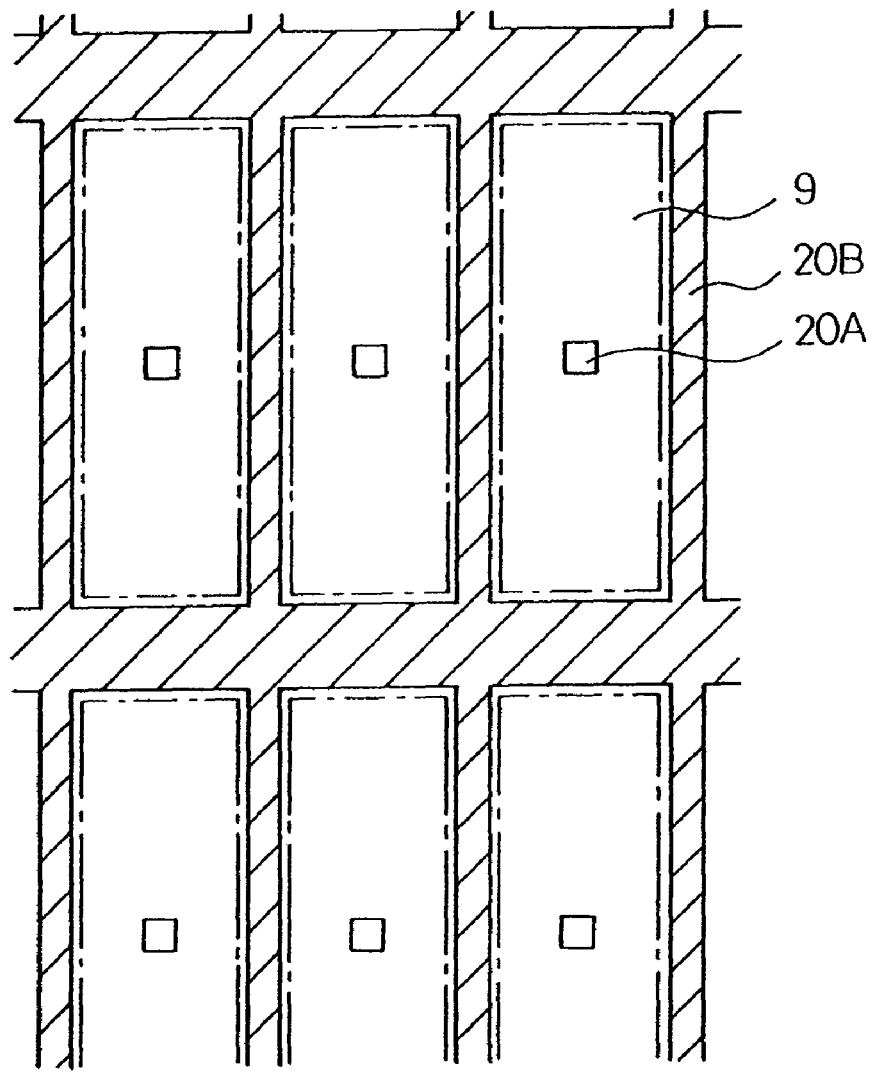
Figure 254B:
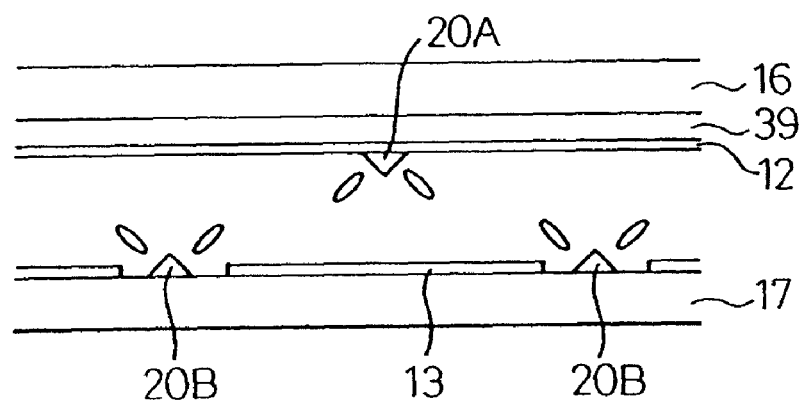
Figure 255:
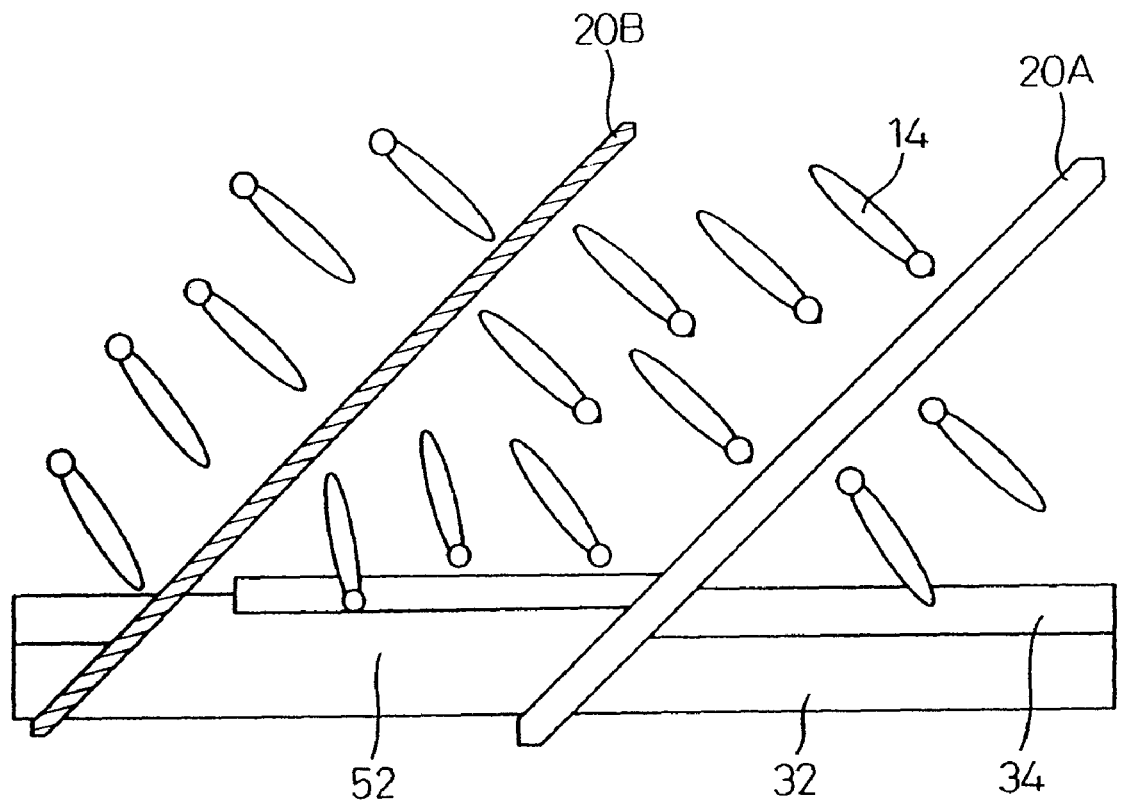

FIG. 131 is a diagram showing a structure of a panel of a 32nd embodiment;

FIG. 132 is a diagram showing a structure of a panel of a modification of the 32nd embodiment;

FIG. 133 is a diagram showing a structure of a TFT substrate of a 33rd embodiment;

FIGS. 134A and 134B are diagrams showing a pattern of protrusions of the 33rd embodiment;

FIG. 135 is a diagram showing a structure of a panel of a 34th embodiment;

FIGS. 136A and 136B are diagrams showing a pattern of protrusions of the 34th embodiment;

FIGS. 137A to 137D are diagrams showing a process for producing a TFT substrate of the 35th embodiment;

FIG. 138 is a diagram showing a structure of a TFT substrate of the 35th embodiment;

FIGS. 139A to 139E are diagrams showing a process for producing a TFT substrate of the 36th embodiment;

FIGS. 140A and 140B are diagrams for explaining a problem of dielectric substance on an electrode;

FIGS. 141A and 141B are diagrams showing a structure of protrusions of a 37th embodiment;

FIGS. 142A to 142E are diagrams showing a process for producing protrusions of the 37th embodiment;

FIG. 143 is a diagram showing a structure of protrusions of a 38th embodiment;

FIGS. 144A and 144B are diagrams showing a change of a shape of a protrusion due to baking;

FIGS. 145A to 145E are diagrams showing a change of the shape of the protrusion according to baking temperatures;

FIGS. 146A to 146C are diagrams showing a change of the shape of the protrusion according to a width of the protrusion;

FIGS. 147A and 147B are diagrams showing protrusions and a forming condition of the vertical alignment film;

FIGS. 148A to 148C are diagrams showing an example of a method of forming protrusions according to a 39th embodiment;

FIGS. 149A and 148B are diagrams showing an another example of a method of forming protrusions according to the 39th embodiment;

FIG. 150 is a diagram showing an another example of a method of forming protrusions according to the 39th embodiment;

FIGS. 151A and 151B are diagrams showing changes of a repellent occurrence ratio according to the ultraviolet light irradiation;

FIGS. 152A to 152C are diagrams showing an another example of a method of forming protrusions according to the 39th embodiment;

FIGS. 153A to 153C are diagrams showing an another example of a method of forming protrusions according to the 39th embodiment;

FIGS. 154A and 154B are diagrams showing an another example of a method of forming protrusions according to the 39th embodiment;

FIGS. 155A and 155B are diagrams showing an another example of a method of forming protrusions according to the 39th embodiment;

FIG. 156 is a diagram showing a temperature condition of the method shown in FIGS. 155A and 155B;

FIGS. 157A to 157C are diagrams showing an another example of a method of forming protrusions according to the 39th embodiment;

FIG. 158 is a diagram showing a structure of a panel of a prior art provided with black matrices;

FIG. 159 is a diagram showing a structure of a panel of a 40th embodiment;

FIG. 160 is a diagram showing a pattern of protrusions of the 40th embodiment;

FIG. 161 is a diagram showing a shade pattern (black matrices) of a 41th embodiment;

FIG. 162 is a sectional view of a panel of the 41st embodiment;

FIG. 163 is a diagram showing pixels and a pattern of protrusions of a 42nd embodiment;

FIG. 164 is a diagram showing a structure of a prior art panel having spacers;

FIGS. 165A and 165B are diagrams showing structures of panels of a 43rd embodiment and an modification thereof;

FIGS. 166A and 166B are diagrams showing structures of panels of modifications of the 43rd embodiment;

FIG. 167 is a diagram showing a structure of a panel of a modification of the 43rd embodiment;

FIGS. 168A to 168C are diagrams showing a process of a panel of a 44th embodiment;

FIG. 169 is a diagram showing a relationship between a scattered density of spacers and a cell gap in the 44th embodiment;

FIG. 170 is a diagram showing a relationship between a scattered density of spacers and generations of blemishes when a force is applied to the panel;

FIGS. 171A and 171B are diagrams showing chemical formulas of crown added to protrusion materials so that the protrusions have ion absorption ability;

FIGS. 172A and 172B are diagrams showing chemical formulas of kryptand added to protrusion materials so that the protrusions have ion absorption ability;

FIGS. 173A and 173B are diagrams showing structures of CF substrates of a 45th embodiment and a modification thereof;

FIG. 174 is a diagram showing a structure of a panel of a 46th embodiment;

FIGS. 175A and 175B are diagrams showing structures of CF substrates of another modifications of the 46th embodiment;

FIGS. 176A and 176B are diagrams showing structures of CF substrates of another modifications of the 46th embodiment;

FIGS. 177A and 177B are diagrams showing structures of CF substrates of another modifications of the 46th embodiment;

FIG. 178 is a diagram showing a structure of a panel of an another modification of the 46th embodiment;

FIGS. 179A and 179B are diagrams showing structures of CF substrates of another modifications of the 46th embodiment;

FIGS. 180A and 180B are diagrams showing structures of CF substrates of another modifications of the 46th embodiment;

FIGS. 181A to 181G are diagrams showing a process for forming protrusions on the CF substrate according to a 47th embodiment;

FIG. 182 is a diagram showing a structure of a panel of the 47th embodiment;

FIGS. 183A and 180B are diagrams showing a process for forming black matrices of the CF substrate according to a 48th embodiment;

FIGS. 184A and 184B are diagrams showing a structure of a panel of the 48th embodiment;

FIGS. 185A to 185C are diagrams showing a process for forming protrusions on the CF substrate according to a 49th embodiment;

FIG. 186 is a diagram showing a structure of a panel of the 49th embodiment;

FIG. 187 is a diagram showing a process for forming protrusions on the CF substrate according to a 50th embodiment;

FIGS. 188A and 188B are diagrams showing a structure of a panel of the 50th embodiment;

FIG. 189 is a diagram showing a structure of a CF substrate of a 51th embodiment;

FIGS. 190A and 190B are diagrams showing structures of CF substrates of modifications of the 51th embodiment;

FIG. 191 is a diagram showing structures of CF substrates of modifications of the 51th embodiment;

FIG. 192 is a diagram showing structures of CF substrates of modifications of the 51th embodiment;

FIG. 193 is a diagram showing a structure of a panel of an another modification of the 50th embodiment;

FIG. 194 is a diagram showing an example of a product employing the LCD in accordance with the present invention;

FIG. 195 is a diagram showing a structure of the product shown in FIG. 197;

FIGS. 196A and 196B are diagrams showing examples of arrangements of the protrusions in the product;

FIG. 197 is a flowchart showing a process of a panel according to the present invention;

FIG. 198 is a flowchart showing a process of forming protrusions;

FIG. 199 is a diagram for explaining a process of forming protrusions by printing;

FIG. 200 is a diagram showing the configuration of a liquid-crystal injection apparatus;

FIGS. 201A and 201B are diagrams showing examples of the positions of liquid-crystal injection ports of the LCD panel;

FIGS. 202A and 202B are diagrams showing examples of the positions of liquid-crystal injection ports of the LCD panel;

FIGS. 203A and 203B are diagrams showing examples of the positions of liquid-crystal injection ports of the LCD panel;

FIG. 204 is a diagram showing a structure of electrodes near the liquid-crystal injection port in the panel of the present invention;

FIGS. 205A to 205C are diagrams for explaining a defect due to contamination by polyurethane resin and skin in the VA LCD;

FIG. 206 is a diagram showing a relationship between a size of polyurethane resin particulate and a size of defective area;

FIG. 207 is a diagram showing a simulation result of a relationship between a display frequency and an effective voltage at respective specific resistances;

FIG. 208 is a diagram showing a simulation result of a discharge time at respective specific resistances;

FIG. 209 is a diagram showing a simulation result of a discharge time at respective specific resistances;

FIG. 210 is a diagram showing a fundamental constitution of the prior art VA LCD;

FIG. 211 is a diagram showing a viewing angle characteristic (contrast ratio) of the prior art VA LCD;

FIG. 212 is a diagram showing a viewing angle characteristic (gray-scale reversal) of the prior art VA LCD;

FIG. 213 is a diagram showing a fundamental constitution of the panel of according to the present invention;

FIG. 214 is a diagram showing a viewing angle characteristic (contrast ratio) of present invention;

FIG. 215 is a diagram showing a viewing angle characteristic (gray-scale reversal) of present invention;

FIG. 216 is a diagram for explaining characteristics of a retardation film;

FIG. 217 is a diagram showing a constitution of a panel of a 52nd embodiment;

FIG. 218 is a diagram showing a viewing angle characteristic (gray-scale reversal) of the 52nd embodiment;

FIG. 219 is a diagram showing a viewing angle characteristic (gray-scale reversal) of the 52nd embodiment;

FIG. 220 is a diagram showing a relationship of a polar angle at which a predetermined value of contrast can be obtained with respect to a retardation in the 52nd embodiment;

FIG. 221 is a diagram showing a constitution of a panel of a 53rd embodiment;

FIG. 222 is a diagram showing a viewing angle characteristic (gray-scale reversal) of the 52rd embodiment;

FIG. 223 is a diagram showing a viewing angle characteristic (gray-scale reversal) of the 52rd embodiment;

FIG. 224 is a diagram showing a relationship of a polar angle at which a predetermined value of contrast can be obtained with respect to a retardation in the 53rd embodiment;

FIG. 225 is a diagram showing a constitution of a panel of a 54th embodiment;

FIG. 226 is a diagram showing a relationship of a polar angle at which a predetermined value of contrast can be obtained with respect to a retardation in the 54th Embodiment;

FIG. 227 is a diagram showing a change of an upper limit to the optimum condition regarding contrast with respect to a retardation in the 54th embodiment;

FIG. 228 is a diagram showing a change of a polar angle at which no gray-scale reversal is generated with respect to a retardation in the 54th embodiment;

FIG. 229 is a diagram showing a change of an upper limit to the optimum condition regarding gray-scale reversal with respect to a retardation in the 54th embodiment;

FIG. 230 is a diagram showing a viewing angle characteristic (gray-scale reversal) of the 55th embodiment;

FIG. 231 is a diagram showing a viewing angle characteristic (gray-scale reversal) of the 55th embodiment;

FIG. 232 is a diagram showing a constitution of a panel of a 56th embodiment;

FIG. 233 is a diagram showing a viewing angle characteristic (gray-scale reversal) of the 56th embodiment;

FIG. 234 is a diagram showing a viewing angle characteristic (gray-scale reversal) of the 56th embodiment;

FIG. 235 is a diagram showing a relationship of a polar angle at which a predetermined value of contrast can be obtained with respect to a retardation in the 56th Embodiment;

FIG. 236 is a diagram showing a constitution of a panel of a 57th embodiment;

FIG. 237 is a diagram showing a viewing angle characteristic (gray-scale reversal) of the 57th embodiment;

FIG. 238 is a diagram showing a viewing angle characteristic (gray-scale reversal) of the 57th embodiment;

FIG. 239 is a diagram showing a relationship of a polar angle at which a predetermined value of contrast can be obtained with respect to a retardation in the 57th embodiment;

FIG. 240 is a diagram showing a constitution of a panel of a 58th embodiment;

FIG. 241 is a diagram showing a viewing angle characteristic (gray-scale reversal) of the 58th embodiment;

FIG. 242 is a diagram showing a viewing angle characteristic (gray-scale reversal) of the 58th embodiment;

FIG. 243 is a diagram showing a relationship of a polar angle at which a predetermined value of contrast can be obtained with respect to a retardation in the 58th embodiment;

FIG. 244 is a diagram showing a constitution of a panel of a 59th embodiment;

FIG. 245 is a diagram showing a viewing angle characteristic (gray-scale reversal) of the 59th embodiment;

FIG. 246 is a diagram showing a viewing angle characteristic (gray-scale reversal) of the 59th embodiment;

FIG. 247 is a diagram showing a relationship of a polar angle at which a predetermined value of contrast can be obtained with respect to a retardation in the 59th embodiment;

FIG. 248 is a diagram showing a change of an upper limit to the optimum condition regarding contrast with respect to a retardation in the 59th embodiment;

FIG. 249 is a diagram showing a viewing angle characteristic of a panel of the 32th embodiment;

FIG. 250 is a diagram showing a change of an ion density when an ion absorption treatment is applied to the protrusions;

FIGS. 251A to 251D are diagrams showing a process of a method of a panel of a modification in the 51st embodiment;

FIGS. 252A and 252B are diagrams showing a pattern of protrusions and a sectional structure of the panel of the second embodiment;

FIG. 253 is a diagram showing a pattern of protrusions of an another modification of the second embodiment;

FIGS. 254A and 254B are diagrams showing a pattern of protrusions and a sectional structure of the panel of the sixteenth embodiment;

FIG. 255 is a detailed diagram showing a distinctive portion of a modification of the tenth embodiment.

DESCRIPTION OF THE PREFERRED EMBODIMENTS

Before proceeding to a detailed description of the preferred embodiments of the present invention, a prior art liquid crystal display device will be described to allow a clearer understanding of the differences between the present invention and the prior art.

FIGS. 1A and 1B are diagrams for explaining the structure and principles of operation of a panel of the TN LCD. As shown in FIGS. 1A and 1B, an alignment film is placed on transparent electrodes 12 and 13 formed on glass substrates, a rubbing treatment is performed so that orientation directions of the liquid crystalline molecules on the two substrates are shifted by 90° to each other, and a TN liquid crystal is sandwiched between the transparent electrodes. Due to the properties of the liquid crystal, liquid crystalline molecules in contact with the alignment films are aligned in the directions of the orientation defined by the alignment films. The other liquid crystalline molecules are aligned in line with the aligned molecules. Consequently, as shown in FIG. 1A, the liquid crystalline molecules are aligned while twisted by 90°. Two sheet polarizers 11 and 15 are located in parallel with the directions of the orientation defined by the alignment films.

When light 10 that is not polarized falls on a panel having the foregoing structure, the light passing through the sheet polarizer 11 becomes linearly-polarized light and enters the liquid crystal. Since the liquid crystalline molecules are aligned while twisted 90°, the incident light is passed while twisted 90°. The light can therefore pass through the lower sheet polarizer 15. This state is a bright state.

Next, as shown in FIG. 1B, when a voltage is applied to the electrodes 12 and 13 and thus applied to the liquid crystalline molecules, the liquid crystalline molecules erect themselves to untwist. However, on the surfaces of the alignment films, since an orientation control force is stronger, the orientation of the liquid crystal remains matched with the orientation defined by the alignment films. In this state, the liquid crystalline molecules are isotropic relative to passing light. The linearly-polarized light incident on the liquid-crystal layer will therefore not turn the direction of polarization. The linearly-polarized light passing through the upper sheet polarizer 11 cannot therefore pass through the lower sheet polarizer 15. This brings about a dark state. Thereafter, when a state in which no voltage is applied is resumed, display is returned to the bright state owing to the orientation control force.

The technology of manufacturing the TN TFT LCD has outstandingly advanced in recent years. Contrast and color reproducibility provided by the TN TFT LCD have surpassed those offered by the CRT. However, the TN LCD has a critical drawback of a narrow viewing angle range. This poses a problem that the application of the TN LCD is limited. FIGS. 2A to 2C are diagrams for explaining this problem. FIG. 2A shows a state of white display in which no voltage is applied, FIG. 2B shows a state of halftone display in which an intermediate voltage is applied, and FIG. 2C shows a state of black display in which a predetermined voltage is applied. As shown in FIG. 2A, in the state in which no voltage is applied, liquid crystalline molecules are aligned in the same direction with a slight inclination (about 1° to 5°). In reality, the molecules are twisted as shown in FIG. 1A. For convenience' sake, the molecules are illustrated like FIG. 2A. In this state, light is seen nearly white in any azimuth. Moreover, as shown in FIG. 2C. In the state in which a voltage is applied, intermediate liquid crystalline molecules except those located near the alignment films are aligned in a vertical direction. Incident linearly-polarized light is therefore seen black but not twisted. At this time, light obliquely incident on a screen (panel) has the direction of polarization thereof twisted to some extent because it passes obliquely through the liquid crystalline molecules aligned in the vertical direction. The light is therefore seen halftone (gray) but not perfect black. As shown in FIG. 2B, in the state in which an intermediate voltage lower than the voltage applied in the state shown in FIG. 2C is applied, the liquid crystalline molecules near the alignment films are aligned in a horizontal direction but the liquid crystalline molecules in the middle parts of cells erect themselves halfway. The birefringent property of the liquid crystal is lost to some extent. This causes a transmittance to deteriorate and brings about halftone (gray) display. However, this refers only to light incident perpendicularly or the liquid-crystal panel. Obliquely incident light is seen differently, that is, light is seen differently depending on whether it is seen from the left or right side of the drawing. As illustrated, the liquid crystalline molecules are aligned mutually parallel relative to light propagating from right below to left above. The liquid crystal hardly exerts a birefringent effect. Therefore, when the panel is seen from left, it is seen black. By contrast, the liquid crystalline molecules are aligned vertically relative to light propagating from left below to right above. The liquid crystal exerts a great birefringent effect relative to incident light, and the incident light is twisted. This results in nearly white display. Thus, the most critical drawback of the TN LCD is that the display state varies depending on the viewing angle.

Figure 3A:
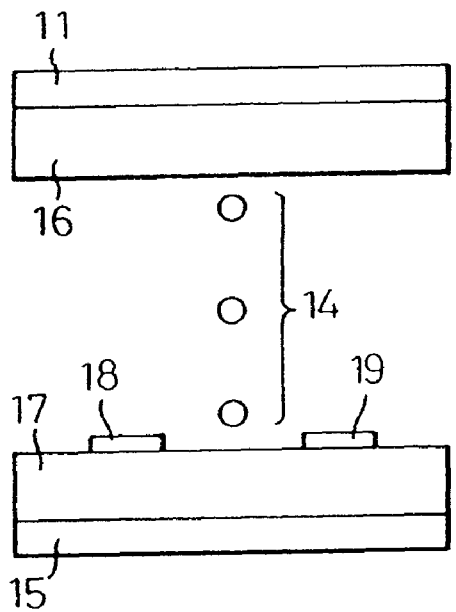
FIGS. 3A to 3D are diagrams for explaining an IPS LCD.
Figure 3C:
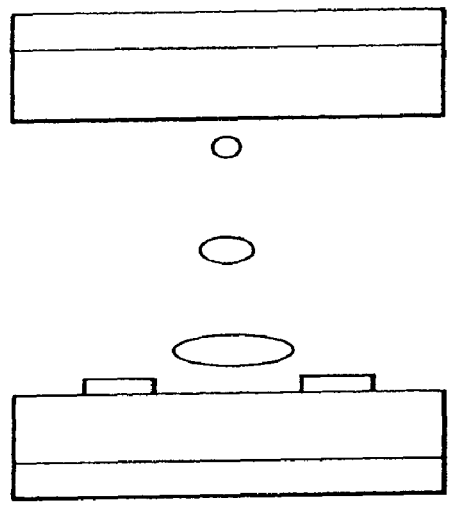
Figure 3B:
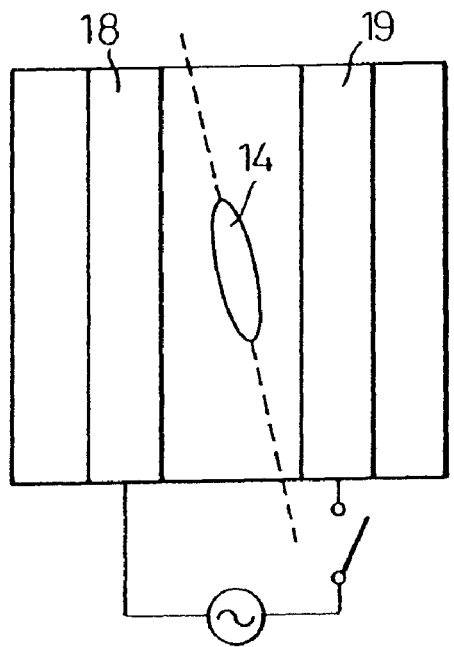
Figure 3D:
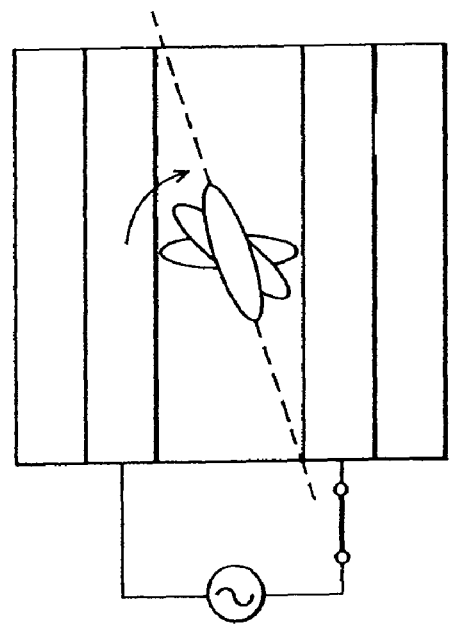

In an effort to solve the above problem, Japanese Examined Patent Publication (Kokai) Nos. 53-48452 and 1-120528 have proposed an LCD adopting a mode referred to as an IPS mode. FIGS. 3A to 3D are diagrams for explaining the IPS LCD. FIG. 3A is a side view of the LCD with no voltage applied, FIG. 3B is a top view thereof with no voltage applied, FIG. 3C is a side view thereof with a voltage applied, and FIG. 3D is a top view with a voltage applied. In the IPS mode, as shown in FIGS. 3A to 3D, slit-like electrodes 18 and 19 are formed in one substrate 17, and liquid crystalline molecules existent in a gap between the slit-like electrodes are driven with electric fields induced by a transverse electric wave. A material exhibiting positive dielectric anisotropy is used to make a liquid crystal 14. When no electric field is applied, an alignment film is rubbed in order to align the liquid crystalline molecules homogeneously so that the major axes of the liquid crystalline molecules will be nearly parallel to the longitudinal direction of the electrodes 18 and 19. In the illustrated example, the liquid crystalline molecules are homogeneously aligned with an azimuth of 15° relative to the longitudinal direction of the slit-like electrodes in order to make a direction (direction of turn), to which the orientation of the liquid crystal is changed with application of a voltage, constant. In this state, when a voltage is applied to the slit-like electrodes, as shown in FIG. 3C, liquid crystalline molecules existent near the slit-like electrodes change their orientation so that the major axes thereof will be turned 90° relative to the longitudinal direction of the slit-like electrodes. However, since the other substrate 16 is orientationally processed so that liquid crystalline molecules will be aligned with an azimuth of 15° relative to the longitudinal direction of the slit-like electrodes, liquid crystalline molecules near the substrate 16 are aligned so that the major axes thereof will be nearly parallel to the longitudinal direction of the electrodes 18 and 19. The liquid crystalline molecules are therefore aligned while twisted from the upper substrate 16 to the lower substrate 17. In this kind of liquid crystal display, when the sheet polarizers 11 and 15 are placed on and under the substrates 16 and 17 respectively so that the axes of transmission thereof will be orthogonal to each other. When the axis of transmission of one sheet polarizer is made parallel to the major axes of the liquid crystalline molecules, black display can be attained with no voltage applied, and white display can be attained with a voltage applied.

As mentioned above, the IPS mode is characterized in that the liquid crystalline molecules do not erect themselves but turned in a transverse direction. In the TN mode or the like, when the liquid crystalline molecules erect themselves, the birefringent property of the liquid crystal varies depending on a direction of an viewing angle and a problem occurs. When the liquid crystalline molecules are turned in the transverse direction, the birefringent property hardly varies depending on a direction. This results in very good viewing angle characteristics. However, the IPS mode has another problems. One of the problems is that a response speed is quite low. The reason why the response speed is low is that although a gap between electrodes in the normal TN mode in which liquid crystalline molecules are turned is 5 micrometers, the gap in the IPS mode is 10 micrometers or more. The response speed can be raised by narrowing the gap between the electrodes. However, since electric fields of opposite polarities must be applied to the adjoining electrodes in the IPS mode, when the gap between the electrodes is narrowed, a short circuit occurs to bring about a display defect. For this reason, the gap between the electrodes cannot be narrowed very much. Besides, when the gap between the electrodes is narrowed, the ratio in area of the electrodes to display gets large. This poses a problem that a transmittance cannot be improved.

As mentioned above, the IPS mode suffers from slow switching. At present, when a motion picture representing a fast motion is displayed, drawbacks including a drawback that an image streams take place. In an actual panel, therefore, for improving the response speed, as shown in FIGS. 3B and 3D, the alignment film is not rubbed parallel to the electrodes but rubbed in a direction shifted by about 15°. For realizing horizontal alignment, when an agent is merely applied to the alignment film, liquid crystalline molecules are arrayed freely leftward or rightward and cannot be aligned in a predetermined direction. Rubbing is therefore carried out for rubbing the surface of the alignment film in a certain direction so that the liquid crystalline molecules will be aligned in the predetermined direction. When rubbing is carried out in the IPS mode, if rubbing proceeds parallel to the electrodes, liquid crystalline molecules near the center in the gap between the electrodes are slow to turn to the left or right with application of a voltage, and therefore slow to respond to the application. Rubbing is therefore, as shown in FIGS. 3B and 3D, carried out in a direction shifted by about 15° in order to demolish right-and-left uniformity. However, even when the direction of rubbing is thus shifted, since the response time permitted by the IPS mode is twice longer than the one permitted by the TN mode, the response speed is very low. Moreover, when rubbing is carried out in the direction shifted by about 15°, a viewing angle characteristic of a panel does not become uniform between the right and left sides of the panel. Gray-scale reversal occurs relative to a specified angle of a viewing angle range. This problem will be described with reference to FIGS. 4 to 6B.

Figure 4:
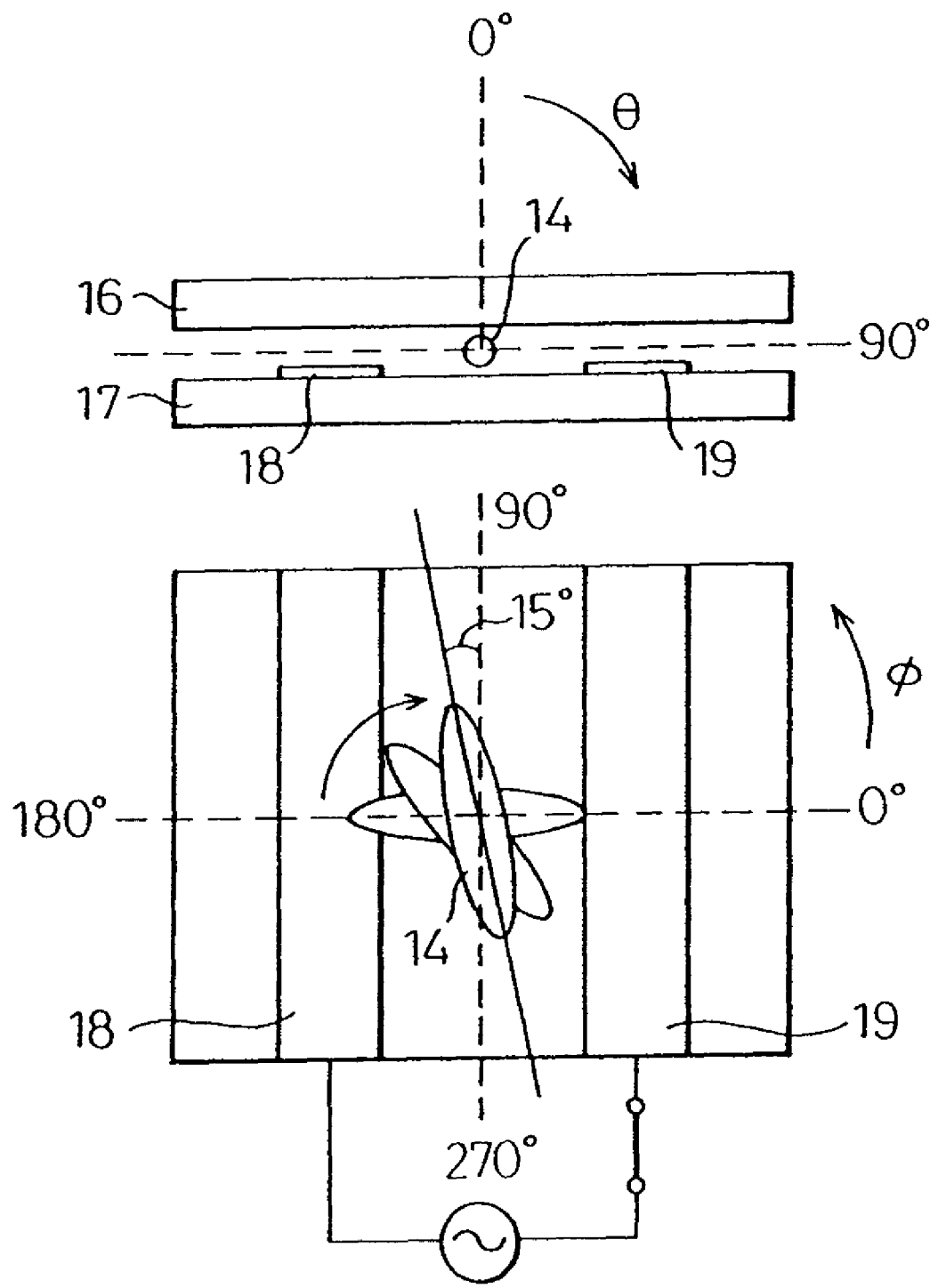
FIG. 4 is a diagram giving a definition of a coordinate system employed in studying viewing of a liquid crystal display as an example of the IPS LCD.
Figure 5:
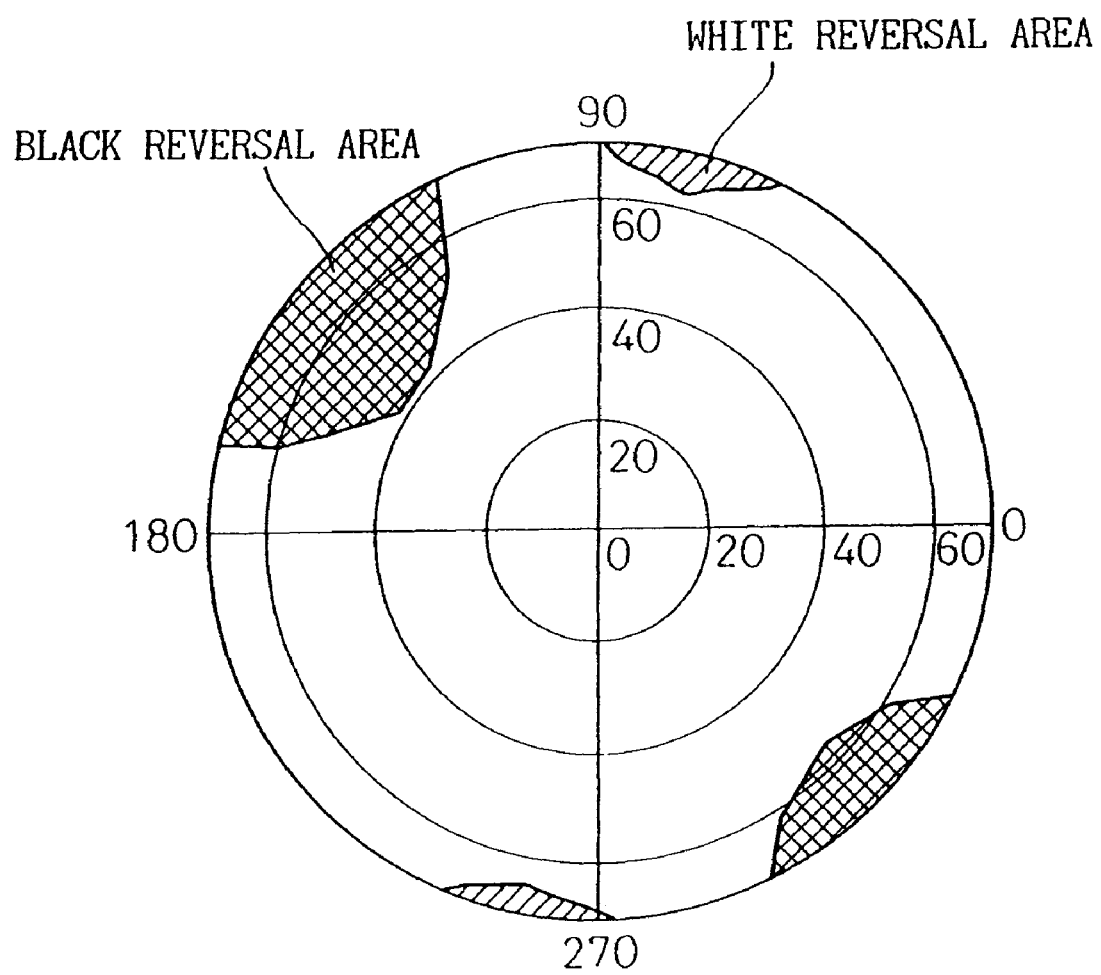
FIG. 5 is a diagram showing a gray-scale reversal areas in the IPS LCD.
Figure 6A:
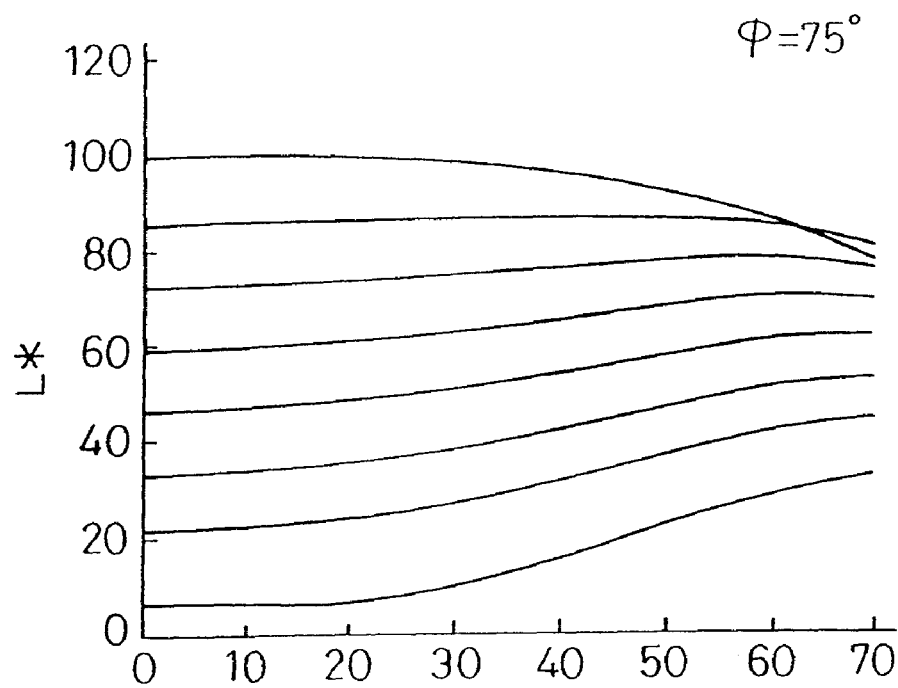
FIGS. 6A and 6B are diagrams showing examples of changes in display luminance levels of display in relation to the polar angle.
Figure 6B:
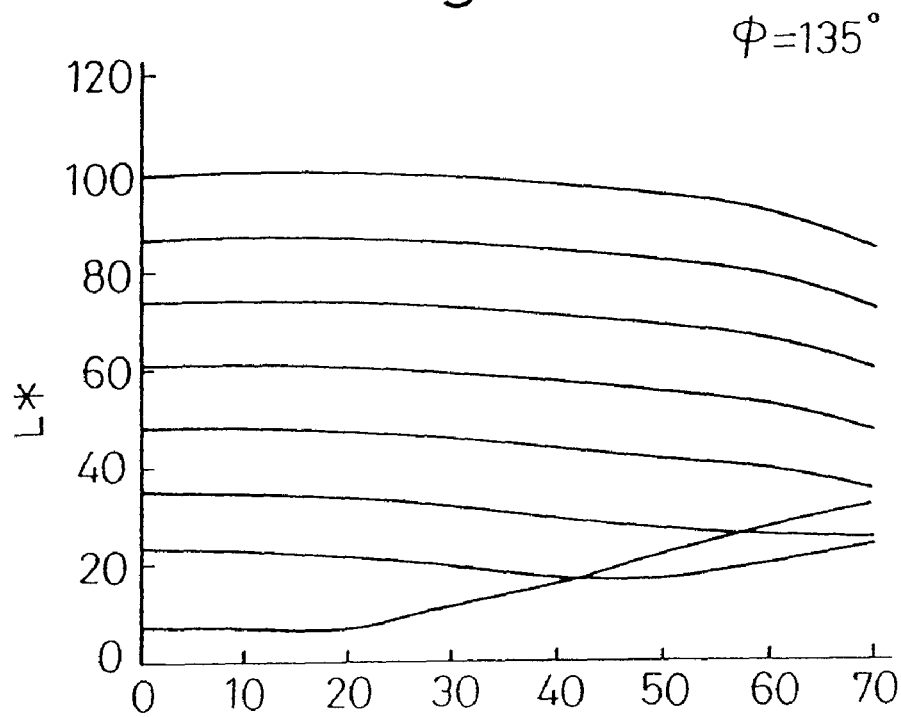

FIG. 4 is a diagram giving a definition of a coordinate system employed in studying viewing of a liquid crystal display (of the IPS type herein). As illustrated, a polar angle θ and azimuth o are defined in relation to substrates 16 and 17, electrodes 18 and 19, and a liquid crystalline molecule 4. FIG. 5 is a diagram showing a gray-scale reversal characteristic of a panel concerning a viewing angle. A gray scale from white to black is segmented into 8 gray-scale levels. Domain areas causing gray-scale reversal when a change in luminance is examined by varying the polar angle θ and azimuth Ø are shown in FIG. 5. In the drawing, reversal occurs at fours hatched areas. FIGS. 6A and 6B are diagrams showing examples of changes in luminance of display of 8 gray-scale levels in relation to the polar angle θ with the azimuths fixed to values of 75° and 135° causing reversal. White gray-scale reversal occurs at gray-scale levels associated with high luminances, that is, when white luminance deteriorates with an increasing value of the polar angle θ. Black gray-scale reversal occurs when black luminance increases with an increasing value of the polar angle θ. As mentioned, the IPS mode has a problem that gray-scale reversal occurs in four azimuths. Furthermore, the IPS mode has a problem that it is harder to manufacture the IPS LCD than the TN LCD. Thus, in the IPS mode, any of the other characteristics such as a transmittance, a response speed and productivity, is sacrificed for the viewing angle characteristic.

As mentioned above, the IPS mode that has been proposed as an alternative for solving the problem on the viewing angle characteristic of the TN mode has the problem that the characteristics offered by the IPS mode other than the viewing angle characteristic are insufficient. A vertically-aligned (VA) mode using a vertical alignment film has been proposed. FIGS. 7A to 7C are diagrams for explaining the VA mode. The VA mode is a mode using a negative liquid crystal material and vertical alignment film. As shown in FIG. 7A, when no voltage is applied, liquid crystalline molecules are aligned in a vertical direction and black display appears. As shown in FIG. 7C, when a predetermined voltage is applied, the liquid crystalline molecules are aligned in a horizontal direction and white display appears. A contrast in display offered by the VA mode is higher than that offered by the TN mode. A response speed at black level is also higher. The VA mode is therefore attracting attention as a novel mode for a liquid crystal display.

However, the VA mode has the same problem as the TN mode concerning halftone display, that is, a problem that the display state varies depending on the viewing angle. For displaying a halftone in the VA mode, a voltage lower than a voltage to be applied for white display is applied. In this case, as shown in FIG. 7B, liquid crystalline molecules are aligned in an oblique direction. As illustrated, the liquid crystalline molecules are aligned parallel to light propagating from right below point to left above. The liquid crystal is therefore seen black when viewed from the left side thereof because a birefringent effect is hardly exerted on the left side thereof. By contrast, the liquid crystalline molecules are aligned vertically to light propagating from left below to right above. The liquid crystal exerts a great birefringent effect relative to incident light, therefore, display becomes nearly white. Thus, there is the problem that the luminance varies depending the viewing angle. The VA mode provides a much higher contrast than the TN mode and is superior to the TN mode in terms of a viewing angle characteristic, because even when no voltage is applied, liquid crystalline molecules near an alignment film are aligned nearly vertically. However, the VA mode is not certainly superior to the IPS mode in terms of the viewing angle characteristic.

Figure 8A:
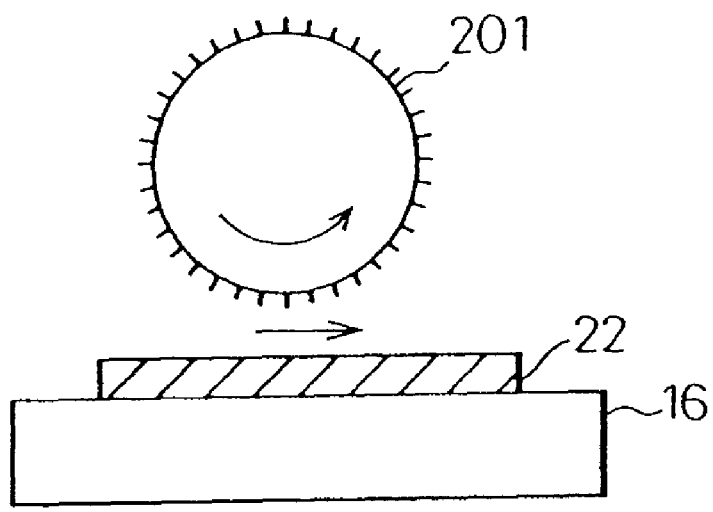
FIGS. 8A to 8C are diagrams for explaining rubbing treatment.
Figure 8B:
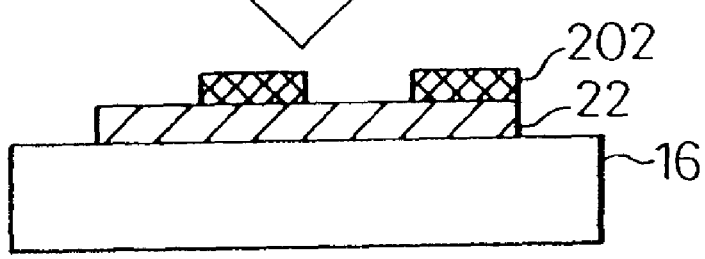
Figure 8C:
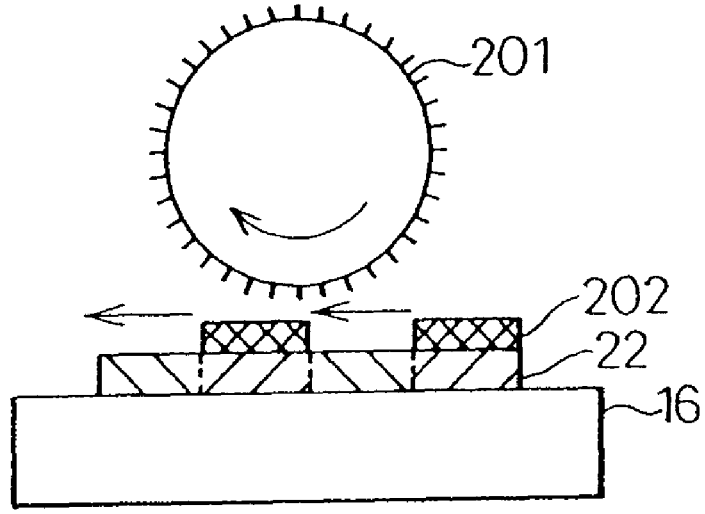

It is known that viewing angle performance of a liquid crystal display device (LCD) in the TN made can be improved by setting the orientation directions of the liquid crystalline molecules inside pixels to a plurality of mutually different directions. Generally, the orientation direction of the liquid crystalline molecules (pre-tilt angles) which keep contact with a substrate surface in the TN mode are restricted by the direction of a rubbing treatment applied to the alignment film. The rubbing treatment is a processing which rubs the surface of the alignment film in one direction by a cloth such as rayon, and the liquid crystalline molecules are orientated in the rubbing direction. Therefore, viewing angle performance can be improved by making the rubbing direction different inside the pixels. FIGS. 8A to 8C show a method of making the rubbing direction different inside the pixels. As shown in this drawing, an alignment film 22 is formed on a glass substrate 16 (whose electrodes, etc., are omitted from the drawing). This alignment film 22 is then bought into contact with a rotating rubbing roll 201 to execute the rubbing treatment in one direction. Next, a photo-resist is applied to the alignment film 22 and a predetermined pattern is exposed and developed by photolithography. As a result, a layer 202 of the photo-resist which is patterned is formed as shown in the drawing. Next, the alignment film 22 is brought into contact with a rubbing roll 201 that is rotating to the opposite direction to the above so that only the open portions of the pattern are rubbed. In this way, a plurality of regions that are subjected to the rubbing treatment in different directions are formed inside the pixel, and the orientation directions of the liquid crystal become plural inside the pixel. Incidentally, the rubbing treatment can be done in arbitrarily different directions when the alignment film 22 is rotated relative to the rubbing roll 201.

Though the rubbing treatment has gained a wide application, it is the treatment that rubbs and consequently, damages, the surface of the alignment film and involves the problem that dust is likely to occur.

A method which forms a concavo-convex pattern on an electrode is known as another method of restricting the pre-tilt angle of the liquid crystalline molecules in the TN mode. The liquid crystalline molecules in the proximity of the electrodes are orientated along the surface having the concavo-convex pattern.

FIGS. 9A to 9C are diagrams for explaining the principles of the present invention. According to the present invention, as shown in FIGS. 9A to 9C, in the VA mode employing a conventional vertical alignment film and adopting a negative liquid crystal as a liquid crystal material, a domain regulating means is included for regulating the orientation of a liquid crystal in which liquid crystalline molecules are aligned obliquely when a voltage is applied so that the orientation will include a plurality of directions within each pixel. In FIGS. 9A to 9C, as the domain regulating means, electrodes 12 on an upper substrate are slitted and associated with pixels, and an electrode 13 on a lower substrate is provided with protrusions (projections) 20.

As shown in FIG. 9A, in a state in which no voltage is applied, liquid crystalline molecules are aligned vertically to the surfaces of the substrates. When an intermediate voltage is applied, as shown in FIG. 9B, electric fields oblique to the surfaces of the substrates are produced near the slits of the electrodes (edges of the electrodes). Moreover, liquid crystalline molecules near the protrusions 20 slightly tilt relative to their state attained with no voltage applied. The inclined surfaces of the protrusions and the oblique electric fields determine the directions in which the liquid crystalline molecules are tilted. The orientation of the liquid crystal is divided into different directions along a plane defined by each pair of protrusions 20 and the center of each slit. At this time, for example, light transmitted from immediately below to immediately above is affected by weak birefringence because the liquid crystalline molecules are slightly tilting. Consequently, the transmission of light is suppressed and halftone display of gray appears. Light transmitted from right above to left below is hardly transmitted by a region of the liquid crystal in which liquid crystalline molecules are tilting leftward, while the light is quite readily transmitted by a region thereof in which liquid crystalline molecules are tilting rightward. On the average, halftone display of gray appears. Light transmitted from left below to right above contributes to gray display due to the same principles. Consequently, homogeneous display can be attained in all azimuths. Furthermore, when a predetermined voltage is applied, liquid crystalline molecules become nearly horizontal as shown in FIG. 9C. White display appears. Thus, in all states of black display, halftone display, and white display, excellent display with little dependency on a viewing angle can be attained.

Figure 10A:
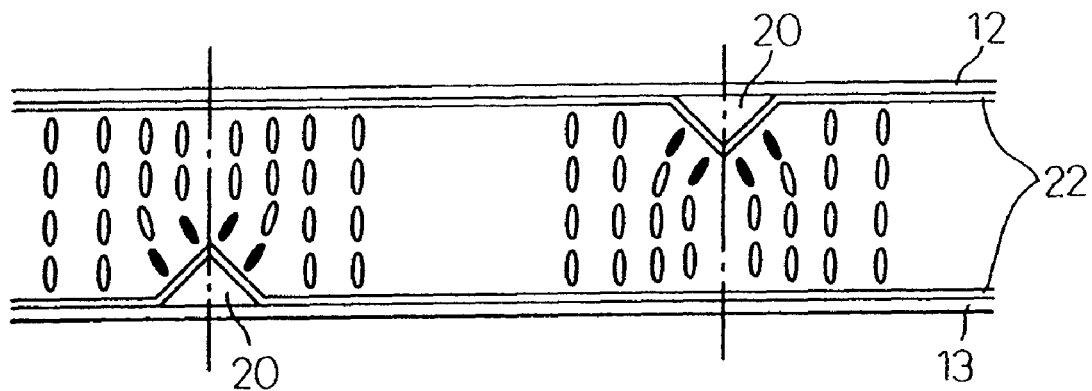
FIGS. 10A to 10C are diagrams for explaining determination of an orientation by protrusions.
Figure 10B:
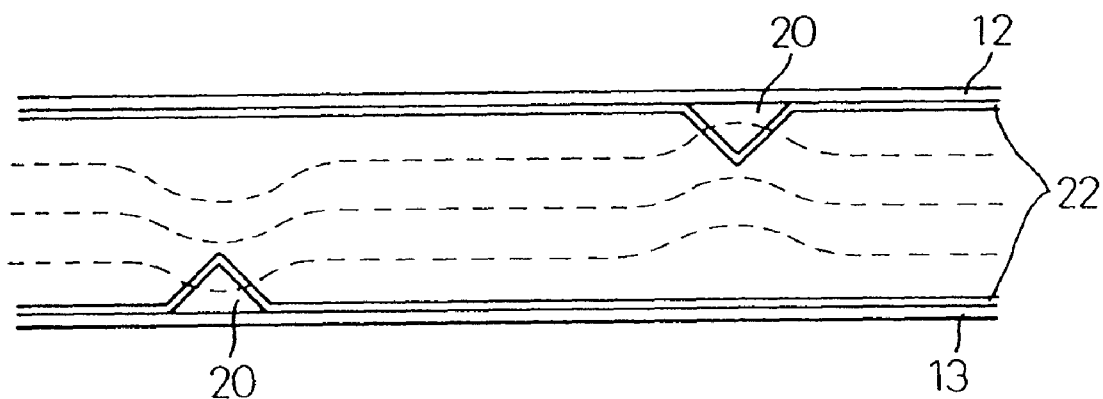

Now, FIGS. 10A and 10B are diagrams for explaining determination of an orientation by protrusions of dielectric material provided on the electrodes. In the specification, the dielectric materials are insulating materials of low dielectric. Referring to FIGS. 10A and 10B, an orientation determined by the protrusions will be discussed.

Protrusions are formed alternately on the electrodes 12 and 13, and coated with the vertical alignment films 22. A liquid crystal employed is of a negative type. As shown in FIG. 10A, when no voltage is applied, the vertical alignment films 22 cause the liquid crystalline molecules to align vertically to the surfaces of the substrates. In this case, rubbing need not be performed on the vertical alignment films. Liquid crystalline molecules near the protrusions 20 try to align vertically to the inclined surfaces of the protrusions. The liquid crystalline molecules near the protrusions are therefore tilted. However, when no voltage is applied, in almost all regions of the liquid crystal other than the protrusions, liquid crystalline molecules are aligned nearly vertically to the surfaces of the substrates. Consequently, as shown in FIG. 9A, excellent black display can appear.

When a voltage is applied, the distribution of electric potentials in the liquid-crystal layer is as shown in FIG. 10B. In the regions of the liquid-crystal layer without the protrusions, the distribution is parallel to the substrates (electric fields are vertical to the substrates). However, the distribution is inclined near the protrusions. When a voltage is applied, as shown in FIGS. 7B and 7D, the liquid crystalline molecules tilt according to an electric field strength. Since the electric fields are vertical to the substrates, when a direction of tilt is not defined by carrying out rubbing, the azimuth in which the liquid crystalline molecules tilt due to the electric fields includes all directions of 360°. If there are pre-tilted liquid crystalline molecules as shown in FIG. 10A, surrounding liquid crystalline molecules are tilted in the directions of the pre-tilted liquid crystalline molecules. Even when rubbing is not carried out, the directions in which the liquid crystalline molecules lying in gaps between the protrusions can be restricted to the azimuths of the liquid crystalline molecules in contact with the surfaces of the protrusions. As shown in FIG. 10B, the electric fields near the protrusions are inclined in directions in which they become parallel to the inclined surfaces of the protrusions. When a voltage is applied, the negative liquid crystalline molecules are tilted in directions vertical to the electric fields. The directions correspond to the directions in which the liquid crystalline molecules are pretilted because of the protrusions. Thus, the liquid crystalline molecules are aligned on a stabler basis. The slope of the protrusions and the electric fields in the proximity of the inclined surfaces of the protrusions contribute to stable alignment. Furthermore, when a higher voltage is applied, the liquid crystalline molecules become nearly parallel to the substrates.

As mentioned above, the protrusions fill the role of a trigger for determining azimuths in which the liquid crystalline molecules are aligned with application of a voltage. The protrusions need not have inclined surfaces (slopes) of large area. For example, the inclined surfaces over the whole pixel are unnecessary. However, if the size of the inclined surfaces is too small, the effect of the slope and electric field are not available. Therefore, the width of the inclined surfaces are required to be determined according to the materials and shape of the protrusions. Because a good result is obtained when the width of the protrusions is 5 μμm. This means that when the width of the protrusions is larger than 5 μm, a good result can be certainly obtained. With small inclined surfaces, when no voltage is applied, the liquid crystalline molecules in almost all the regions of the liquid-crystal layer except the protrusions are aligned vertically to the surfaces of the substrates. This results in nearly perfect black display. Thus, a contrast ratio can be improved.

When the sections of the protrusions are rectangular, the side surfaces are almost vertical to the substrates. These side surfaces also operate as the domain regulating means. Therefore, the surfaces vertical to the substrates are included in the inclined surfaces.

Figure 11A:
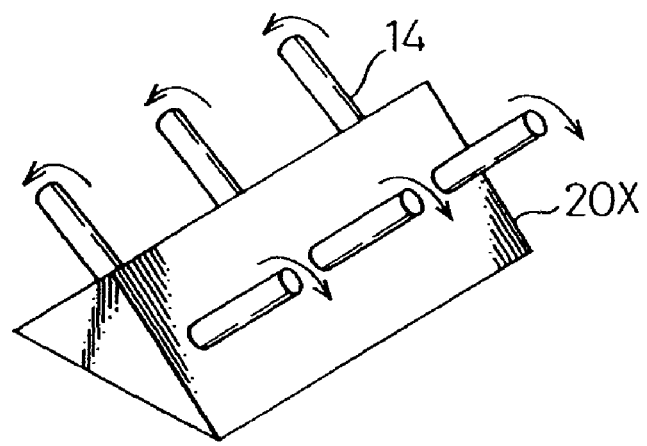
FIGS. 11A to 11C are diagrams showing examples of the protrusions.
Figure 11B:
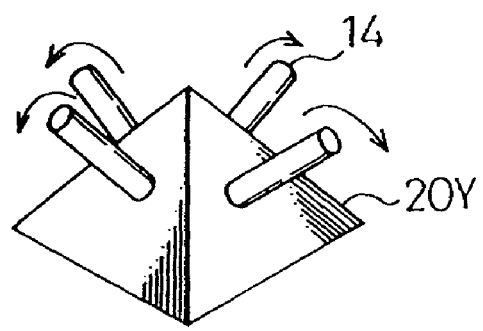
Figure 11C:
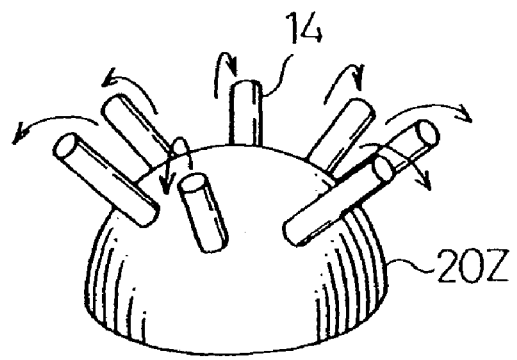

The tilting direction of the orientation of the liquid crystal is decided by domain regulating means. FIG. 11 shows the orientation direction when protrusions are used as the domain regulating means. FIG. 11A shows a bank having two slopes and the liquid crystalline molecules are oriented in two directions different from each other at an angle of 180 degrees with the bank being the boundary. FIG. 11B shows a pyramid and the liquid crystalline molecules are oriented in four directions different from one another at an angle of 90 degrees with the apex of the pyramid being the boundary. FIG. 11C shows a hemisphere and the orientation of the liquid crystalline molecules assumes symmetry of rotation with the axis of the hemisphere perpendicular to the substrate being the center. In the case of FIG. 11C, the display state becomes the same for all the viewing angles. However, it cannot be said that a larger number of domains or directions is better. When the relationship to the direction of polarization offered by a sheet polarizer is taken into account, if the oblique orientation of the liquid crystal becomes rotationally symmetrical, there arises a problem that light use efficiency deteriorates. This is because when domains in the liquid crystal are defined uninterruptedly and radially, liquid crystalline molecules lying along a transmission axis and absorption axis of the sheet polarizer work inefficiently, and liquid crystalline molecules lying in directions of 45° with respect to the axes work most efficiently. For improving the light use efficiency, the directions included in the oblique orientation of the liquid crystal are mainly four directions or less. When there are four directions, they should preferably be directions in which light components to be projected on the display surface of the liquid crystal display propagate with azimuths mutually different in increments of 90°. In this case, the ratio in number of liquid crystalline molecules aligned in directions in which light components to be projected on the display surface propagate with azimuth mutually different by 180° should preferably be nearly even. Out of two sets of liquid crystalline molecules aligned in the directions in which the light components to be projected on the display surface propagate with azimuths mutually different by 180°, the ratio in number of aligned liquid crystalline molecules of one set is nearly even, while the ratio in number of aligned liquid crystalline molecules of the other set is uneven. The set of aligned liquid crystalline molecules of which ratio in number is nearly even is a majority, and the set of aligned liquid crystalline molecules of which ratio in number is uneven may be negligible. In other words, a characteristic analogous to that exhibited when two domains are defined in 180° different directions can be realized.

Figure 12A:
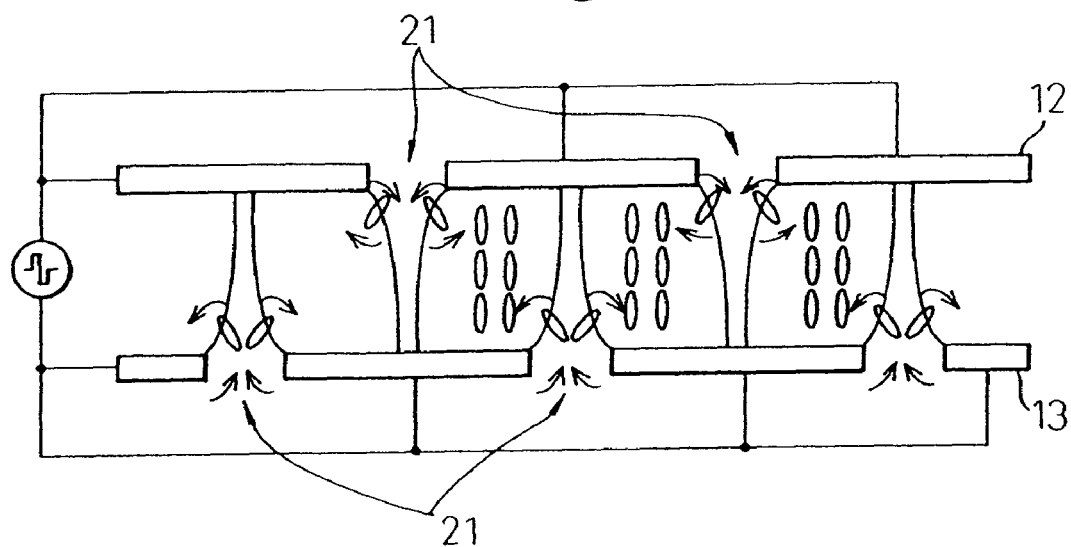
FIGS. 12A to 12C are diagrams showing examples of realizing the domain regulating means.
Figure 12B:
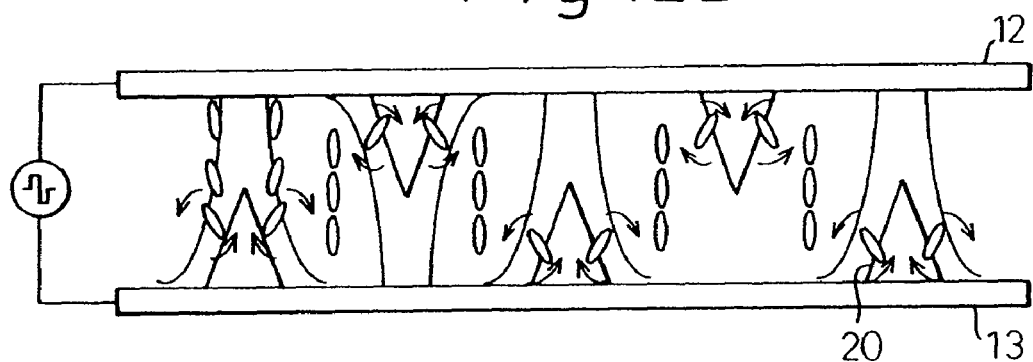
Figure 12C:
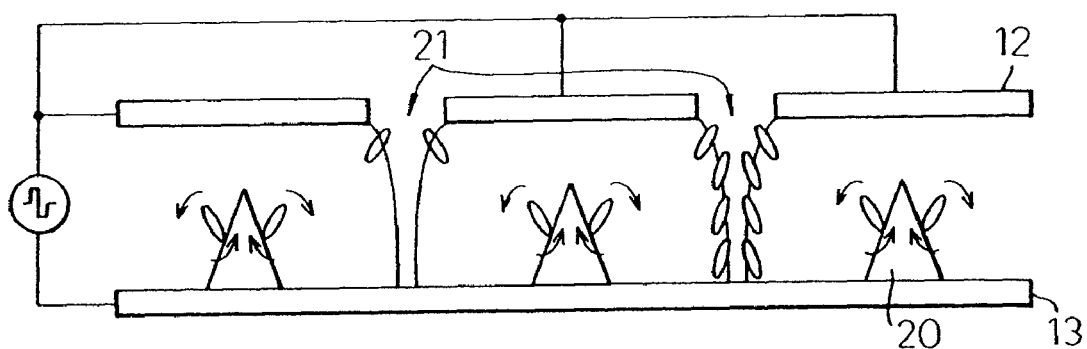

In FIGS. 9A to 9C, for realizing the domain regulating means, the electrodes 12 on the upper substrate are slitted and associated with pixels, and the electrode 13 on the lower substrate is provided with the protrusions 20. Any other means will also do. FIGS. 12A to 12C are diagrams showing examples of realizing the domain regulating means. FIG. 12A shows an example of realizing it by devising the shapes of the electrodes, FIG. 12B shows an example of devising the contours of the surfaces of the substrates, and FIG. 12C shows an example of devising the shapes of the electrodes and the contours of the surfaces of the substrates. In any of the examples, the orientations shown in FIG. 8 can be attained. However, the structures of liquid crystals are a bit different from one another.

In FIG. 12A, ITO electrodes 41 and 42 on both substrates or one of the substrates are slitted. The surfaces of the substrates are processed for vertical alignment, and a negative liquid crystal is sealed in. When no voltage is applied, liquid crystalline molecules are aligned vertically to the surfaces of the substrates. When a voltage is applied, electric fields are generated obliquely to the surfaces of the substrates near the slits (edges) of the electrodes. With the oblique electric fields, the directions in which liquid crystalline molecules are tilted are determined. The orientation of the liquid crystal is divided as illustrated into right and left directions. In this example, the oblique electric fields induced near the edges of the electrodes are used to align the liquid crystalline molecules rightward and leftward. This technique shall therefore be referred to as an oblique electric field technique.

In FIG. 12B, protrusions 20 are formed on both the substrates. Like the structure shown in FIG. 12A, the surfaces of the substrates are processed for vertical alignment, and a negative liquid crystal is sealed in. When no voltage is applied, the liquid crystalline molecules are aligned vertically to the surfaces of the substrates in principles. On the inclined surfaces of the protrusions, however, the liquid crystalline molecules are aligned at a little tilt. When a voltage is applied, the liquid crystalline molecules are aligned in the directions of tilt. Moreover, when an insulating material with low dielectric constant is used to form the protrusions, the electric fields are interrupted (state close to the state attained by the oblique electric field technique, the same state as the state attained by the structure having the electrodes slitted). More stable orientation division can be achieved. This technique shall be referred to as a both-side protrusion technique.

FIG. 12C shows an example of combining the techniques shown in FIGS. 12A and 12B. The description will be omitted.

Three examples of realizing the domain regulating means have been presented. Moreover, various modifications can be devised. For example, the portions of the electrodes formed as the slits in FIG. 12A may be dented, and the dents may be provided with inclined surfaces. Instead of making the protrusions in FIG. 12B using an insulating material, protrusions may be formed on the substrates, and ITO electrodes may be formed on the substrates and protrusions. Thus, the electrodes having the protrusions may be realized. Even this structure can regulate the orientation of the liquid crystal. Moreover, dents may be substituted for the protrusions. Furthermore, any of the described domain regulating means may be formed on one of the substrates. When domain regulating means are formed on both the substrates, any pair of domain regulating means can be employed. Moreover, although the protrusions or dents should preferably be designed to have inclined surfaces, the protrusions or dents having vertical surfaces can also exert an effect of a certain level.

When the protrusions are formed, during black display, parts of the liquid crystal lying in the gaps between the protrusions are seen black, but light leaks out through parts thereof near the protrusions. This kind of partial difference in display is microscopic and indiscernible by naked eyes. The whole display exhibits averaged display intensity. The density for black display deteriorates a bit, whereby contrast deteriorates. When the protrusions are made of a material not allowing passage of visible light, contrast can be further improved.

When a domain regulating means is formed on one substrate or both substrates, protrusions, dents, or slits can be formed like a unidirectional lattice with a predetermined pitch among them. In this case, when the protrusions, dents, or slits are a plurality of protrusions, dents, or slits bent at intervals of a predetermined cycle, orientation division can be achieved more stably. Moreover, when the protrusions, dents, or slits are located on both substrates, they should preferably be arranged to be offset by a half pitch.

In the constitution disclosed in Japanese Unexamined Patent Publication (Kokai) No. 6-301036, apertures (slits) are provided on only the counter (CF) substrate. Therefore, the size of domain areas cannot be too small. Contrarily, according to the present invention, the size of domain areas can be optionally determined because the domain regulating means are provided on both of the pixel electrode and counter electrode. Further, at least one of the domain regulating means has inclined surfaces, the response speed can be improved.

On one of two upper and lower substrates, protrusions or dents may be formed like a two-dimensional lattice. On the other substrate, protrusions or dents may be arranged to be opposed to the centers of squares of the two-dimensional lattice.

In any case, it is required that orientation division occurs within each pixel. The pitch of the protrusions, dents, or slits must be smaller than that of pixels.

The results of examining the characteristics of an LCD in which the present invention is implemented demonstrate that a viewing angle characteristic is quite excellent and equal to or greater than those of not only a TN LCD but also an IPS LCD. Even when the LCD is viewed from its front side, the viewing angle characteristic is quite excellent, and the contrast ratio is 400 or more (twice as high as that offered by the TN LCD). The transmittance offered by the TN LCD is 30%, the one offered by the IPS LCD is 20%, and the one offered by the present invention is 25%. The transmittance offered by the present invention is lower than the one offered by the TN LCD but higher than the one offered by the IPS LCD. A response speed is outstandingly higher than those offered by the other modes. For example, as far as equivalent panels are concerned, a TN LCD panel exhibits an on speed (for transition from 0 V to 5 V) of 23 ms, an off speed (for transition from 5 V to 0 V) of 21 ms, and a response speed (on+off) of 44 ms, while an IPS LCD panel exhibits an on speed of 42 ms, an off speed of 22 ms, and a response speed of 64 ms. According to the mode of the present invention, the on speed is 9 ms, the off speed is 6 ms, and the response speed is 15 ms. Thus, the response speed is 2.8 times higher than the one offered by the TN mode and 4 times higher than the one offered by the IPS mode, and is a speed causing no problem in display of a motion picture.

Furthermore, in the mode of the present invention, when no voltage is applied, vertical alignment is achieved. When a voltage is applied, protrusions, dents, or oblique electric fields determine directions in which liquid crystalline molecules tilt. Unlike the ordinary TN or IPS mode, rubbing need not be carried out. In the process of manufacturing a panel, a rubbing step is a step likely to produce the largest amount of refuse. After the completion of rubbing, substrates must be cleaned (with running water or IPA) without fail. The cleaning may damage an alignment film, causing imperfect alignment. By contrast, according to the present invention, since the rubbing step is unnecessary, the step of cleaning substrates is unnecessary.

Figure 13:
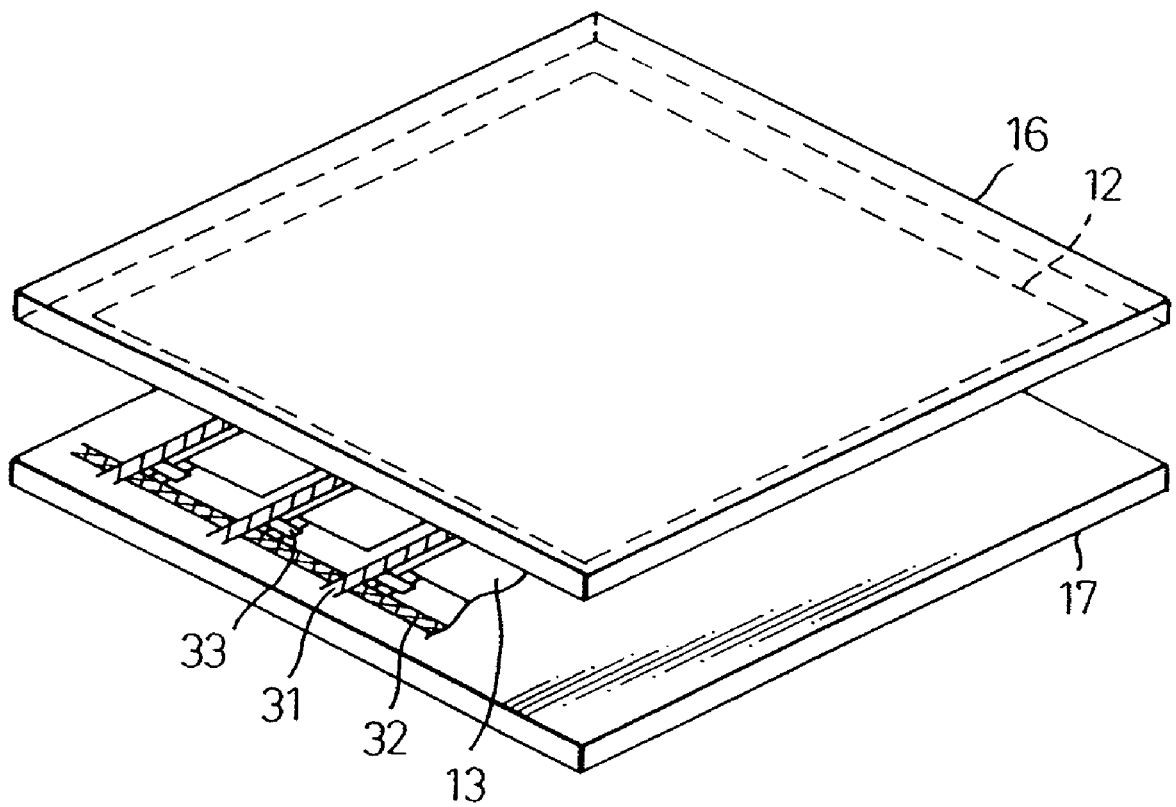
FIG. 13 is a diagram showing overall configuration of a liquid crystal panel of the first embodiment.

FIG. 13 is a diagram showing the overall configuration of a liquid crystal panel of the first embodiment of the present invention. As shown in FIG. 13, the liquid crystal panel of the first embodiment is a TFT LCD. A common electrode 12 is formed on one glass substrate 16. The other glass substrate 17 is provided with a plurality of scan bus lines 31 formed parallel to one another, a plurality of data bus lines 32 formed parallel to one another vertically to the scan bus lines, and TFTs 33 and cell electrodes 13 formed like a matrix at intersections between the scan bus lines and data bus lines. The surfaces of the substrates are processed for vertical alignment. A negative liquid crystal is sealed in between the two substrates. The glass substrate 16 is referred to as a color filter (CF) substrate because color filters are formed, while the glass substrate 17 is referred to as a TFT substrate. The details of the TFT LCD will be omitted. Now, the shapes of the electrodes which are constituent features of the present invention will be described.

Figure 14A:
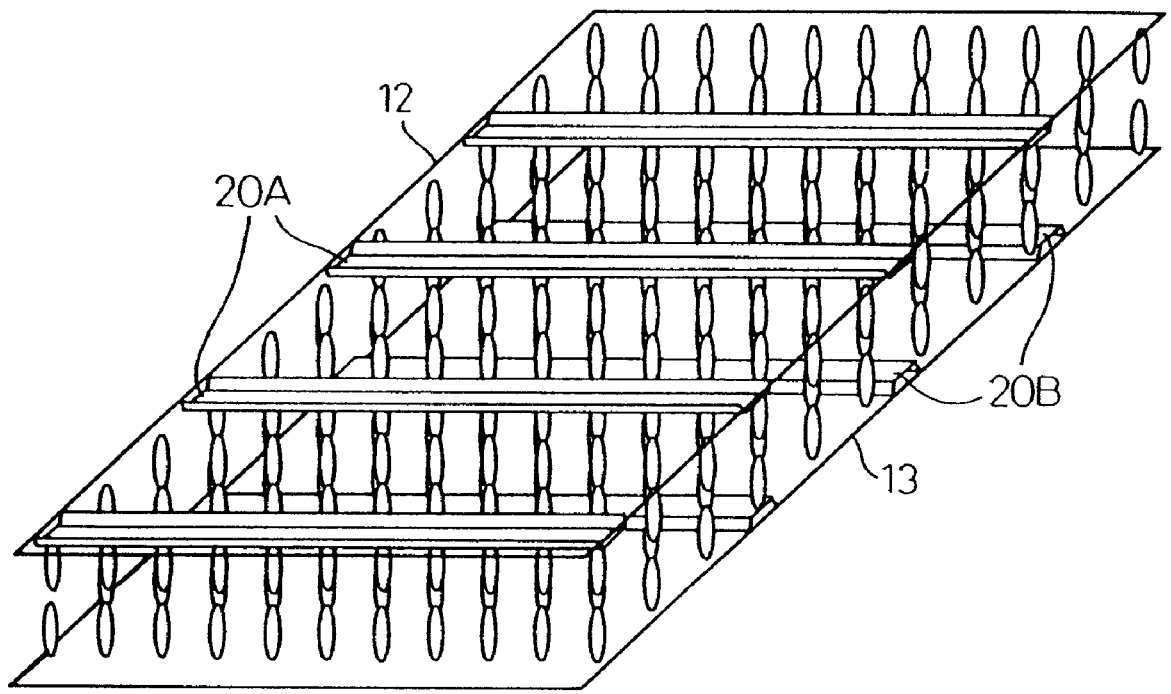
FIGS. 14A and 14B are diagrams showing the structure of a panel in accordance with a first embodiment.
Figure 14B:
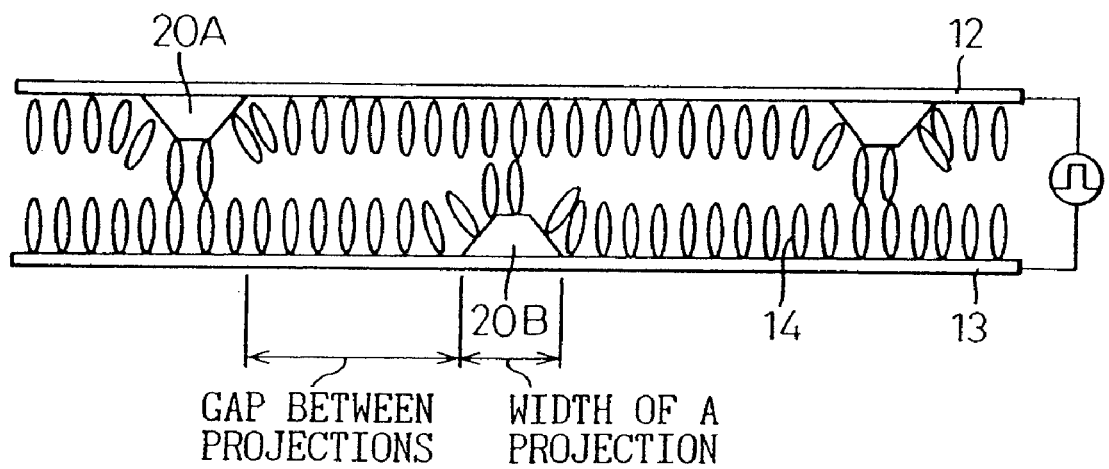
Figure 15:
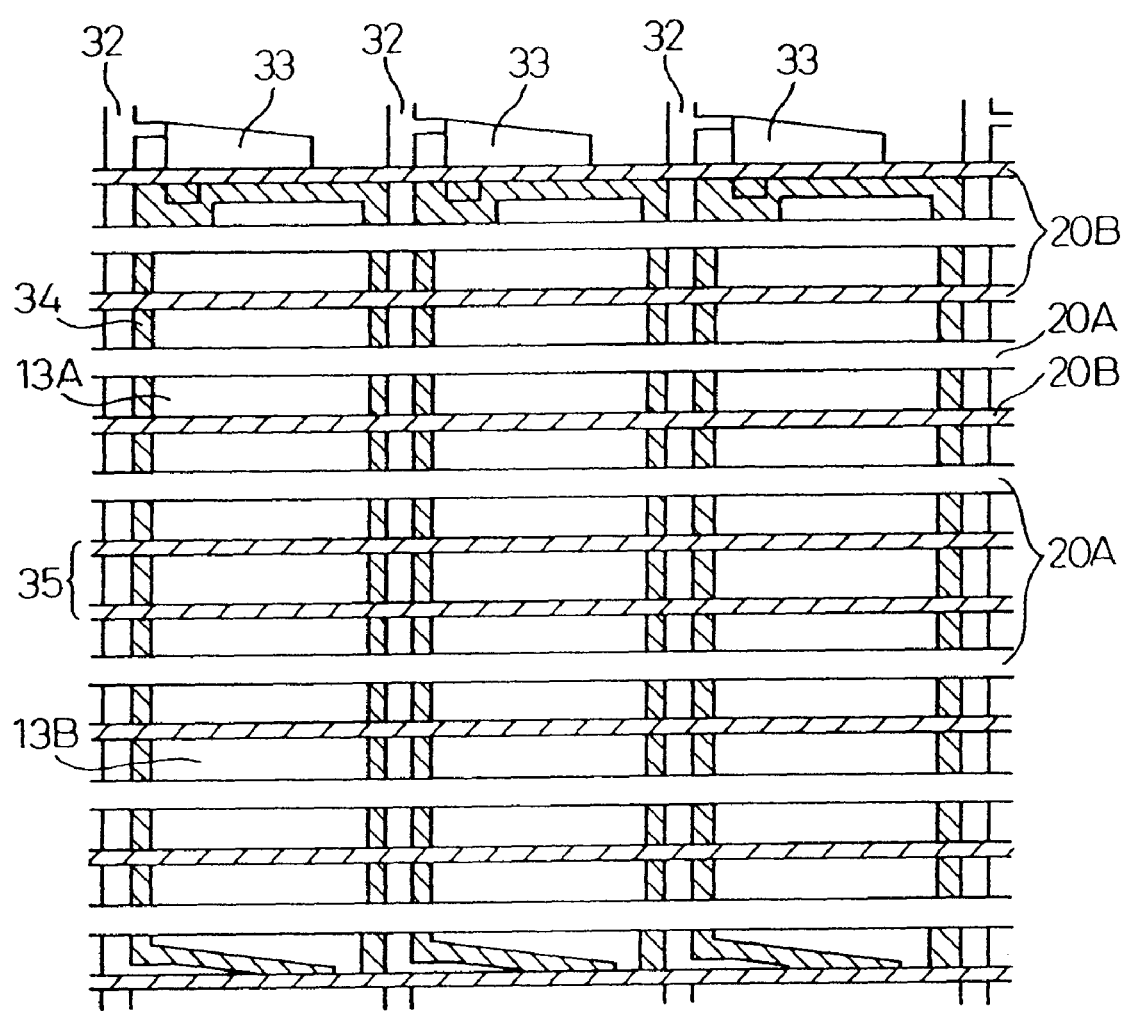
FIG. 15 is a diagram showing the relationship between a pattern of protrusions and pixels in the first embodiment.
Figure 16:
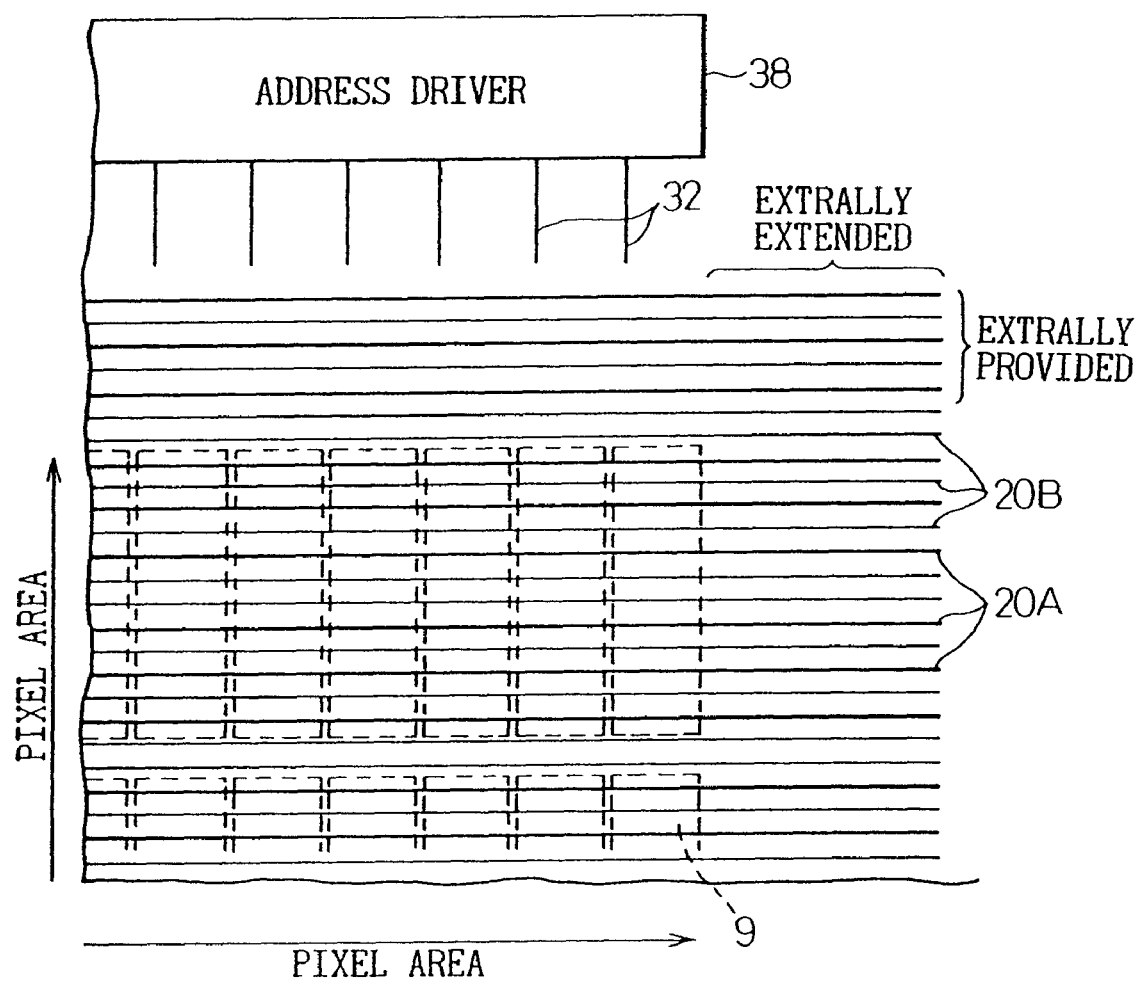
FIG. 16 is a diagram showing the pattern of protrusions outside a display area of the first embodiment.

FIGS. 14A and 14B are diagrams showing the structure of a panel in accordance with the first embodiment of the present invention. FIG. 14A is a diagram illustratively showing a state in which the panel is seen obliquely, and FIG. 14B is a side view of the panel. FIG. 15 is a diagram showing the relationship between a pattern of protrusions and pixels in the first embodiment, FIG. 16 is a diagram showing the pattern of protrusions outside a display area of a liquid crystal panel of the first embodiment, and FIG. 17 is a sectional view of the liquid crystal panel of the first embodiment.

Figure 17:
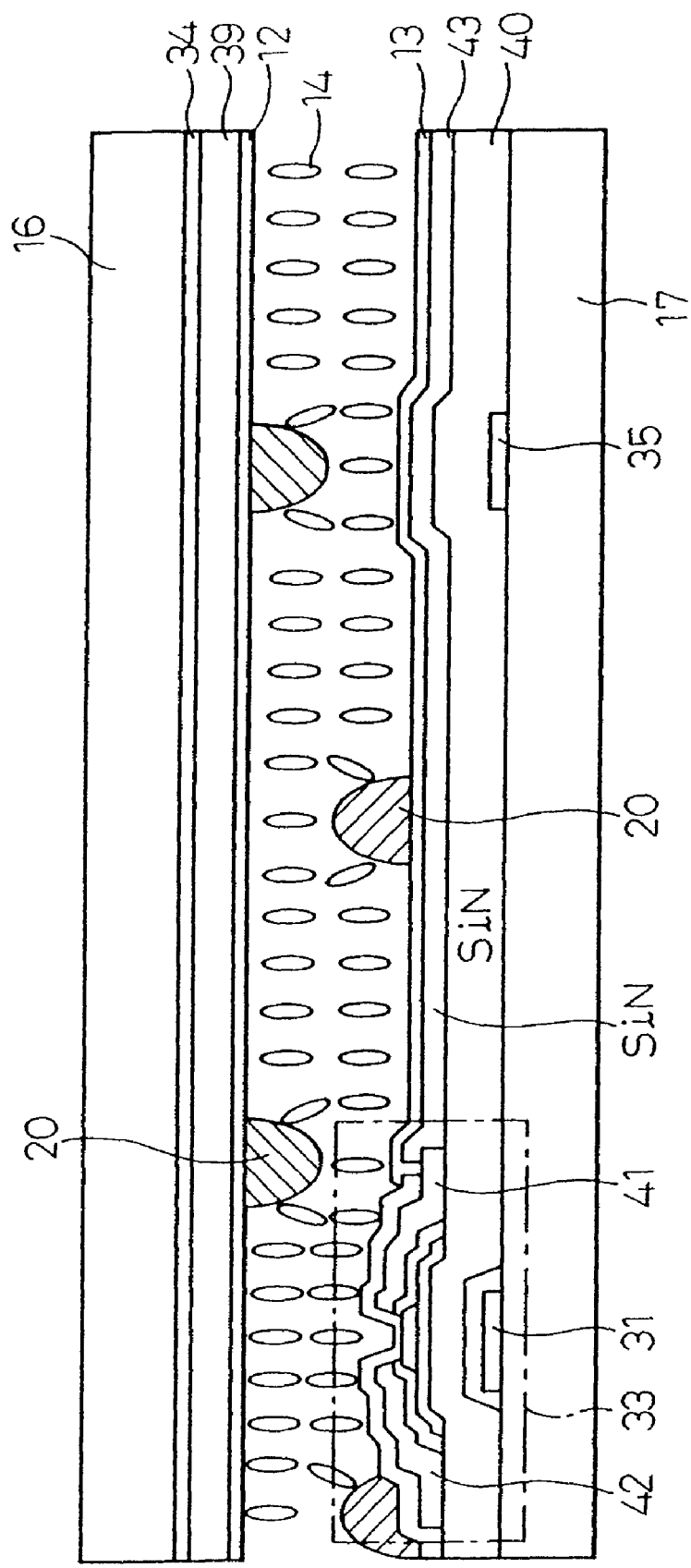
FIG. 17 is a sectional view of the LCD panel of the first embodiment.

As shown in FIG. 17, a black matrix layer 34, an ITO film 12 providing color filters and a common electrode, and protrusions 20 parallel to one another with an equal pitch among them are formed on the surface of a side of a CF substrate 16 facing a liquid crystal. The ITO film and protrusions are coated with a vertical alignment film that is omitted therein. Gate electrodes 31 forming gate bus lines, CS electrodes 35, insulating films 40 and 43, electrodes forming data bus lines, an ITO film 13 providing pixel electrodes, and protrusions parallel to one another with an equal pitch among them are formed on the surface of a side of a TFT substrate 17 facing the liquid crystal. The TFT substrate is further coated with a vertical alignment film, though the vertical alignment film is omitted from the figure. Reference numerals 41 and 42 denote a source and drain of a TFT. In this embodiment, protrusions 20A and 20B are made of a TFT flattening material (positive resist).

As shown in FIG. 14A, the pattern of the protrusions 20A and 20B is a pattern of parallel protrusions extending straightly and arranged with an equal pitch among them. The protrusions 20A and 20B are arranged to be offset by a half pitch. The structure shown in FIG. 14B is thus realized. As mentioned in conjunction with FIG. 9B, the orientation of the liquid crystal is divided into two directions to thus divide each domain into two regions.

The relationship of the pattern of protrusions to pixels is shown in FIG. 15. As shown in FIG. 15, in a general color-display liquid crystal display, three pixels of red, green, and blue constitute one color pixel. The width of each of the red, green, and blue pixels is approximately one-third of the length thereof so that color pixels can be arrayed with the same gap kept above and below them. A pixel defines each pixel electrode. Among arrayed pixel electrodes, gate bus lines (hidden behind the protrusions 20B) are laid down sideways, and data bus lines 32 are laid down lengthwise. The TFTs 33 are located near intersections between the gate bus lines 31 and data bus lines 32, whereby the pixel electrodes are interconnected. Opposed to the gate bus lines 31, data bus lines 32, and TFTs 33 included in the respective pixel electrodes 13 are black matrices 34 for intercepting light. Reference numeral 35 denotes CS electrodes used to provide a storage capacitor for stabilizing display are placed. Since the CS electrodes are light-interceptive, the CS-electrode portions of the pixel electrodes 13 do not work as pixels. Consequently, each pixel is divided into an upper part 13A and lower part 13B.

In each of the pixels 13A and 13B, three protrusions 20A are lying and four protrusions 20B are lying. Three first regions each having the protrusions 20B on the upper side of the panel and the protrusions 20A on the lower side thereof, and three second regions each having the protrusions 20A on the upper side thereof and the protrusions 201B on the lower side thereof are defined in one pixel composed of the pixels 13A and 13B. In the pixel composed of the pixels 13A and 13B, a total of six regions of the first and second regions are defined.

As shown in FIG. 16, on the margin of the liquid crystal panel, the pattern of the protrusions 20A and 20B is extending outside topmost pixels and beyond rightmost pixels. This is intended to allow orientation division to occur in the outermost pixels in the same manner as that in the inner pixels.

Figure 18A:
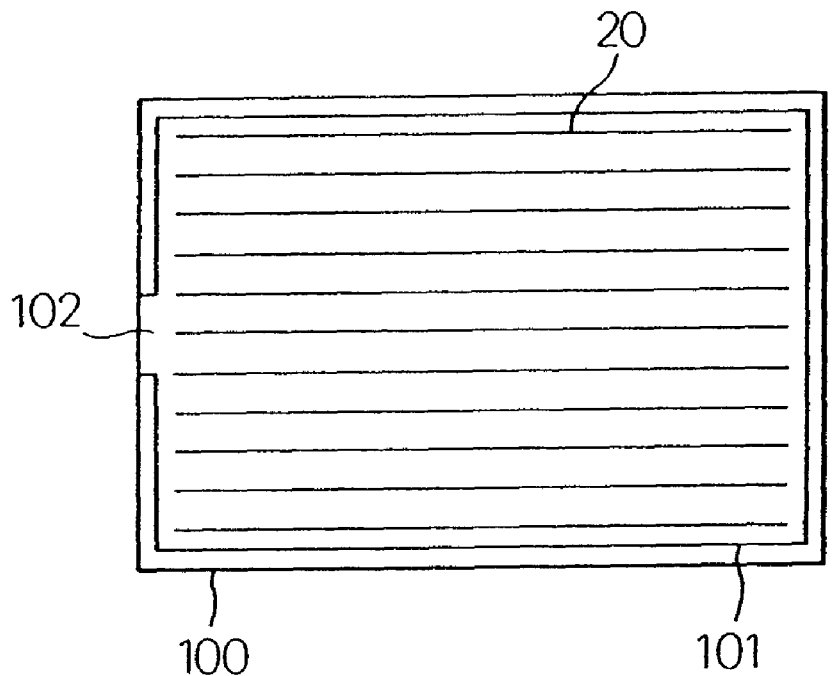
FIGS. 18A and 18B are diagrams showing the position of a liquid-crystal injection port of the LCD panel of the first embodiment.
Figure 18B:
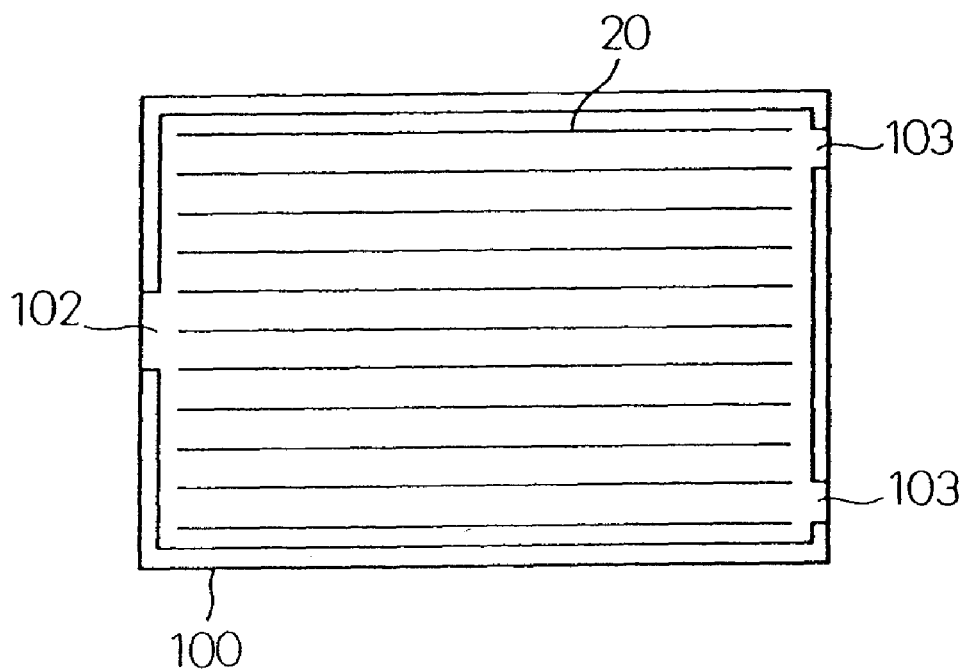

FIGS. 18A and 18B are diagrams showing the position of a liquid-crystal injection port of the liquid crystal panel 100 of the first embodiment through which a liquid crystal is injected. As described later, in the process of assembling components to produce a liquid-crystal panel, after the CF substrate and TFT substrate are bonded to each other, a liquid crystal is injected. As far as a VA type TFT LCD is concerned, it takes much time to inject a liquid crystal compared with the TN LCD in general. Since protrusions are formed, it takes much more time to inject a liquid crystal. For shortening the time required for injecting the liquid crystal, as shown in FIG. 18A, a liquid-crystal injection port 102 should preferably be formed on a side vertical to the direction in which the protrusions are arrayed parallel to one another on a cyclic basis. Reference numeral 101 denotes a sealing line.

During injection of a liquid crystal, when the interior of the panel is deaerated through exhaust ports 103 formed at another positions, the internal pressure decreases. This makes it easy to inject a liquid crystal. The exhaust ports should, as shown in FIG. 18B, be located on a side opposite to the side on which the injection port is located.

Figure 19:
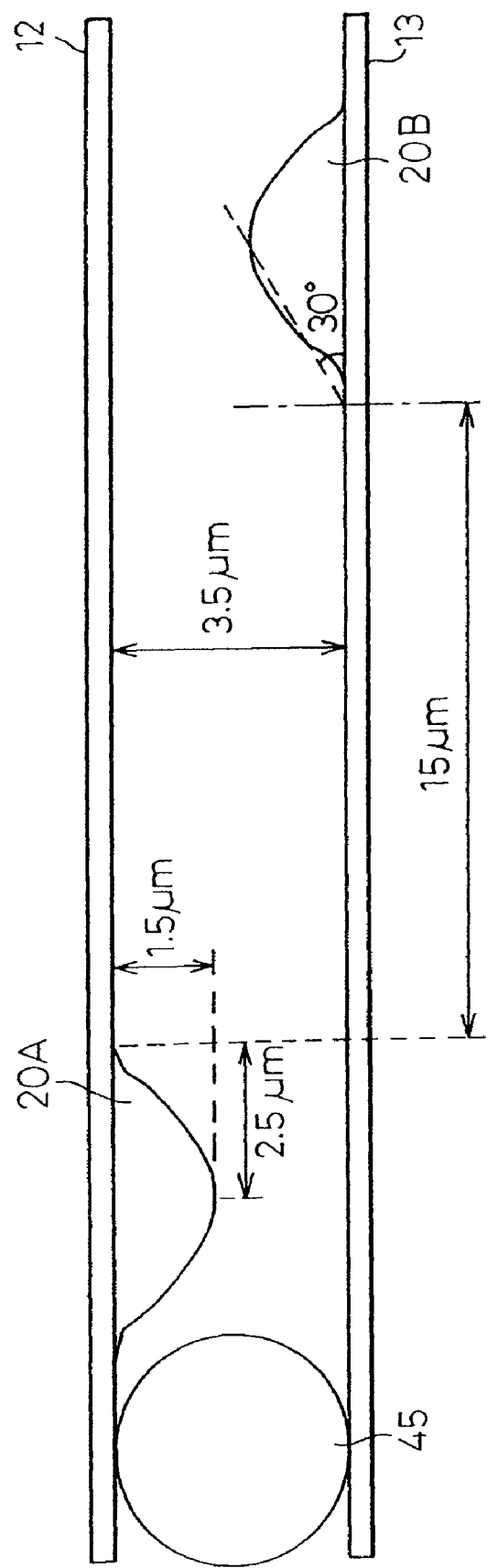
FIG. 19 is a diagram showing contours of protrusions in a prototype of the first embodiment defined by performing measurement using a tracer type coating thickness meter.

FIG. 19 shows contours of protrusions in a prototype defined by performing measurement using a tracer type coating thickness meter. As illustrated, the gap between the ITO electrodes 12 and 13 formed on the substrates is restricted to 3.5 micrometers by means of spacers 45. The protrusions 20A and 20B have a height of 1.5 micrometers and a width of 5 micrometers. A pair of upper and lower protrusions 20A and 20B are spaced by 15 micrometers. This means that a spacing between adjoining protrusions formed on the same ITO electrodes is 35 micrometers.

After an intermediate voltage is applied to the panel of the second embodiment, the interior of the panel is observed using a microscope. The observation has revealed that very stable alignment is attained.

Figure 20A:
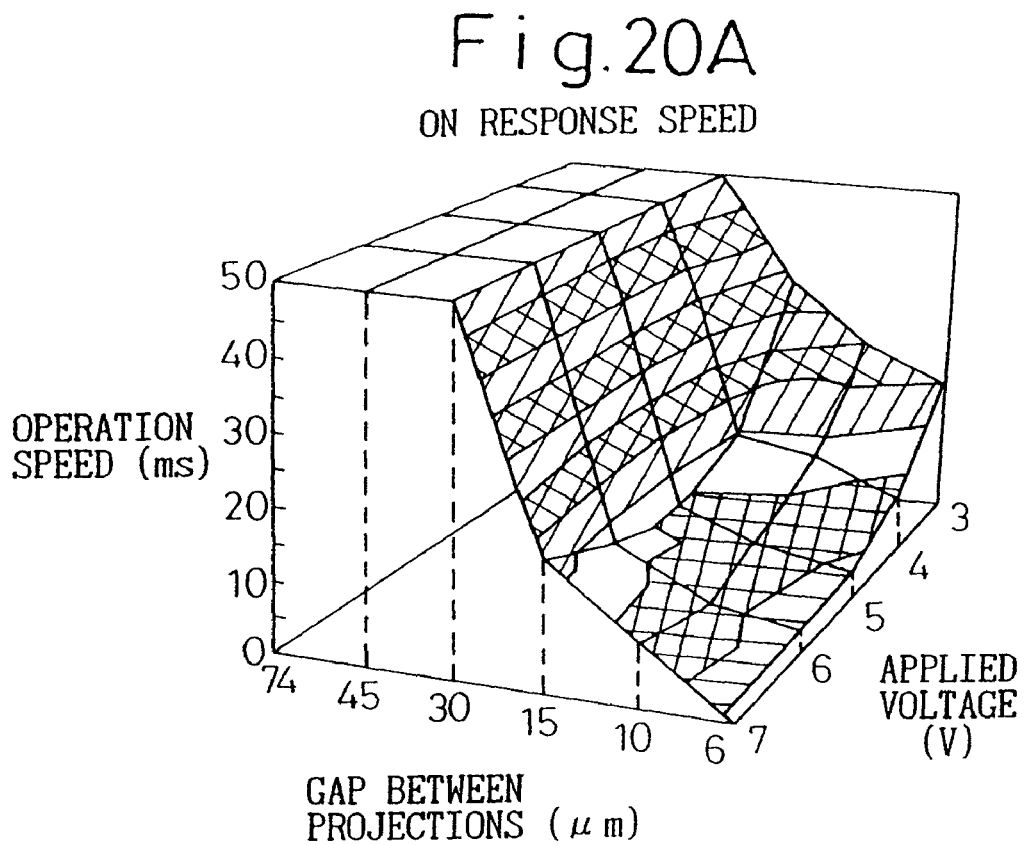
FIGS. 20A and 20B are diagrams indicating a change in response speed according to a change of spacing between protrusions in the panel of the first embodiment.
Figure 20B:
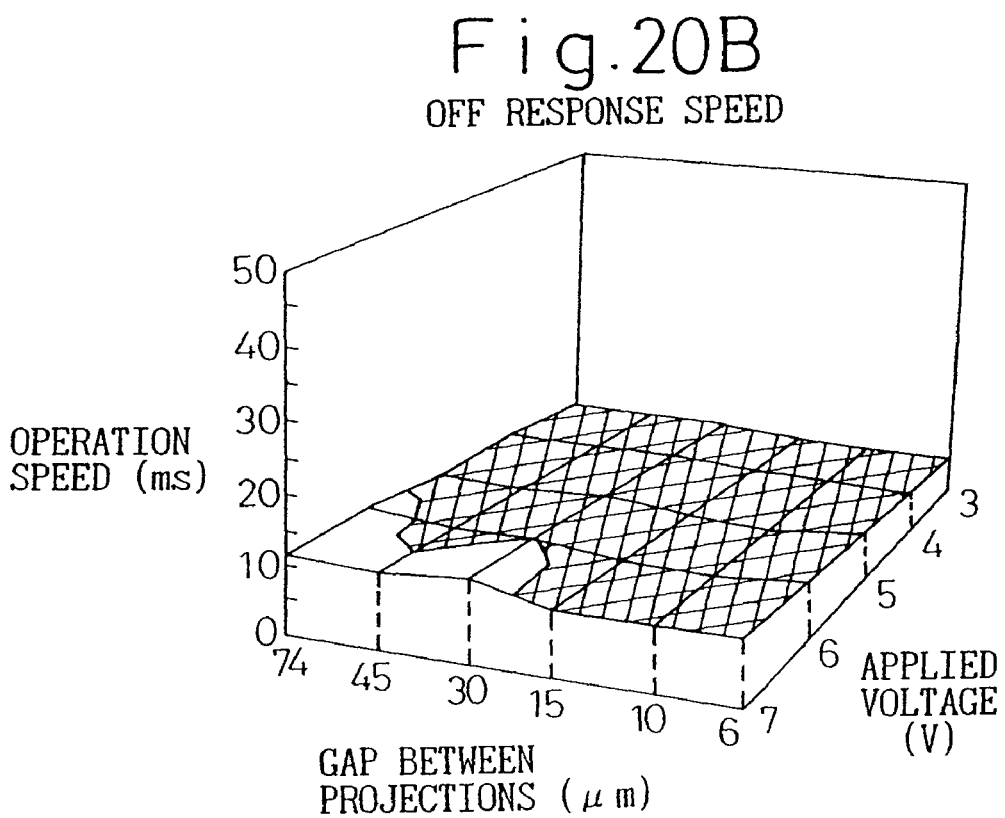
Figure 21:
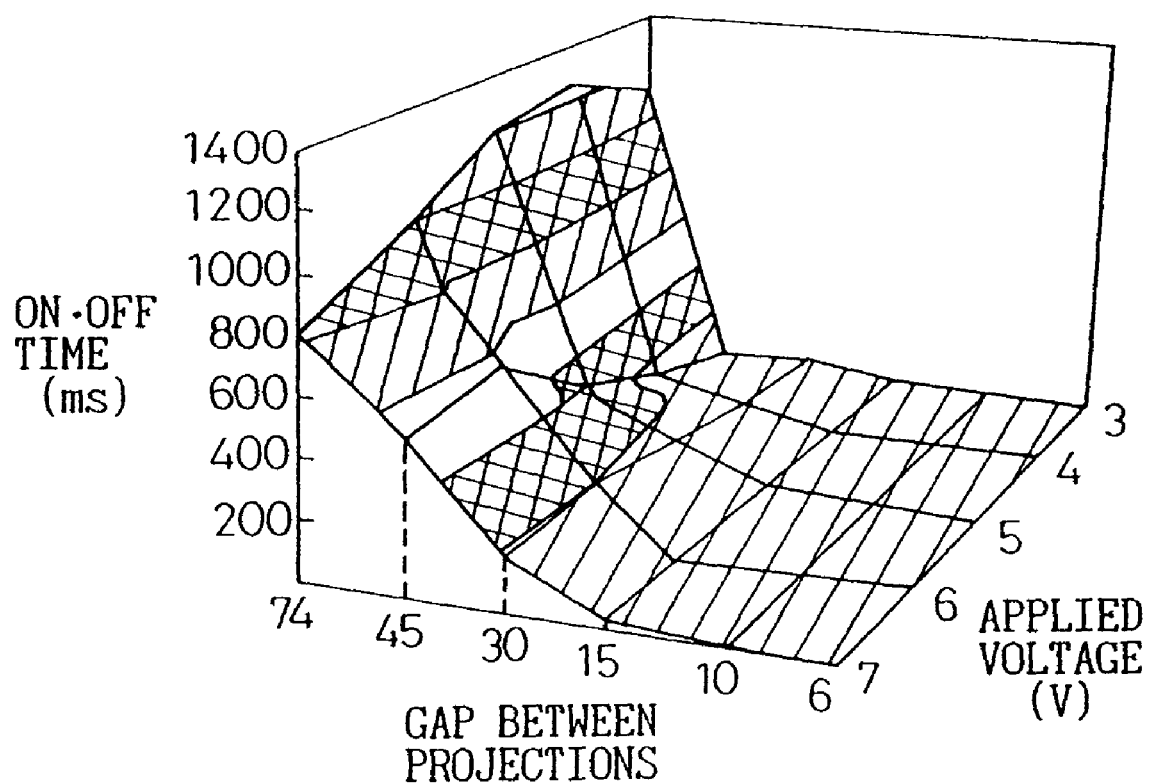
FIG. 21 is a diagram indicating a change in switching speed according to a change of spacing between protrusions in the panel of the first embodiment.

Furthermore, in the panel of the first embodiment, a response speed has quite improved. FIGS. 20A to 21 are diagrams indicating a changing value of the response speed permitted by the panel of the first embodiment in relation to changes in parameters that are an applied voltage and a spacing (gap) between upper and lower protrusions. FIG. 20A indicates an on speed (for transition from 0 to 5 V), FIG. 20B indicates an off speed (for transition from 5 to 0 V), and FIG. 21 indicates a switching speed that is a sum of the on speed and off speed. As shown in FIGS. 20A to 21, a fall time off is hardly dependent on the spacing but a rise time on varies greatly. The smaller the spacing is, the higher the response speed becomes. Incidentally, the thickness of cells is 3.5 micrometers. The practical value of the spacing varies slightly depending the thickness of cells. That is to say, when the thickness of cells is small, the spacing is widened. When the thickness of cells gets larger, the spacing is narrowed. It has been actually confirmed that as far as the spacing is about 100 times larger than the thickness of cells, liquid crystalline molecules are aligned properly.

In any case, the panel of the first embodiment permits the satisfactory switching speed. For example, when the spacing between protrusions is 15 micrometers and the thickness of cells is 3.5 micrometers, the response speed for transition between 0 and 5 V, that is, the on time on is 9 ms, the off time off is 6 ms, and the switching speed 15 ms. Thus, very fast switching can be achieved.

Figure 22:
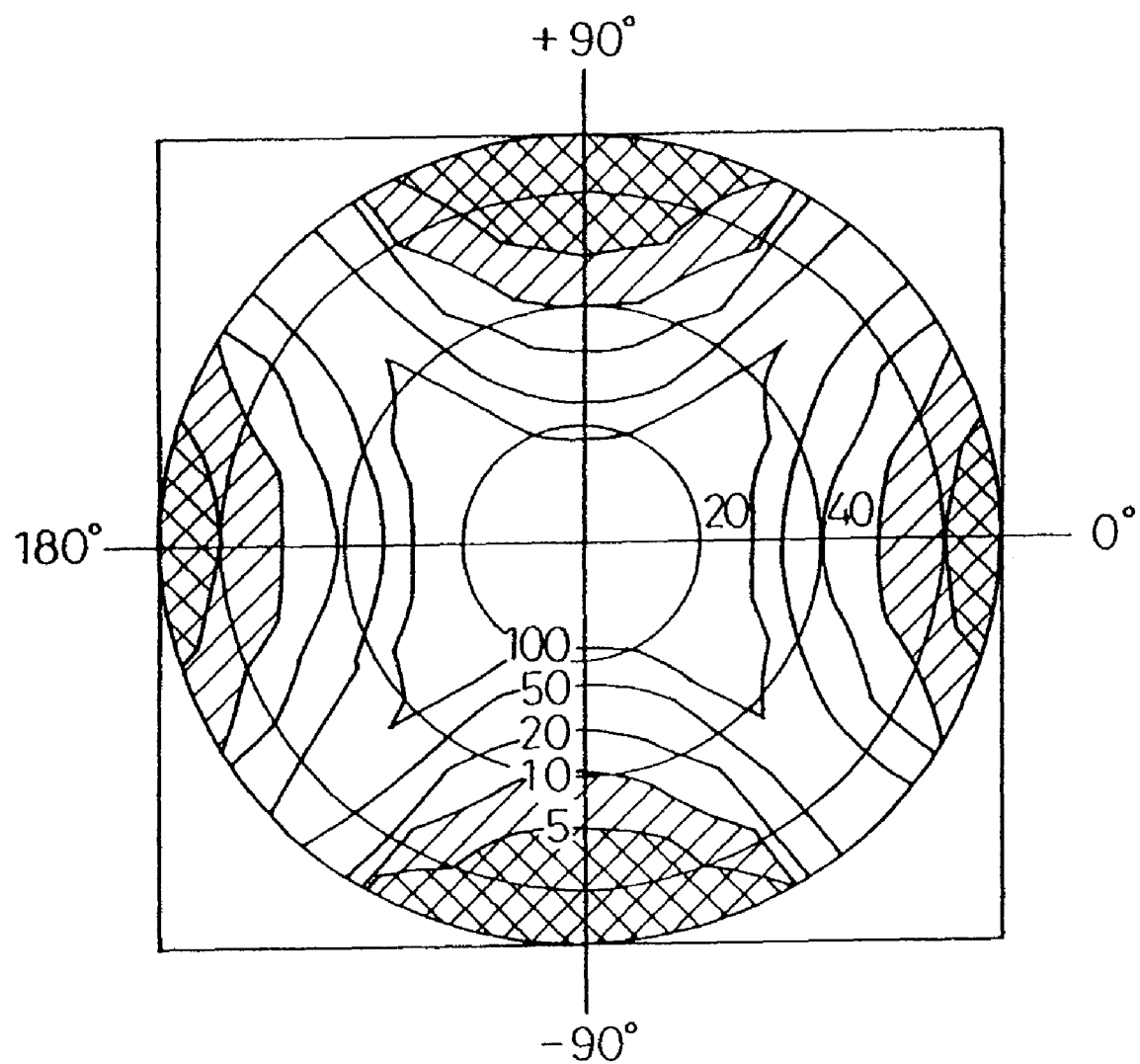
FIG. 22 is a diagram showing a viewing angle characteristic of the panel of the first embodiment.
Figure 23A:
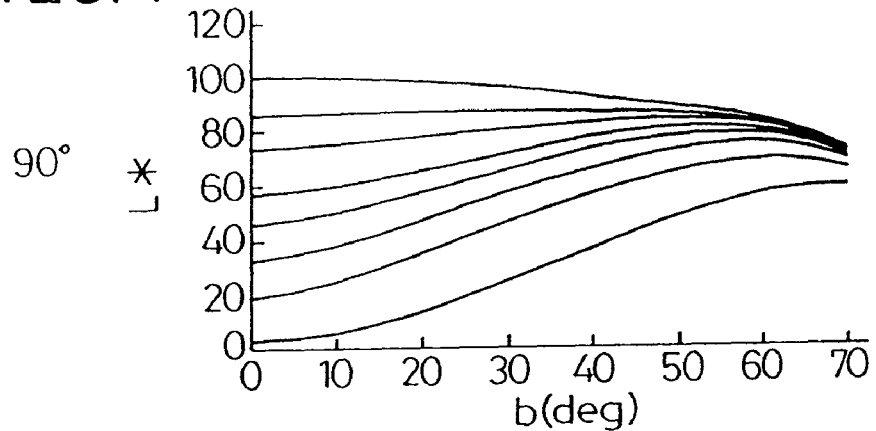
FIGS. 23A to 23C are diagrams showing changes in display luminance levels of the panel of the first embodiment.
Figure 23B:
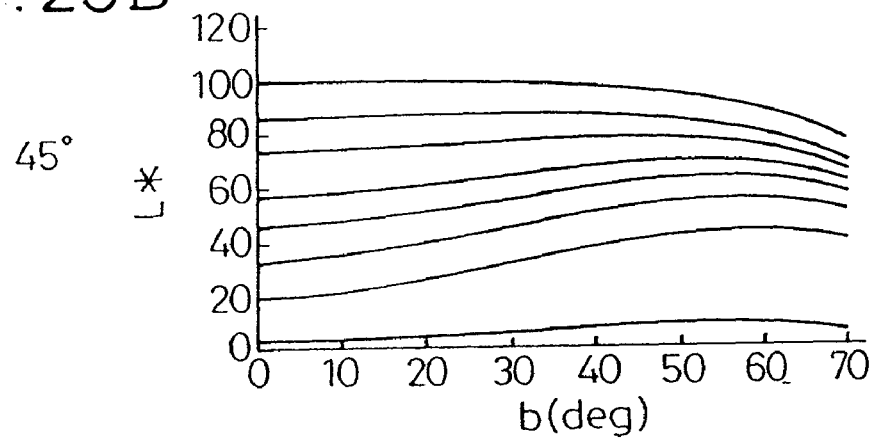
Figure 23C:
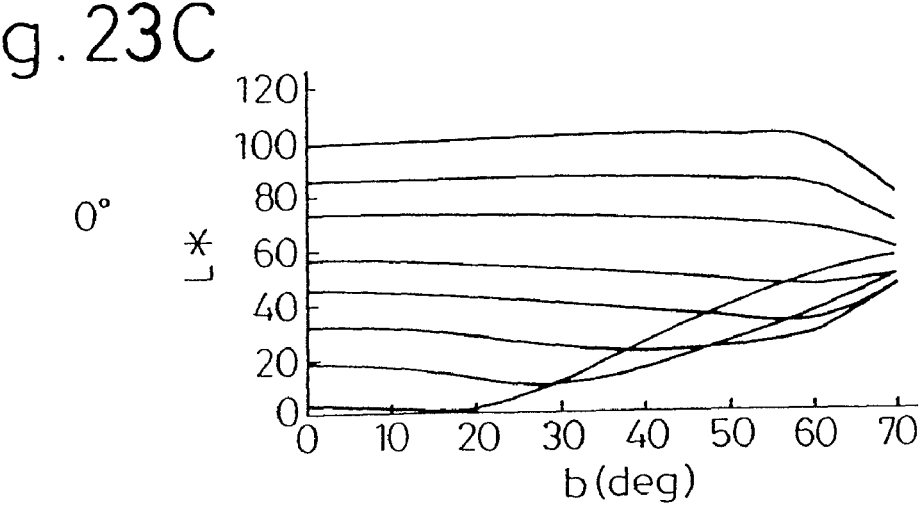
Figure 24A:
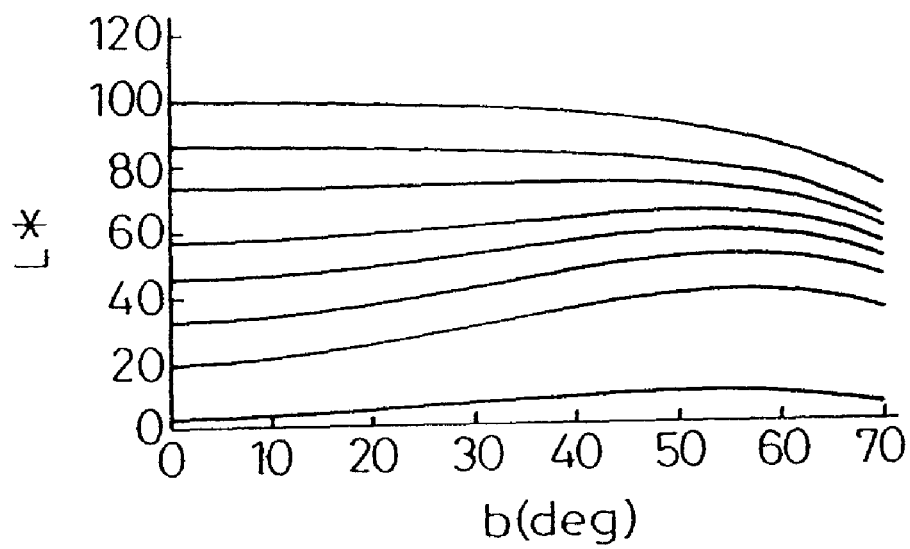
FIGS. 24A and 24B are diagrams showing changes in display luminance levels of the panel of the first embodiment.
Figure 24B:
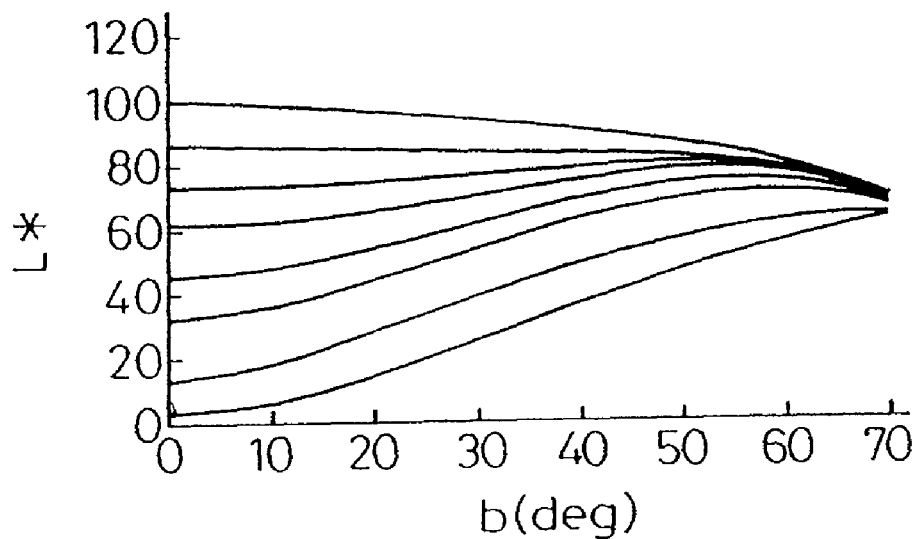
Figure 25:
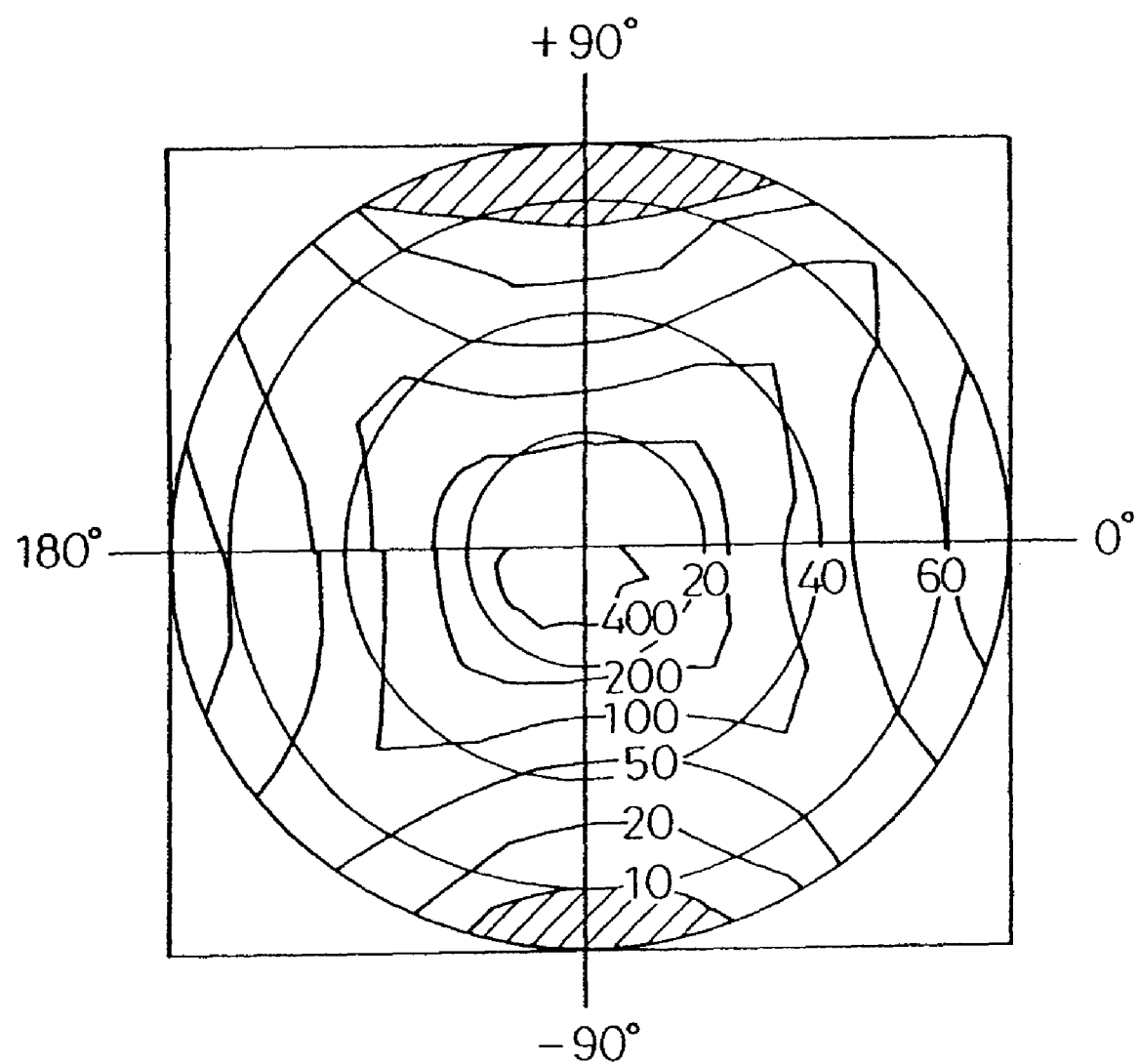
FIG. 25 is a diagram showing a viewing angle characteristic of the panel of the first embodiment having a phase-difference film.
Figure 26A:
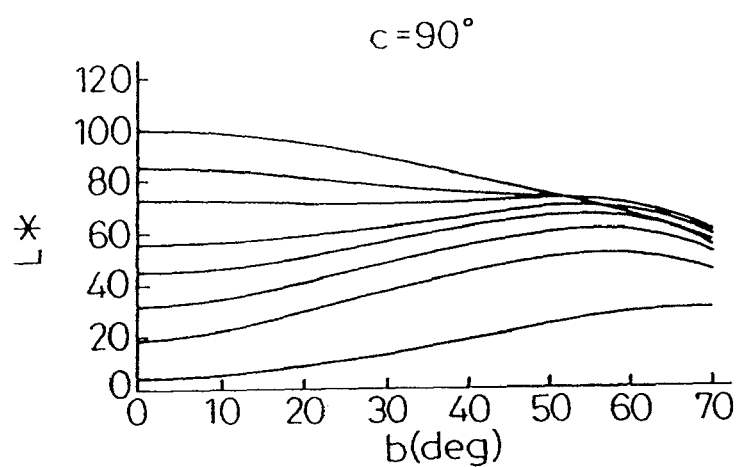
FIGS. 26A to 26C are diagrams showing changes in display luminance levels of the panel of the first embodiment having a phase-difference film.
Figure 26B:
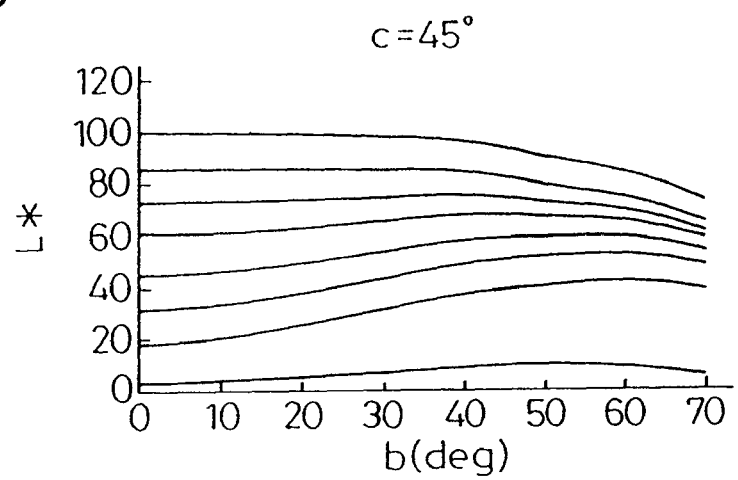
Figure 26C:
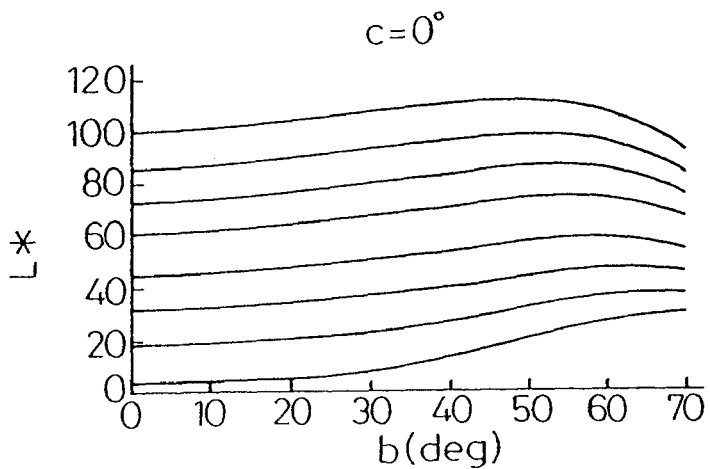

FIGS. 22 to 24B are diagrams showing the viewing angle characteristic of the panel of the first embodiment. FIG. 22 two-dimensionally shows a change in contrast dependent on a viewing angle, and FIGS. 23A to 24B show changes in display luminance levels corresponding to 8 gray-scale levels in relation to viewing angles. FIG. 23A shows a change occurring at an azimuth of 90°, FIG. 23B shows a change occurring at an azimuth of 45°, and FIG. 23C shows a change occurring at an azimuth of 0°. FIG. 24A shows a change occurring at an azimuth of −45°, and FIG. 24B shows a change occurring at an azimuth of −90°. Hatched parts of FIG. 22 indicate areas in which a contrast is 10 or less, and double-hatched parts thereof indicate areas in which the contrast is 5 or less. As illustrated, a generally good characteristic is exhibited. However, since each pixel is divided vertically into two region, the characteristic is not a perfectly laterally and vertically uniform characteristic unlike the one provided by the first embodiment. Deterioration of contrast in a vertical direction is little larger than that in a lateral direction. The deterioration of contrast in the lateral direction is smaller than that in the vertical direction. However, as shown in FIG. 23C, gray-scale reversal of black occurs at a viewing angle of about 30°. Sheet polarizers are bonded in such a way that the absorption axes thereof will lie at 45° and 135° respectively with respect to an optical axis. The viewing angle characteristic to be exhibited when the panel is viewed in an oblique direction is very good. The characteristics offered by this embodiment are overwhelmingly superior to those offered by the TN mode. However, this embodiment is slightly inferior to the IPS mode in terms of viewing angle characteristic. However, once one phase-difference film or optical compensation film is placed on the panel of the first embodiment, the viewing angle characteristic of the panel can be improved so greatly that it overwhelms the one offered by the IPS mode. FIGS. 25 to 26C are diagrams showing a viewing angle characteristic to be exhibited by the panel of the first embodiment having the phase-difference film, and correspond to FIGS. 22 to 23C. As illustrated, deterioration of contrast depending on a viewing angle has been drastically overcome. Moreover, gray-scale reversal occurring in a lateral direction on the panel has been overcome. On the contrary, gray-scale reversal occurs in a vertical direction during white display. However, generally, gray-scale reversal in white display is hardly visible to human eyes and is therefore not counted as a problem in terms of display quality. Thus, once the phase-difference film is employed, better characteristics than those offered by the IPS mode can be exhibited in all aspects including a viewing angle characteristic, response speed, and manufacturing difficulty.

Figure 27:
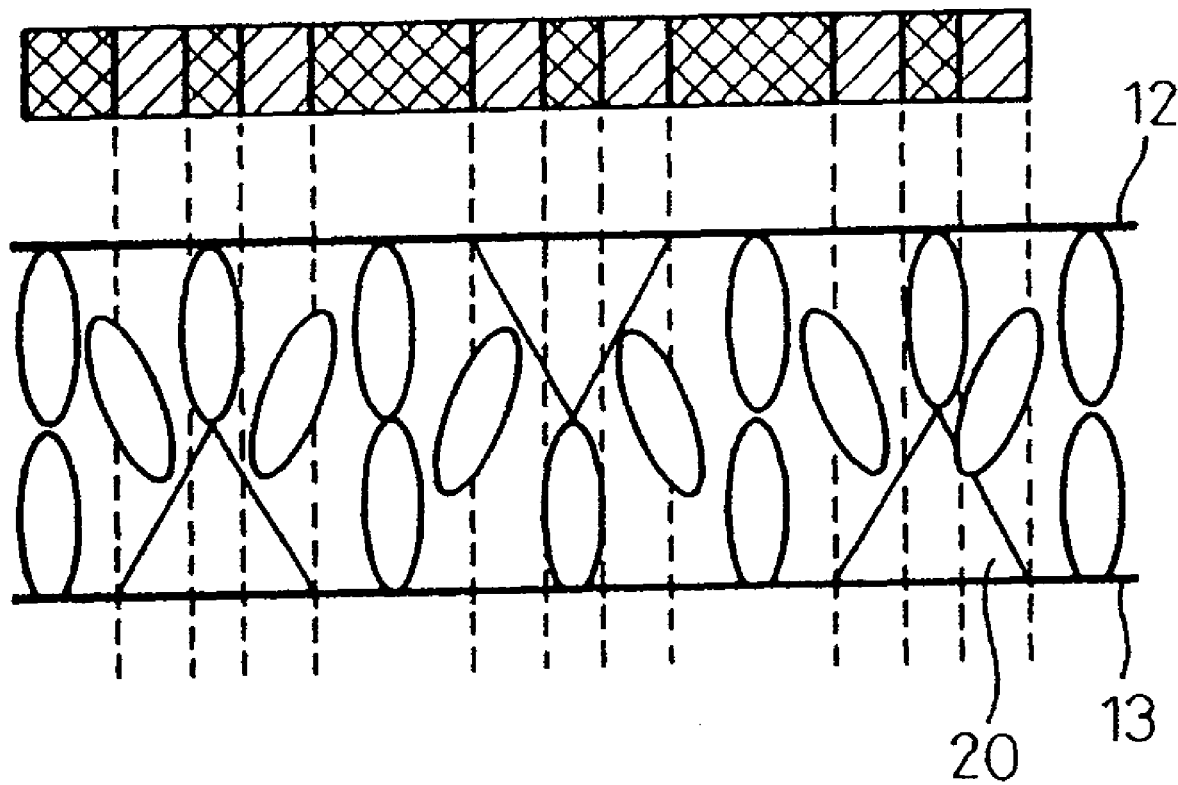
FIG. 27 is a diagram for explaining occurrence of light leakage near the protrusions.

An attempt was made to discuss optimal conditions by creating various variations of the structure of the first embodiment or modifying parameters other than the foregoing ones. In the case of protrusions, when the panel is displayed in black, light leaks out near the protrusions. FIG. 27 is a diagram for explaining occurrence of light leakage near the protrusions. As illustrated, light incident vertically on portions of the electrodes 113 on the lower substrate on which the protrusions 20 are formed is transmitted to some extent because liquid crystalline molecules are as illustrated aligned obliquely along the inclined surfaces of the protrusions 20. This results in halftone display. By contrast, liquid crystalline molecules near the apices of the protrusions are aligned in a vertical direction. No light therefore leaks out near the apices. The same applies to the electrode 12 on the upper substrate. During black display, near the protrusions, halftone display and black display are carried out partially. This partial difference in display is microscopic and discernible to naked eyes. The whole display exhibits averaged display intensity. The black display deteriorates a bit, whereby contrast deteriorates. The protrusions are therefore made of a material not allowing passage of visible light, namely, made of material shielding visible light, whereby contrast improves. Even in the second embodiment, when the protrusions are made of a material shielding visible light, contrast can be further improved.

Figure 28:
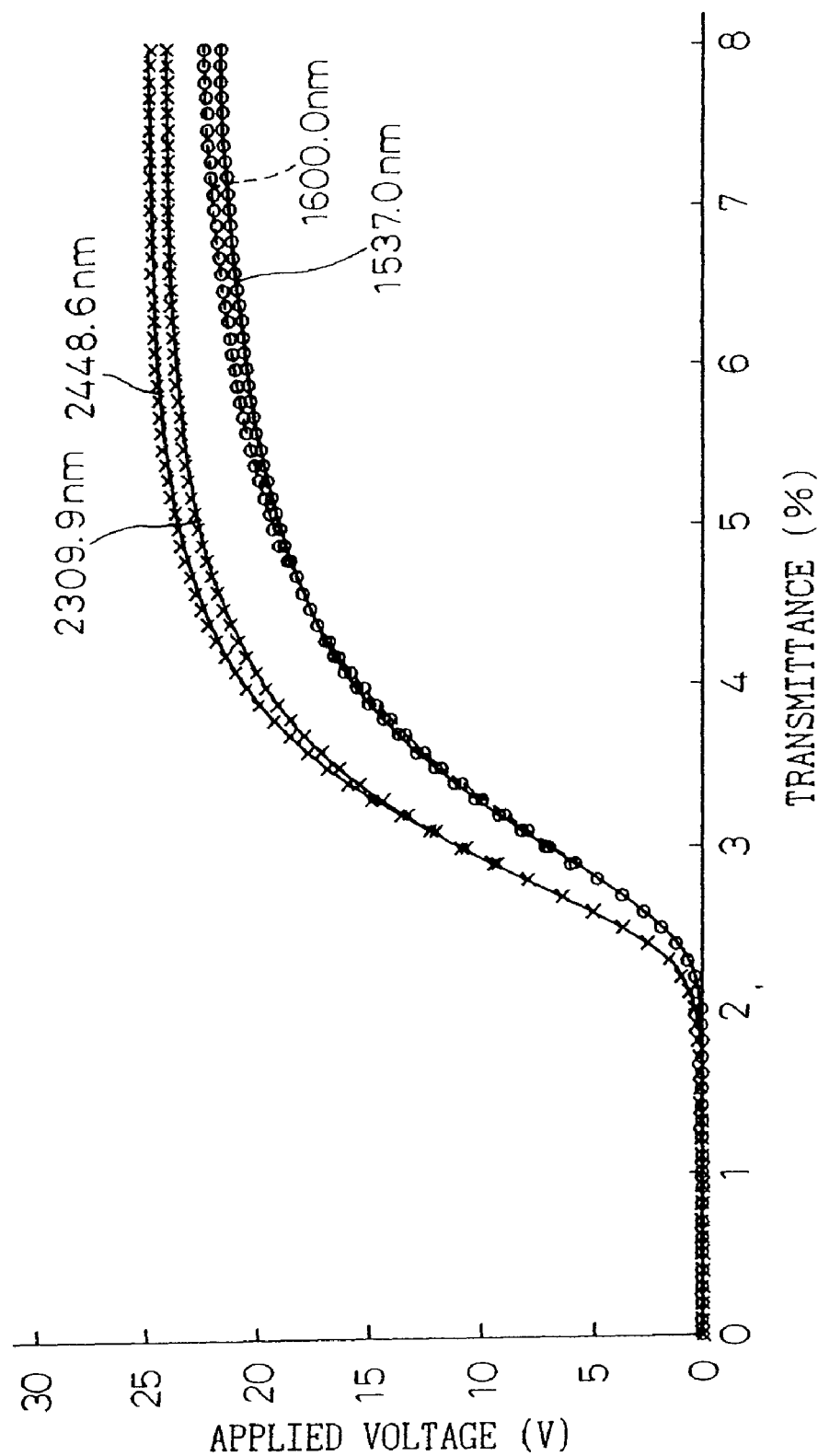
FIG. 28 is a diagram showing a change in transmittance according to a change of applied voltage.
Figure 29:
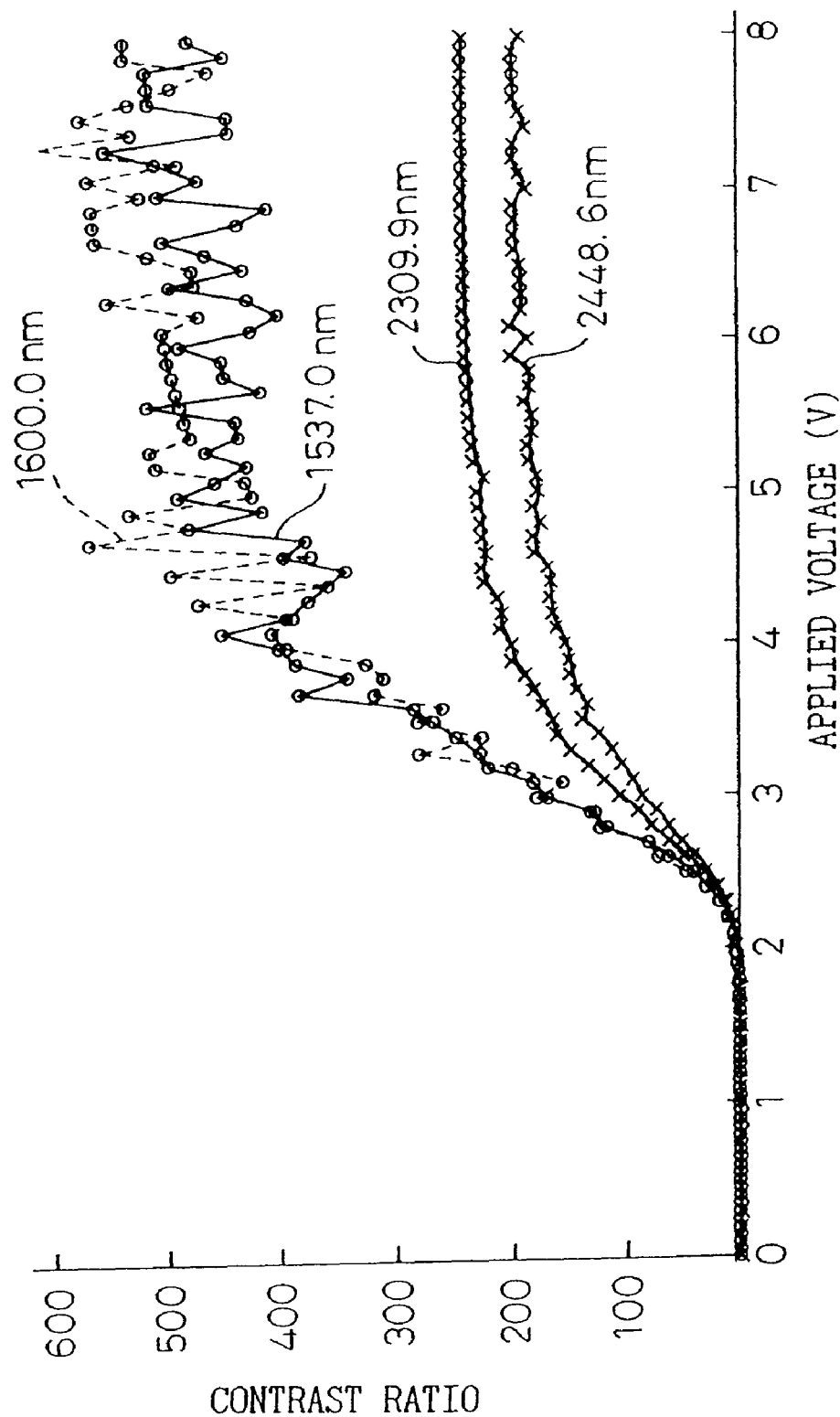
FIG. 29 is a diagram showing a change in contrast ratio according to a change of applied voltage.
Figure 30:
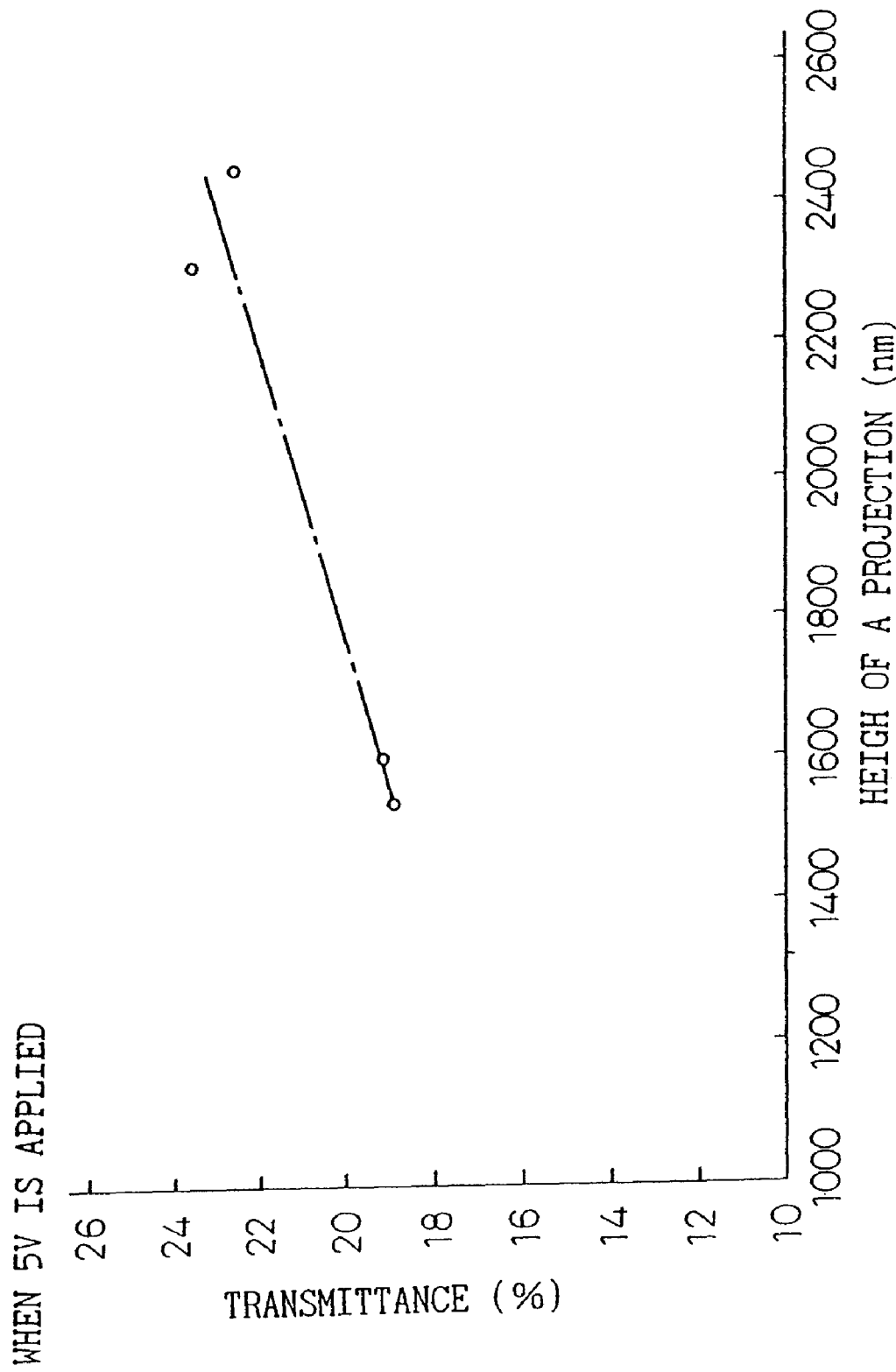
FIG. 30 is a diagram showing a change in transmittance of white display according to a change of height of protrusions in the panel of the first embodiment.
Figure 31:
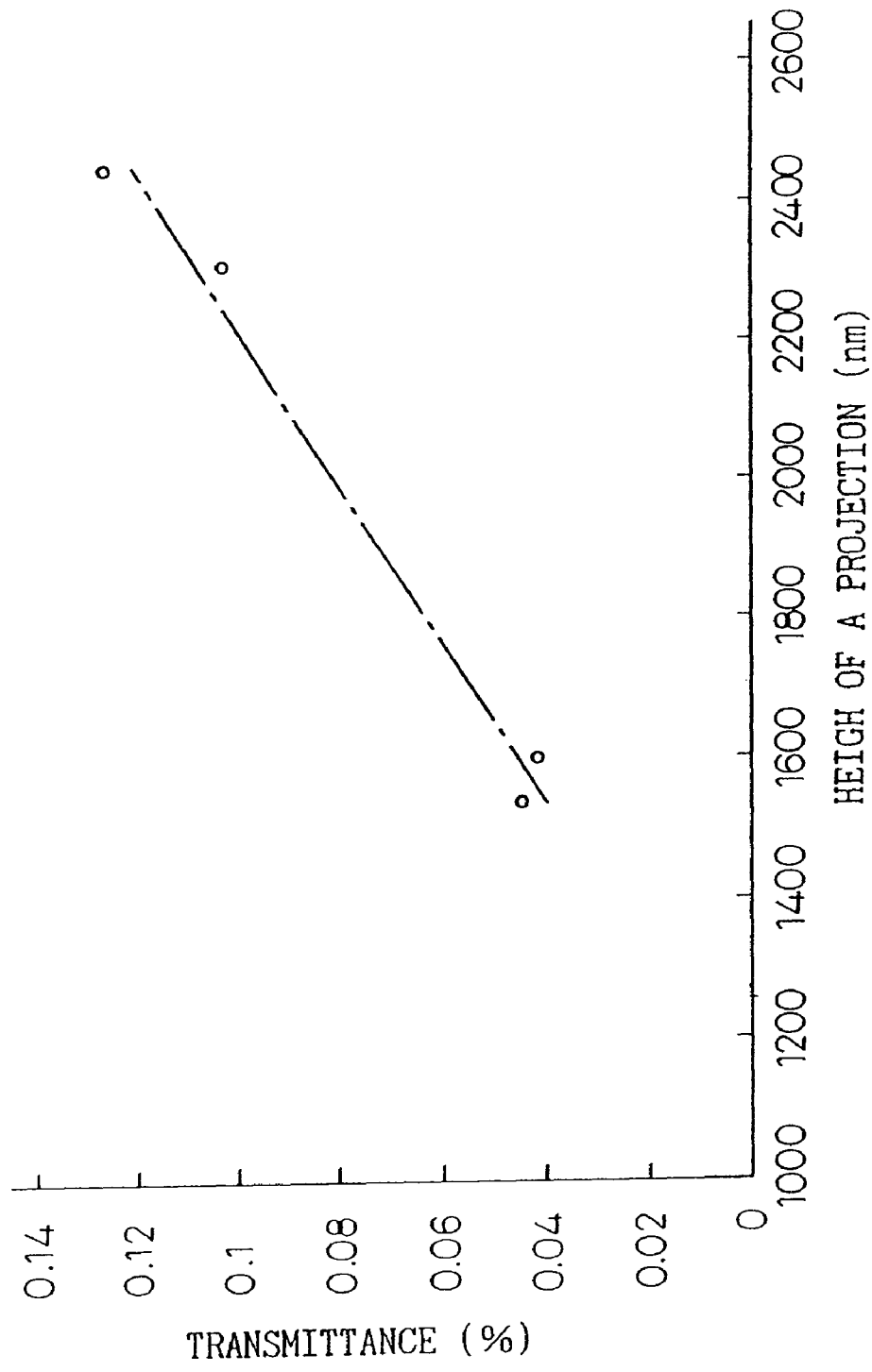
FIG. 31 is a diagram showing a change in transmittance of black display according to a change of height of protrusions in the panel of the first embodiment.
Figure 32:
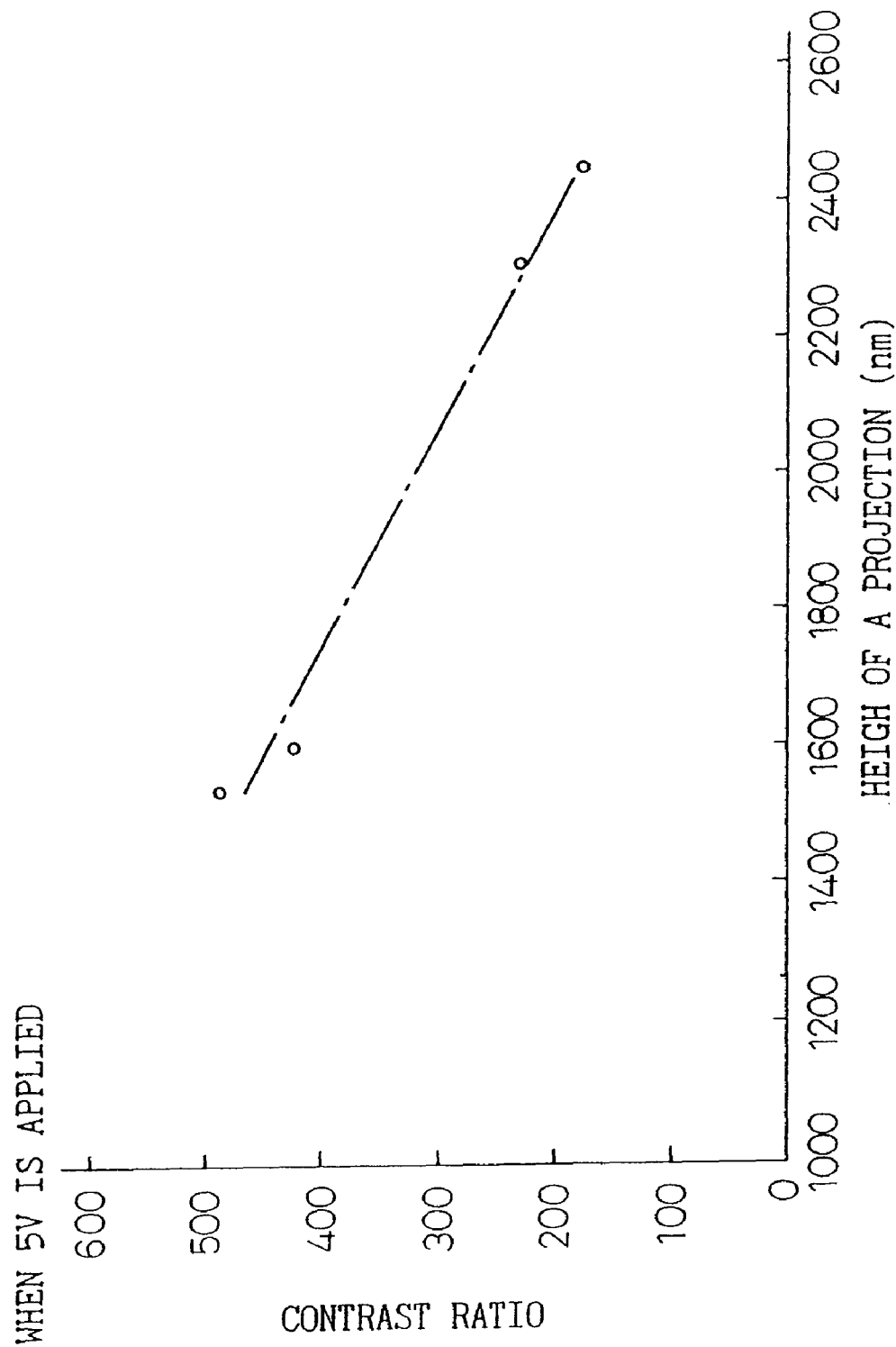
FIG. 32 is a diagram showing a change in contrast ratio according to a change of height of protrusions in the panel of the first embodiment.

A change in response speed occurring when the spacing between protrusions is varied has been described in conjunction with FIGS. 20A to 21. A change in characteristic deriving from a change in height of protrusions was measured. The width of a photo-resist to be applied for realizing protrusions and the spacing between protrusions were 7.5 micrometers and 15 micrometers respectively, and the thickness of cells was approximately 3.5 micrometers. The height of the resist was set to 1.537 μm, 1.600 μm, 2.3099 μm, and 2.4486 μm. The transmittance and contrast ratio of a prototype were measured. The results of the measurement are shown in FIGS. 28 and 29. A change in transmittance dependent on the height of the protrusions (resist) occurring in a white state (when 5 V is applied) is shown in FIG. 30. A change in transmittance dependent on the height of the protrusions (resist) occurring in a black state (when no voltage is applied) is shown in FIG. 31. A change in contrast ratio dependent on the height of the protrusions (resist) is shown in FIG. 32. The higher the resist is, the higher the transmittance in the white state (when a voltage is applied) becomes. This is presumably attributable to the fact that the protrusions (resist) filling a supplementary role for tilting liquid crystalline molecules are large enough to turn down the liquid crystalline molecules in terms of both of figures and electrical effects. The transmittance (light leakage) in the black state (when no voltage is applied) increases with an increase in height of the resist. This causes black levels to fall and is therefore not very preferable. The causes of light leakage will be described in conjunction with FIG. 27. Liquid crystalline molecules lying immediately above the protrusions (resist) and in the spacings between the protrusions are aligned vertically to the surfaces of the substrates. Light leakage does not occur in these places. However, liquid crystalline molecules lying on the slopes of the protrusions are aligned slightly obliquely. As the protrusions get higher, the area of the slopes increases and a light leakage increases.

The contrast (white luminance level/black luminance level) decreases as the resist gets higher. However, even when the height of the resist is increased to have the same value as the thickness of cells, screen display can be achieved without any problem. In this case, as described later, the protrusions (resist) can be designed to fill the role of panel spacers.

Based on the above results, prototypes of liquid crystal displays of size 15 were produced using TFT substrates and CF substrates having protrusions of 0.7 micrometers, 1.1 micrometers, 1.5 micrometers, and 2.0 micrometers in height. The trend revealed by the results of the experiment was also observed in the actually-produced liquid crystal panels. For actual viewing, because the contrast has been originally high, deteriorations in contrast occurring in the panels produced under the different conditions were of a good level. Thus, satisfactory display was achieved. This is presumably because the panels originally permitted high contrasts and a little decrease in contrast was indiscernible to human eyes. Moreover, a panel including protrusions of 0.7 micrometers high was also produced in an effort to detect the lower limit of the height of the protrusions working on molecular alignment. Display was perfectly normal. Consequently, even when the height of the protrusions (resist) is as small as 0.7 micrometers or less, the protrusions can satisfactorily work on alignment of liquid crystalline molecules.

Figure 33:
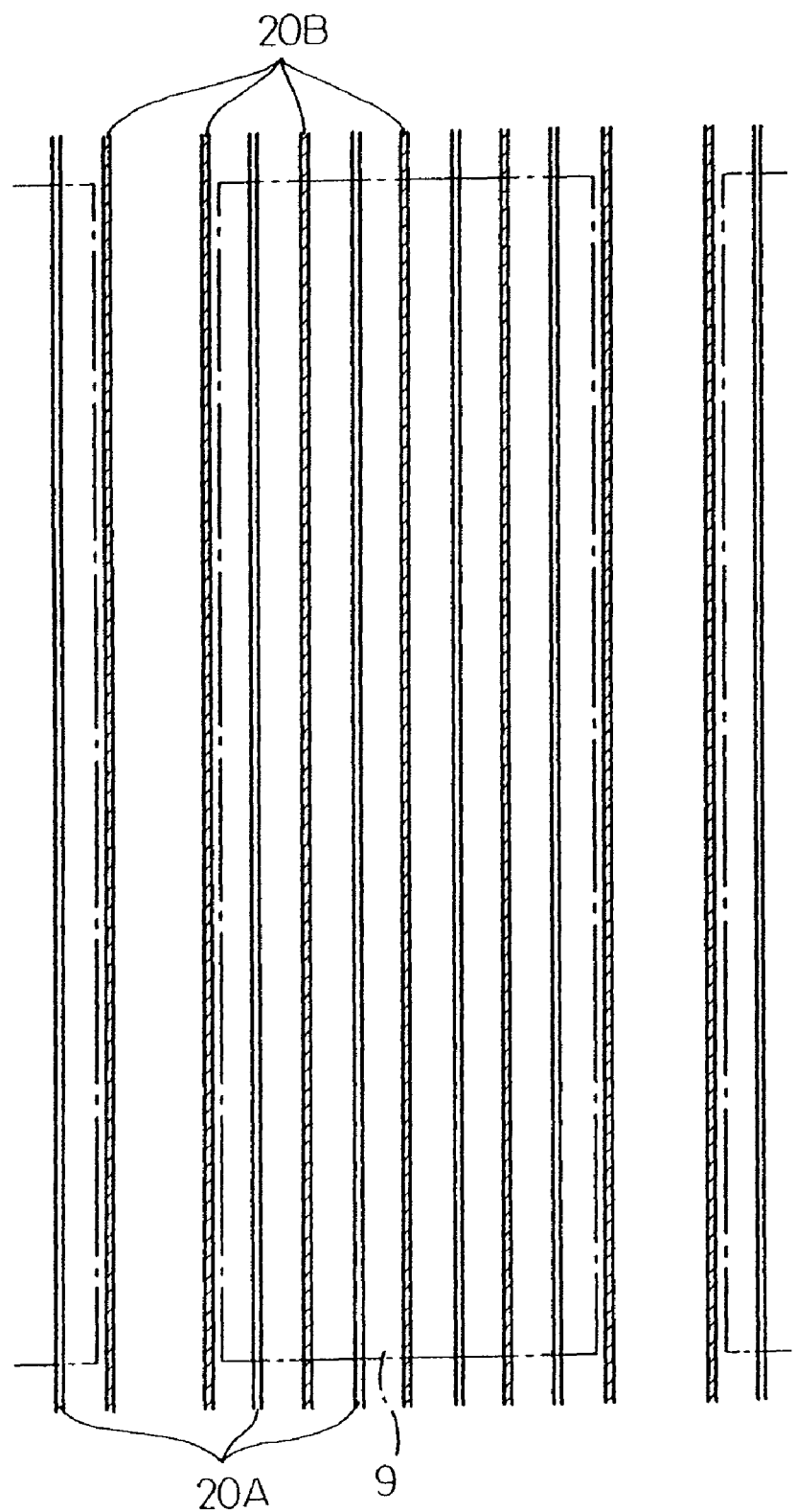
FIG. 33 is a diagram showing a pattern of protrusions of the second embodiment.

FIG. 33 is a diagram showing a pattern of protrusions in the second embodiment. As shown in FIG. 15, in the first embodiment, protrusions are linear and extending in a direction vertical to the longer sides of pixels. In the second embodiment, protrusions are extending in a direction vertical to the shorter sides of pixels 9. The other components of the second embodiment are identical to those of the first embodiment.

FIGS. 252A and 252B show a modification of the second embodiment, wherein FIG. 252A shows a protrusion pattern and FIG. 252B is a sectional view showing the arrangement of the protrusion arrangement. In this modification, the protrusion 20A disposed on the electrode 12 on the side of the CF substrate 16 is extended in such a fashion as to pass through the center of the pixel 9 and to extend in a direction perpendicular to the minor side of the pixel 9. No protrusion is disposed on the side of the TFT substrate 17. Therefore, the liquid crystal is oriented in two directions inside each pixel. As shown in FIG. 252B, the domain is divided by the protrusion 20A at the center of the pixel. Since the edge of the pixel electrode serves as the domain regulating means around the pixel electrode 13, the orientation can be divided stably. In this modification, only one protrusion is disposed for each pixel and the distance between the protrusion 20A and the edge of the pixel electrode 13 is great. Therefore, the response speed becomes lower than in the second embodiment but the production process becomes simpler because the protrusion is disposed on only one of the sides of the substrate. Further, because the occupying area of the protrusion inside the pixel is small, display luminance can be improved.

FIG. 253 shows a protrusion pattern of another modification of the second embodiment. The protrusion 20A disposed on the electrode 12 on the side of the CF substrate 16 is positioned at the center of the pixel 9, and no protrusion is disposed on the side of the TFT substrate 17. The protrusion 20A is a pyramid, for example. Therefore, the liquid crystal is oriented in four directions inside each pixel. This modification can obtain the same effect as that of the modification shown in FIG. 255 and because the occupying area of the protrusion inside the pixel is further smaller, display luminance can be all the more improved.

In the first and second embodiments, numerous linear protrusions extending unidirectionally are located parallel to one another. Orientation division caused by the protrusions divides each domain mainly into two regions. Azimuths with which liquid crystalline molecules in two regions are aligned differ from each other by 180°. The viewing angle characteristic for a halftone exhibited relative to light components propagating inside a panel with azimuths including an azimuth corresponding to a direction in which liquid crystalline molecules are aligned vertically to the substrates will be improved as shown in FIGS. 9A to 9C. As for the viewing angle characteristic exhibited relative to light components propagating vertically to the light components, the problem described in conjunction with FIGS. 7A to 7C occurs. For this reason, orientation division should preferably be division of the orientation into four directions.

Figure 34:
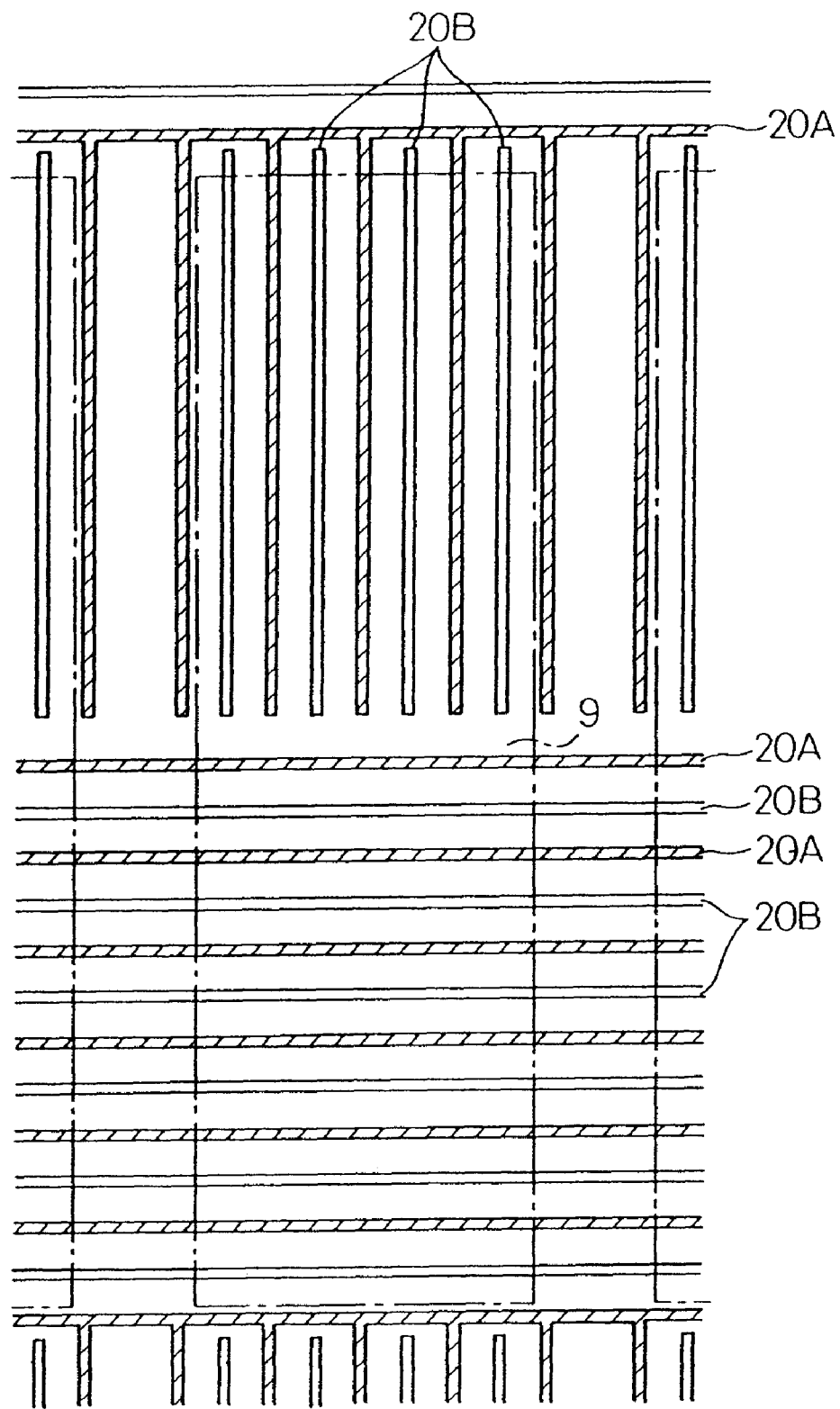
FIG. 34 is a diagram showing a pattern of protrusions of a third embodiment.

FIG. 34 is a diagram showing a pattern of protrusions in the third embodiment. As shown in FIG. 34, in the third embodiment, a pattern of protrusions extending lengthwise and a pattern of protrusions extending sideways are created within each pixel 9. Herein, the pattern of protrusions extending lengthwise is created in the upper half of one pixel, and the pattern of protrusions extending sideways is created in the lower half thereof. In this case, the pattern of protrusions extending lengthwise divides the orientation of the liquid crystal sideways into azimuths that are mutually different by 180°, that is, divides each pixel or domain sideways into two regions. The pattern of protrusions extending sideways divides the orientation of the liquid crystal lengthwise into azimuths that are mutually different by 180°, that is, divides each pixel or domain lengthwise into two regions. Consequently, the orientation of the liquid crystal within one pixel 9 is divided into four directions. Talking of the whole liquid crystal panel, the viewing angle characteristics thereof relative to both the vertical direction and lateral direction are improved. In the third embodiment, the components other than the pattern of protrusions are identical to those of the first embodiment.

Figure 35:
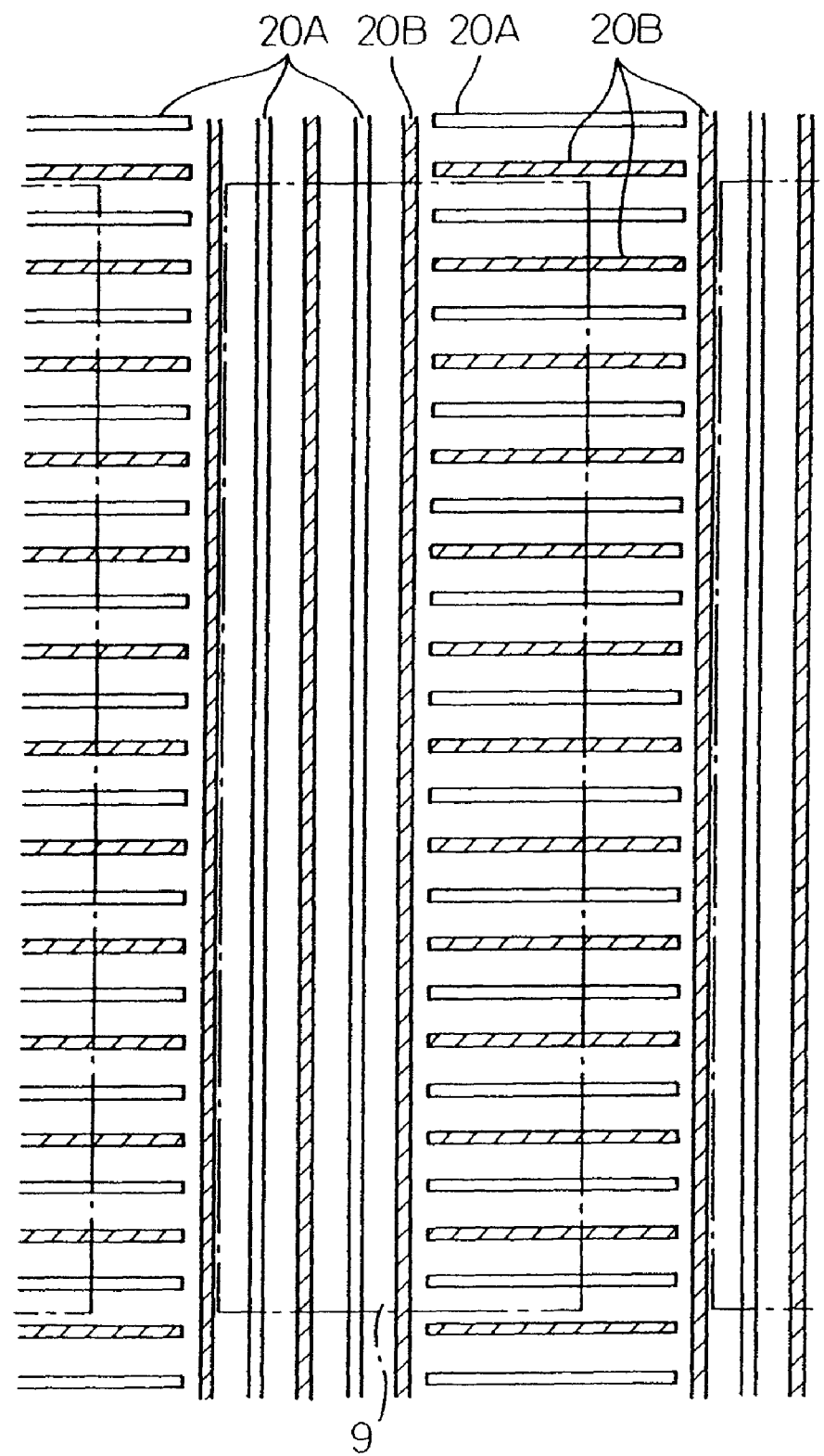
FIG. 35 is a diagram showing a modification of the pattern of protrusions of the third embodiment.

FIG. 35 is a diagram showing a modification of the pattern of protrusions of the third embodiment. This modification is different from the third embodiment shown in FIG. 34 in a point that a pattern of protrusions extending lengthwise is created in the left half of each pixel, and a pattern of protrusions extending sideways is created in the right half thereof. Even in this case, like the patterns of protrusions shown in FIG. 34, the orientation of the liquid crystal is divided into four directions within each pixel 9. The viewing angle characteristics of the panel relative to both the vertical direction and lateral direction are improved.

Figure 36:
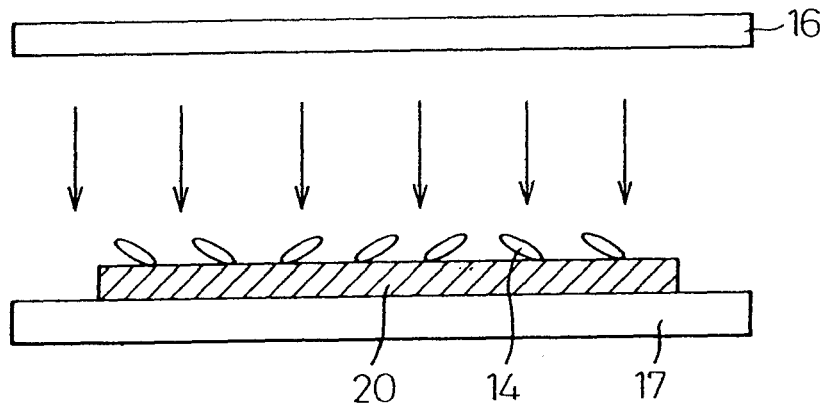
FIG. 36 is a diagram showing an alignment of liquid crystalline molecules near apices of the protrusions.

The first to third embodiments use protrusions as a domain regulating means for realizing orientation division. As shown in FIG. 36, the alignment of liquid crystalline molecules near the apices of the protrusions is not regulated at all. Near the apices of the protrusions, the alignment of liquid crystalline molecules is therefore not controlled to deteriorate display quality. The fourth embodiment is an example for solving this kind of problem.

Figure 37A:
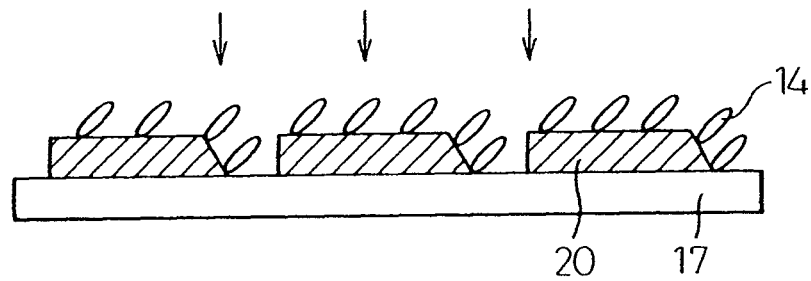
FIGS. 37A and 37B are diagrams showing shapes of protrusions of a fourth embodiment; protrusions.
Figure 37B:
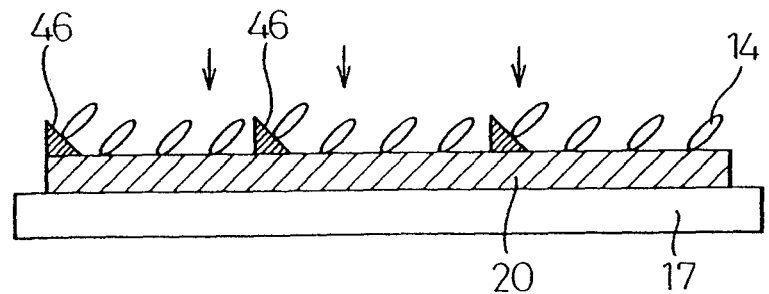

FIGS. 37A and 37B are diagrams showing the shapes of protrusions in the fourth embodiment. The other components are identical to those of the first to third embodiments. In the fourth embodiment, as shown in FIG. 37A, the protrusions 20 are partly tapered. The length of the taper portions is about 50 micrometers or less than it. For creating a pattern of this kind of protrusions, the pattern is drawn using a positive resist, and the protrusions and taper portions are created by performing slight etching. With the thus created protrusions, the alignment of liquid crystalline molecules near the apices of the protrusions can be controlled.

Moreover, in a modification of the fourth embodiment, as shown in FIG. 37B, tapered juts 46 are formed on each protrusion 20. Even in this case, the length of each tapered portion is about 50 micrometers or less than it. For creating a pattern of this kind of protrusions, the pattern is drawn using a positive resist, and the protrusions 20 are created by performing slight etching. A positive resist whose thickness is about a half of the height of the protrusions is applied, and the tapered juts 46 on the protrusions 2 are left intact by performing slight etching. With the juts, the alignment of liquid crystalline molecules near the apices of the juts can be controlled.

Figure 38A:
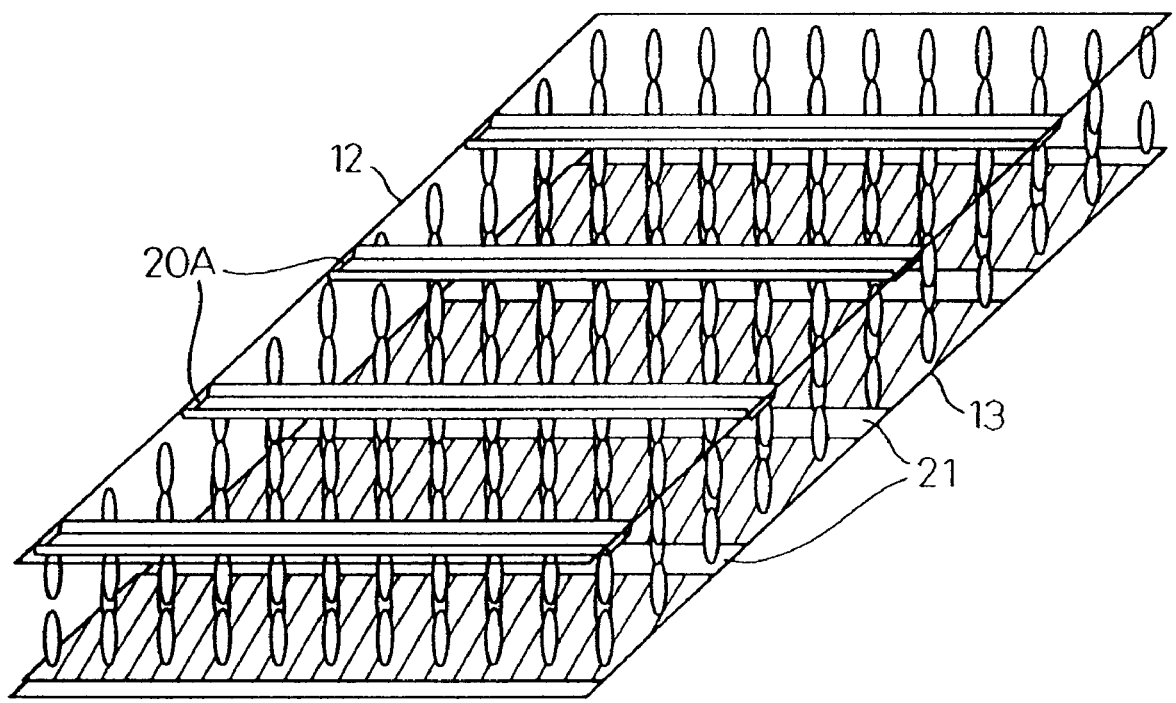
FIGS. 38A and 38B are diagrams showing a structure of a panel of a fifth embodiment.
Figure 38B:
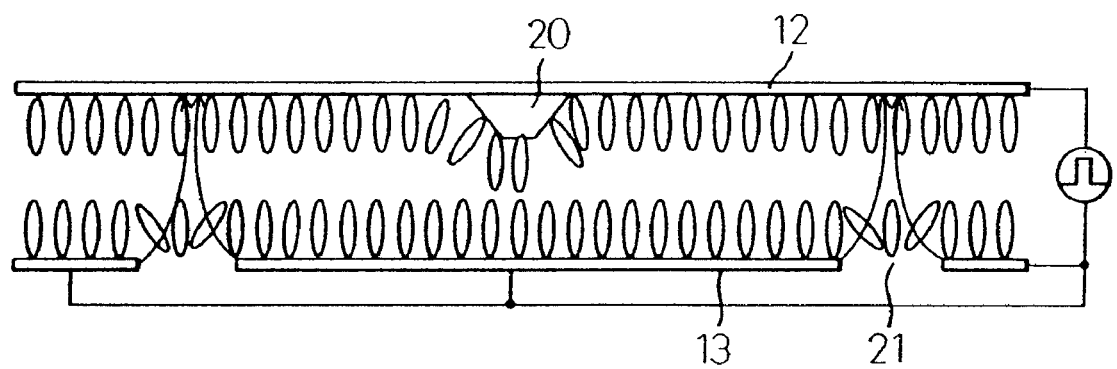

FIGS. 38A and 38B are diagrams showing the structure of a panel in the fifth embodiment. FIG. 38A is a diagram illustratively showing a state in which the panel is seen obliquely, and FIG. 38B is a side view. The fifth embodiment is an example in which the structure of a panel corresponds to the structure shown in FIG. 12C. The protrusions 20A are created as illustrated on the electrode 12 (herein, a common electrode) formed on the surface of one substrate by applying a positive resist, and the slits 21 are created in the electrodes 13 (herein, cell (pixel) electrodes) formed on the surface of the other substrate.

Cost serves as an important factor for determining whether a liquid crystal display device could become commercially successful or not. The liquid crystal display device of the VA system and, particularly, the VA system equipped with a domain regulating means features a high display quality as described above but becomes expensive due to the provision of the domain regulating means and, hence, it has been desired to further decrease the cost.

When the protrusion is formed on the electrode, the photoresist that is applied must be exposed to light through a pattern followed by developing and etching, requiring an increased number of steps and increased cost, deteriorating the yield. On the other hand, the pixel electrode must be formed by patterning, and the number of the steps does not increase despite a pixel electrode having a slit is formed. On the side of the TFT substrate, therefore, the cost can be decreased when the domain regulating means is formed by slits rather than protrusions. On the other hand, the opposing electrode of the color filter substrate (CF substrate) is usually a flat electrode. When a slit is to be formed in the opposing electrode, an etching step must be executed after the patterned photoresist is developed. When the protrusion is to be formed on the opposing electrode, however, the developed photoresist can be used in its form without much driving up the cost of forming the protrusion. Like in the liquid crystal display device of the first embodiment of the present invention, therefore, the domain regulating means on the side of the TFT substrate is formed by a slit in the pixel electrode and the domain regulating means on the side of the color filter substrate is formed by a protrusion, driving up the cost little.

Figure 39:
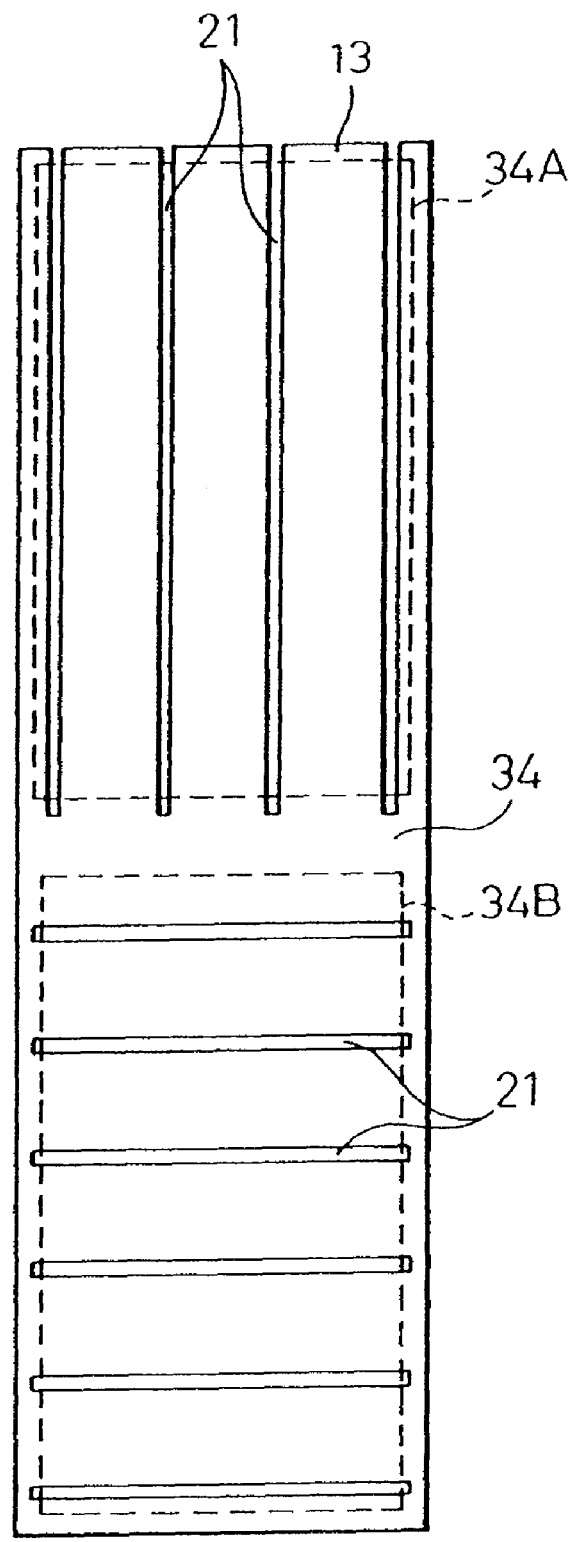
FIG. 39 is a diagram showing a pattern of slits of a pixel electrode of the fifth embodiment.

FIG. 39 is a diagram showing a pattern of slits of each pixel electrode in a modification of the fifth embodiment. This modification corresponds to an example in which the protrusions 20B are replaced with the slits 21 in the third embodiment.

When a slit is formed in the pixel electrode to divide it into a plurality of partial electrodes, the same signal voltage must be applied to these partial electrodes, and electric connection portions must be provided to connect the partial electrodes together. When the electric connection portions are formed on the same layer as the pixel electrodes, orientation of liquid crystals is disturbed in the electric connection portions impairing viewing angle characteristics, luminance of the panel and response speed.

According to this as shown in FIG. 39, therefore, the electric connection portions are formed in the perimeter of the pixel electrode 13 and are shielded by the black matrices (BM) 34 to obtain luminance and response speed comparable with those of when protrusions are formed on both of them. In this embodiment in which the CS electrode 35 having light-shielding property is provided at the central portion of the pixel, the pixel is divided into upper and lower two portions. Reference numeral 34A denotes an opening of the upper side defined by BM, and 34B denotes an opening of the lower side defined by BM, and light passes through the inside of the openings.

The bus lines such as gate bus lines 31 and data bus lines 32 are made of a metal material and have light-shielding property. To obtain stable display, the pixel electrodes must be so formed as will not be superposed on the bus lines, and light must be shielded between the pixel electrodes and the bus lines. Furthermore, when amorphous silicon is used as operation semiconductor, the element characteristics undergo a change upon the incidence of light giving rise to the occurrence of erroneous operation. Therefore, the TFT portions must be shielded from light. Therefore, the BM 34 has heretofore been provided for shielding light for these portions. According to this embodiment, the electric connection portions are provided in the perimeter of the pixel, and light is shielded by the BM 34. There is no need to newly provide the BM for shielding light for the electric connection portions; i.e., the conventional BM may be used or the BM may be slightly expanded without decreasing the numerical aperture to a serious degree.

The panel of the fifth embodiment is of a type in which each pixel is divided into two portions, and therefore basically exhibits the same characteristics as the one of the first embodiment. The viewing angle characteristic of the panel becomes identical to that of the panel of the second embodiment when the phase-difference film or optical compensation film is employed. The response speed of the panel is slightly lower than that of the panel of the first embodiment, because oblique electric fields induced by the slits formed in one substrates are utilized. Nevertheless, the on speed is 8 ms, the off speed is 9 ms, and the switching speed is 17 ms. Thus, the response speed is much higher than the ones offered by the conventional modes. As mentioned above, display is seen little irregular. However, the manufacturing process is simpler than those of the first and second embodiments. For example, in the course of forming ITO pixel electrodes (cell electrodes) on a TFT substrate, the electrodes are slitted. A pattern of protrusions is then drawn on a common electrode using a photo-resist. As already described, the rubbing step is unnecessary, and the associated after-rubbing cleaning step can therefore be omitted.

For the reference, the measurement results of an example in which slits are provided on the cell (pixel) electrode and no slit is provided on the counter electrode is described. In this example, the cell electrodes have the slits, and the width and pitch of the slits are determined properly. Owing to this constitution, stable alignment is attained, that is, liquid crystalline molecules are aligned in all azimuths of 360° inside walls defined with oblique electric fields induced near the slits. The liquid crystalline molecules are aligned in all azimuths of 360° within each small region. The viewing angle characteristic of the panel is therefore excellent. An image that is seen homogeneous in all azimuths of 360° can be produced. However, a response speed has not been improved. An on speed is 42 ms, and an off speed is 15 ms. A switching speed that is a sum of the on and off speeds is 57 ms. Thus, the response speed has not been improved very much. This means that no problem occurs in displaying a still image but the response speed is not high enough to display a motion picture like the one offered by the IPS mode. If a number of the slits is decreased, the response speed is further decreased. This is presumably that when the number of the slits is decreased, the area of each domain becomes large, and it lengthens a time in which all liquid crystalline molecules are oriented.

Figure 40:
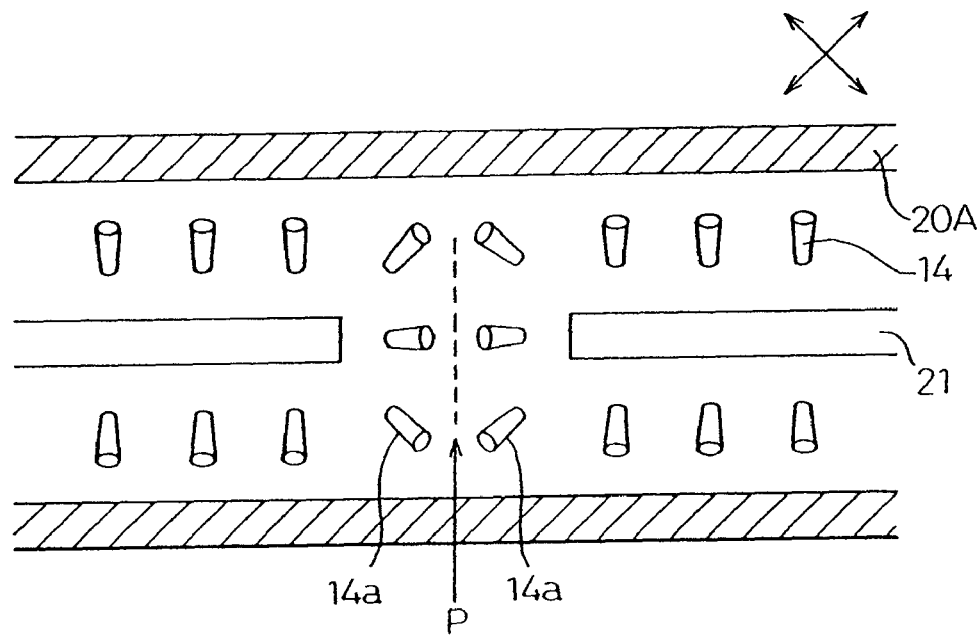
FIG. 40 is a diagram showing an example of alignment of liquid crystalline molecules at a connection of slits.
Figure 41:
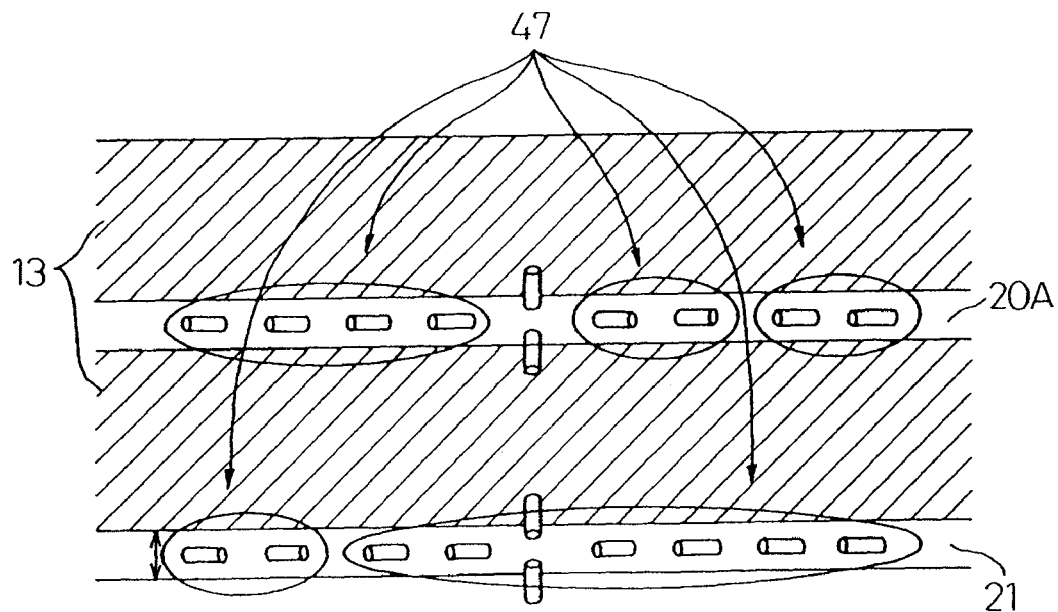
FIG. 41 is a diagram showing generations of domains in the panel of the fifth embodiment.

In the fifth embodiment, when a voltage is applied, the liquid crystal has portions, in which molecular alignment is unstable. The reason will be described with reference to FIGS. 40 and 41. FIG. 40 is a diagram illustrating the distribution of orientation of liquid crystalline molecules in the electric connection portions. In a portion where the protrusion 20A and the slit 21 are provided in parallel, the liquid crystalline molecules are oriented in a direction perpendicular to the direction in which the protrusion and the slit extend as viewed from the upper side. In the electric connection portion, however, the liquid crystalline molecules 14a are oriented in different directions, developing abnormal orientation. Therefore, as shown in FIG. 41, liquid crystalline molecules in the spaces between the protrusions 20A and the slits 21 of the electrodes are aligned in a direction vertical (vertical direction in the drawing) to the protrusions 20A and slits 21. Near the apices of the protrusions and the centers of the slits, liquid crystalline molecules are aligned in a horizontal direction but not in the vertical direction. Oblique electric fields induced by the slopes of the protrusions or the slits enable control of the liquid crystal in the vertical direction in the drawing but cannot enable control in the lateral direction. For this reason, a random domain is produced sideways near the apices of the protrusions and the centers of the slits. This has been confirmed through microscopic observation. A domain near the apex of a protrusion is too small to be discerned, causing no problem. However, an area occupied by a domain having liquid crystalline molecules aligned sideways and lying near a slit is so large as to be discerned even by naked eyes. When the domain is produced regularly, even if the domain is large, it will not be cared. However, when the domain is produced at random, an image is seen irregular. This leads to deteriorated display quality. The panel in the fifth embodiment makes a little poor impression on image quality compared with the one provided by the first embodiment, though display has no problem.

Abnormal orientation causes the luminance of the panel and the response speed to decrease. For example, a comparison of a practical device in which an electric connection portion is formed at the central portion of the pixel electrode with a practical device in which a protrusion is provided, indicates abnormal conditions such as a drop in the luminance and a residual image in which white appears bright for a moment when black changes into white. In the sixth embodiment, this problem is solved.

Figure 42:
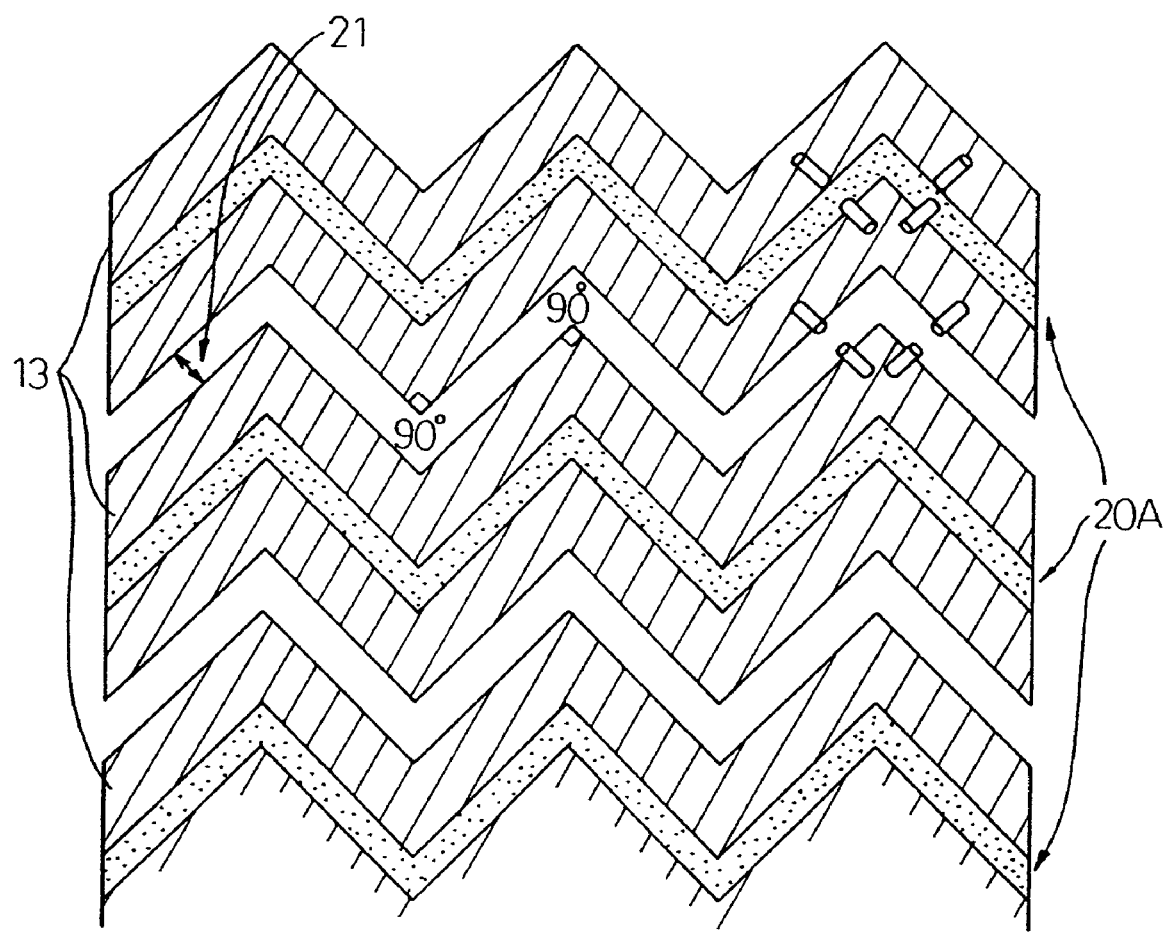
FIG. 42 is a diagram showing shapes of protrusions and slits of a sixth embodiment.
Figure 43:
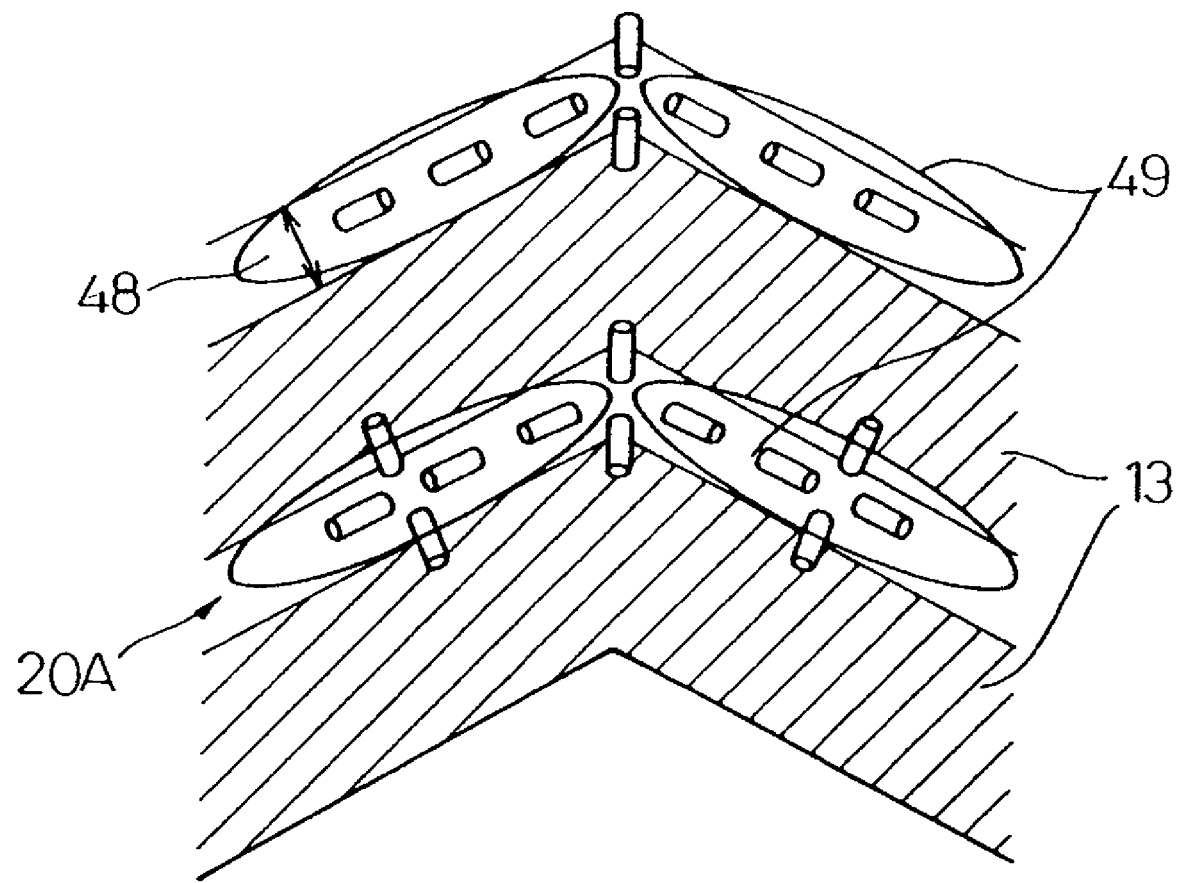
FIG. 43 is a diagram showing generations of domains at corners of the protrusions and slits in the panel of the sixth embodiment.

A panel of the sixth embodiment is provided by modifying the shape of the protrusions 20A and that of the slits 21 in the cell electrodes 13 in the panel of the fifth embodiment. FIG. 42 is a diagram showing the shape of the protrusions 20A of the sixth embodiment and that of the cell electrodes 13 thereof which are seen in a direction vertical to the panel. As illustrated, the protrusions 20A are zigzagged. Owing to this shape, as shown in FIG. 43, a domain divided regularly into four regions is produced. Consequently, irregular display that poses a problem in the fifth embodiment can be overcome.

Figure 44:
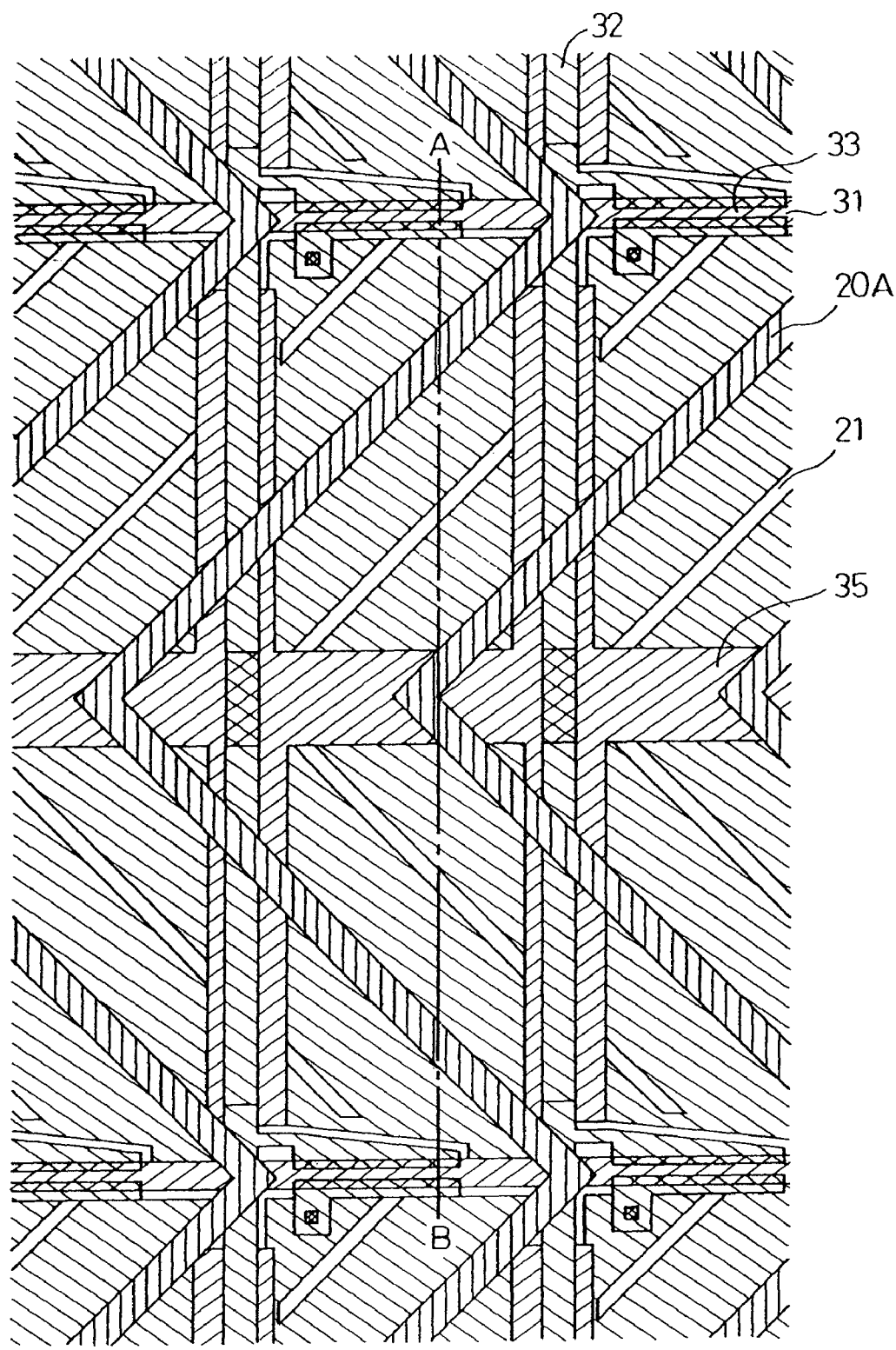
FIG. 44 is a plan view of pixel portion in a LCD panel of the sixth embodiment.
Figure 45:
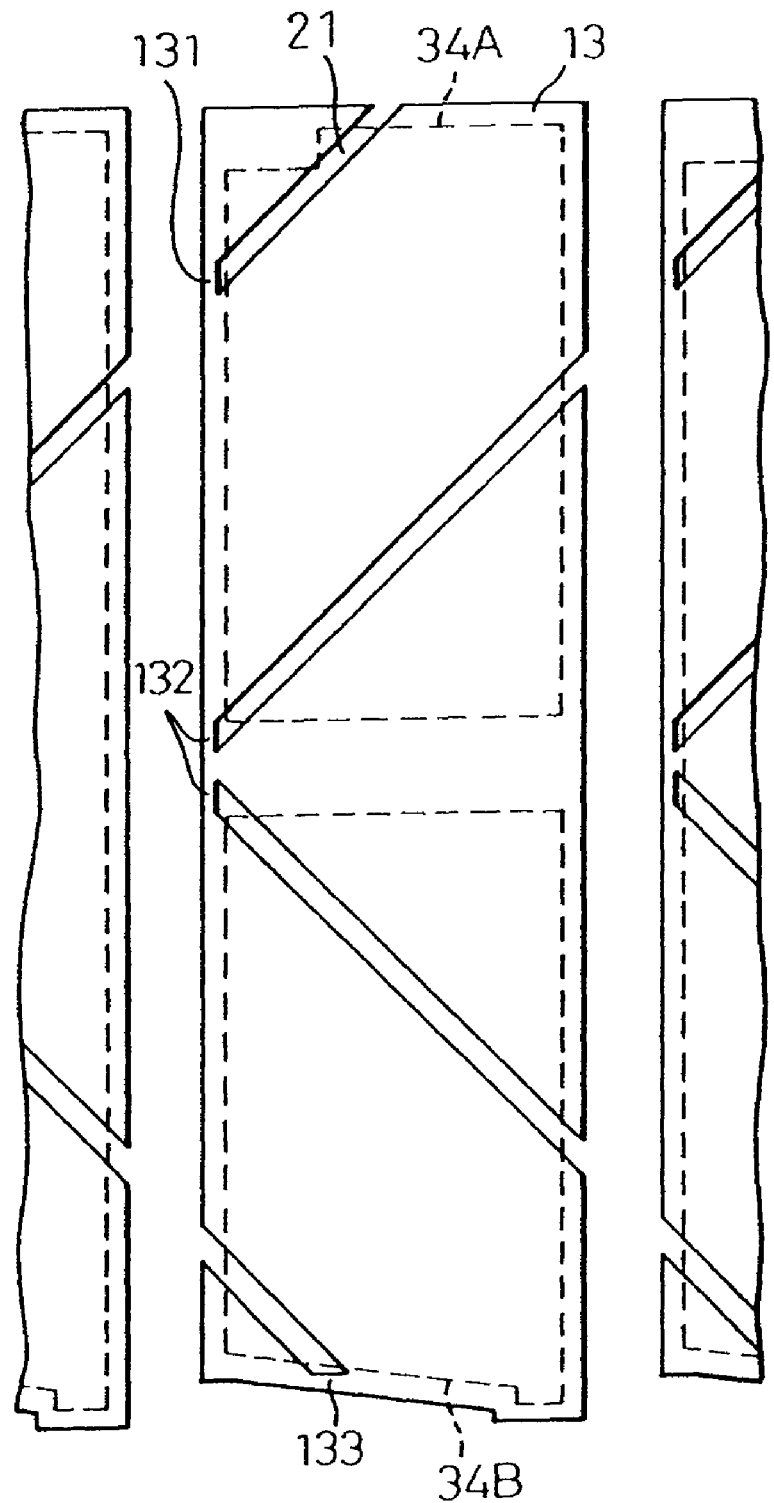
FIG. 45 is a diagram showing a pattern of pixel electrodes of the sixth embodiment.
Figure 46:
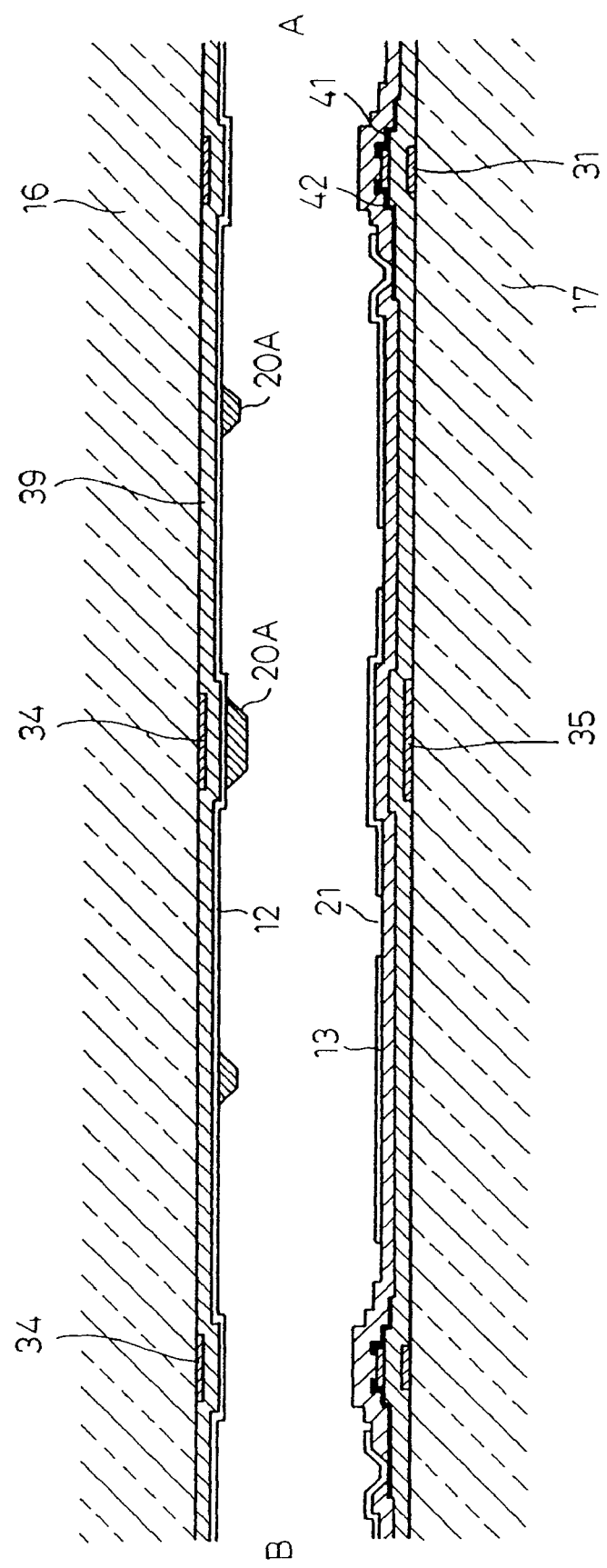
FIG. 46 is a sectional view of the LCD panel of the sixth embodiment.

FIG. 44 is a plan view of a pixel portion in the LCD according to a sixth embodiment of the present invention, FIG. 45 is a diagram illustrating a pattern of a pixel electrode according to the sixth embodiment, and FIG. 46 is a sectional view of a portion indicated by A B in FIG. 44.

Referring to FIGS. 44 and 46, in the LCD of the sixth embodiment, on one glass substrate 16 are formed a black matrix (BM) 34 for shielding light and a color decomposition filter (color filter) 39, and a common electrode 12 is formed on one surface thereof. Moreover, sequences of protrusions 20A are formed in a zig-zag manner. The glass substrate 16 on which the color filter 39 is formed is called color filter substrate (CF substrate). On the other glass substrate 17 are formed a plurality of scan bus lines 31 arranged in parallel, a plurality of data bus lines 32 arranged in parallel in a direction perpendicular to the scan bus lines, TFTs 33 arranged like a matrix to correspond to the intersecting points of the scan bus lines and the data bus lines, and display pixel (cell) electrodes 13. The scan bus lines 31 form gate electrodes of the TFTs 33, and the data bus lines 32 form drain electrodes 42 of the TFTs 33. The sources 41 are formed in the same layers as the data bus lines 32 and are formed simultaneously with the formation of the drain electrodes. A gate-insulating film, an amorphous silicon active layer and a channel protection film are formed on predetermined portions between the scan bus line 31 and the data bus line 32, an insulating film is formed on the layer of the data bus line 32 and, besides, an ITO film corresponding to the pixel electrode 13 is formed thereon. The pixel electrode 13 is of a rectangular shape of 1:3 as shown in FIG. 45, and has a plurality of slits 21 in a direction tilted by 45 degrees with respect to the sides thereof. In order to stabilize the potential of every pixel electrode 13, furthermore, a CS electrode 35 is provided to form a storage capacitor. The glass substrate 17 is called TFT substrate.

As shown, the sequences of protrusions 20A of the CF substrate and the slits 21 of the TFT substrates are arranged being deviated by one-half pitch of their arrangement, so that the substrates maintain an inverse relationship. The protrusions and the slits maintain a positional relationship as shown in FIG. 12C, and the orientation of the liquid crystals is divided into four directions. As described above, the pixel electrode 13 is formed by forming an ITO film, applying a photoresist thereon, exposing it to light through a pattern of electrode, followed by developing and etching. Therefore, the slit can be formed through the same step as the conventional step if the patterning is so effected as to remove the portion of the slit, without driving up the cost.

Figure 10C:
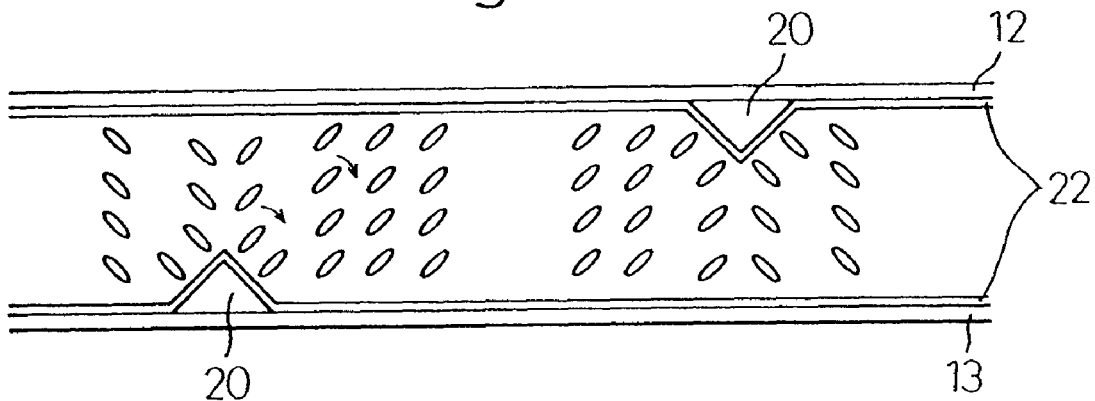

Upon forming the slits in the pixel electrode 13, the pixel electrode 13 is divided into a plurality of partial electrodes. Here, however, a signal of the same voltage must be applied to the partial electrodes and, hence, the partial electrodes must be electrically connected together. According to this embodiment as shown in FIG. 45, therefore, the pixel electrode 13 is not completely divided by slits, but the electrode is left at the perimetric portions 131, 132, 133 of the pixel electrode 13 to form electric connection portions. As described above, the alignments of the molecules are disturbed near the electric connection portions. Therefore, according to this embodiment as shown in FIG. 10, the electric connection portions are formed in the perimeter of the pixel electrode 13 and are shielded by the BM 34 to obtain luminance and response speed comparable with those of when protrusions are formed on both of them. In this embodiment in which the CS electrode 35 having light-shielding property is provided at the central portion of the pixel, the pixel is divided into upper and lower two portions. Reference numeral 34A denotes an opening of the upper side defined by BM, and 34B denotes an opening of the lower side defined by BM, and light passes through the inside of the openings.

Figure 47:
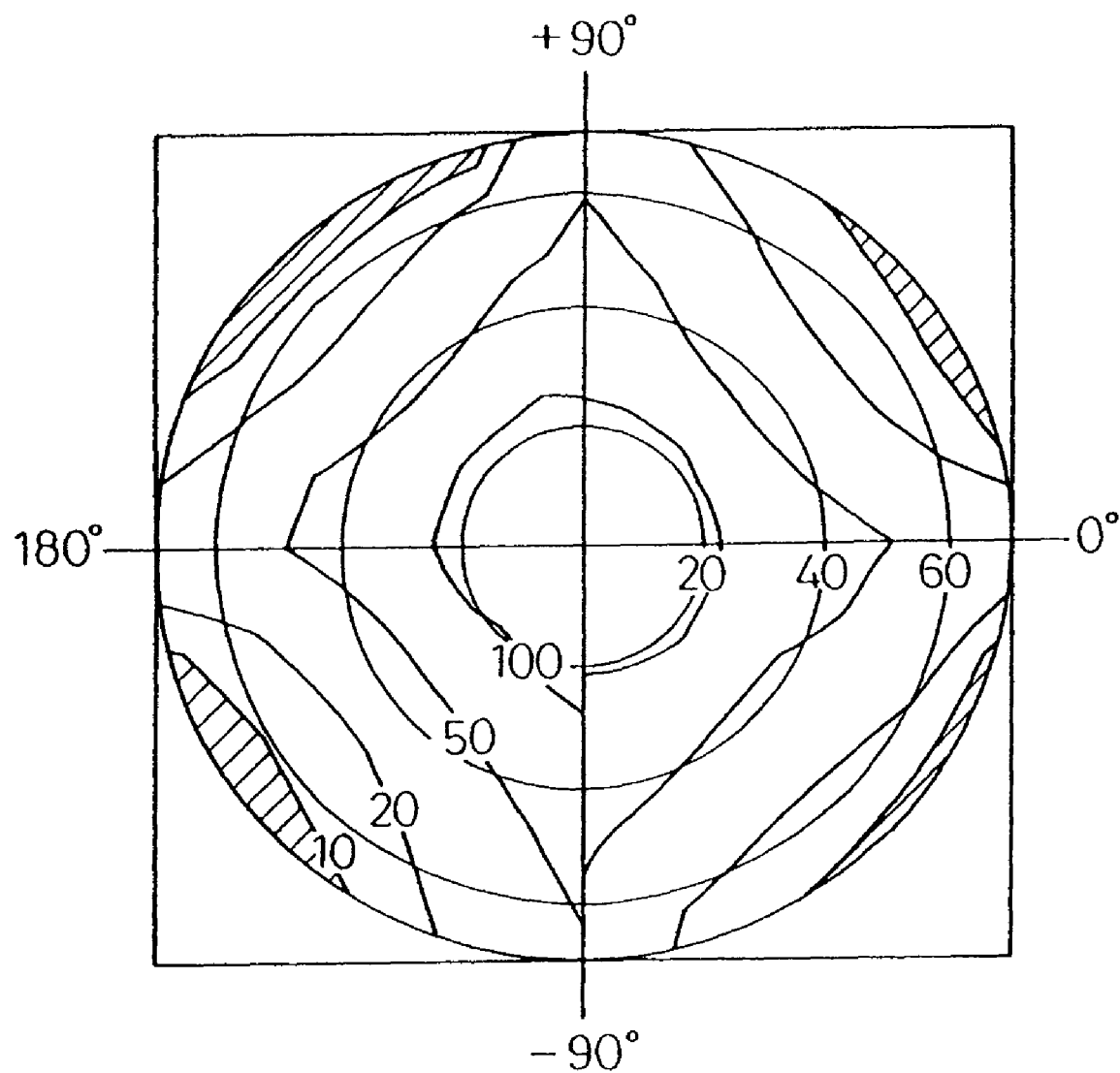
FIG. 47 is a diagram showing a viewing angle characteristic of the panel of the sixth embodiment.
Figure 48A:
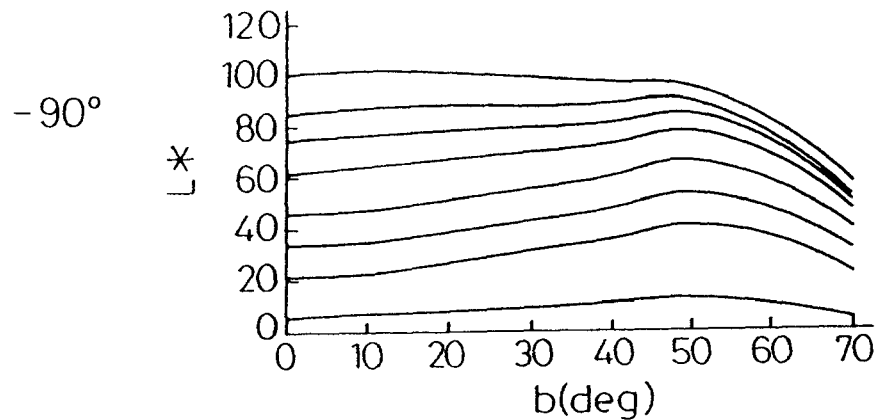
FIGS. 48A to 48C are diagrams showing changes in display luminance levels of the panel of the sixth embodiment.
Figure 48B:
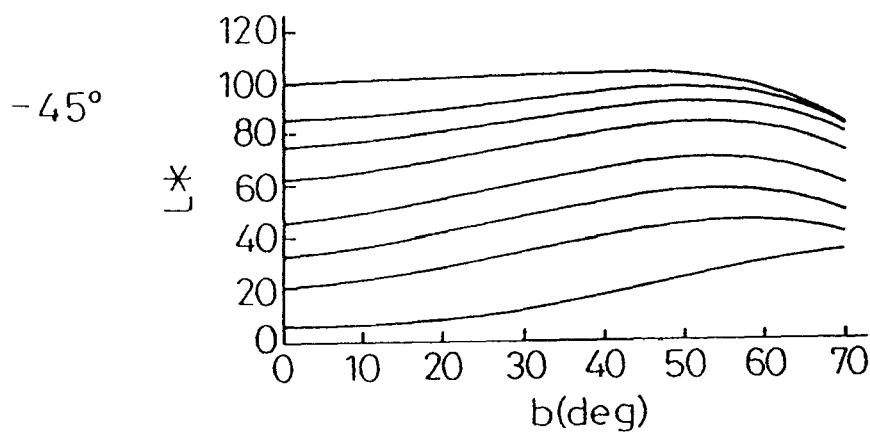
Figure 48C:
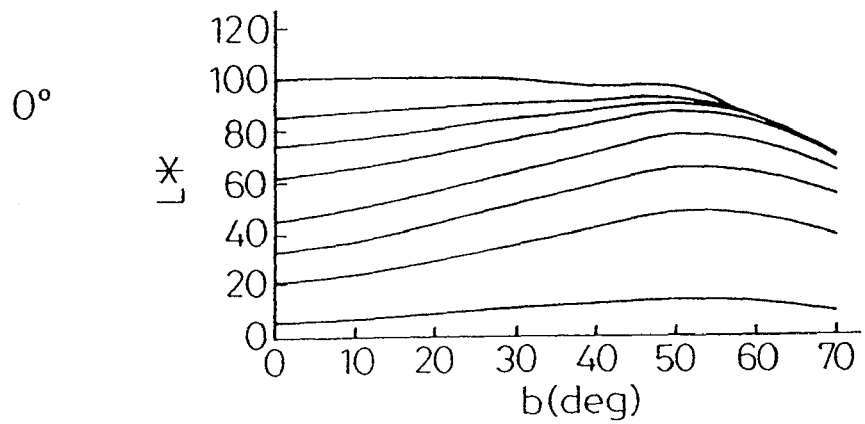

FIGS. 47 to 48C are diagrams showing a viewing angle characteristic exhibited by the sixth embodiment. As illustrated, the viewing angle characteristic is excellent and irregular display is overcome. Moreover, a response speed is as high as a switching speed is 17.7 ms. Thus, very fast switching can be achieved.

FIGS. 49A and 49B illustrate another example of the pattern of the pixel electrode, wherein the BM 34 shown in FIG. 49B is formed on the pixel electrode 113 shown in FIG. 49A. The pattern of the pixel electrode can be modified in a variety of ways. For example, electric connection portions may be formed in the perimeter on both sides of the slit to decrease the resistance between the partial electrodes.

In the fifth and sixth embodiments, slits can be provided in the place of the protrusions on the counter electrode 12. Namely, both of the domain regulating means are realized by the slits. However, in this constitution, the response speed is decreased.

In the sixth embodiment, the electric connection portions are formed in the same layer as the partial electrodes. The electric connection portions, however, may be formed in a separate layer. A seventh embodiment deals with this case.

FIGS. 50A and 50B are diagrams illustrating a pattern and a structure of the pixel electrode according to the seventh embodiment. The seventh embodiment is the same as the sixth embodiment except that the connection electrode 134 is formed simultaneously with the formation of the data bus line 32, and a contact hole is formed in the insulating layer 135 to connect the partial electrode 13 to the connection electrode 134. In this embodiment, the connection electrode 134 is formed simultaneously with the data bus line 32. However, the connection electrode 134 may be formed simultaneously with the gate bus line 31 or the CS electrode 35. The connection electrode may be formed separately from the formation of the bus line. In this case, however, a step must be newly provided for forming the connection electrode, i.e., a new step must be added. In order to simplify the steps, it is desired to form the connection electrode simultaneously with the formation of the bus line or the CS electrode.

In the seventh embodiment, the connection electrode which becomes a cause of abnormal orientation is more separated away from the liquid crystal layer than that of the sixth embodiment, making it possible to further decrease abnormal orientation. When the connection electrode is formed of a light-shielding material, such a portion is shielded from light, and the quality of display is further improved.

Figure 51:
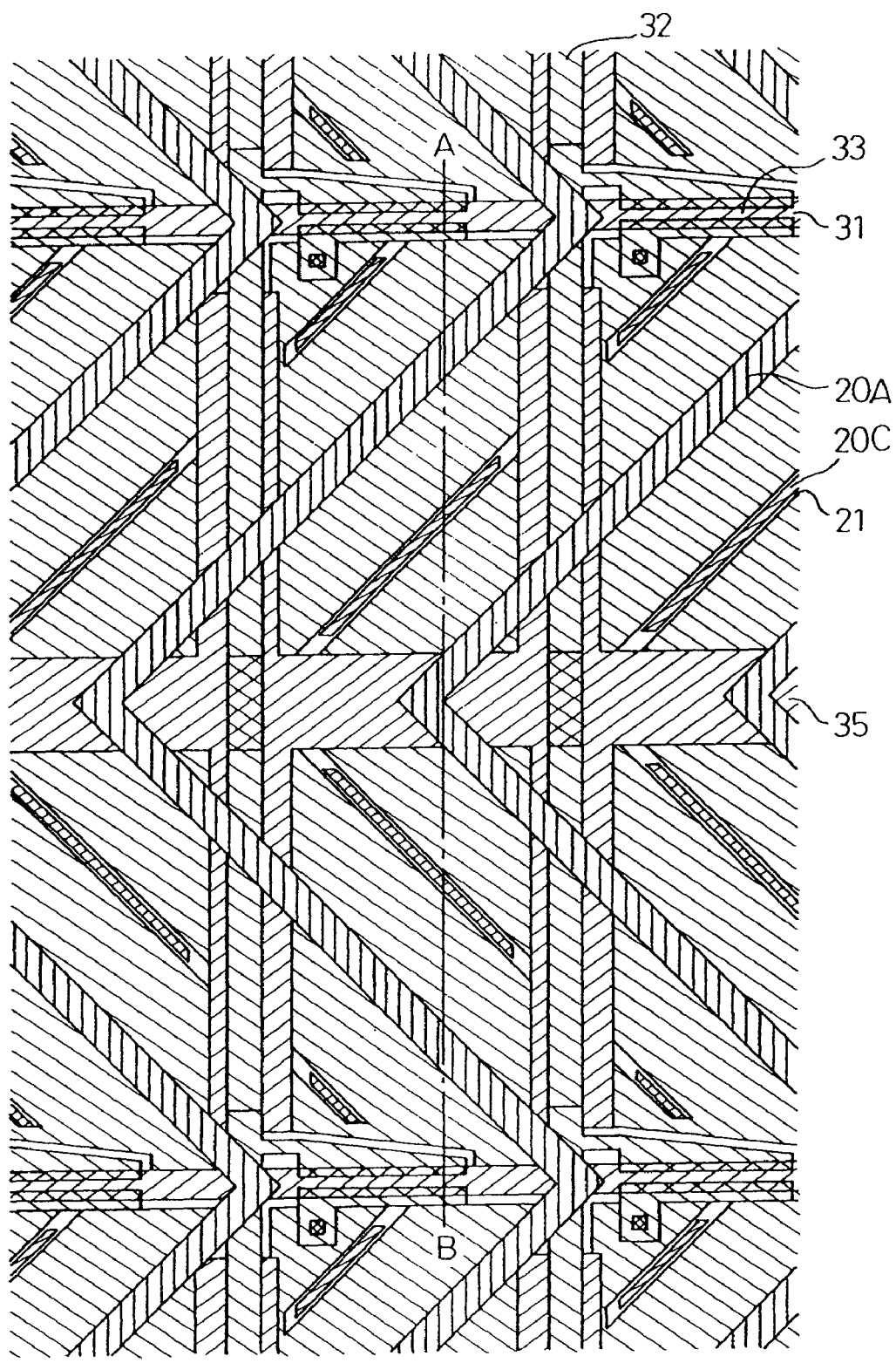
FIG. 51 is a plan view of pixel portion in a LCD panel of the seventh embodiment.
Figure 52:
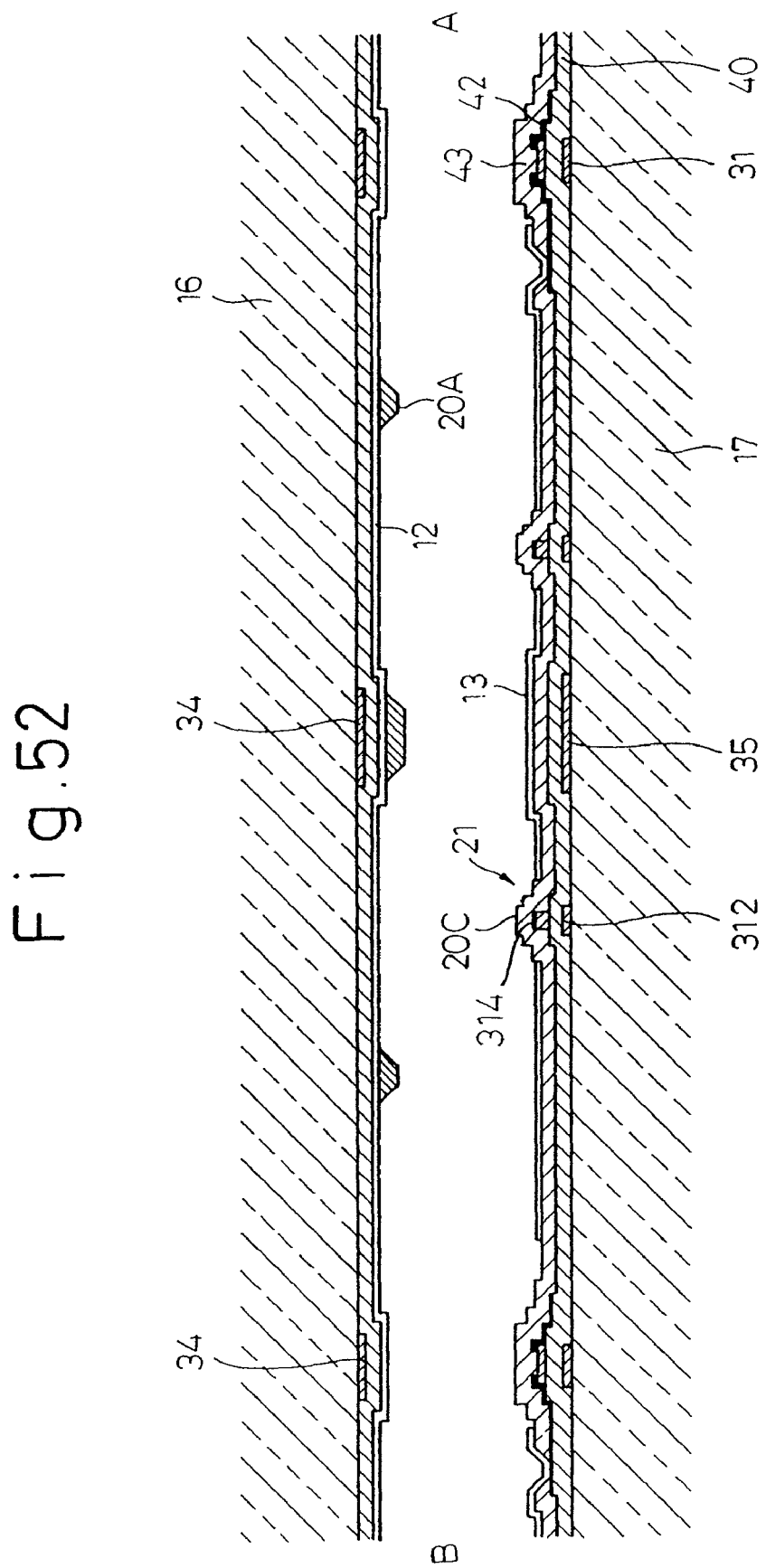
FIG. 52 is a diagram showing a structure of a panel of an eighth embodiment.

FIG. 51 is a plan view of a pixel portion according to a eighth embodiment, and FIG. 52 is a sectional view of a portion A B in FIG. 51. The eighth embodiment is the same as the sixth embodiment except that a protrusion 20C is formed in the slit of the pixel electrode 13. Both the slit of the electrode and the insulating protrusion formed on the electrode define the orientation region of the liquid crystals. When the protrusion 20C is formed in the slit 21 as in this embodiment, the directions of orientation of the liquid crystals due to the slit 21 and the protrusion 20C are in agreement, the protrusion 20C assisting the division of orientation by the slit 21, to improve stability. Therefore, the orientation is more stabilized and the response speed is more increased than those of the first embodiment. Referring to FIG. 52, the protrusion 20C is formed by laminating the layers that are formed when the CS electrode 35, gate bus line 31 and data bus line 32 are formed.

Figure 53A:
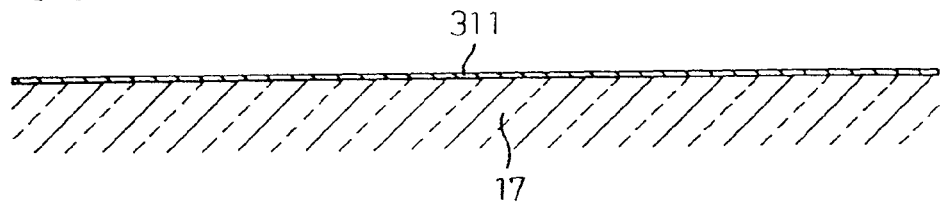
FIGS. 53A to 53J are diagrams showing a process for producing a TFT substrate of the eighth embodiment.
Figure 53B:
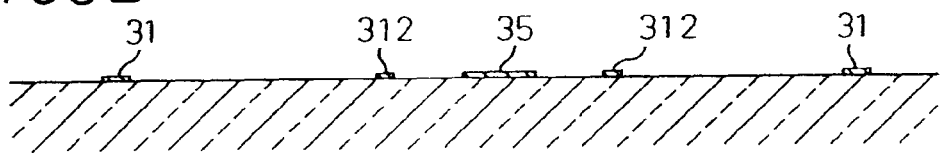
Figure 53C:
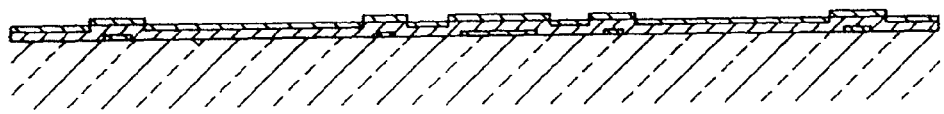
Figure 53D:
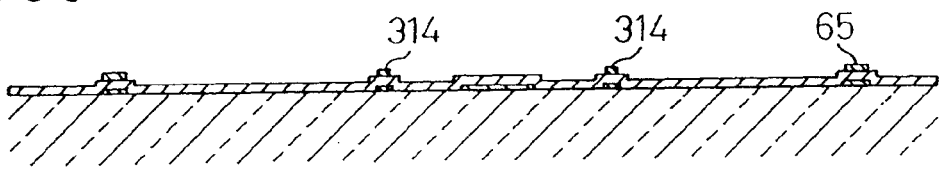
Figure 53E:
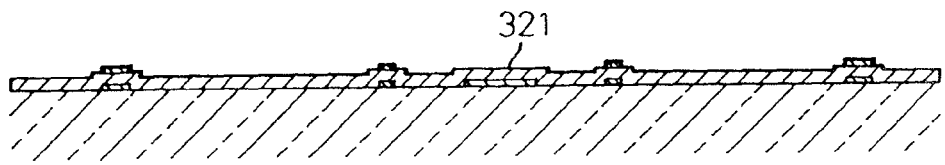
Figure 53F:
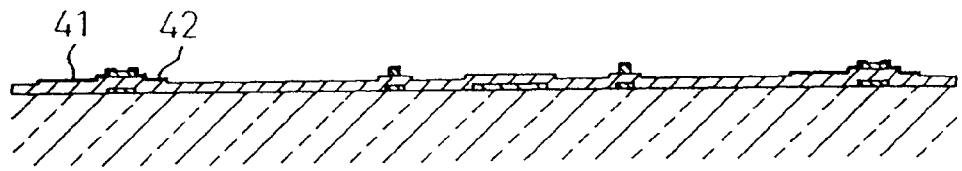
Figure 53G:
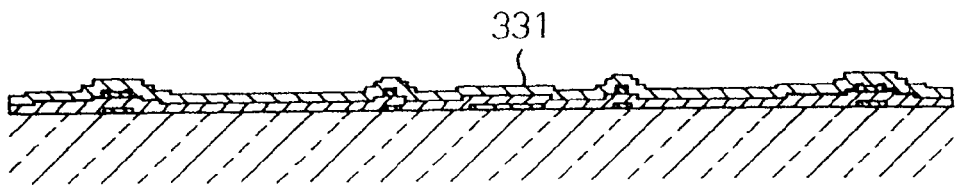
Figure 53H:
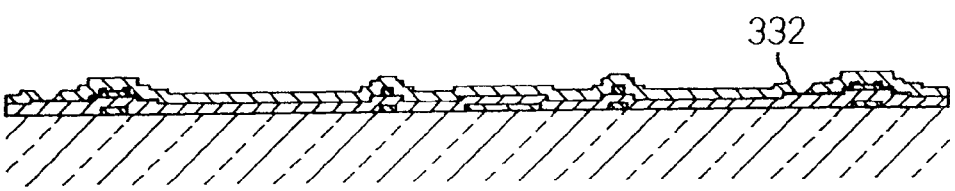
Figure 53I:
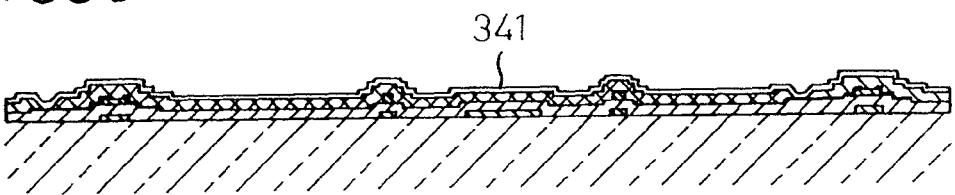
Figure 53J:
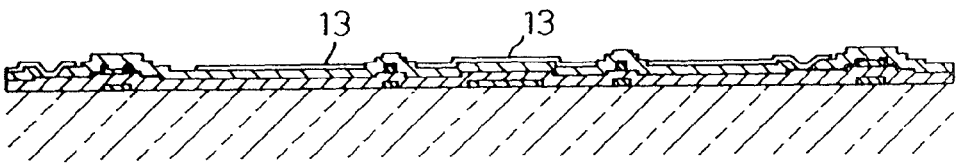

FIGS. 53A to 53J are diagrams illustrating a process for producing a TFT substrate according to the eighth embodiment. In FIG. 53A, a metal film of the gate layer is formed on a glass substrate 17. In FIG. 53B, portions corresponding to gate bus lines 31, CS electrodes 35 and protrusions 312 are left relying upon the photolithography method. In FIG. 53C, a gate-insulating film, an amorphous silicon active layer and a channel protection film are continuously formed. In FIG. 53D, the channel protection film 314 is left in a self-aligned manner by exposure to light through the back surface. In FIG. 53E, a metal film 321 is formed for forming the contact layer and the source-drain layer. In FIG. 53F, a source electrode 41 and a drain electrode 42 are formed relying on the photolithography method. At this moment, the metal film is left even at a position corresponding to the protrusion 20C on the inside of the slit. In FIG. 53G, a passivation film 33 is formed. In FIG. 53H, a contact hole 332 is formed for the source electrode 41 and the pixel electrode. In FIG. 53I, an ITO film 341 is formed. In FIG. 53J, a pixel electrode 13 is formed by the photolithography method. Slits are formed at this moment.

According to this embodiment as described above, the protrusion 20C is formed in the slit 21 of the pixel electrode 13 without, however, increasing the number of the steps compared with the conventional process. Besides, the orientation is further stabilized owing to the protrusion 20C. In this embodiment, the protrusion in the slit of the pixel electrode is formed by superposing three layers, i.e., gate bus line layer, channel protection layer and source/drain layer. The protrusion, however, may be formed by one layer or by a combination of two layers.

Figure 54:
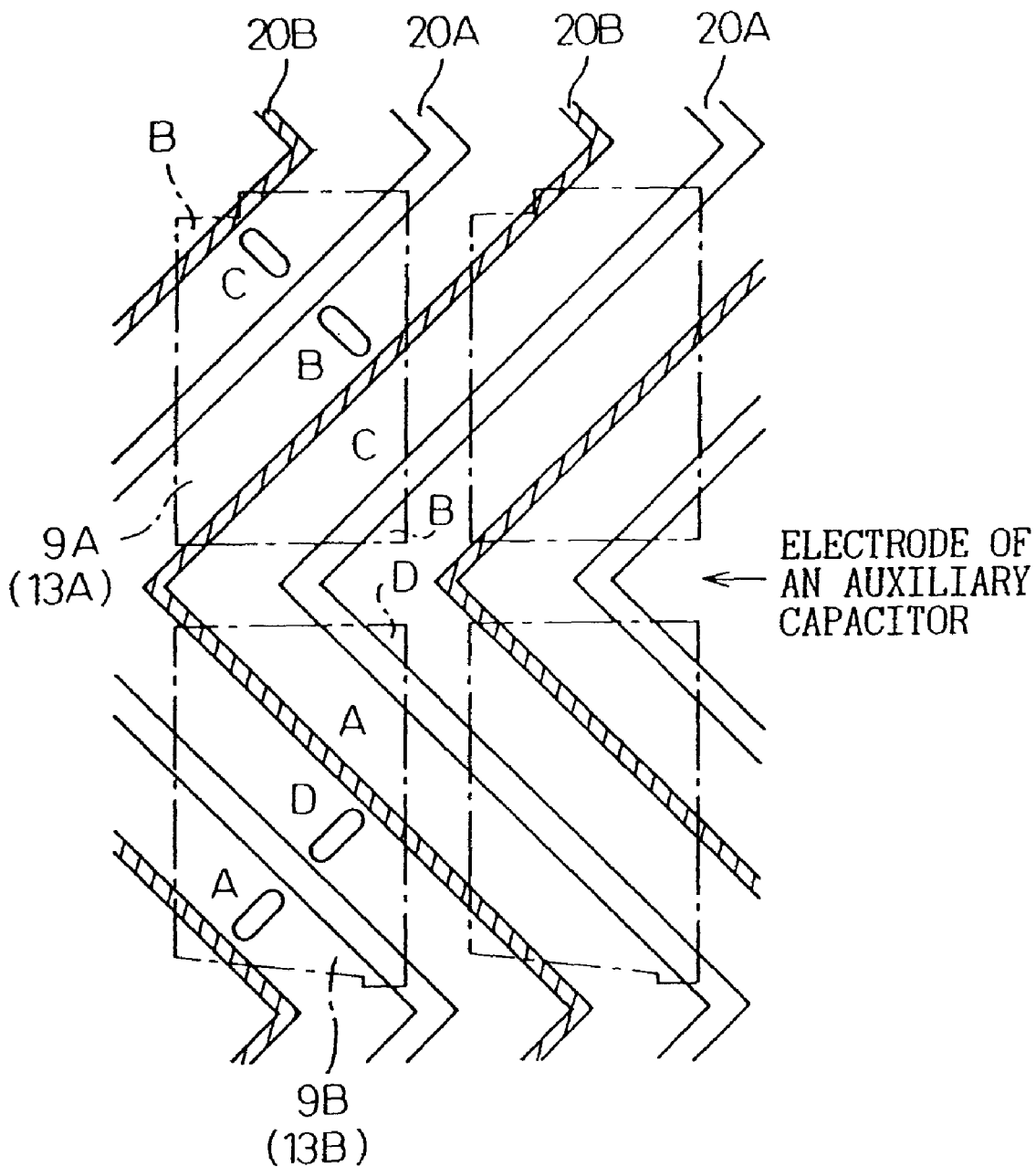
FIG. 54 is a diagram showing a pattern of protrusions a panel of a ninth embodiment.
Figure 55:
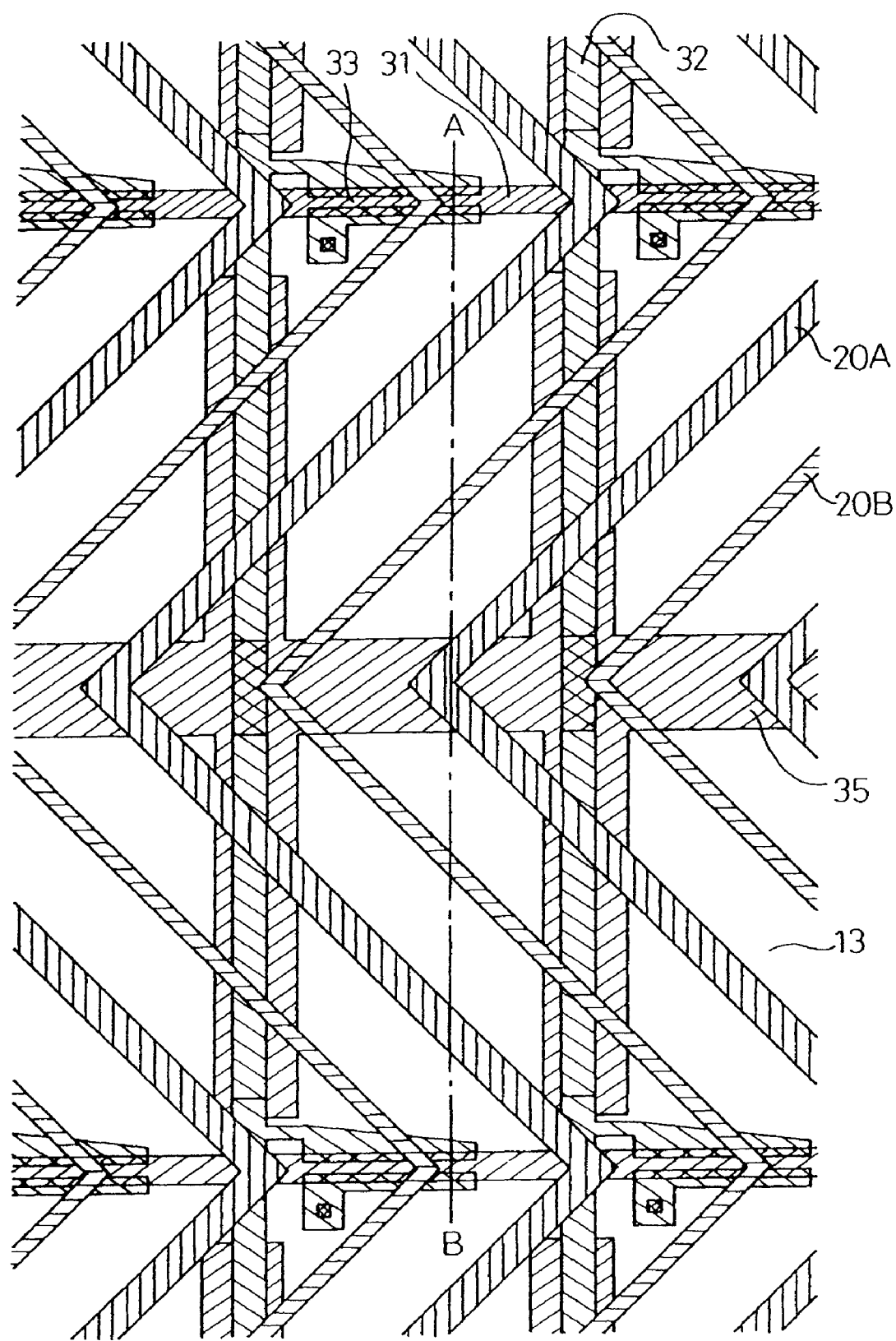
FIG. 55 is a plan view of pixel portion in a LCD panel of the ninth embodiment.

FIG. 54 is a diagram showing the shape of the protrusions 20A and 20B in the ninth embodiment which are seen in a direction vertical to the panel. FIG. 55 is a diagram showing a practical plan view of pixel portions of the ninth embodiment. A panel of the ninth embodiment of the present invention is provided by zigzagging the protrusions 20A and 20B in the panel of the first embodiment like those in the one of the sixth embodiment. As illustrated, the protrusions 20A and 20B are zigzagged so that an orientation causing each domain to be divided into four regions can be attained. The directions of the surfaces of each protrusion reaching and receding from a bent are mutually different by 90°. Since liquid crystalline molecules are aligned in a direction vertical to the surfaces of each protrusion, an orientation causing each domain to be divided into four regions can be attained. In practice, a panel in which a thickness of the liquid crystal layer is 4.1 μm, a width and height of the protrusions 20A are respectively 10 μm and 4 μm, a width and height of the protrusions 20B are respectively 5 μm and 1.2 μm, a gap between the protrusions 20A and 20B (a distance in the direction shifted by 45° from the horizontal line in the figure) is 27.5 μm, and a size of the pixel (pixel arrangement pitches) is 99 μm×297 μm has been made. As a result of measurement of this panel, the response speed of the panel is identical to that of the panel of the first embodiment. The viewing angle characteristic thereof is identical to the one in the sixth embodiment, and is so excellent as to demonstrate that the orientation is divided vertically and laterally uniformly. Optimal values of the width, height and gap of the protrusions have relations to each other. Further, they are changed according to materials of the protrusions, vertical alignment film, liquid crystal, a thickness of the liquid crystal layer and so forth.

In the panel in the ninth embodiment, the direction of tilt of liquid crystalline molecules can be controlled to include four directions. Regions A, B, C, and D in FIG. 54 are regions to be controlled so that liquid crystalline molecules therein will be aligned in the four directions. The ratio of the regions within one pixel is uneven. This is because the pattern of protrusions is continuous and is located in the same way in all pixels, and a pitch of repeated patterns of protrusions is matched with a pitch of arrayed pixels. In reality, the viewing angle characteristic shown in FIGS. 47 to 48C is exhibited but does not reflect the uneven ratio of regions resulting from orientation division. However, this state is not very preferable. The pattern of protrusions shown in FIG. 54 is therefore formed all over the substrates with the pitch of pixels ignored. The width of a resist is 7 micrometers, an interval between resist lines is 15 micrometers, the height of the resist is 1.1 micrometers, and the thickness of cells is 3.5 micrometers. Using a TFT substrate and CF substrate meeting these conditions, a liquid crystal display of size 15 was produced as a prototype. Some resist lines interfered with gate bus lines and data bus lines. Nevertheless, generally good display appeared. Even when the width of the resist was increased to be 15 micrometers and the interval between resist lines was increased to 30 micrometers, nearly the same results were obtained. Consequently, when the width of protrusions and the pitch of repeated patterns are made much smaller than the pitch of pixels, even if a pattern of protrusions is drawn with the dimensions of a pixel ignored, good display can be attained. Besides, the freedom in design expands. For completely preventing interference with bus lines, the pitch of repeated patterns of protrusions or dents should be set to an integral submultiple or multiple of the pitch of pixels. Likewise, a cycle of protrusions must be designed in consideration of a cycle of pixels and should preferably be set to an integral submultiple or multiple of the pitch of pixels.

Figure 56:
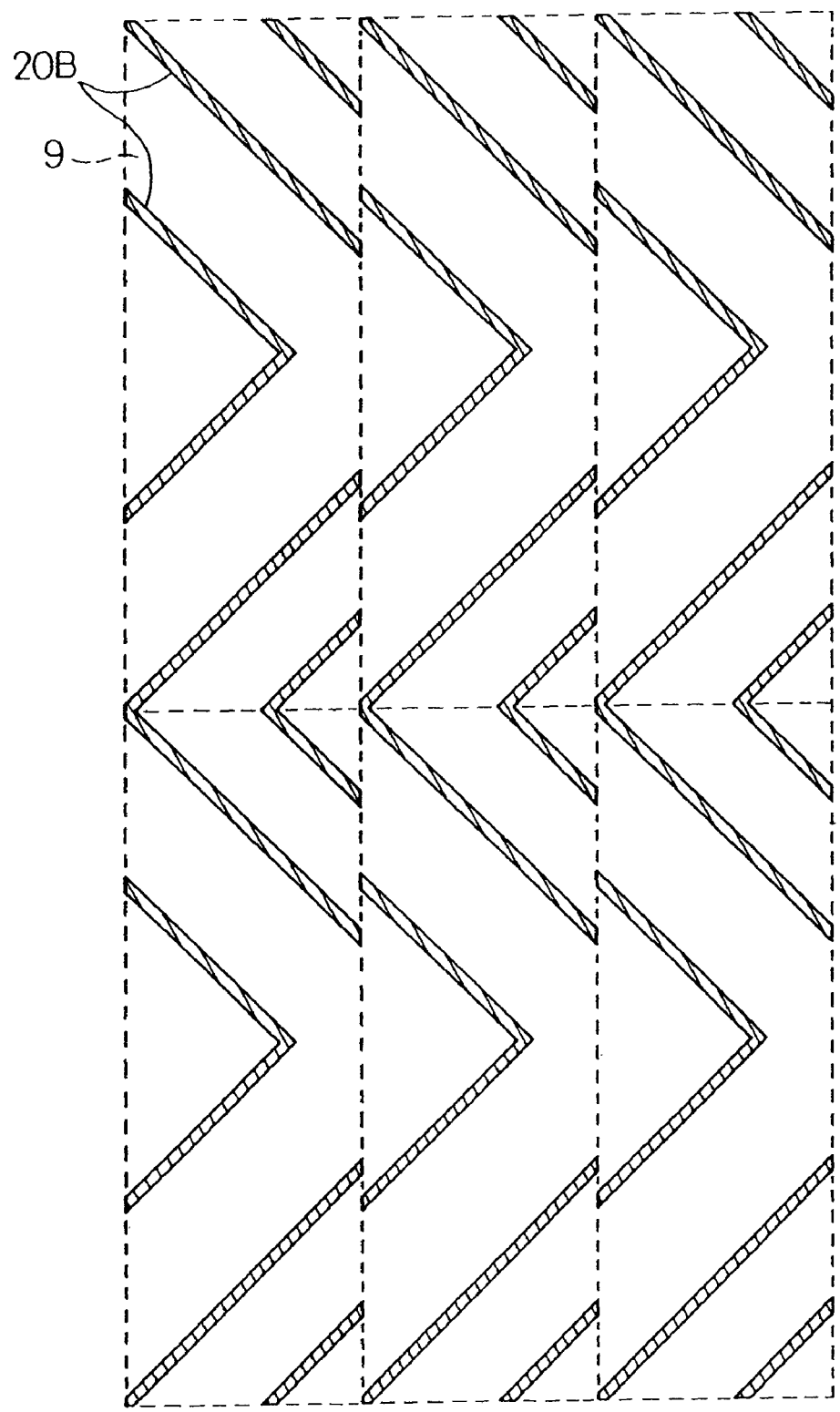
FIG. 56 is a diagram showing a modification of pattern of protrusions of the ninth embodiment.

In the ninth embodiment, when a pattern of protrusions that is discontinuous like the one shown in FIG. 56 is adopted, the ratio of regions within one pixel in which liquid crystalline molecules are aligned in four different directions is even. There is still no particular problem in manufacturing. However, since the pattern of protrusions is discontinuous, the orientation of the liquid crystal is disordered at the edges of patterns. This leads to deteriorate display quality such as light leakage. Even from this viewpoint, preferably, the pitch of repeated patterns of protrusions should be matched with the pitch of arrayed pixels, and a continuous pattern of protrusions should be adopted.

In the ninth embodiment, the protrusions of dielectric materials are formed in a zig-zag manner on the electrodes 12, 13 as the domain regulating means and the protrusions regulate the alignment direction of the liquid crystalline molecules. As described above, the slits provided on the electrodes generate oblique electric fields, at the edges thereof, and the oblique electric fields operate as the domain regulating means. The edges of the cell (pixel) electrodes also generate oblique electric field. Therefore, the oblique electric field must be considered as the domain regulating means.

Figure 57A:
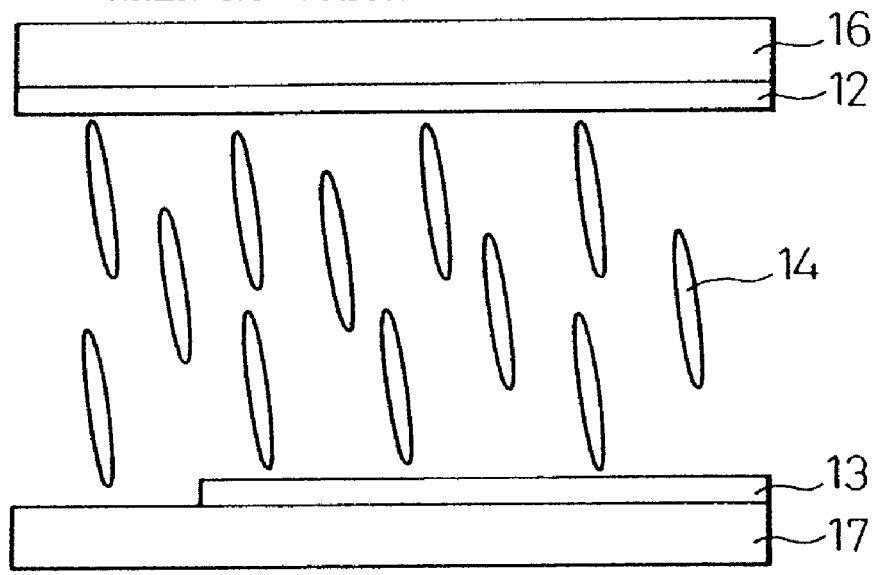
FIGS. 57A and 57B are diagrams for explaining influences of oblique electric fields at edges of an electrode.
Figure 57B:
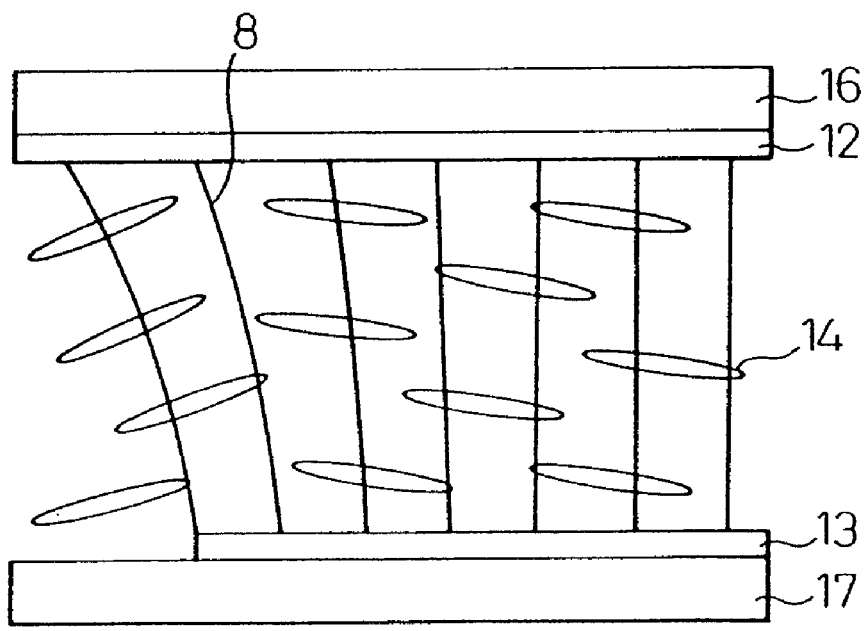

FIGS. 57A and 57B are diagrams for explaining this phenomenon and shows the case of the vertical orientation somewhat inclined from the vertical direction. As shown in FIG. 57A, each liquid crystal particle 14 is oriented substantially vertically when no voltage is applied thereto. Upon application of a voltage between electrodes 12 and 13, however, an electric field is generated in vertical direction in the electrodes 12 and 13 in the region other than the perimeter of the electrode 13, so that the liquid crystalline molecules 14 are tilted in the direction perpendicular to the electric field. One electrode is a common electrode, and the other electrode is a display pixel electrode separated into each display pixel. Therefore, as shown in FIG. 57B, the direction of the electric field 8 is inclined at its perimetric edge (edge). The liquid crystalline molecules 14 are tilted in the direction perpendicular to the electric field 8. The direction of inclination of the liquid crystal, therefore, is different between the central portion and the edge of the pixel as shown. This phenomenon is called "reverse tilt". A reverse tilt causes a schlieren structure to be formed in the display pixel area and thus deteriorates the display quality.

Figure 58:
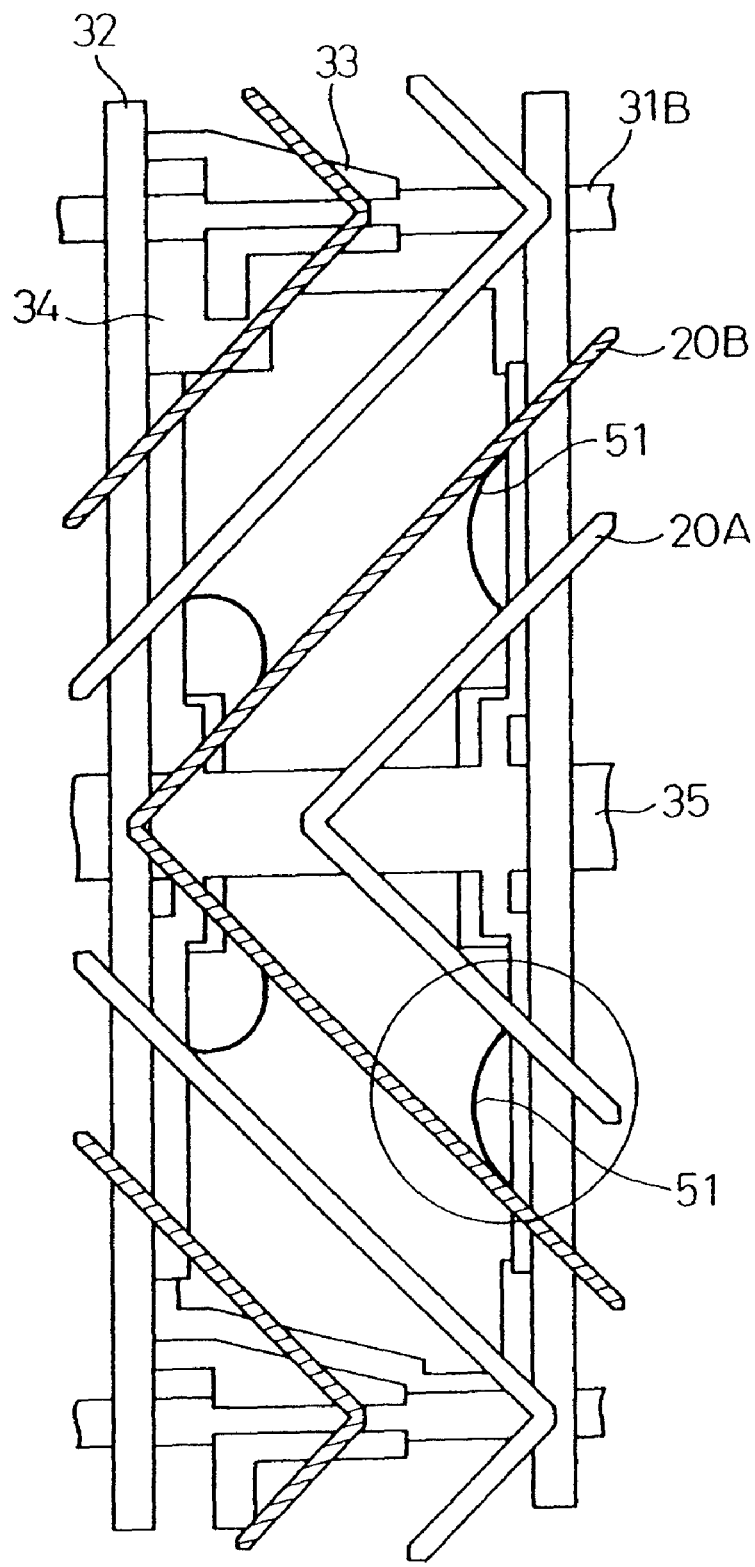
FIG. 58 is a diagram for explaining a problem occurred in a structure using zigzag protrusions.
Figure 59:
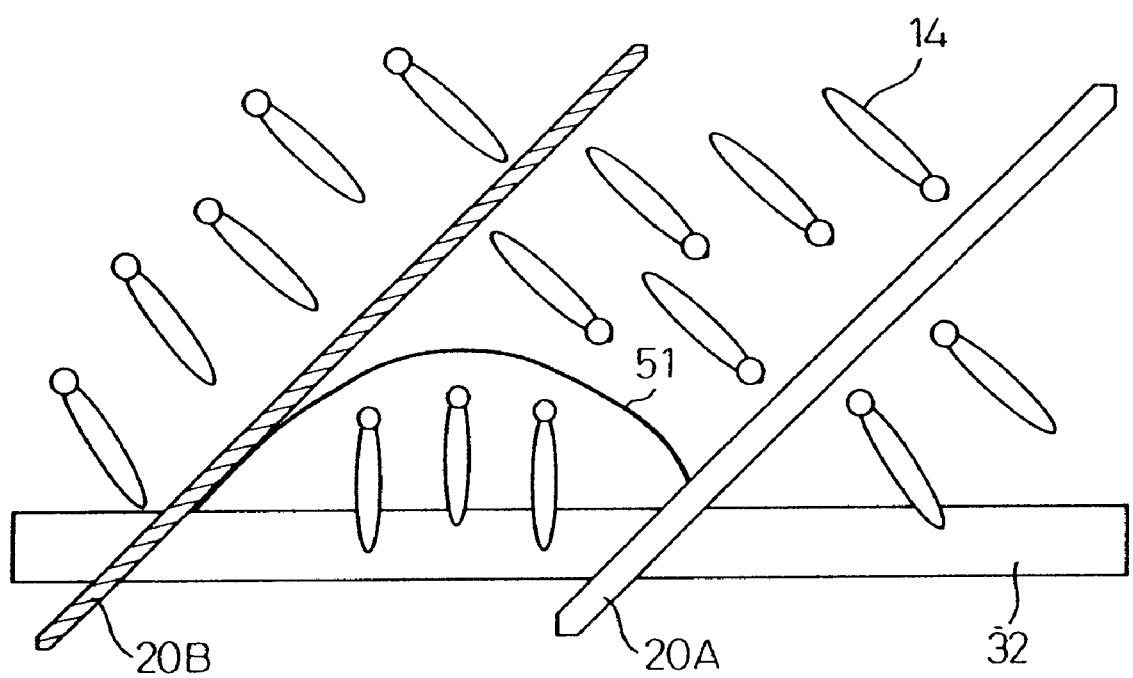
FIG. 59 is a diagram showing in enlarged form the neighborhood of a portion where a schlieren structure is observed.

The reverse tilt also occurs in the case where the domain regulating means is used. FIG. 58 is a diagram showing a portion 41 where the schlieren structure can be observed in a configuration formed with the zigzag protrusion pattern of the ninth embodiment. FIG. 59 is a diagram showing in enlarged form the neighborhood of the portion 41 where a schlieren structure is observed and also shows the direction in which the liquid crystalline molecules 14 are tilted upon application of a voltage thereto. In this case, protrusions of different materials are formed on the pixel electrode substrate formed with a TFT and on the opposed substrate formed with a common electrode. A vertical alignment film is printed, and the device is assembled without being rubbed. The cell thickness is 3.5 μm. The portion 41 where the schlieren structure is observed is where the direction in which the liquid crystalline molecules are fallen by the orientation regulation force due to the diagonal electric field is considerably different from the direction of orientation regulation due to the protrusions. This reduces the contrast and the response rate, thereby leading to a deteriorated display quality.

Figure 60:
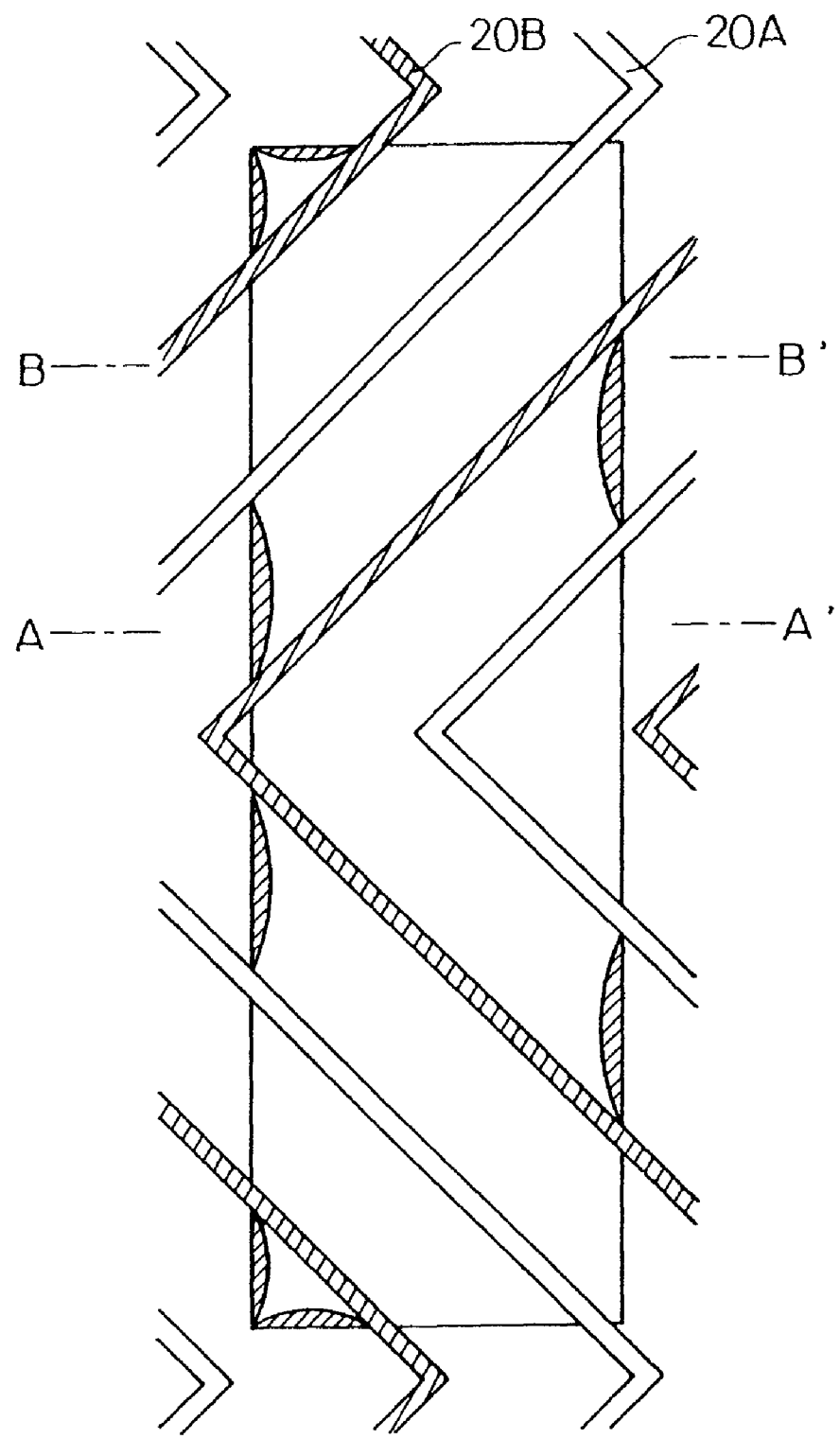
FIG. 60 is a diagram showing a region where response speed are reduced.

In the case where the liquid crystal display device configured of a protrusion pattern bent in zigzag in the ninth embodiment is driven, the display is darkened in a part of the display pixels, or a phenomenon called an after-image in which a somewhat previous display appears remaining occurs in the display of an animation or cursor relocation. FIG. 60 is a diagram showing a region appearing black in the pixel on the liquid crystal panel configured in the ninth embodiment. In this region, the change in orientation is found to be very slow upon application of a voltage.

Figure 61A:
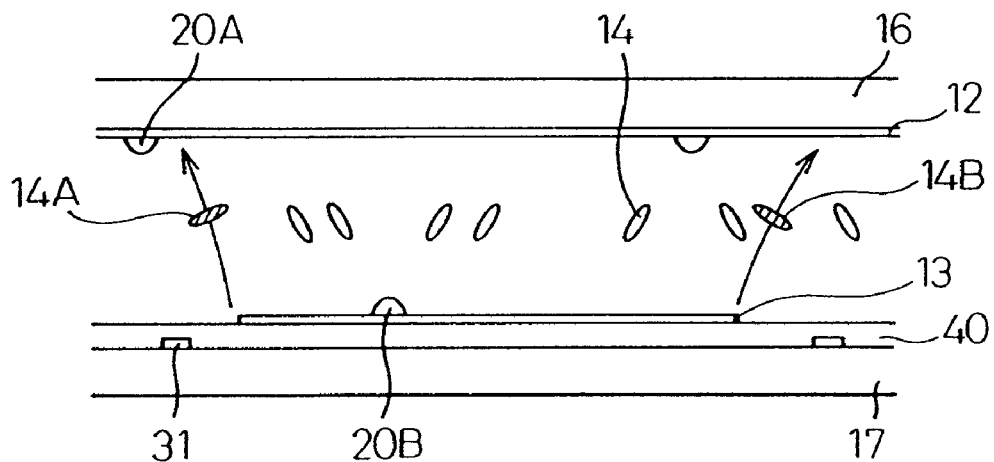
FIGS. 61A and 61B are sectional views of the portions where the response speed is reduced.
Figure 61B:
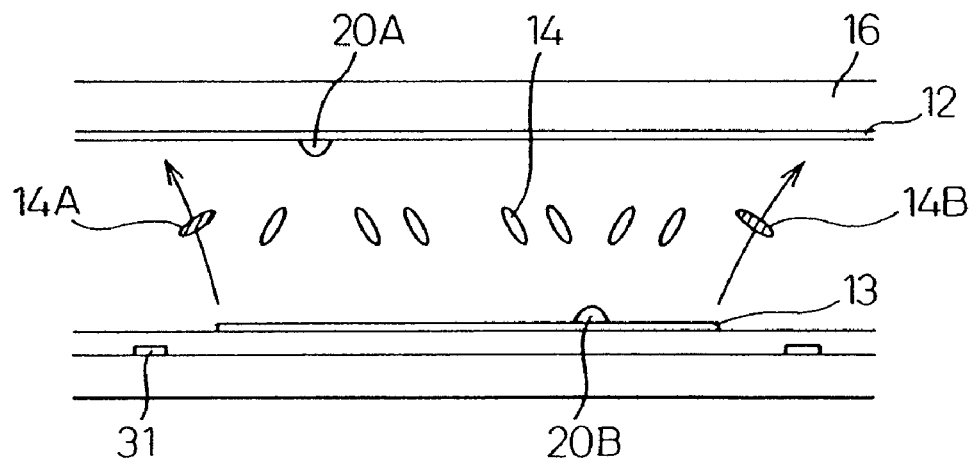

FIG. 61A is a sectional view taken in line A-A' in FIG. 60, FIG. 61B is a sectional view taken in line B-B'. As shown in FIG. 60, the section A-A' has a region looking black in the neighborhood of the left edge, while the neighborhood of the right edge lacks a region appearing black. In correspondence with this, as shown in FIG. 61A, the direction in which the liquid crystalline molecules are tilted by the orientation regulation force due to the diagonal electric field is considerably different from the direction of orientation regulation due to the protrusions in the neighborhood of the left edge, while the direction in which the liquid crystalline molecules are tilted by the orientation regulation force due to the diagonal electric field comparatively coincides with the direction of orientation regulation due to the protrusions in the neighborhood of the right edge. In similar fashion, a region looking black is present in the neighborhood of the right edge but absent in the neighborhood of the left edge. In correspondence with this, as shown in FIG. 61B, the direction in which the liquid crystalline molecules are tilted by the orientation regulation force due to the diagonal electric field is considerably different from the direction of orientation regulation due to the protrusions in the neighborhood of the right edge, while the direction in which the liquid crystalline molecules are tilted by the orientation regulation force due to the diagonal electric field comparatively coincides with the direction of orientation regulation due to the protrusions in the neighborhood of the left edge.

As described above, the deterioration of the display quality is attributable to the portion where the direction in which the liquid crystalline molecules are tilted by the orientation regulation force due to the diagonal electric field at an edge of the display pixel electrode is considerably different from the orientation regulation force due to the protrusions upon application of a voltage thereto.

In the case where a liquid crystal display device having a configuration with a protrusion pattern is driven, the display quality is seen to deteriorate in the neighborhood of the bus line (gate bus line or data bus line) in the pixel. This is due to the undesirable minute region (domain) formed in the neighborhood of the bus line and the resulting disturbance of liquid crystal orientation and reduced response rate. The problem thus is posed of a reduced viewing angle characteristic and a reduced color characteristic in half tone.

Figure 62A:
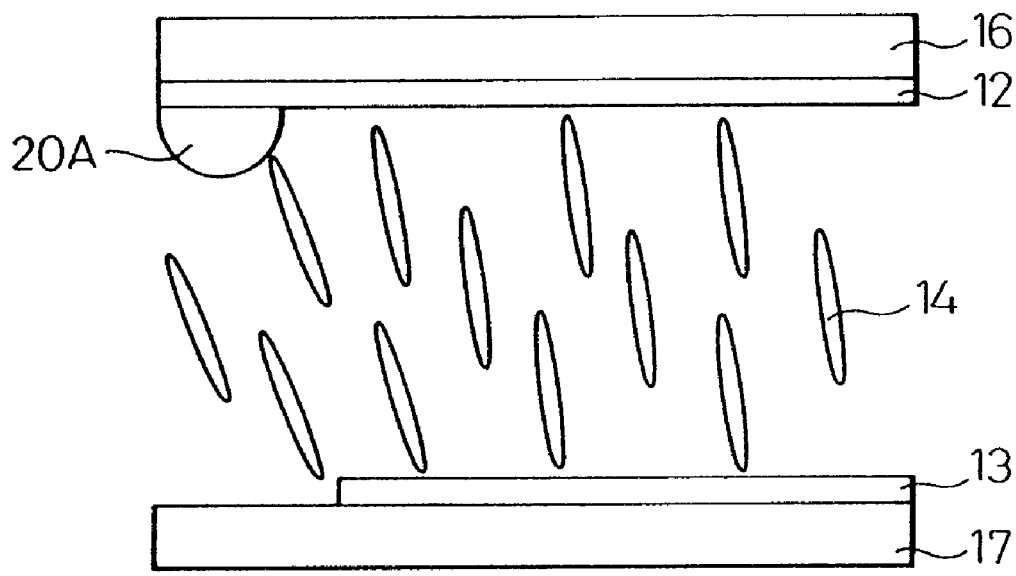
FIGS. 62A and 62B are diagrams showing a fundamental arrangement of a protrusion with respect to an edge of pixel electrode in a tenth embodiment.
Figure 62B:
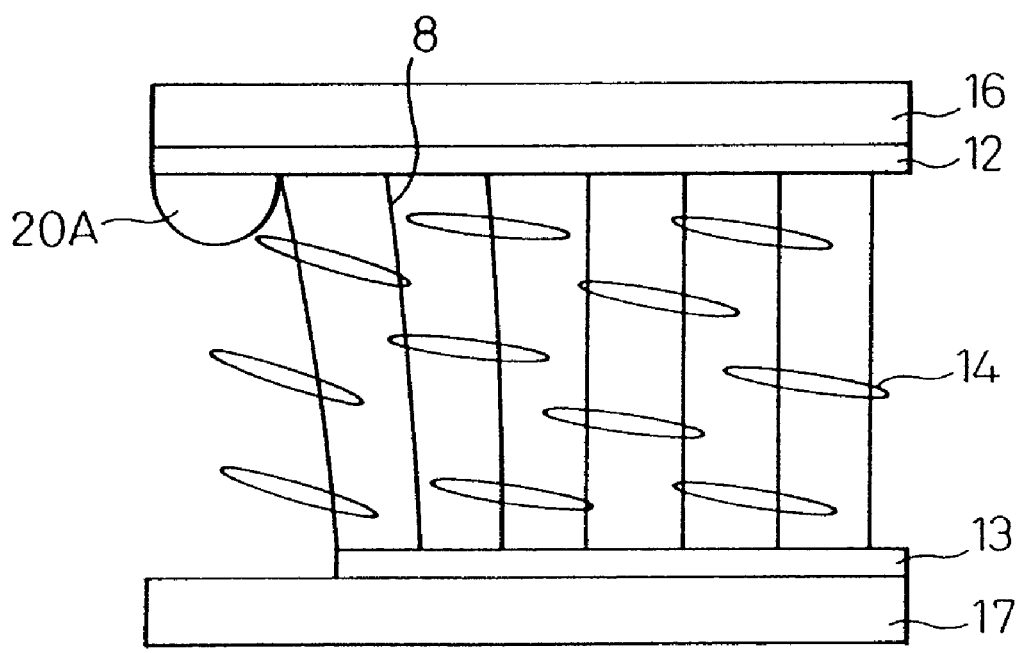

FIGS. 62A and 62B are diagrams showing a fundamental configuration of a LCD according to a tenth embodiment. A pixel functions within the range defined by a cell electrode 13, which will be called a display region and the remaining part a non-display region. Normally, a bus line and a TFT are arranged in a non-display region. A bus line made of a metal material has a masking characteristic but a TFT transmits light. As a result, a masking member called a black matrix (BM) is inserted between a TFT, a cell electrode and a bus line.

According to the tenth embodiment, a protrusion 20A is arranged in the non-display region on a common electrode 12 of a CF substrate 16 so as to generate an orientation regulation force in a direction different from the orientation restriction force exerted due to a diagonal electric field generated by an edge of the cell electrode 13. FIG. 62A, shows the state where no voltage is applied. In this state, liquid crystalline molecules 14 are oriented substantially perpendicular to the surfaces of the electrodes 12, 13 and the protrusion 20A due to the vertical orientation process. Upon application of a voltage thereto, as shown in FIG. 62B, the liquid crystalline molecules 14 are oriented in the direction perpendicular to the electric field 8. In the non-display region lacking the cell electrode 13, the electric field is formed diagonally from the neighborhood of an edge of the cell electrode 13 toward the non-display region. This diagonal electric field tends to orient the liquid crystalline molecules 14 in a direction different from the orientation in the display region as shown in FIG. 57B. The orientation regulation force of the protrusion 42, however, orients the liquid crystalline molecules 14 in the same direction as in the display region, as shown in FIG. 62A.

Figure 63:
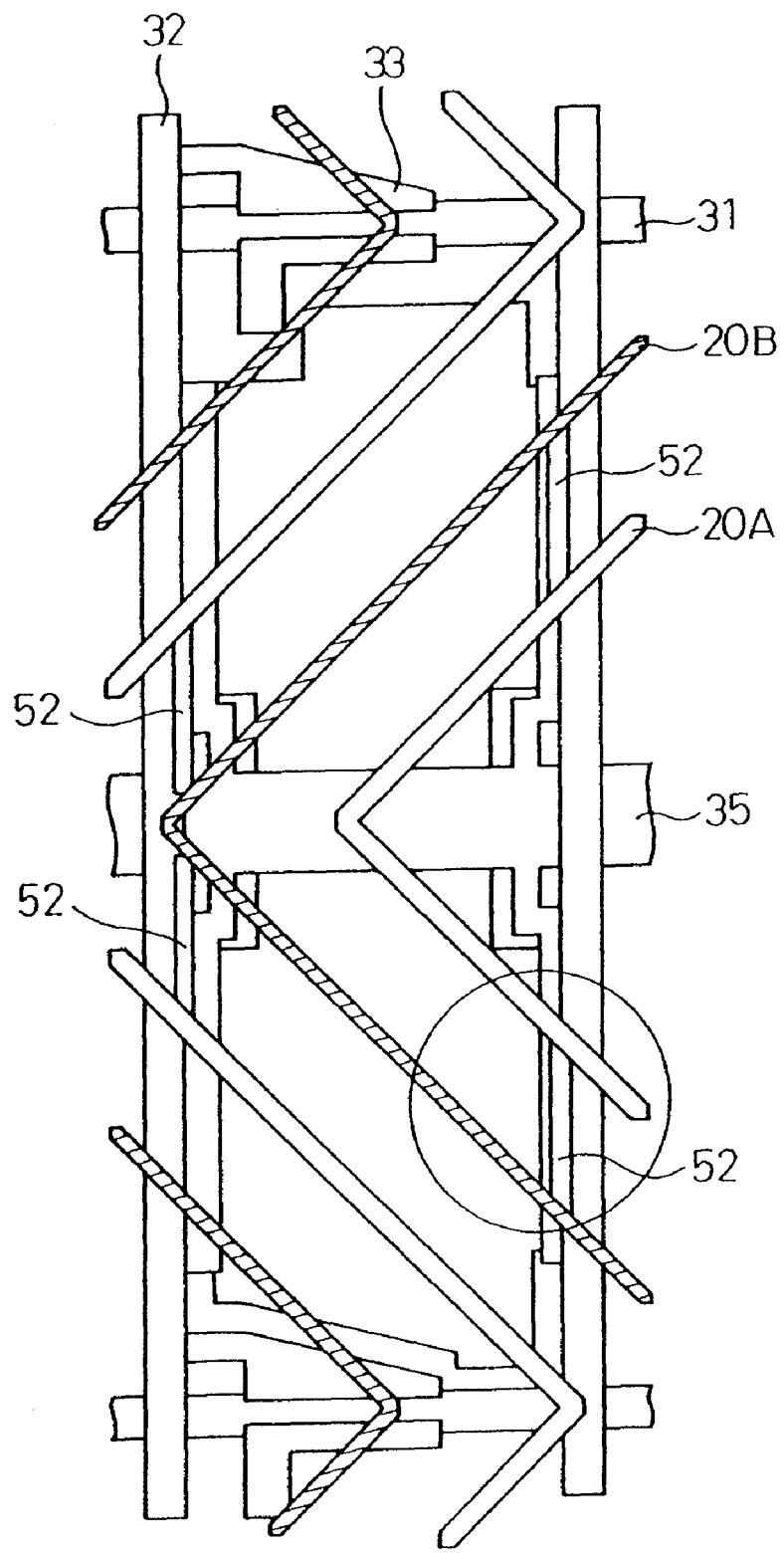
FIG. 63 is a diagram showing an arrangement of protrusions in the tenth embodiment.
Figure 64:
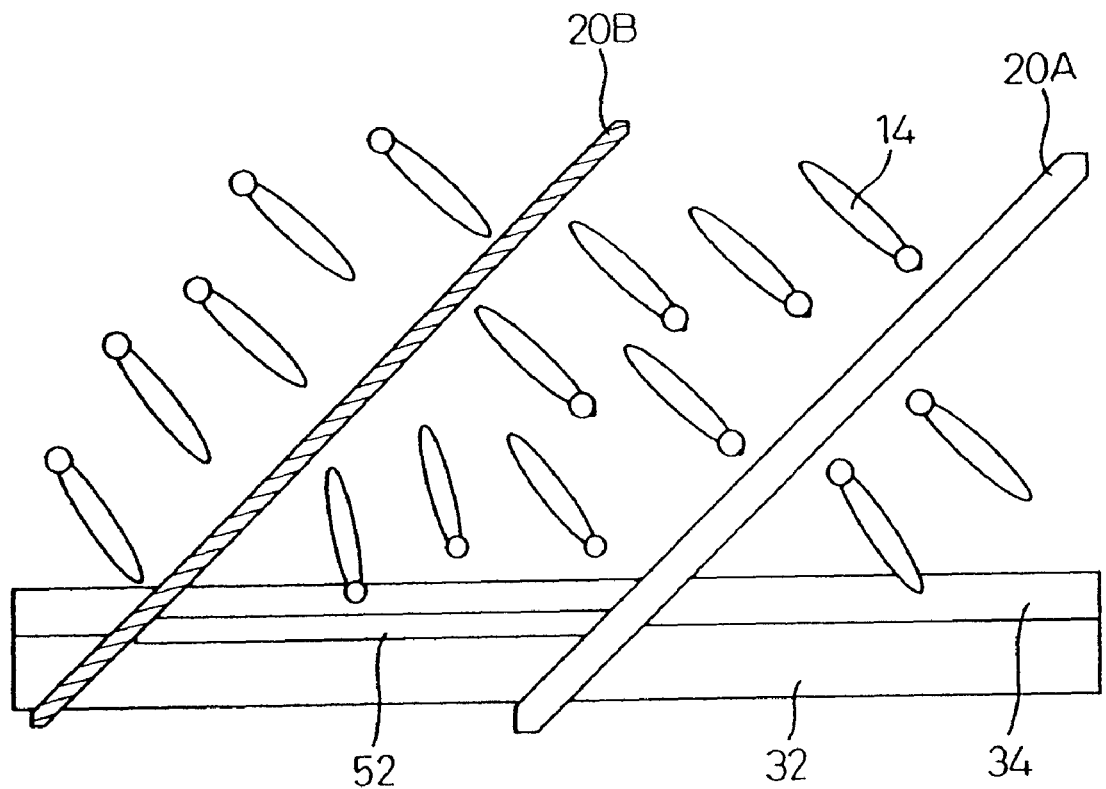
FIG. 64 is a detailed diagram showing a distinctive portion of the tenth embodiment.

FIG. 63 is a diagram showing a protrusion arrangement pattern in a liquid crystal display device of the tenth embodiment. FIG. 64 is a diagram showing, in enlarged form, the portion defined by a circle in FIG. 63. In the tenth embodiment, a new protrusion 52 is formed in the vicinity of the portion where a shlieren structure is observed. This protrusion 52 is connected to and integrally formed with a protrusion arrangement 20A formed on the common electrode 12. The relation shown in FIGS. 62A and 62B is realized at the portion formed with the protrusion 52, where the orientation of the liquid crystalline molecules 14 at an edge of the cell electrode coincides with the orientation in the display region, as shown in FIG. 64. Therefore, the schlieren structure that has been observed in FIG. 58 cannot be observed in FIG. 64 for an improve display quality.

FIG. 255 shows a modification in which the protrusion 52 is arranged to face the edge of the pixel electrode 13. In this modification, no shlieren structure is observed.

The tenth embodiment, which uses an acrylic transparent resin for the protrusion, can alternatively use a black material. The use of a black resin material can shield the leakage light at the protrusion and therefore improves the contrast. This is also the case with the embodiments described below.

The protrusion 52 which is formed as a non-display region domain regulating means in the non-display region as shown in FIGS. 62A to 63 can be replaced by a depression (groove) with equal effect. The depression, however, is required to be formed on the TFT substrate.

Any non-display domain regulating means which has an appropriate orientation regulation force can be employed. The direction of orientation is known to change, for example, when the light of a specific wavelength such as ultraviolet light is irradiated on the alignment film. Utilizing this phenomenon, it is possible to realize a non-display region domain regulating means by changing the direction of orientation in a part of the non-display region.

Figure 65A:
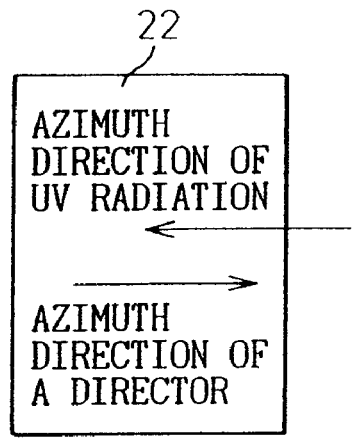
FIGS. 65A and 65B are diagrams for explaining a change in orientation direction by irradiation of ultraviolet light.
Figure 65B:
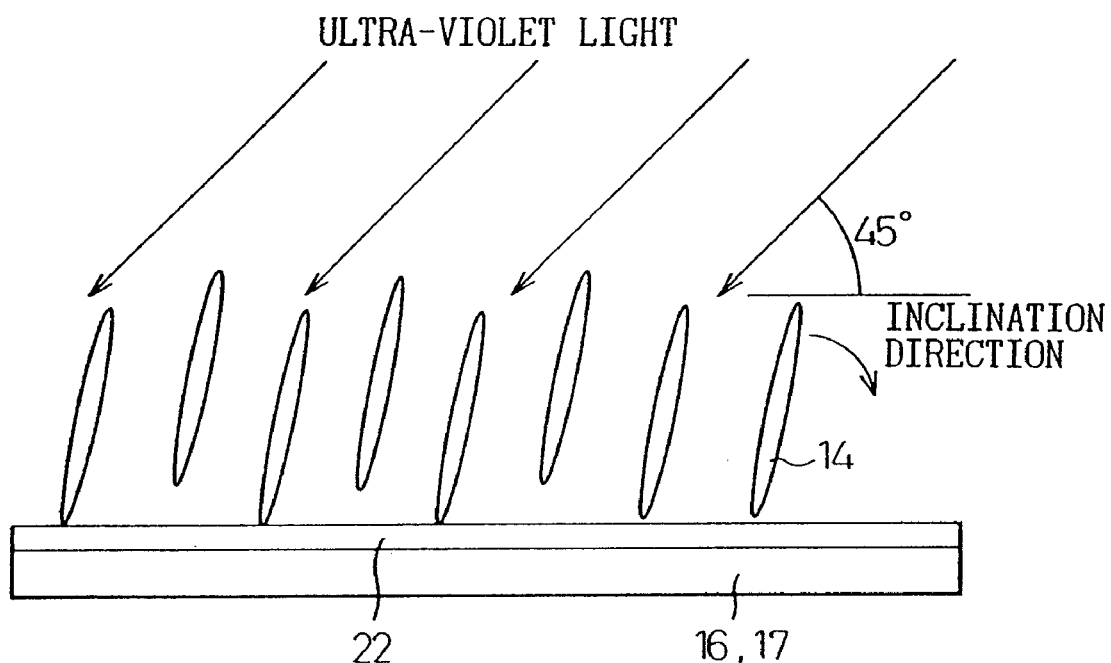

FIGS. 65A and 65B are diagrams for explaining the change in orientation direction by irradiation of ultraviolet light. As shown in FIG. 65A, a vertical alignment film is coated on the substrate surface, and a non-polarized ultraviolet light is irradiated on it from one direction at an angle of, say, 45° as shown in FIG. 65B. Then, the direction of orientation of the liquid crystalline molecules 14 is known to tilt toward the direction in which the ultraviolet light is irradiated.

Figure 66:
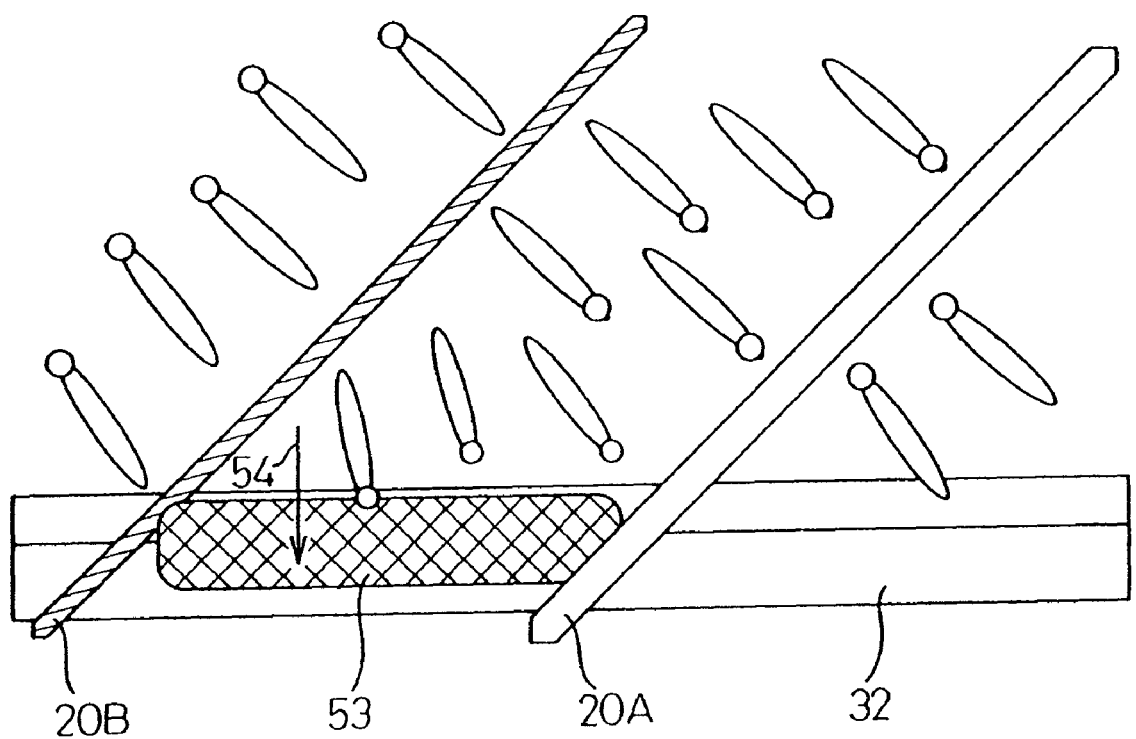
FIG. 66 is a diagram showing a modification of the tenth embodiment.

FIG. 66 is a diagram showing a modification of the tenth embodiment. The ultraviolet light is irradiated from the direction indicated by arrow 54 on a portion 53 of the alignment film on the TFT substrate opposed to the protrusion 52 constituting the non-display domain regulating means shown in FIG. 63. As a result, the portion 53 comes to have an orientation regulation force acting in such a direction as to offset the effect of the diagonal electric field at the edge of the cell electrode 13. Consequently, an effect similar to that of the tenth embodiment shown in FIG. 63 is obtained. The ultraviolet light, though irradiated only on the TFT substrate in FIG. 66, can alternatively be irradiated only on the CF substrate 16 or on both the TFT substrate and the CF substrate. The direction in which the ultraviolet light is irradiated is required to be set optimally striking a balance between the degree of the orientation regulation force in relation to the irradiation conditions and the orientation regulation force due to the diagonal electric field.

The non-display region domain regulating means, which reduces the effect of the diagonal electric field generated at an edge of the cell electrode on the orientation of the liquid crystalline molecules in the display region and stabilizes the orientation of the liquid crystalline molecules in the display region, is applicable to various systems including the VA system.

Figure 67A:
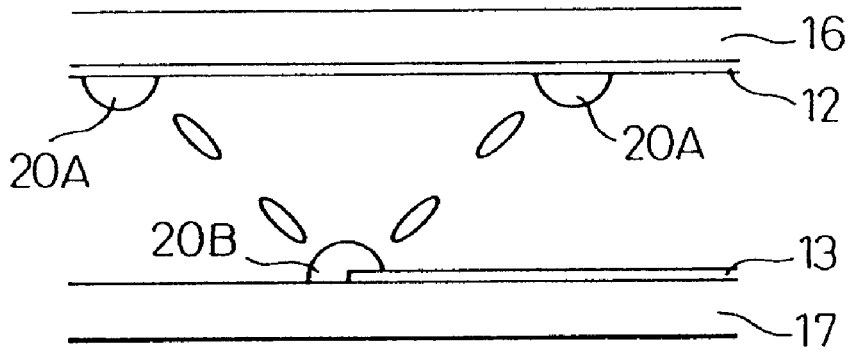
FIGS. 67A to 67C are diagrams for explaining desirable arrangements of the protrusions and an edge of the pixel electrode.
Figure 67B:
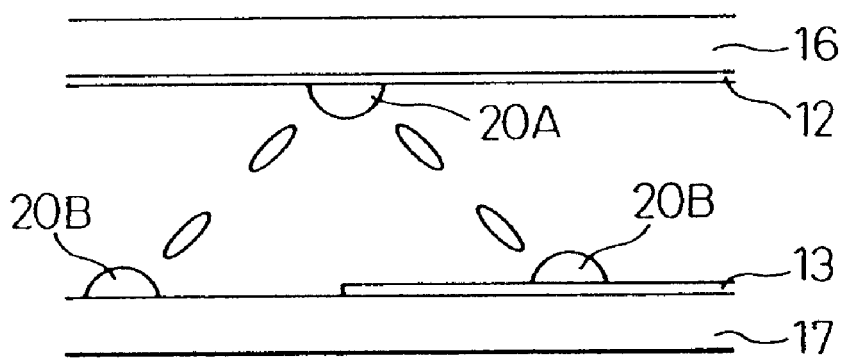
Figure 67C:
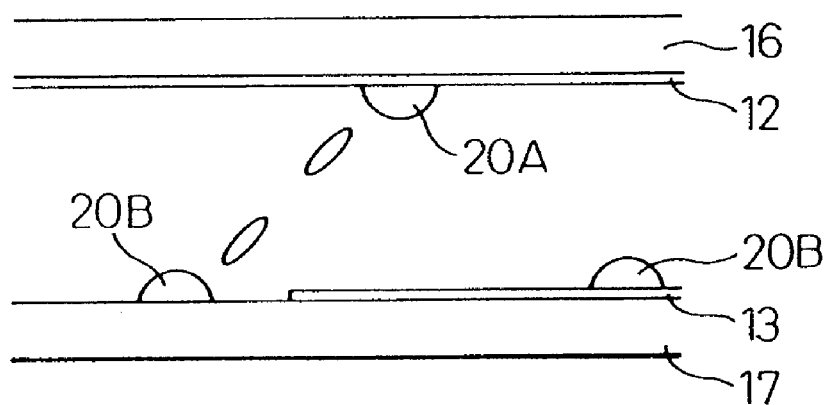

Now, desirable arrangements of the protrusions and depressions, which operate as the domain regulating means, which respect to edges of pixel electrodes will be described. FIGS. 67A to 67C are 22 diagrams showing fundamental relative positions of the edge of the cell electrode and protrusions acting as domain regulating means. As shown in FIG. 67A, protrusions 20B are arranged at the edges of the cell electrode 13, or a protrusion 20A is arranged on the common electrode 12 opposed to the edge of the cell electrode 13 as shown in FIG. 67B. As another alternative, the protrusion 20A on the CF substrate is formed inside the display region with respect to the edges of the cell electrode 13, as shown in FIG. 67C, while the protrusion 20B on the TFT substrate 17 is arranged in the non-display region.

In FIGS. 67A and 67B, the protrusions are arranged at the edges of the cell electrode 13 or in opposed relation thereto, and the region where the protrusions affect the orientation direction of the liquid crystal is defined by the edges. Regardless of the state of the diagonal electric field in the non-display region, therefore, the orientation in the display region is not affected whatsoever. Thus, a stable orientation is secured in the display region and the display quality is improved.

According to the conditions for arrangement shown in FIG. 67C, the orientation restriction force of the diagonal electric field at an edge of the cell electrode 13 is in the same direction as the orientation regulation force of the protrusions, and therefore a stable orientation can be obtained without developing any domain.

Figure 68:
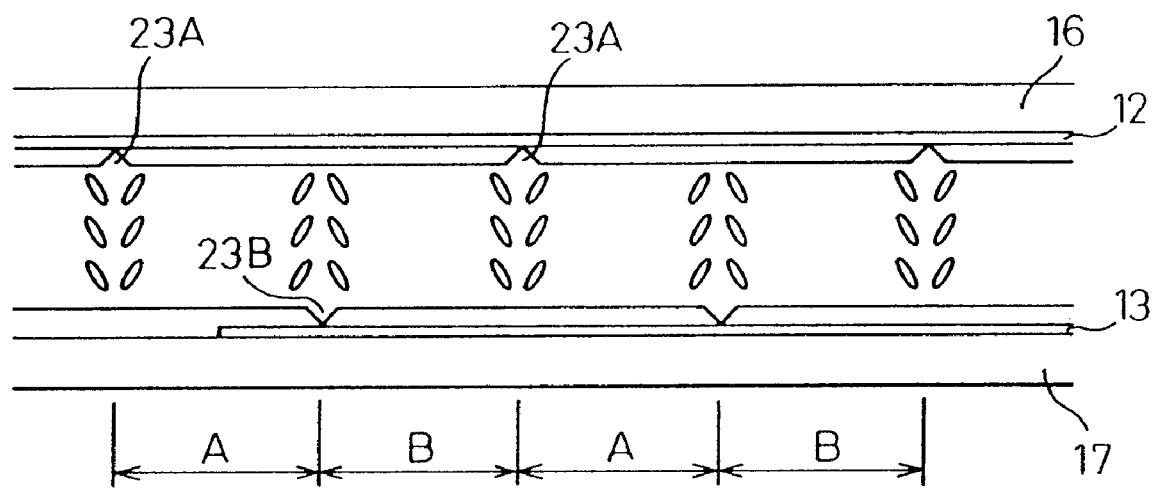
FIG. 68 is a diagram for explaining desirable arrangements of the depressions and an edge of the pixel electrode.

The conditions under which the direction of the orientation regulation force of the diagonal electric field coincides with the direction of the orientation regulation force of the domain regulating means can be realized also using a depression instead of a protrusion. FIG. 68 is a diagram showing an arrangement of edges and depressions for realizing the conditions for arrangement equivalent to FIG. 67C. Specifically, the protrusions 20B on the TFT substrate 17 are arranged inside the display region, and the protrusions 20A on the CF substrate are arranged in the non-display region with respect to the edges of the cell electrode 13.

Figure 69A:
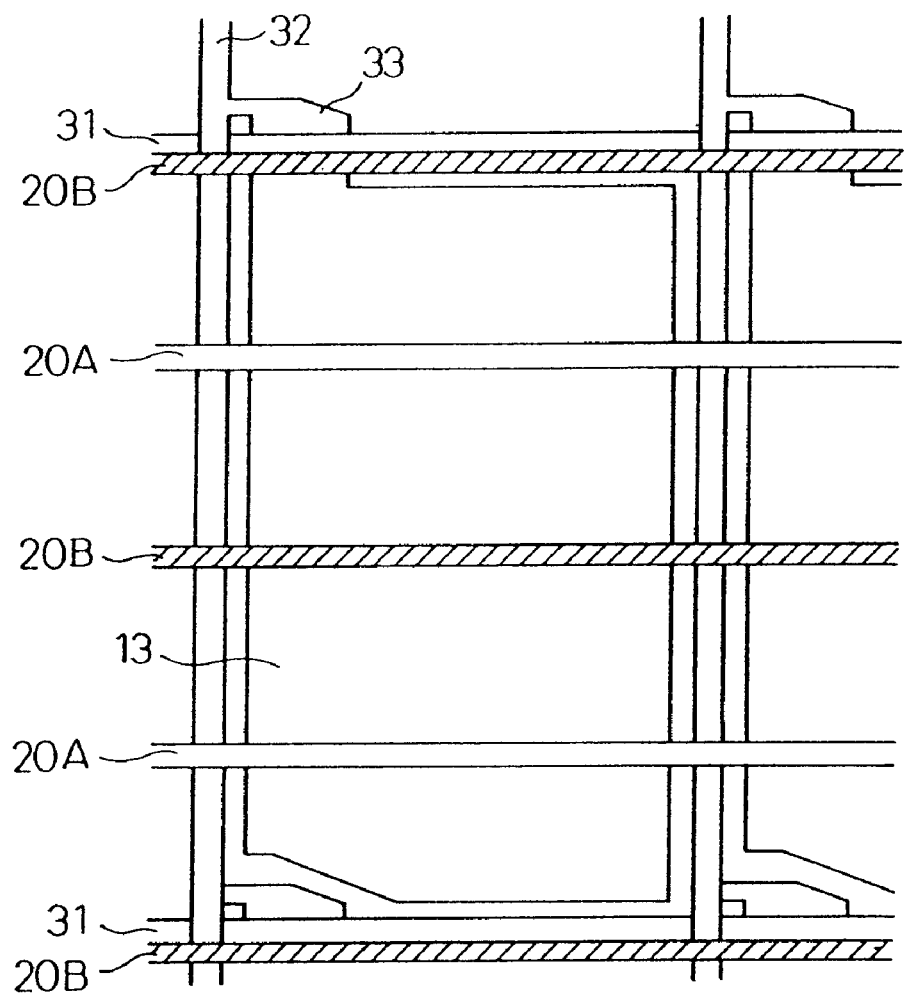
FIGS. 69A and 69B are diagrams showing desirable arrangements of the protrusions and edges of the pixel electrode.
Figure 69B:
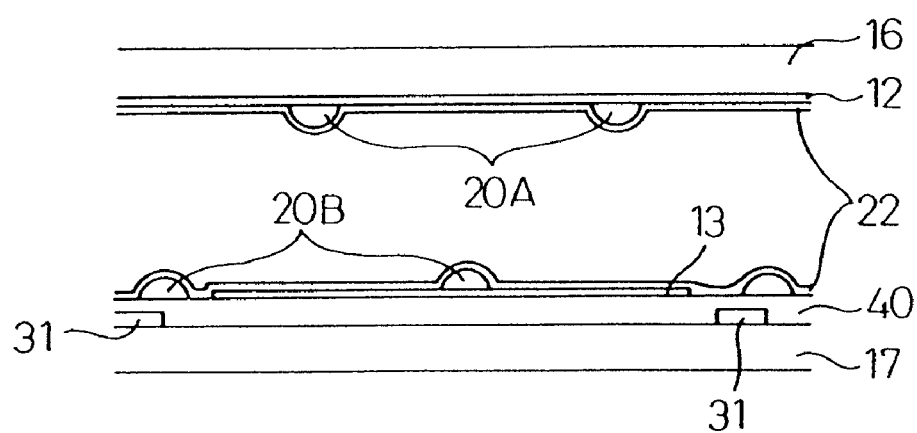

FIGS. 69A and 69B are diagrams showing an arrangement of a linear (striped) protrusion arrangement constituting a domain regulating means on a LCD realizing the conditions FIG. 67C in the first embodiment. FIG. 69A is a top plan view and FIG. 69B is a sectional view. In the configuration of FIGS. 69A and 69B, the protrusion height is about 2 μm, the protrusion width is 7 μm and the inter-protrusion interval is 40 μm. After two substrates are attached to each other, the protrusions of the TFT substrate are arranged in a staggered fashion with the protrusions of the CF substrate. In order to realize the conditions of FIG. 67C, the protrusions of the TFT substrate 17 are interposed between the cell electrodes 13. Since a gate bus line 31 is interposed between the cell electrodes 13, however, the protrusion arranged between the cell electrodes 13 is located on the gate bus line 31.

With the LCD of FIGS. 69A and 69B, no undesirable domain is observed and the switching speed is not low at any portion. Therefore, a superior display quality is obtained without any after-image. Assuming that the protrusions 20B between the cell electrodes 13 in FIGS. 69A and 69B are arranged at the edges of the cell electrodes 13, the conditions of FIG. 67A can be met, while if the arrangement of the protrusions 20A and 20B is reversed between the two substrates, on the other hand, the conditions of FIG. 67B are satisfied. The protrusion arranged on or in opposed relation to the edges can alternatively be arranged either on the TFT substrate 17 or on the CF substrate 16. Considering the displacement of the substrates attached to each other, however, the protrusions are desirably formed at the edges of the cell electrodes 13 on the TFT substrate 17.

Figure 70A:
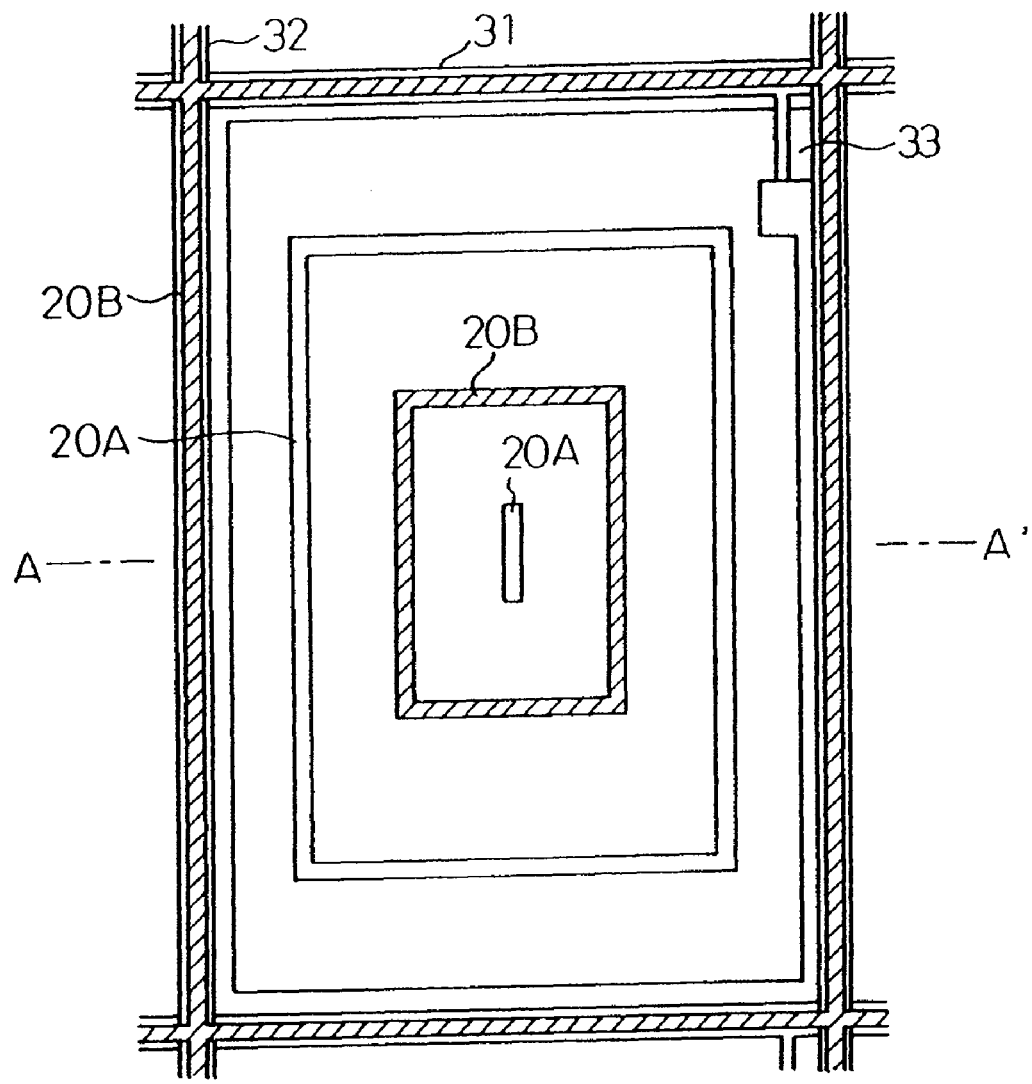
FIGS. 70A and 70B are diagrams showing a pattern of protrusions of a eleventh embodiment.
Figure 70B:
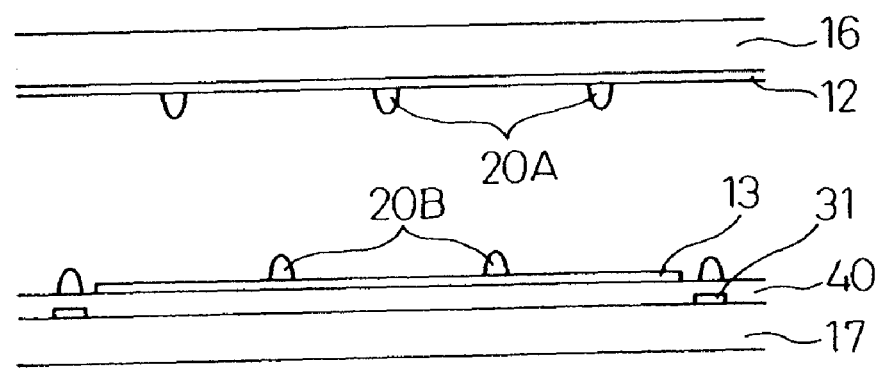

FIGS. 70A and 70B are diagrams showing an arrangement of a protrusion arrangement of another protrusion pattern for a LCD according to a eleventh embodiment satisfying the conditions of FIG. 67C. FIG. 70A is a top plan view and FIG. 70B is a sectional view. As shown, a checkered grid of protrusions is arranged between the cell electrodes 13, and protrusions similar in shape to the above-mentioned protrusion pattern are formed sequentially inward of each pixel. By use of this protrusion pattern, the orientation in each pixel can be divided into four directions, but not in equal proportion. Also in this case, the checkered protrusion pattern is arranged on the gate bus line 31 and the data bus line 32 between the cell electrodes 13.

Also in FIGS. 70A and 70B, the conditions of FIGS. 67A and 67B are satisfied if the protrusions 20B otherwise interposed between the cell electrodes 13 are arranged at a portion in opposed relation to an edge of the cell electrode 13 of the TFT substrate 17 or an edge of the CF substrate. In this case, too, the protrusions are preferably formed at the edges of the cell electrode 13 on the TFT substrate 17.

Figure 71:
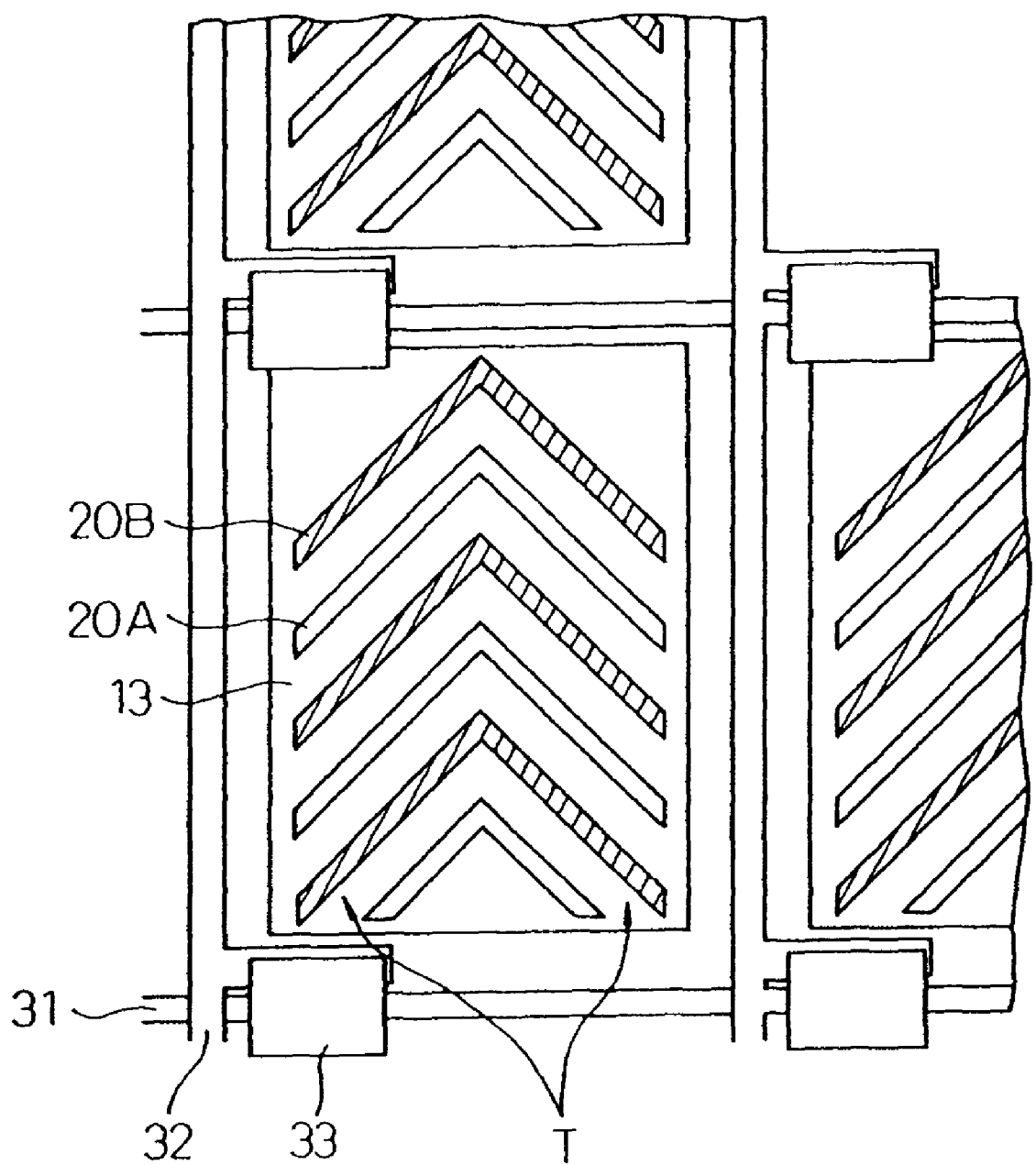
FIG. 71 is a diagram showing an example in which discontinuous protrusions are provided in each pixel.

In the example shown in FIGS. 70A and 70B, protrusions are formed in rectangular grid similar to the rectangular cell electrodes. Since the protrusions are rectangular, however, an equal proportion cannot be secured for all the directions of orientation. In view of this, a protrusion arrangement bent in zigzag shown in the ninth embodiment is conceived. As described with reference to FIGS. 58 and 60, however, an undesirable domain is generated in the neighborhood of the edges of the cell electrode 13 unless protrusions are formed as shown in FIG. 63. For this reason, independent protrusions for different pixels, not a continuous arrangement of protrusions as shown in FIG. 71, is the next subject of discussion. In the case where the protrusions 20A and 20B are formed as shown in FIG. 71, however, an abnormal orientation occurs at the portion indicated by T of the pixel 13, with the result that the difference in distance from an electric field controller (TF) 33 poses the problem of a reduced response rate. With the protrusion arrangement bent in zigzag in a rectangular pixel, it is impossible to satisfy the conditions for arrangement of the protrusions in relation to all the edges of the cell electrode shown in FIGS. 67A to 67C. A twelfth embodiment is intended to solve this problem.

Figure 72:
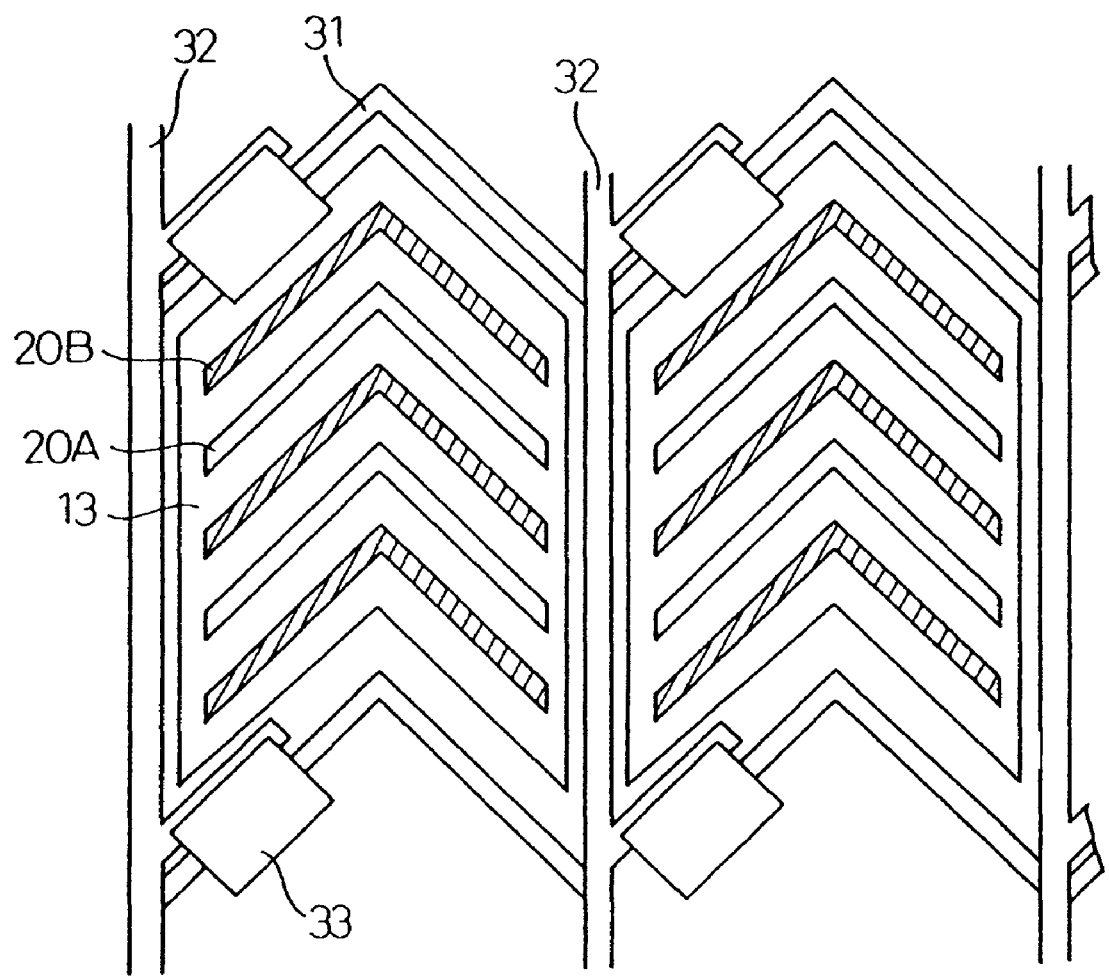
FIG. 72 is a diagram showing shapes of the pixel electrodes and protrusions of a twelfth embodiment.

FIG. 72 is a diagram showing the shapes of the cell electrode 13, the gate bus line 31, the data bus line 32, the TFT 33 and the protrusions 20A, 20B according to the twelfth embodiment. As shown, in the twelfth embodiment, the cell electrode 113 has a shape similar to the bent form of the zigzag protrusions 20A, 20B. This shape prevents the occurrence of an abnormal orientation, and the equal distance from the TFT 33 to the end of the cell electrode 13 can improve the response rate. According to the twelfth embodiment, the gate bus line 31 is also bent in zigzag in conformance with the shape of the cell electrode 13.

As far as the protrusions arranged on the gate bus line 31 are formed on the portions in opposed relation to the edges of the cell electrode 13 or the edges of the CF substrate, the conditions of FIGS. 67A and 67B are satisfied. In this case, too, the protrusions are desirably formed at the edges of the cell electrode 13 on the TFT substrate.

Nevertheless, the conditions of FIGS. 67A to 67C can be met only for the edges parallel to the gate bus line 31 but not for the edges parallel to the data bus line 32. As a result, the latter portion is exposed to the effect of the diagonal electric field, thereby posing the problem described above with reference to FIGS. 57A to 60.

Figure 73:
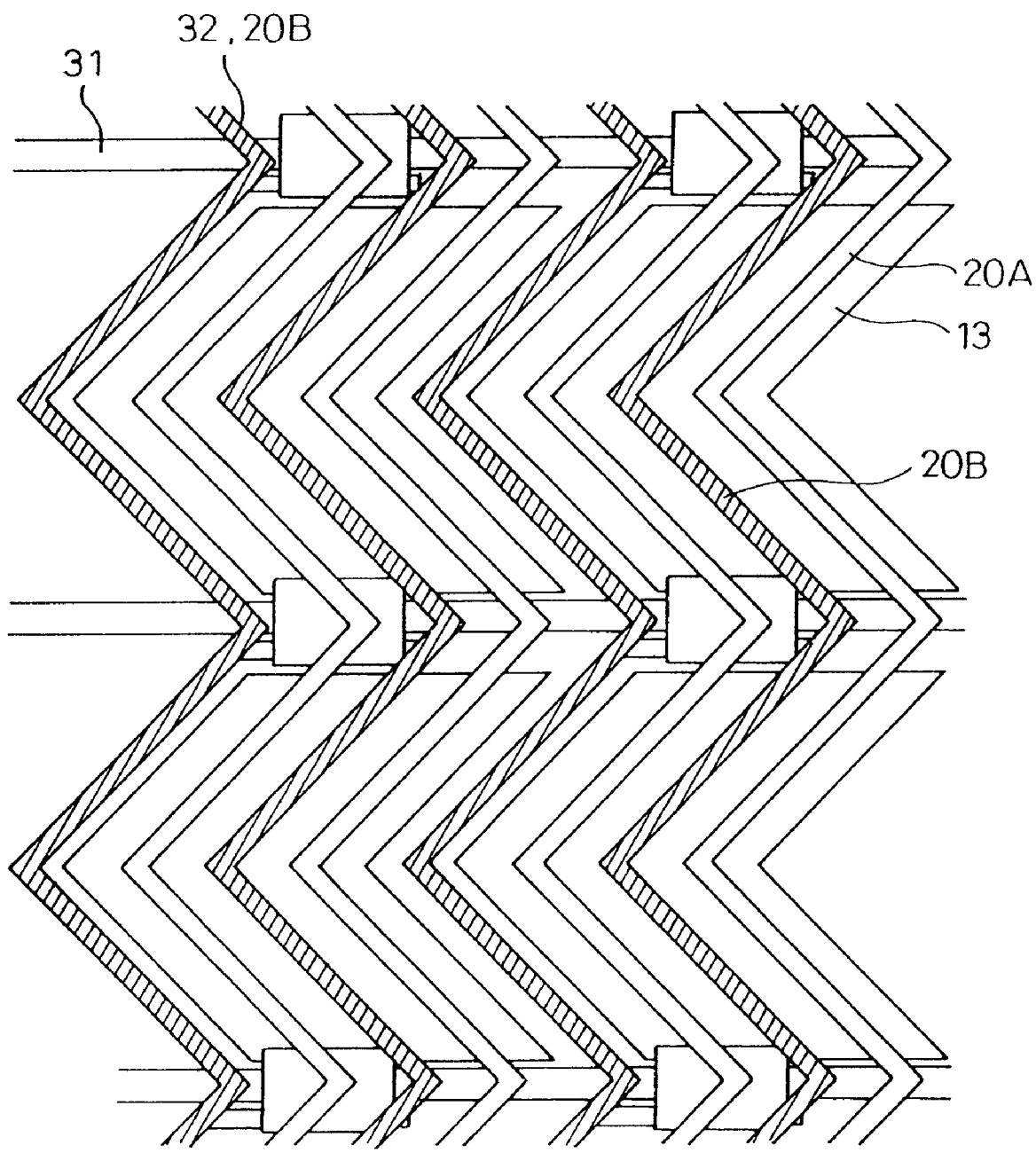
FIG. 73 is a diagram showing a modification of shapes of the pixel electrodes and protrusions of a twelfth embodiment.

FIG. 73 is a diagram showing the shapes of the cell electrode 13, the gate bus line 31, the data bus line 32, the TFT 33 and the protrusions 20A, 20B according to a modification of the twelfth embodiment. Unlike in the twelfth embodiment of FIG. 72 in which the gate bus line 31 is shaped in zigzag in conformance with the shape of the cell electrode 13, the cell electrode 13 is shaped as shown in FIG. 73, so that the gate bus line 31 is rectilinear while the data bus line 32 is bent in zigzag. In FIG. 73, the protrusions 20A and 20B are not independent for different pixels but form a continuous protrusion covering a plurality of pixels. The protrusion 20B is arranged on the data bus line 32 laid vertically between the cell electrodes 13 thereby to satisfy the conditions of 67C. The arrangement of FIG. 73 can also realize the conditions of FIGS. 67A and 67B, as far as the protrusions arranged on the data bus line 32 are formed in spatially opposed relation to the edges of the cell electrode 13 or the edges of the CF substrate 16. In this case, too, the protrusions are desirably formed at the edges of the cell electrode 13 on the TFT substrate 17.

In the arrangement of FIG. 73, each protrusion crosses the edge of the cell electrode 13 parallel to the gate bus line 31. The resulting effect of the diagonal electric field on this portion gives rise to the problem described above with reference to FIGS. 57A to 60.

Figure 74:
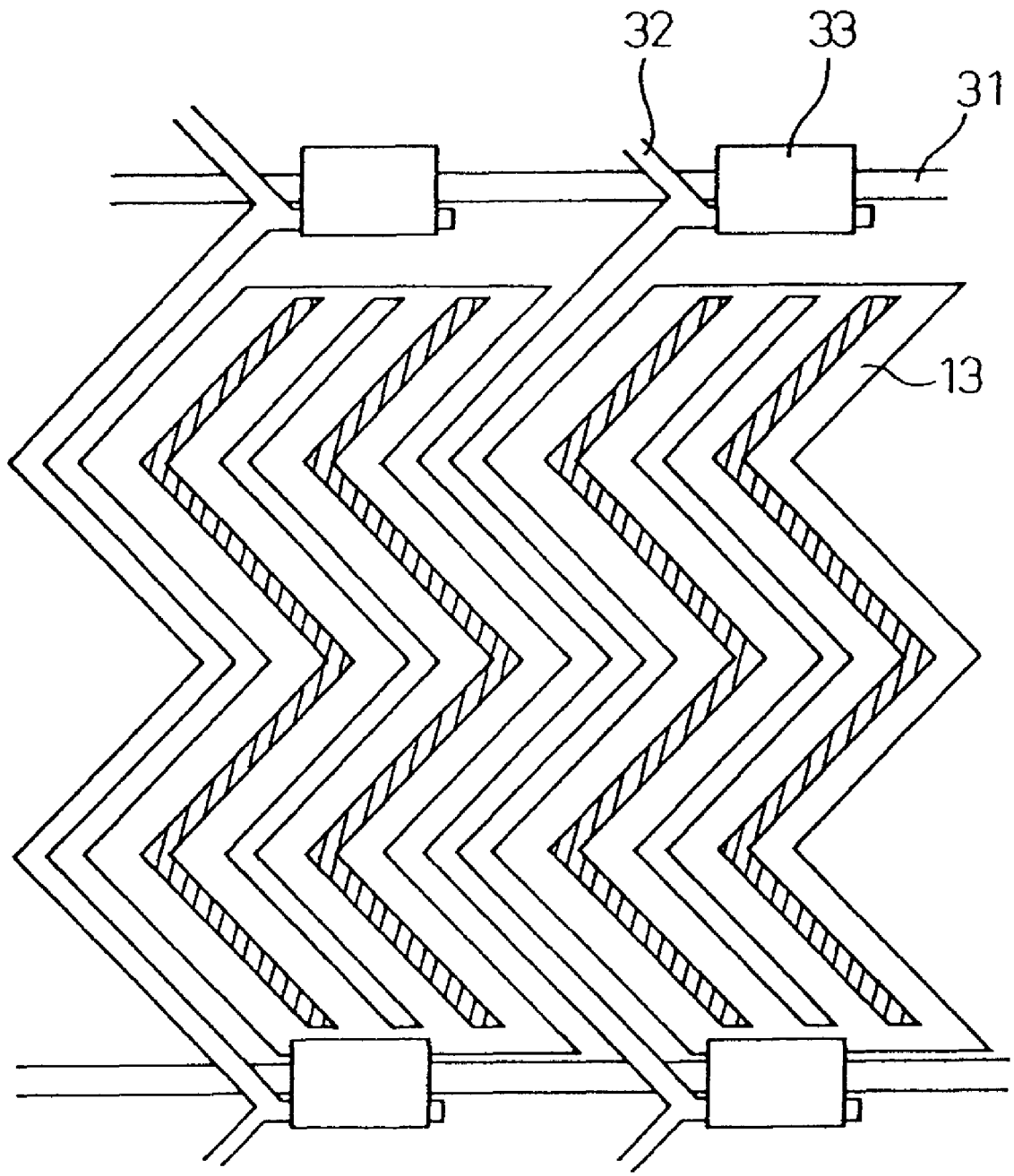
FIG. 74 is a diagram showing a modification of shapes of the pixel electrodes and protrusions of a twelfth embodiment.

FIG. 74 is a diagram showing another modification of the twelfth embodiment. In the arrangement shown in FIG. 74, the protrusions are bent twice in a pixel. This makes the pixel somewhat rectangular in shape as compared with FIG. 73 and therefore the display is easier to view.

Figure 75:
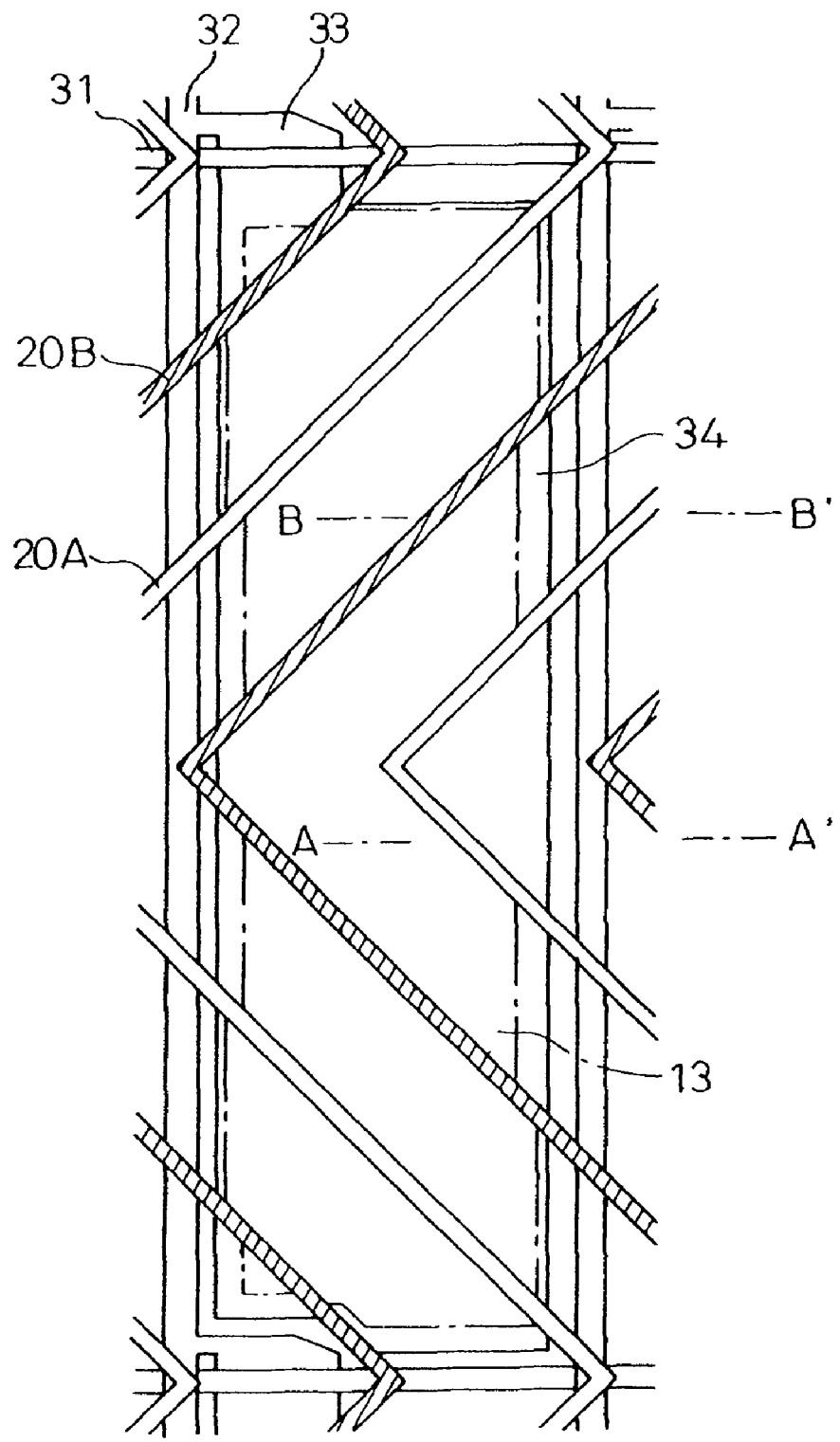
FIG. 75 is a diagram showing a pattern of protrusions of a thirteenth embodiment.
Figure 76A:
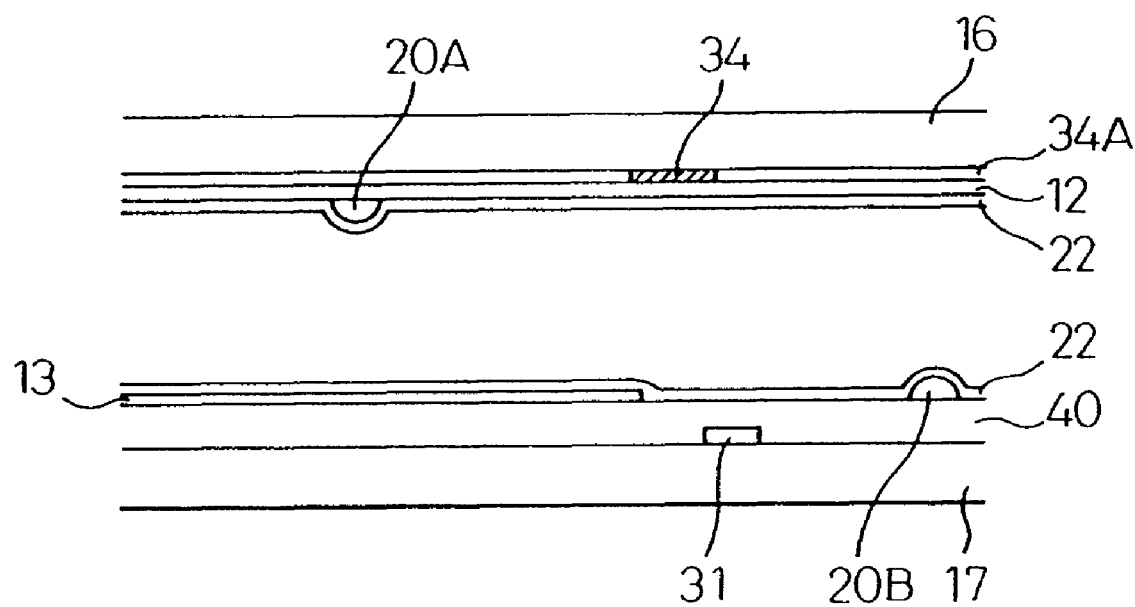
FIGS. 76A and 76B are sectional views of the third embodiment.
Figure 76B:
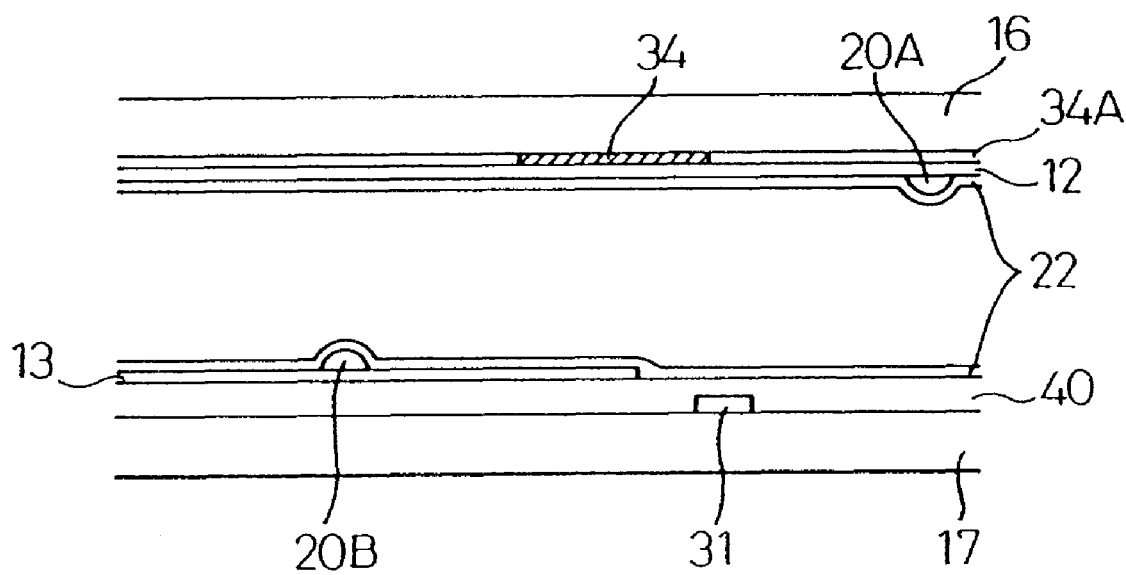

FIG. 75 is a diagram showing the shapes of the cell electrode 13, the gate bus line 31, the data bus line 32, the TFT 33 and the protrusions 20A, 20B according to a thirteenth embodiment. FIGS. 76A and 76B are sectional views taken in lines A A' and B B' in FIG. 75. In order to alleviate the effect of the diagonal electric field at the edges of the cell electrode 13 with a protrusion arrangement bent in zigzag, the tenth embodiment includes the non-display region domain regulating means arranged outside the display region while the thirteenth embodiment has the cell electrode bent in zigzag, both having failed to completely eliminate the effect of the diagonal electric field. In view of this, according to the thirteenth embodiment, the portion where the orientation is liable to be disturbed and an undesirable domain is liable to occur as shown in FIGS. 58 and 60 is masked by a black matrix 34 to eliminate the effect of the diagonal electric field on the display.

At the portion A-A' shown in FIG. 75 is free of the effect of the diagonal electric field, the BM 34 is narrowed as shown in FIG. 76A, while at the portion B-B' where the diagonal electric field has a considerable effect, the width of the BM 34 is increased as compared with the prior art so as not to display any image. In this way, the display quality is not deteriorated nor an after-image or a reduced contrast is caused. The increased area of the BM 34, however, reduces the luminance of display due to a reduced numerical aperture. Nevertheless, no problem is posed as far as the area of the increase of BM 34 is not considerable.

As described with reference to the tenth to thirteenth embodiments, according to this invention, the effect of the diagonal electric field at the edge portions of the cell electrode can be alleviated and therefore the display quality can be improved.

In the embodiments as set above, the orientation of liquid crystal is divided by the domain regulating means. A detailed observation of the orientation in the boundary portion of the domain, however, reveals the fact that the domain is divided in the directions 180° apart at the domain regulating means, that minute domains 90° different in direction exist in the boundary portion (on a protrusion, a depression or a slit) between domains and that a region looking black exists in the boundary (the neighborhood of the edge of a protrusion, if any) of each domain including a minute domain. The region looking dark brings about a reduced numerical aperture and darkens the display. As described above, the liquid crystal display device using a TFT requires a CS electrode contributing to a reduced numerical aperture. In other cases, a black matrix (BM) is provided for shielding the surrounding of the display pixel electrode and the TFT. In all of these cases, it is necessary to prevent the numerical aperture from being reduced as far as possible.

Figure 77A:
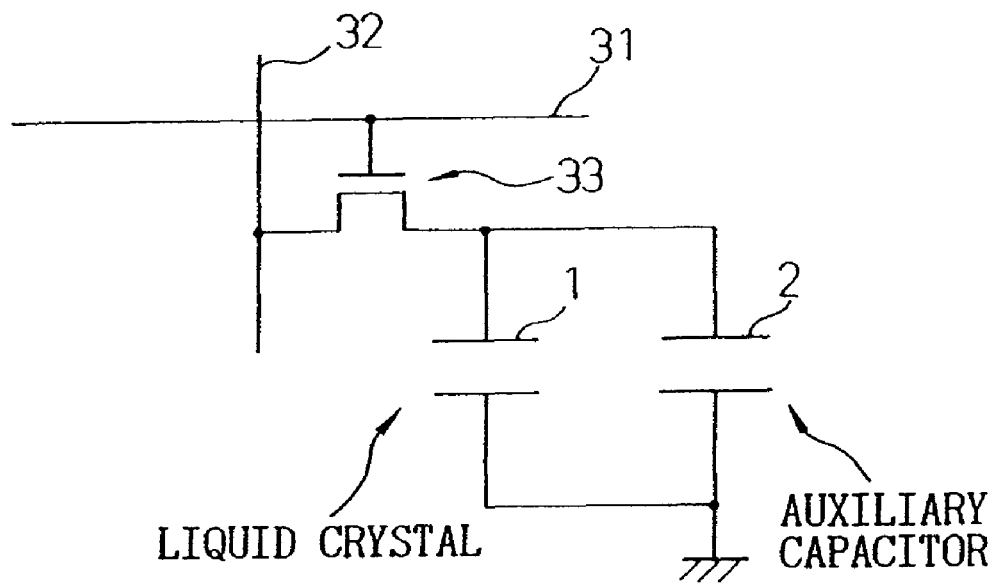
FIGS. 77A and 77B are diagrams showing an operation of a storage capacitor (CS) and a structure of electrodes.

The use of a storage capacitor with the CS electrode was described above. Let us briefly explain the function of the storage capacitor (CS) and the electrode structure. The circuit of each pixel in a liquid crystal panel having a storage capacitor is shown in FIG. 77A. As shown in FIG. 17, the CS electrode 35 is formed in parallel to the cell electrode 13 in such a manner as to configure a capacitor element between the CS electrode 35 and the cell electrode 13 through a dielectric layer. The CS electrode 35 is connected to the same potential as the common electrode 12, and therefore, as shown in FIG. 77A, a storage capacitor 2 is formed in parallel to the capacitor 1 due to the liquid crystal. Upon application of a voltage to the liquid crystal 1, a voltage is similarly applied to the storage capacitor 2, so that the voltage held in the liquid crystal 1 is held also in the storage capacitor 2. As compared with the liquid crystal 1, the storage capacitor 2 is easily affected by a voltage change of the bus line or the like, and therefore effectively contributes to suppressing an after-image or a flicker and alleviating the display failure due to the TFT-off current. The CS electrode 35 is preferably formed in the same layer as the gate (gate bus line), the source (data bus line) or the drain (cell) electrode of the TFT element in order to simplify the process. Since these electrodes are formed of an opaque metal for securing the required accuracy, the CS electrode 35 is also opaque. As described above, the CS electrode is formed in parallel to the cell electrode 13, and therefore the portion of the CS electrode cannot be used as a display pixel for a reduced numerical aperture.

The liquid crystal display device is required to have an improved display luminance while an effort is being made to save power consumption at the same time. The numerical aperture, therefore, is preferably as high as possible. As explained above, on the other hand, the light leakage through the slit formed in the protrusion or the electrode for improving the display quality deteriorates the display quality. For eliminating this inconvenience, the protrusion is preferably made of a masking material and the slit is preferably masked with a BM or the like. Nevertheless, these measures contribute to a lower numerical aperture.

Figure 77B:
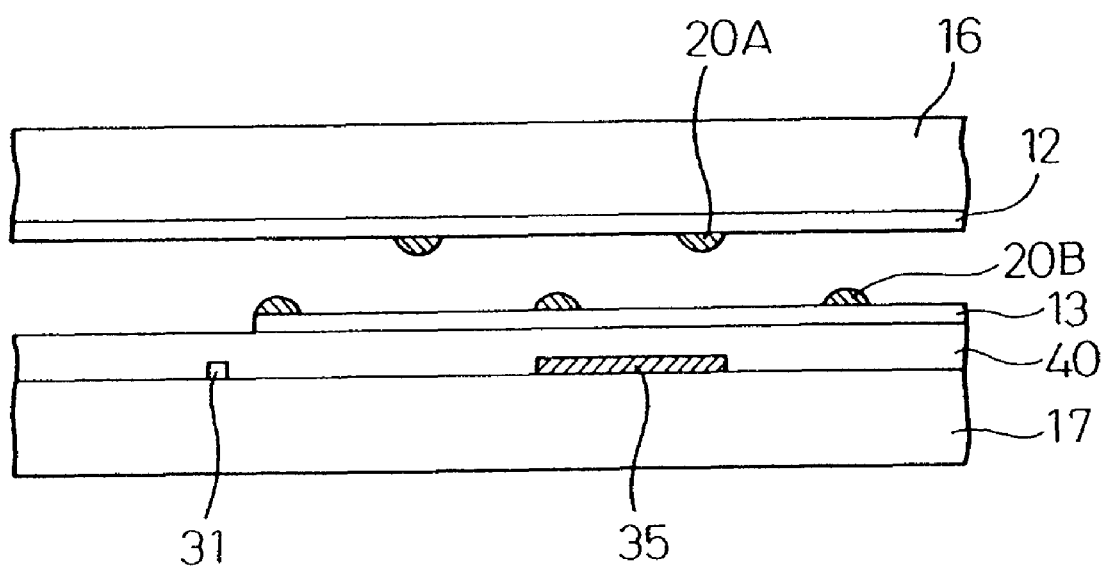

An arrangement of the protrusions 20A, 20B and the CS electrode 35 of the embodiments as set above is shown in FIG. 77B. The protrusions 20A, 20B and the CS electrode 35 are opaque to the light and the corresponding portions have a lower numerical aperture. The protrusions 20A, 20B are formed partly in superposition but partly not in superposition on a part of the CS electrode 35.

Figure 78A:
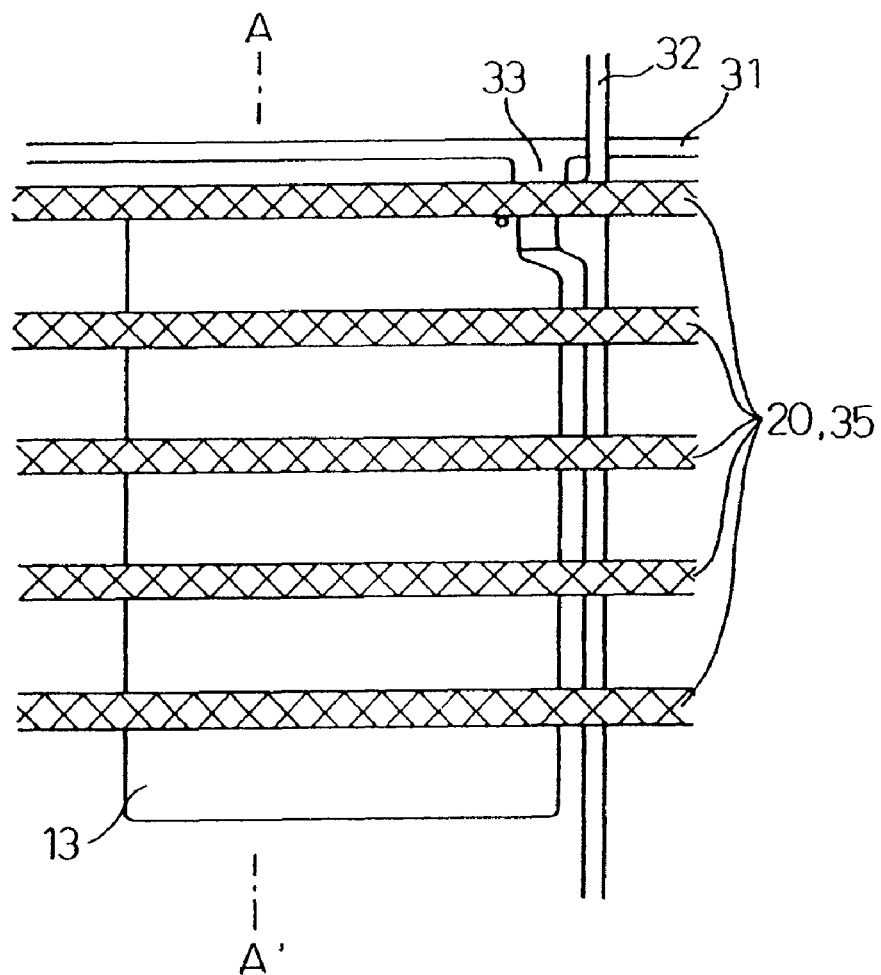
FIGS. 78A and 78B are diagrams showing an arrangement of protrusions and CS electrodes of a fourteenth embodiment.
Figure 78B:
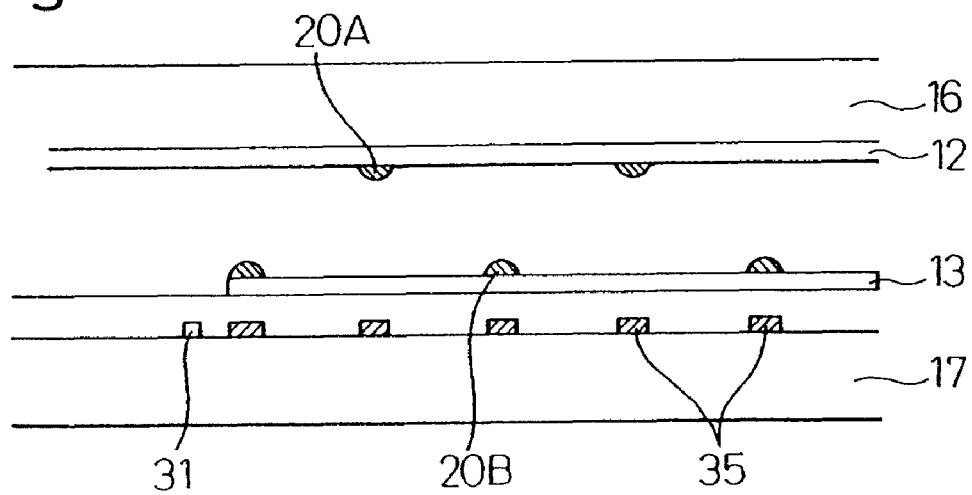

FIGS. 78A and 78B are diagrams showing an arrangement of the protrusions 20 (20A, 20B) and the CS electrodes 35 according to an 14th embodiment. FIG. 78A is a top plan view and FIG. 78B is a sectional view. As shown, a plurality of CS electrode units 35 are arranged under the protrusions 20A, 20B. For a storage capacitor of a predetermined capacitance to be realized, a predetermined area is required of the CS electrode units 35. The combined area of the five units into which the CS electrode 35 is divided as shown in FIGS. 78A and 78B coincides with the area of the CS electrode 35 shown of FIGS. 77A and 77B. Further, in view of the fact that the CS electrode units and the protrusions 20A, 20B are all superposed one on another in FIGS. 78A and 78B, the numerical aperture is not substantially reduced more than it would be reduced by the CS electrode alone. It follows, therefore, that the numerical aperture is not reduced by the provision of the protrusions.

Figure 79A:
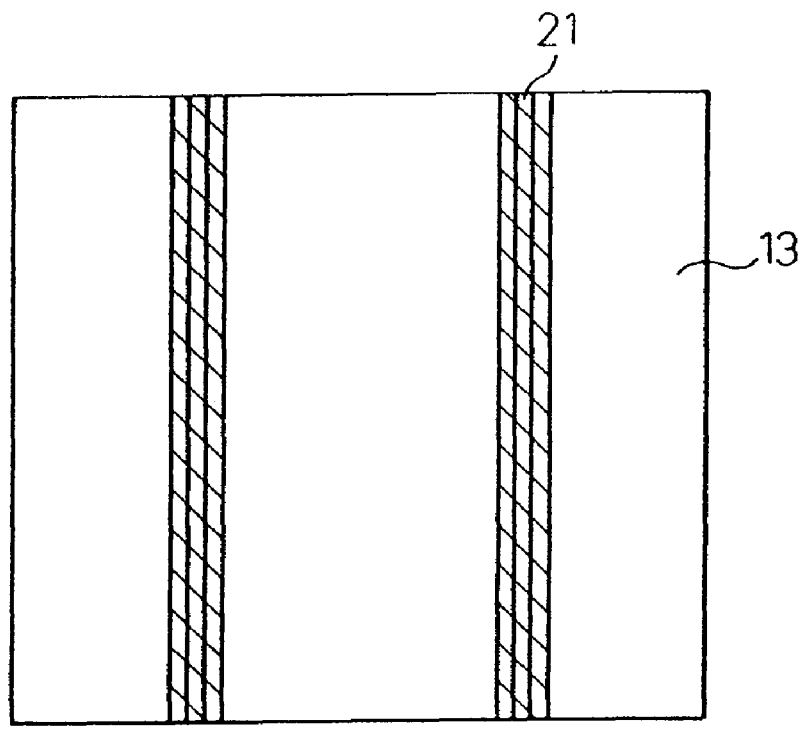
FIGS. 79A and 79B are diagrams showing an arrangement of slits and CS electrodes of a modification of the fourteenth embodiment.
Figure 79B:
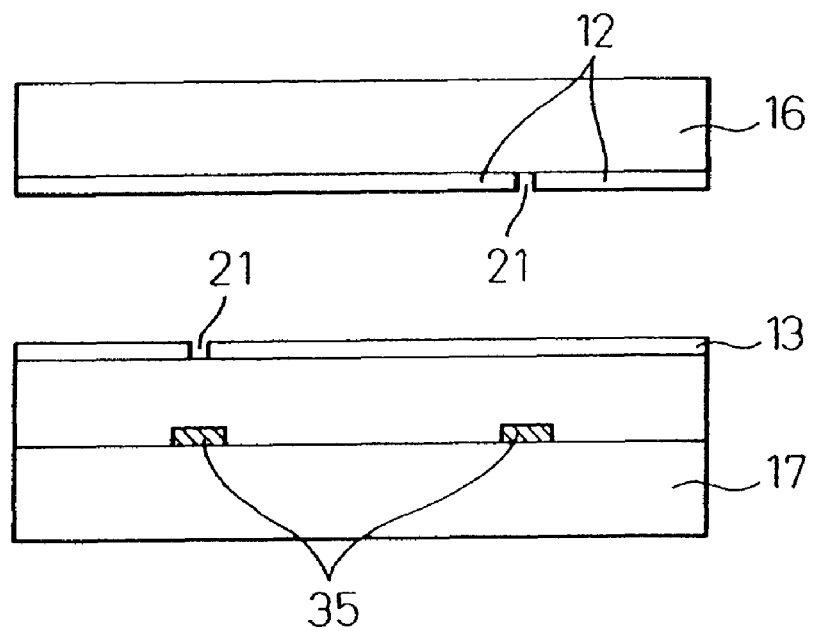

FIGS. 79A and 79B are diagrams showing an arrangement of the slits 21 of the electrodes 12, 13 and the CS electrode units 35 according to a modification of the 14th embodiment. FIG. 79A is a top plan view and FIG. 79B is a sectional view. The slits 21 function as a domain regulating means and are preferably masked for preventing the light leakage therethrough. In this modification, the leakage light at the slits 21 is masked by the CS electrode units 35. Since the total area of the CS electrode units 35 remains the same, the numerical aperture is not reduced.

Figure 80A:
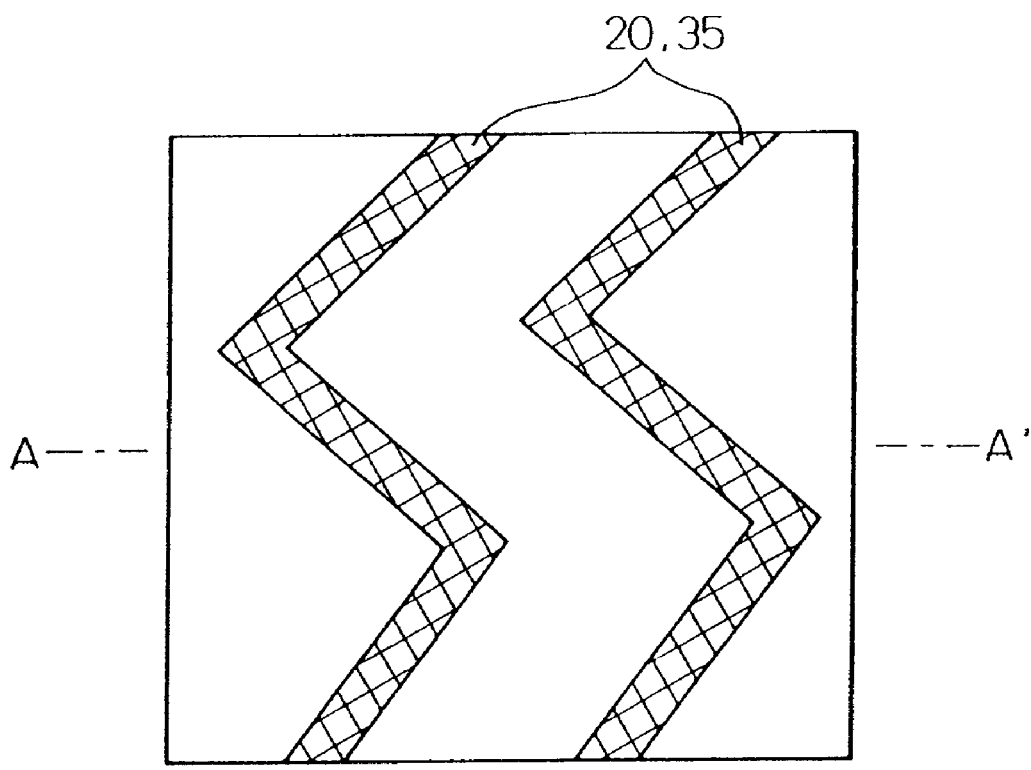
FIGS. 80A and 80B are diagrams showing an arrangement of protrusions and CS electrodes of an another modification of the fourteenth embodiment.
Figure 80B:
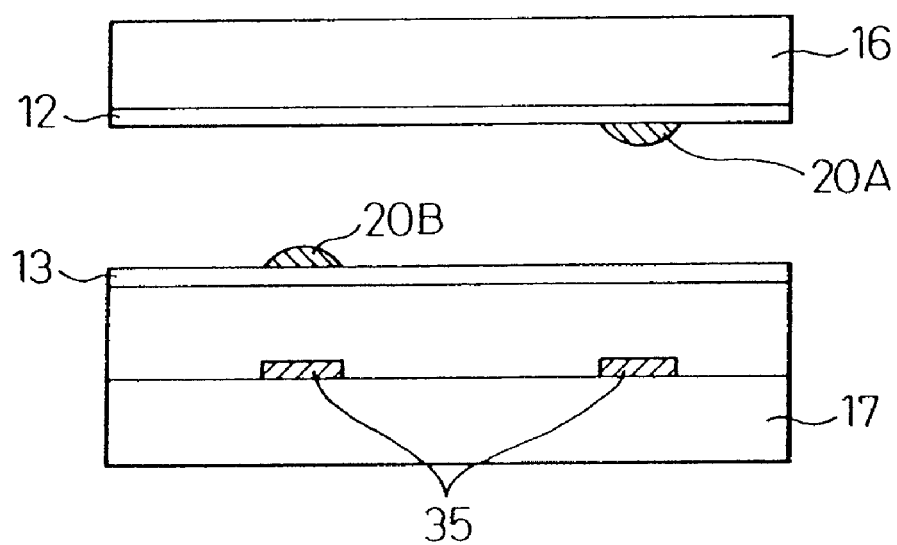

FIGS. 80A and 80B are diagrams showing an arrangement of the slits 21 of the electrodes 12, 13, and the CS electrode units 35 according to another modification of the 11th embodiment. FIG. 80A is a top plan view and FIG. 80B is a sectional view. This modification is identical to the aforementioned modification of FIGS. 78A and 78B except that the protrusions are bent in zigzag.

Figure 81A:
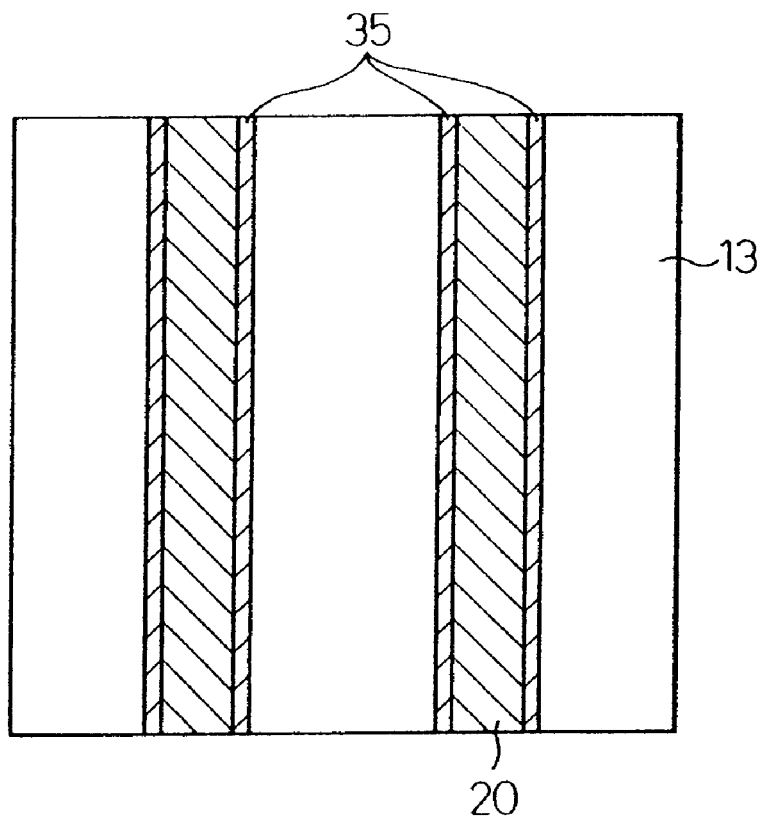
FIGS. 81A and 81B are diagrams showing an arrangement of protrusions and CS electrodes of an another modification of the fourteenth embodiment.
Figure 81B:
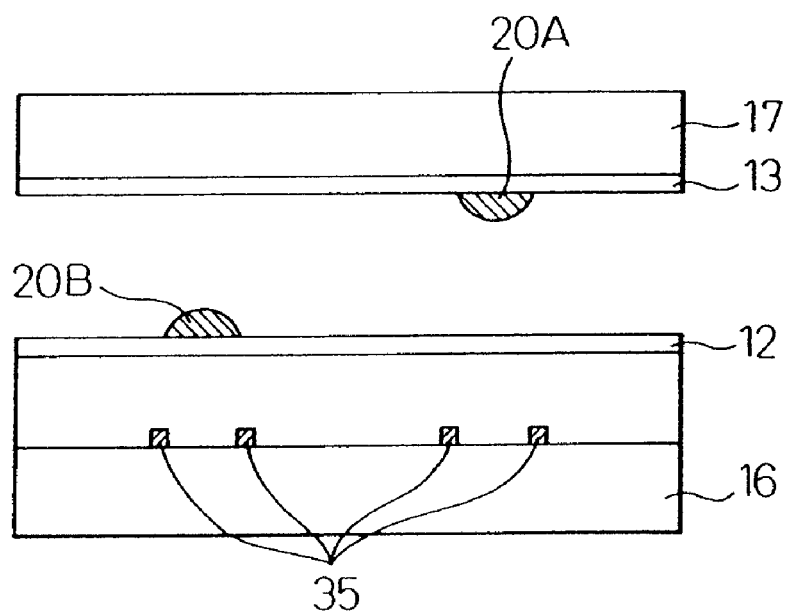

FIGS. 81A and 81B are diagrams showing an arrangement of the slits 21 of the electrodes 12, 13, and the CS electrode units 35 according to another modification of the 14th embodiment. FIG. 81A is a top plan view and FIG. 81B is a sectional view. This modification represents the case in which the total area of the protrusions 20A, 20B is larger than the total areas of the CS electrode units 35. According to this modification, the CS electrode units are arranged at positions corresponding to the edges of the protrusions 20A, 20B and not arranged at the central portion of the protrusion. As a result, a minute domain having an orientation angle 90° different existing in the neighborhood of the top of the protrusion can be effectively utilized for a brighter display.

The constitution in which the CS electrode is divided into a plurality of CS electrode unit can be adapted to a case in which the depressions (grooves) are used as the domain regulating means.

The 14th embodiment described above can prevent the reduction in numerical aperture which otherwise might be caused by the domain regulating means used.

Figure 82:
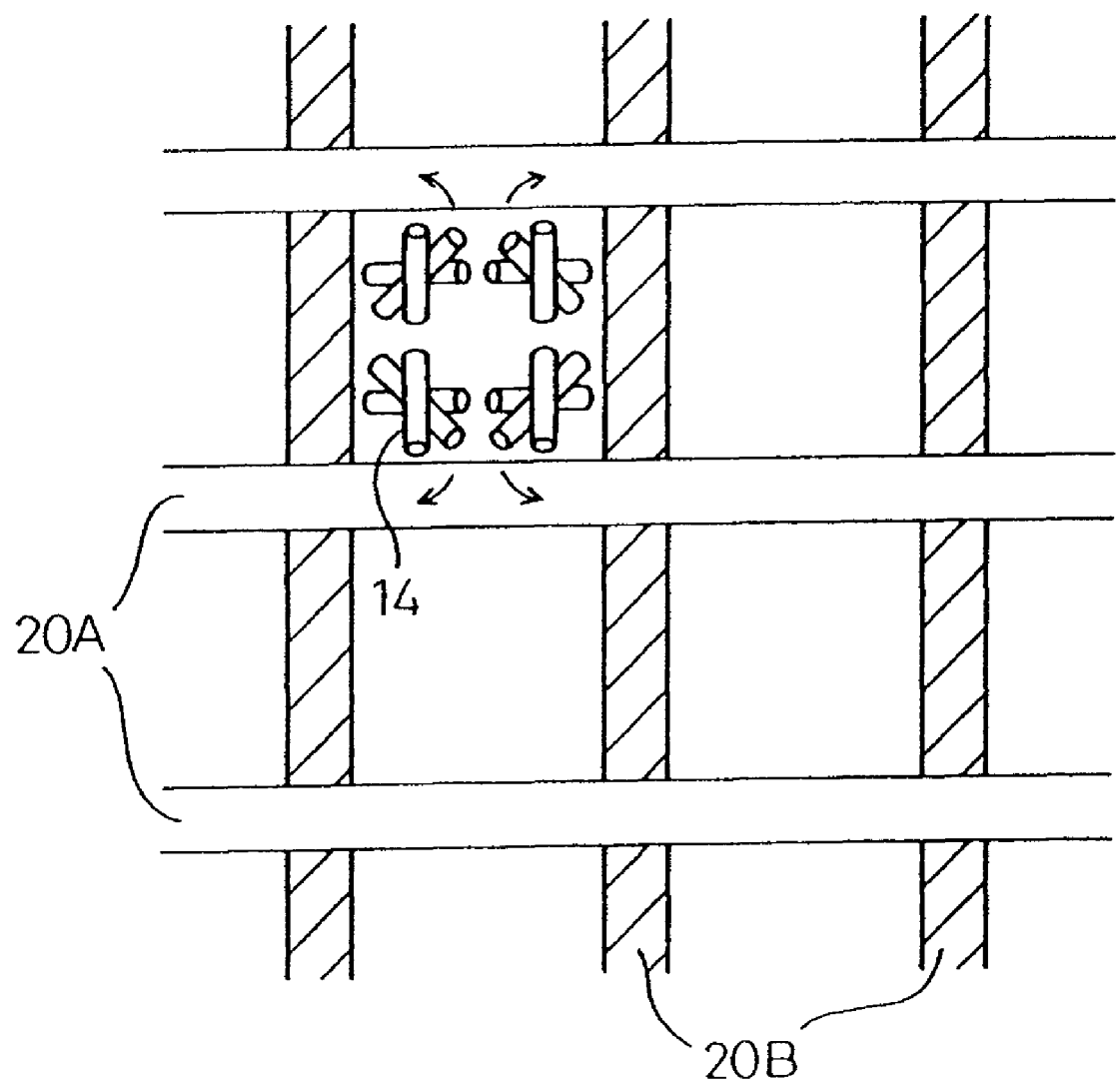
FIG. 82 is a diagram showing a pattern of protrusions of the fifteenth embodiment.

FIG. 82 shows a protrusion pattern of the fifteenth embodiment. In this fifteenth embodiment, linear protrusions 20A and 20B are disposed in parallel with one another on the upper and lower substrates, respectively, so that when they are viewed from the surface of the substrates, these protrusions 20A and 20B orthogonally cross one another. The liquid crystalline molecules 14 are oriented perpendicularly to the slopes under the state where no voltage is applied between the electrodes but the liquid crystalline molecules in the proximity of the slopes of the protrusions 20A and 20B are oriented perpendicularly to the slopes. Therefore, the liquid crystalline molecules in the proximity of the slopes of the protrusions 20A and 20B are inclined under this state and moreover, the directions of inclination are different by 90 degrees near the protrusions 20A and 20B. When the voltage is applied between the electrodes, the liquid crystalline molecules are inclined in a direction which is parallel to the substrates, but because the liquid crystalline molecules are regulated in the directions different by 90 degrees near the protrusions 20A and 20B, respectively, they are twisted. The change of the image in the case of twisting in this fifteenth embodiment is the same as that of the TN mode shown in FIGS. 2A to 2C. FIG. 2C shows the state when no voltage is applied and this is different only in that when the voltage is applied, the state becomes the one shown in FIG. 2A. As shown in FIG. 82, further, four different twist regions are defined in the range encompassed by the protrusions 20A and 20B in the fifteenth embodiment. In consequence, viewing angle performance is excellent, too. Incidentally, the directions of the twists are different among the adjacent regions.

Figure 83:
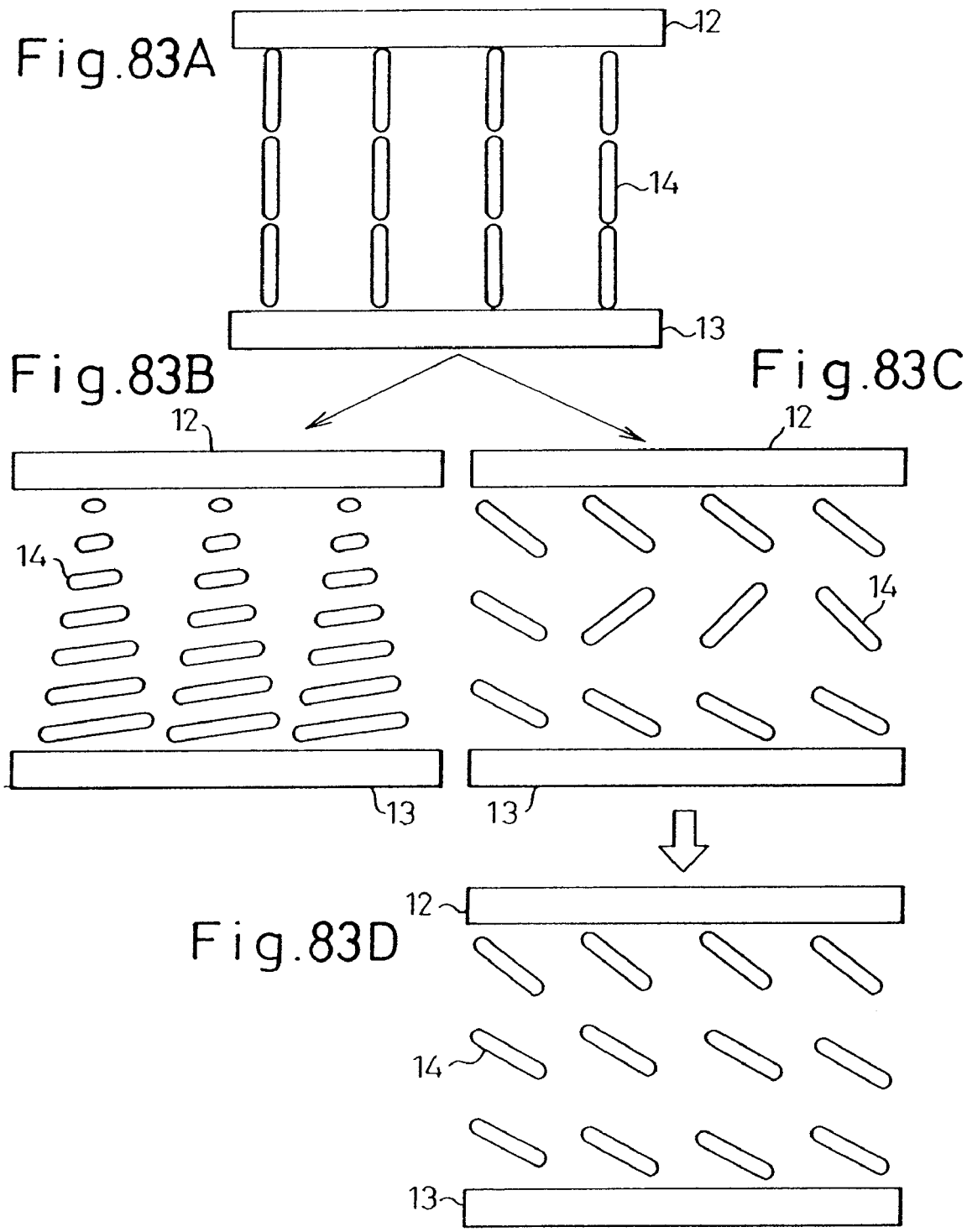
FIGS. 83A to 83D are diagrams for explaining alignment changes of the liquid crystalline molecules in the fifteenth embodiment.

FIGS. 83A to 83D explanatory views useful for explaining why the response speed in the fifteenth embodiment is higher than that of the first embodiment. FIG. 83A shows the state where no voltage is applied, and the liquid crystalline molecules are oriented perpendicularly to the substrates. When the voltage is applied, the liquid crystalline molecules are inclined in such a manner as to twist in the LCD of the fifteenth embodiment as shown in FIG. 83B. In contrast, the liquid crystalline molecules at other portions are oriented by using the liquid crystalline molecules keeping touch with the protrusions as the trigger in the LCD of the first embodiment as shown in FIG. 83C. However, the liquid crystalline molecules near the centers of the upper and lower protrusions move irregularly when the orientation changes because they are not limited, and they are oriented in the same direction as shown in FIG. 83D after the passage of a certain period of time. Generally, the change speed of the twist of the LCDs is high not only in the LCD of the VA system LCD using the protrusions, and the response speed of the fifteenth embodiment is higher than that of the first embodiment.

Figure 84:
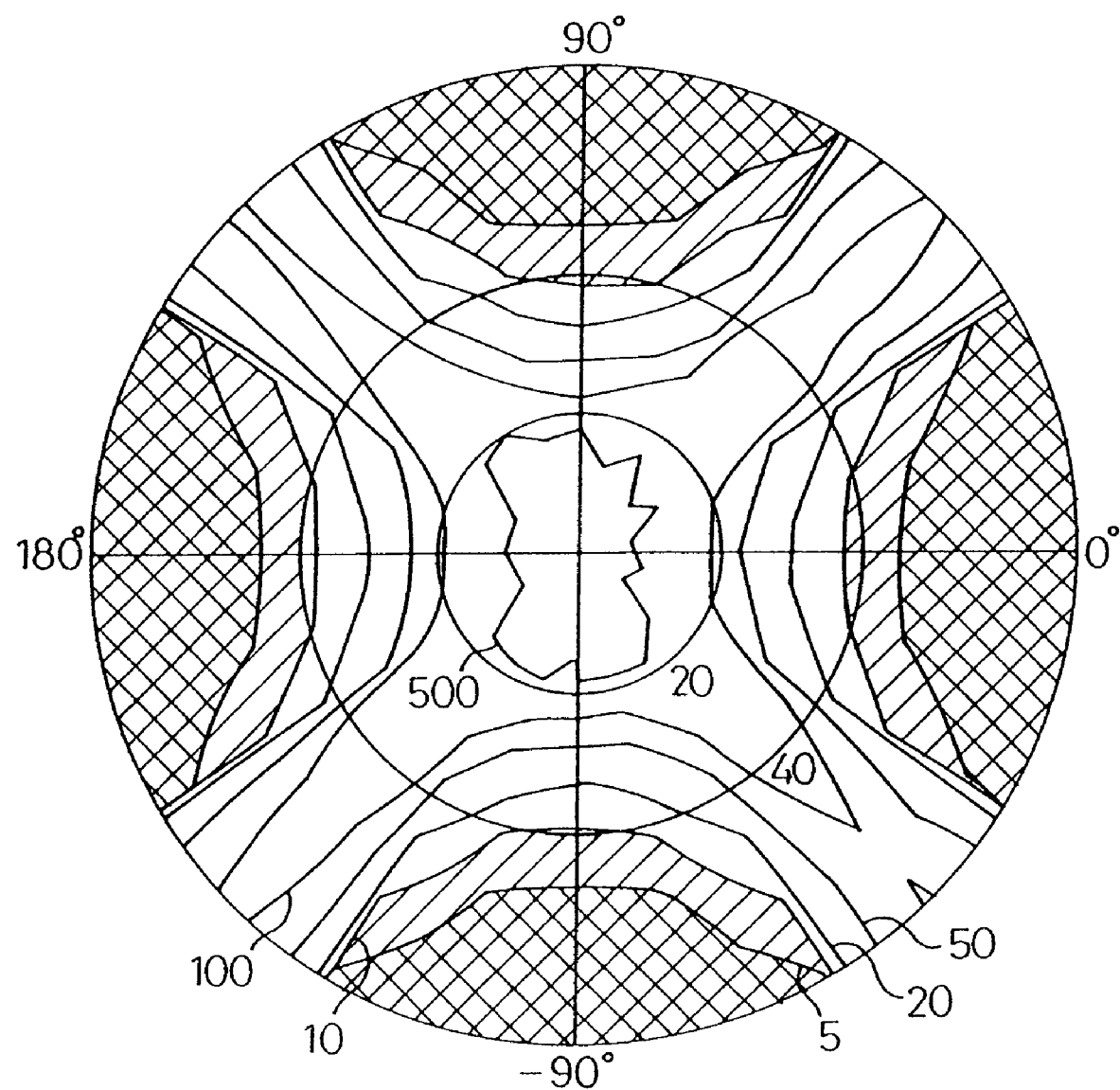
FIG. 84 is a diagram showing a viewing angle characteristic of the panel of the fifteenth embodiment.

FIG. 84 shows viewing angle performance of the LCD of the fifteenth embodiment. This viewing angle performance is extremely excellent in the same way as that of the VA LCD of the first embodiment, and is naturally higher than that of the TN mode and is at least equal to that of the IPS mode.

Figure 85A:
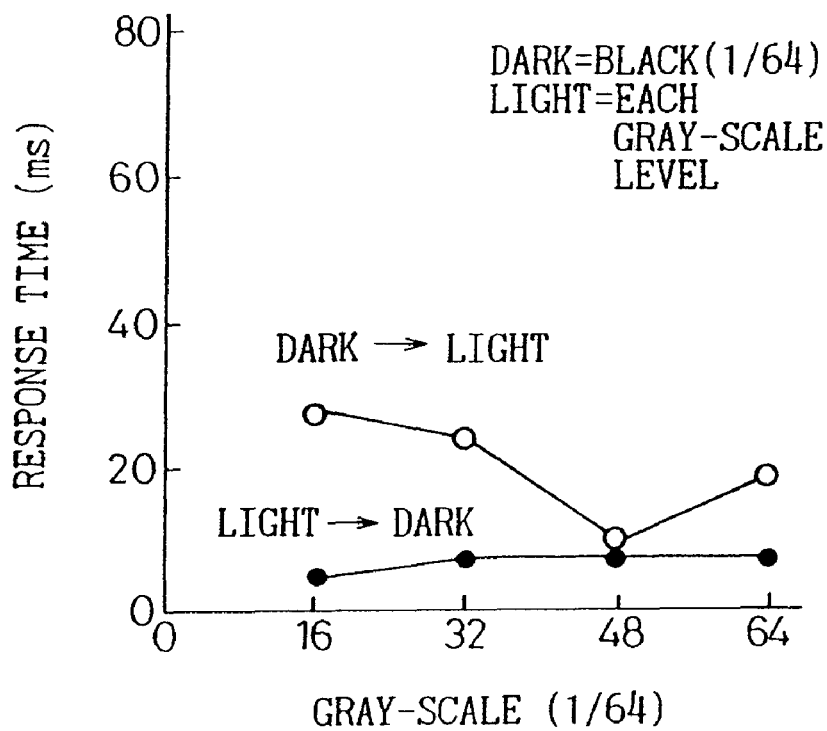
FIGS. 85A to 85D are diagrams showing changes of response times between gray-scale levels in the fifteenth embodiment. TN LCD, and other VA LCDs.
Figure 85B:
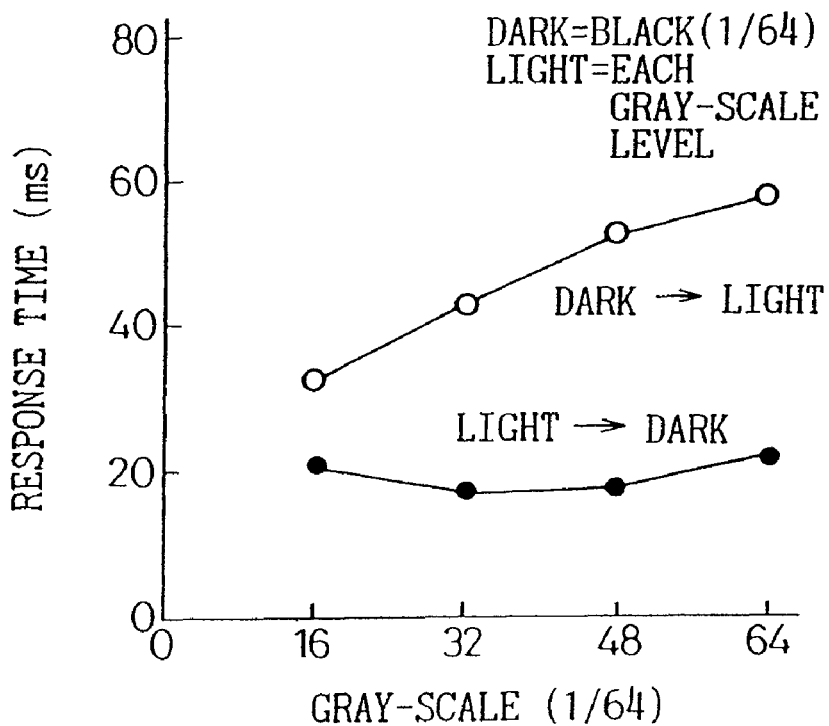
Figure 85C:
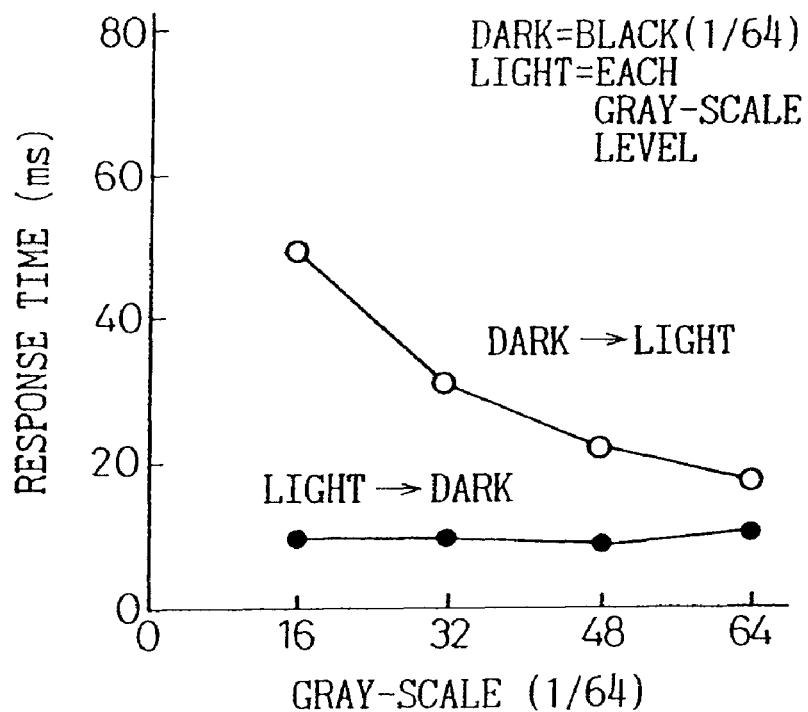
Figure 85D:
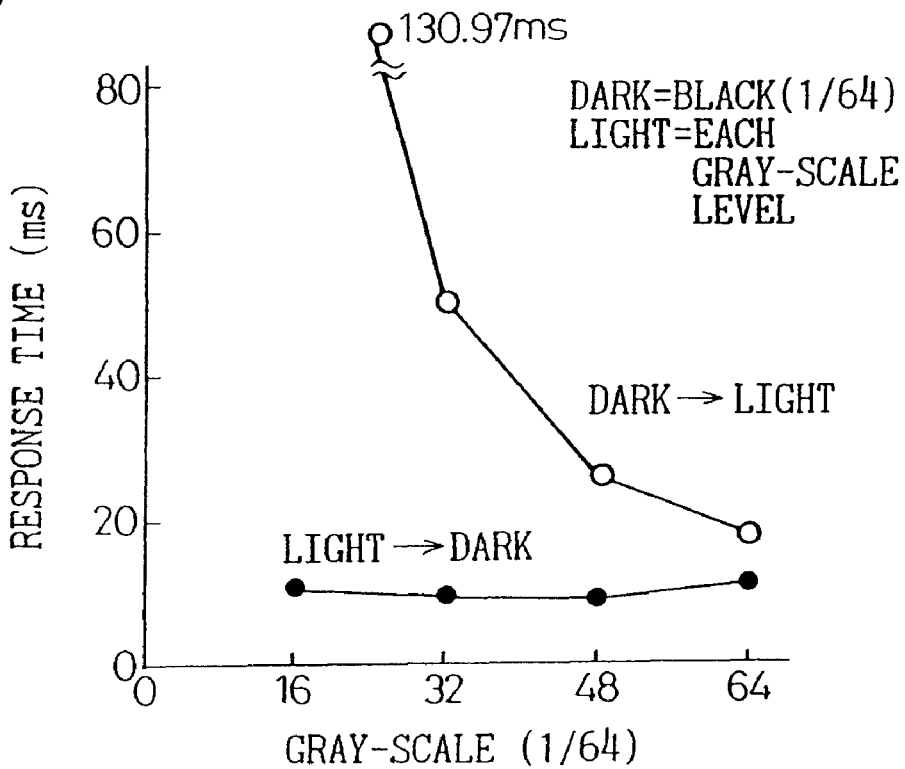

FIG. 85A is a diagram showing the response speeds with the change of the gray-scale at the 16th graduation, 32nd gradation, 48th gradation, 64th gradation and black (first gradation) when 64-gradation display is effected in the LCD of the fifteenth embodiment. For reference, FIG. 85B shows the response speed of the TN mode, FIG. 85C shows the response speed of the mono-domain VA mode in which the orientation is not divided and FIG. 85D shows the response speed of the multi-domain VA mode using the parallel protrusions of the first embodiment. For example, the response speed from the full black to the full white is 58 ms in the TN mode, 19 ms in the mono-domain VA mode and 19 ms in the multi-domain system, whereas it is 19 ms in the fifteenth embodiment, and this value remains at the same level as those of other VA mode. The response speed from the full white to the full black is 21 ms in the TN mode 12 ms in the mono-domain VA mode and 12 ms in the multi-domain type, whereas it is 6 ms in the fifteenth embodiment, and this value is higher than those of other VA modes. Further, the response speed from the full to the 16th gradation is 30 ms in the TN mode, 50 ms in the mono-domain type and 130 ms in the multi-domain type, whereas it is 28 ms in the fifteenth embodiment, and this value remains at the same level as that of the TN mode and is by far more excellent than the values of other VA modes. The response speed from the 16th gradation to the full black is 21 ms in the TN mode, 9 ms in the mono-domain type and 18 ms in the multi-domain type, whereas it is 4 ms in the fifteenth embodiment and this value is more excellent than the values of any other modes. Incidentally, the response speed of the IPS mode is extremely lower in comparison with any other modes, and the response speeds from the full black to the full white and vice versa are 75 ms, the response speed from the full black to the 16th gradation is 200 ms and the response-speed from the 16 gradation to the full black is 75 ms.

As described above, the LCD of the fifteenth embodiment are extremely excellent in both viewing angle performance and the response speed.

Figure 86A:
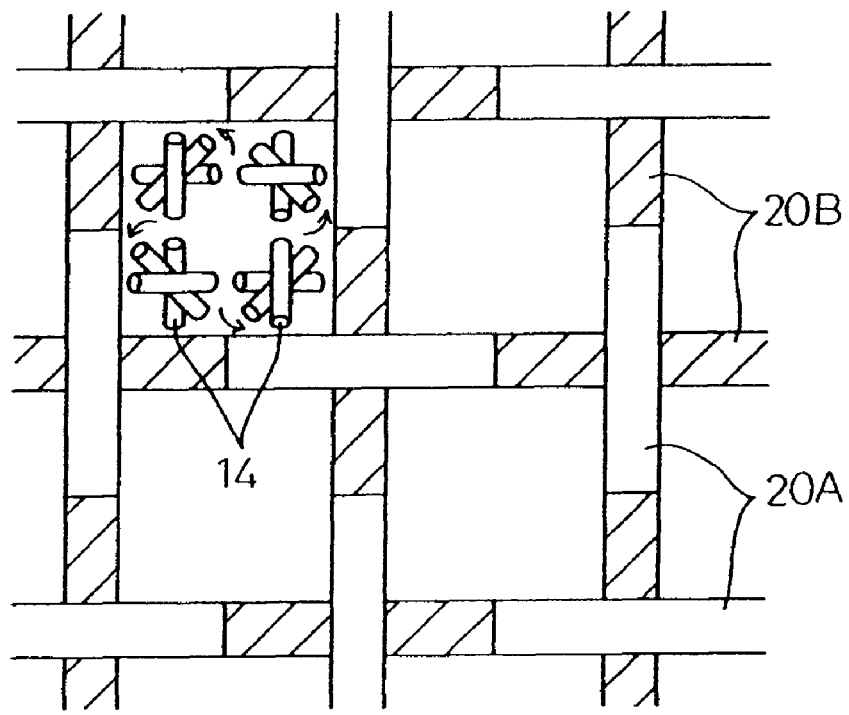
FIGS. 86A and 86B are diagrams showing an arrangement of protrusions of a modification of the fifteenth embodiment.
Figure 86B:
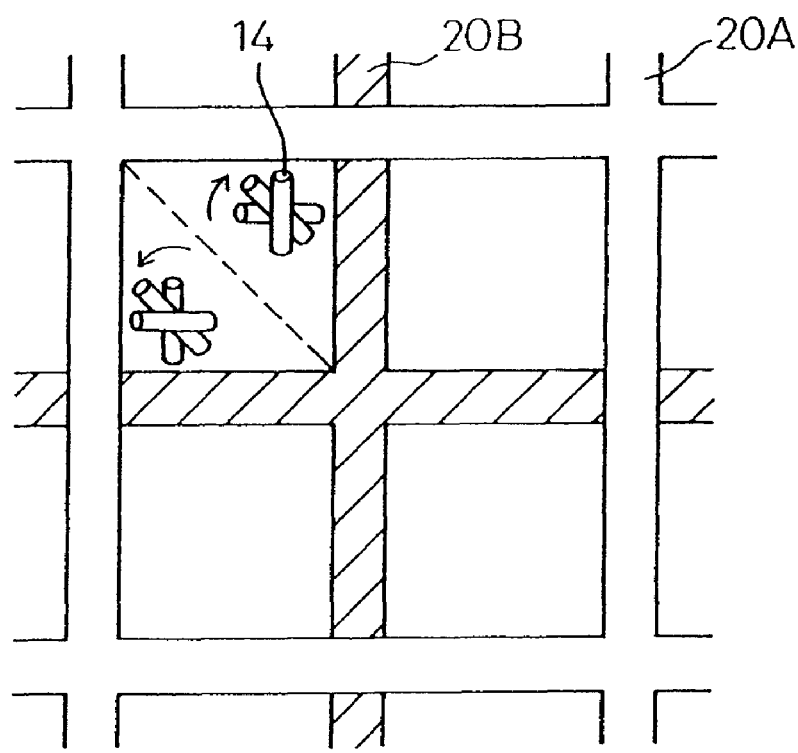

FIGS. 86A and 86B shows another protrusion patterns for accomplishing the twist type VA system described above. In FIG. 86A protrusions 20A and 20B are interruptedly disposed in such a fashion as to extend orthogonally in two directions on the respective substrates and not to cross one another, but to cross one another when they are viewed from the respective substrates. In this embodiment, four twist regions are formed in the different way from FIG. 82. The direction of the twist is the same in each twist region but the rotating positions deviate from one another by 90 degrees. In FIG. 86B protrusions 20A and 20B are disposed in such a fashion as to extend orthogonally in two directions to the respective substrates and to cross one another but to deviate mutually in both directions. In this embodiment, two twist regions having mutually different twist directions are formed.

Figure 87:
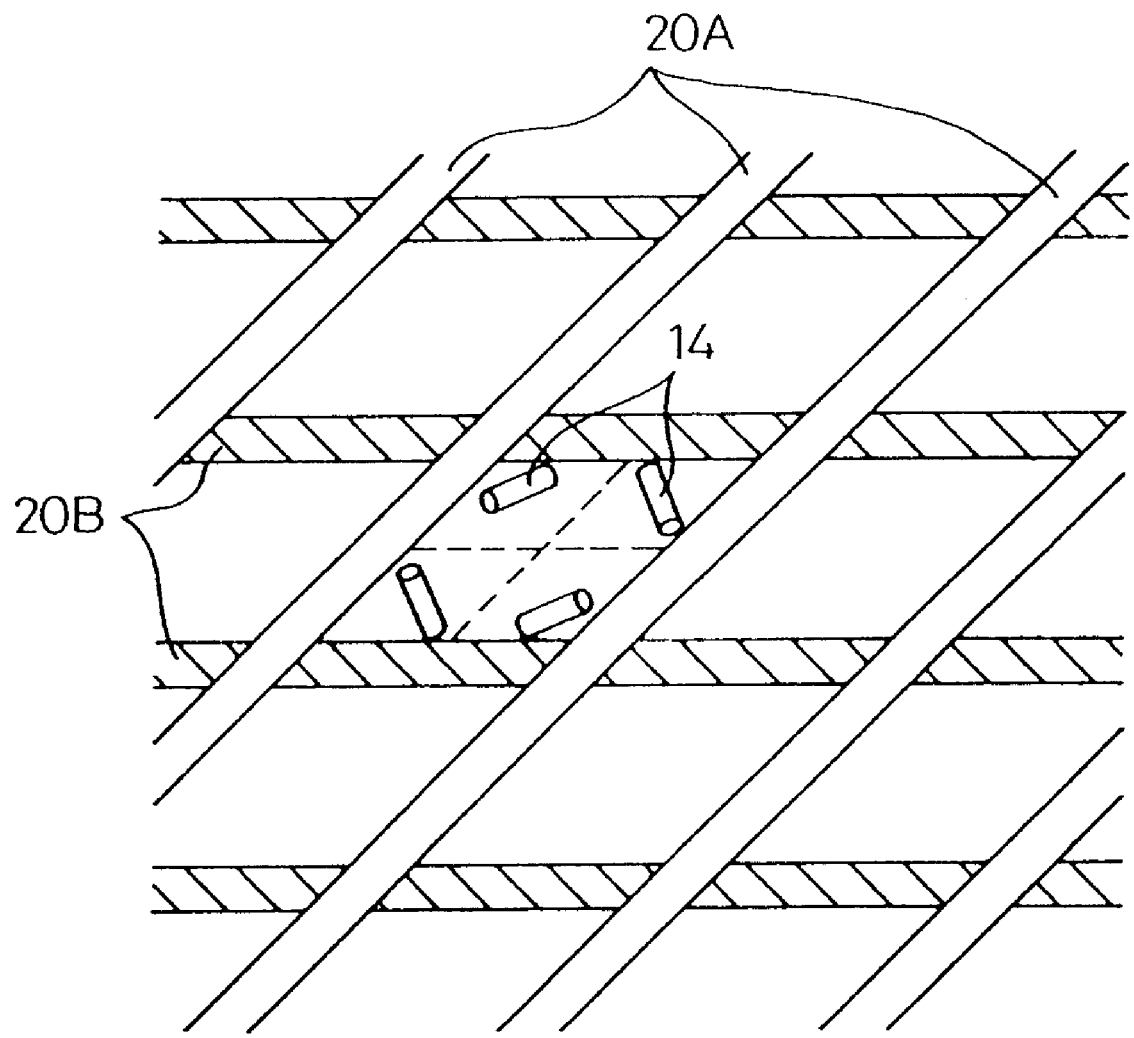
FIG. 87 is a diagram showing an arrangement of protrusions of another modification of the fifteenth embodiment.

In FIGS. 82, 86A and 86B, the protrusions 20A and 20B disposed on the two substrates need not be disposed in such a fashion as to orthogonally cross one another. FIG. 87 shows a modification wherein the protrusions 20A and 20B shown in FIG. 82 are so disposed as to cross one another at an angle other than 90 degrees. In this case, too, four twist regions having mutually different twist directions are formed, and the quantity of the twist is different between the two opposed regions.

Furthermore, the same result can be obtained when slits are disposed in place of the protrusions 20A and 20B shown in FIGS. 82, 86A and 86B.

Figure 88:
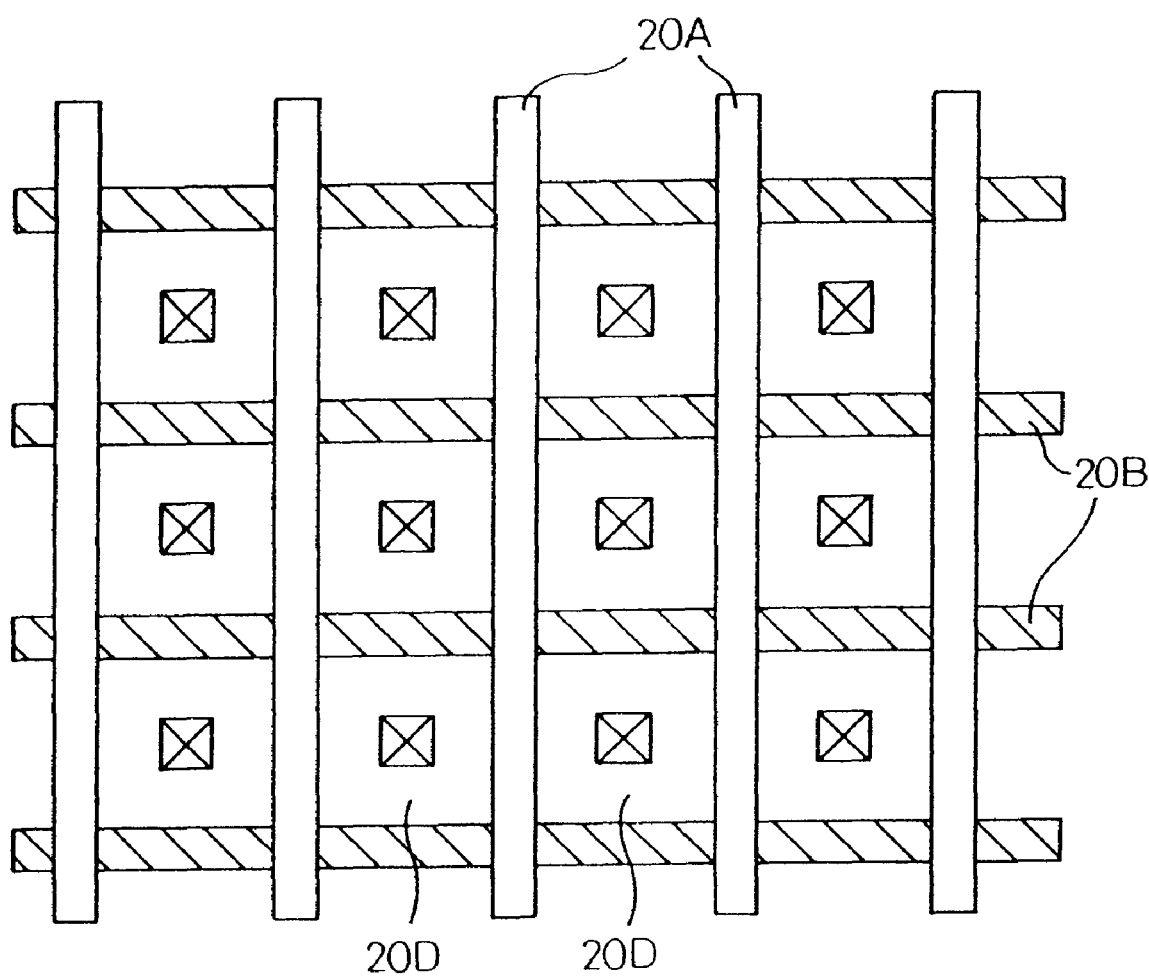
FIG. 88 is a diagram showing an arrangement of protrusions of another modification of the fifteenth embodiment.

In the fifteenth embodiment shown in FIG. 82, there is no means for controlling the orientation at the center portion in the frame encompassed by the protrusions 20A and 20B in comparison with the portions near the protrusions, and the orientation is likely to be disturbed because it is far from the protrusions. For this reason, an elongated time is necessary before the orientation gets stabilized, and it is expected that the response speed at the center portion becomes lower. The response speed attains the highest at the corner portions of the frame because they are affected strongly by the protrusions serving as two adjacent sides. The influences of the orientation at the corner portions are transferred to the center portion, impinge with the influences of other twist regions and the twist regions are rendered definite and are stabilized. In this way, all the liquid crystals are not simultaneously oriented, but certain portions are first oriented and then this orientation is transmitted to the portions nearby. Therefore, the response speed becomes slower at the center portion far from the protrusions. When the frame defined by crossing is a square as shown in FIG. 82 for example, the influences are transferred from the four corners but when the frame defined by the crossing protrusions is the parallelogram as shown in FIG. 87, the influences are transferred from the acute angle portions, where the influences of the protrusions are stronger, to the center portion. The influences impinge at the center portion and are further transferred to the corners having an obtuse angle. Therefore, the response speed becomes slower in the parallelogramic frame than in the square frame. To solve such a problem, a protrusion 20D similar to the frame is disposed at the center of each frame as shown in FIG. 88. An excellent response speed can be obtained when, for example, the protrusions 20A and 20B has a width of 5 μm and a height of 1.5 μm, the gap of the protrusions is 25 μm and the protrusion 20D is a square pyramid having a bottom of 5 μm.

Figure 89:
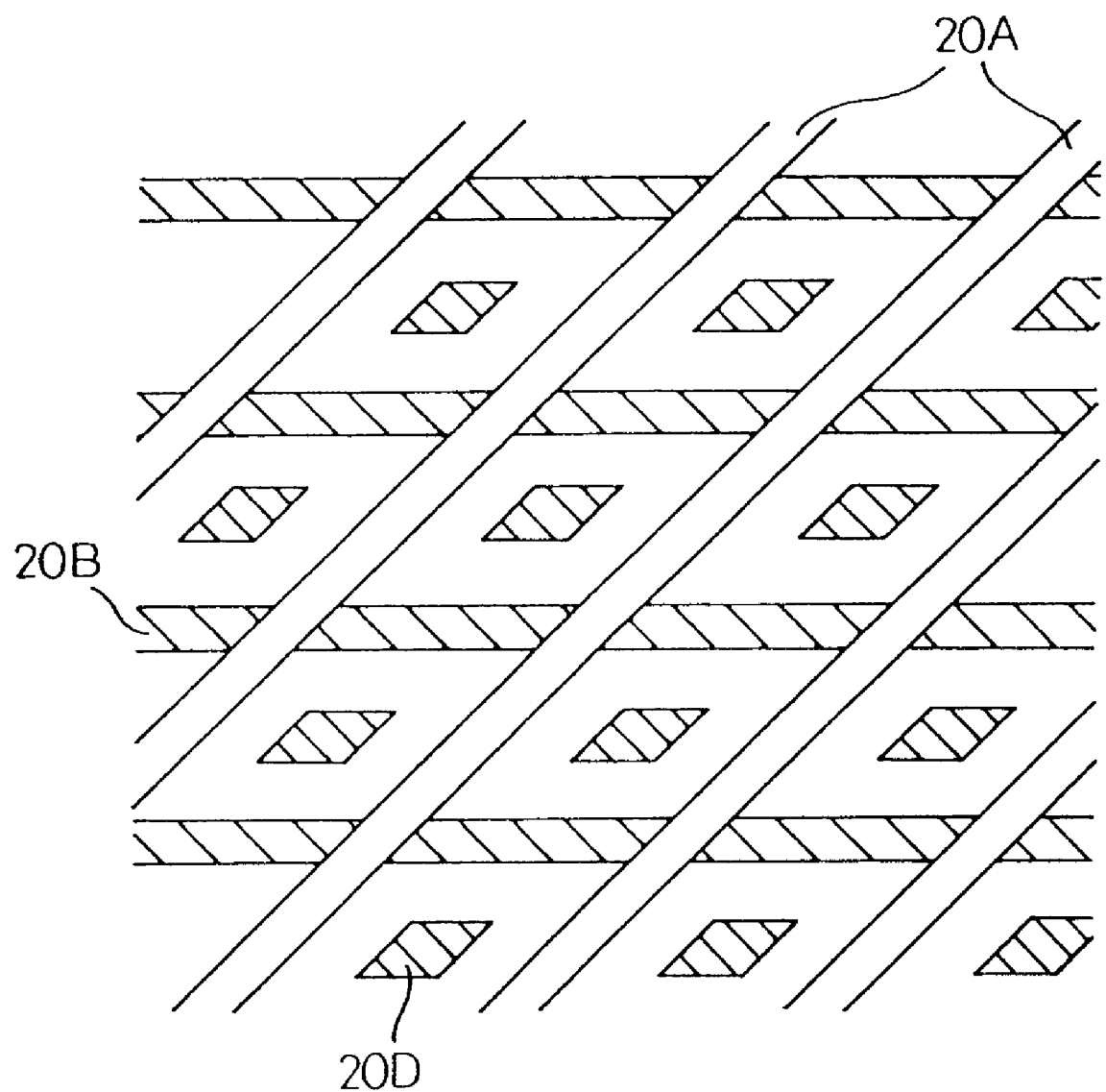
FIG. 89 is a diagram showing an arrangement of protrusions of another modification of the fifteenth embodiment.

FIG. 89 shows another embodiment wherein the protrusion is disposed at the center of each frame of the protrusion pattern shown in FIG. 87. The same result as that of FIG. 82 can be obtained according to this arrangement, too.

In the constructions shown in FIGS. 82, 86A, 86B and 87 wherein the protrusions 20A and 20B cross one another, the thickness of the liquid crystal layer can be limited at the portions at which the protrusions 20A and 20B cross one another by setting the sum of the height of the protrusions 20A and 20B to a value equal to the gap of the substrates, that is, the thickness of the liquid crystal layer. According to this arrangement, the spacer need not be used.

Figure 90A:
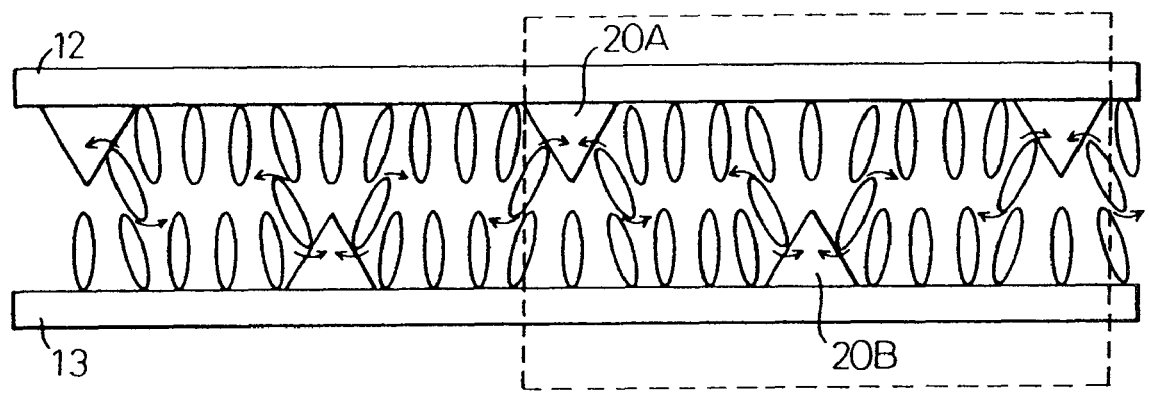
FIGS. 90A and 90B are diagrams showing a structure of protrusions of a sixteenth embodiment.
Figure 90B:
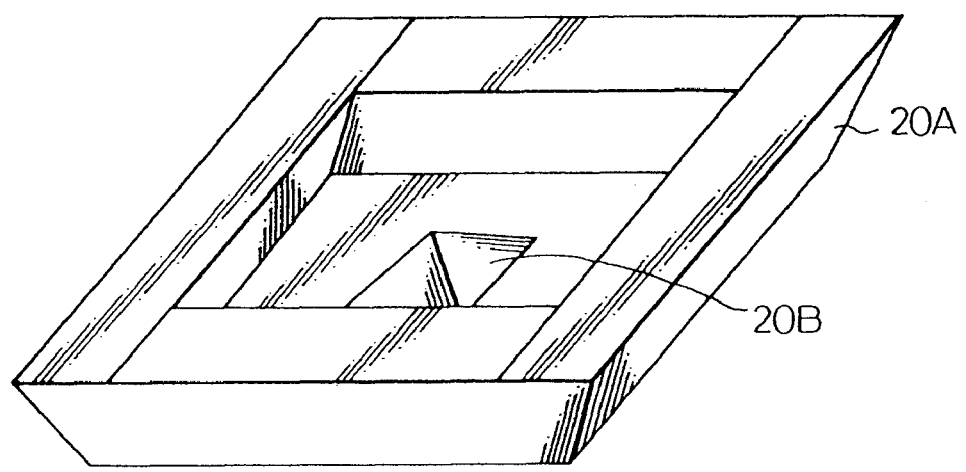
Figure 91:
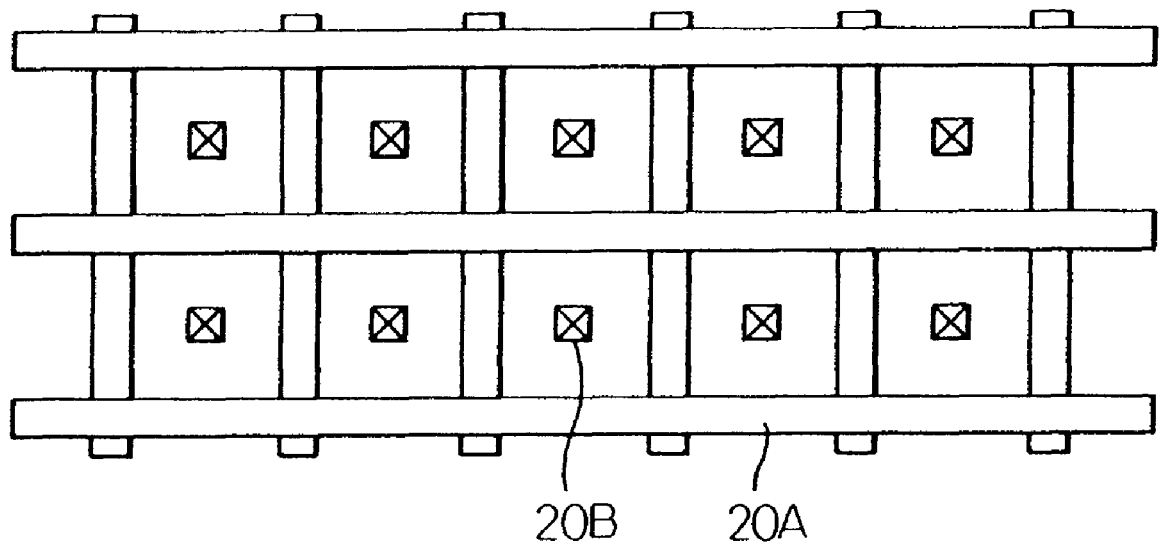
FIG. 91 is a diagram showing an arrangement of protrusions of the sixteenth embodiment.

FIGS. 90A and 90B are diagrams showing the structure of a panel of the 16th embodiment. FIG. 90A is a side view, and FIG. 90B is an oblique view of a portion of the panel corresponding to one square of a lattice. FIG. 91 is a diagram showing a pattern of protrusions in the 16th embodiment which is seen in a direction vertical to the panel. As illustrated, in the 16th embodiment, the protrusions 20A are created like a cubic lattice on the electrode 12 formed on one substrate, and the pyramidal protrusions 20B are created at positions coincident with the center positions of the opposite squares of the lattice on the electrodes on the other substrate. In a region shown in FIG. 90B, the orientation is divided according to the principles described in conjunction with FIG. 12B and divided vertically and laterally uniformly. In reality, a prototype was produced by setting the distance between the electrodes to 3.5 micrometers, the sideways spacing between protrusions 20A and 20B to 10 micrometers, and the height of protrusions to 5 micrometers. As a result, the viewing angle characteristic of the panel was of the same level as the one of the panel of the second embodiment shown in FIG. 22.

FIGS. 254A and 254B show a modification of the sixteenth embodiment. FIG. 254A shows a protrusion pattern and FIG. 254B is a sectional view. In this modification, the arrangement of the matrix-like protrusions and the pyramidal protrusions of the sixteenth embodiment is reversed. In other words, the protrusion 20A disposed on the electrode 12 of the CF substrate 16 is pyramidal whereas the protrusion 20B on the side of the TFT substrate 17 has a two-dimensional matrix form. The protrusion 20A is disposed at the center of each pixel 9 and the protrusion 20B is disposed in the same pitch as that of the pixels and is disposed on the bus line between the pixels 9. Therefore, the liquid crystal is oriented in four directions inside each pixel. The domain is divided by the protrusion 20A at the center of the pixel as shown in FIG. 254B. The protrusion 20B disposed outside the pixel electrode 13 divides the orientation at the boundary of the pixels as shown in the drawing. Further, the edge of the pixel electrode functions at this portion as the domain regulating means. The orientation regulating force by the protrusion 20B and the orientation regulating force of the edge of the pixel electrode coincide with each other. Consequently, the division of the orientation can be carried out stably. In this modification, the distances between the protrusion 20A and the protrusion 20B versus the edge of the pixel electrode 12 are great. Therefore, it is only the protrusion 20A that exists inside the pixel, and the occupying area of the protrusion inside the pixel is small and display luminance can be improved, though the response speed drops to a certain extent. Further, the production cost can be reduced by forming the protrusion 20B by the formation process of the bus line because the number of the production steps does not increase.

In the aforesaid first to 16th embodiments, protrusions produced using a resist that is an insulating material are used as a domain regulating means for dividing the orientation of a liquid crystal. In the embodiments, the shape of the inclined surfaces of the protrusions are utilized. The insulating protrusions are very important in terms of the effect of interruption of electric fields. A liquid crystal is driven using, generally, an alternating wave. With an increase in response speed deriving from innovation of a liquid crystal material, influence exerted during one frame (during which a direct (dc) voltage is applied), that is, influence predetermined by a DC wave must be taken into full consideration. A driving wave for a liquid crystal must exhibit both the characteristics of the AC and DC voltages and satisfy the requirements for the AC and DC voltages. The properties of the resist used to allow the driving wave for a liquid crystal to exert a predetermined effect of minimizing electric fields must be set in relation to the characteristics of the AC and DC voltages or the AC and DC characteristics. Specifically, the resist must be set to have properties effective in minimizing electric fields in relation to the AC and DC characteristics.

From the viewpoint of the DC characteristic, the specific resistance ρ must be high enough to affect the resistance of a liquid-crystal layer. Specifically, the specific resistance must be $10^{12}$ ohms/cm or more so that it will be equal to or larger than the specific resistance of a liquid crystal (for example, the specific resistance of a TFT-drive liquid crystal is about $10^{12}$ ohms/cm or more). Preferably, the specific resistance should be $10^{13}$ ohms/cm or more.

From the viewpoint of the AC characteristic, the capacitance (value determined by a dielectric constant, film thickness, and sectional area) of a resist must be about ten or less times larger than the capacitance of a liquid-crystal layer under the resist (with an impedance of about one-tenth or more of the impedance of the liquid-crystal layer), so that the resist can exert the operation of minimizing electric fields in the liquid-crystal layer under the resist. For example, the dielectric constant ∈ of the resist is approximately 3 or about one-third of the dielectric constant ∈ of the liquid crystal layer (approximately 10). The film thickness is approximately 0.1 micrometers or about ⅟35 of the thickness of the liquid-crystal layer (for example, approximately 3.5 micrometers). In this case, the capacitance of the insulating film is approximately ten times larger than the capacitance of the liquid-crystal layer under the insulating film. In other words, the impedance of the resist (insulating film) is approximately one-tenth of the impedance of the liquid-crystal layer under the resist. Thus, the resist can affect the distribution of electric fields in the liquid-crystal layer.

In addition to an effect exerted by the shape of the inclined surfaces created by the resist, the influence of the distribution of electric fields can be utilized. This results in more stable and firm alignment. When a voltage is applied, liquid crystalline molecules are tilted. At this time, the strength of electric fields in a domain in which the orientation of a liquid crystal is divided (on a resist) is sufficiently low. In the domain, liquid crystalline molecules aligned nearly vertically exist stably and work as a barrier (partition) against domains generated on both sides of the domain. When a higher voltage is applied, the liquid crystalline molecules in the orientation-divided domain (on the resist) starts tilting. However, the liquid crystalline molecules in the domains generated on both sides of the domain on the resist tilt in a direction nearly horizontal to the resist (this results in a very firm orientation). For establishing this state, the insulating layer (resist) of the orientation-divided domain must have a capacitance that is approximately ten or less times larger than the one of the liquid-crystal layer under the resist. A material exhibiting a small dielectric constant ∈ should be adopted to realize the insulating layer, and the thickness of the layer must be large. This suggests an insulating layer having a dielectric constant ∈ of approximately 3 and a thickness of 0.1 micrometers or more. The employment of an insulating layer having a smaller dielectric constant ∈ and a larger thickness would exert a more preferable operation and effect. In the first to 16th embodiments, a novolak resist having a dielectric constant ∈ of approximately 3 is used to form protrusions of 1.5 micrometers thick. Observation of orientation division has revealed that very stable alignment can be attained. The novolak resist is widely adopted in the process of manufacturing a TFT or CF. The adoption of the novolak resist would bring about a great merit (of obviating the necessity of additional facilities).

Moreover, it is ascertained that the novolak resist is highly reliable as compared with other resists or a flattening material and has no problem.

Moreover, when the insulating film is placed on both substrates, a more preferable operation and effect can be exerted.

Aside from the novolak resist, an acrylic resist ($\in$=3.2) was checked to see if it would prove effective as an insulating film. The same results as those obtained by checking the novolak resist were obtained. For demonstrating that the influence of electric fields is very important, an ITO film was deposited on a resist and the aligned state of liquid crystalline molecules was observed. The results were not so good as those obtained when the insulating film was used.

In the first to 16th embodiments, an electrode is slitted or protrusions of insulators are formed on an electrode in order to divide the orientation of a liquid crystal. Other forms can be adopted. Some of the forms will be presented below.

Figure 92A:
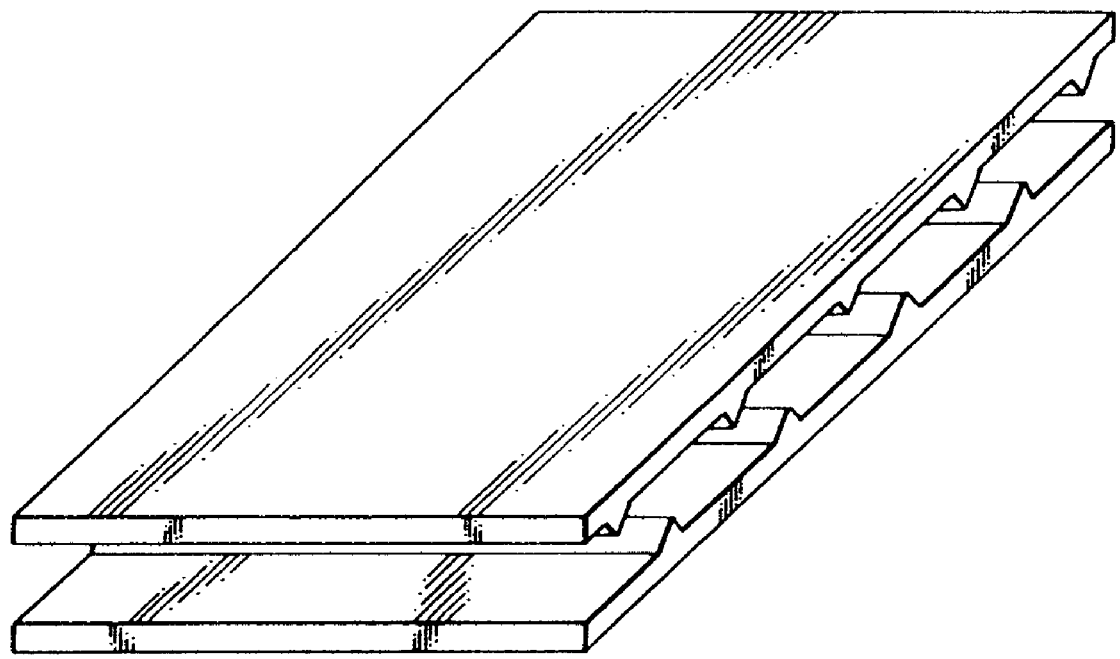
FIGS. 92A and 92B are diagrams showing a structure of a panel of a seventeenth embodiment.
Figure 92B:
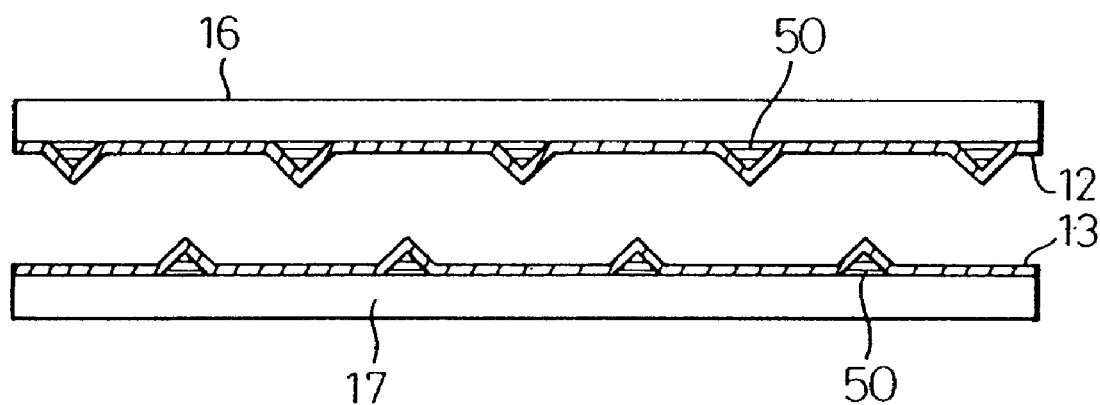

FIGS. 92A and 92B are diagrams showing the structure of a panel of the 17th embodiment. FIG. 92A is an oblique view and FIG. 92B is a side view. As illustrated, in the 17th embodiment, protrusions 50 extending parallel to one another unidirectionally are formed on glass substrates 16 and 17, and electrodes 12 and 13 are formed on the substrates. The protrusions 50 are arranged to be mutually offset by a half pitch. The electrodes 12 and 13 are therefore shaped to partly jut out. The surfaces of the electrodes are processed for vertical alignment. Using the thus shaped electrodes, when a voltage is applied to the electrodes, electric fields are induced in a vertical direction. The orientation of a liquid crystal is divided into two directions with each protrusion as a border. The viewing angle characteristic of the panel is therefore improved as compared with a conventionally exhibited one. However, the distribution of electric fields becomes different from the one attained when the protrusions are made of an insulating material. Only the effect of the shape of the inclined surfaces of the protrusions is utilized in order to divide the orientation. The stability of alignment is slightly inferior to that attained when the protrusions are made of an insulating material. However, as described above, the protrusions provided on the electrodes need to be made of insulating material with low dielectric constant. Therefore, the materials used to form the protrusions are limited. Further, various conditions must be satisfied to form the protrusions by using those materials. This causes a problem in the production process. Contrarily, the panel structure of the 17th embodiment does not have such limitation.

Figure 93:
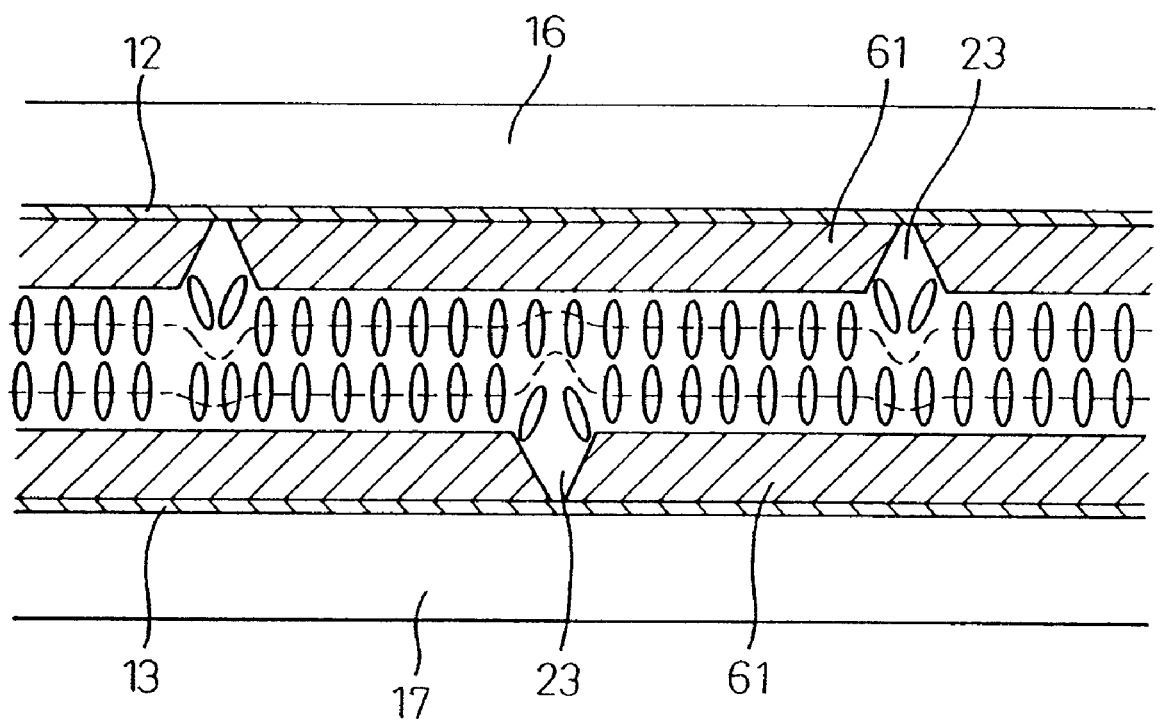
FIG. 93 is a diagram showing a structure of a panel of a eighteenth embodiment.

FIG. 93 is a diagram showing the structure of a panel of the 18th embodiment. In this embodiment, insulating layers 61 formed on the ITO electrodes 12 and 13 are provided with depressions 23. As the shape of the depressions, the shapes of protrusions or slits of electrodes presented in the second to ninth embodiments can be adopted. In this case, an effect exerted by oblique electric fields works like the effect exerted by the protrusions to stabilize alignment.

Figure 94:
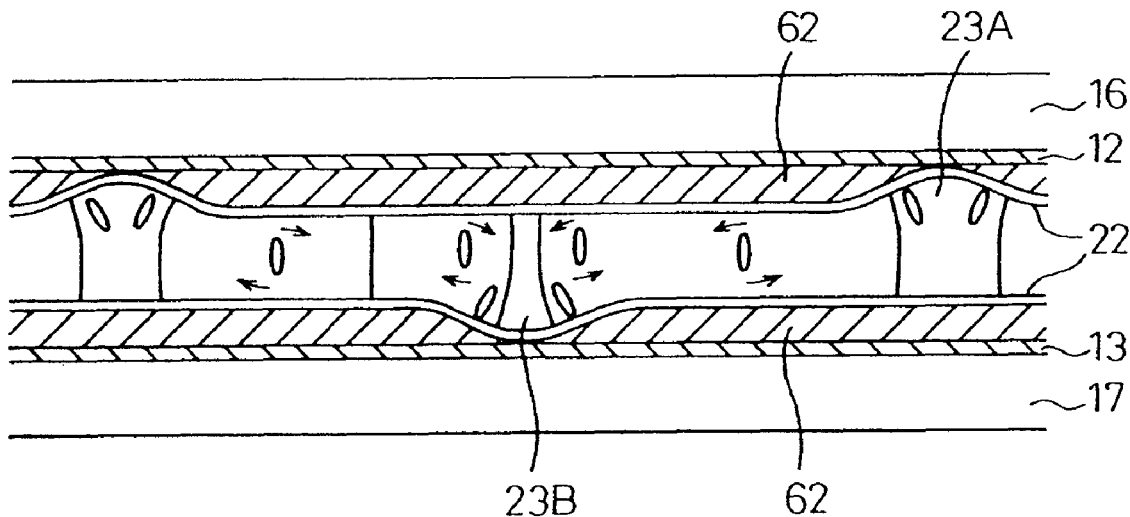
FIG. 94 is a diagram showing a structure of a panel of a nineteenth embodiment.

FIG. 94 shows a panel structure of the nineteenth embodiment. In this embodiment, electrodes 12 and 13 are formed on glass substrates 16 and 17, respectively, layers 62 each made of an electrically conductive material and having a depression (groove) 23A, 23B having a width of 10 μm and a depth of 1.5 μm are formed on these electrodes 12 and 13, and vertical alignment films 22 are formed on these layers 62. Incidentally, the thickness of a liquid crystal layer is 3.5 μm, and a color filter layer 39, a bus line, a TFT, etc. are omitted from the drawing. It can be observed that the orientation of the liquid crystal is divided at the recess portions. In other words, it has been confirmed that the depression, too, functions as the domain regulating means.

In the panel structure of the nineteenth embodiment, the depressions 23A and 23B are disposed at the same predetermined pitch of 40 μm in the same way as in the case of the protrusions, and the upper and lower depressions 23A and 23B are so disposed as to deviate by a half pitch. Therefore, the regions in which the liquid crystal assumes the same orientation are defined between the adjacent upper and lower depressions.

Figure 95:
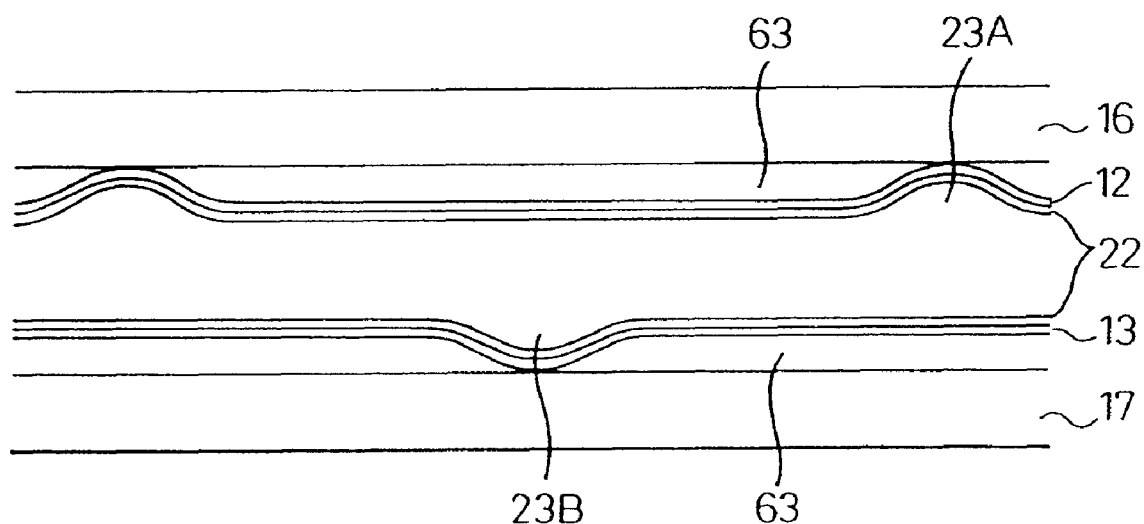
FIG. 95 is a diagram showing a structure of a panel of a twentieth embodiment.

FIG. 95 shows the panel structure of the 20th embodiment. In this 20th embodiment, layers 62 having grooves 23A and 23B having a width of 10 μm and a depth of 1.5 μm are formed on the glass substrates 16 and 17 by using a color filter (CF) resin, respectively, electrodes 12 and 13 are formed on these layers 62, and vertical alignment films are further formed on the electrodes 12 and 13, respectively. In other words, a part of each electrode 12, 13 is recessed. The protrusions 23A and 23B are disposed at the same predetermined pitch of 40 μm whereas the upper and lower depressions 23A and 23B are so disposed as to deviate from one another by a half pitch. In this case, too, the same result as that of the nineteenth embodiment can be obtained. Incidentally, since the structure having the depression is disposed below the electrode in this 20th embodiment, limitation to the material is small, and the material used for other portions such as the CF resin can be used.

In the case of the protrusion and the slit, the orientation is divided in such a fashion that the liquid crystalline molecules expand in the opposite direction at these portions but in the case of the recess, the orientation is divided in such a fashion that the liquid crystalline molecules face one another at the depression portion. In other words, the function of dividing the orientation by the recess has the opposite relation to that of the protrusion and the slit. Therefore, when the depression is used as the domain regulating means in combination with the protrusion or the slit, the preferred arrangement becomes opposite to the arrangements of the foregoing embodiments. The explanation will be predetermined next on the arrangement when the recess is used as the domain regulating means.

Figure 96:
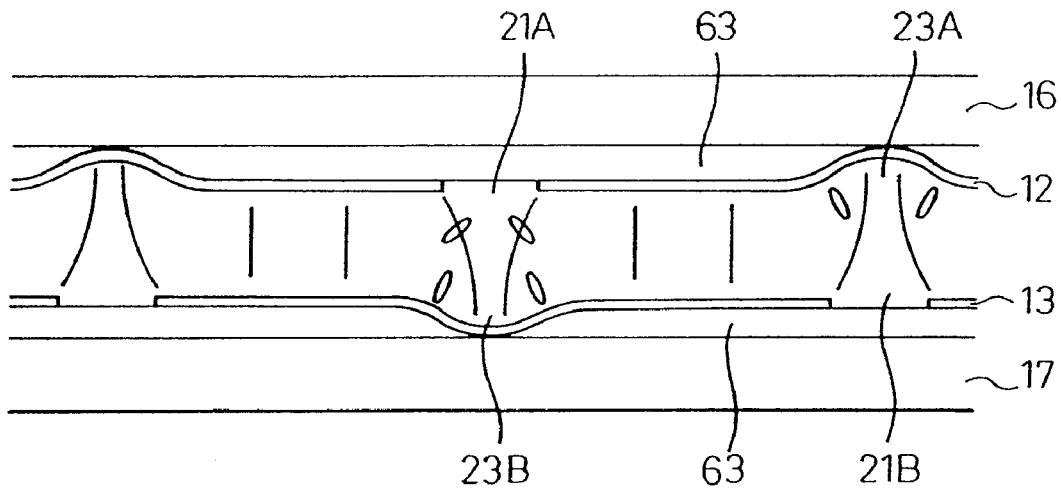
FIG. 96 is a diagram showing a structure of a panel of a modification of the twentieth embodiment.

FIG. 96 shows an example of the preferred arrangements when the depression and the slit are used in combination. As shown in the drawing, the slits 21A and 21B are disposed at positions opposing the depressions 23A and 23B of the 20th embodiment shown in FIG. 95. Since the direction of the orientation division of the liquid crystal by the depressions and the slits opposing one another is the same, the orientation is further stabilized. For example, when the depression is formed under the condition of the 20th embodiment, the slit has a width of 15 μm and the gap between the center of the depression and that of the slit is 20 μm, the switching time is 25 ms under the driving condition of 0 to 5 V and 40 ms under the driving condition of 0 to 3 V. In contrast, when only the slit is used, the switching time is 50 ms and 80 ms, respectively.

Figure 97:
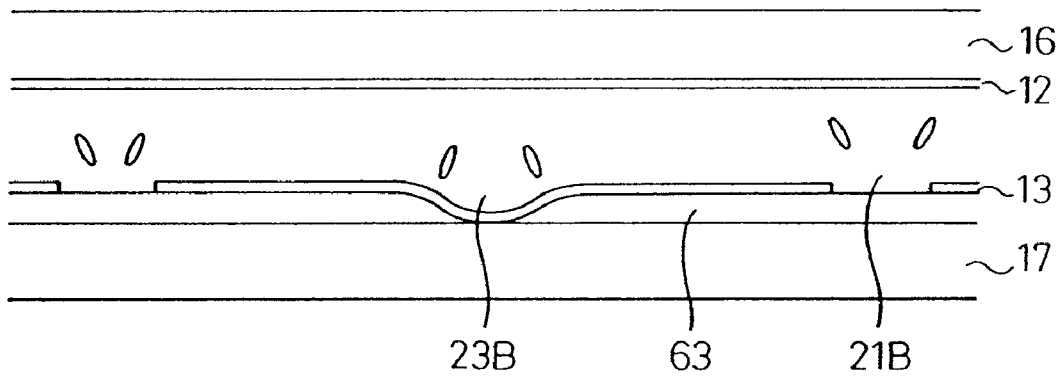
FIG. 97 is a diagram showing a structure of a panel of another modification of the twentieth embodiment.
Figure 98:
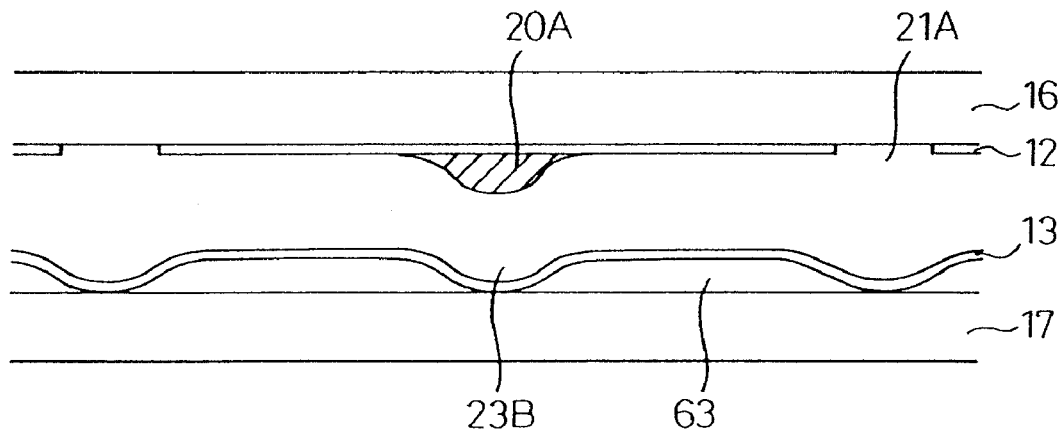
FIG. 98 is a diagram showing a structure of a panel of another modification of the twentieth embodiment.

FIG. 97 shows the structure wherein the depression 20A and the slit 21A on one of the substrates (substrate 16 in this case) in the panel structure shown in FIG. 98, and the region having the same orientation direction is formed between the adjacent depression 20B and the slit 21B.

Incidentally, the same characteristics can be obtained by disposing the protrusion at the same position in place of the slit in the panel structures shown in FIGS. 96 and 97, and the response speed can be further improved.

FIG. 98 shows another panel structure wherein the depression 23B is formed in the electrode 13 of the substrate 17 and the protrusions 20A and the slits 21A are alternately formed at positions of the opposed substrate 16 at positions facing the depression 23B, respectively. In this case, the direction of the orientation becomes different between the set of the adjacent depression 23B and protrusion 20A and the set of the adjacent depression 23B and slit 21A and consequently, the boundary of the orientation regions is formed in the proximity of the center of the depression.

Figure 99A:
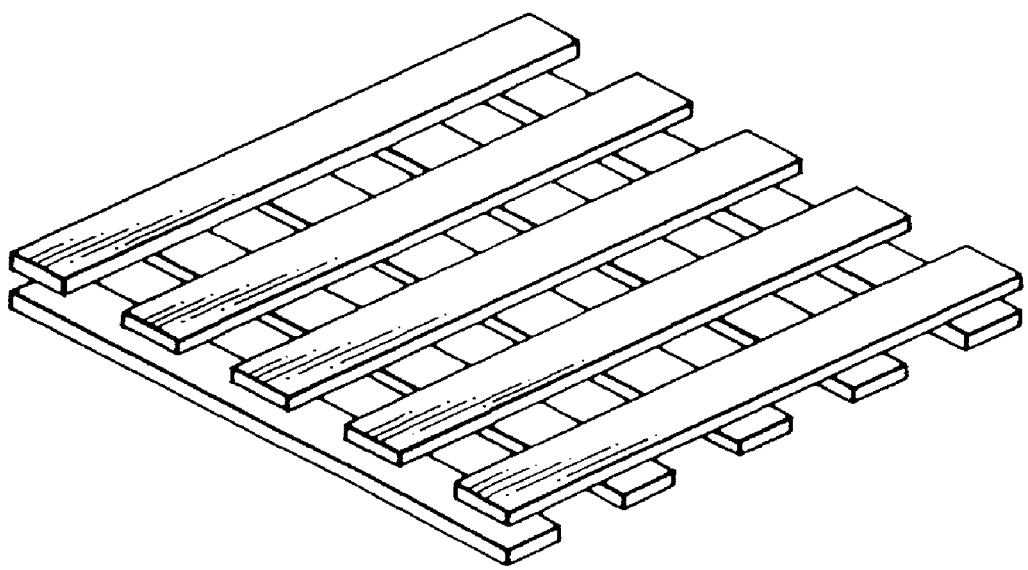
FIGS. 99A and 99B are diagrams showing a structure of a panel of a 21st embodiment.
Figure 99B:
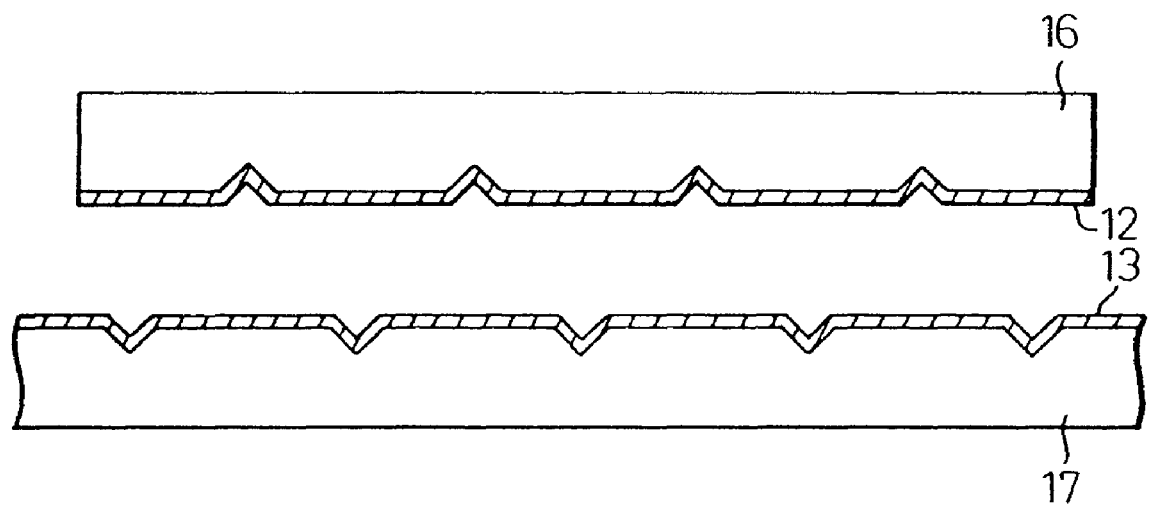

FIGS. 99A and 99B are diagrams showing the structure of a panel of the 21th embodiment. As illustrated, the panel of the 21th embodiment is a simple matrix LCD. The surface of each electrode is dented. The orientation of a liquid crystal is divided with each depression as a border. However, like the tenth embodiment, an effect of oblique electric fields is not exerted. The stability of alignment is little poor.

As described above, the alignment dividing operation of depressions (grooves) is reversed to those of protrusions and slits. By using this relation, a ratio of domain areas can be constant regardless of assembly errors. Now, the influence of assembly errors in the panel of the first embodiment will be described.

Figure 100A:
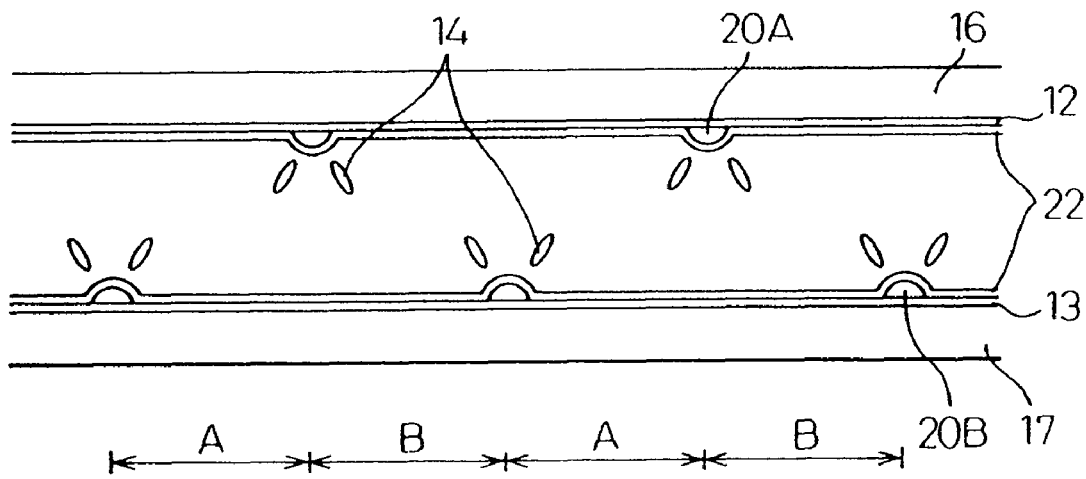
FIGS. 100A and 100B are diagrams for explaining an influence of an assembly error to the alignment division.
Figure 100B:
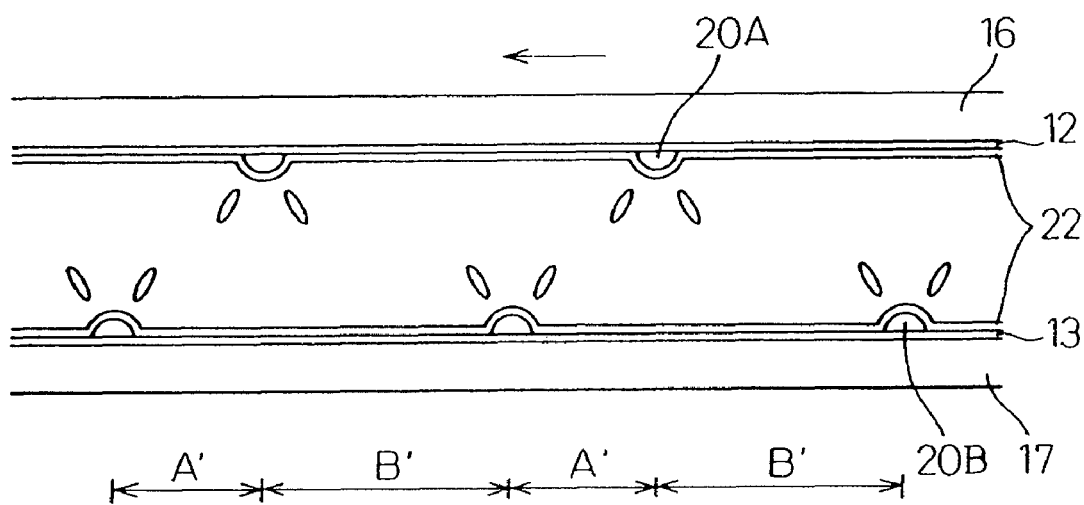

FIGS. 100A and 100B are sectional views of a panel in the first embodiment. As described already, a region where the orientation is regulated is defined by the protrusion 20A formed on the common electrode 12 and the protrusion 20B formed on the cell electrode 13. In FIG. 100A, the region defined by the right inclined side surface of the protrusion 20B and the left inclined side surface of the protrusion 20A is designated as a region A, and the region defined by the left inclined side surface of the protrusion 20B and the right inclined side surface of the protrusion 20A is designated as a region B.

Assume that the CF substrate 16 is displaced leftward of the TFT substrate 17 due to an assembly error, as shown in (2) FIG. 100B. The region A is reduced, while the region B increases. Therefore, the ratio between region A and region B is not already 1 to 1. The resulting proportion of liquid crystalline molecules divided in orientation is not equal, thereby deteriorating the viewing angle characteristic.

Figure 101A:
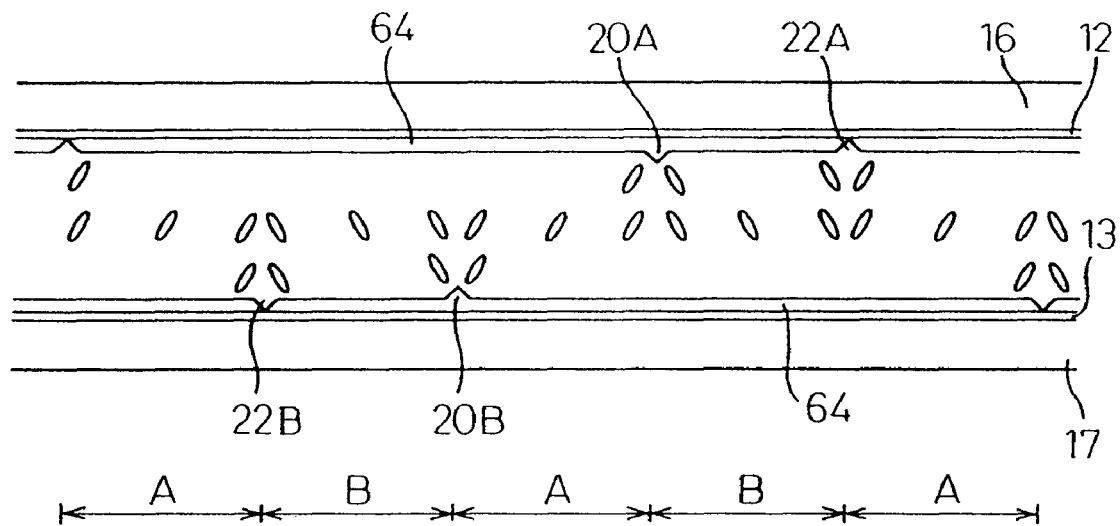
FIGS. 101A and 101B are diagrams showing a structure of a panel of a 22nd embodiment.
Figure 101B:
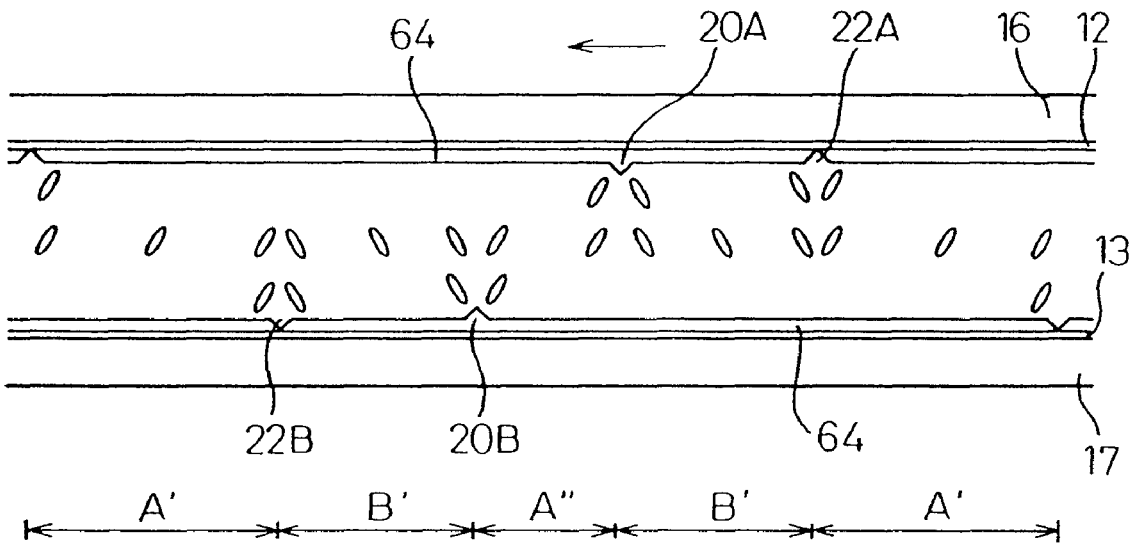

FIGS. 100A and 101B are sectional views of a panel according to a 22th embodiment. In the 22th embodiment, as shown in FIG. 101A, a depression 22B and a protrusion 20B are formed in the TFT substrate 17, followed by forming a depression 20A and a protrusion 22A on the CF substrate 16. This process is repeated. As shown in FIG. 101B, assuming that the CF substrate is displaced with respect to the TFT substrate 17 at the time of assembly, the region A' defined by the protrusions 20B and 20A is reduced. Since the region A" defined by the depressions 22B and 22A is increased by the same amount as the region A' is reduced, however, the region A remains unchanged. The region B, which is defined by the protrusion 20B, the depression 22B, the protrusion 20A and the depression 22A, remains unchanged since the interval between them remains unchanged. Consequently, the ratio between the regions A and B remains the same, and the superior viewing angle characteristic is maintained.

Figure 102:
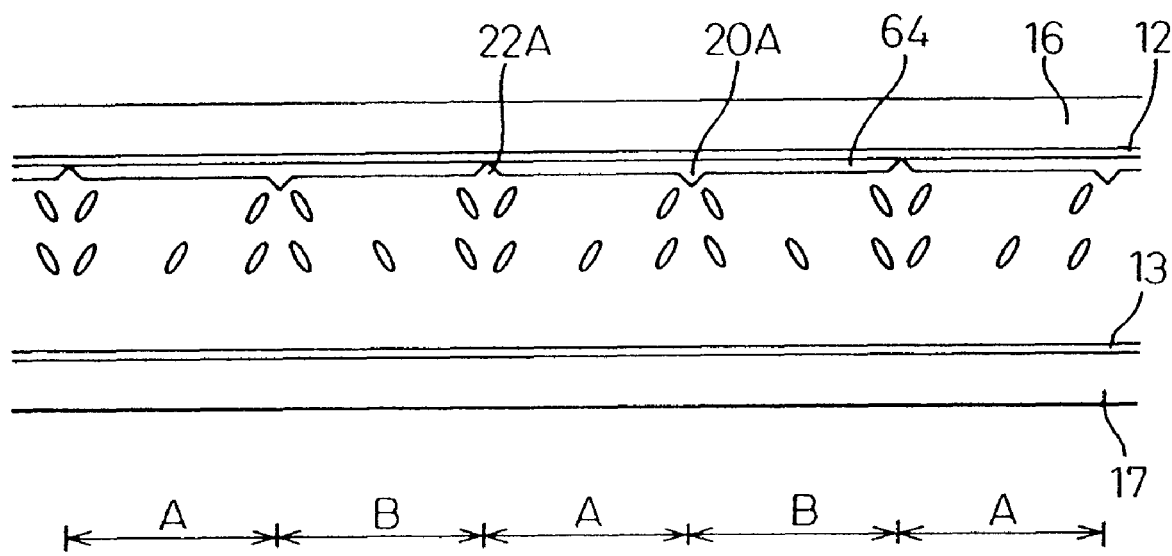
FIG. 102 is a diagram showing a structure of a panel of a 23rd embodiment.

FIG. 102 is a sectional view of a panel according to a 23th embodiment. In the 23th embodiment, as shown, the CF substrate 16 is formed with the protrusions 22A and the depressions 20A alternately with each other. This process is repeated. The region A is defined by the left inclined side surface of the protrusion 20A and the right inclined side surface of the depression 22A, while the region B is defined by the right inclined side surface of the protrusion 20A and the left inclined side surface of the depression 22A. In view of the fact that the orientation region is defined only by the protrusions and depressions formed on one of the substrates, the assembly accuracy is not affected.

The foregoing embodiments are directed to obtain a great viewing angle in all directions. Depending on the application of the liquid crystal panel, however, there are the cases where the viewing angle need not be great, and a great viewing angle needs be obtained in only a specific direction. The LCD suitable for such an application can be accomplished by using the orientation dividing technology by the domain regulating means described above. Next, several embodiments to which the technology of the present invention is applied for the LCDs for such specific applications will be explained.

Figure 103A:
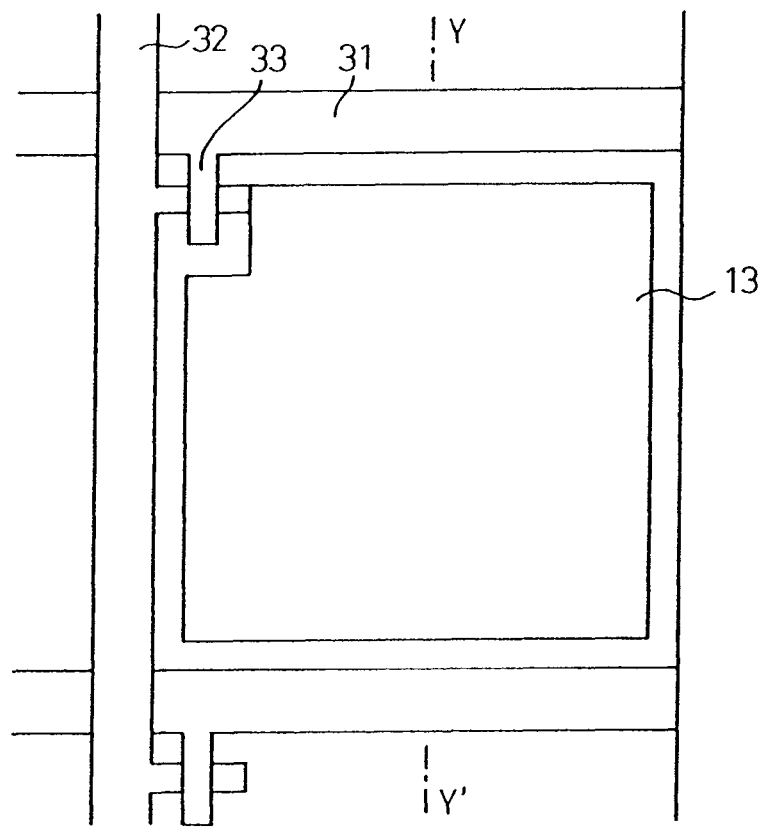
FIGS. 103A and 103B are diagrams showing a structure of a panel of a 24th embodiment.
Figure 103B:
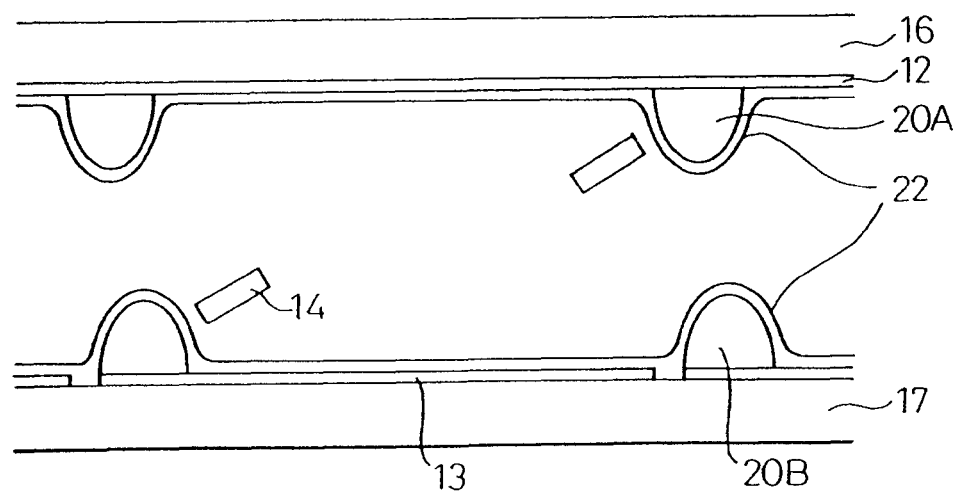

FIGS. 103A and 103B show the panel structure of the 24th embodiment. FIG. 103A is a top view and FIG. 103B is a sectional view taken along a line Y-Y' of FIG. 103B. Linear protrusions 20A and 20B are disposed in the same pitch on substrates 16 and 17, respectively, as shown in the drawing, and these protrusions 20A and 20B are so situated as to deviate a little from the respective opposing positions. In other words, the region B is extremely narrowed in the structure shown in FIG. 102 so that the regions are occupied almost fully by the region A.

The panel of the twenty-fourth embodiment is used for a protrusion type LCD, for example. The viewing angle performance of the protrusion type LCD may be narrow, but a high response speed, a high contrast and high luminance are required for the protrusion type LCD. Since the orientation direction of the panel of the 24th embodiment is substantially in one direction (mono-domain), the viewing angle performance is the same as those of the conventional VA system and cannot be said as excellent. Nonetheless, since the protrusions 20A and 20B are disposed, the response speed is improved markedly in comparison with the conventional system, in the same way as the LCDs of the foregoing embodiments. As to contrast, the contrast of this panel is substantially equal to other VA system and is therefore superior to that of the conventional TN mode and IPS mode. As has been explained already with reference to FIG. 27, the orientation gets distorted and leaking light transmits through the portions of the protrusions 20A and 20B. To improve contrast, therefore, the portions of these protrusions 20A and 20B are preferably shaded. As to luminance, on the other hand, the aperture ratio of the pixel electrode 13 is preferably increased. Therefore, the protrusions 20A and 20B are disposed at the edge of the pixel electrode 113 as shown in FIGS. 103A and 103B. This arrangement can increase luminance without lowering the aperture ratio.

From the aspect of the response speed, the gap between the protrusions 20A and 20B is preferably decreased but to attain this object, the protrusions 20A and 20B must be disposed around the pixel electrode 13. When the protrusions 20A and 20B are disposed around the pixel electrode 13, these portions must be shaded, so that the aperture ratio drops as much. As described above, the response speed, the contrast and luminance have the trade-off relationship, and they must be set appropriately depending on the object of use, and so forth.

Figure 104:
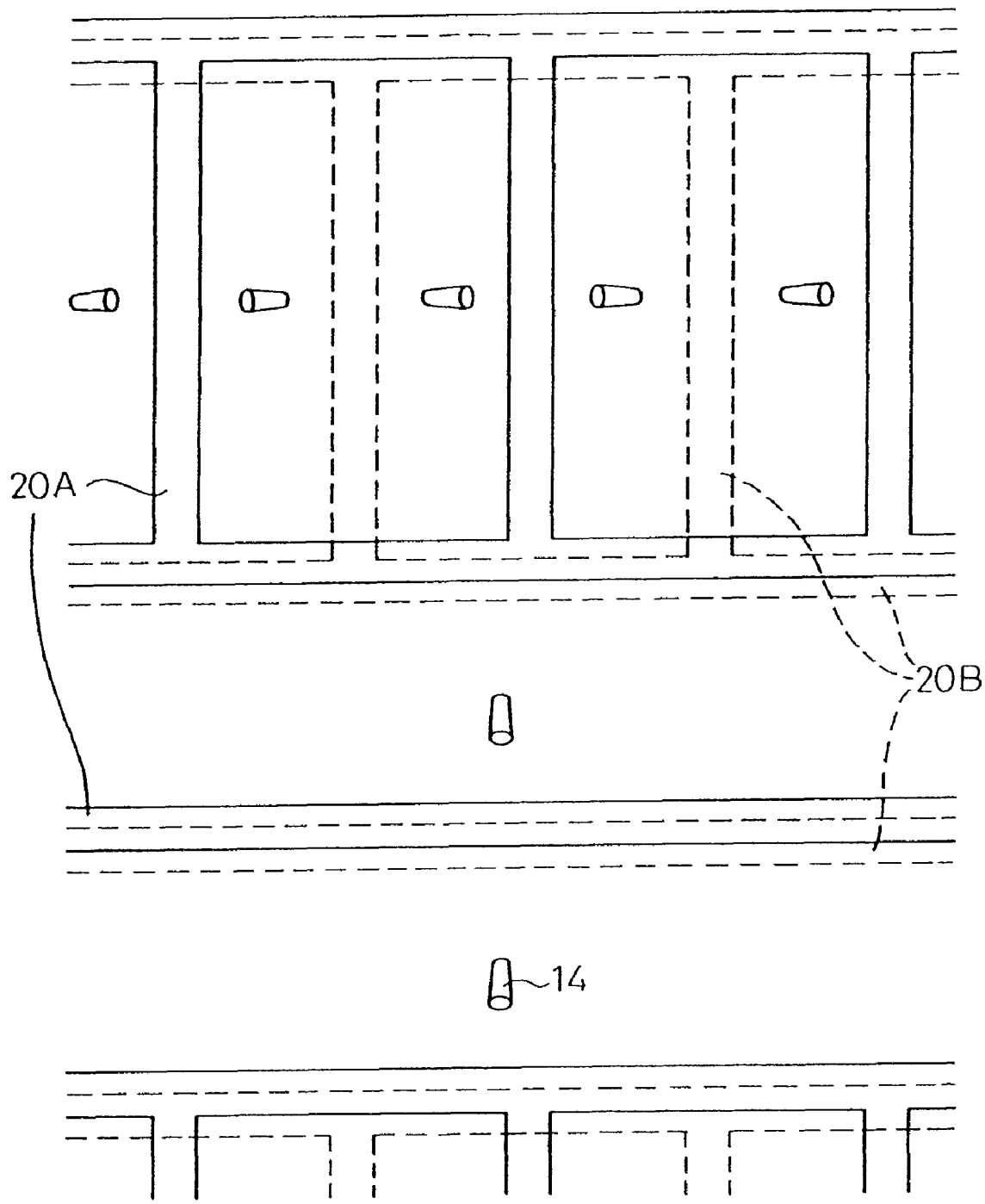
FIG. 104 is a diagram showing a pattern of protrusions to which the structure of the 24th embodiment is applied.

FIG. 104 shows a structure for achieving an LCD panel having excellent viewing angle performance in three directions by utilizing the technology of forming the mono-domain according to the 24th embodiment. In this structure, the protrusions 20A and 20B are disposed in such a fashion as to define two regions of the transverse direction in the same proportion and one region of the longitudinal orientation inside one pixel. The two regions of the transverse orientation in the same proportion are formed by so disposing the protrusions 20A and 20B as to deviate from one another by a half pitch as shown in FIGS. 100A and 100B, while one region of the longitudinal orientation is formed by disposing the protrusions 20A and 20B adjacent to one another as shown in FIGS. 103A and 103B. This structure can accomplish a panel which has excellent viewing angle performance on the right and left sides and on the lower side but has lower viewing angle performance on the upper side.

The LCD such as of the 24th embodiment is used for a display which is installed at a high position so that a large number of people look it up from below, such as a display device disposed above a door of a train.

As shown in FIG. 85C, the LCD of the VA system which does not execute the orientation division and the LCD of the VA system which execute the orientation division by the protrusions or the like, the response speed from black to white and vice versa is superior to that of the TN mode, but the response speed between the intermediate gray-scale is not practically sufficient. The twenty-fifth embodiment solves this problem.

Figure 105A:
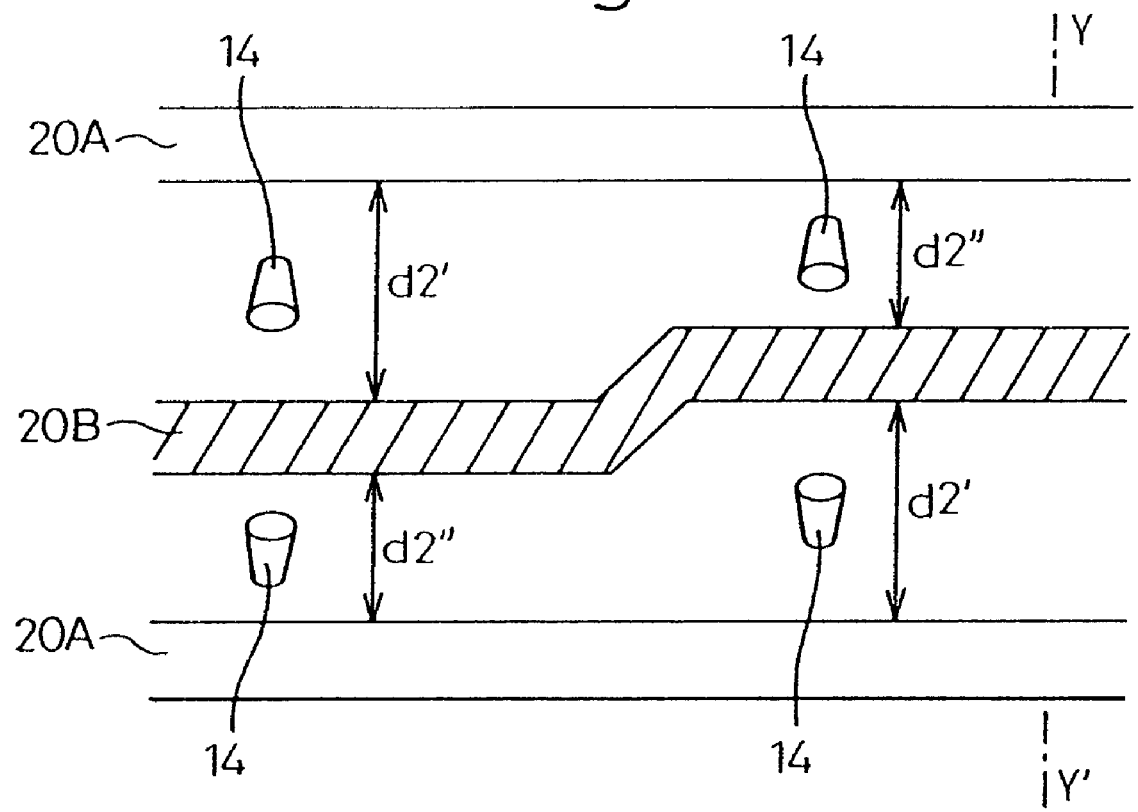
FIGS. 105A and 105B are diagrams showing a structure of a panel of a 25th embodiment.
Figure 105B:
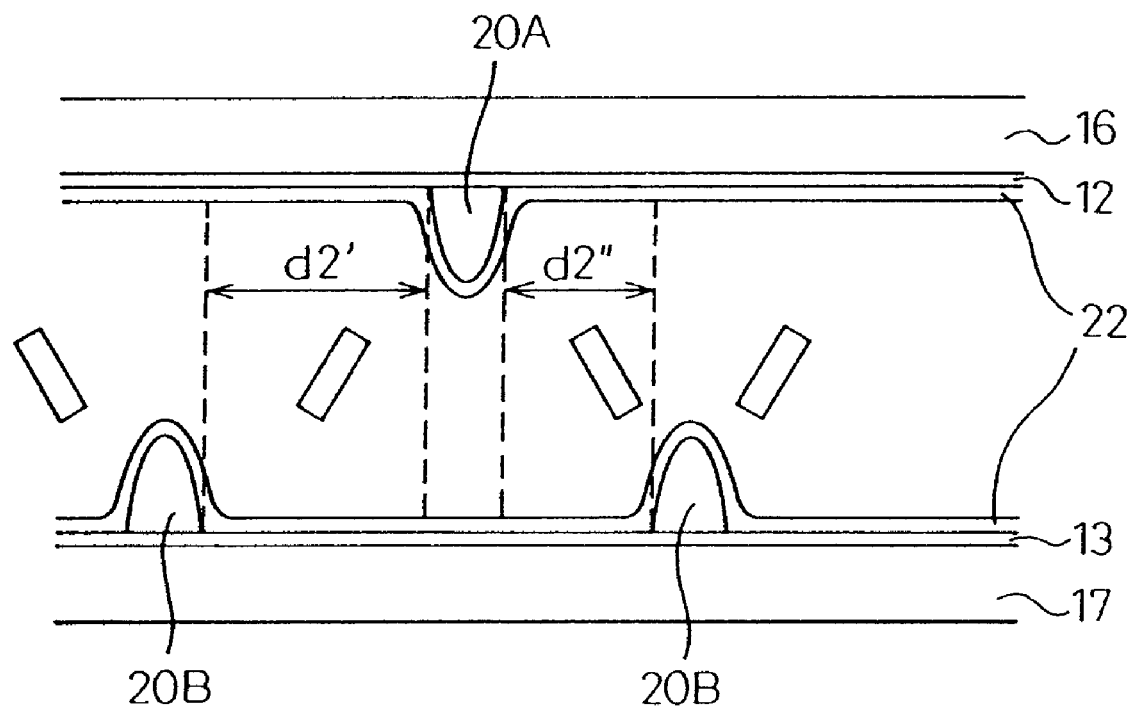

FIGS. 105A and 105B show the panel structure in the 25th embodiment. FIG. 105A shows the shape of the protrusion when viewed from the panel surface and FIG. 105B is a sectional view. As shown in these drawings, the position of the protrusion 20B is charged inside one pixel so as to define a portion having a different gap with the protrusion 20A. In consequence, the proportion of the domain oriented in two directions can be made equal and the viewing angle performance is symmetric. When the structure shown in the drawings is employed, the response speed between the intermediate gray-scale can be apparently improved. This principle will be explained with reference to FIGS. 106 to 109B.

Figure 106:
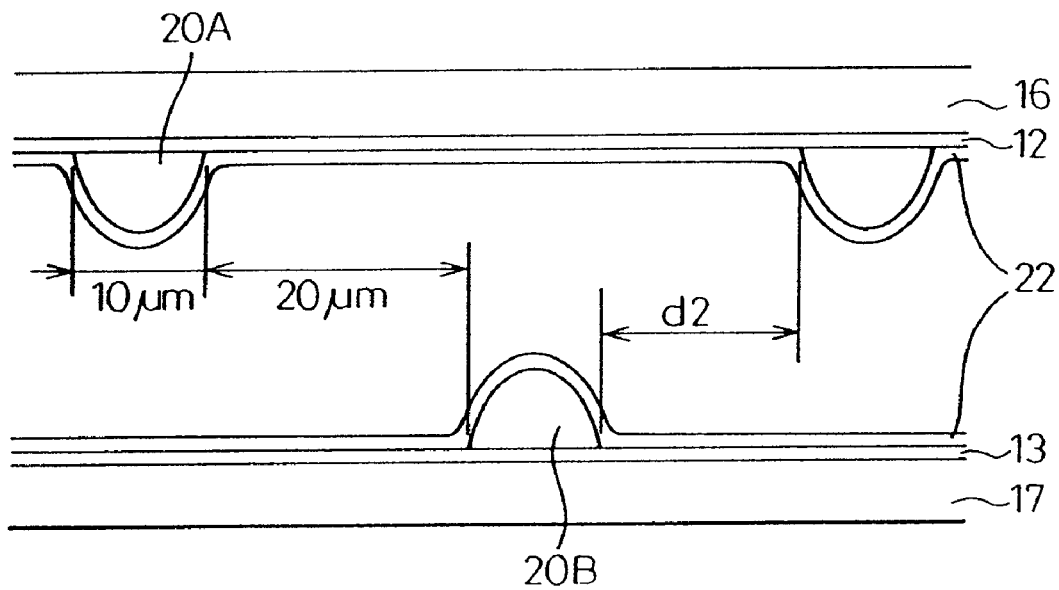
FIG. 106 is a diagram showing a structure of a panel in which a relationship of response time with respect to a gap length between protrusions is measured.

FIG. 106 shows the structure of the panel manufactured for measuring the changes of the response speed and the transmittance depending on the gap of the protrusions. The protrusions 20A and 20B have a height of 1.5 μm and a width of 10 μm, and the thickness of the liquid crystal layer is 3.5 μm. The response speed and the transmittance of the region of the gap d1 and the region of the gap d2 are measured by setting one of the gaps d1 of the protrusions to 10 μm, changing the other gap d2 and changing also the voltage to be applied across the electrodes between 0V and 3 V corresponding to the intermediate gray-scale.

Figure 107:
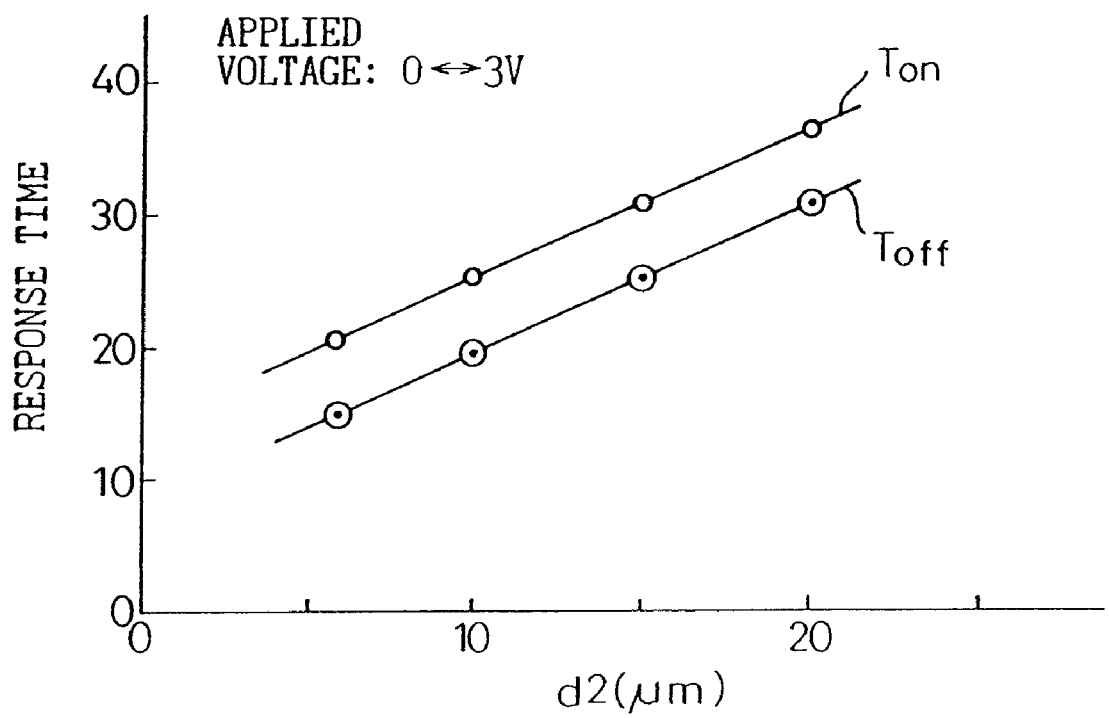
FIG. 107 is a diagram showing the relationship of response time with respect to the gap length.

FIG. 107 is a graph showing the result of the response speed measured in the way described above. This graph corresponds to the one obtained by extracting the object portion shown in FIGS. 20A and 20B. As can be seen clearly from the graph, the response time drops as the gap d2 becomes smaller.

Figure 108A:
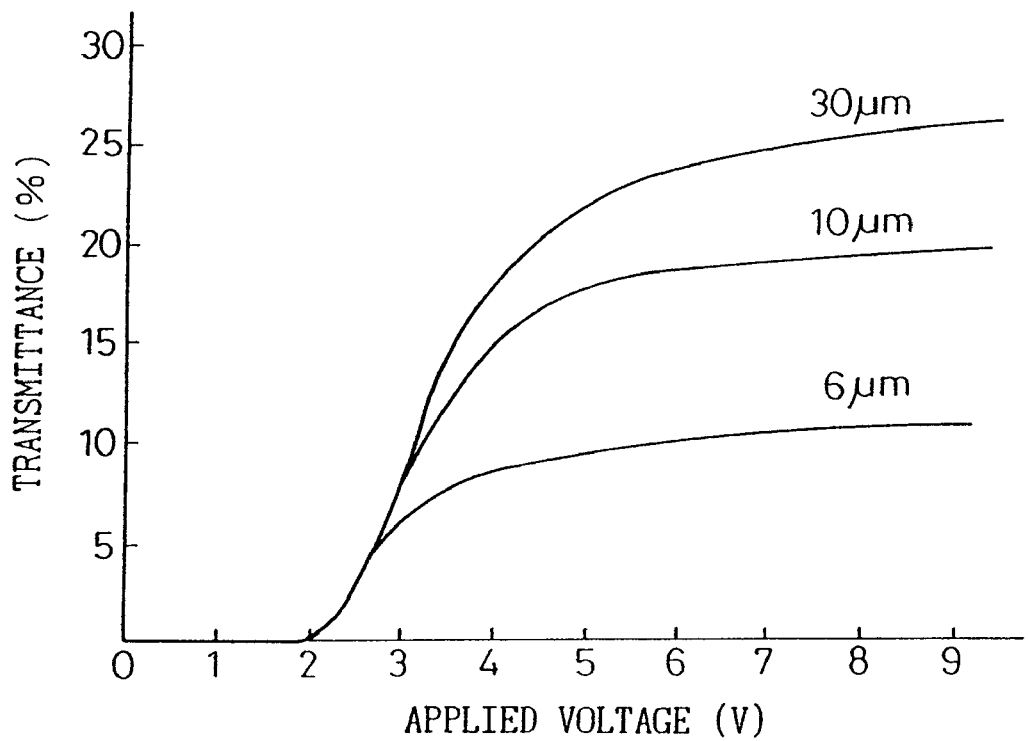
FIGS. 108A and 108B are diagrams showing a relationship of a transmittance with respect to a gap between protrusions.
Figure 108B:
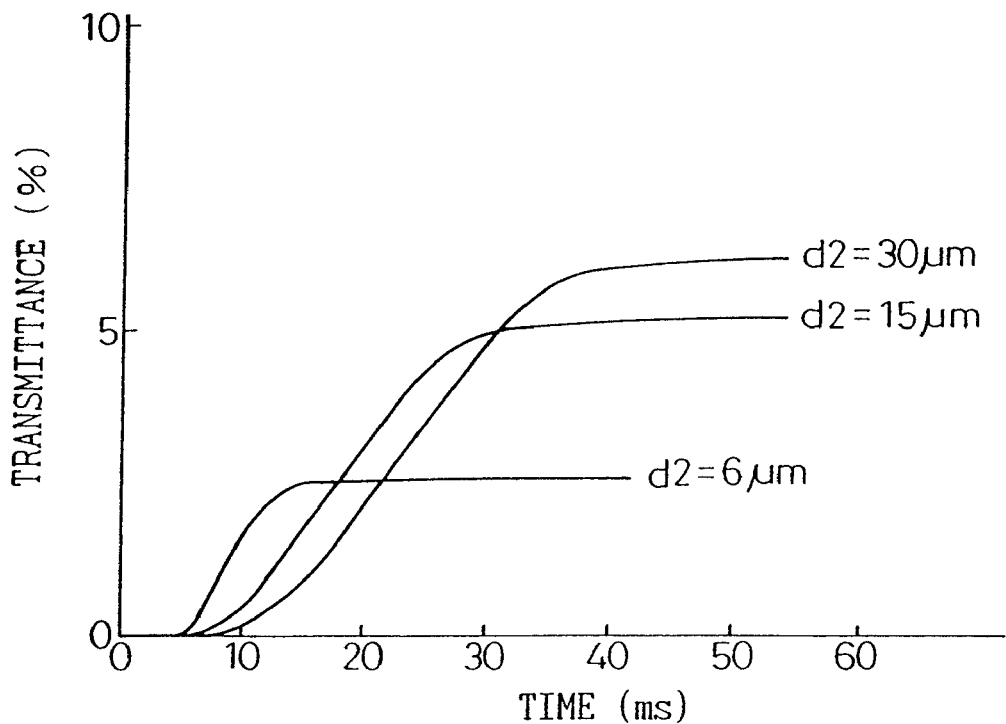

FIG. 108A shows the change of the transmittance when the applied voltage is changed, by using the gap d2 as a parameter. FIG. 108B shows the change of the transmittance when the voltage is changed from 0V to 3V by using the gap d2 as a parameter. It can be seen from FIGS. 108A and 108B that the response speed of the intermediate gradation can be drastically improved by decreasing the gap d2 of the protrusions. However, the maximum transmittance drops when the gap d2 of the protrusions is decreased.

Figure 109A:
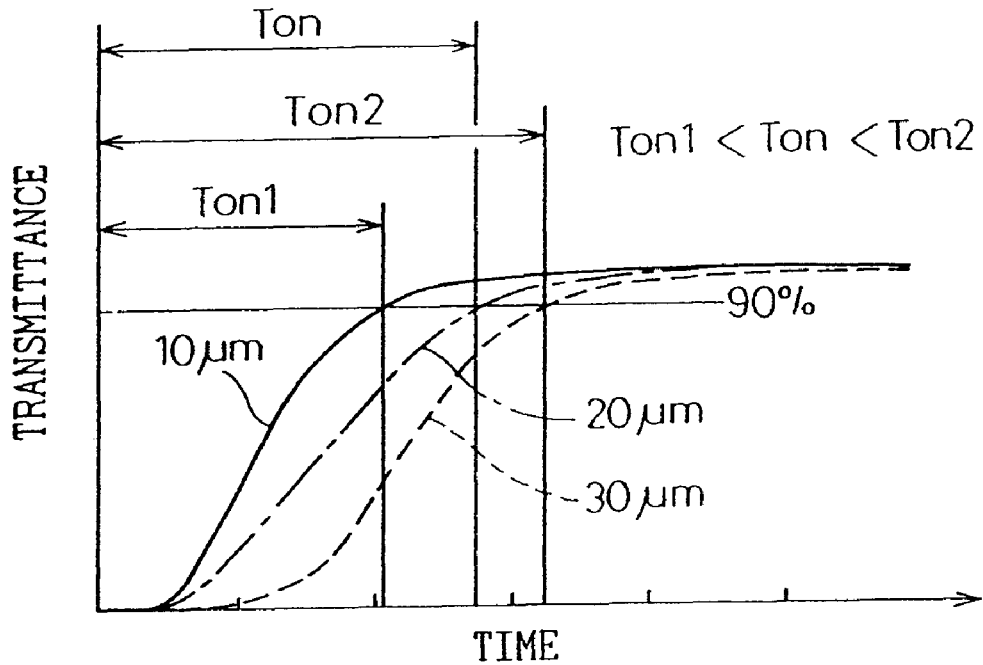
FIGS. 109A and 109B are diagrams showing an operational principle of the 25th embodiment.
Figure 109B:
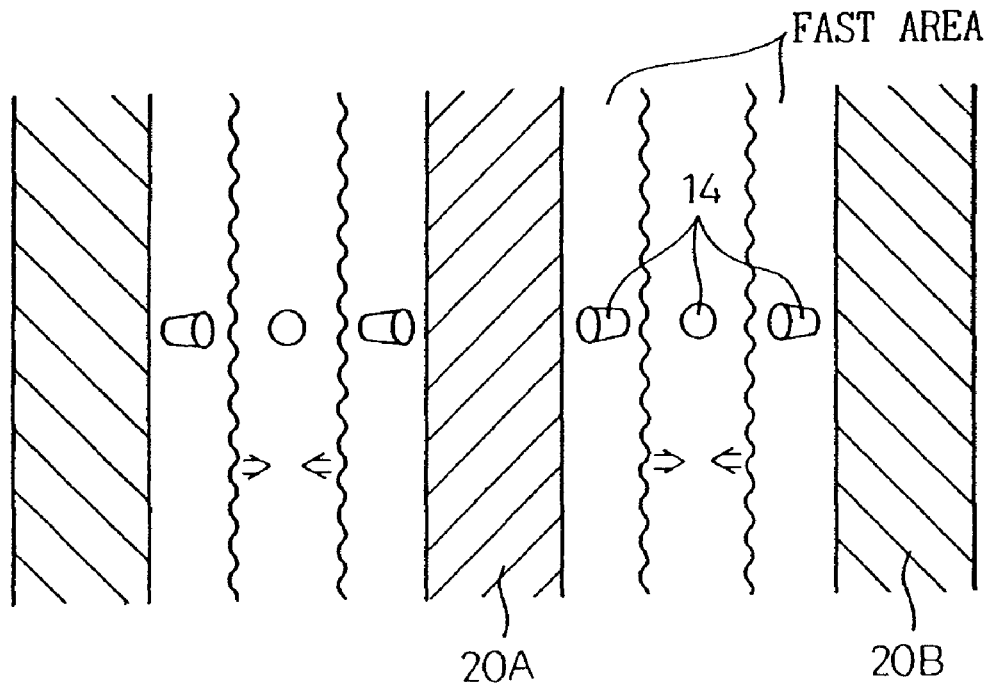

FIG. 109A is a graph showing the normalized time change of the transmittance at each gap d2, and FIG. 109B explains the orientation change of the liquid crystal. Assuming that the time before the transmittance reaches 90% of the maximum transmittance is an ON response time, the ON response time when d2 is 10 μm is Ton 1, the ON response time when d2 is 20 μm is Ton 2 and the ON response time when d2 is 30 μm is Ton 3, they have a relationship of Ton 1<Ton 2<Ton 3.

The reason why such a difference occurs is because only the liquid crystals in the proximity of the protrusion are oriented perpendicularly to the slope of the protrusion and the liquid crystals away from the protrusion are oriented perpendicularly to the electrode when the voltage is not applied, as shown in FIG. 109B. When the voltage is applied, the liquid crystal is inclined, and the liquid crystal can take the tilt angle of up to 360 degrees with respect to the axis perpendicular to the electrode. The liquid crystal in the proximity of the protrusion is oriented when the voltage is not applied, and the liquid crystal between the protrusions is oriented in such a fashion as to extend along the former liquid crystal as the trigger. In this way is formed the domain in which the liquid crystals are oriented in the same direction. Consequently, the closer to the liquid crystal to the protrusion, the more quickly it is oriented.

As described above, the response time between black and white is sufficiently short in the existing VA system LCDs and it is the response time between the intermediate gray-scale that becomes the problem. In the case of the structure shown in FIGS. 105A and 105B, the transmittance in the regions having a narrow gap d2" changes within a short time whereas the transmittance in the regions having a broad gap d2' changes gradually. The regions of the gap d2" are narrower than the regions of the gap d2' and have a smaller contribution to the transmittance, but because the human eyes have logarithmic characteristics, the human eyes catch the change as a relatively large change when the transmittance in the regions of the small gap d2" changes a little. Therefore, if the transmittance of the regions having a small gap d2" changes within a short time, this change is caught as the drastic change as a whole.

As described above, the panel according to the 25th embodiment can apparently improve the response speed between the intermediate gray-scale without lowering the transmittance.

FIG. 110 shows the panel structure of the 26th embodiment. As shown in the drawing, the protrusions 20A and 20B are disposed in an equal pitch on the substrates 16 and 17 and the electrodes 12 and 13 are formed on the protrusions, respectively, in this 26th embodiment. However, the electrodes are not formed on one of the slopes of the protrusions 20A and 20B, and a vertical alignment film is further formed. The protrusions 20A and 20B are arranged in such a fashion that the slopes on which the electrode is formed and the slopes on which the electrode is not formed are adjacent to one another. In the region between the slopes on which the electrodes are not formed, the liquid crystals are oriented perpendicularly to the slopes, and the orientation direction is decided consequently. The electric field in the liquid crystal layer is represented by broken lines in the drawing. Since the liquid crystals are oriented along this electric field, the orientation direction due to the electric field in the proximity of the slopes, on which the electrodes are not formed, coincides with the orientation direction due to the slopes.

In the region between the slopes on which the electrode is formed, on the other hand, the liquid crystal in the proximity of the slopes is oriented perpendicularly to the slopes, but the orientation direction of the electric field in this region is different from the orientation direction due to the slopes. Therefore, the liquid crystal in this region is oriented along the electric field with the exception of the portions near the slopes when the voltage is applied. Consequently, the orientation directions in the two regions become equal to each other, and the mono-domain orientation can be obtained.

Figure 111:
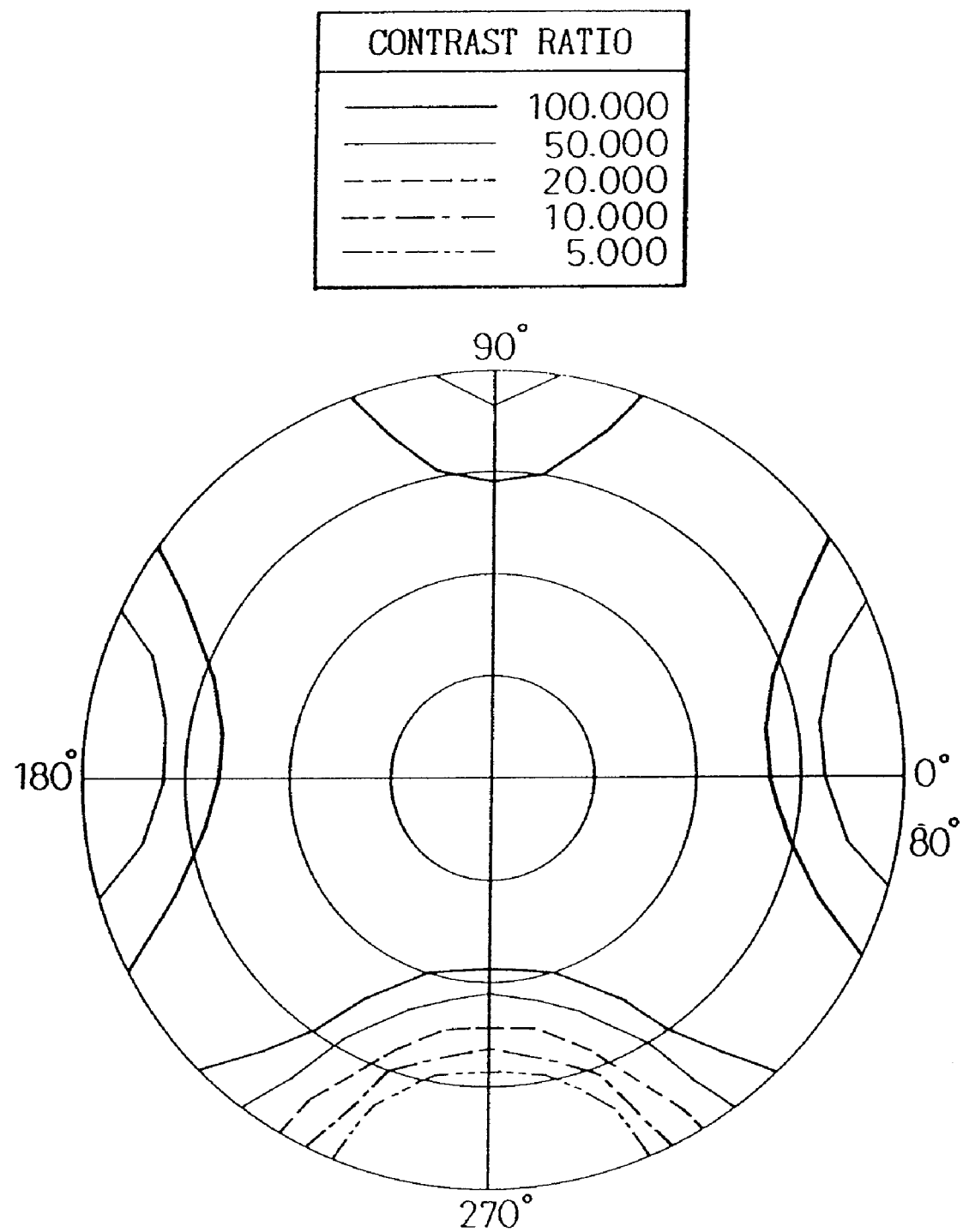
FIG. 111 is a diagram showing a viewing angle characteristic of the panel of the 26th embodiment.

FIG. 111 shows the viewing angle performance with respect to contrast when a phase difference film having negative dielectric constant anisotropy and having the same retardation as that of the liquid crystal panel is superposed with the panel of the 26th embodiment. A high contrast can be obtained over a broad range of viewing angles. Incidentally, when this panel is assembled into the protrusion type projector, the contrast ratio is at least 300. Incidentally, the contrast ratio obtained when the ordinary TN mode LCD is assembled into the protrusion type projector is about 100, and it can be appreciated that the contrast ratio can be drastically improved.

In the case where a liquid crystal display device having a configuration with a protrusion pattern is driven as in the first embodiment, the display quality is seen to deteriorate in the neighborhood of the bus line (gate bus line or data bus line) in the pixel. This is due to the undesirable minute region (domain) formed in the neighborhood of the bus line and the resulting disturbance of liquid crystal orientation and reduced response rate. The problem thus is posed of a reduced viewing angle characteristic and a reduced color characteristic in half tone. This problem is solved in a 27th Embodiment.

Figure 112:
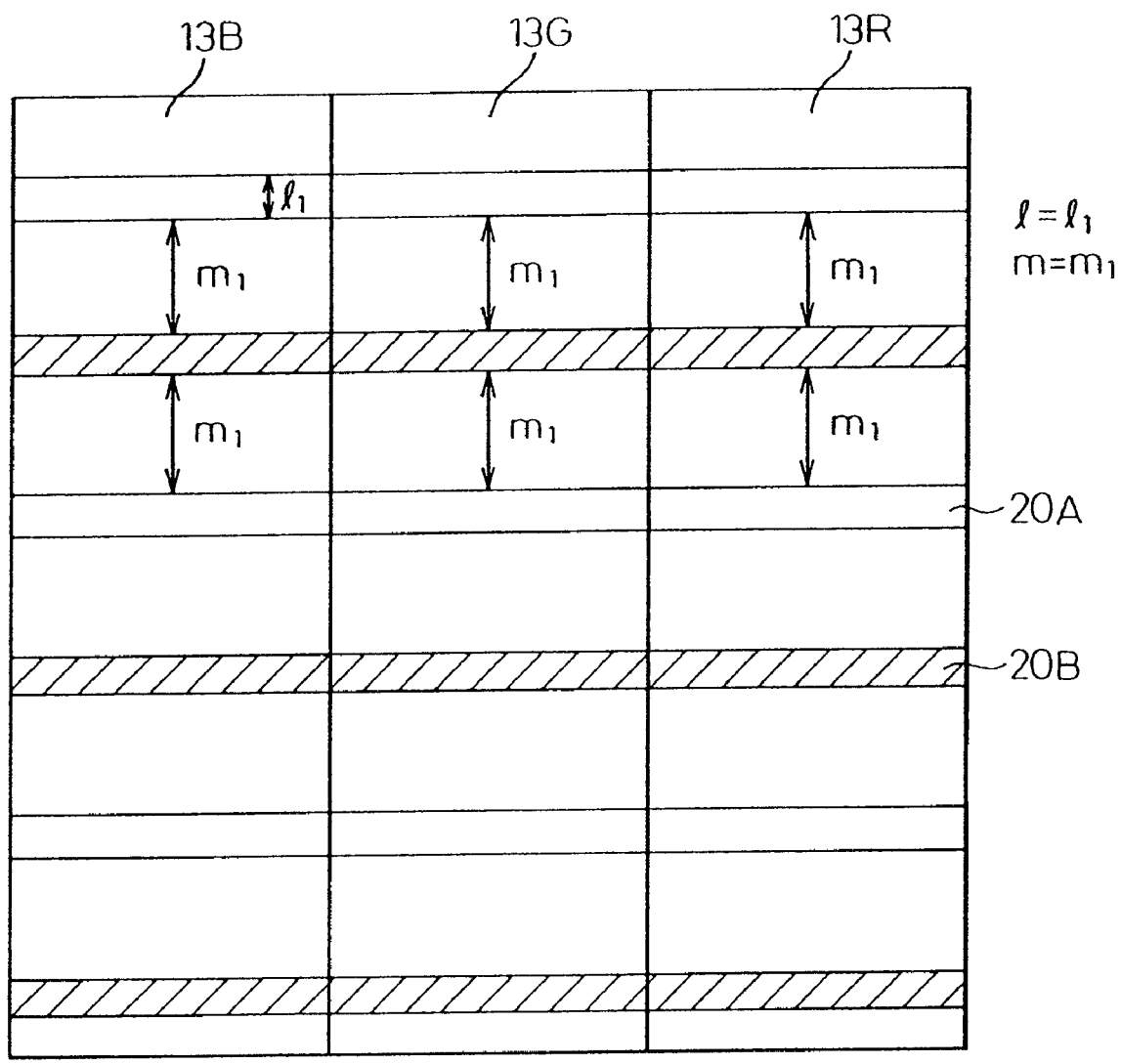
FIG. 112 is a diagram showing a pattern of protrusions of normal types.

FIG. 112 is a diagram showing an example pattern for repeating the linear protrusions according to the embodiments as set above. The protrusion pattern described above has a plurality of protrusions of a predetermined width and a predetermined height repeated at predetermined pitches. In FIG. 112, therefore, the width 1 and the interval m assume of the protrusion assume the predetermined values of l1 and m1 respectively. In the shown example, the width of the protrusion formed on one substrate is different from that of the protrusion formed on the other substrate. The protrusions formed on a substrate, however, have a predetermined width 1. This is also the case with the protrusion height h.

Figure 113:
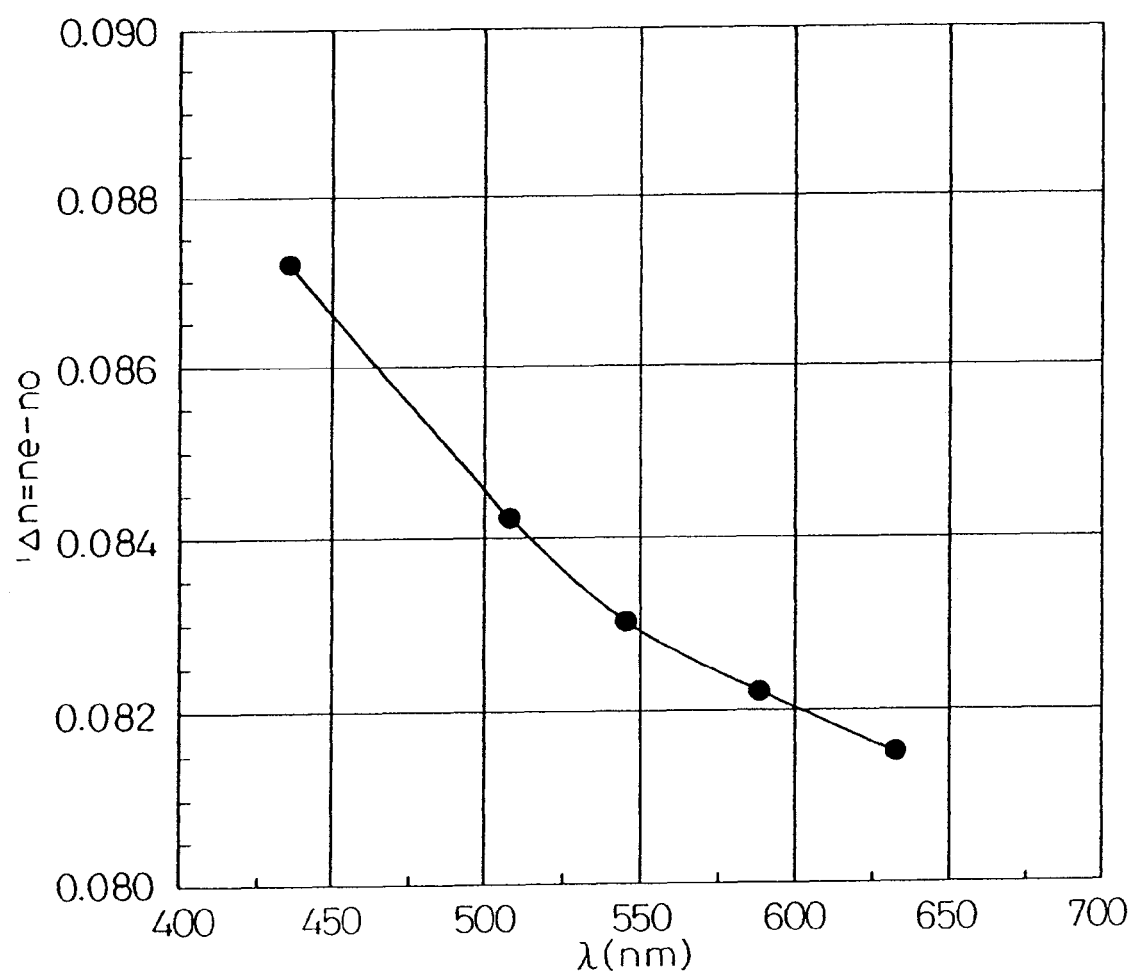
FIG. 113 is a diagram showing wavelength dispersion characteristic of the optical anisotropy of the liquid crystal.

FIG. 113 is a diagram showing the wavelength dispersion characteristic of the optical anisotropy of the liquid crystal used. As shown, it is seen that the shorter the wavelength, the larger the retardation Δn. Thus, the retardation Δn increases in the order of blue (B) pixel, green (G) pixel and red (R) pixel, and different colors have different retardation Δn while passing through the liquid crystal layer. This difference is desirably as small as possible.

Figure 114:
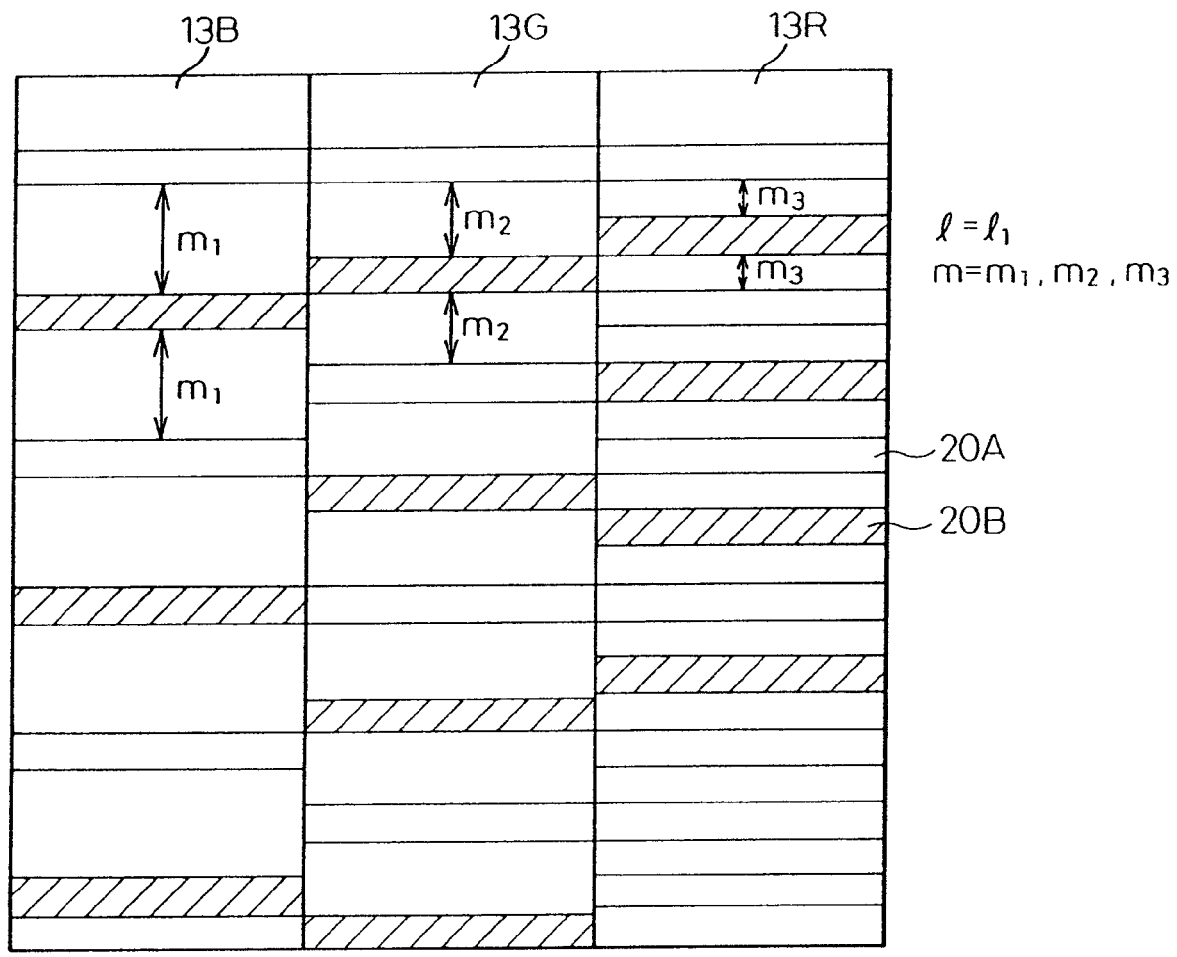
FIG. 114 is a diagram showing a pattern of protrusions of a 27th embodiment.

FIG. 114 is a diagram showing a protrusion pattern according to a 27th embodiment of the invention. In the 27th embodiment, the blue (B) pixel 13B, the green (G) pixel 13G and the red (R) pixel 13R each have the same protrusion width 1 but different protrusion intervals m. Specifically, the B pixel 13B has m1, the G pixel 13G m2 and the R pixel 13R m3 in such a relation that m1>m2>m3.

Figure 115:
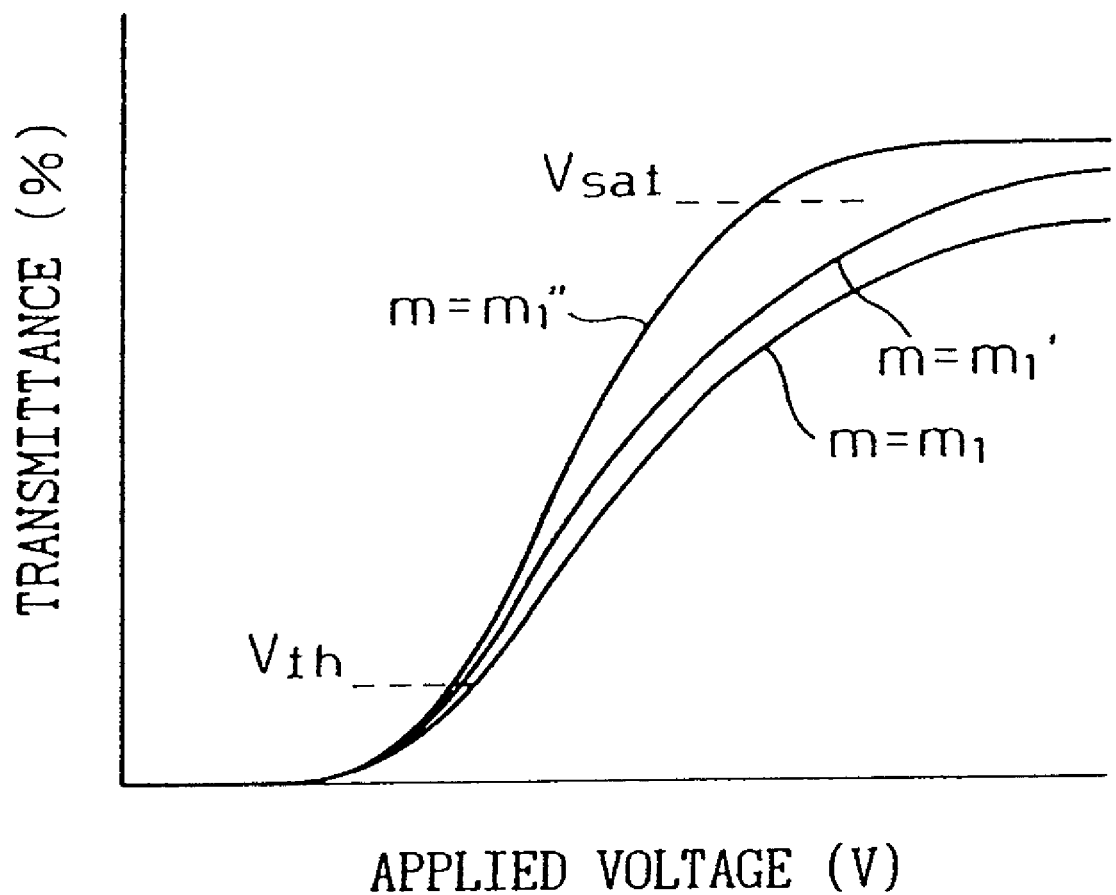
FIG. 115 is a diagram showing a relation between an applied voltage and transmittance.

The smaller the protrusion interval m, the larger the effect that the electric field vector has on the liquid crystalline molecules, thus making it more possible to alleviate the problem of the electric field vector at the time of drive. FIG. 115 is a diagram showing the relation between the applied voltage and the transmittance as measured while changing the protrusion interval. It is seen that the larger the interval m, the larger the numerical aperture, and hence the transmittance is improved. The wavelength dispersion characteristic of the optical anisotropy of the liquid crystal is as shown in FIG. 113. By changing the protrusion interval m for each color pixel as shown in FIG. 114, the difference of the retardation for a particular color can be reduced Δn while passing through the liquid crystal layer for an improved color characteristic.

Figure 116:
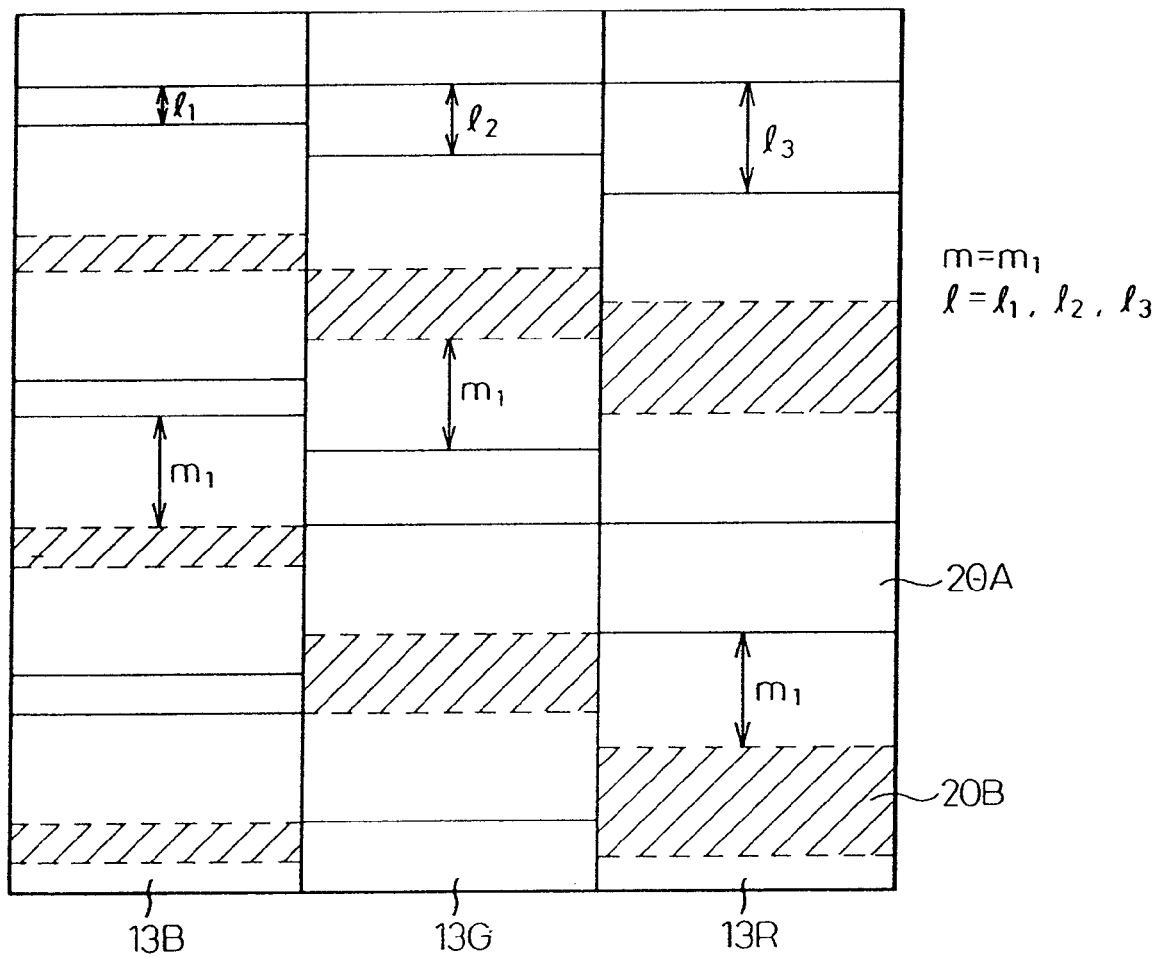
FIG. 116 is a diagram showing a pattern of protrusions of a 28th embodiment.

FIG. 116 is a diagram showing a protrusion pattern according to a 28th embodiment of the invention. In the seventh embodiment, the blue (B) pixel 13B, the green (G) pixel 13G and the red (R) pixel 13R have the same protrusion interval m but different protrusion widths 1. The effect is the same as that of the 27th embodiment.

Figure 117:
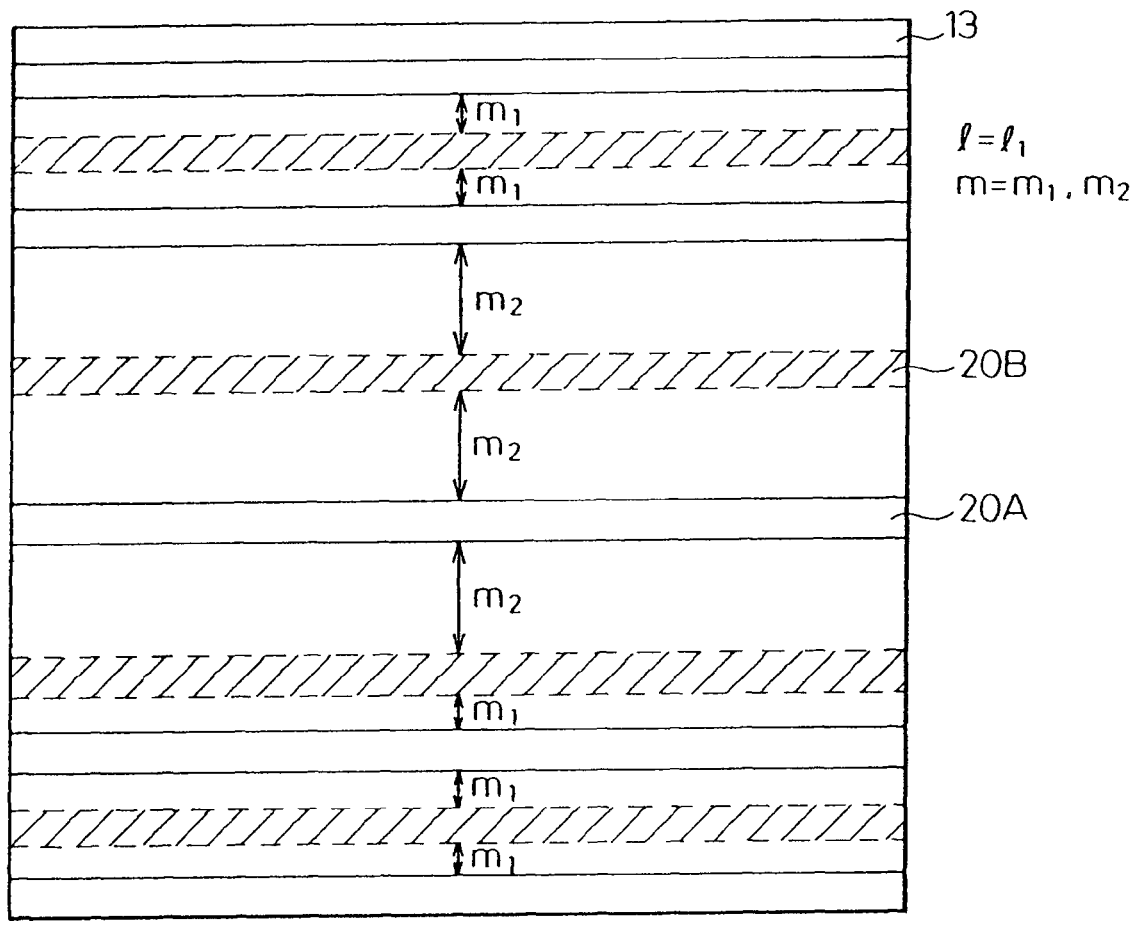
FIG. 117 is a diagram showing a pattern of protrusions of a 29th embodiment.

FIG. 117 is a diagram showing a protrusion pattern according to an 29th embodiment of the invention. In the 29th embodiment, the protrusion interval m in each pixel is set to a small value m1 in the upper and lower regions near to the gate bus line and a large value m2 at the central region. In the neighborhood of a bus line such as the gate bus line or the data bus line, a domain may occur at the time of driving and the liquid crystalline molecules fall into a state not suitable for display due to the electrical field vector, thereby deteriorating the display quality. According too the eighth embodiment, the protrusion interval is narrowed in the region near to the gate bus line thereby to make it difficult for the gate bus line to be affected by the electrical vector. As a result, the generation of an undesirable domain is suppressed for an improved display quality. However, a narrower protrusion interval reduces the numerical aperture accordingly and darkens the display. From the viewpoint of numerical aperture, therefore, a larger protrusion interval is recommended. The protrusion pattern according to the eighth embodiment can minimize the reduction in numerical aperture and reduce the effect of the electrical field vector generated by the gate bus line.

Figure 118:
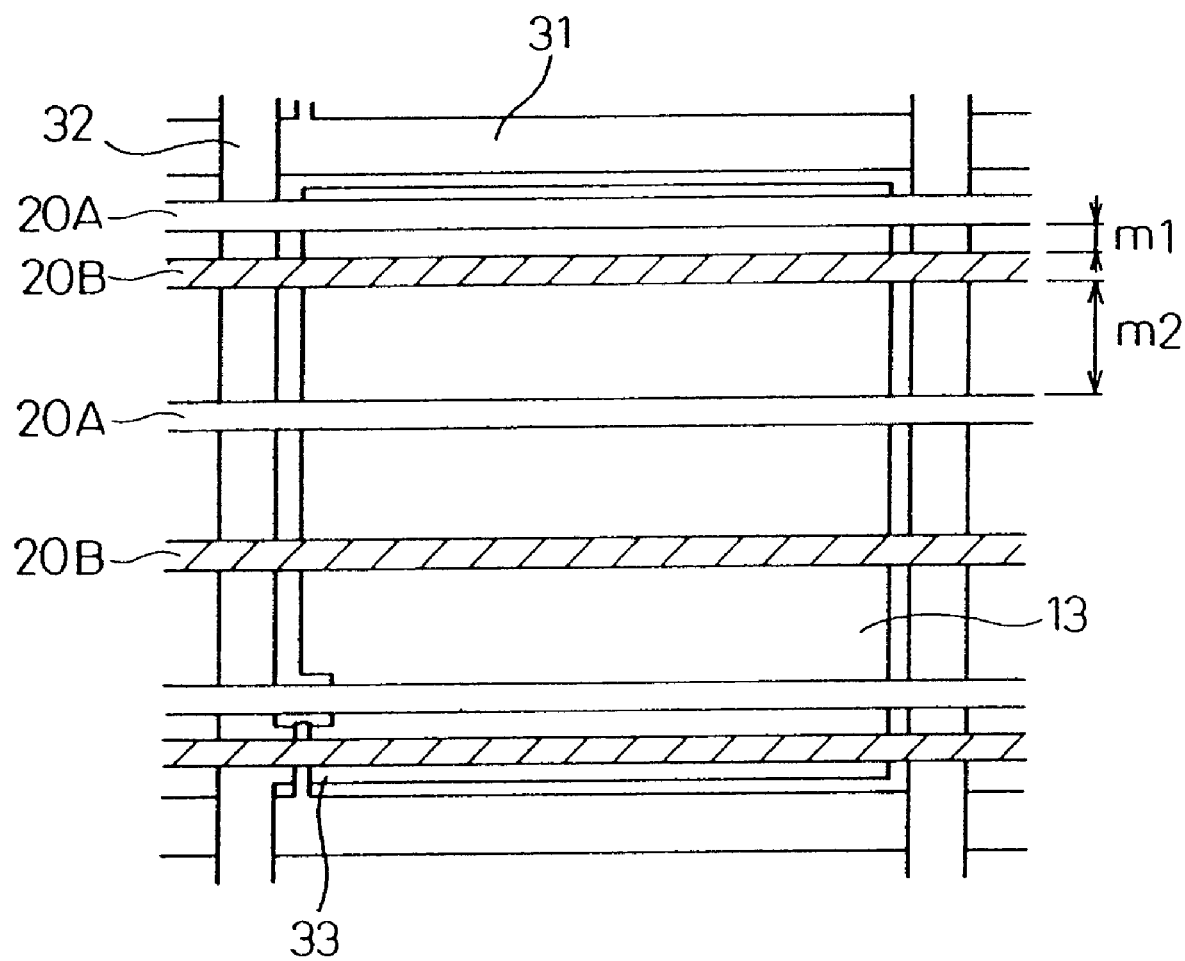
FIG. 118 is a diagram showing a pixel structure of the 29th embodiment.

FIG. 118 is a diagram showing the pixel structure in the case where the protrusion pattern according to the 29th embodiment shown in FIG. 117 is actually realized.

Figure 119:
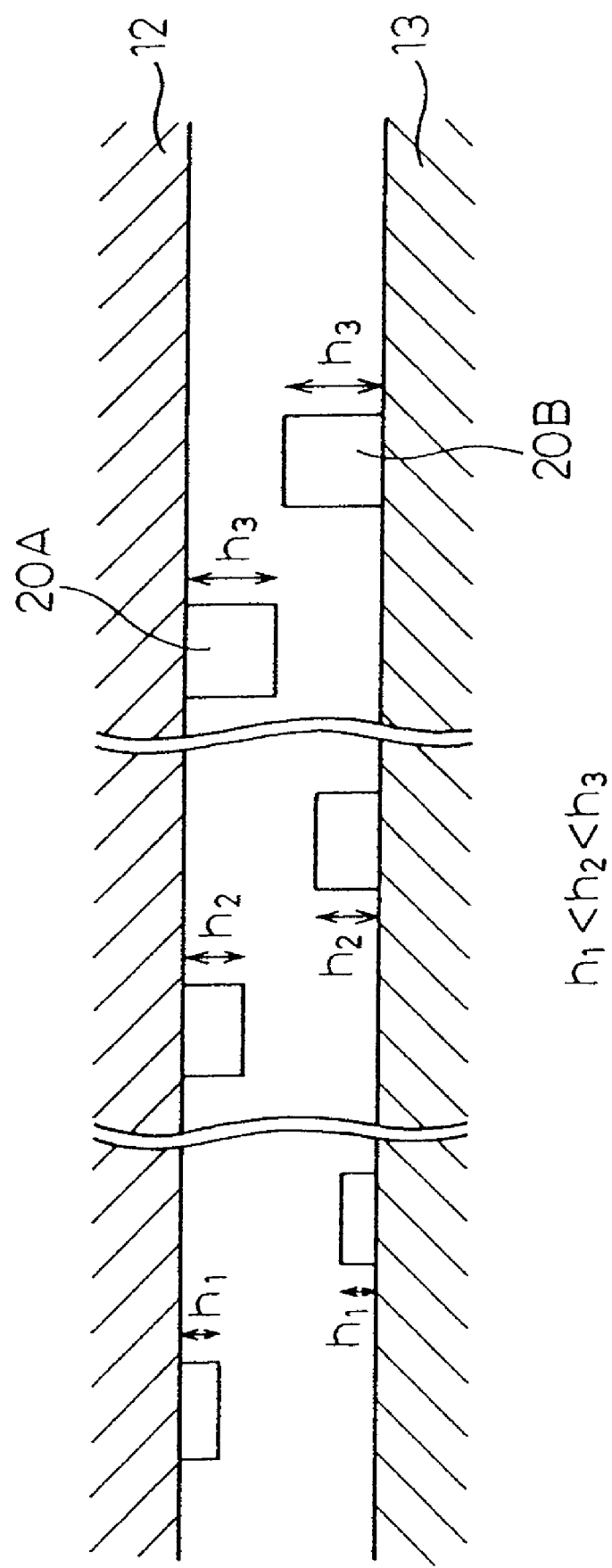

FIG. 119 is a diagram showing a protrusion arrangement according to a 30th embodiment. As shown in FIG. 119, in the 30th embodiment, the protrusion height is changed gradually.

Figure 120:
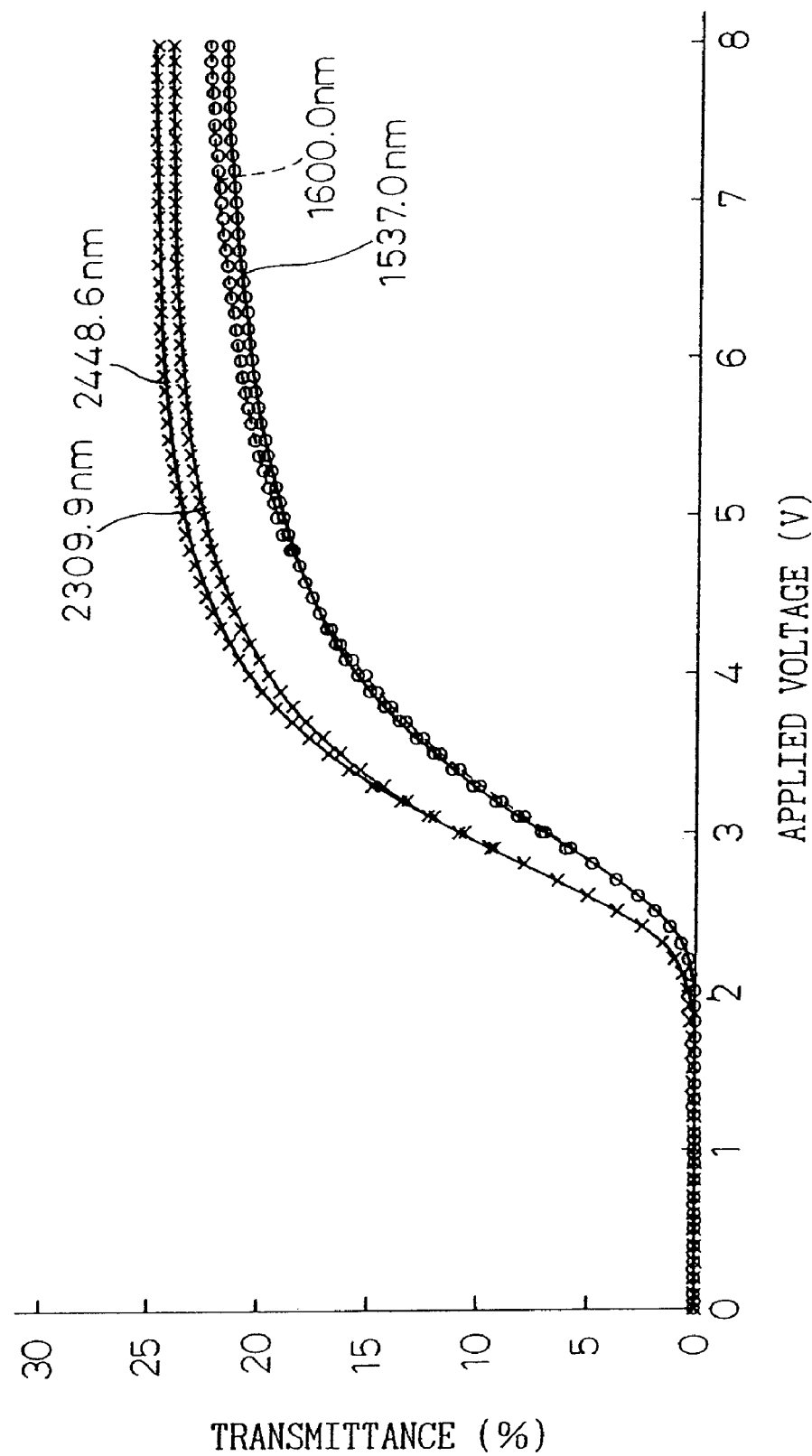
Figure 121:
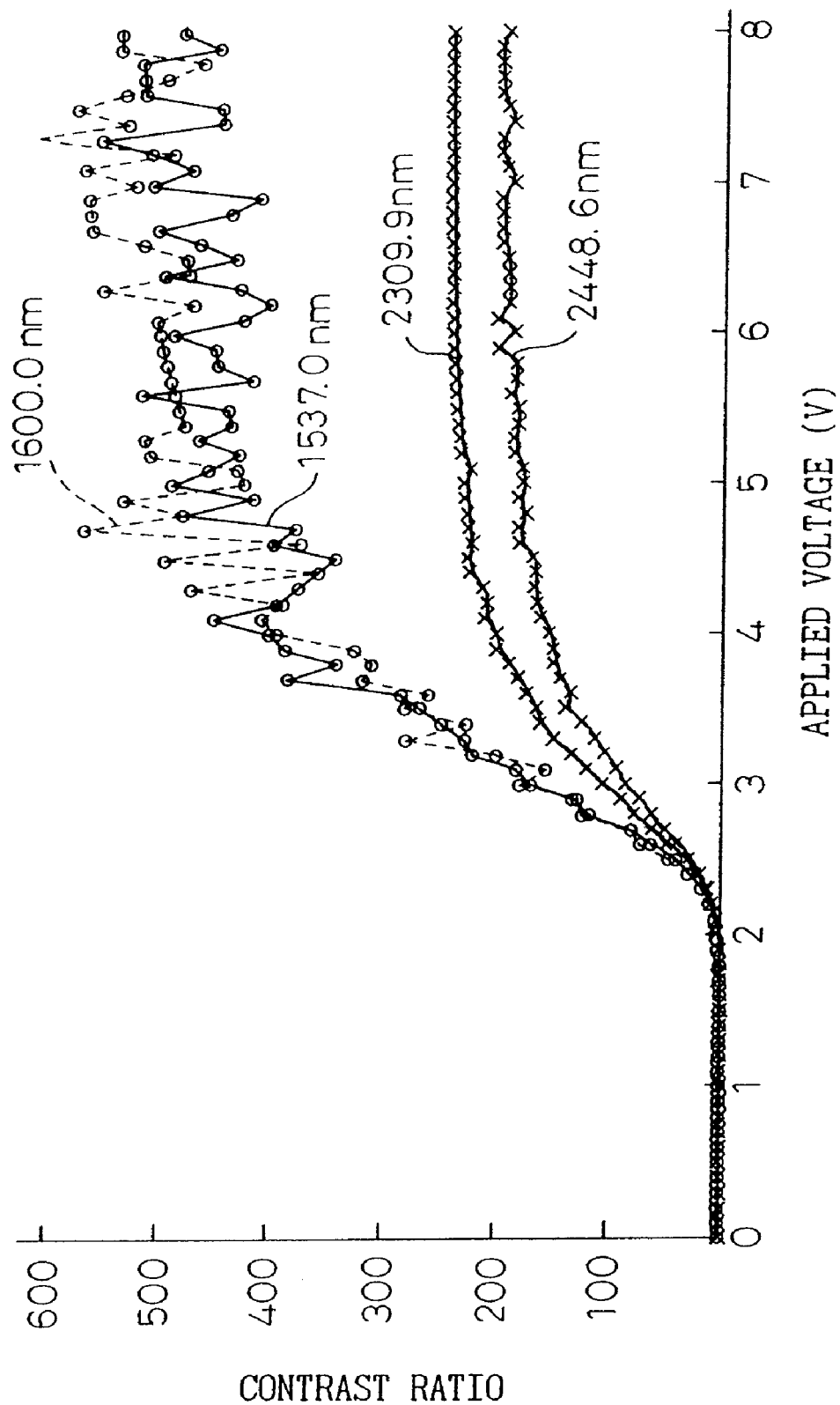
Figure 122:
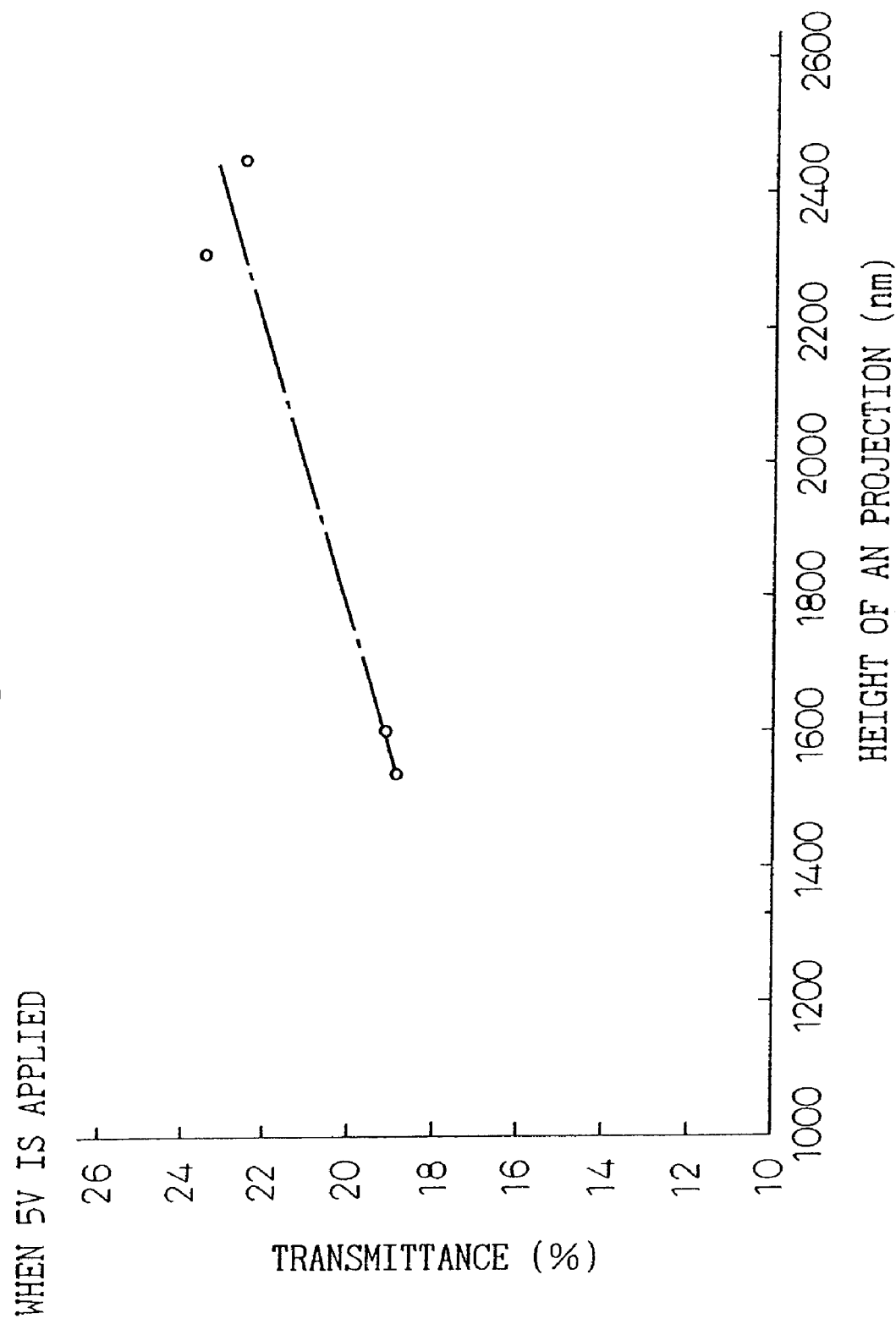
Figure 123:
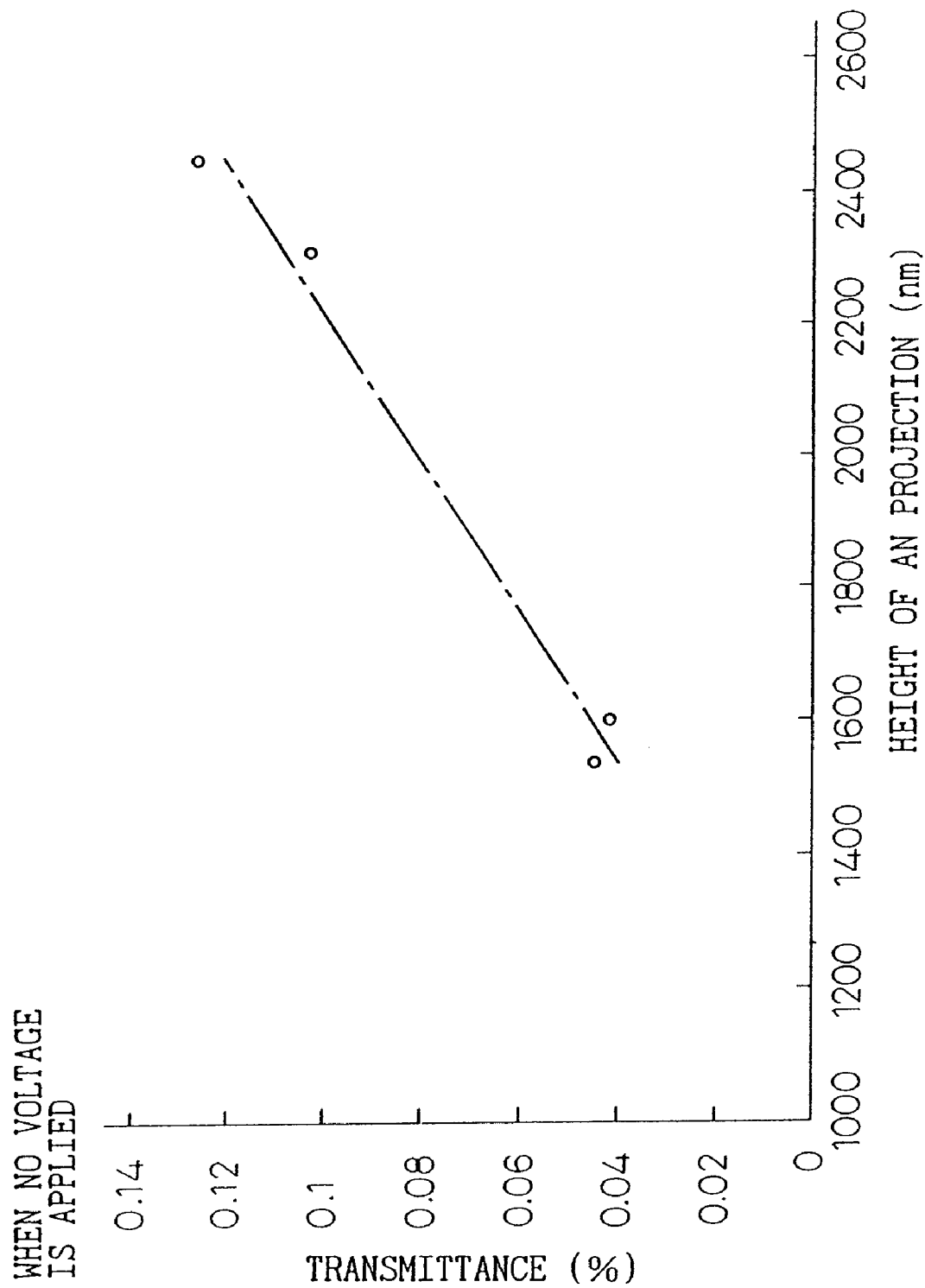

FIG. 120 is a diagram showing the change that the relation between the applied voltage and the transmittance undergoes when the protrusion height is changed, FIG. 121 the change that the relation between the applied voltage and the contrast undergoes when the protrusion height is changed, FIG. 122 the change of the transmittance in white level with respect to the protrusion height, and FIG. 123 the change of the transmittance in black level with respect to the protrusion height. These diagrams show the result of measuring the transmittance and the contrast in test equipment with the width and interval of the resist for forming the protrusion set to 7.5 μm and 15 μm, respectively, the cell thickness to about 3.5 μm, and the resist height to 1.537 nm, 1.600 nm, 2.3099 nm and 2.486 nm.

This measurement shows that the transmittance of white level (with 5 V applied) increases with the resist height. This is considered due to the fact that the protrusion playing an auxiliary role in tilting the liquid crystal is so large that the liquid crystal is positively fallen. The transmittance (leakage light) in black level (without any applied voltage) also increases with the protrusion height. This is not desirable as it works to deteriorate the black level. The contrast (ratio between white luminance and black luminance) decreases with the protrusion height. It is therefore desirable to use a masking material for the protrusion and not to increase the protrusion height excessively.

Any way, the orientation of the crystal liquid can be changed by changing the protrusion height, and therefore a superior display is made possible by changing the protrusion height for each color pixel and thus adjusting the color characteristic, or by setting the protrusion height appropriately in accordance with the distance from the bus line. For the R pixel, for example, the protrusion height is increased, and decreased for the G pixel and the B pixel in that order, or in each pixel, the protrusion height is increased in the neighborhood of the bus line and lowered at the central portion.

The inventor has confirmed that the screen display can be accomplished without any problem even when the protrusion height is increased to the same level as the cell thickness. As a result, the protrusion height is set to the same level as the cell thickness as shown in FIG. 124A, or protrusions are formed at the opposed positions on the two substrates as shown in FIG. 124B so that the sum of the heights of the two protrusions is the same as the cell thickness. In this way, the protrusion can play the role of a panel spacer.

Figure 125A:
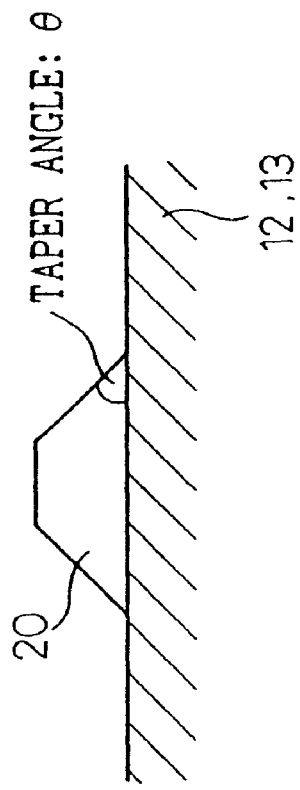
Figure 125B:
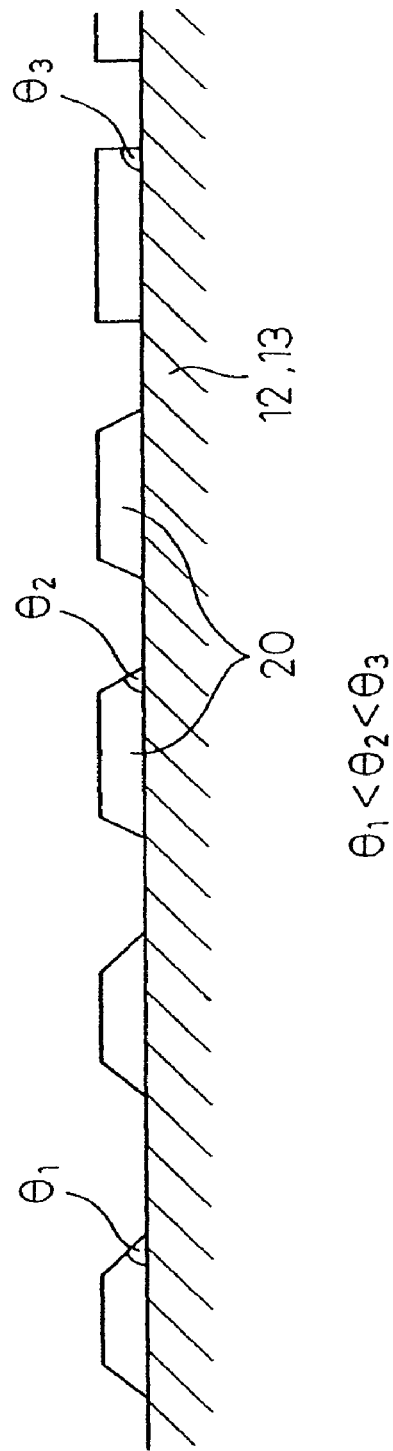

FIGS. 125A and 125B are diagrams showing a protrusion pattern according to a 31th embodiment. In this embodiment, as shown in FIG. 125A, the inclination of the side surfaces of the protrusion is defined by the angle θ that the side surface forms with the substrate (electrode). This angle is called the taper angle. According to the tenth embodiment, assume that the taper angle θ of the protrusion 20 can take several values as shown in FIG. 125B. Generally, the larger the taper angle θ, the more satisfactory the orientation into which the liquid crystalline molecules fall. By changing the taper angle θ, therefore, the orientation of the liquid crystal can be changed. Thus, a superior display can be made possible by changing the taper angle for each color pixel to adjust the color characteristic or by setting a proper taper angle θ in accordance with the distance from the bus line. For example, the taper angle θ is set large for the R pixel, and decreased for the G pixel and the B pixel in that order. Also, the taper angle θ is increased in the neighborhood of the bus line and decreased at the central portion in a pixel.

As described above with reference to the sixth to tenth embodiments, the orientation regulation force of the protrusion is changed by changing the protrusion interval, protrusion width, protrusion height or taper angle. It is therefore possible that these conditions are differentiated within a pixel or with different color pixels to partially differentiate the orientation regulation force of protrusions and thus to assure the viewing angle characteristic or response rate of the liquid crystal as near to the ideal ones as possible.

Retardation of the liquid crystal depends on the wavelength as shown in FIG. 113. Therefore, an embodiment of the liquid crystal panel which improves luminance of white display on the basis of this feature and accomplishes a high response speed for all the color pixels will be explained.

First, wavelength dependence of the VA system will be explained briefly. FIG. 126 shows the change of a twist angle of a liquid crystal layer due to the application of a voltage when a vertical orientation (VA) system liquid crystal display panel using a liquid crystal having negative dielectric anisotropy (n type liquid crystal) is provided with the twist angle. When no voltage is applied, the liquid crystal is oriented in a direction of 90 degrees on the surface of one of the substrates and in a direction of 0 degree on the surface of the other substrate, so that the twist of 90 degrees is attained. When the voltage is applied under this state, only the liquid crystalline molecules in the proximity of the surface of the substrate undergo twisting in such a manner as to follow the anchoring energy of the substrate surface, but twisting hardly occurs in other layers. Therefore, the mode does not substantially change to the rotatory polarization mode (TN mode) but to the birefringence mode. FIG. 127 shows the change of relative luminance (transmittance) to the change of the retardation Δnd (d; μm) in both the TN mode and the birefringence mode. As shown in the graph, the birefringence mode exhibits sharper transmittance characteristics to Δnd of the liquid crystal than the TN mode. As described above, the vertical orientation liquid crystal using the n type liquid crystal executes black display when no voltage is applied and white display when the voltage is applied, by using the polarizer plate as the cross-Nicol.

Figure 128:
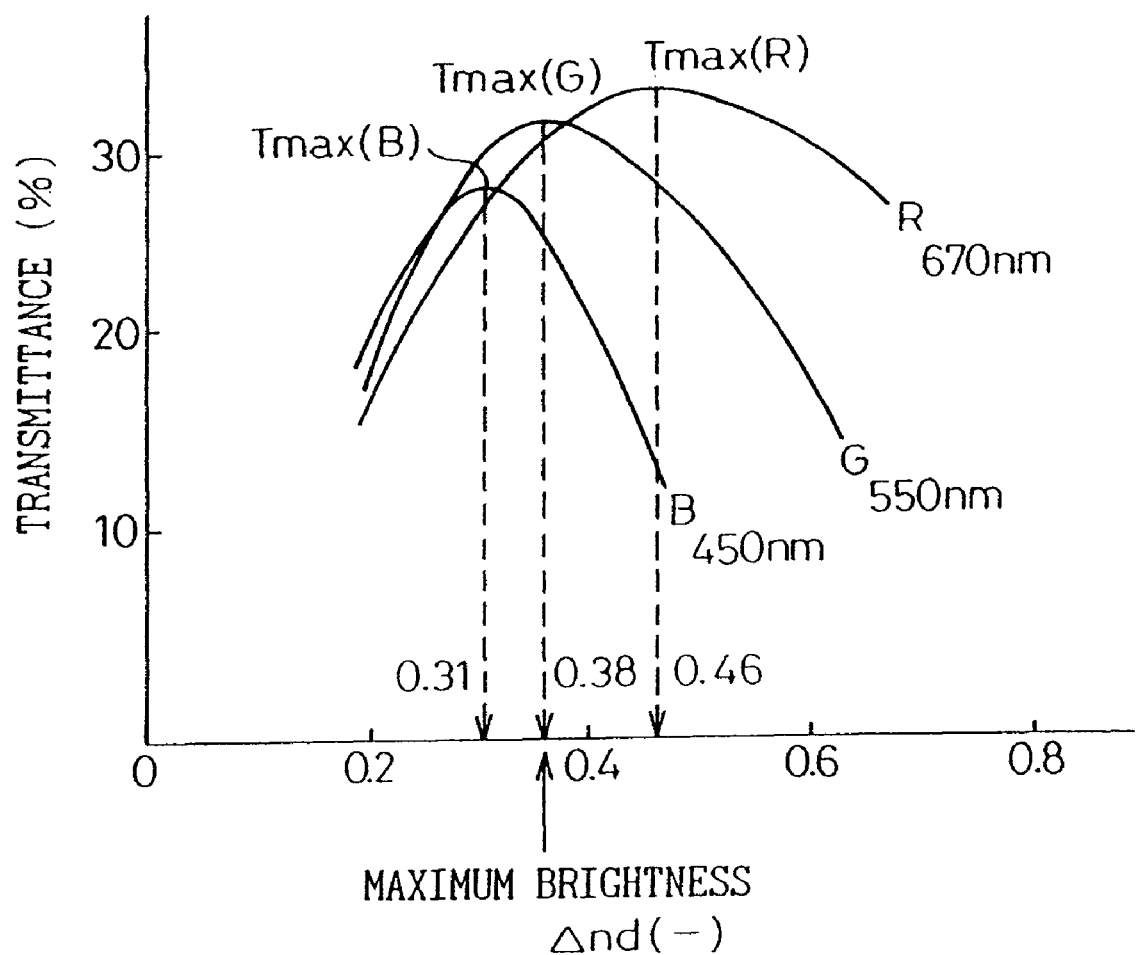

FIG. 128 shows the change of the transmittance to the change of Δnd at each wavelength (R: 670 nm, G: 550 nm, B: 450 nm). It can be appreciated from this graph that when the thickness of the liquid crystal layer is set to Δnd at which luminance in white display attains the maximum, that is, to Δnd at which the transmittance attains the maximum at the wavelength of 550 nm, the transmittance at 450 nm becomes excessively low. Therefore, the thickness of the liquid crystal layer is set to a value smaller than the thickness determined from maximum luminance so as to restrict coloring in white display. Therefore, luminance in white display is lower than that of the TN mode, and in order to obtain white luminance equivalent to that of the liquid crystal display panel of the TN mode, back-light luminance must be increased. To increase this back-light luminance, however, power consumption of illumination must be increased, and the range of application of the panel is limited. When the thickness of the liquid crystal layer is increased by laying stress on white luminance, the transmittance becomes excessively low at 450 nm in comparison with the TN mode, and the panel is colored yellow in white display.

To enlarge the viewing angle range, on the other hand, it has been customary to add a phase difference film, but when the thickness of the liquid crystal layer becomes great, the color change in the direction of the critical angle (transverse direction) becomes so great that even if the retardation value of the phase difference film is the same, the color difference becomes greater.

In the 32th embodiment, the thickness of the liquid crystal layer of each color pixel is individually set so that the transmittance becomes maximal when the driving voltage is applied. However, when the thickness of the liquid crystal layer is different, a difference occurs in the response speed and the color tone cannot be displayed correctly when the operation display is carried out. Therefore, when the thickness of the liquid crystal layer is set to a different value for each color pixel, means for making uniform the response speed of the liquid crystal becomes necessary.

Figure 129:
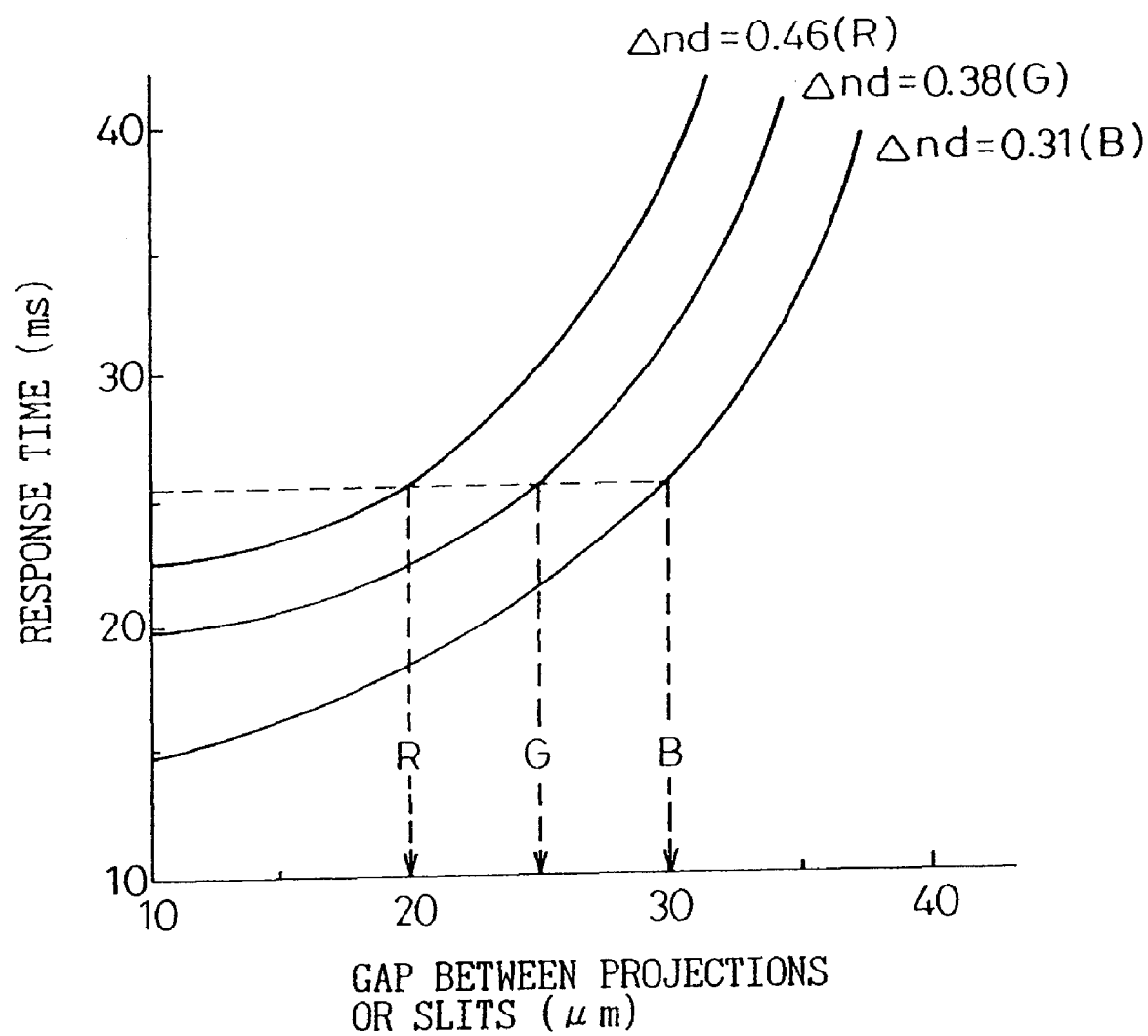

FIG. 129 shows the change of the liquid crystal response speed to the gap of the protrusions or the slits when Δnd of the liquid crystal layer is set so that the maximum transmittance can be obtained at the three kinds of wavelengths described above. The liquid crystal response speed becomes lower as the thickness of the liquid crystal layer becomes greater. In the VA system LCD panel which controls the orientation by using the protrusion, the liquid crystal response speed changes with the dielectric constant of the protrusion, the shape of the protrusion, the protrusion gap, and so forth. However, when the dielectric constant, the shape of the protrusion and its height are constant, the response speed becomes higher when the gap of the protrusions is narrower. It can be appreciated that to obtain the liquid crystal response speed of 25 ms, for example, in FIG. 129, the gap of the protrusions or the slits must be set to 20 μm for the R pixel, 25 μm for the G pixel and 30 μm for the B pixel.

Figure 130:
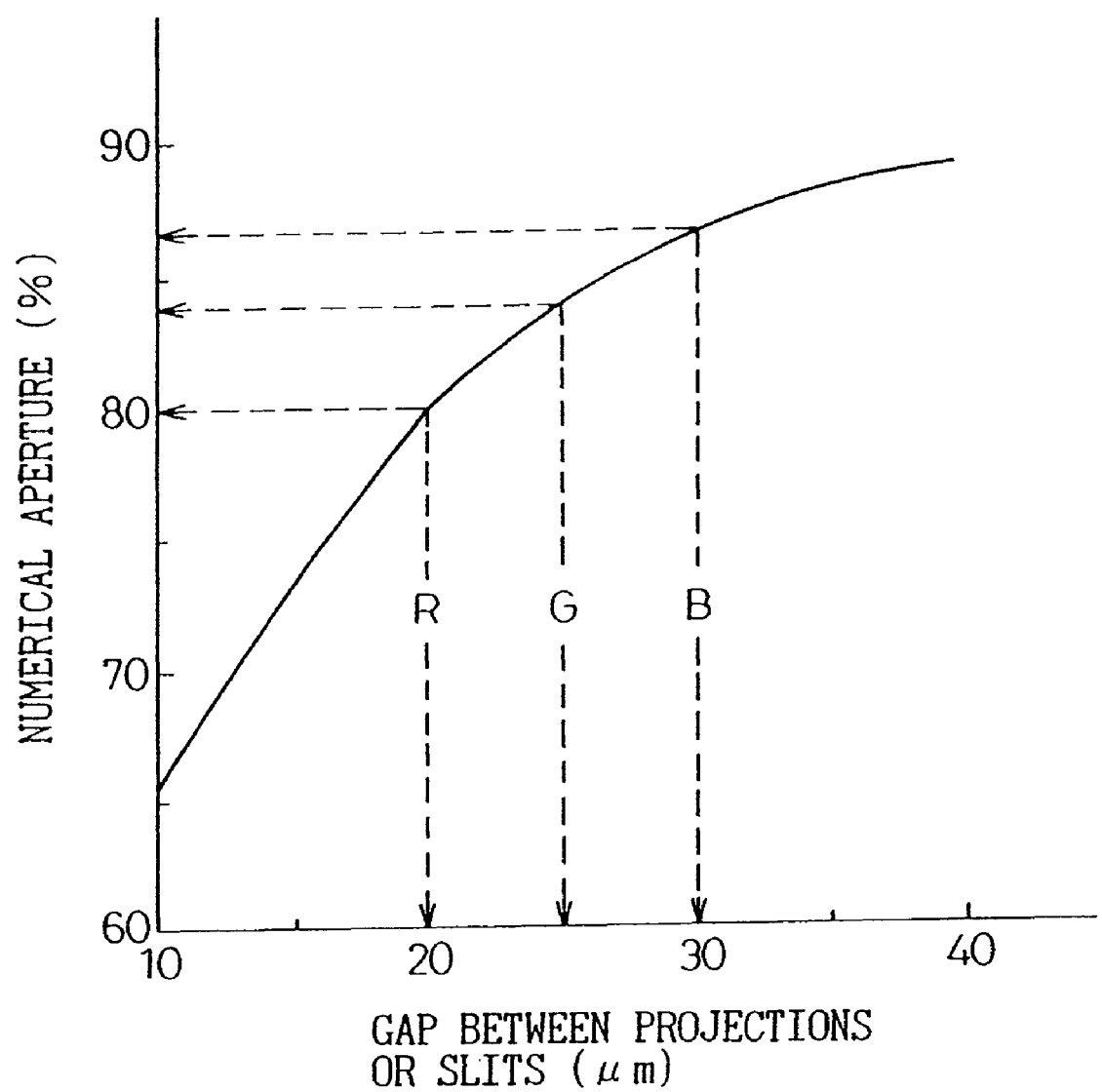

FIG. 130 shows the change of the aperture ratio with respect to the protrusion or slit gap. When the gap of the protrusions or the slits is set to 20 μm for the R pixel, 25 μm for the G pixel and 30 μm for the B pixel from FIG. 129 the transmittance is 80%, 83.3% and 85.7%, respectively, and the differences occur in the transmittance.

In view of this point the 32nd embodiment individually sets the thickness of the liquid crystal layer of each color pixel so that the transmittance attains the maximum when the driving voltage is applied, the response speed in each color pixel is rendered coincident by regulating the gap of the protrusions, and the area of each color pixel is changed so that the transmittance becomes coincident.

FIG. 131 shows the panel structure of the 32nd embodiment. As shown in this drawing, a structure 71 not having the R pixel portion but having the G pixel portion having a thickness of 0.55 μm and the B pixel portion having a thickness of 1.05 μm is provided to both substrates 16 and 17. The optimum condition is calculated for this thickness by simulation for the VA system birefringence mode using the n type liquid crystal. Further, the height of the protrusion 20A is set to 2.45 μm for the R pixel, 1.9 μm for the G pixel and 1.4 μm for the B pixel. Further, the gap of the protrusions is set to 20 μm for the R pixel, 25 μm for the G pixel and 30 μm for the B pixel. The area ratio of the B pixel: G pixel: R pixel is set to 1:1.03:1.07. In other words, the pixel areas are so set as to satisfy the relation R pixel>G pixel>B pixel.

The structure 71 uses an acrylic resin, and after a resist is applied to a thickness of 1.4 μm for the B pixel, a protrusion having a width of 5 μm is formed by photolithography. After a vertical alignment film is applied, a 3.6 μm spacer is sprayed to form a seal, and after bonding and curing of the seal, the liquid crystal is charged. In this way, the thickness of the liquid crystal layer is 5.7 μm for the R pixel, 4.6 μm for the G pixel and 3.6 μm for the B pixel.

FIG. 132 shows the panel structure of a modification of the 32th embodiment, wherein a protrusion is formed on the CF substrate 16 and a slit 21 is formed on the pixel electrode 13 of the TFT substrate 17. In this modification, an acrylic resin structure 71 not having the R pixel portion but having the G pixel portion having a thickness of 1.1 μm and the B pixel portion having a thickness of 2.1 μm is provided to the CF substrate 16. After a resist is applied to a thickness of 1.4 μm for the B pixel, a protrusion having a width of 5 μm is formed by photolithography. As a result, the height of the protrusion is 3.5 μm for the R pixel, 2.5 μm for the G pixel and 1.4 μm for the B pixel. The gap between the protrusion 20A and the slit is set to 20 μm for the R pixel, 25 μm for the G pixel and 30 μm for the B pixel. The area ratio of the B pixel: G pixel: R pixel is set to 1:1.03:1.07.

A biaxial phase difference film (retardation value: 320 nm) in match with nd of the liquid crystal layer of the G pixel is added to the panels of the 32th embodiment and to its modification produced in the manner described above, and the color difference is measured for each of the panel transmittance, the viewing angle and the critical angle direction (0 to 80 degrees). The results are shown in FIG. 249. By the way, the measurement results obtained by changing the thickness of the liquid crystal layer in the prior art example are also shown in FIG. 249 as the reference values.

As can be appreciated from FIG. 249 the transmittance (luminance) in front can be increased by increasing the thickness of the liquid crystal layer to improve the transmittance as represented by the prior art example 1, but because the length of the optical path gets elongated in the direction of the critical angle, the transmittance of the square wavelength fluctuates greatly and the color difference becomes great. In contrast, in the panels of the 32th embodiment and its modification, the gap of the protrusions or the slits is narrowed for the R and G pixels so as to make uniform the response speed of the liquid crystal, and the transmittance becomes lower than that of the prior art example 2 as the aperture ratio is lower. Nonetheless, because the thickness of each liquid crystal layer is set so that the transmittance attains the maximum when the driving current is applied (white display), the color difference in the direction of the critical angle becomes small.

The panels according to the 32th embodiment and its modification can brighten white luminance to the level equal to the TN mode without causing coloration of the panels in the broad range of the viewing angles. Because the liquid crystal response speed is made uniform so as to correspond to the thickness of each liquid crystal layer, display can be obtained with high color reproducibility even when dynamic image display is made.

Next, processes for forming protrusions will be described.

When protrusions are formed on electrodes 12, 13 of a CF substrate 16 and a TFT substrate 17, the electrodes of ITO film are formed, then, a resist is coated on the surfaces and is patterned with a photolithography. This process is easily carried out by using conventional techniques.

However, this process needs a step of creating the pattern of protrusions. If protrusions can be formed on the TFT substrate by utilizing the conventional process as it is, an increase in number of steps can be avoided. For forming insulating protrusions, it is thought that an insulating layer used in the conventional process is further patterned in order to leave the pattern of protrusions intact. For creating conducting protrusions, a conductive layer used in the conventional process is further patterned in order to leave the pattern of protrusions intact FIG. 133 is a diagram showing the structure of a TFT substrate in the 33th embodiment. The thirteenth 33th provides a structure in which an insulating layer used in the conventional process is utilized for creating insulating protrusions. In this structure, the ITO electrodes 13 are formed first. An insulating layer is formed on the ITO electrodes and portions of the insulating layer coincident with the ITO electrodes 13 are removed. At this time, portions of the insulting layer coincident with protrusions 68 are left intact. The gate electrodes 31 are then formed. An insulating layer is formed and portions of the insulating layer other than necessary portions are removed. At this time, if the protrusions are required to have a certain thickness, portions of the insulating layer coincident with the protrusions 68 are left intact. Thereafter, data bus lines and TFTs are formed in the same manner as a conventional process. In the drawing, reference numeral 41 denotes a drain (data bus line), 65 denotes a channel protective film, 66 denotes a wiring layer used to separate devices, and 67 denotes an operating layer for transistors. The ITO electrodes 13 and sources are linked by holes FIGS. 134A and 134B are diagrams showing examples of a pattern of protrusions manufactured according to the process described in conjunction with the 33th embodiment. FIG. 134A shows linear and parallel protrusions used to divide an orientation-divided domain into two regions, and FIG. 134B shows zigzag protrusions used to divide an orientation-divided domain into four regions. In the drawings, reference numerals 68 denotes a protrusion, and 69 denotes a pixel.

FIG. 135 is a diagram showing the structure of a panel of the 34th embodiment. The 34th embodiment provides a structure in which a conductive layer used in the conventional process is utilized for forming conducting protrusions. In this structure, first, a TFT light-interceptive metallic layer 70 for intercepting light from TFTs is formed, an insulating layer is formed on the metallic layer 70, and ITO electrodes are formed thereon. An insulating layer is formed further thereon, data bus lines and TFTs are then formed, and an insulating layer is formed further thereon. A layer of gate electrodes 31 is then formed. The insulating layer is removed except portions thereof coincident with the gate electrodes. At this time, portions of the insulating layer coincident with the protrusions 20B are left intact FIGS. 136A and 136B show examples of a pattern of protrusions manufactured as described in conjunction with the 34th embodiment. FIG. 136A shows linear and parallel protrusions used to divide an orientation-divided domain into two regions, and FIG. 136B shows zigzag protrusions used to divide an orientation-divided domain into four regions. In the drawings, reference numeral 20B denotes a protrusion. Reference numeral 35 denotes a CS electrode. The CS electrodes 35 are extending along the edges of pixel electrodes so as to work as black matrices, but are separated from the protrusions 20B. This is because the CS electrodes 35 apply a certain voltage to the pixel electrodes (ITO electrodes) 13, and that if the voltage were applied to the protrusions 20B, alignment of liquid crystalline molecules would be adversely affected FIGS. 137A to 137D show a process for manufacturing the TFT substrate of the panel of the 35th embodiment. As shown in FIG. 137A, the gate electrode 31 is patterned on the glass substrate 17. Next, the SiNx layer 40, the amorphous silicon (α-Si) layer 72 and the SiNx layer 65 are serially formed. Further, as shown in FIG. 137B, the SiNx layer 65 is etched to the α-Si layer 72 in such a fashion as to leave only the portion of the channel protecting film. The n⁺ α-Si layer and the Ti/Al/Ti layer corresponding to the data bus line, the source 41 the drain 42 are formed, and etching is then so made by patterning as to leave only the portions corresponding to the data bus line, the source 41 and the drain 42. After the SiNx layer corresponding to the final protecting film 43 is formed as shown in FIG. 137D, etching is then made to the surface of the glass substrate 17 in such a manner as to leave the portions 43B and 40B corresponding to the portion necessary for insulation and to the protrusions. At this time, the contact hole of the source electrode 41 and the pixel electrode is formed simultaneously, too. Further, the ITO electrode layer is formed and patterned, thereby forming the pixel electrode 13. Therefore, the height of the protrusion is the sum of the SiNx layer 40 and the final protecting film 43.

FIG. 138 shows the structure of a modification of the panel of the 35th embodiment, and when the SiNx layer corresponding to the final protecting film 43 is etched, etching is made up to the upper surface of the SiNx layer 40. Therefore, the height of the protrusion is the thickness of the final protecting film 43.

Figure 139A:
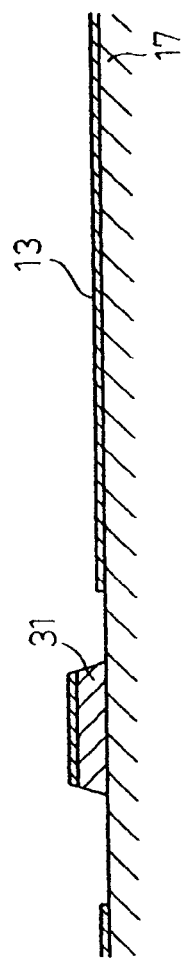
Figure 139B:
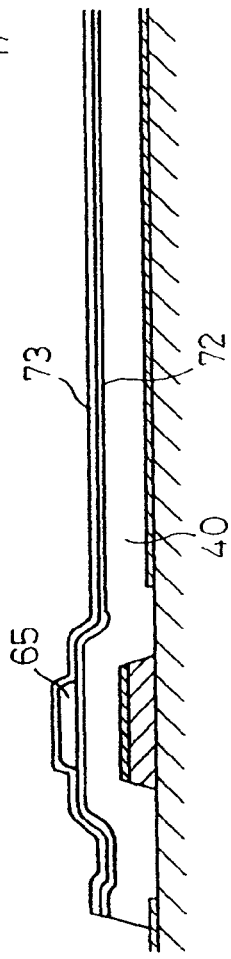
Figure 139C:
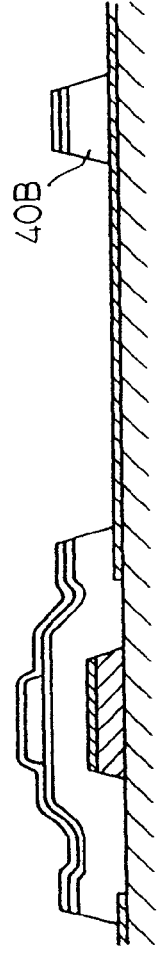
Figure 139D:
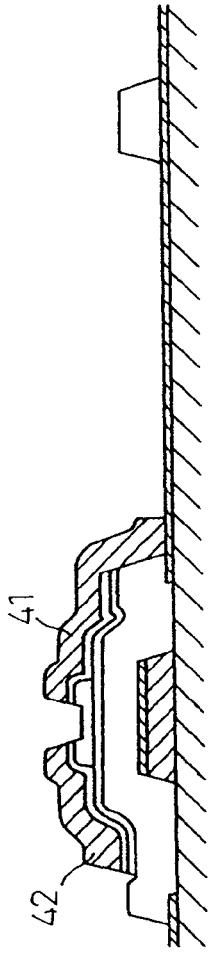
Figure 139E:
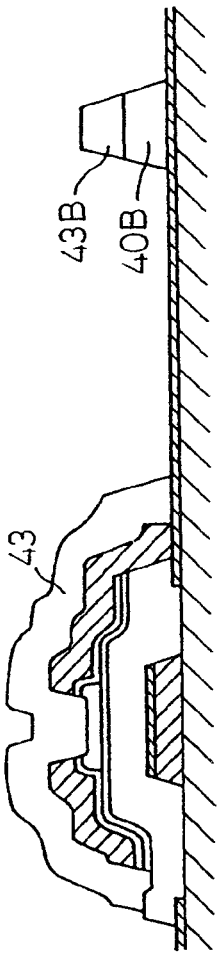

FIGS. 139A to 139E show a process for manufacturing the TFT substrate of the panel of the 36th embodiment. As shown in FIG. 139A, the gate electrode 31 is patterned on the glass substrate 17. Next, the ITO electrode layer is formed and patterned to form the pixel electrode 13. The SiNx layer 40, the amorphous silicon (α-Si) layer 72 and the SiNx 65 are serially formed as shown in FIG. 139B. Further, the SiNx layer 65 is etched up to the α-Si layer 72 in such a fashion as to leave only the portion of the channel protecting film. The n⁺ α-Si layer is further formed. As shown in FIG. 139C, etching is then made up to the surface of the pixel electrode 13 in such a fashion as to leave the necessary portions and the portion 40B corresponding to the protrusion. The Ti/Al/Ti layer corresponding to the data bus line, the source 41 and the drain 42 is formed as shown in FIG. 139D, and is then patterned in such a fashion as to leave only the portions corresponding to the data bus line, the source 41 and the drain 42. The n⁺ α-Si layer and the α-Si 72 are etched by using the data bus line, the source 41 and the drain 42 as the mask. After the SiNx layer corresponding to the final protecting film 43 is formed as shown in FIG. 139E, etching is made up to the surface of the pixel electrode 13 in such a fashion as to leave the portion necessary for insulation and the portions 43B and 40B corresponding to the protrusions.

The explanation predetermined above explains the embodiments relating to the manufacture of the protrusion 20B on the side of the TFT substrate 17, but there are various modifications depending on the structure of the TFT substrate 17, and the like. In any case, the production cost can be reduced by manufacturing the protrusion by conjointly using the manufacturing process of other portions of the TFT substrate 17.

As has been explained already, the protrusion of the dielectric material disposed on the electrode has the advantage that stable orientation can be obtained because the direction of regulation of the orientation by the slope coincides with the direction of regulation of the orientation by the electric field at the protrusion portion. However, the protrusion is the dielectric material disposed on the electrode and the alignment film is formed on the protrusion. For this reason, the inside of the liquid crystal cell becomes asymmetric between a pair of electrodes, and the charge is likely to stay with the application of the voltage. In consequence, the residual DC voltage becomes high, and the problem of so-called "burn" occurs if the area of the projection is relatively large.

FIGS. 140A and 140B show the relationship between the thickness of the dielectric material on the electrode and the residual DC voltage. FIG. 140A is a graph showing this relationship and FIG. 140B shows the portion corresponding to the thickness d of the dielectric material and the position of the occurrence of "burn". The vertical alignment film 22, too, is the dielectric material, and the sum of the height of the protrusion and the vertical alignment film 22 corresponds to the thickness d of the dielectric material as shown in FIG. 140B. The residual DC voltage increases with the increase of d as shown in FIG. 140A. Therefore, burn is likely to occur at the portion of the protrusion 20 shown in FIG. 140B. This also holds true of the case where the dielectric depression is formed on the electrode as in the eighteenth embodiment shown in FIG. 93. The 37th embodiment to be explained next is directed to prevent the occurrence of such a problem.

FIGS. 141A and 141B show the structure of the protrusion in the 37th embodiment. FIG. 141A is a perspective view of the protrusion 20 and FIG. 141B is a sectional view. As shown in these drawings, the protrusion 20 has a width of 7 μm, the width of its upper surface is about 5 μm and its height is about 1 to 1.5 μm. A large number of fine pores are formed on this upper surface, and each fine pore has a diameter of not greater than 2 μm.

Figure 142A:
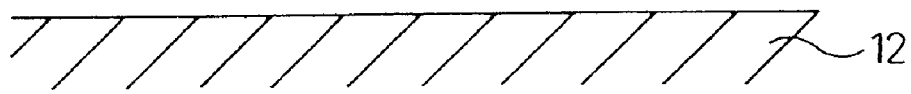
Figure 142B:
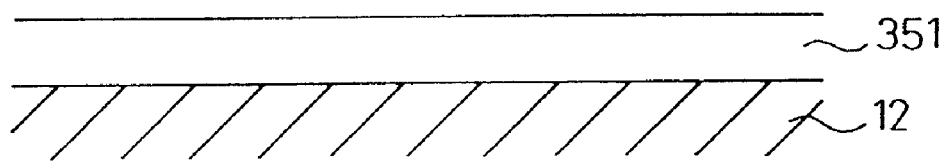
Figure 142C:
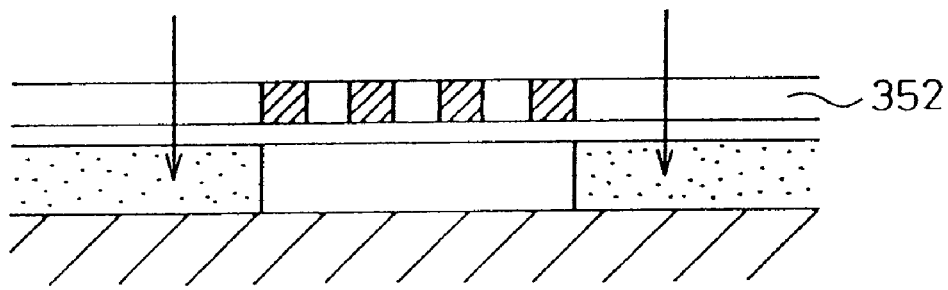
Figure 142D:
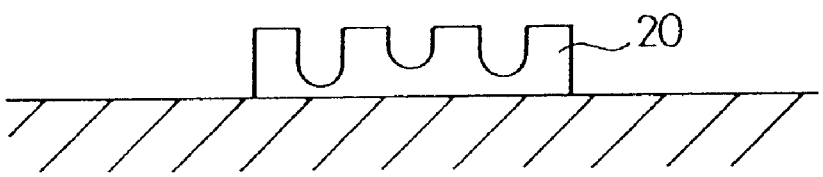
Figure 142E:
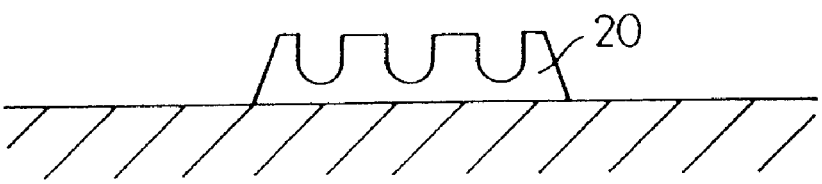

FIGS. 142A to 142E are drawings showing a method of forming the protrusion (on the side of the CF substrate) having such fine pores. As shown in FIG. 142A, the glass substrate having the opposed electrode 12 of the ITO film formed thereon is washed. A photosensitive resin (resist) is applied and is then baked to form a resist layer 351 as shown in FIG. 142B. A mask pattern 352, permitting light to transmit through the portions other than the protrusion and the pore portions is brought into close contact with the resist layer 351 and then exposure is effected. The protrusion 20 shown in FIG. 142D is obtained by then carrying out development. When baking is made further, the protrusion 20 undergoes shrinkage, and the side surface changes to the slope as shown in FIG. 142E.

When the substrate having the fine pores formed in the protrusion described above and the substrate not having the pores are assembled and the residual DC voltage is measured by a flicker erasure method (DC: 3 V, AC: 2.5 V, temperature: 50 C, DC application time: 10 minutes), the residual DC voltage is 0.09 V when the fine pores are formed and is 0.25 V when they are not formed. Because the residual DC voltage is reduced in this manner, seizure becomes more difficult to occur.

The liquid crystalline molecules are oriented perpendicularly to the slopes of the protrusions, etc, and to the electric field. It has been found out, however, when the gap of the protrusions becomes smaller to the size approximate to the fine pores, the liquid crystalline molecules are not oriented to the slope of the fine portions. Therefore, the liquid crystalline molecules are affected at the upper surface portion of the protrusions by the influences of the orientation due to the slopes on both sides and are oriented along this orientation.

FIG. 143 shows the protrusion structure of the 38th embodiment. In the 38th embodiment, a groove having a width of 3 μm and a small thickness is disposed below the protrusion 20B having a width of 7.5 μm on the TFT substrate side. Further, a chromic shading layer 34 is disposed below the protrusion 20B. Such a protrusion 20B can be manufactured by the same method as that of the 37th embodiment. When the residual DC voltage is measured for the protrusion structure of the 38th embodiment, it is 0.10V, and the result substantially equal to that of the 37th embodiment can be obtained.

In the protrusion structure of the 38th embodiment, the liquid crystalline molecules are not oriented at the groove portion in the direction perpendicular to the substrate when no voltage is applied, and the vertical orientation property gets deteriorated in some cases. However, because the shading film 34 is disposed, leaking light due to abnormal orientation at this portion is cut off and does not invite the drop of the contrast.

Next, the shape of a section of a resist was examined. Normally, the resist has a section like the one shown in FIG. 144A immediately after completion of patterning. However, in the mode of the present invention, a cylindrical section having a rather smooth slope contributes to more stable alignment. Substrates immediately after being patterned were baked at 200° C., whereby the sectional shape of the resist was changed into the one shown in FIG. 144B. FIGS. 145A to 145E are diagrams showing a change in sectional shape of the resist deriving from a change in temperature at which the patterned resist is baked. Even when the baking temperature was raised to 150° C. or more, a further change in sectional shape was limited Talking of the reasons why the resist was baked at 200° C., aside from a reason that the sectional shape of the resist is intended to be changed, there is another important reason. That is to say, when the resist employed in the prototypes is baked normally (at 135° C. for 40 min.), it is melted while reacting upon a solvent applied to an alignment film. In this embodiment, the resist is baked at a high enough temperature before the alignment film is formed, and thus prevented from reacting upon the alignment film In the first embodiment, the resist is baked at 200° C. in order to make the sectional shape of the resist cylindrical. Data that has been described so far was acquired using the pattern of protrusions whose sectional shape is cylindrical.

In the foregoing examples, the sectional shape of a resist is made cylindrical by optimizing the baking temperature. Depending on the line width of a resist, the resist becomes cylindrical naturally. FIGS. 146A to 146C are diagrams showing the relationships between the line width of a resist and the sectional shape thereof. When the line width is about 5 micrometers, the resist has a preferable cylindrical shape naturally. Presumably, therefore, when the line width is about 7 micrometers or less, a resist having a naturally cylindrical sectional shape can be formed. In an existing display, the line width of 5 micrometers can actually be adopted. Depending on the performance of an exposure device, even when the line width is in the unit of submicrons, the same alignment can be thought to be attained in principle.

When a protrusion is used as the domain regulating means, furthermore, it becomes necessary to form a vertical alignment film thereon. FIGS. 147A and 147B are sectional views of a conventional panel using protrusion as a domain regulating means, and illustrates the protrusion. Referring to FIG. 147A, on the substrates 16 and 17 are formed color filters and bus lines as well as ITO electrodes 12 and 13. Protrusions 20A and 20B are formed thereon, and vertical alignment films 22 are formed on the ITO electrodes 12 and 13 that include the protrusions 20A and 20B.

When the protrusion is formed by using the positive type photoresist such as a TFT flattening agent HRC-135 manufactured by JSR Co. the surface exhibits poor wettability to the vertical alignment film, expels the material of the vertical alignment film that is applied, and makes it difficult to form a vertical alignment film on the surface of the protrusion. FIG. 147B shows this condition. Therefore, it causes a problem in that no vertical alignment film 22 is formed on the surfaces of the protrusions 20A and 20B. The protrusions 20A and 20B having no vertical alignment film 22 formed on the surfaces thereof do not help obtain a desired orientation. Therefore, light-leakage occurs from the protrusions to deteriorate the quality of display. A 39th embodiment is to solve this problem.

According to the 39th embodiment, the surface of the protrusion is treated so that the material of the vertical alignment film easily adheres onto the surface of the protrusion. As the treatment for enabling the material of the vertical alignment film to easily adhere to the surface of the protrusion, it can be contrived to form fine ruggedness on the surface of the protrusion so that the material of the alignment film can be favorably applied thereto, or the wettability of the surface of the protrusion can be enhanced relative to the material of the vertical alignment film. When fine ruggedness is formed on the surface of the protrusion, the liquid of the alignment film stays in the concave portions, and the material of the alignment film is less expelled by the surface of the protrusion. The ruggedness can be formed by either a chemical treatment or a physical treatment. As the chemical treatment, ashing can be effectively employed.

FIGS. 148A to 148C are diagrams illustrating a method of forming protrusions according to a 39th embodiment based on the ashing treatment. Referring to FIG. 148A, a protrusion 20 is formed by using the photoresist on the electrode 13 (which, in this case, is a pixel electrode 13 but may be an opposing electrode 12). The protrusion 20 has the shape of for example, a stripe of a width of 10 μm and a height of 1.5 μm. The protrusion is annealed to assume the shape of a dome in cross section. The surface of protrusion on the substrate is subjected to the ashing treatment using a conventional plasma asher. Through the plasma ashing, fine dents are formed on the surface of the protrusion as shown in FIG. 148B. The thus obtained substrate is washed, dried, and onto which a vertical orientation member is applied by using a printer. Due to the effect of ruggedness formed on the protrusion, the orientation member is not expelled, and a vertical alignment film is formed on the whole surface of the protrusion as shown in FIG. 148C. Thereafter, the processing is executed in the same manner as that of the ordinary multi-domain VA system. The thus obtained liquid crystal display device exhibits favorable display properties without defect that stems from the expulsion of the alignment film.

Another example of the ashing treatment will be an ozone ashing treatment exhibiting the same effect as that of the plasma ashing treatment.

Figure 149B:
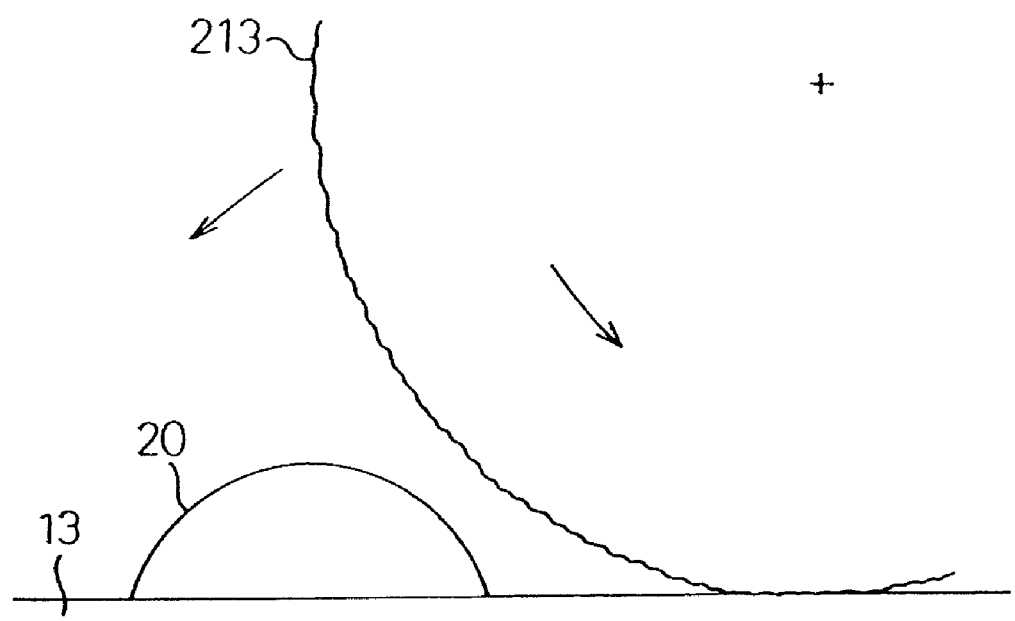

As a physical method of forming ruggedness, the substrate is washed with a brush by using a substrate washing machine after the protrusion has been annealed. This forms ruggedness in the form of stripes on the protrusion. Other examples of the method of physically forming ruggedness include effecting the rubbing by using a rubbing device as shown in FIG. 149A, and transferring ruggedness of a roller 103 by pushing the rugged roller 103 onto the substrate on which the protrusion 20 has been formed as shown in FIG. 149B.

FIG. 150 is a diagram illustrating the irradiation with ultraviolet rays in order to enhance the wettability of the surface of the protrusion relative to the material of the vertical alignment film. As described above, a protrusion 20 same as that of FIG. 148C is formed on the substrate by using a photoresist. By using an excimer UV irradiation apparatus, the substrate is irradiated with ultraviolet rays of a main wavelength of 172 nm in an environment in which an oxygen concentration is not lower than 20% in a dosage of 1000 mJ/cm$^2$. This helps improve the wettability of the surfaces of the substrate and of the protrusion relative to the material of the vertical alignment film. The thus obtained substrate is washed, dried, and is coated with the vertical orientation member by using a printer. Since wettability has been improved by the irradiation with ultraviolet rays, the orientation material is not expelled, and the vertical alignment film is formed on the whole surface of the protrusion. Thereafter, the processing is carried out in the same manner as that of the ordinary multi-domain VA system. The thus obtained liquid crystal display device exhibits favorable display properties without defect that stems from the expulsion of the alignment film.

FIGS. 151A and 151B are graphs illustrating a change in the expulsion factor of the material of the vertical alignment film of when the conditions are changed in which the protrusion formed of a photoresist is irradiated with ultraviolet rays. FIG. 151A is a graph illustrating a relationship among the wavelength, dosage (radiation quantity) and expulsion factor (repellent occurrence ratio). Ultraviolet rays having a wavelength of not longer than 200 nm are effective. When the wavelength is longer than 200 nm, the improvement is accomplished to only a small degree. When the ultraviolet rays have a wavelength of not longer than 200 nm, furthermore, no expulsion (repellent) occurs with the dosage of 1000 mJ/cm$^2$. FIG. 151B is a graph illustrating a relationship between the oxygen concentration and the expulsion factor of when the protrusion is irradiated with ultraviolet rays having a wavelength of not longer than 200 nm with a dosage of 1000 mJ/cm$^2$. In an environment where the oxygen concentration is low, ozone is not generated in sufficient amounts and the improvement is accomplished little. It is therefore desired that the protrusion is irradiated with ultraviolet rays having a wavelength of not longer than 200 nm in an environment in which an oxygen concentration is not lower than 20% with a dosage of not smaller than 1000 mJ/cm$^2$.

As an apparatus for generating ultraviolet rays having a wavelength of not longer than 200 nm, there can be used a low-pressure mercury lamp in addition to the above-mentioned excimer UV irradiation apparatus.

In the above-mentioned processing, the substrate was washed and dried after irradiated with ultraviolet rays. However, the substrate may be irradiated with ultraviolet rays after it has been washed and dried. In this case, since the protrusion is irradiated with ultraviolet rays just prior to printing an alignment film thereon, wettability is not impaired by being left to stand after it is irradiated or by washing.

Repellence on the protrusion can be drastically improved if a silane coupling agent, an alignment film solvent, etc, are applied before the alignment film is applied, and then the alignment film is formed. More concretely, the substrate is baked (annealed) and the shape of the protrusion is turned into the semicylindrical shape as shown in FIG. 146. After this substrate is washed, hexamethyldisilane (HMDS) is applied by using a spinner. A vertical orientation material is applied to the substrate by using a printing press. In this way, the vertical alignment film is satisfactorily formed on the surface of the protrusion. Incidentally, N-methylpyrrolidone (NMP) may be applied in place of HMDS. Further, printing of the vertical alignment film may be carried but in a sealed NMP atmosphere and in this case, too, the vertical alignment film can be formed satisfactorily on the surface of the protrusion. Various solvents are available as the solvent to be applied before the formation of the vertical alignment film, and gamma-butyrolactone, methyl cellosolve, etc, as the solvent of the alignment film can be used, for example.

FIGS. 152A to 152C are explanatory views useful for explaining an example of the production method of the protrusion in the 39th embodiment, and represents an example wherein the protrusion is formed by a material dispersing therein fine particles (particulates) (example of the CF substrate side). As shown in FIG. 152A a positive type photosensitive resin (resist) 355 containing 5 to 20% of fine alumina particles having a grain size of not greater than 0.5 μm in mixture is applied onto the electrode 12. The resist 355 is exposed and developed by using a photomask 356 which shades the protrusion portion, as shown in FIG. 152B. After baking is carried out, a protrusion 20A shown in FIG. 152C can be obtained. The fine alumina particles 357 protrude from the surface of this protrusion 20A and fall off from the surface to form holes. In other words, fine concave-convexities are formed on the surface of the protrusion 20A. For this reason, wettability can be improved when the vertical alignment film is applied.

To increase the number of concave-convexities on the surface of the protrusion in the embodiment described above, the proportion of the fine alumina particles to be mixed with the resist must be increased. When the proportion of the fine alumina particles exceeds 20%, however, the photosensitivity of the resist drops and patterning can not be carried out by exposure. FIGS. 153A to 153C show a method of manufacturing the protrusion when the number of the concave-convexities on the surface of the protrusion must be increased.

A non-photosensitive resin containing a great proportion of fine alumina particles 357 having a grain size of not greater than 0.5 μm is applied onto the electrode 12 as shown in FIG. 153A. Further, as shown in FIG. 153B, a resist is applied to the surface of the resin, and exposure and development are carried out by using a photomask 358 shading the protrusion portion. Because the resist remains at only the portions corresponding to the photomask 358, the non-photosensitive resin at portions other than the protrusion portion is removed by etching. When baking is carried out further, the protrusion 20A can be obtained as shown in FIG. 153C. The concave-convexities are formed similarly on the surface of the protrusion 20A but because the proportion of the fine alumina particles 357 mixed is great, a large number of concave-convexities are formed, and wettability can be much more improved than in the embodiment shown in FIG. 154 when the vertical alignment film is applied.

FIGS. 154A and 154B show another manufacturing method of the concave-convexities on the surface of the protrusion by the fine particles. In this example, after the resist 360 is applied to the surface of the electrode 12, the fine alumina particles 361 are sprayed and allowed to adhere to the surface of the resist 360, followed then by pre-baking. Thereafter, the protrusion is patterned in the same way as in the prior art, and the protrusion 20A shown in FIG. 154B can be obtained. When this protrusion 20A is washed, the fine alumina particles 361 exist on the surface of the protrusion 20A and fall off from the surface to define the holes. In consequence, the concave-convexities are formed.

FIGS. 155A and 155B are explanatory views useful for explaining an example of the manufacturing method of the protrusion in the 39th embodiment, and represents the example wherein a protrusion material is foamed to form the concave-convexities on the surface of the protrusion. The resist for forming the protrusion 20 is first dissolved in a solvent such as PGMEA (Propylene Glycol MonoMethyl Ethel Acetate), for example, is applied by a spinner and is then pre-baked (pre-cured) at 60° C. Under this state, large quantities of the solvent remain inside the resist. Patterning is then carried out by exposure and development by using a mask.

According to the embodiments as described above, as shown in FIG. 156 with a broken line, the temperature is gradually raised inside a clean oven up to 200° C. in the course of 10 minutes, is held at this temperature for longer than 75 minutes and is gradually returned to the normal temperature in the course of 10 minutes. In contrast, according to this embodiment, as shown in FIG. 156 with a continuous line, the substrate is placed on a hot plate at 200° C. and is heated for 10 minutes. At this time, about one minute time is necessary to raise the substrate temperature to 200° C. Thereafter, the substrate is left standing for cooling for 10 minutes to the normal temperature. When quick heating is carried out in this way, the solvent inside the resist is bumped and bubbles 362 are formed inside the resist as shown in FIG. 155A. The bubbles 362 are emitted outside from the surface of the protrusion 20 as shown in FIG. 155B. At this time, the traces 363 of the bubbles are left on the surface of the protrusion, forming thereby the concave-convexities.

Incidentally, when the resist dissolved in the solvent is stirred before the application and the bubbles are introduced into the resist, foaming is more likely to occur than when the resist is quickly heated. Stirring may be carried out while a nitrogen gas or a carbonic acid gas is being introduced. According to this method, the bubbles of the gas are introduced into the resist and a part of the gas is dissolved in the solvent, so that formability at the time of heating increases. Water of crystallization which emits water at about 120 to about 200° C. or a clathrate compound which emits a guest solvent may be mixed with the resist, too. Water is emitted from water of crystallization and changes to a steam or the guest solvent is emitted at the time of heating, and foaming is more likely to occur. A solvent or a silica gel adsorbing a gas may be mixed with the resist. The adsorbed solvent or the gas is emitted from the silica gel at the time of heating and consequently, foaming is more likely to occur. Incidentally, the solid material to be mixed must be smaller than the height of the protrusion and its width, and must be pulverized in advance to such a size.

The fine pores are formed in the protrusion in the 37th embodiment whereas the grooves are disposed in the protrusion in the 38th embodiment, and according to such structures, the vertical alignment film can be formed more easily on the surface of the protrusion. FIGS. 157A to 157C show another method of forming the protrusion having the grooves such as those of the 38th embodiment.

As shown in FIG. 157A, the protrusions 365 and 366 are formed adjacent to one another by using a photoresist which is used for forming a micro-lens. The patterning shape of this micro-lens can be changed depending on the light reflection intensity, the baking temperature, the composition, and so forth, and when the suitable baking condition is set, the protrusion collapses and changes to the shape shown FIG. 157B. When the vertical alignment film 22 is applied to this shape, as shown in FIG. 157C, the vertical alignment film 22 can be formed satisfactorily because the center of the protrusion 20 is recessed. After the material described above is applied to a thickness of 1.5 µm, the protrusions 365 and 266 are patterned to a width of 3 µm and a gap of 1 µm between the protrusions. The film is then baked at 180° C. for 10 to 30 minutes. As a result, two protrusions are fused to each other to form the shape shown in FIG. 157B. A desired shape can be obtained by controlling the baking time. The protrusions 365 and 266 can be fused to one another when the height is from 0.5 to 5 µm, the width is from 2 to 10 µm and the gap is within the range of 0.5 to 5 µm. When the height of the protrusions is greater than 5 µm, this height affects the cell thickness (thickness of the liquid crystal layer) and impedes injection of the liquid crystal. When the width of the protrusion is smaller than 2 µm, on the other hand, the orientation limiting force of the protrusion drops. Furthermore, when the gap between the protrusions exceeds 5 µm, the two protrusions cannot be fused easily and when it is smaller than 0.5 µm, the depression can not be formed at the center.

In the foregoing was described the treatment for improving wettability of the protrusion relative to the material of the alignment film according to the 39th embodiment. Here, the protrusion may have any pattern and may not be of the shape of a dome in cross section. Moreover, the material forming the protrusion is not limited to the photoresist but may be of any material provided it is capable of forming a protrusion in a desired shape. By taking into consideration the chemical or physical formation of ruggedness in a subsequent process, however, it is desired to use a material which is soft, is not easily peeled off and can be subjected to the ashing. The materials satisfying these conditions will be photoresist, black matrix resin, colored filter resin, overcoating resin and polyimide resin. These organic materials make it possible to improve (treat) the surfaces through the ashing or UV irradiation.

According to the 39th embodiment as described above, wettability of the surface of the protrusion is improved for the material of the alignment film, making it possible to prevent a trouble in that the alignment film is not formed on the surface of the protrusion, the quality of display is improved and the yield is improved.

In the past, a so-called black matrix is placed on the perimeter of each pixel in order to prevent deterioration of contrast deriving from leakage of light passing through a region between pixels. FIG. 158 is a diagram showing the structure of a panel of a prior art provided with black matrices. As illustrated, a red filter 39R, green filter 39G, and blue filter 39B that coincide with red, green, and blue pixels are formed on a color filter (CF) substrate 16, and ITO electrodes 12 are formed on the CF substrate. Furthermore, black matrices 34 are formed on the borders among the red, green, and blue pixels. Data bus lines and gate bus lines or TFT devices 33 are formed together with ITO electrodes 13 on a TFT substrate 17. A liquid-crystal layer 3 is interposed between the two substrates 16 and 17.

FIG. 159 is a diagram showing the structure of a panel of the 40th embodiment of the present invention, and FIG. 160 is a diagram showing a pattern of protrusions over pixels in the 40th embodiment. As illustrated, the red filter 39R, green filter 39G, and blue filter 39B are formed on the CF substrate 16. As shown in FIG. 160, the protrusions 20A for controlling alignment, which are included in the liquid crystal panel of the first embodiment, are formed on the CF substrate 16, though they are not shown in FIG. 159. The protrusions 20A are made of a light-interceptive material. Protrusions 61 are formed on the perimeters of pixels. The protrusions 61 are also made of a light-interceptive material and function as black matrices. The necessity of forming the black matrices 34 like in the prior art is obviated. The protrusions 61 functioning as black matrices can be formed concurrently with the protrusions 20A. Using this process of manufacturing, the step of creating black matrices in the course of creating the CF substrate 16 can be omitted. Reference numeral 62 denotes a TFT in each pixel. The protrusions 61 are designed to intercept light from the TFTs.

In FIG. 159, the protrusions 20A and 61 are formed on the CF substrate 16. Alternatively, the protrusions 61 or 20A or both of them may be formed on the TFT substrate 17. Owing to this structure, a mismatch between the CF substrate 16 and TFT substrate 17 occurring during bonding need not be taken into account. Consequently, the numerical aperture of the panel and the yield of a bonding step can be improved outstandingly. Assuming that the CF substrate 16 is provided with black matrices, when the ITO electrodes 13 on the TFT substrate 17 and open portions (portions without the black matrices) of the CF substrate 16 are designed to be mutually identical, if a bonding mismatch occurred in the process of manufacturing the panel, the mismatch region would cause light leakage. This disables normal display. Generally, even if a high-precision bonding machine is employed, a matching error of about ±5 micrometers (μm) is present. A corresponding margin must therefore be preserved. In consideration of the margin, an aperture for each black matrix is designed to be smaller. Thus, the above problem is coped with. That is to say, each black matrix is designed to invade into an ITO electrode 13 formed on the TFT substrate 17 by about 5 to 10 micrometers. When the protrusions 61 are formed on the TFT substrate 17, the panel is free from the adverse effect of the bonding mismatch. Consequently, the numerical aperture can be maximized. This advantage becomes greater as each pixel of the panel gets smaller, that is, as a resolution improves. For example, in this embodiment, a substrate having ITO electrodes of pixels of which width is 80 micrometers and height is 240 micrometers is employed. In any of the conventional modes, since a margin of 5 micrometers is needed, the width and length of the aperture become 70 micrometers and 230 micrometers respectively, and the area of an aperture for each pixel becomes 16100 square micrometers. By contrast, in this embodiment, the area of the aperture for each pixel is 19200 square micrometers. The numerical aperture is improved to be approximately 1.2 times larger than the one permitted by the conventional mode. For realizing a display that offers twice as high a resolution as the one provided by the panel, the width and length of an electrode are 40 micrometers and 120 micrometers respectively. In the conventional mode, the area of the aperture for each pixel is 3300 square micrometers. In this embodiment, the area of the aperture for each pixel is 4800 square micrometers and thus improved to be approximately 1.5 times higher than the one permitted by the conventional mode. Thus, the higher the resolution is, the greater the advantage is.

FIG. 161 is a diagram showing a pattern of a black matrix (BM) according to a 41th embodiment. It was described above that light leaks at the domain regulating means. A minute domain having an orientation angle 90° different located at about the top of the protrusion can be used as described above. The light leaks, however, unless a stable orientation can be secured at about the top of the protrusion. For the contrast to be improved, therefore, the domain regulating means is preferably masked. One method of masking the protrusion is to form the protrusion of a light-shielding material. According to the 41th embodiment, however, the domain regulating means is masked by use of a black matrix (BM).

As described above, the BM 34 is used for shielding the leakage light at the TFT and the boundary between the cell electrode and the bus line. The 41th embodiment, however, uses the BM also at the domain regulating means. Consequently, the leakage light at the domain regulating means can be masked for an improved contrast.

FIG. 162 is a sectional view of a panel according to a 41st embodiment. As shown, the BMs 34 are arranged at positions corresponding to the protrusions 20A, 20B, the TFT 33, and the interval between the bus lines (only the gate bus line 31 is shown) and the cell electrodes 13.

FIG. 163 shows a pixel pattern according to a 42nd embodiment. Conventionally, a delta arrangement is known, in which the display pixels, which are substantially square in shape, are arranged in adjacent columns one half of a pitch displaced from each other. In a color liquid crystal display device, a set of color pixels is configured of three adjacent pixels of 13B, 13G, 13R. Each pixel is almost square in shape, and as compared with a 1-to-3 rectangle, an equal proportion of liquid crystalline molecules can be easily secured in each direction of division without reducing the protrusion interval considerably. In such a case, the data bus line is extended in zigzag along the perimetric edge of the pixel. In this way, the delta arrangement is very effective in the case where a protrusion arrangement or a depression arrangement is continuously formed over the entire substrate surface for orientation division.

The 43rd embodiment to be described next is an embodiment using the protrusions for controlling alignment or the protrusions 61 serving as black matrices in the 40th embodiment as spacers. As also shown in FIG. 19, spacers are used to retain the distance (gap) between two substrates (thickness of cells) at a predetermined value. FIG. 164 is a diagram showing the structure of a panel of a prior art, wherein spacers 45 are placed on borders between pixels and define the thickness of cells. The spacers 45 are, for example, spheres having a predetermined diameter.

FIGS. 165A and 165B are diagrams showing the structure of a panel of the 43rd embodiment. FIG. 165A shows the structure of the panel of the 43rd embodiment, and FIG. 165B shows a modification. As shown in FIG. 165A, in the panel of the 43rd embodiment, protrusions 64 formed on the perimeters of pixels are made as thick as cells, and thus define the thickness of cells. In the drawing, the protrusions 64 are formed on the TFT substrate 17. Alternatively, the protrusions 64 may be formed on the CF substrate 16. This structure obviates the necessity of including spacers. No liquid crystal is present at the positions of the protrusions 64. For a vertically-aligned panel or the like, the positions of protrusions (cell holder areas) of the panel appear in black all the time irrespective of an applied voltage. The black matrices are therefore unnecessary, and the protrusions 64 need not be made of a light-interceptive material but can be made of a transparent material.

In the 43rd embodiment shown in FIG. 165A, the protrusions 64 define the thickness of cells. The precision in thickness of cells is dominated by the precision in forming the protrusions, and is therefore poorer than that permitted when the spacers are used. A panel having the structure of the sixteenth embodiment was actually produced. As a result, a level of uncertainty in thickness of cells can be controlled within ±0.1 micrometers. This level would not pose any particular problem in practice. However, this structure is unsuitable when the thickness of cells must be controlled strictly. The modification shown in FIG. 167B is a structure intended to solve this problem. In the modification shown in FIG. 167B, the spacers 45 are mixed in a resin to be made into the protrusions 65, and the resin is applied to the substrate. The substrate is then patterned in order to form the protrusions. In this modification, the merit of the 43rd embodiment that the spacers are unnecessary is lost, but there is a merit that the thickness of cells can be defined irrespective to the precision in drawing a pattern of protrusions. A panel having the structure shown in FIG. 167B was produced actually. The thickness of cells could be defined so precisely that an error falls within ±0.05 micrometers. Nevertheless, the spacers are still needed. However, since the spacers are mixed in a resin, the spacers are arranged while the resin is being applied. This obviates the necessity of scattering the spacers at a panel production step. The number of steps included in the process does not increase.

FIGS. 166A and 166B are diagrams showing another modifications of the 43rd embodiment. FIG. 166A shows a structure in which the protrusions 64 of the 43rd embodiment are replaced with protrusions 81 made of a light-interceptive material, and FIG. 166B shows a structure in which the protrusions 65 shown in FIG. 165B are replaced with protrusions 82 made of a light-interceptive material. As mentioned above, in FIGS. 165A and 165B, the protrusions 64 and 65 may be made of a transparent material. The protrusions can still fill the role of black matrices. However, when the protrusions are made of the light-interceptive material, perfect light interception can be achieved.

FIG. 167 is a diagram showing a modification of the 43rd embodiment. Protrusions 83 are formed on the CF substrate 16 and protrusions 84 are formed on the TFT substrate 17. The protrusions 83 and 84 are brought into contact with each other, thus defining the thickness of cells. An effect exerted is the same as the one exerted by the 43rd embodiment and its modification.

In the 43rd embodiment and its modification, protrusions lying on the perimeters of pixels are used to define the thickness of cells. Protrusions for controlling alignment, for example, the protrusions 20A shown in FIG. 160 may be used to define the thickness of cells.

Furthermore, in the 40th embodiment, 43rd embodiment, and modifications of the 43rd embodiment, protrusions are formed all over the perimeters of pixels. Alternatively, the protrusions may be formed on parts of the perimeters of the pixels. For example, the protrusions 61, 64 and 81 to 84 in the 43rd embodiment and its modification may be made of a light-interceptive material and formed along one sides of only TFT portions of pixels, that is, portions 62 shown in FIG. 59. As mentioned above, as far as a so-called normally black-mode panel that, like a vertically-aligned (VA) panel, appears in black when no voltage is applied to ITO electrodes is concerned, even if the black matrices are excluded, light leakage hardly poses a problem. In this embodiment, therefore, only the TFT portions of pixels are coated with a light-interceptive resin but the drain bus lines and gate bus lines surrounding the pixels are not coated therewith. As mentioned above, as the number of light-interceptive regions decreases, the numerical aperture improves accordingly. This is advantageous. The structure in which protrusions are formed along only the TFT portions can be adapted to the 43rd embodiment and its modifications shown in FIGS. 165A to 169.

In the 43rd embodiment, the black matrix is provided with the function of the spacer but according to the prior art, spherical spacers having a diameter equal to the cell thickness are sprayed on one of the substrates having the vertical alignment film formed thereon and then the other substrate is bonded. When the protrusion is formed on the electrode, however, a part of the spacers so sprayed is positioned on the protrusion. If the diameter of the spacers is equal to the cell thickness in the case where no protrusion is formed, the cell thickness becomes greater than the desired thickness due to the existence of the spacer on the protrusion. Further, when any force is applied from outside to the panel that is once assembled and the spacers move on the protrusion, the cell thickness becomes greater at that portion and the problem of non-uniform display develops. The forty-fourth embodiment to be next explained is directed to solve this problem by decreasing the diameter of the spacers in consideration of the thickness of the protrusion.

FIGS. 168A to 168C show the panel structure of the 44th embodiment. FIG. 168A shows the TFT substrate 17 before assembly, FIG. 168B shows the CF substrate 16 before assembly and FIG. 168C shows the assembled state. As shown in FIGS. 168A and 168B, the protrusion 20A is formed on the electrode 12 of the CF substrate 16 and the vertical alignment film 22 is further formed. The protrusion 20B is formed on the electrode 13 of the TFT substrate 17 and the vertical alignment film 22 is before assembly and further formed. The protrusions 20A and 20B have the same height of 1 μm and are assembled so that they do not cross mutually when viewed from the panel surface. The cell thickness is 4 micrometers (μm), and the diameter of the spacer 85 made of a plastic material is 3 μm which is the balance obtained by subtracting the height of the protrusion from the cell 163 A thickness. As shown in FIG. 168A, 150 to 300 pcs/mm$^2$ of spacers 85 are sprayed (sprinkled) on the TFT substrate 17. A seal is formed from a bonding resin on the CF substrate 16 and the CF substrate 16 is bonded to the TFT substrate 17. The spacers 85 are positioned on the protrusions 20B or below the protrusions 20A at a certain probability as shown in FIG. 168C. This probability corresponds to the proportion of the areas of the protrusions 20A and 20B to the entire area. Under the state shown in FIG. 168C, the cell thickness is limited by the spacers positioned on the protrusions 20B or below the protrusions A and the thickness of the protrusions. The spacers 45 existing at portions other than the protrusions 20A and 20B are floating spacers that do not affect the cell thickness. Since the cell thickness is limited by the protrusions 20A and 20B, the cell thickness hardly exceeds the desired value. Even when the spacers at portions other than the portions of the protrusions move to the protrusion portions during the use of the panel, the cell thickness does not become thick, and even when the spacers existing at the protrusion portions move to the portions other than the protrusion portions, they change to only the floating spacers.

FIG. 169 is a graph showing the relationship between the scattered (sprinkle) density of the spacers and the cell thickness. When the scattered density of the spacers is 100 to 500 pcs/mm$^2$ the cell thickness falls within the range of 4 μm±0.5 μm.

Next, FIG. 172 shows the experimental result of variance of the cell thickness that occurs when a force is applied from outside to the panel, and the scattered density of the spacers. It can be appreciated from this result that when the scattered density is lower than 150 pcs/mm$^2$, variance is likely to occur against the force applied, and when the scattered density exceeds 300 pcs/mm$^2$, variance is likely to occur against the tensile force. Therefore, the optimum scattered density is 150 to 300 pcs/mm$^2$.

In the manufacturing process of the liquid crystal display panel, ionic impurities are sometimes entrapped and ions contained in the liquid crystal and ions eluting from the alignment film, the protrusion forming material, the seal material, etc, mix in the liquid crystal panel in some cases. When the ions mix into the liquid crystal panel, the specific resistance of the panel drops, so that the effective voltage applied to the panel drops, too, thereby resulting in burn of the display and in the drop of the voltage retention ratio. In this way, mixing of the ions into the panel lowers display performance and reliability of the liquid crystal panel.

For these reasons, the ion adsorption capacity is preferably provided to the dielectric protrusion formed on the electrode, used as the domain regulating means in the embodiments described above. There are two methods of providing the ion adsorption capacity to the protrusion. The first method irradiates the ultra-violet rays and the second adds a material having the ion adsorption capacity to the material of the protrusion.

Surface energy of the protrusion forming material rises when the ultra-violet rays are irradiated to the material. Consequently, the ion adsorption capacity can be improved. The surface energy $\gamma$ can be expressed by the sum of the polarity term $\gamma p$ of the surface energy and its scatter term $\gamma d$. The polarity term is based on the Coulomb electrostatic force and the scatter term, on the scatter force among the van der Waals force. When the ultra-violet rays are irradiated, bonding at portions having a low bonding energy is cut off, and oxygen in air combines with the cut portions. Accordingly, the polarizability of the surface increases, the polarity term becomes great and the surface energy increases. When the degree of polarization increases, the ions become more likely to be adsorbed to the surface. In other words, the surface of the protrusion comes to possess the ion adsorption capacity when the ultra-violet rays are irradiated. It is preferred to selectively irradiate the ultra-violet rays to only the protrusions when irradiating the ultra-violet rays, but because the bonds of the protrusion forming material are more likely to be cut off than the bonds on the surface of the substrates, only the protrusions come to possess the ion adsorption capacity even when the ultra-violet rays are irradiated to the entire surface of the panel. The vertical alignment film is formed after the ultraviolet rays are irradiated.

An ion exchange resin, a chelating agent, a silane coupling agent, a silica gel, alumina, zeolite, etc, are known as the materials having the ion adsorption capacity. Among them, the ion exchange resin exchanges the ions, and supplements the ions that have existed as impurities from the beginning. Instead, it discharges other ions ands for these reasons, it is not suitable for the protrusion forming material. Among the materials having the ion supplementing capacity, some materials exist which have the ion supplementing capacity without emitting the substituent ions, and such materials are preferably used. Examples of such materials are crown ether having the chemical formula shown in FIGS. 171A and 171B and kryptand having the chemical formula shown in FIGS. 172A and 172B. Further, inorganic materials such as alumina and zeolite have the capacity of supplementing ions without emitting ions. Therefore, these materials are used. Incidentally, since the kinds of the ions adsorbed by one ion adsorption material are limited, materials adsorbing different ions are preferably used in combination.

A protrusion line having a width of 7.5 μm, a height of 1.5 μm and a gap of 15 μm between the protrusions is formed from a positive type resist, and is subjected to the treatment for imparting the various ion adsorption capacity described above so as to manufacture the panels. FIG. 250 shows the result of measurement of the initial ion density and the ion density (unit: pc) after the use for 200 hours of the panel so manufactured. In FIG. 250, ultra-violet rays of 1,500 mJ are irradiated in Example C, 0.5 wt % of crown ether is added in Example D, zeolite is added in Example E, and crown ether and zeolite are added in Example F. For reference, the case where the treatment for imparting the ion adsorption capacity is not carried out is represented as Comparative Example. A 10 V triangular wave having a frequency of 0.1 Hz is applied at the time of use, and the temperature at the time of measurement is 50° C. It can be appreciated from the result that the initial value of the ion density remains at substantially the same level regardless of the ion adsorption capacity treatment. However, the ion density after 200 hours drastically increases when this treatment is not carried out, but when the treatment is carried out, the increase remains small.

When the sample to which the ultra-violet rays are irradiated and the sample which is not at all treated are subjected to the practical running test, burn occurs in the un-treated sample but does not occur in the sample subjected to the ultra-violet irradiation.

In the 40th embodiment, the structure in which a pattern of protrusions is drawn on the CF substrate 16 using black matrices has been disclosed. The structure will be described below.

As mentioned above, if a pattern of protrusions can be drawn on the CF substrate 16 in the conventional manufacturing process, since a new step need not be added, an increase in cost deriving from drawing of a pattern of protrusion can be minimized. The seventeenth embodiment is an embodiment in which a pattern of protrusions are drawn on the CF substrate 16 by utilizing the conventional manufacturing process.

FIGS. 173A and 173B are diagrams showing the structure of the CF substrate of the 45th embodiment. As shown in FIG. 173A, in the 45th embodiment, the color filter (CF) resins 39R and 39G (and 39B) are applied pixel by pixel to the CF substrate 16. Black matrices or an appropriate material such as a CF resin or any other flattening resin is used to define a pattern of protrusions 50A by tracing predetermined positions. ITO (transparent) electrodes 12 are then formed on the pattern of protrusions. A material to be made into the black matrices is not restricted to any specific one. For forming protrusions, however, a certain thickness is needed. From this viewpoint, the adoption of a resin is preferable.

FIG. 173B is a diagram showing a modification of the CF substrate in the 45th embodiment. Black matrices or an appropriate material such as a CF resin or any other flattening resin is used to draw a pattern of protrusions 50B by tracing predetermined positions on the CF substrate 16. Thereafter, the CF resins 39R and 39G are applied. Consequently, the CF resin defining the pattern of protrusions gets thicker. The pattern of protrusions can now provide protrusions as it is. The ITO (transparent) electrodes 12 are then formed.

According to the structure of the 45th embodiment, protrusions can be formed at any positions on the CF substrate.

FIG. 174 is a diagram showing the structure of a panel of the 46th embodiment. In the 46th embodiment, the protrusions 50 are formed on the perimeters of pixels on the CF substrate 16, that is, on seams between the CF resins 39R, 39G, and 39B or on seams relative to black matrices 34. On the TFT substrate 17, the protrusions 20B are formed at positions coincident with intermediate positions between the seams. For forming continuous protrusions along one sides of the pixels opposed to the seams on the CF substrate 16, that is, for drawing a pattern of linear protrusions, a pattern of linear protrusions is drawn parallel to the pattern of protrusions by tracing positions near the centers of the pixels on the TFT substrate. Moreover, when continuous protrusions are formed along all sides of the seams between the pixels on the CF substrate 16, the pattern shown in FIGS. 80A to 81 is drawn. On the TFT substrate 17, pyramidal protrusions are formed near the centers of the pixels.

The structure of the panel of the 46th embodiment can be adapted to various forms. An example of the structure of the CF substrate of the 46th embodiment will be described below.

FIGS. 175A to 180B are diagrams showing examples of the structure of the CF substrate of the 46th embodiment. FIG. 175A shows a structure in which the black matrix (BM) 34 is interposed between each pair of the CF resins 39R and 39G. The black matrices 34 are formed thicker than the CF resins, and the ITO electrodes 12 are formed on the black matrices 34. The black matrices 34 become protrusions. Even in this case, the black matrices 34 should preferably be made of a resin or the like.

In FIG. 175B, the thin black matrices 34 made of a metal or the like are formed on the CF substrate 12. The CF resins 39R and 39G are applied to the black matrices, thus forming color filters. Thereafter, the CF resin 39 is applied in order to form protrusions 70. The ITO electrodes 12 are formed on the protrusions.

In FIG. 176A, the thin black matrices made of a metal or the like are formed on the CF substrate 12. The CF resins 39R and 39G are applied to the substrate, thus forming color filters. A resin other than the CF resin, for example, a resin used as a flattening material is used to form protrusions 71 without the use of the black matrices 34. The ITO electrodes 12 are then formed on the protrusions. In this case, like the structure shown in FIG. 175A, the flattening material is applied thicker than the CF resin.

In FIG. 176B, a resin or the like is used to form the black matrices 34, of which thickness is the same as the thickness of protrusions, on the CF substrate 12. The CF resins 39R and 39G are applied so that they will overlap the black matrices 34, thus forming color filters. Thereafter, the ITO electrodes 12 are formed. The portions of the CF resins overlapping the black matrices 34 serve as protrusions.

In FIG. 177A, the thin black matrices 34 made of a metal or the like are formed on the CF substrate 12, and the CF resin 39R is then applied to the substrate. Thereafter, the CF resin 39G is applied to overlap the CF resin 39R, and the ITO electrodes 12 are then formed. Portions of the CF resin 39G overlapping the CF resin 39R serve as protrusions. At the positions of the protrusions, the black matrices 34 are included for not allowing passage of light. Either of the color filter resins may overlap the other color filter resin. According to this structure, protrusions can be formed at the step of forming color filters. The number of steps will therefore not increase.

In FIG. 177B, a flattening material 71 is applied to overlap parts of the CF resins 39R and 39G on the same substrate as the one shown in FIG. 176A. Portions of the flattening material 71 overlapping the CF resins serve as protrusions. Owing to this structure, the flattening material 71 can be made as thin as the height of protrusions.

The aforesaid structures are structures in which ITO electrodes are formed on protrusions and electrodes have the protrusions. Next, an example of a structure in which an insulating material is used to form protrusions on the ITO electrodes will be described.

In FIG. 178, after color filters are formed on the CF substrate 16 by applying the CF resins 39R and 39G, the ITO electrodes 12 are formed. The black matrices 34 are then placed in order to form protrusions. Even in this case, the number of steps will not increase.

In FIG. 179A, after the thin black matrices 34 are formed on the CF substrate 16, the ITO electrodes 12 are formed. Color filters are then formed by applying the CF resins 39R and 39G. At this time, the CF resin 39G is applied to overlap the CF resin 39R, thus forming protrusions. Even in this case, the number of steps will not increase.

In FIG. 179B, after the thin black matrices 34 are formed on the CF substrate 16, color filters are formed by applying the CF resins 39R and 39G. The ITO electrodes 12 are then formed. The flattening material 71 is then used to form protrusions.

In FIG. 180A, after the ITO electrodes 12 are formed on the CF substrate 16, color filters are formed by applying the CF resins 39R and 39G. The black matrices 34 are then placed on the color filters, thus forming protrusions.

In FIG. 180B, after the thin black matrices 34 are formed on the CF substrate 16, color filters are formed by applying the CF resins 39R and 39G. A flattening material 72 is used to flatten the surface. The ITO electrodes 12 are then formed on the surface and the black matrices 34 are further formed, whereby protrusions are realized.

FIGS. 181A to 181G are diagrams illustrating the steps for producing the color filter (CF) substrate according to a 47th embodiment. The CF substrate has a protrusion as a domain regulating means.

Figure 181A:
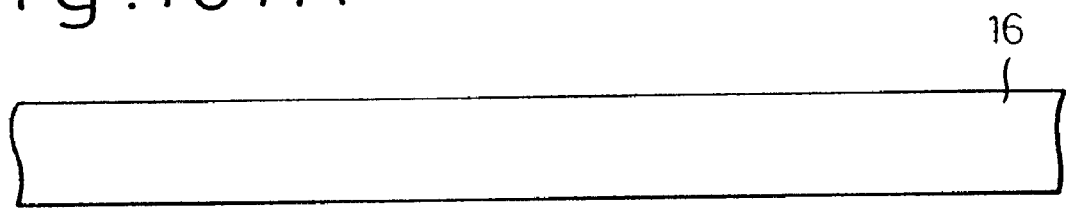
Figure 181B:
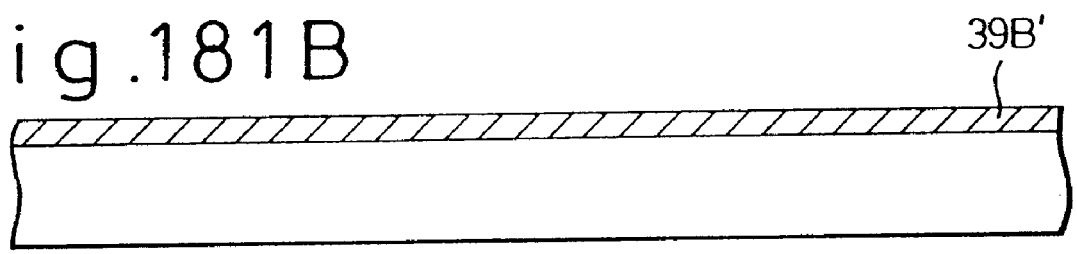
Figure 181C:
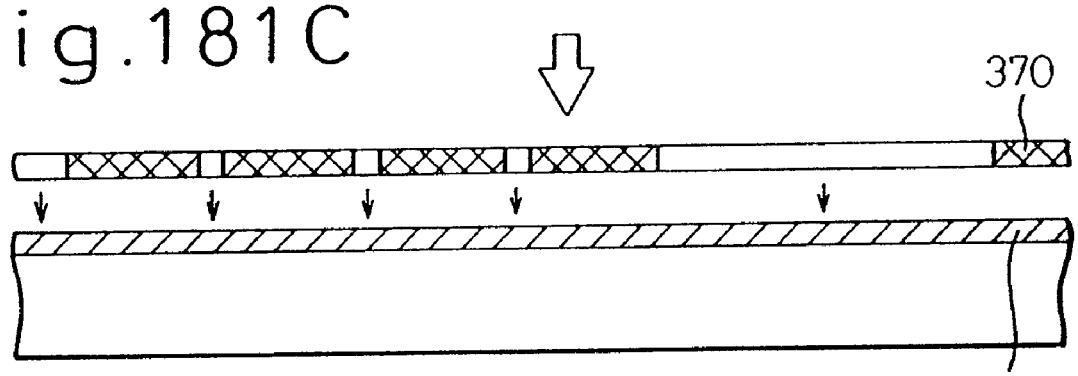
Figure 181D:
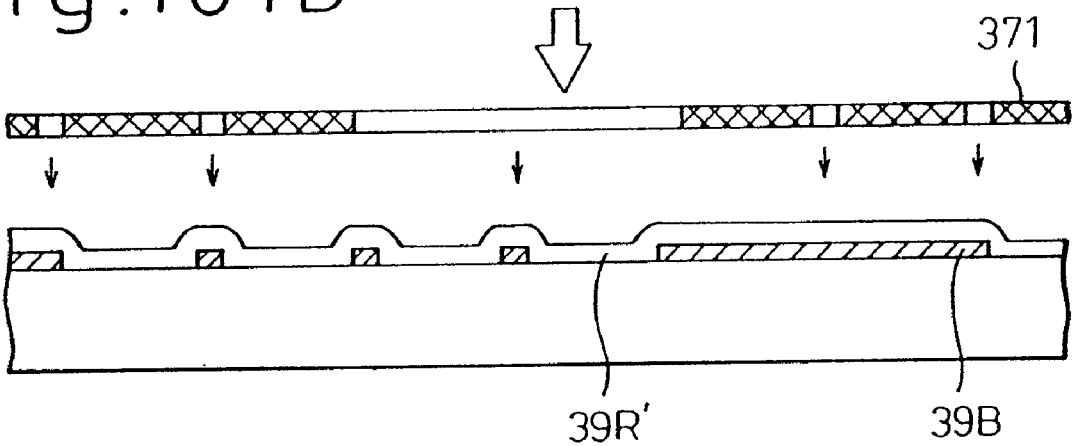
Figure 181E:
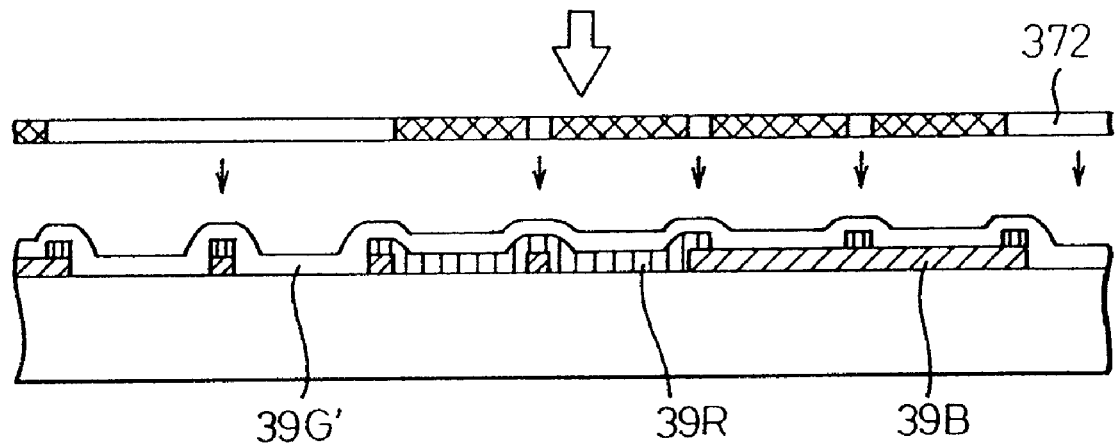

Referring to FIG. 181A, a glass substrate 16 is prepared. Then, as shown in FIG. 181B, a resin (resin B, CB-7001, manufactured by Fuji Hanto Co.) 39B' for negative-type flue filter is applied onto the glass substrate 16 maintaining a thickness of 1.3 µm. Then, as shown in FIG. 181C, the resin B is formed on the portions of the blue (B) pixel, BM portion and protrusion 20A by the photolithography method using a photomask 370 as shown. Next, referring to FIG. 181D, a resin (resin R, CR-7001, manufactured by Fuji Hanto Co.) 39R' for red filter is applied to form the resin R on the portions of the red (R) pixel, BM portion and protrusion 20A by the photolithography method. Referring to FIG. 181E, a resin (resin G, CG-7001, manufactured by Fuji Hanto Co.) 39G' for green filter is applied to form the resin G on the portions of the green (G) pixel, BM portion and protrusion 20A by the photolithography method. Through the above-mentioned steps, corresponding color filter (CF) layers are formed in one layer only on the pixel portions B, G and R, and the resins B, G and R are formed in three layers being superposed one upon the other on the BM portion and on the protrusion 20A. The portions where the resins B, G and R are superposed in three layers are black portions without almost permitting the passage of light.

Figure 181F:
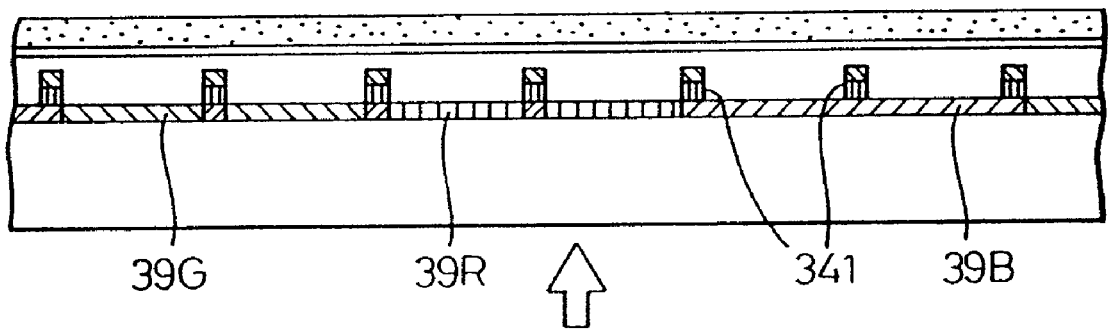
Figure 181G:
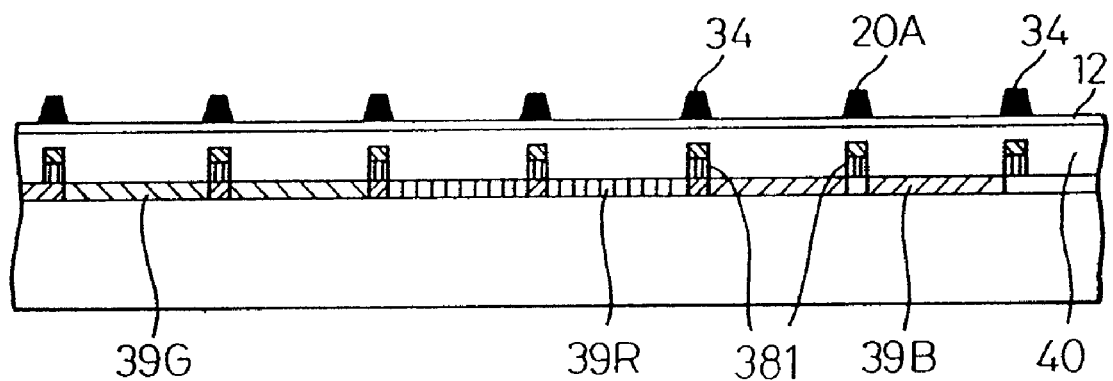

Next, a transparent flattening resin (HP-1009 manufactured by Hitachi Kasei Co.) is applied by a spin coater maintaining a thickness of about 1.5 µm, post-baked in an oven heated at 230° C. for one hour, and an ITO film is formed by mask-sputtering. Referring next to FIG. 181F, a black positive-type resist (CFPR-BKP manufactured by Tokyo Ohka Co.) is applied by the spin coater maintaining a thickness of about 1.0 to 1.5µ, pre-baked, and is exposed to ultraviolet rays having a wavelength of 365 nm in a dosage of 1000 mJ/cm$^2$ from the back surface of the glass substrate 16 through the CF resin. The portions where the resins B, G and R are superposed in three layers permit ultraviolet rays to transmit through less than through other portions, and where a threshold value of exposure is not reached. When developed with an alkali developing solution, the BM portion 34 and the protrusion 20A are formed that were not exposed to light, and are post-baked in an oven heated at 230° C. for one hour. Moreover, a vertical alignment film 22 is formed to complete the CF substrate.

FIG. 182 is a sectional view of a liquid crystal panel completed by sticking the CF substrate 16 prepared as described above and a TFT substrate 17 together. In the TFT substrate 17, a slit 21 is formed as a domain regulating means in the pixel electrode 13, and a vertical alignment film 22 is formed thereon. Reference numeral 40 denotes a gate protection film and a channel protection film. On the portions where the light must be shielded, the BM 34 and the resins of the three layers B, G and R are superposed one upon the other to favorably shield the light. The protrusion 20A of the CF substrate 16 and the slit 21 in the TFT substrate 17 divide the orientation of liquid crystals making it possible to obtain good viewing angle characteristics and high operation speed.

According to the 47th embodiment as described above, the protrusion 20A which is the domain regulating means and the BM 34 are formed on the CF substrate without the need of exposure to light through a pattern, but by patterning by exposure to light from the back surface, making it possible to simplify the steps for forming the protrusion 20A and the BM 34, to lower the cost and to increase the yield.

In the 47th embodiment, the pigment scatter method is employed for forming the CF. This can be similarly adapted even to the dying method and to the case where a non-photosensitive resist formed by dispersing a pigment in the polyimide is to be formed by etching. According to the 47th embodiment, the CF resins are superposed in three layers on the portions of the protrusion 20A and BM 34. These resins, however, may be superposed in two layers provided the wavelength of the irradiation light and the irradiation energy are suitably selected at the time of exposure through the back surface.

In the 47th embodiment, the BM and the protrusion which is the domain regulating means are formed on the CF substrate without patterning. However, the fifth embodiment can be also adapted even to the case where the BM only is formed without forming protrusion, as a matter of course. A 48th embodiment deals with a case where the BM is formed but forming the protrusion by a method different from that of the 47th embodiment.

FIGS. 183A and 183B are diagrams illustrating a step of producing the CF substrate according to the 48th embodiment, and FIGS. 184A and 184B are diagrams illustrating a panel structure according to the 48th embodiment.

In the 48th embodiment, no CF resin is superposed on a portion corresponding to the protrusion but the CF resin is superposed on a portion corresponding to the BM only to form a BM protrusion 381. Next, without effecting the flattening, an ITO film 12 is formed as shown in FIG. 183A, and the above-mentioned black positive-type resist 380 is applied thereon maintaining a predetermined thickness, for example, about 2.0 μm to 2.5 μm. Then, the developing is effected by exposure to light from the back surface to obtain a panel having a BM resist 380 superposed on the BM protrusion 381 as shown in FIG. 183B. The BM 34 is constituted by both the BM protrusion 381 and the BM resist 380.

The CF substrate and the TFT substrate are stuck together to prepare a panel shown in FIG. 184A. FIG. 184B is a view illustrating, on an enlarged scale. A circular portion of a dotted line of FIG. 184A, and in which the BM resist 380 is in contact with the TFT substrate 17, and the distance between the substrates is defined by both the BM protrusion 381 and the BM resist 380. That is, the BM protrusion 381 and the BM resist 380 work as a spacer.

According to the 48th embodiment as described above, there is no need to pattern the BM simplifying the steps, and the BM works as a spacer eliminating the need of providing the spacer. In the 48th embodiment, the positive-type resist was used to form the BM by exposure to light through the back surface without effecting the patterning. However, either the negative-type resist or the positive-type resist can be used provided it can be patterned by the photolithography method. The resist which is not of a black color can be used for forming protrusion which works as a domain regulating means, or can be used as a spacer in compliance with the 47th embodiment.

Next, described below is a case where the protrusion 341 on which the CF resin is superposed in the 48th embodiment, is directly used as the BM.

FIGS. 185A to 185C are diagrams for illustrating the steps for producing the CF substrate according to a 49th embodiment, and FIG. 186 is a diagram illustrating a panel structure according to the 49th embodiment.

Referring to FIG. 185A, the CF resin is superposed in three layers on the BM to form a protrusion 381 which permits light to pass through very little. Referring next to FIG. 185B, the above-mentioned transparent flattening resin is applied by a spin coater maintaining a thickness of about 1.5 μm, post-baked at 230° C. for one hour and, then, an ITO film 12 is formed. Then, in FIG. 185C, a positive-type resist (SC-1811 manufactured by Shipley Far East Co.) is applied maintaining a thickness of about 1.0 to 1.5 μm), pre-baked, and a protrusion 20A is formed by the photolithography method. The protrusion 381 formed by superposing the CF resins B, G and R in three layers does not almost permit light to pass through and works as the BM. The thus completed CF substrate 16 and the TFT substrate 17 are stuck together via a spacer 45 to obtain a panel as shown in FIG. 186.

The 47th to 49th embodiments have dealt with the cases where the BM was formed by superposing the CF resins. The liquid crystal display device of the VA system holding the negative-type liquid crystals, is normally black, and the non-pixel portions to where no voltage is applied do not almost permit light to pass through. Therefore, the BM for shielding light for the non-pixel portions may have a light transmission factor which is not acceptable in the case of the normally white device. That is, the BM may have a light transmission factor which is low to some extent. An 50th embodiment is to easily produce the CF substrate by giving attention to this point, and uses a CF resin or, concretely speaking, uses the resin 13 as the BM. This does not develop any problem from the standpoint of quality of display.

FIG. 187 is a diagram illustrating a step for producing the CF substrate according to the 50th embodiment, and FIGS. 188A and 188B are diagrams illustrating the panel structure according to the 50th embodiment.

Referring to FIG. 187, the CF resins R, G (CR-7001, CG-7001, manufactured by Fuji Hanto Co.) of two colors are formed on the glass substrate 16, and the negative-type photosensitive resin B (CB-7001 manufactured by Fuji Hanto Co.) is applied thereon by using a spin coater or a roll coater and is pre-baked. Then, the glass substrate 16 is exposed to ultraviolet rays of a wavelength of 365 nm in a dosage of 300 mJ/cm$^2$ from the back surface thereof, developed by using an alkali developing solution (CD manufactured by Fuji Hanto Co.), and is post-baked in an oven heated at 230° C. for one hour. Thereafter, an ITO film is formed and, then, a vertical alignment film is formed. That is, the resin B is formed on the portions other than the portions where the CF resins R and G are formed. The CF resins are not formed on the portions where the light must be shielded by forming the BM; i.e., the resin B is formed on the portions where the light must be shielded.

Referring to FIG. 188A, the resin B 39B is formed as BM on the portions of bus lines 31, 32 and on the portions of TFTs where the light must be shielded. FIG. 188B is a diagram illustrating, on an enlarged scale, a circular portion of a dotted line of FIG. 188A. As shown, a high numerical aperture can be obtained by selecting the width of the light-shielding portion (resin B) 382 of the side of the CF indicated by an arrow to be equal to the widths of the bus lines 31, 32 of the TFT substrate 17 to which a margin (1) is added at the time of sticking the two pieces of substrates together.

In the 50th embodiment, the resin B is formed last since the transmission factors of the g-, h- and i-rays of photosensitive wavelengths are resin B>resin R>resin G. When the CF resin having a high exposure sensitivity (which may be exposed to a small amount of light) and the CF resin which permits photosensitizing wavelength to pass through at a large rate, are formed last, the resin of a color formed last remains little on the resins that have been formed already, which is desirable.

In general, it is effective if the first color is that of a resin (generally B>R>G in the transmission light) which makes it easy to discriminate the position alignment mark of an exposure device, and if the alignment mark is formed together with the pixel pattern.

FIG. 192 is a diagram illustrating the structure of the CF substrate according to a 51th embodiment. In the conventional liquid crystal display device, the BM 34 of metal film is formed on the glass substrate 16, the CF resin is formed thereon, and the ITO film is further formed thereon. According to the ninth embodiment, on the other hand, the BM is formed on the ITO film.

In the 51th embodiment, the CF resin 39 is formed by patterning on the glass substrate 16 like in the embodiments described above. As required, a transparent flattening member may be applied thereon. Next, a transparent ITO film 12 is foxed, and a light-shielding film 383 is formed on a diagramed portion thereon. For example, the ITO film 12 is formed by sputtering maintaining a thickness of about 0.1 µm via a mask, and chromium is grown thereon as a light-shielding layer maintaining a thickness of about 0.1 µm. Furthermore, a resist is uniformly applied onto the light-shielding layer maintaining a thickness of about 1.5 µm by such a coating method as spin coating, and the light-shielding film is exposed to light through a pattern, developed, etched, and is peeled, thereby to form the light-shielding film 383. The light-shielding film 383 is composed of chromium and is electrically conducting, has a large contact area relative to the ITO film 12 and makes it possible to lower the resistance of the ITO film 12 over the whole substrate. The ITO film 12 and the light-shielding film 383 may be formed by any method. According to the conventional method, the ITO film 12 is formed, and the substrate is annealed and is washed to form the chromium film. According to the 51th embodiment, the ITO film 12 and the chromium film are continuously formed in an apparatus, making it possible to decrease the step of washing and, hence, to simplify the steps. Therefore, no film-forming device is required, and the apparatus is realized in a small size.

FIGS. 190A and 190B are diagrams illustrating a modified example of the CF substrate of the 51th embodiment. In FIG. 190A, the three CF resins are formed, another resin 384 is formed in a groove in the boundary of the CF resins, and the ITO film 12 and the light-shielding film 383 are formed. In FIG. 190B, the two CF resins 39R and 39G are formed like in the eighth embodiment explained with reference to FIG. 187. Then, the resin B is applied maintaining a thickness of about 1.5 µm, and the substrate is exposed to light from the back surface thereof and is developed to form a flat surface. Then, the ITO film 12 and the light-shielding film 383 are formed thereon. Since the surfaces of the CF layers are flat, the ITO film is not cut, and the resistance of the ITO film 12 can be lowered over the whole substrate.

When a colored resin having a low reflection factor is used as the resin 384 or 39B under the light-shielding film 383, the light-shielding portion exhibits a decreased reflection factor, and light falling on the liquid crystal display device from the outer side is less reflected. Furthermore, when a colored resin having a small transmission factor is used as the resin 384 or 39B under the light-shielding film 383, the light-shielding portion exhibits a decreased transmission factor, enabling the contrast of the liquid crystal display device to be enhanced.

In the structure of FIG. 190B, furthermore, the CF resin 34B is formed requiring no patterning. Therefore, there is no need to use an exposure apparatus which is capable of effecting the patterning and is expensive correspondingly, and the investment for the facilities can be decreased and the cost can be decreased, too.

FIG. 191 is a diagram illustrating a modified example of the 51st embodiment. Spacer for controlling the thickness of the liquid crystal layer are mixed in advance in the resist that is to be applied onto the light-shielding film. After the resist is patterned, therefore, the spacers 45 are formed on the light-shielding film that is formed in any shape. This eliminates the step for dispersing the spacers.

FIG. 192 is a diagram illustrating a CF substrate according to a 52rd embodiment. According to this embodiment, a chromium film is formed on the ITO film 12 and a resist is applied thereon. At the time when the light-shielding film 383 is to be patterned and exposed to light, the protrusion that works as a domain regulating means is patterned simultaneously therewith. After developing and etching, the resist is not peeled off but is allowed to stay. Thus, an insulating protrusion 387 that works as a domain regulating means is formed on the CF substrate 16. By using such a CF substrate, there is realized a panel of a structure shown in FIG. 193.

As described in the 47th embodiment, CF films are formed on a CF substrate, the CF substrate is coated with flatting resin such as acrylic resin so that the surface of the substrate becomes flat, and an electrode of an ITO film is formed thereon. In some cases, the surface flatting step is omitted in order to simplify the process. The CF substrate to which the surface flatting step is not performed is called a CF substrate with no top-coat. The CF substrate with no top-coat has grooves formed between respective CF films. The ITO film is formed with a sputtering process. When the ITO film is formed is formed on the CF substrate with no top-coat, it occurs a problem that the ITO layer is rigid on flat surfaces but it is coarse at the grooves because the sputtering process has anisotropy.

Therefore, when material of vertical alignment film is coated or printed, solvent included in the material infiltrates into the CF films through the grooves after the coating or printing to a precuring process. The infiltrated solvent remains inside the CF layers after the precuring process is completed. The solvent remained inside the CF films generates craters on the surfaces of the vertical alignment film. The craters cause display unevenneses. According to the 51th embodiment, the light-shielding film provided at the grooves can prevents the infiltration of solvent. In a 52th embodiment, resin provided at the grooves between respective CF films are used as protrusions.

Figure 251A:
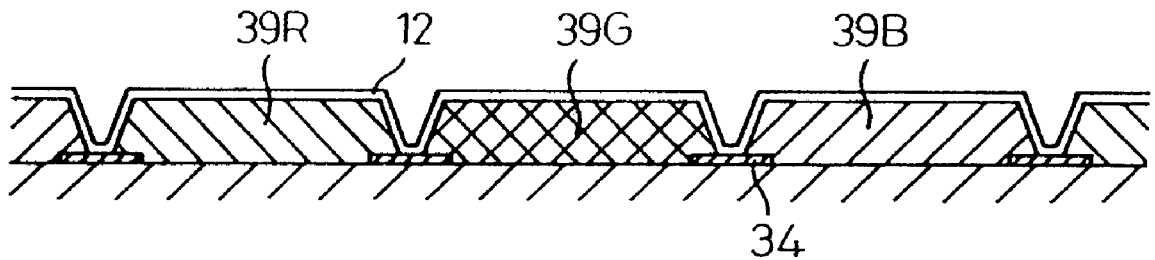
Figure 251B:
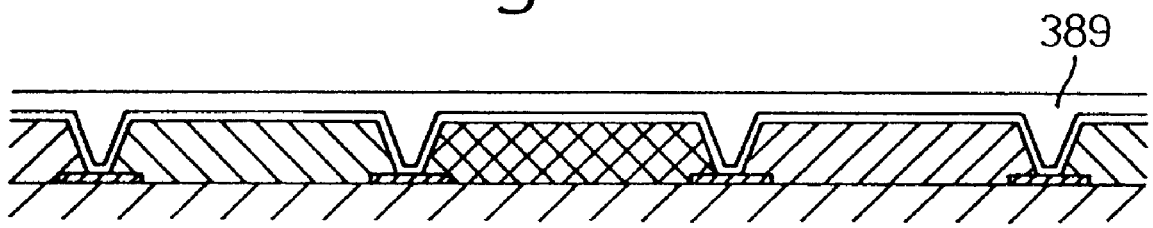
Figure 251C:
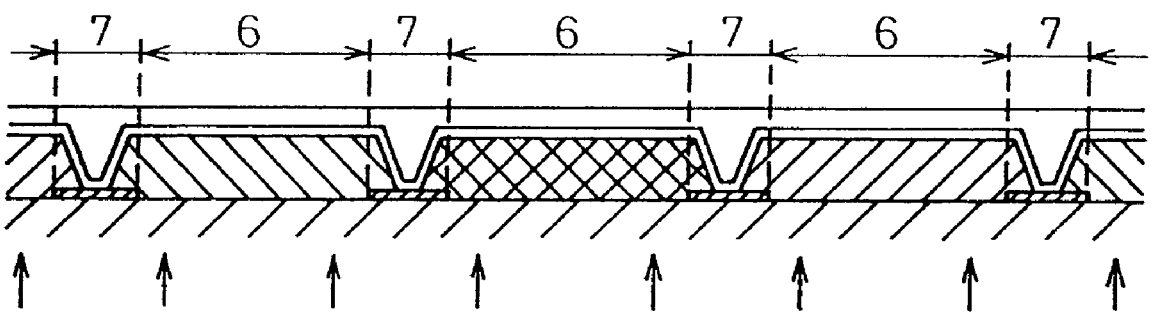
Figure 251D:
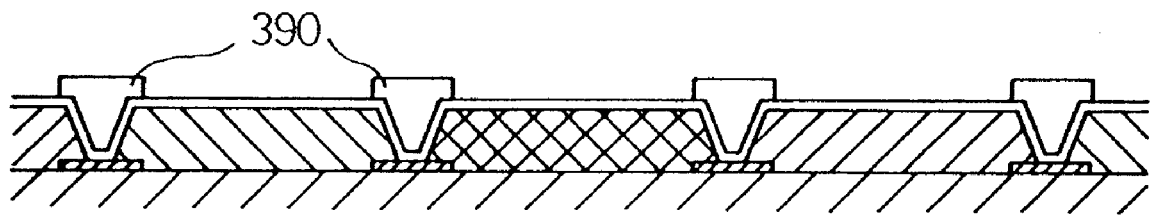

FIGS. 251A to 251D are diagrams showing a production process of a CF substrate of the 52th embodiment. FIG. 251A shows a CF substrate with no top-coat. The CF films 39R, 39G and 39B are formed, the light-shielding films 34 are formed under the boundaries of the respective CF films, and the ITO film is formed the CF films. As shown in FIG. 251B, a positive resist is coated. As shown in FIG. 251C, the positive resist is irradiated with ultraviolet light from a surface of the glass substrate, and it is developed. Then, protrusions 390 are formed at positions corresponding to the light-shielding films 34. The protrusions 390 prevent the infiltration of solvent. Further, the protrusions 390 operate as the protrusions 20A of the CF substrate.

The structures of a liquid crystal display in accordance with the present invention have been described so far. Examples of applications of the liquid crystal display will be described below.

FIG. 194 shows an example of a product employing the liquid crystal display in accordance with the present invention, and FIG. 195 is a diagram showing the structure of the product. As shown in FIG. 195, a liquid-crystal panel 100 has a display surface 111, and makes it possible to view a displayed image not only from the front side but also from any oblique direction defined by a large angle while offering an excellent viewing angle characteristic, a high contrast, and good quality but not causing gray-scale reversal. On the back side of the liquid crystal panel 100, there are a light source 114 and a light box 113 for converting illumination light emanating from the light source 114 to light capable of illuminating the liquid-crystal panel 100 uniformly.

As shown in FIG. 194, a display screen 110 of this product is turnable and the product is therefore usable as either a sideways display or lengthwise display according to a purpose of use. A switch for use in detecting a tilt by 45° is therefore included. By detecting the state of the switch, switching is carried out to select whether display is carried out for the sideways display or for the lengthwise display. For this switching, a mechanism for changing a direction, in which display data is read from a frame memory for image display, by 90° is needed. The relevant technology is well-known. The description of the technology will be omitted.

An advantage provided when the liquid crystal display in accordance with the present invention is adapted to the above product will be described. Since a conventional liquid crystal display permits only a small viewing angle, when a large display screen is adopted, there arises a problem that a viewing angle relative to a marginal part of the screen gets so large that the marginal part becomes hard to see. However, a liquid crystal display in which the present invention is implemented makes it possible to view a high-contrast image even at a large viewing angle without occurrence of gray-scale reversal. In the product shown in FIG. 194, a viewing angle relative to a longer marginal part of the display screen becomes large. It has therefore been impossible to adapt a liquid crystal display to this kind of product. The liquid crystal display of the present invention permitting a large viewing angle can be adapted to the product.

The aforesaid embodiments provide liquid crystal displays in each of which the orientation of a liquid crystal is divided for dividing each domain of the liquid crystal mainly into four regions whose azimuths are mutually different in increments of 90°, and liquid crystal displays in each of which the orientation of a liquid crystal is divided for dividing each domain of the liquid crystal mainly into two regions whose azimuths are mutually different in increments of 90°. This point will be discussed in relation to applications of the present invention. When the orientation of a liquid crystal is divided for dividing each domain of the liquid crystal into four regions whose azimuths are mutually different in increments of 90°, a good viewing angle characteristic can be exhibited in almost all directions. To whichever directions the orientation is set, no problem occurs in particular. For example, when the pattern of protrusions shown in FIG. 54 is arranged as shown in FIG. 196A relative to a screen, a viewing angle at which display appears well is 80° or more both in lateral and vertical directions. Even after the screen is turned and the pattern of protrusions is arranged as illustrated on the right side of FIG. 196A, no problem occurs in particular.

By contrast, when the orientation of a liquid crystal is divided for dividing each domain thereof into two regions whose azimuths are mutually different by 180°, the viewing angle characteristic will be improved relative to the directions into which the orientation is divided but will not be improved very much relative to directions different from the directions by 90°. When a nearly equal viewing angle characteristic is requested to be exhibited in both lateral and vertical directions, a pattern of protrusions should preferably be, as shown in FIG. 196B, run in an oblique direction in a screen.

Next, a process of manufacturing a liquid crystal display in accordance with the present invention will be described. In general, the process of manufacturing a liquid crystal panel comprises, as described in FIG. 197, a step 501 of cleaning substrates, a step 502 of forming gate electrodes, a step 503 of forming an operating layer by applying a continuous film, a step 504 of separating devices, a step 505 of applying a protective film, a step 506 of forming pixel electrodes, and a step 508 of assembling components which are carried out in that order. For forming insulating protrusions, the step 506 of forming pixel elements is succeeded by a step 507 of forming protrusions.

As shown in FIG. 198, the protrusion forming step comprises a step 511 of applying a resist, a step of pre-baking the applied resist, a step 513 of exposing a pattern of protrusions so as to leave the positions of the protrusions intact, a step 514 of performing development so as to remove portions other than the protrusions, and a step 515 of post-baking the remaining protrusions. As described above, at the subsequent step of applying an alignment film, there is a possibility that the resist may react upon the alignment film. At the post-baking step 515, baking should therefore be carried out at a high temperature of a certain level. During the baking, if protrusions are curved to have a cylindrical section, the stability of alignment will increase.

Even when dents are formed as a domain regulating means, nearly the same process as the foregoing one is adopted. However, when electrodes are slitted, a pattern having slitted pixel electrodes should merely be created at the pixel electrode forming step 506 in FIG. 197. The protrusion forming step 507 becomes unnecessary.

What is described in FIG. 198 is an example of drawing a pattern of protrusions using a photosensitive resist. The pattern of protrusions may be printed. FIG. 199 is a diagram showing a technique of drawing a pattern of protrusions by performing letterpress printing. As shown in FIG. 199, a pattern of protrusions is drawn on a flexible relief plate 604 made of an APR resin. The relief plate is in turn fixed to the surface of a large roller 603 referred to as a plate cylinder. The plate cylinder is rotated while being interlocked with an anilox roller 605, a doctor roller 606, and a printing stage 602. A polyimide resin solution used to form protrusions is dropped onto the anilox roller 605 by a dispenser 607, and spread by the doctor roller 606 to be developed uniformly over the anilox roller 605. The developed resin solution is transferred to the relief plate 604. The solution transferred to the raised portion of the relief plate 604 is transferred to a substrate 609 on the printing stage 602. Thereafter, baking or the like is carried out. Various techniques of drawing a microscopic pattern by printing have been employed in practice. If a pattern of protrusions can be drawn using any of the techniques, the pattern of protrusions can be drawn at low cost.

Next, injection of a liquid crystal into a liquid-crystal panel to be performed after upper and lower substrates are bonded will be described. As described in conjunction with FIGS. 18A and 18B, at the step of assembling components to produce a liquid-crystal panel, after a CF substrate and TFT substrates are bonded, a liquid crystal is injected. A VA type TFT LCD has cells whose thickness is small. It takes much time to inject a liquid crystal. Since protrusions are formed, it takes much more time to inject the liquid crystal. It is therefore requested to shorten the time required for injecting the liquid crystal as much as possible.

FIG. 200 is a diagram slowing the configuration of a liquid-crystal injection apparatus. The details of the apparatus will be omitted. An injection connector 615 is attached to a liquid-crystal injection port of a liquid-crystal panel 100, and a liquid crystal is supplied from a liquid-crystal defoamer and pressurizer tank 614. Concurrently, an exhaust connector 618 is connected to a liquid-crystal exhaust port, and the pressure in the liquid-crystal panel 100 is reduced using a vacuum pump 620 for deaeration so that a liquid crystal can be injected readily. A liquid crystal exhausted through the exhaust port is separated from an air by a liquid-crystal trap 619.

In the first embodiment, as shown in FIGS. 18A and 18B, the protrusions 20 are linear and running in a direction parallel to the long side of the panel 100. The liquid crystal injection port 102 is formed on a short side of the panel vertical to the protrusions 20, while the exhaust ports 103 are formed on the other short side thereof opposite to the side on which the injection port 102 is formed. Likewise, as shown in FIGS. 201A and 201B, when the protrusions 20 are linear and running in a direction parallel to the short side of the panel 100, preferably, the liquid-crystal injection port 102 is formed on one long side of the panel vertical to the protrusions 20, and the exhaust ports 103 are formed on the other long side thereof opposite to the long side on which the injection port 102 is formed. Moreover, as shown in FIGS. 202A and 202B, when the protrusions 20 are zigzagged, the liquid-crystal injection port 102 is preferably formed on a side of the panel vertical to a direction in which the protrusions 20 are extending. As shown in FIGS. 203A and 203A, the exhaust ports 103 are preferably formed on a side of the panel opposite to the side on which the injection port 102 is formed.

During injection of a liquid crystal, foams may be mixed in the liquid crystal. Once foams are mixed in a liquid crystal, imperfect display ensues. Assuming that a negative liquid crystal and a vertical alignment film are employed, when no voltage is applied, black display appears. Even if foams are mixed in the liquid crystal, black display appears in areas coincident with the foams. The mixing of foams cannot therefore be discovered in this state. A voltage is applied to electrodes so that white display will appear. When black display does not appear in any area, it is confirmed that no foam has mixed in the liquid crystal. However, since there is no electrode near the liquid-crystal injection port, even if foams are mixed in a portion of the liquid crystal near the liquid-crystal injection port, the foams cannot be discovered. If foams are present in this portion of the liquid crystal, there is a fear that the foams will be dispersed to deteriorate display quality. Even the foams near the injection port must therefore be discovered. In a liquid crystal display of the present invention, therefore, as shown in FIG. 207, an electrode 120 is formed near an injection port 101 outside a display area 121 and the black matrices 34 so that mixing of foams in this portion of a liquid crystal can be detected.

As explained above, the VA system liquid crystal display device using the domain regulating means such as the protrusion and the recess, the slit, etc, does not require the rubbing treatment. Therefore, contamination in the manufacturing process can be drastically reduced, and a part of the washing process can be omitted. However, the negative type (n type) liquid crystal used has lower contamination resistance to organic materials, particularly to polyurethane resin and the skin, than the positive type liquid crystal that is ordinarily used, and involves the problem that display defect occurs. This display defect presumably results from the drop, of the specific resistance of the contaminated liquid crystal.

Therefore, examinations are first made as to which size of the polyurethane resin and the skin causes this display defect. FIGS. 205A to 205C show the VA system liquid crystal panel. After the vertical alignment film is formed on the two substrates 16 and 17, several polyurethane resins having a size of about 10 μm are put on one of the substrates. After the spacers 45 are formed on one of the substrates and the seal material 101, on the other, the substrates are bonded to each other, and the panel is manufactured by charging the liquid crystal. As a result, it is found out that the polyurethane resin 700 expands to an area of 15 μm square by heat and by the formation of the cell thickness (cell gap), and the display defect due to contamination of the liquid crystal is recognized within the range of 0.5 to 2 mm with the polyurethane resin 700 as the center.

FIG. 206 shows the result of the investigation of the contamination area of the liquid crystal by changing the size of the polyurethane resin 700. Assuming that no problem occurs when the display has a size of not greater than 0.3 mm square on the panel, the size of the polyurethane resin must be not greater than 5 μm. This also holds true of the skin.

As described above, the polyurethane resin and the skin lower the specific resistance of the liquid crystal, thereby inviting the display defect. Therefore, the relationship between the mixing quantity of the polyurethane resin and the drop of the specific resistance is examined. FIG. 207 shows the calculation result of frequency dependence of an equivalent circuit of the liquid crystal pixel shown in FIG. 208 by assuming the gate-on state. This graph shows the change of the effective voltage to the frequency when the resistance is $9.1 \times 10^9$, $9.1 \times 10^{10}$, $9.1 \times 10^{11}$ and $9.1 \times 10^{12}$ in the equivalent circuit of the liquid crystal pixel. It can be appreciated from the graph that the drop of the resistance value of the liquid crystal causes the drop of the effective voltage. It can be appreciated further that abnormal display occurs at the drop of the specific resistance of at least 3 digits within the frequency range of 1 to 60 Hz that is associated with the practical display.

FIGS. 208 and 209 are graphs showing within which time the charge once stored is discharged when the resistance is $9.1 \times 10^{10}$, $9.1 \times 10^{11}$ and $9.1 \times 10^{12}$, respectively, by assuming the state where the liquid crystal pixel holds the charge. For reference, an example of the case where only the alignment film exists is shown, too. Because the alignment film has a large resistance and a large time constant, it hardly contributes to discharge phenomenon. FIG. 209 shows in magnification the portion below 0.2 s in FIG. 208. It can be seen from this graph that when the liquid crystal resistance is lower by at least two digits, a black smear starts occurring at 60 Hz.

It can be understood from the observation described above that the problem develops when the resistance drops by two to three digits due to the polyurethane resin and the skin.

Next, after phenyl urethane is charged into the liquid crystal, a ultrasonic wave is applied for 10 seconds and the liquid crystal is thereafter left standing so as to measure the specific resistance of the supernatant. It is found out from the result that the specific resistance drops drastically when the mixing quantity of the polyurethane resin is about 1/1000 in terms of a molar ratio.

It is concluded from the explanation described above that non-uniform display does not occur at the level at which the mixing quantity of the polyurethane and the skin is not greater than 1/1000 in terms of the molar ratio.

The embodiments of panels according to the present invention in which directions of alignment of liquid crystalline molecules are divided by the domain regulating means have been described so far. As already described, it is known that optical retardation film are available for improving the view angle performance. Next, embodiments regarding characteristics and arrangements of the retardation films will be described. The LCD panels of these embodiments have protrusions shown in FIG. 54. Namely, in the VA LCD panel, the directions of alignment of liquid crystalline molecules are divided into four areas in each pixel.

FIG. 210 is a diagram showing a constitution of a prior art VA LCD. A space formed between two electroded 12, 13 is sealed with a liquid crystal material. Thus a liquid crystal panel is completed. As shown in FIG. 210, a first polarizing plate 11 and a second polarizing plate 15 are arranged at both sides of the panel. In the VA LCD, vertical alignment films are formed on the electrodes and the liquid crystal has negative dielectric constant anisotoropy. The rubbing directions of the two vertical alignment films are different each other by 180 degrees. Further, the rubbing directions intersects with the absorption axis of the polarizing plates. Namely, the VA LVD panel is that shown in FIGS. 7A to 7C. FIG. 211 shows isocontrast curves. FIG. 212 shows viewing angle regions, in each of which gray-scale reversal occurs during an eight-gray-scale level driving operation in such a case. From these results, contrasts at directions of 0°, 90°, 180° and 270° are low and the gray-scale reversal occurs in wide view-angle.

FIG. 213 shows a constitution of a VA mode LCD device in which protrusion patterns as illustrated in FIG. 54 are formed.

FIG. 214 shows iso-contrast curves in the case of the LCD device shown in FIG. 213. Further, FIG. 215 shows viewing angle regions, in each of which gray-scale reversal occurs during an eight-gray-scale-level driving operation, in the case of such a liquid crystal display device. These figures reveal that although the gray-scale reversal is improved in the case of this device as compared with the case of the conventional device of the VA (vertically aligned) type, the improvement on the gray-scale reversal is insufficient and that the contrast is not improved very much.

Applicant of the present application disclosed in Japanese Patent Application No. 8-41926/1996 and Japanese Patent Application Nos. 9-29455/1997 and 8-259872/1996, whose priority is based on the Japanese Patent Application No. 8-41926/1996 that the viewing angle characteristics of a liquid crystal display device of the VA type, on which the alignment division is performed by rubbing, are improved by providing an optical retardation film (namely, a phase difference film) therein. These Japanese Patent Applications, however, do not refer to the cases of performing the alignment division by protrusions, depressions (or dents) or slits respectively provided in pixel electrodes.

In the following, conditions for further improving the viewing angle characteristics of a liquid crystal display device of the VA type, which is adapted to perform the alignment division in each pixel through the use of protrusions, depressions or slits provided in the pixel electrodes, by providing an optical retardation film therein will be described.

First, the optical retardation film used in the device of the present invention will be described hereinbelow by referring to FIG. 216. As illustrated in FIG. 216, let $n_x$ and $n_y$ designate dielectric constantes (or indices) respectively corresponding to inplane directions defined in a surface of the film. Further, let $n_z$ denote a dielectric constant in the direction of thickness thereof. The following relation among the dielectric constantes $n_x$, $n_y$ and $n_z$ holds in the phase difference film to be used in the device of the present invention: $n_x, n_y \geq n_z$.

Incidentally, an optical retardation film, in which the following relation holds: $n_x n_y = n_z$, has optically positive uniaxiality therein. Hereunder, such a phase difference film will be referred to simply as a positive uniaxial film. Axis extending in a direction corresponding to a larger one of the dielectric constantes $n_x$ and $n_y$ is referred to as a phase lag axis. In this case, $n_x n_y$. Therefore, the axis extending in the x-direction is referred to as the phase lag axis. Let d designate the thickness of the film. When light passes through this positive uniaxial film, the following phase difference (or optical retardation) R is caused in an inplane direction: $R=(n_x-n_y)d$. Hereinafter, the "phase difference caused by the positive uniaxial film" indicates a phase difference caused in an inplane direction.

Moreover, a phase difference film, in which the following relation holds: $n_x=n_y, n_z$, has optically negative uniaxiality in the direction of a normal to the surface thereof. Hereunder, such a phase difference film will be referred to simply as a negative uniaxial film. Let d designate the thickness of the film. When light passes through this negative uniaxial film, the following phase difference R is caused in the direction of the thickness thereof: $R=((n_x+n_y)/2-n_z)d$. Hereinafter, the "phase difference caused by the negative uniaxial film" indicates a phase difference caused in the direction of the thickness thereof.

Furthermore, a phase difference film, in which the following relation holds: $n_x n_y n_z$, has (optical) biaxiality. Hereunder, such a phase difference film will be referred to simply as a biaxial film. In this case, $n_x n_y$. Therefore, the axis extending in the x-direction is referred to as the phase lag axis. Let d designate the thickness of the film. When light passes through this positive uniaxial film, the following phase difference R is caused in an inplane direction: $R=(n_x-n_y)d$ (incidentally, $n_x n_y$). Further, the phase difference R caused in the direction of the thickness thereof is predetermined by the following equation: $R=((n_x+n_y)/2-n_z)d$.

FIG. 217 is a diagram showing the constitution of a liquid crystal display device which is a 52th embodiment of the present invention.

Color filter and a common electrode (namely, what is called a full-surface covering electrode) are formed on the liquid-crystal-side surface of CF (Color Filter) substrate that is one of substrates 91 and 92. Further, TFT elements, bus lines and pixel electrodes are formed on the liquid-crystal-side surface of TFT substrate that is the other of the substrates 91 and 92.

Vertical alignment film is formed on the liquid-crystal-side surfaces of the substrates 91 and 92 by applying a vertical alignment material thereto through transfer printing, and by then burn the material at 180° C. Subsequently, a positive photosensitive overcoating (or protecting) material is applied onto the vertical alignment film through spin coating. Then, a protrusion pattern shown in FIG. 54 is formed by performing prebaking, exposure and postbaking.

The substrates 91 and 92 are bonded together through a spacer having a diameter of 3.5 μm. Further, a space formed therebetween is sealed with a liquid crystal material having negative dielectric constant anisotropy. Thus a liquid crystal panel is completed.

As illustrated in FIG. 217, the liquid crystal display device, which is the 52th embodiment of the present invention, is constituted by placing a first polarizing plate 11, a first positive uniaxial film 94, two substrates 91 and 92, a second positive uniaxial film 94 and a second polarizing plate 15 therein in this order. Incidentally, the first and second uniaxial films 94 are placed so that the phase lag axis of the first positive uniaxial film 94 intersects with the absorption axis of the first polarizing plate 11 at right angles.

FIG. 218 shows iso-contrast curves in the case that each of the phase differences $R_0$ and $R_1$ respectively corresponding to the first and second positive uniaxial films 61 of the 52th embodiment is set at 110 nm. Further, FIG. 219 shows viewing angle regions, in each of which gray-scale inversion occurs during an eight-gray-scale-level driving operation in such a case. As is apparent from the comparison with FIGS. 214 and 215, a range, in which high contrast is obtained, is enlarged extensively, with the result that the gray-scale reversal does not occur in the entire viewing angle region. Consequently, the viewing angle characteristics are considerably improved.

Incidentally, the viewing angle characteristics were studied by changing the retardation $R_0$ and $R_1$ in various ways in the case of the constitution of FIG. 217. Process of studying the viewing angle was as follows. First, while changing the phase differences $R_0$ and $R_1$, an angle at which the contrast (ratio) was 10, was found in each of an upper right direction (corresponding to an azimuth angle of 45° towards the right top), an upper left direction (corresponding to an azimuth angle of 135° towards the left top), a lower left direction (corresponding to an azimuth angle of 225° towards the left bottom) and a lower right direction (corresponding to an azimuth angle of 315° towards the right bottom) with respect to the liquid crystal panel, as viewed in this figure. FIG. 220 is a contour graph showing each contour that connects points, each of which is represented by coordinates $R_0$ and $R_1$ thereof and corresponds to the found angle having a same value. Incidentally, the contour graphs respectively corresponding to the upper right direction, the upper left direction, the lower left direction and the lower right direction were the same with one another. It is considered that this was because four regions obtained by the alignment division were equivalent to one another as a result of using the protrusion pattern shown in FIG. 54.

In the case of FIG. 217, the angle, at which the contrast ratio is 10 in each of the directions respectively corresponding to the azimuth angles 45°, 135°, 225° and 315° is 39°. This reveals that the use of the optical retardation film is effective in the case of the combination of the coordinates $R_0$ and $R_1$ shown in FIG. 223. Incidentally, in the case illustrated in FIG. 223, the angle, at which the contrast ratio is 10, is not less than 39° when $R_0$ and $R_1$ meet the following conditions or requirements: $R_1 \leq 450$ nm$-R_0$, $R_0-250$ nm$\leq R_1 \leq R_0+250$ nm, $0 \leq R_0$ and $0 \leq R_1$.

Additionally, the retardation $\Delta n \cdot d$ caused in a liquid crystal was changed within a piratical range. Moreover, the twist angle was changed within a range of 0 to 90°. Similarly, the optimum conditions for $R_0$ and $R_1$ were obtained. As a result, it was ascertained that the optimum conditions were the same as the aforementioned requirements even in such cases.

FIG. 221 is a diagram showing the constitution of a liquid crystal display device which is a 53rd embodiment of the present invention. This embodiment is different from the 52nd embodiment in that two positive uniaxial films, namely, first and second positive uniaxial films 94 are placed between the first polarizing plate 11 and the liquid crystal panel, that the phase lag axes of the two positive uniaxial films 94 intersect with each other at right angles and that the phase lag axis of the second positive uniaxial film adjoining the first polarizing plate 11 intersects with the absorption axis of the first polarizing plate 11 at right angles.

FIG. 222 shows iso-contrast curves in the case that the phase differences $R_0$ and $R_1$ respectively corresponding to the first and second positive uniaxial films 61 of the 52nd embodiment are set at 110 nm and 270 nm, respectively. Further, FIG. 223 shows viewing angle regions, in each of which gray-scale inversion occurs during an eight-gray-scale-level driving operation in such a case. As is obvious from the comparison with FIGS. 214 and 215, a range, in which high contrast is obtained, is enlarged extensively. Moreover, the range, in which the gray-scale reversal occurs, is greatly reduced. Consequently, the viewing angle characteristics are considerably improved.

FIG. 224 shows the viewing angle characteristics obtained as a result of being studied by changing the phase differences $R_0$ and $R_1$ of the first and second uniaxial films 94 in various ways in the case of the constitution of FIG. 221, similarly as in the case of the 52th embodiment. The viewing angle characteristics shown in FIG. 224 are the same as of FIG. 220 and are illustrated by a contour graph showing angles, at which the contrast ratio is 10, in terms of coordinates $R_0$, and $R_1$. As is seen therefrom, the angle, at which the contrast ratio is 10, is not less than 39° when $R_0$ and $R_1$ meet the following conditions or requirements: 2 $R_0-170$ nm$\leq R_1 \leq 2$ $R_0+280$ nm, $R_1 \leq -R_0/2+800$ nm, $0 \leq R_0$, and $0 \leq R_1$.

Further, it was ascertained that the optimum conditions were the same as the aforementioned requirements even in the cases where, similarly, in the case of the 53th embodiment, the retardation $\Delta n \cdot d$ caused in a liquid crystal was changed within a practical range and where, moreover, the twist angle was changed within a range of 0 to 90°.

FIG. 225 is a diagram showing the constitution of a liquid crystal display device which is a 54th embodiment of the present invention.

This embodiment is different from the 52th embodiment in that the first negative uniaxial film 95 is placed between the liquid crystal panel and the first polarizing plate 11 and that the second negative uniaxial film 95 is placed between the liquid crystal panel and the second polarizing plate 15.

FIG. 226 shows the viewing angle characteristics obtained as a result of being studied by changing the phase differences $R_0$ and $R_1$ in various ways in the case of the constitution of FIG. 225, similarly as in the case of the 52th embodiment. The viewing angle characteristics shown in FIG. 226 are the same as of FIG. 220 and are illustrated by a contour graph showing angles, at which the contrast ratio is 10, in terms of coordinates $R_0$ and $R_1$. As is seen therefrom, the angle, at which the contrast ratio is 10, is not less than 39° when $R_0$ and $R_1$ meet the following condition or requirement: $R_0+R_1 \leq 500$ mm.

Incidentally, similarly, in the case of the 54th embodiment, the retardation $\Delta n \cdot d$ caused in a liquid crystal and the upper limit to the optimum condition were studied by changing the retardation $\Delta n \cdot d$ within a practical range. FIG. 227 illustrate results of this study. Let $R_{LC}$ denote $\Delta n \cdot d$ caused in the liquid crystal. Consequently, the optimum value in the optimum condition for a sum of the phase differences respectively corresponding to the phase difference films is not more than $(1.7 \times R_{LC}+50)$ nm.

Further, although this characteristic condition relates to the contrast (ratio), the optimum condition for the gray-scale reversal was similarly studied. Angles, at which gray-scale reversal occurs, were found by changing the phase differences $R_0$ and $R_1$ in the direction of the thickness of the first and second negative uniaxial films 95 in various manners in the constitution of FIG. 225, similarly as in the case of the contrast ratio. FIG. 228 shows contour graphs obtained from the found angles, which is illustrated by using the coordinates $R_0$ and $R_1$. Incidentally, the angle, at which the gray-scale reversal occurs in the case illustrated in FIG. 215, is 52°. Thus, when the phase differences $R_0$ and $R_1$ have values at which the angle enabling an occurrence of the gray-scale reversal is not less than 52° in the case illustrated in FIG. 228, the phase difference film has an effect on the gray-scale reversal. In the case shown in FIG. 228, the angle, at which the contrast ratio is 10, is not less than 39° when $R_0$ and $R_0$ meet the following condition or requirement: $R_0+R_1 \leq 345$ nm.

Then, in the case of the 54th embodiment, the relation between $\Delta n \cdot d$ caused in a liquid crystal (display) cell and the upper limit to the optimum condition was studied by changing the retardation Δn·d within a practical range. FIG. 229 illustrate results of this study. This reveals that the upper limit to the optimal condition is nearly constant independent of Δn·d caused in the liquid crystal cell and that the optimum condition for a sum of the phase differences respectively corresponding to the phase difference films is not more than 350 nm.

It is desirable that the angle, at which the contrast ratio is not less than 50°. Further, in view of the gray-scale reversal and Δn·d caused in the liquid crystal cell, it is preferable that a sum of the phase differences respectively corresponding to the phase difference films is not less than 30 nm but is not more than 270 nm.

Moreover, as a result of studying the optimal condition by changing the twist angle in a range of 0 to 90°, it is found that the optimum condition was the same as the aforementioned requirement.

A 55th embodiment of the present invention is obtained by removing one of the first and second negative uniaxial films 95 from the constitution of the liquid crystal display device of FIG. 225, which is the third embodiment of the present invention.

FIG. 230 shows iso-contrast curves in the case that the phase difference corresponding to one of the negative uniaxial films 95 of the 55th embodiment is set at 200 nm. Further, FIG. 231 shows viewing angle regions, in each of which gray-scale inversion occurs during an eight-gray-scale-level driving operation in such a case. As is obvious from the comparison with FIGS. 214 and 215, a range, in which high contrast is obtained, is enlarged extensively. Moreover, the range, in which the gray-scale reversal occurs, is greatly reduced. Consequently, the viewing angle characteristics are considerably improved. Moreover, the optimal condition for realizing the contrast ratio of 10 and the optimal condition for the gray-scale reversal were studied. Results of this study reveal that it is sufficient to use a single negative uniaxial film having the phase difference corresponding to a sum of the phase differences of the negative uniaxial films of the 54th embodiment.

Each of 56th to 58th embodiments of the present invention uses the combination of positive and negative uniaxial films. Although there are various kinds of modifications to the arrangement of such films, it has been found that the constitutions of the fifth to seventh embodiments have (advantageous) effects.

FIG. 232 is a diagram showing the constitution of a liquid crystal display device which is a 56th embodiment of the present invention.

The 56th embodiment differs from the 52th embodiment in that a negative uniaxial film 95 is used and placed between the liquid crystal panel and the first polarizing plate 11 instead of the first positive uniaxial film 94.

FIG. 233 shows iso-contrast curves in the case that the phase difference $R_0$ in an inplane direction in the surface of the positive uniaxial film 94 and the phase difference $R_1$ in the direction of thickness of the negative uniaxial film 95 are set at 150 nm in the 56th embodiment. Further, FIG. 234 shows viewing angle regions, in each of which gray-scale inversion occurs during an eight-gray-scale-level driving operation in such a case. As is obvious from the comparison with FIGS. 214 and 215, a range, in which high contrast is obtained, is enlarged extensively. Moreover, the range, in which the gray-scale reversal occurs, is greatly reduced. Consequently, the viewing angle characteristics are considerably improved.

In the case of the 56th embodiment, the optimal condition for the contrast was studied. FIG. 235 shows results of this study, which reveal that the optimum condition indicated by FIG. 235 was the same as illustrated in FIG. 220.

FIG. 236 is a diagram showing the constitution of a liquid crystal display device which is a 57th embodiment of the present invention. This embodiment is different from the 52th embodiment in that a positive uniaxial films 61 are placed between the liquid crystal panel and the first polarizing plate 11 and that a negative uniaxial film 95 is placed between this positive uniaxial film 94 and the first polarizing plate 11. The positive uniaxial film 94 is placed in such a manner that the phase lag axis thereof intersects with the absorption axis of the first polarizing plate 11 at right angles.

FIG. 237 shows iso-contrast curves in the case that the phase difference $R_0$, in an inplane direction in the surface of the positive uniaxial film 61 and the phase difference $R_1$ in the direction of thickness of the negative uniaxial film 62 are set at 50 nm and 150 nm in the 57th embodiment, respectively. Further, FIG. 238 shows viewing angle regions, in each of which gray-scale inversion occurs during an eight-gray-scale-level driving operation in such a case. As is obvious from the comparison with FIGS. 214 and 215, a range, in which high contrast is obtained, is enlarged extensively. Moreover, the range, in which the gray-scale reversal occurs, is greatly reduced. Consequently, the viewing angle characteristics are considerably improved.

Even in the case of the 57th embodiment, the optimal condition for the contrast was studied. FIG. 239 shows results of this study, which reveal that the optimum condition indicated by FIG. 239 was the same as illustrated in FIG. 220.

FIG. 240 is a diagram showing the constitution of a liquid crystal display device which is a 58th embodiment of the present invention. This embodiment is different from the 52th embodiment in that a negative uniaxial films 95 are placed between the liquid crystal panel and the first polarizing plate 11 and that a positive uniaxial film 94 is placed between this negative uniaxial film 95 and the first polarizing plate 11. The positive uniaxial film 94 is placed in such a manner that the phase lag axis thereof intersects with the absorption axis of the first polarizing plate 11 at right angles.

FIG. 241 shows iso-contrast curves in the case that the phase difference $R_1$ in an inplane direction in the surface of the positive uniaxial film 94 and the phase difference $R_0$ in the direction of thickness of the negative uniaxial film 95 are set at 150 nm in the 58th embodiment. Further, FIG. 242 shows viewing angle regions, in each of which gray-scale inversion occurs during an eight-gray-scale-level driving operation in such a case. As is obvious from the comparison with FIGS. 214 and 215, a range, in which high contrast is obtained, is enlarged extensively. Moreover, the range, in which the gray-scale reversal occurs, is greatly reduced. Consequently, the viewing angle characteristics are considerably improved.

Even in the case of the 58th embodiment, the optimal condition for the contrast was studied. FIG. 243 shows results of this study, which reveal that the optimum condition indicated by FIG. 243 was the same as illustrated in FIG. 220.

FIG. 244 is a diagram showing the constitution of a liquid crystal display device which is an 59th embodiment of the present invention.

This embodiment is different from the 52nd embodiment in that a phase difference film 96, whose inplane dielectric constantes $n_x$ and $n_y$ and dielectric constant $n_z$ in the direction of thickness thereof have the following relation: $n_x$, $n_y \geq n_z$, is placed between the liquid crystal panel and the first polarizing plate 11 and that a positive uniaxial film 94 is removed from between the liquid crystal panel and the second polarizing plate 15. The phase difference film 96 is placed in such a manner that the x-axis thereof intersect with the absorption axis of the first polarizing plate 11 at right angles.

FIG. 245 shows iso-contrast curves in the case that the x-axis is employed as the phase lag axis of the phase difference film 96, namely, $n_x n_y$, and that the phase difference in an inplane direction in the surface of the film and the phase difference in the direction of thickness thereof are set at 55 nm and 190 nm, respectively, in the 59th embodiment. Further, FIG. 246 shows viewing angle regions, in each of which gray-scale inversion occurs during an eight-gray-scale-level driving operation in such a case. As is obvious from the comparison with FIGS. 214 and 215, a range, in which high contrast is obtained, is enlarged extensively. Moreover, the range, in which the gray-scale reversal occurs, is greatly reduced. Consequently, the viewing angle characteristics are considerably improved.

Incidentally, quantities $R_{xy}$ and $R_{yz}$ are defined as follows: $R_{xy}=(n^x-n^y)d$; and $R_{yz}=(n_y-n_z)d$. In the case of the 59th embodiment, the optimal condition for the contrast (ratio) was studied by changing the quantities $R_{zy}$ and $R_{yz}$ in various ways. FIG. 247 shows the found optimal condition for the contrast. The optimum condition shown in FIG. 247 was the same as the aforementioned condition (of FIG. 220), except that $R_0$ and $R_1$ correspond to $R_{xy}$ and $R_{yz}$, respectively. These results reveal that the angles, at which the contrast ratio is 10, are not less than 39° when the quantities $R_{xy}$ and $R_{yz}$ satisfy the following conditions: $R_{xz}-250$ nm$\leq R_{yz} \leq R_{xz}+150$ nm, $R_{yz} \leq -R_{xz}+1000$ nm, $0 \leq R_{yz}$ and $0 \leq R_{xz}$.

Incidentally, let $R_0$ and $R_1$ denote the phase difference in an inplane direction of the phase difference film 96 and the phase difference in the direction of thickness thereof, respectively. Thus, the following relations hold for these phase differences: $R_0=(n_x-n_y)d=R_{xz}-R_{yz}$ ... (in the case that $n_x \geq n_y$); $R_0=(n_y-n_x)d=R_{yz}-R_{xz}$ ... (in the case that $n_y \geq n_x$); and $R_{xz}=((n_x+n_y)/2-n_z)d=(R_{xz}-R_{yz})/2$. Therefore, the optimal conditions for $R_{xz}$ and $R_{yz}$ are written as follows: $R_0 \leq 250$ nm, $R_1 \leq 500$ nm.

Namely, it is desirable that the inplane phase difference is not more than 250 nm and the phase difference in the direction of thickness of the film is not more than 500 nm and that the biaxial phase difference film is placed so that the phase lag axis thereof intersects with the absorption axis of the adjacent polarizing plate at right angles.

As a result of studying the relation between the retardation $\Delta n \cdot d$ caused in a liquid crystal cell and the upper limit to the optimal condition by changing the retardation $\Delta n \cdot d$ in various way within a practical range, it was found that the optimal condition for the phase difference in an inplane direction was not more than 250 mm regardless of the retardation $\Delta n \cdot d$ caused in a liquid crystal cell. In contrast, the phase difference in the direction of thickness depends on the retardation $\Delta n \cdot d$ caused in a liquid crystal cell. FIG. 248 shows the results of the study on the relation between the retardation $\Delta n \cdot d$ caused in a liquid crystal cell and the upper limit to the optimal range of the phase difference in the direction of thickness of the film. Let $R_{LC}$ denote $\Delta n \cdot d$ caused in the liquid crystal. Consequently, it is concluded that the optimum value in the optimal condition for the phase difference in the direction of thickness of the phase difference film is not more than $(1.7 \times R_{LC}+50)$nm.

Incidentally, the optimal condition in the case of a configuration, in which a plurality of phase difference films 96 were placed in at least one of spaces formed between the liquid crystal panel and one of the first polarizing plate 11 and the second polarizing plate 15, which were provided at one or both of sides of the liquid crystal panel, and between the liquid crystal panel and the other thereof was studied similarly. As a result, it was found that the optimum condition was the case where the phase difference in the inplane direction of each of the phase difference films 96 was not more than 250 nm and that a sum of the phase differences in the direction of thickness of the phase difference films 96 was not more than $(1.7 \times R_{LC}+50)$nm.

Further, as a result of studying the optimal condition similarly by changing the twist angle in a range of 0 to 90°, it was found that the optimum condition was the same as the aforementioned requirement.

A positive uniaxial film ($n_x n_y=n_z$), a negative uniaxial film ($n_x=n_y, n_z$) and a biaxial film ($n_x, n_y, n_z$) are employed as the film 96. Namely, a single or a combination of such films may be used.

In the foregoing description, there has been described the optimal conditions for the phase difference film in the case that alignment division is performed in a pixel by providing rows of protrusions on the liquid-crystal-side of each of the two substrates composing the liquid crystal panel. However, even in the case of performing the alignment division by using depressions or slits formed in the pixel electrodes, the viewing angle characteristics can be improved on the similar conditions.

Further, in the present specification, the polarizing plates have been described as ideal ones. Therefore, it is obvious that the phase difference (incidentally, the phase difference in the direction of thickness of the film is usually about 50 nm) caused by a film (namely, TAC (cellulose triacetate) film) protecting a polarizer should be synthesized with the phase difference caused by the phase difference film of the present invention.

Namely, the provision of the phase difference film may be omitted apparently by making TAC film meet the conditions according to the present invention. However, in this case, needless to say, such TAC film performs as well as the phase difference film of the present invention, which should be added to the device, does.

The embodiments in which the present invention is implemented in a TFT liquid crystal display have been described. The present invention can also be implemented in liquid crystal displays of other types. For example, the present invention can be implemented in a MOSFET LCD of a reflection type but not of the TFT type or in a mode using a diode such as a MIM device as an active device. Moreover, the present invention can be implemented in both a TFT mode using an amorphous silicon and a TFT mode using a polycrystalline silicon. Furthermore, the present invention can be implemented in not only a transmission type LCD but also a reflection type or plasma-addressing type LCD.

An existing TN LCD has a problem that it can cover only a narrow range of viewing angles. An IPS LCD exhibiting an improved viewing angle characteristic has problems that a response speed it can offer is not high enough and it cannot therefore be used to display a motion picture. Implementation of the present invention can solve these problems, and realize an LCD exhibiting the same viewing angle characteristic as the IPS LCD and offering a high response speed surpassing the one offered by the TN LCD. Moreover, the LCD can be realized merely by forming protrusions on substrates or slitting electrodes, and can therefore be manufactured readily. Besides, the rubbing step and after-rubbing cleaning step which are required for manufacturing the existing TN LCD and IPS LCD become unnecessary. Since these steps cause imperfect alignment, an effect of improving a yield and product reliability can also be exerted.

Since the LCD offering a high operating speed and exhibiting a good viewing angle characteristic can be realized, expansion of an application range including the application to a monitor substituting for the CRT is expected.

The invention claimed is:

1. A liquid crystal display device including a plurality of pixels, comprising:
 a first substrate and a second substrate;
 a liquid crystal layer provided between said first and second substrates, and including a liquid crystal having a negative dielectric constant anisotropy;
 a first alignment structure and a second alignment structure formed on said first substrate, and a third alignment structure and a fourth alignment structure formed on said second substrate, for controlling an alignment of said liquid crystal; and
 at least one auxiliary alignment structure formed on said first substrate for controlling an alignment of liquid crystals;
 wherein said first alignment structure and said second alignment structure extend linearly in different directions from each other in a pixel, and said third alignment structure and said fourth alignment structure extend parallel to said first alignment structure and said second alignment structure, respectively, in said pixel, and
 said auxiliary alignment structure extends substantially along an edge of said pixel.

2. The liquid crystal display device as defined in claim 1, wherein said first, second, third and fourth alignment structures extend in directions different from a direction in which an edge of said pixel extends.

3. The liquid crystal display device as defined in claim 1, wherein said auxiliary alignment structure is connected to at least one of said first and second alignment structures.

4. The liquid crystal display device as defined in claim 3, wherein said auxiliary alignment structure is connected to an end of said at least one of said first and second alignment structures in said pixel.

5. The liquid crystal display device as defined in claim 1, wherein said auxiliary alignment structure is a protrusion formed on a common electrode provided on said first substrate.

6. The liquid crystal display device as defined in claim 1, wherein one end of said first alignment structure is connected to one end of said second alignment structure, and one end of said third alignment structure is connected to one end of said fourth alignment structure.

7. The liquid crystal display device as defined in claim 1, wherein said first, second, third and fourth alignment structures include protrusions, depressions, slits, or combinations thereof.

8. The liquid crystal display device as defined in claim 7, wherein said first, second, third and fourth alignment structures comprise a slit formed in a pixel electrode.

9. The liquid crystal display device as defined in claim 1, wherein said auxiliary alignment structure includes protrusions, depressions, slits, or combinations thereof.

10. The liquid crystal display device as defined in claim 9, wherein said auxiliary alignment structure comprises a slit formed in a pixel electrode.

11. The liquid crystal display device as defined in claim 1, wherein an angle between said first and second alignment structure is about 90 degrees.

12. The liquid crystal display device as defined in claim 1, wherein an angle between said first alignment structure and an edge of a pixel electrode is about 45 degrees.

13. The liquid crystal display device as defined in claim 1, wherein said first and second alignment structures are physically connected.

14. The liquid crystal display device as defined in claim 1, wherein said first and second alignment structures are not physically connected.

15. The liquid crystal display device as defined in claim 1, wherein said third and fourth alignment structures are physically connected.

16. The liquid crystal display device as defined in claim 1, wherein said third and fourth alignment structures are not physically connected.

17. The liquid crystal display device as defined in claim 1, wherein said first and third alignment structures are repeatedly arranged with a predetermined pitch respectively.

18. The liquid crystal display device as defined in claim 17, wherein said second and fourth alignment structures are repeatedly arranged with a predetermined pitch respectively.

19. The liquid crystal display device as defined in claim 1, wherein, when considered from a perspective substantially vertical to said first and second substrates, a distance between said first and third alignment structures is substantially equal to a distance between said second and fourth alignment structures.

20. The liquid crystal display device as defined in claim 1, wherein each of said plurality of pixels includes a pixel electrode and said first and second alignment structures.

21. The liquid crystal display device as defined in claim 1, wherein each of said plurality of pixels is surrounded by gate bus lines and data bus lines.

* * * * *